US012491943B1

(12) United States Patent
Calliari et al.

(10) Patent No.: US 12,491,943 B1
(45) **Date of Patent: *Dec. 9, 2025**

(54) SYSTEMS AND METHODS FOR A MILITARY VEHICLE

(71) Applicant: Oshkosh Defense, LLC, Oshkosh, WI (US)

(72) Inventors: David Calliari, Oshkosh, WI (US); Cody Bauer, Oshkosh, WI (US); Bjoern Gillstroem, Oshkosh, WI (US); Jonathan King, Oshkosh, WI (US); Mark Chapin, Oshkosh, WI (US); Brian Koppa, Oshkosh, WI (US); Aaron Rositch, Oshkosh, WI (US); Erik Ellifson, Oshkosh, WI (US); Patrick Dillman, Hartford, WI (US); Robert Sollenskog, Oshkosh, WI (US)

(73) Assignee: OSHKOSH DEFENSE, LLC, Oshkosh, WI (US)

(*) Notice: Subject to any disclaimer, the term of this patent is extended or adjusted under 35 U.S.C. 154(b) by 134 days.

This patent is subject to a terminal disclaimer.

(21) Appl. No.: 17/897,146

(22) Filed: Aug. 27, 2022

Related U.S. Application Data

(63) Continuation-in-part of application No. 17/861,701, filed on Jul. 11, 2022, now Pat. No. 11,691,555, and (Continued)

(51) Int. Cl.
*B62D 21/03* (2006.01)
*B60D 1/48* (2006.01)

(Continued)

(52) U.S. Cl.
CPC ............ *B62D 21/03* (2013.01); *B60D 1/488* (2013.01); *B60K 5/00* (2013.01); *B60K 17/04* (2013.01);

(Continued)

(58) Field of Classification Search
CPC .. F16F 9/185; F16F 9/062; F16F 9/063; F16F 9/067; B60G 2202/24; B60G 15/12; B60G 17/08
See application file for complete search history.

(56) References Cited

U.S. PATENT DOCUMENTS

| | | | | |
|---|---|---|---|---|
| 2,004,380 A * | 6/1935 | Nickelsen ............... | F16F 9/185 188/315 |
| 2,048,285 A * | 7/1936 | Padgett ................... | F16F 9/185 188/315 |

(Continued)

FOREIGN PATENT DOCUMENTS

| | | |
|---|---|---|
| CA | 2273950 | 6/1998 |
| CA | 3056935 A1 | 11/2018 |

(Continued)

OTHER PUBLICATIONS

Bucholz, Kami, Thermoplastic technology offers impact protection across automotive, sports, and defense,4 pgs. Mar. 24, 2015 SAE International, www.sae.org/news/2015/03/thermoplastic- technology-offers-impact-protection-across-automotive-sports-and-defense.

(Continued)

*Primary Examiner* — Paul N Dickson
*Assistant Examiner* — Matthew D Lee
(74) *Attorney, Agent, or Firm* — FOLEY & LARDNER LLP

(57) ABSTRACT

A vehicle having a primary mover, a charging system, multiple electric loads, and a controller. The charging system includes a charge storing device and an alternator. The alternator is configured to convert mechanical energy generated by the prime mover into electrical energy to charge the charge storing device. The multiple electrical loads are electrically coupled to the charging system via a power distribution module. The controller is communicably coupled to the charging system and is configured to receive (Continued)

an indication that an electrical output of the charging system is unable to provide sufficient electrical energy to each electrical load in the electrical loads. The controller is also configured to provide a control signal to the power distribution module in response to the indication. The control signal is configured to cause the power distribution module to decouple at least one of the electrical loads from the charging system.

20 Claims, 237 Drawing Sheets

Related U.S. Application Data a continuation-in-part of application No. 17/856,270, filed on Jul. 1, 2022, now Pat. No. 11,893,972, and a continuation-in-part of application No. 17/737,667, filed on May 5, 2022, now Pat. No. 11,932,068, and a continuation-in-part of application No. 17/531,511, filed on Nov. 19, 2021, now Pat. No. 12,025,411, and a continuation-in-part of application No. 17/522,529, filed on Nov. 9, 2021, now Pat. No. 12,366,279, and a continuation-in-part of application No. 17/358,548, filed on Jun. 25, 2021, now Pat. No. 11,673,444, and a continuation-in-part of application No. 17/347,030, filed on Jun. 14, 2021, now Pat. No. 11,697,321, and a continuation-in-part of application No. 17/228,302, filed on Apr. 12, 2021, now Pat. No. 11,738,615, said application No. 17/856,270 is a continuation of application No. 17/200,365, filed on Mar. 12, 2021, now Pat. No. 11,404,039, and a continuation-in-part of application No. 17/165,536, filed on Feb. 2, 2021, now Pat. No. 11,813,917, and a continuation-in-part of application No. 17/140,476, filed on Jan. 4, 2021, now Pat. No. 11,731,507, and a continuation-in-part of application No. 17/140,939, filed on Jan. 4, 2021, now Pat. No. 11,752,824, and a continuation-in-part of application No. 17/140,506, filed on Jan. 4, 2021, now Pat. No. 11,472,283, said application No. 17/347,030 is a continuation of application No. 17/005,989, filed on Aug. 28, 2020, now Pat. No. 11,034,206, and a continuation-in-part of application No. 16/999,732, filed on Aug. 21, 2020, now Pat. No. 11,524,543, said application No. 17/165,536 is a continuation of application No. 16/859,225, filed on Apr. 27, 2020, now Pat. No. 10,940,728, and a continuation-in-part of application No. 16/840,671, filed on Apr. 6, 2020, now Pat. No. 11,524,728, said application No. 17/358,548 is a continuation of application No. 16/837,482, filed on Apr. 1, 2020, now Pat. No. 11,046,142, said application No. 17/737,667 is a continuation of application No. 16/836,422, filed on Mar. 31, 2020, now Pat. No. 11,325,437, said application No. 17/861,701 is a continuation of application No. 16/773,230, filed on Jan. 27, 2020, now Pat. No. 11,400,845, and a continuation-in-part of application No. 16/725,787, filed on Dec. 23, 2019, now Pat. No. 11,597,439, said application No. 17/531,511 is a continuation of application No. 16/700,616, filed on Dec. 2, 2019, now Pat. No. 11,181,345, said application No. 17/140,506 is a continuation of application No. 16/529,294, filed on Aug. 1, 2019, now Pat. No. 10,913,346, said application No. 17/228,302 is a continuation of application No. 16/450,540, filed on Jun. 24, 2019, now Pat. No. 10,974,561, said application No. 17/200,365 is a continuation of application No. 16/411,876, filed on May 14, 2019, now Pat. No. 10,978,039, said application No. 17/522,529 is a continuation of application No. 16/276,273, filed on Feb. 14, 2019, now Pat. No. 11,199,239, which is a continuation-in-part of application No. 16/041,229, filed on Jul. 20, 2018, now Pat. No. 10,619,696, said application No. 17/005,989 is a continuation of application No. 15/956,981, filed on Apr. 19, 2018, now Pat. No. 10,759,251, said application No. 16/840,671 is a continuation of application No. 15/957,307, filed on Apr. 19, 2018, now Pat. No. 10,611,416, said application No. 16/859,225 is a continuation of application No. 15/956,974, filed on Apr. 19, 2018, now Pat. No. 10,632,805, said application No. 16/773,230 is a continuation of application No. 15/957,198, filed on Apr. 19, 2018, now Pat. No. 10,545,010, said application No. 17/140,939 is a continuation of application No. 15/957,319, filed on Apr. 19, 2018, now Pat. No. 10,882,373, said application No. 17/140,476 is a continuation of application No. 15/957,497, filed on Apr. 19, 2018, now Pat. No. 10,906,396, and a continuation-in-part of application No. 15/957,577, filed on Apr. 19, 2018, now Pat. No. 11,427,143, said application No. 16/529,294 is a continuation of application No. 15/957,207, filed on Apr. 19, 2018, now Pat. No. 10,414,266, said application No. 16/725,787 is a continuation of application No. 15/957,505, filed on Apr. 19, 2018, now Pat. No. 10,556,622, said application No. 16/837,482 is a continuation of application No. 15/957,546, filed on Apr. 19, 2018, now Pat. No. 10,611,204, said application No. 16/836,422 is a continuation of application No. 15/956,992, filed on Apr. 19, 2018, now Pat. No. 10,611,203, said application No. 16/276,273 is a continuation-in-part of application No. 15/956,974, filed on Apr. 19, 2018, now Pat. No. 10,632,805, said application No. 16/700,616 is a continuation of application No. 15/956,995, filed on Apr. 19, 2018, now Pat. No. 10,495,419, said application No. 16/999,732 is a continuation of application No. 15/957,513, filed on Apr. 19, 2018, now Pat. No. 10,752,075, said application No. 16/450,540 is a continuation of application No. 15/954,268, filed on Apr. 16, 2018, now Pat. No. 10,350,956, said application No. 16/041,229 is a continuation of application No. 15/084,375, filed on Mar. 29, 2016, now Pat. No. 10,030,737, said application No. 15/954,268 is a continuation of application No. 14/684,082, filed on Apr. 10, 2015, now Pat. No. 9,944,145, said application No. 15/084,375 is a continuation of application No. 13/792,151, filed on Mar. 10, 2013, now Pat. No. 9,303,715.

(60) Provisional application No. 62/673,499, filed on May 18, 2018, provisional application No. 62/491,675, filed on Apr. 28, 2017, provisional application No. 62/491,427, filed on Apr. 28, 2017, provisional application No. 62/491,975, filed on Apr. 28, 2017, provisional application No. 62/491,990, filed on Apr. 28, 2017, provisional application No. 62/491,992, filed on Apr. 28, 2017, provisional application No. 62/491,971, filed on Apr. 28, 2017, provisional application No. 62/491,981, filed on Apr. 28, 2017, provisional application No. 62/491,985, filed on Apr. 28, 2017, provisional application No. 62/491,724, filed on Apr. 28, 2017, provisional application No. 62/491,999, filed on Apr. 28, 2017, provisional application No. 62/491,979, filed on Apr. 28, 2017, provisional application No. 62/491,429, filed on Apr. 28, 2017, provisional application No. 62/491,667, filed on Apr. 28, 2017, provisional application No. 62/492,041, filed on Apr. 28, 2017, provisional application No. 62/491,133, filed on Apr. 27, 2017, provisional application No. 62/490,940, filed on Apr. 27, 2017, provisional application No. 62/491,132, filed on Apr. 27, 2017, provisional application No. 62/491,193, filed on Apr. 27, 2017, provisional application No. 62/491,022, filed on Apr. 27, 2017, provisional application No. 62/490,947, filed on Apr. 27, 2017, provisional application No. 62/487,705, filed on Apr. 20, 2017, provisional application No. 62/487,689, filed on Apr. 20, 2017, provisional application No. 62/487,819, filed on Apr. 20, 2017, provisional application No. 62/487,835, filed on Apr. 20, 2017, provisional application No. 61/978,624, filed on Apr. 11, 2014.

(51) Int. Cl.

| | |
|---|---|
| ***B60K 5/00*** | (2006.01) |
| ***B60K 17/04*** | (2006.01) |
| ***B60K 17/344*** | (2006.01) |
| ***B62D 21/02*** | (2006.01) |
| ***B62D 24/00*** | (2006.01) |
| ***B62D 27/06*** | (2006.01) |
| ***B62D 33/06*** | (2006.01) |
| ***B62D 33/063*** | (2006.01) |
| ***B62D 65/02*** | (2006.01) |

(52) U.S. Cl.

CPC ............ *B60K 17/344* (2013.01); *B62D 21/02* (2013.01); *B62D 24/00* (2013.01); *B62D 27/06* (2013.01); *B62D 33/06* (2013.01); *B62D 33/063* (2013.01); *B62D 65/02* (2013.01)

(56) References Cited

U.S. PATENT DOCUMENTS 2,078,364 A * 4/1937 Becker .................... F16F 9/348 188/315
2,127,518 A 8/1938 Huntman
2,199,880 A * 5/1940 Clifton .................... F16F 9/185 188/315
2,214,038 A 9/1940 Beecher
2,380,393 A 7/1945 Berg
2,432,937 A * 12/1947 Rossman ................ F16F 9/185 188/315
2,601,297 A 6/1952 Keese
2,653,681 A 9/1953 McIntyre
2,783,859 A 3/1957 Patriquin
2,985,319 A 5/1961 Simmons
3,000,625 A 9/1961 Polhemus
3,165,164 A 1/1965 Hostetler et al.
3,175,645 A 3/1965 Schafer et al.
3,316,571 A 5/1967 Cutrone
3,341,189 A 9/1967 Rumsey
3,376,957 A 4/1968 Baumgartner
3,439,913 A 4/1969 Kamman
3,446,317 A 5/1969 Gryglas
3,447,644 A 6/1969 Duckett
3,565,498 A 2/1971 John et al.
3,667,563 A 6/1972 Korb et al.
3,731,770 A 5/1973 Bindon
3,739,885 A 6/1973 Bainbridge
3,750,856 A 8/1973 Kenworthy
3,882,951 A 5/1975 Conley
3,944,270 A 3/1976 Kreuzer
3,981,380 A 9/1976 Andre
3,993,294 A 11/1976 Wossner et al.
4,018,270 A 4/1977 Kolinger et al.
4,071,009 A 1/1978 Kraina
4,150,819 A 4/1979 Taylor
4,155,433 A 5/1979 Porter
4,284,177 A 8/1981 Domek
4,315,204 A 2/1982 Sievers et al.
4,382,311 A 5/1983 Watts
4,383,595 A 5/1983 Schnitzius
4,441,379 A 4/1984 Malkowski et al.
4,537,374 A 8/1985 Barnoin et al.
4,591,031 A 5/1986 Kirst
4,621,150 A 11/1986 Hirai et al.
4,796,871 A 1/1989 Bauer et al.
4,811,983 A 3/1989 Watts et al.
4,813,736 A 3/1989 Schubert et al.
4,836,568 A 6/1989 Preslik et al.
4,854,807 A 8/1989 Bishop
4,899,853 A 2/1990 Hummel
4,905,569 A 3/1990 Seksaria et al.
5,005,677 A 4/1991 Bucholtz et al.
5,007,326 A 4/1991 Gooch et al.
5,013,062 A 5/1991 Yonekawa et al.
5,016,544 A 5/1991 Woollam
5,024,301 A 6/1991 Cook
5,033,357 A 7/1991 Seksaria et al.
5,040,645 A 8/1991 Volpel et al.
5,046,755 A 9/1991 Runkel et al.
5,102,109 A 4/1992 Schnetz
5,113,779 A 5/1992 Amrein et al.
5,171,121 A 12/1992 Smith et al.
5,180,039 A 1/1993 Axthammer et al.
5,193,608 A 3/1993 Sekine et al.
5,234,084 A 8/1993 Bell
5,383,680 A 1/1995 Bock et al.
5,398,592 A 3/1995 Turner
5,417,299 A 5/1995 Pillar et al.
5,421,238 A 6/1995 Catalano
5,498,208 A 3/1996 Braun
5,501,567 A 3/1996 Lanzdorf et al.
5,503,258 A 4/1996 Clarke et al.
5,517,894 A 5/1996 Bohne et al.
5,536,036 A 7/1996 Ehrlich
5,587,907 A 12/1996 Shibata et al.
5,597,047 A 1/1997 Thompson et al.
5,607,028 A 3/1997 Braun et al.
5,653,425 A 8/1997 Page et al.
5,663,520 A 9/1997 Ladika et al.
5,697,741 A 12/1997 Harris et al.
5,732,787 A 3/1998 Hirahara et al.
5,779,300 A 7/1998 McNeilus et al.
5,792,974 A 8/1998 Daqis et al.
5,820,150 A 10/1998 Archer et al.
5,820,258 A 10/1998 Braun
5,829,946 A 11/1998 McNeilus et al.
5,845,723 A 12/1998 Hirahara et al.
5,867,092 A 2/1999 Vogt
5,931,628 A 8/1999 Christenson
6,010,139 A 1/2000 Heyring et al.
6,027,158 A 2/2000 Yang
6,053,486 A 4/2000 Schuitema et al.
6,086,074 A 7/2000 Braun
6,120,009 A 9/2000 Gatehouse et al.
6,129,343 A 10/2000 Ecarnot
6,129,368 A 10/2000 Ishikawa
6,194,877 B1 2/2001 Judge et al.
6,247,564 B1 6/2001 Kim
6,263,749 B1 7/2001 Wesley
6,266,598 B1 7/2001 Pillar et al.
6,286,868 B1 9/2001 Von Mayenburg
6,290,450 B1 9/2001 Humphries et al.
6,421,593 B1 7/2002 Kempen et al.
6,446,944 B1 9/2002 Ward
6,485,079 B1 11/2002 Brown et al.
6,499,548 B2 12/2002 Wesley
6,527,495 B2 3/2003 Humphries et al.

(56) References Cited

U.S. PATENT DOCUMENTS

| | | | |
|---|---|---|---|
| 6,553,290 | B1 | 4/2003 | Pillar |
| 6,622,397 | B1 | 9/2003 | Knoble |
| 6,633,006 | B1 | 10/2003 | Wolf et al. |
| 6,646,845 | B1 | 11/2003 | Turner et al. |
| 6,648,089 | B1 | 11/2003 | Wooldridge et al. |
| 6,666,491 | B2 | 12/2003 | Schrafel |
| 6,688,424 | B1 | 2/2004 | Nakada et al. |
| 6,692,052 | B1 | 2/2004 | Sutton et al. |
| 6,698,729 | B2 | 3/2004 | Popjoy |
| 6,757,597 | B2 | 6/2004 | Yakes et al. |
| 6,778,078 | B1 | 8/2004 | Han et al. |
| 6,882,917 | B2 | 4/2005 | Pillar et al. |
| 6,885,920 | B2 | 4/2005 | Yakes et al. |
| 6,909,944 | B2 | 6/2005 | Pillar et al. |
| 6,918,721 | B2 | 7/2005 | Venton-Walters et al. |
| 6,922,615 | B2 | 7/2005 | Pillar et al. |
| 6,962,102 | B1 | 11/2005 | Johnston et al. |
| 6,993,421 | B2 | 1/2006 | Pillar et al. |
| 6,997,506 | B2 | 2/2006 | Hecker |
| 7,006,902 | B2 | 2/2006 | Archer et al. |
| 7,024,296 | B2 | 4/2006 | Squires et al. |
| 7,055,880 | B2 | 6/2006 | Archer |
| 7,072,745 | B2 | 7/2006 | Pillar et al. |
| 7,073,620 | B2 | 7/2006 | Braun et al. |
| 7,073,847 | B2 | 7/2006 | Morrow et al. |
| 7,107,129 | B2 | 9/2006 | Rowe et al. |
| 7,118,314 | B2 | 10/2006 | Zhou et al. |
| 7,127,331 | B2 | 10/2006 | Pillar et al. |
| 7,162,332 | B2 | 1/2007 | Pillar et al. |
| 7,164,977 | B2 | 1/2007 | Yakes et al. |
| 7,184,862 | B2 | 2/2007 | Pillar et al. |
| 7,184,866 | B2 | 2/2007 | Squires et al. |
| 7,198,130 | B2 | 4/2007 | Schimke |
| 7,228,948 | B2 | 6/2007 | Wilda et al. |
| 7,254,468 | B2 | 8/2007 | Pillar et al. |
| 7,258,194 | B2 | 8/2007 | Braun et al. |
| 7,264,305 | B2 | 9/2007 | Kuriakose |
| 7,270,222 | B1 | 9/2007 | Aymar |
| 7,270,346 | B2 | 9/2007 | Rowe et al. |
| 7,274,976 | B2 | 9/2007 | Rowe et al. |
| 7,277,782 | B2 | 10/2007 | Yakes et al. |
| 7,302,320 | B2 | 11/2007 | Nasr et al. |
| 7,322,591 | B2 | 1/2008 | Seki |
| 7,325,660 | B2 | 2/2008 | Norgaard et al. |
| 7,357,203 | B2 | 4/2008 | Morrow et al. |
| 7,370,904 | B2 | 5/2008 | Wood et al. |
| 7,392,122 | B2 | 6/2008 | Pillar et al. |
| 7,448,460 | B2 | 11/2008 | Morrow et al. |
| 7,451,028 | B2 | 11/2008 | Pillar et al. |
| 7,517,005 | B2 | 4/2009 | Kuriakose |
| 7,522,979 | B2 | 4/2009 | Pillar |
| 7,555,369 | B2 | 6/2009 | Pillar et al. |
| 7,621,580 | B2 | 11/2009 | Randjelovic et al. |
| 7,689,332 | B2 | 3/2010 | Yakes et al. |
| 7,703,586 | B2 | 4/2010 | Deferme |
| 7,711,460 | B2 | 5/2010 | Yakes et al. |
| 7,715,962 | B2 | 5/2010 | Rowe et al. |
| 7,756,621 | B2 | 7/2010 | Pillar et al. |
| 7,823,948 | B2 | 11/2010 | Redman et al. |
| 7,824,293 | B2 | 11/2010 | Schimke |
| 7,831,363 | B2 | 11/2010 | Quigley |
| 7,896,606 | B2 | 3/2011 | Ethington et al. |
| 7,931,103 | B2 | 4/2011 | Morrow et al. |
| 7,949,445 | B2 | 5/2011 | Poilbout |
| 7,954,882 | B2 | 6/2011 | Brummel et al. |
| 7,963,204 | B2 | 6/2011 | Venton-Walters et al. |
| 7,997,182 | B1 | 8/2011 | Cox |
| 8,000,850 | B2 | 8/2011 | Nasr et al. |
| 8,095,247 | B2 | 1/2012 | Pillar et al. |
| 8,096,225 | B1 | 1/2012 | Johnson et al. |
| 8,109,557 | B1 | 2/2012 | Salinas |
| 8,123,645 | B2 | 2/2012 | Schimke |
| 8,152,216 | B2 | 4/2012 | Howell et al. |
| 8,196,721 | B2 | 6/2012 | Gabriel et al. |
| 8,205,729 | B2 | 6/2012 | Miyasato et al. |
| 8,215,892 | B2 | 7/2012 | Calliari |
| 8,333,390 | B2 | 12/2012 | Linsmeier et al. |
| 8,337,352 | B2 | 12/2012 | Morrow et al. |
| 8,376,439 | B2 | 2/2013 | Kuriakose et al. |
| 8,402,878 | B2 | 3/2013 | Schreiner et al. |
| 8,413,567 | B2 | 4/2013 | Luther et al. |
| 8,437,982 | B2 | 5/2013 | Minoshima et al. |
| 8,459,619 | B2 | 6/2013 | Trinh et al. |
| 8,465,025 | B2 | 6/2013 | Venton-Walters et al. |
| 8,509,452 | B2 | 8/2013 | Yokota |
| 8,541,895 | B2 | 9/2013 | Kuriki |
| 8,561,735 | B2 | 10/2013 | Morrow et al. |
| 8,596,648 | B2 | 12/2013 | Venton-Walters et al. |
| 8,640,594 | B2 | 2/2014 | Treadway et al. |
| 8,656,822 | B1 | 2/2014 | Saucedo |
| 8,657,498 | B2 | 2/2014 | Cooley et al. |
| 8,667,880 | B1 | 3/2014 | Berman |
| 8,695,998 | B1 | 4/2014 | Karel et al. |
| 8,723,948 | B2 | 5/2014 | Gotz et al. |
| 8,740,286 | B2 | 6/2014 | Aizik et al. |
| 8,764,029 | B2 | 7/2014 | Venton-Walters et al. |
| 8,770,086 | B2 | 7/2014 | Enck |
| 8,794,886 | B1 | 8/2014 | Nett et al. |
| 8,801,017 | B2 | 8/2014 | Ellifson et al. |
| 8,801,318 | B2 | 8/2014 | Knoble et al. |
| 8,807,576 | B2 | 8/2014 | Koeske et al. |
| 8,813,981 | B2 | 8/2014 | Ethington |
| 8,821,130 | B2 | 9/2014 | Venton-Walters et al. |
| 8,864,613 | B2 | 10/2014 | Morrow et al. |
| 8,876,133 | B2 | 11/2014 | Ellifson |
| 8,886,402 | B1 | 11/2014 | Lou |
| 8,943,946 | B1 | 2/2015 | Richmond et al. |
| 8,947,531 | B2 | 2/2015 | Fischer et al. |
| 8,955,859 | B1 | 2/2015 | Richmond et al. |
| 8,967,699 | B1 | 3/2015 | Richmond et al. |
| 8,991,834 | B2 | 3/2015 | Venton-Walters et al. |
| 8,991,840 | B2 | 3/2015 | Zuleger et al. |
| 8,998,299 | B2 | 4/2015 | Shmargad |
| 9,022,185 | B2 | 5/2015 | Kanioz |
| 9,033,165 | B2 | 5/2015 | Aus et al. |
| 9,045,014 | B1 | 6/2015 | Verhoff et al. |
| 9,062,983 | B2 | 6/2015 | Zych |
| 9,114,804 | B1 | 8/2015 | Shukla et al. |
| 9,114,808 | B2 | 8/2015 | Ogata et al. |
| 9,127,738 | B2 | 9/2015 | Ellifson et al. |
| 9,132,736 | B1 | 9/2015 | Shukla et al. |
| 9,139,409 | B2 | 9/2015 | Perron |
| 9,145,905 | B2 | 9/2015 | Hou |
| 9,157,704 | B2 | 10/2015 | Bayer et al. |
| 9,174,686 | B1 | 11/2015 | Messina et al. |
| 9,194,136 | B2 | 11/2015 | Cormier et al. |
| 9,240,176 | B2 | 1/2016 | Tzirkel-Hancock et al. |
| 9,279,258 | B2 | 3/2016 | Cormier et al. |
| 9,291,230 | B2 | 3/2016 | Ellifson et al. |
| 9,293,135 | B2 | 3/2016 | Rill et al. |
| 9,297,426 | B2 | 3/2016 | Graves et al. |
| 9,303,715 | B2 | 4/2016 | Dillman et al. |
| 9,305,541 | B2 | 4/2016 | Caillet et al. |
| 9,306,432 | B2 | 4/2016 | Coldwate et al. |
| 9,327,576 | B2 | 5/2016 | Ellifson |
| 9,328,986 | B1 | 5/2016 | Pennau et al. |
| 9,329,000 | B1 | 5/2016 | Richmond et al. |
| 9,330,653 | B2 | 5/2016 | Yokota |
| 9,366,507 | B1 | 6/2016 | Richmond et al. |
| 9,376,102 | B1 | 6/2016 | Shukla et al. |
| 9,404,717 | B2 | 8/2016 | Pfennig et al. |
| 9,428,042 | B2 | 8/2016 | Morrow et al. |
| 9,452,750 | B2 | 9/2016 | Shukla et al. |
| 9,454,952 | B2 | 9/2016 | Tzirkel-Hancock et al. |
| 9,493,093 | B2 | 11/2016 | Stingle et al. |
| 9,508,335 | B2 | 11/2016 | Benattar et al. |
| 9,508,336 | B1 | 11/2016 | Torres |
| 9,581,153 | B2 | 2/2017 | Venton-Walters et al. |
| 9,595,251 | B2 | 3/2017 | Whinnery |
| 9,633,507 | B2 | 4/2017 | Wolf et al. |
| 9,641,120 | B2 | 5/2017 | Matsuda et al. |
| 9,650,032 | B2 | 5/2017 | Kotloski et al. |
| 9,651,120 | B2 | 5/2017 | Morrow et al. |
| 9,656,640 | B1 | 5/2017 | Verhoff et al. |

(56) References Cited

U.S. PATENT DOCUMENTS 9,656,659 B2 5/2017 Shukla et al.
9,669,679 B2 6/2017 Zuleger et al.
9,685,151 B2 6/2017 Torres
9,688,112 B2 6/2017 Venton-Walters et al.
9,704,507 B2 7/2017 Westerman
9,707,869 B1 7/2017 Messina et al.
9,731,594 B2 8/2017 Wildgrube
9,738,186 B2 8/2017 Krueger et al.
9,743,213 B2 8/2017 Mohammad et al.
9,747,367 B2 8/2017 Benattar
9,764,613 B2 9/2017 Rowe et al.
9,765,841 B2 9/2017 Ellifson et al.
9,809,080 B2 11/2017 Ellifson et al.
9,821,789 B2 11/2017 Shukla et al.
9,829,282 B1 11/2017 Richmond et al.
9,845,839 B2 12/2017 Rummel
9,890,024 B2 2/2018 Hao et al.
9,904,851 B2 2/2018 Dimitriadis et al.
9,908,520 B2 3/2018 Shukla et al.
9,938,121 B2 4/2018 Aus et al.
9,944,145 B2 4/2018 Dillman et al.
9,970,515 B2 5/2018 Morrow et al.
9,987,900 B2 6/2018 Farjoud et al.
9,989,333 B2 6/2018 Sumi et al.
10,029,555 B2 7/2018 Kotloski et al.
10,029,556 B2 7/2018 Morrow et al.
10,030,737 B2 7/2018 Dillman et al.
10,063,972 B1 8/2018 Zanpure
10,111,000 B1 10/2018 Ho et al.
10,152,962 B2 12/2018 MacNeille et al.
10,157,606 B2 12/2018 Christoph
10,199,030 B2 2/2019 Torres et al.
10,214,876 B2 2/2019 Nakagawa et al.
10,350,956 B2 7/2019 Dillman et al.
10,403,258 B2 9/2019 Zafeiropoulos
10,414,266 B1 9/2019 Wiegand et al.
10,419,868 B2 9/2019 Hotary
10,547,947 B2 1/2020 Kim et al.
10,556,622 B1 2/2020 Calliari et al.
10,611,203 B1 4/2020 Rositch et al.
10,611,204 B1 4/2020 Zhang et al.
10,611,416 B1 4/2020 Groteleuschen et al.
10,619,696 B2 4/2020 Dillman et al.
10,632,805 B1 4/2020 Rositch et al.
10,714,116 B2 7/2020 Tintor et al.
10,752,075 B1 8/2020 Shukla et al.
10,882,373 B1 1/2021 Shukla et al.
10,974,561 B2 4/2021 Dillman et al.
11,046,142 B2 6/2021 Zhang et al.
11,199,239 B2 12/2021 Dumitru et al.
11,255,401 B2 2/2022 Dillman et al.
11,255,642 B1 2/2022 Rasico et al.
11,293,514 B2 4/2022 Dillman et al.
11,649,874 B2 5/2023 Dillman et al.
12,020,720 B2 6/2024 Tintor et al.
2001/0011614 A1 8/2001 Sasano et al.
2001/0012369 A1 8/2001 Marquiss
2001/0025889 A1 10/2001 Salberg
2002/0015614 A1 2/2002 Lindsay
2002/0020572 A1 2/2002 Wooldridge et al.
2002/0100649 A1 8/2002 Agrotis et al.
2003/0067152 A1 4/2003 Most et al.
2003/0159575 A1 8/2003 Reichman
2004/0004316 A1 1/2004 Robertson
2004/0020354 A1 2/2004 Ravid et al.
2004/0062620 A1 4/2004 Deets
2004/0148778 A1 8/2004 Fleming
2005/0051935 A1 3/2005 Lanterman et al.
2005/0087064 A1 4/2005 Cohen
2005/0200201 A1 9/2005 Jabaji et al.
2005/0252635 A1 11/2005 Adamson et al.
2005/0274491 A1 12/2005 Evans et al.
2005/0284682 A1 12/2005 Hass et al.
2005/0285445 A1 12/2005 Wruck et al.
2006/0076741 A1 4/2006 Lim
2006/0163016 A1 7/2006 Ferkany
2006/0163017 A1 7/2006 Verriet
2006/0185950 A1 8/2006 Gaile
2006/0192354 A1 8/2006 Van Cayzeele
2006/0288969 A1 12/2006 Thomas
2007/0023253 A1 2/2007 Wayman
2007/0068716 A1 3/2007 Kunikata
2007/0084337 A1 4/2007 Strassgurtl et al.
2007/0144713 A1 6/2007 Sugimoto et al.
2007/0216147 A1 9/2007 Ramsey
2007/0234895 A1 10/2007 Singh et al.
2008/0084182 A1 4/2008 Oberlin et al.
2008/0093818 A1 4/2008 Nykanen et al.
2008/0195277 A1 8/2008 Stiller
2009/0001675 A1 1/2009 Higashi
2009/0007626 A1 1/2009 Bochen et al.
2009/0007856 A1 1/2009 Minekawa
2009/0020081 A1 1/2009 Claypole et al.
2009/0085377 A1 4/2009 Hayes et al.
2009/0151483 A1 6/2009 Kim et al.
2009/0267354 A1 10/2009 Donaldson et al.
2009/0309278 A1 12/2009 Axelsson et al.
2010/0006043 A1 1/2010 Kardos et al.
2010/0018732 A1 1/2010 Daniel et al.
2010/0037761 A1 2/2010 Boczek et al.
2010/0077913 A1 4/2010 Cunningham et al.
2010/0101404 A1 4/2010 Lorenzo et al.
2010/0121590 A1 5/2010 Kato
2010/0140031 A1 6/2010 Miyasato
2010/0170389 A1 7/2010 North
2010/0171323 A1 7/2010 Helms
2010/0218667 A1 9/2010 Naroditsky et al.
2010/0236882 A1 9/2010 Uchiyama
2010/0251883 A1 10/2010 Naroditsky
2010/0251884 A1 10/2010 Floch
2010/0307329 A1 12/2010 Kaswen et al.
2011/0017054 A1 1/2011 Naroditsky et al.
2011/0017536 A1 1/2011 Chunduru et al.
2011/0073402 A1 3/2011 Manabe et al.
2011/0100775 A1 5/2011 Foister et al.
2011/0114286 A1 5/2011 Komatsu et al.
2011/0139525 A1 6/2011 Karl
2011/0144868 A1 6/2011 Tezak et al.
2011/0192275 A1 8/2011 Medwell et al.
2011/0204675 A1 8/2011 Sonnek et al.
2011/0240387 A1 10/2011 Piggott
2011/0252954 A1 10/2011 Peryea et al.
2011/0315494 A1 12/2011 Marking
2012/0005962 A1 1/2012 Ackermann
2012/0048665 A1 3/2012 Marking
2012/0049470 A1 3/2012 Rositch et al.
2012/0070020 A1 3/2012 Kano
2012/0097019 A1 4/2012 Sherbeck et al.
2012/0098172 A1 4/2012 Trinh et al.
2012/0100790 A1 4/2012 Miesterfeld et al.
2012/0160620 A1 6/2012 Yamashita et al.
2012/0160624 A1 6/2012 Katayama et al.
2012/0174767 A1 7/2012 Naroditsky et al.
2012/0186428 A1 7/2012 Peer et al.
2012/0200116 A1 8/2012 Klein et al.
2012/0205843 A1 8/2012 Allen et al.
2012/0234638 A1 9/2012 Ellifson et al.
2012/0241128 A1 9/2012 Vacca et al.
2012/0247890 A1 10/2012 Murakami
2012/0312648 A1 12/2012 Yu et al.
2012/0318623 A1 12/2012 Mombour
2013/0241237 A1 9/2013 Dziuba et al.
2013/0249183 A1 9/2013 Ellifson et al.
2013/0327582 A1 12/2013 Kim
2014/0023456 A1 1/2014 Allor et al.
2014/0056675 A1 2/2014 Kitaoka et al.
2014/0060303 A1 3/2014 Enck
2014/0060304 A1 3/2014 Harmon et al.
2014/0060953 A1 3/2014 Wetterlund
2014/0130656 A1 5/2014 Farinella et al.
2014/0130658 A1 5/2014 Gonzalez
2014/0150633 A1 6/2014 Mears et al.
2014/0195062 A1 7/2014 Stanczak et al.
2014/0195115 A1 7/2014 Muller et al.

(56) References Cited

U.S. PATENT DOCUMENTS

| | | | |
|---|---|---|---|
| 2014/0208931 | A1 | 7/2014 | Shmargad |
| 2014/0233748 | A1 | 8/2014 | Klug et al. |
| 2014/0251742 | A1 | 9/2014 | Dillman et al. |
| 2014/0271066 | A1 | 9/2014 | Hou |
| 2014/0316637 | A1 | 10/2014 | Rhode et al. |
| 2014/0318359 | A1 | 10/2014 | Asaf et al. |
| 2014/0326555 | A1 | 11/2014 | Ellifson et al. |
| 2014/0334956 | A1 | 11/2014 | Venton-Walters et al. |
| 2014/0343831 | A1 | 11/2014 | Hosey et al. |
| 2014/0361566 | A1 | 12/2014 | Oh et al. |
| 2015/0008658 | A1 | 1/2015 | Keatley |
| 2015/0028529 | A1 | 1/2015 | Ellifson |
| 2015/0145188 | A1 | 5/2015 | Polakowski et al. |
| 2015/0189433 | A1 | 7/2015 | Ganeshkumar |
| 2015/0191069 | A1 | 7/2015 | Zuleger et al. |
| 2015/0197129 | A1 | 7/2015 | Venton-Walters et al. |
| 2015/0249886 | A1 | 9/2015 | Haylett et al. |
| 2015/0251610 | A1 | 9/2015 | Kugelstadt et al. |
| 2015/0258872 | A1 | 9/2015 | Lee |
| 2015/0268009 | A1 | 9/2015 | Tunis et al. |
| 2015/0290993 | A1 | 10/2015 | Dillman et al. |
| 2015/0300784 | A1 | 10/2015 | Scarinci et al. |
| 2015/0316039 | A1 | 11/2015 | Tucker et al. |
| 2015/0352944 | A1 | 12/2015 | Hoffmann et al. |
| 2015/0367898 | A1 | 12/2015 | Kondo |
| 2015/0369114 | A1 | 12/2015 | Bruss et al. |
| 2015/0375592 | A1 | 12/2015 | Lannen et al. |
| 2016/0017650 | A1 | 1/2016 | Marshall et al. |
| 2016/0029111 | A1 | 1/2016 | Wacquant et al. |
| 2016/0100250 | A1 | 4/2016 | Baskin et al. |
| 2016/0121947 | A1 | 5/2016 | Lyle et al. |
| 2016/0122973 | A1 | 5/2016 | Lyle et al. |
| 2016/0138243 | A1 | 5/2016 | Ogura et al. |
| 2016/0159401 | A1 | 6/2016 | Batt |
| 2016/0162254 | A1 | 6/2016 | Benattar |
| 2016/0163303 | A1 | 6/2016 | Benattar et al. |
| 2016/0176283 | A1 | 6/2016 | Hicke et al. |
| 2016/0305531 | A1 | 10/2016 | Martin et al. |
| 2016/0329040 | A1 | 11/2016 | Whinnery |
| 2017/0001672 | A1 | 1/2017 | Bodin |
| 2017/0008361 | A1 | 1/2017 | Langhorst et al. |
| 2017/0009840 | A1 | 1/2017 | Hertz |
| 2017/0021721 | A1 | 1/2017 | Kurokawa |
| 2017/0110107 | A1 | 4/2017 | Iida |
| 2017/0125784 | A1 | 5/2017 | Dulle et al. |
| 2017/0201197 | A1 | 7/2017 | Res |
| 2017/0218832 | A1 | 8/2017 | Kurokawa et al. |
| 2017/0225535 | A1 | 8/2017 | Batsch et al. |
| 2017/0241502 | A1 | 8/2017 | Rummel |
| 2017/0253221 | A1 | 9/2017 | Verhoff et al. |
| 2017/0305226 | A1 | 10/2017 | Okimura |
| 2017/0321995 | A1 | 11/2017 | Sumi et al. |
| 2017/0349048 | A1 | 12/2017 | Nakayama et al. |
| 2018/0003101 | A1 | 1/2018 | Kondou et al. |
| 2018/0003807 | A1 | 1/2018 | Galera et al. |
| 2018/0038074 | A1 | 2/2018 | Nishihata |
| 2018/0052037 | A1 | 2/2018 | Minoshima |
| 2018/0052038 | A1 | 2/2018 | Minoshima |
| 2018/0126823 | A1 | 5/2018 | Schoneboom |
| 2018/0141402 | A1 | 5/2018 | Oh |
| 2018/0147915 | A1 | 5/2018 | Tezuka et al. |
| 2018/0154728 | A1 | 6/2018 | Giovanardi et al. |
| 2018/0162401 | A1 | 6/2018 | Yamazaki |
| 2018/0182583 | A1 | 6/2018 | Kato |
| 2018/0266510 | A1* | 9/2018 | Jee .......................... F16F 9/325 |
| 2018/0312039 | A1 | 11/2018 | Sakane et al. |
| 2019/0016357 | A1 | 1/2019 | Smith et al. |
| 2019/0036321 | A1 | 1/2019 | Hu et al. |
| 2019/0092165 | A1 | 3/2019 | Martin |
| 2019/0178329 | A1 | 6/2019 | Dumitru et al. |
| 2019/0255903 | A1 | 8/2019 | Hirao et al. |
| 2019/0276042 | A1 | 9/2019 | Higashitani et al. |
| 2019/0300076 | A1 | 10/2019 | Tilp et al. |
| 2019/0316650 | A1 | 10/2019 | Dillman et al. |
| 2019/0349683 | A1 | 11/2019 | Anders et al. |
| 2020/0173513 | A1* | 6/2020 | Woenarta ................ F16F 9/067 |
| 2020/0232533 | A1 | 7/2020 | Dillman et al. |
| 2020/0348109 | A1 | 11/2020 | Trott |
| 2022/0258556 | A1 | 8/2022 | Rositch et al. |

FOREIGN PATENT DOCUMENTS

| | | | | |
|---|---|---|---|---|
| CN | 206125159 | U | | 4/2017 |
| CN | 206953913 | U | | 2/2018 |
| CN | 114370475 | A | * | 4/2022 |
| DE | 39 34 385 | A1 | | 4/1991 |
| DE | 40 03 200 | A1 | | 8/1991 |
| DE | 10 2011 112 387 | A1 | | 3/2013 |
| DE | 20 2016 100 149 | U1 | | 4/2016 |
| DE | 10 2016 001 235 | B3 | | 2/2017 |
| DE | 10 2008 039 949 | A1 | | 3/2020 |
| EP | 0 133 157 | A2 | | 2/1985 |
| EP | 1 158 202 | A2 | | 11/2001 |
| EP | 1 640 251 | B1 | | 3/2006 |
| EP | 2 650 151 | A2 | | 10/2013 |
| EP | 2 706 367 | | | 3/2014 |
| FR | 2340482 | A1 | | 9/1977 |
| FR | 2503055 | A1 | | 10/1982 |
| FR | 2687123 | A1 | | 8/1992 |
| FR | 3031721 | A1 | | 7/2016 |
| GB | 0 899 480 | | | 6/1962 |
| JP | 63-167137 | A | | 7/1988 |
| JP | H08-328570 | A | | 12/1996 |
| JP | 2000-108633 | A | | 4/2000 |
| JP | 2000-142054 | A | | 5/2000 |
| WO | WO-2006/010207 | A1 | | 2/2006 |
| WO | WO-2007/031821 | A1 | | 3/2007 |
| WO | WO-2020/214031 | A1 | | 10/2020 |

OTHER PUBLICATIONS

Viconic Defense website, Oct. 18, 2014 http://www.viconicdefense.com/products/blast- mitigating-floor-mats.

Viconic Launches New Military Blast Mat, 2 pgs., Dec. 18, 2013, http://www.viconicdefense.com/news.

Zhang; Fault Diagnosis of Automotive Electric Power Generation and Storage Systems; Sep. 2010; https://eeexplore.ieee.org/stamp/stamp.jsp?tp=&arnumber=5611179 (Year: 2010).

Ebert, Utility Vehicle With Aggregate Frame on a Sub-frame, Nov. 14, 2007, EPO, EP 1640251 B1, Machine Translation of Description (Year: 2007) (Year: 2007).

Just, Cross Beam I.e. Front Cross Beam, for Use in Supporting Device of E.g. Lorry . . . , Mar. 11, 2010, EPO, DE 102008039949 A1, Machine Translation of Description (Year: 2010) (Year: 2010).

* cited by examiner

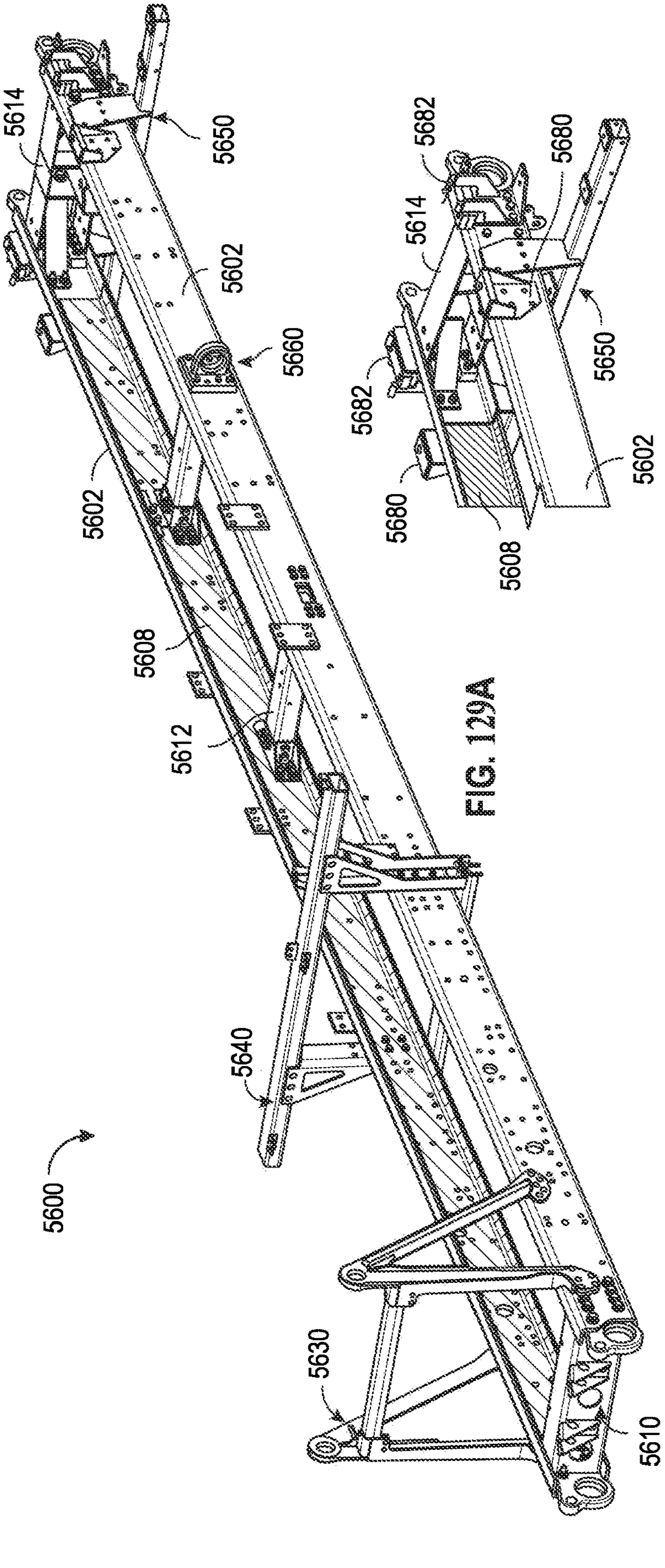
FIG. 129A
FIG. 129B
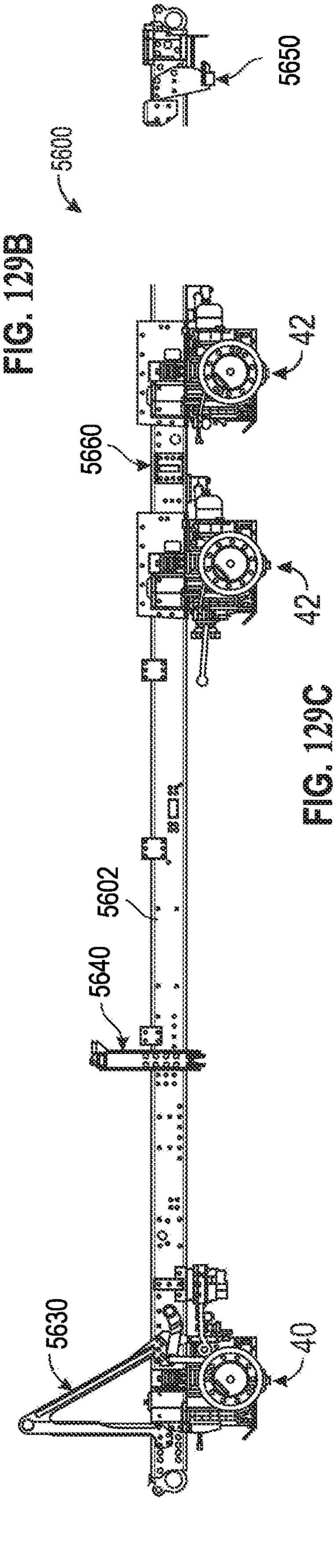
FIG. 129C

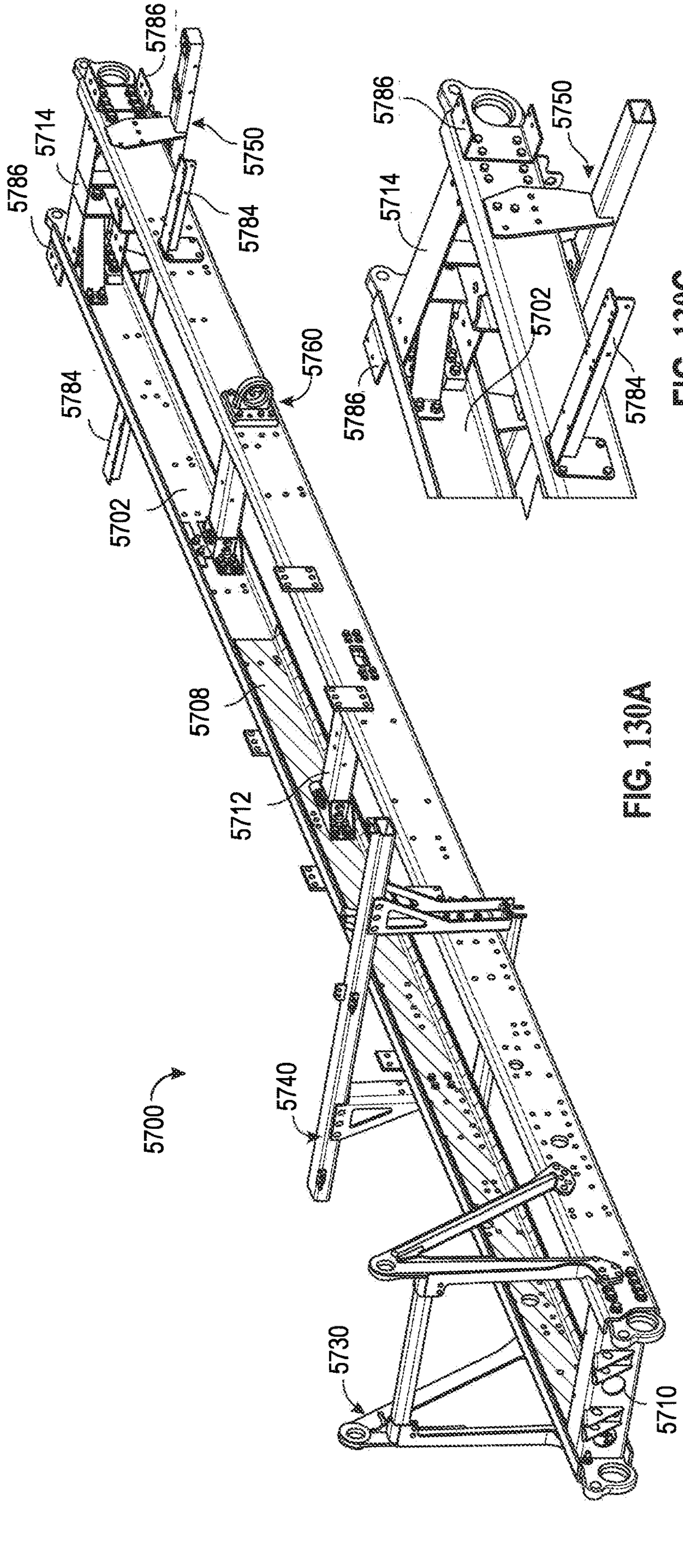
FIG. 130A
FIG. 130C
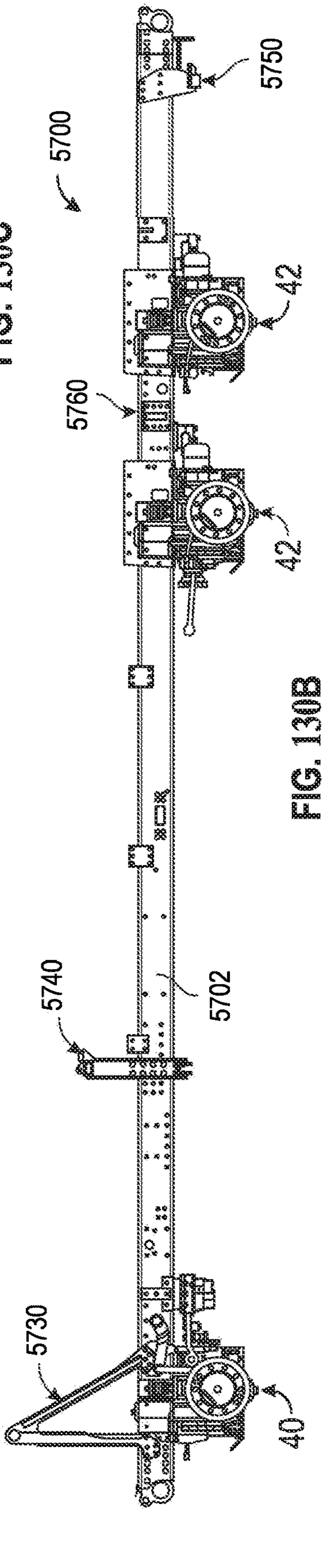
FIG. 130B

SYSTEMS AND METHODS FOR A MILITARY VEHICLE

CROSS-REFERENCE TO RELATED PATENT APPLICATIONS

This application is a continuation in part of: (i) U.S. application Ser. No. 15/957,577, filed Apr. 19, 2018, now U.S. Pat. No. 11,427,143, which claims the benefit of U.S. Provisional Application No. 62/491,985, filed Apr. 28, 2017, U.S. Provisional Application No. 62/491,992, filed Apr. 28, 2017, and U.S. Provisional Application No. 62/491,990, filed Apr. 28, 2017; (ii) U.S. application Ser. No. 16/725,787, filed Dec. 23, 2019, which is a continuation of U.S. patent application Ser. No. 15/957,505, filed Apr. 19, 2018, now U.S. Pat. No. 10,556,622, which claims the benefit of U.S. Provisional Patent Application No. 62/487,705, filed Apr. 20, 2017, U.S. Provisional Patent Application No. 62/487,819, filed Apr. 20, 2017, and U.S. Provisional Patent Application No. 62/487,835, filed Apr. 20, 2017; (iii) U.S. application Ser. No. 16/840,671, filed Apr. 6, 2020, which is a continuation of U.S. application Ser. No. 15/957,307, filed Apr. 19, 2018, now U.S. Pat. No. 10,611,416, which claims the benefit of U.S. Provisional Application No. 62/491,975, filed Apr. 28, 2017, U.S. Provisional Application No. 62/491,427, filed Apr. 28, 2017, and U.S. Provisional Application No. 62/491,022, filed Apr. 27, 2017; (iv) U.S. application Ser. No. 16/999,732, filed Aug. 21, 2020, which is a continuation of U.S. application Ser. No. 15/957,513, filed Apr. 19, 2018, now U.S. Pat. No. 10,752,075, which claims the benefit of U.S. Provisional Application No. 62/491,667, filed Apr. 28, 2017, and U.S. Provisional Application No. 62/491,675, filed Apr. 28, 2017; (v) U.S. application Ser. No. 17/140,939, filed Jan. 4, 2021, which is a continuation of U.S. application Ser. No. 15/957,319, filed Apr. 19, 2018, now U.S. Pat. No. 10,882,373, which claims the benefit of U.S. Provisional Application No. 62/492,041, filed Apr. 28, 2017, and U.S. Provisional Application No. 62/491,724, filed Apr. 28, 2017; (vi) U.S. application Ser. No. 17/140,476, filed Jan. 4, 2021, which is a continuation of U.S. patent application Ser. No. 15/957,497, filed Apr. 19, 2018, now U.S. Pat. No. 10,906,396, which claims the benefit of U.S. Provisional Application No. 62/487,689, filed Apr. 20, 2017; (vii) U.S. application Ser. No. 17/165,536, filed Feb. 2, 2021, which is a continuation of U.S. patent application Ser. No. 16/859,225, filed Apr. 27, 2020, now U.S. Pat. No. 10,940,728, which is a continuation of U.S. patent application Ser. No. 15/956,974, filed Apr. 19, 2018, now U.S. Pat. No. 10,632,805, which claims the benefit of and priority to U.S. Provisional Application No. 62/491,132, filed Apr. 27, 2017, and U.S. Provisional Application No. 62/491,971, filed Apr. 28, 2017; (viii) U.S. application Ser. No. 17/140,506, filed Jan. 4, 2021, which is a continuation of U.S. patent application Ser. No. 16/529,294, filed Aug. 1, 2019, now U.S. Pat. No. 10,913,346 which is a continuation of U.S. patent application Ser. No. 15/957,207, filed Apr. 19, 2018, now U.S. Pat. No. 10,414,266, which claims the benefit of U.S. Provisional Application No. 62/491,979, filed Apr. 28, 2017, and U.S. Provisional Application No. 62/491,981, filed Apr. 28, 2017; (ix) U.S. application Ser. No. 17/228,302, filed Apr. 12, 2021, which is a continuation of U.S. application Ser. No. 16/450,540, filed Jun. 24, 2019, now U.S. Pat. No. 10,974,561, which is a continuation of U.S. application Ser. No. 15/954,268, filed Apr. 16, 2018, now U.S. Pat. No. 10,350,956, which is a continuation of U.S. application Ser. No. 14/684,082, filed Apr. 10, 2015, now U.S. Pat. No. 9,944,145, which claims the benefit of U.S. Provisional Application No. 61/978,624, filed Apr. 11, 2014; (x) U.S. application Ser. No. 17/347,030, filed Jun. 14, 2021, which is a continuation of U.S. patent application Ser. No. 17/005,989 filed Aug. 28, 2020, now U.S. Pat. No. 11,034,206, which is a continuation of U.S. patent application Ser. No. 15/956,981, filed Apr. 19, 2018, now U.S. Pat. No. 10,759,251, which claims the benefit of U.S. Provisional Application No. 62/491,133, filed Apr. 27, 2017; (xi) U.S. application Ser. No. 17/358,548, filed Jun. 25, 2021, which is a continuation of U.S. application Ser. No. 16/837,482, filed Apr. 1, 2020, now U.S. Pat. No. 11,046,142, which is a continuation of U.S. application Ser. No. 15/957,546, filed Apr. 19, 2018, now U.S. Pat. No. 10,611,204, which claims the benefit of U.S. Provisional Application No. 62/491,999, filed Apr. 28, 2017; (xii) U.S. application Ser. No. 17/531,511, filed Nov. 19, 2021, which is a continuation of U.S. application Ser. No. 16/700,616, filed Dec. 2, 2019, now U.S. Pat. No. 11,181,345, which is a continuation of U.S. application Ser. No. 15/956,995, filed Apr. 19, 2018, now U.S. Pat. No. 10,495,419, which claims the benefit of U.S. Provisional Application No. 62/490,940, filed Apr. 27, 2017, and U.S. Provisional Application No. 62/490,947, filed Apr. 27, 2017; (xiii) U.S. application Ser. No. 17/522,529, filed Nov. 9, 2021, which is a continuation of U.S. application Ser. No. 16/276,273, filed Feb. 14, 2019, now U.S. Pat. No. 11,199,239, which is a continuation in part of (a) of U.S. application Ser. No. 15/956,974, filed Apr. 19, 2018, now U.S. Pat. No. 10,632,805, which claims the benefit of U.S. Provisional Application No. 62/491,132, filed Apr. 27, 2017, and U.S. Provisional Application No. 62/491,971, filed Apr. 28, 2017, and also a continuation in part of (b) U.S. application Ser. No. 16/041,229, filed Jul. 20, 2018, now U.S. Pat. No. 10,619,696 which is a continuation of U.S. application Ser. No. 15/084,375, filed Mar. 29, 2016, now U.S. Pat. No. 10,030,737, which is a continuation of U.S. application Ser. No. 13/792,151, filed Mar. 10, 2013, now U.S. Pat. No. 9,303,715; (xiv) U.S. application Ser. No. 17/737,667, filed May 5, 2022, which is a continuation of U.S. patent application Ser. No. 16/836,422, filed Mar. 31, 2020, now U.S. Pat. No. 11,325,437, which is a continuation of U.S. patent application Ser. No. 15/956,992, filed Apr. 19, 2018, now U.S. Pat. No. 10,611,203, which claims the benefit of and priority to U.S. Provisional Application No. 62/491,193, filed Apr. 27, 2017; (xv) U.S. application Ser. No. 17/861,701, filed Jul. 11, 2022, which is a continuation of U.S. application Ser. No. 16/773,230, filed Jan. 27, 2020, now U.S. Pat. No. 11,400,845, which is a continuation of U.S. application Ser. No. 15/957,198, filed Apr. 19, 2018, now U.S. Pat. No. 10,545,010, which claims the benefit of U.S. Provisional Application No. 62/491,429, filed Apr. 28, 2017; and (xvi) U.S. application Ser. No. 17/856,270, filed Jul. 1, 2022, which is a continuation of U.S. patent application Ser. No. 17/200,365, filed Mar. 12, 2021, now U.S. Pat. No. 11,404,039, which is a continuation of U.S. patent application Ser. No. 16/411,876, filed May 14, 2019, now U.S. Pat. No. 10,978,039 which claims the benefit of and priority to U.S. Provisional Patent Application No. 62/673,499, filed May 18, 2018, all of which are incorporated herein by reference in their entireties.

BACKGROUND

Certain vehicles may have a limited ability to mitigate the effect of a blast event on an occupant without adversely affecting occupant comfort. Energy absorbing mats are used in vehicles to absorb a portion of the energy of an underbody blast event, reducing the energy that is transmitted into an occupant's foot and person. These mats may traditionally have a uniform thickness, creating an uneven surface along the floor of the vehicle.

SUMMARY

One embodiment relates to a vehicle having a primary mover, a charging system, multiple electric loads, and a controller. The charging system is coupled to the prime mover, and includes a charge storing device and an alternator. The alternator is configured to convert mechanical energy generated by the prime mover into electrical energy to charge the charge storing device. The multiple electrical loads are electrically coupled to the charging system via a power distribution module. The controller is communicably coupled to the charging system and is configured to receive an indication that an electrical output of the charging system is unable to provide sufficient electrical energy to each electrical load in the electrical loads. The controller is also configured to provide a control signal to the power distribution module in response to the indication. The control signal is configured to cause the power distribution module to decouple at least one of the electrical loads from the charging system.

Another embodiment relates to a chassis for a vehicle. The chassis includes a frame. The frame has a first end and an opposing second end. The frame includes a first frame rail, a second frame rail, and a cross member. The first frame rail defines a first channel. The second frame rail defines a second channel, and is spaced from the first frame rail. The cross member assembly is coupled to the first end of the frame and extends between the first frame rail and the second frame rail. The cross member assembly includes a first end plate, a second end plate, and a cross member. The first end plate is positioned within and releasably received by the first channel of the first frame rail. The second end plate is positioned within and releasably received by the second channel of the second frame rail. The cross member extends between the first end plate and the second end plate.

Another embodiment relates to a vehicle including a frame, tractive assemblies coupled to the frame, a cabin, and a mount. The mount includes a boss, a first bracket, a second bracket, and a first and second isolator. The boss is coupled to the cabin. The first bracket is pivotably coupled to the boss. The second bracket is coupled to the frame. The first isolator and the second isolator extend between the first bracket and the second bracket and couple the first bracket to the second bracket.

Another embodiment relates to a vehicle including a sprung mass, tractive assemblies, multiple springs, multiple load sensors, and a controller. The sprung mass includes a cabin coupled to a chassis. The tractive assemblies each include at least one tractive element. The springs couple the tractive elements to the sprung mass. Each spring is configured to impart an upward force on the sprung mass. The load sensors are each configured to provide a signal indicative of the force imparted by one of the springs. The controller is operatively coupled to the load sensors. The controller is configured to determine a weight of the sprung mass using the signals from the load sensors. The controller is configured to monitor at least one operational condition of the vehicle, and to determine whether or not to disable determination of the weight based on the at least one operational condition.

Another embodiment relates to a suspension system. The suspension system includes a spring assembly and a controller. The spring assembly includes a gas spring and an accumulator coupled to the gas spring. The accumulator includes a bladder and has a compressed state and an uncompressed state. The controller is configured to determine a target amount of gas in the spring assembly and adjust the amount of gas in the spring assembly towards the target amount of gas based on a pressure difference across the bladder.

Another embodiment relates to a powertrain for a vehicle. The powertrain includes a transfer case, and an override system. The transfer case is configured to couple to a transmission and includes a shift rod, a piston assembly, and a resilient member. The piston assembly includes a first piston coupled to the shift rod and a second piston selectively engageable with the first piston. The resilient member is positioned to bias the shift rod and the first piston into a high position corresponding with a high mode of operation of the transfer case. The override system includes a housing coupled to the transfer case, a lever, and an engagement element. The lever is coupled to the housing, and is pivotable between a first position and a second position. The engagement element is disposed within the housing and coupled to the lever. The engagement element is configured to engage the second piston in response to the lever being pivoted from the first position to the second position such that the second piston engages the first piston, thereby repositioning the first piston and the shift rod to a neutral position corresponding with a neutral mode of operation of the transfer case.

Another embodiment relates to a vehicle having a support arm, a suspension element, a thrust washer, and a mounting pin. The support arm has a mounting portion including a passage. The suspension element includes a cap attached to a first end of the suspension element. The cap includes a first opening. The thrust washer is disposed between the passage and the first opening. The thrust washer includes a ring and fins coupled to the ring. The fins define channels that extend in a radial direction with respect to a central axis of the ring. The mounting pin extends through the passage, the first opening, and the thrust washer. The mounting pin rotatably couples the suspension element to the support arm.

Another embodiment relates to a vehicle. The vehicle includes a chassis, a cab coupled to the chassis, a prime mover coupled to the chassis and positioned at least one of beneath or behind the cab, and an accessory drive. The accessory drive includes an accessory and connecting shaft. The accessory is positioned forward of a front of the cab such that the accessory is spaced from the prime mover. The connecting shaft extends from the prime mover, past the front of the cab, and to the accessory. The connecting shaft is positioned to facilitate driving the accessory with the prime mover.

Another embodiment relates to a suspension element including a main body having an internal volume, a tubular element extending at least partially within the main body, the main body and the tubular element each including a sidewall having an inner surface and an outer surface, a first piston assembly separating the internal volume of the main body into a first chamber and a second chamber, the second chamber defined by at least portions of the outer surface of the tubular element, the inner surface of the main body, and a surface of the first piston assembly, and a second piston assembly including a side that is directly exposed to the first chamber. The sidewall of the main body defines an aperture therethrough that forms a portion of a flow path between the first chamber and the second chamber. The first piston assembly is configured to prevent direct fluid communication between the first chamber and the second chamber during at least one of an extension and a contraction of the tubular element.

Another embodiment relates to a vehicle. The vehicle includes a frame, a first mounting bracket, and a sway bar assembly. The frame includes a first member including a first opening and a second member including a second opening. The first member and the second member are spaced apart from one another in at least one position. The first mounting bracket is disposed proximal the first member and includes a first panel and a second panel. The first panel is substantially parallel to a surface of the first member and defines a bar opening that is substantially aligned with the first opening. The second panel extends substantially perpendicular to the first panel and includes an aperture that is substantially aligned with the bar opening. The sway bar assembly includes a bar having a first end and a second end. The bar extends through the first opening and the second opening and is rotatably coupled to the first mounting bracket. The first end of the bar extends outward of the first member and the second end of the bar extends outward of the second member.

According embodiment relates to a vehicle includes a chassis, a plurality of tractive assemblies coupled to the chassis, and a controller. Each tractive assembly includes a tractive element and an actuator coupled to the tractive element and configured to move the tractive element relative to the chassis. The controller is configured to control at least one of the actuators to vary a load supported by one of the tractive assemblies in response to an indication that a portion of a first tractive assembly of the plurality of tractive assemblies is disabled.

Another embodiment relates to a vehicle including a frame, a front cabin, an armor component, and a retainer. The front cabin is coupled to the frame and selectively repositionable between an in-use position and a maintenance position. The retainer is coupled to the armor component and defines a slot extending laterally across a portion of the retainer. The vehicle is reconfigurable between an A-kit configuration and a B-kit configuration. In the A-kit configuration, the armor component is removed from the vehicle. In the B-kit configuration, the armor component is coupled to the front cabin. The retainer is offset the armor component by a retainer spacer.

Another embodiment relates to a damper assembly. The damper assembly includes a tubular member, a rod, a primary piston, and a secondary piston. The tubular member includes a sidewall and a cap at an end of the sidewall. The sidewall and the cap define an inner volume. The sidewall includes a first portion and a second portion. The first portion and the second portion define a shoulder. The rod extends within the inner volume. The primary piston is positioned within the inner volume and coupled to the rod. The primary piston defines a first contact surface. The secondary piston includes a body member, and one or more bypass orifices. The body member includes a second contact surface, an opposing second surface, an inner cylindrical face defining a central aperture that receives the rod, and an outer cylindrical face. The opposing second surface includes one or more surface grooves disposed about the body member, extending across an entire radial width of the opposing second surface from the inner cylindrical face to the outer cylindrical face. The one or more bypass orifices are disposed about the body member. The one or more bypass orifices extend along the inner cylindrical face between the second contact surface and the opposing second surface. The secondary piston defines a channel extending between the inner cylindrical face and an outer periphery of the body member. The primary piston and the secondary piston separate the inner volume into a first working chamber, a second working chamber, and a recoil chamber. The first contact surface and the channel are configured to cooperatively define a flow conduit upon engagement between the primary piston and the secondary piston. The second contact surface is configured to engage the first contact surface such that an open flow path is formed from the recoil chamber through the central aperture and the flow conduit upon engagement between the primary piston and the secondary piston.

Another embodiment relates to a suspension element for use with a vehicle. The suspension element includes a main body having an internal volume. The main body includes a barrier at one end. In some embodiments, the main body includes an end cap disposed on an opposite end. A tubular element is slidably engaged with the main body. The suspension element further includes a first piston coupled to the tubular element, and a flow control element having at least two flow states. Advantageously, the flow control element is configured to prevent movement of the tubular element relative the main body in a direction.

Another embodiment relates to a vehicle system. The vehicle system includes one or more processing circuits comprising one or more memory devices coupled to one or more processors. The one or more memory devices are configured to store instructions thereon that, when executed by the one or more processors, cause the one or more processors to (a) store a plurality of passenger profiles regarding passengers of a vehicle where each of the plurality of passenger profiles include pre-stored characteristics of a respective passenger associated therewith, (b) acquire passenger identifying data regarding a present passenger in the vehicle, (c) identify a respective passenger profile associated with the present passenger from the plurality of passenger profiles based on the passenger identifying data, and (d) control a speaker positioned within the vehicle based at least in part on the respective passenger profile to emit noise-canceling sound waves to generate a noise suppression zone to suppress sound waves perceived by the present passenger.

Another embodiment relates to a vehicle including a frame, a cabin, and a blast mat. The cabin is coupled to the frame and includes a seat and a series of walls. The blast mat has a bottom surface engaging at least one of the walls. The blast mat includes a first portion configured to support a first portion of an occupant seated in the seat and a second portion configured to support a second portion of the occupant. The first portion of the occupant and the second portion of the occupant have different resistances to blast energy. The second portion of the blast mat has a greater thickness than the first portion of the blast mat.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which:

FIG. 122 is a section view of the front cabin of FIG. 87 including the door of FIG. 120, according to an exemplary embodiment.

FIG. 123 is a side view of a lock assembly of the door of FIG. 120, according to an exemplary embodiment.

FIG. 124 is a side view of a lock assembly of the door of FIG. 120, according to an exemplary embodiment.

FIGS. 125A-125M are various views of a frame structure for a vehicle, according to an exemplary embodiment.

FIGS. 126A-126C are various views of a frame structure for a vehicle, according to various exemplary embodiments.

FIGS. 127A-127E are various views of a frame structure for a vehicle, according to various exemplary embodiments.

FIGS. 128A and 128B are various views of a frame structure for a vehicle, according to various exemplary embodiments.

FIGS. 129A-129C are various views of a frame structure for a vehicle, according to various exemplary embodiments.

FIGS. 130A-130C are various views of a frame structure for a vehicle, according to various exemplary embodiments.

FIG. 131A is a view of a frame structure for a vehicle, according to various exemplary embodiments.

FIGS. 132A and 132B are various views of the frame structure of FIG. 131A for a vehicle, according to various exemplary embodiments.

FIGS. 133A and 133B are various views of a frame structure for a vehicle, according to various exemplary embodiments.

FIGS. 134A-134E are various views of a frame structure for a vehicle, according to various exemplary embodiments.

Figure 135A:
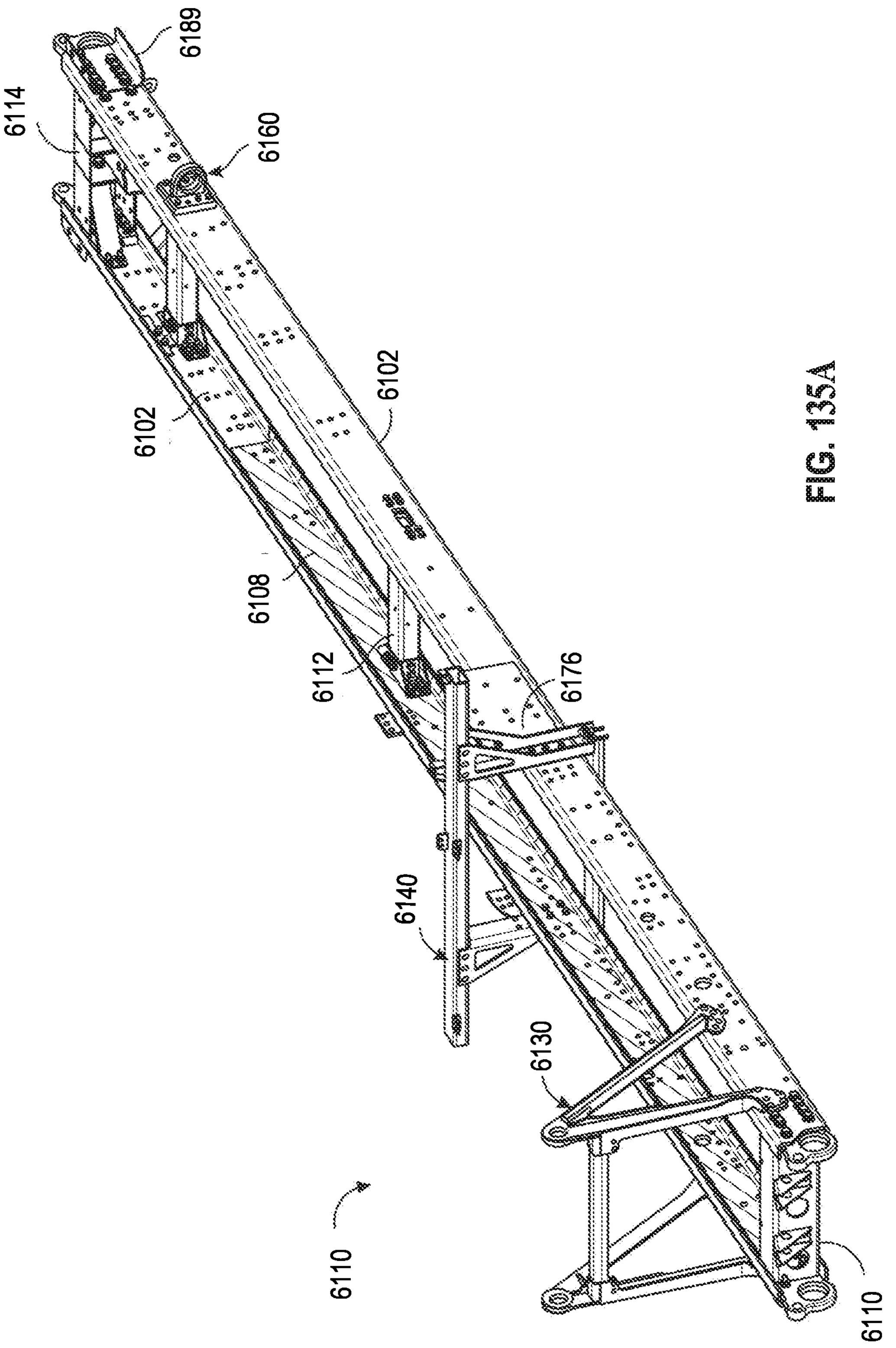
Figure 135B:
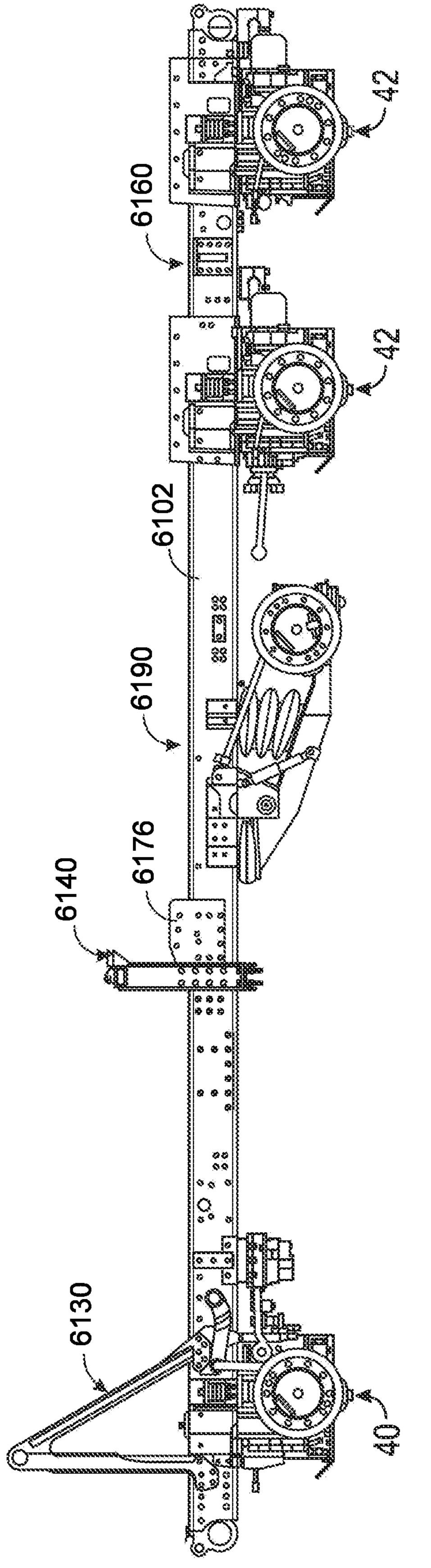
Figure 135C:
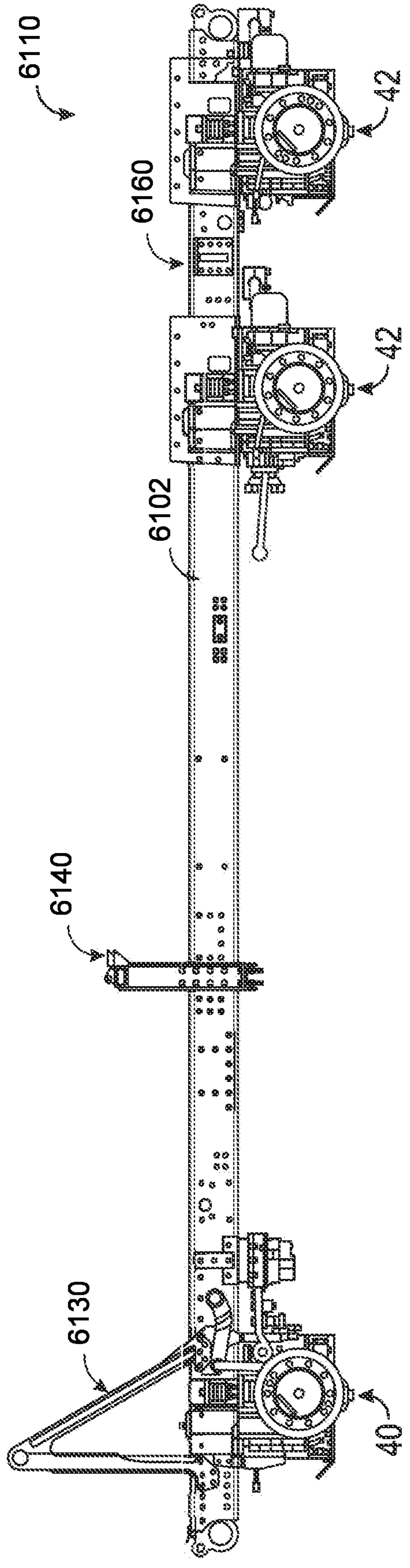

FIGS. 135A-135C are various views of a frame structure for a vehicle, according to various exemplary embodiments.

FIGS. 136A-136F are various views of a frame reinforcement system, according to various exemplary embodiments.

FIGS. 137A-137G are various views of a frame reinforcement system, according to various exemplary embodiments.

FIGS. 138A-138F are various views of a frame reinforcement system, according to various exemplary embodiments.

Figure 1:
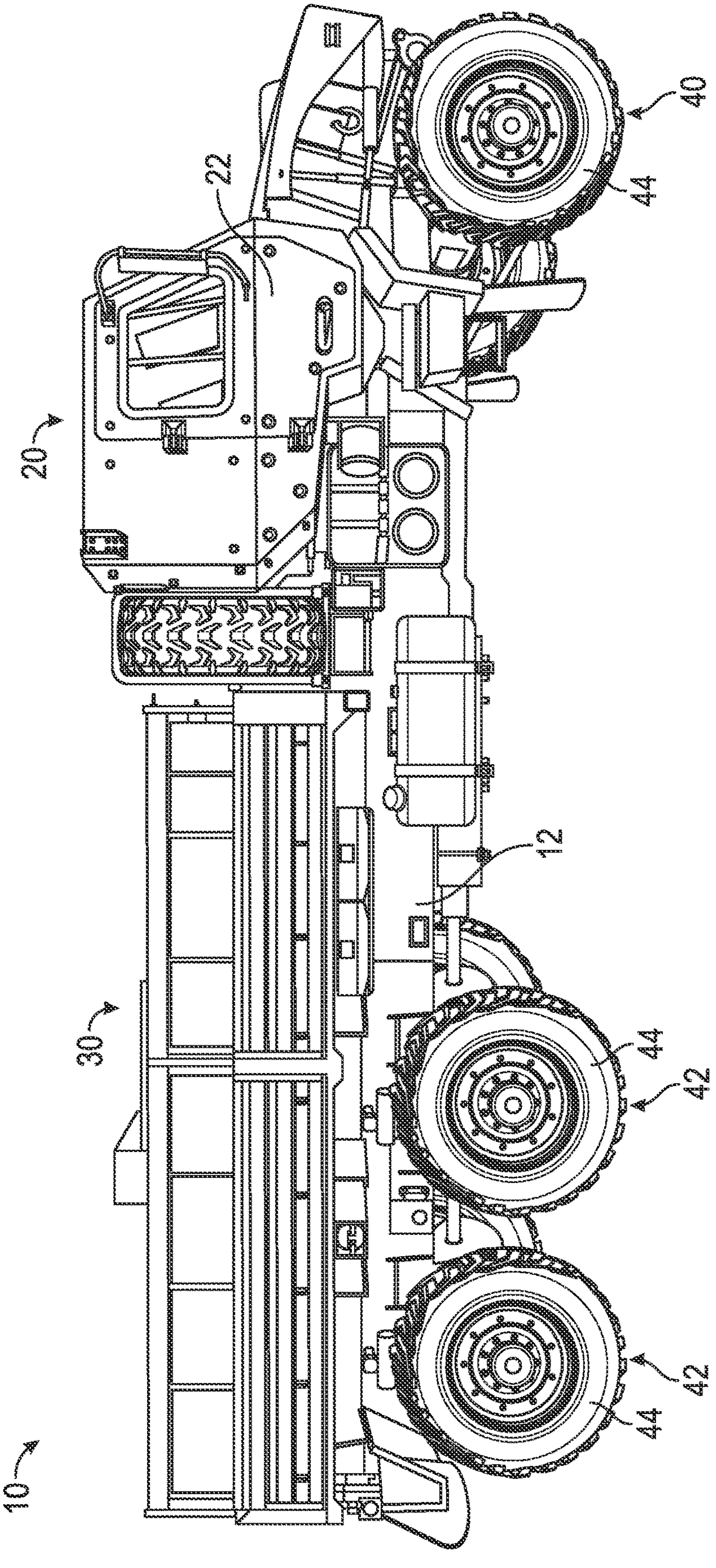
FIG. 1 is a side view of a vehicle, according to an exemplary embodiment.
Figure 139:
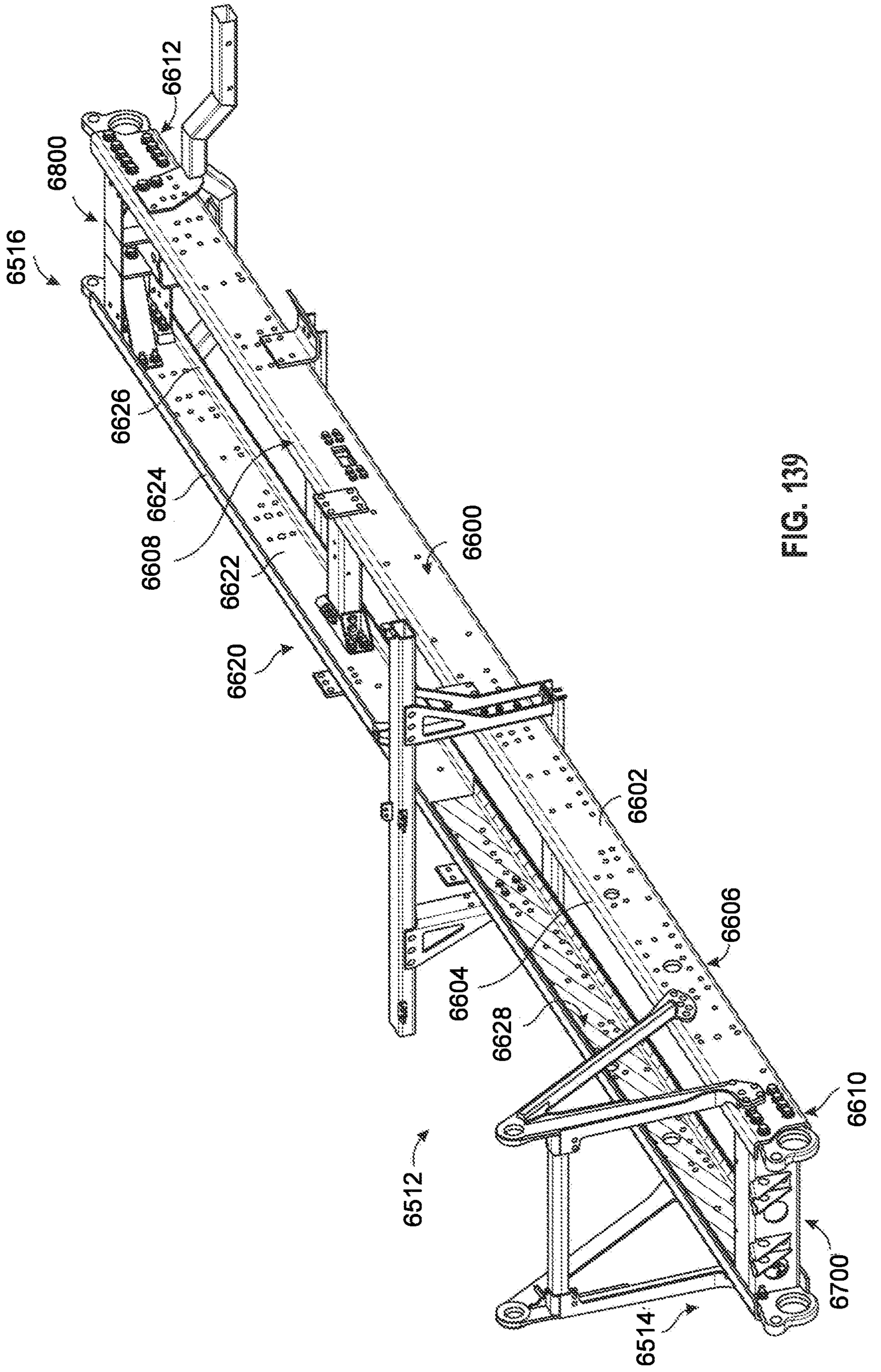

FIG. 139 is a perspective view of a frame assembly of the vehicle of FIG. 1, according to an exemplary embodiment.

Figure 140:
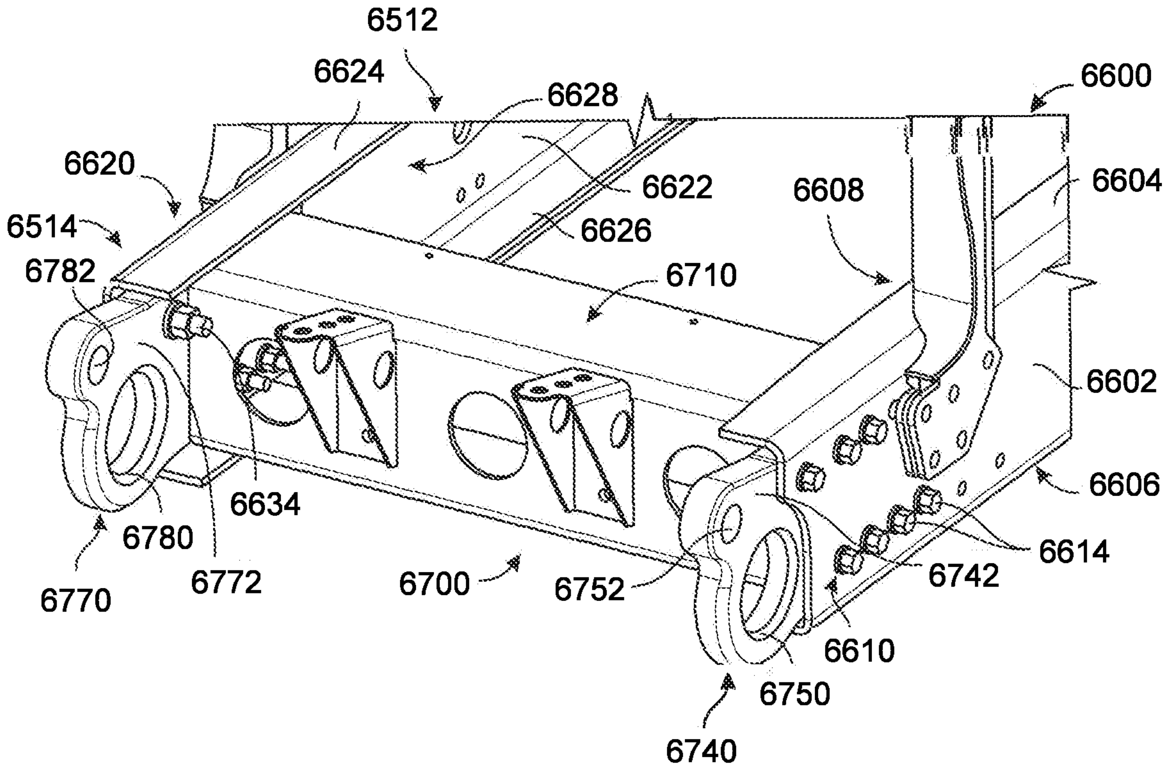

FIG. 140 is a detailed perspective view of a front cross member assembly coupled to the frame assembly of FIG. 139, according to an exemplary embodiment.

Figure 141:
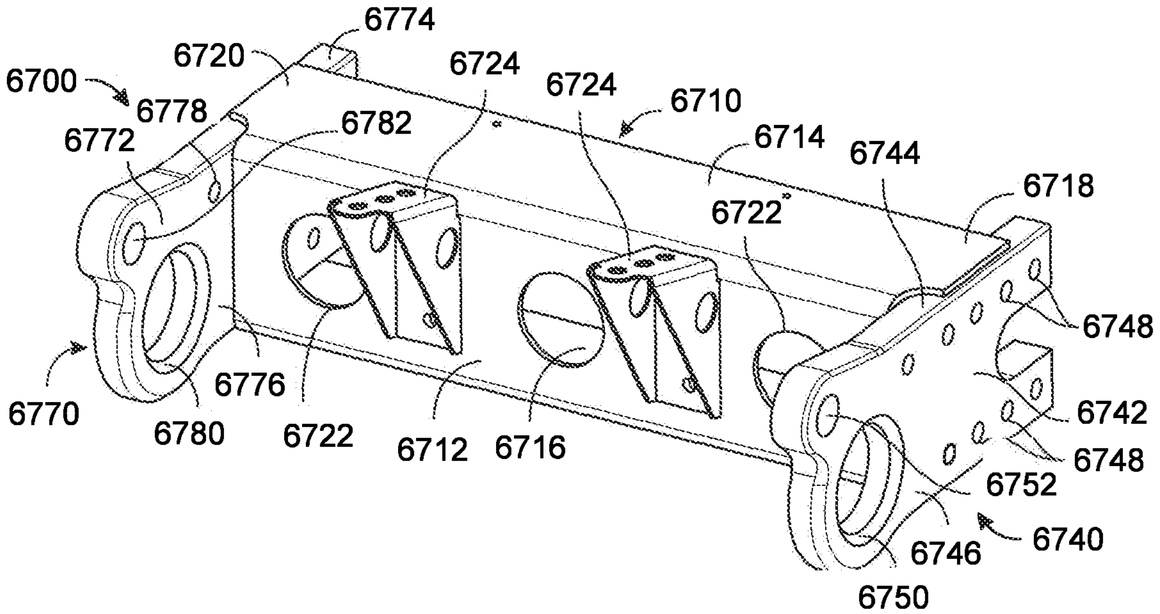

FIG. 141 is a front perspective view of the front cross member assembly of FIG. 140, according to an exemplary embodiment.

Figure 142:
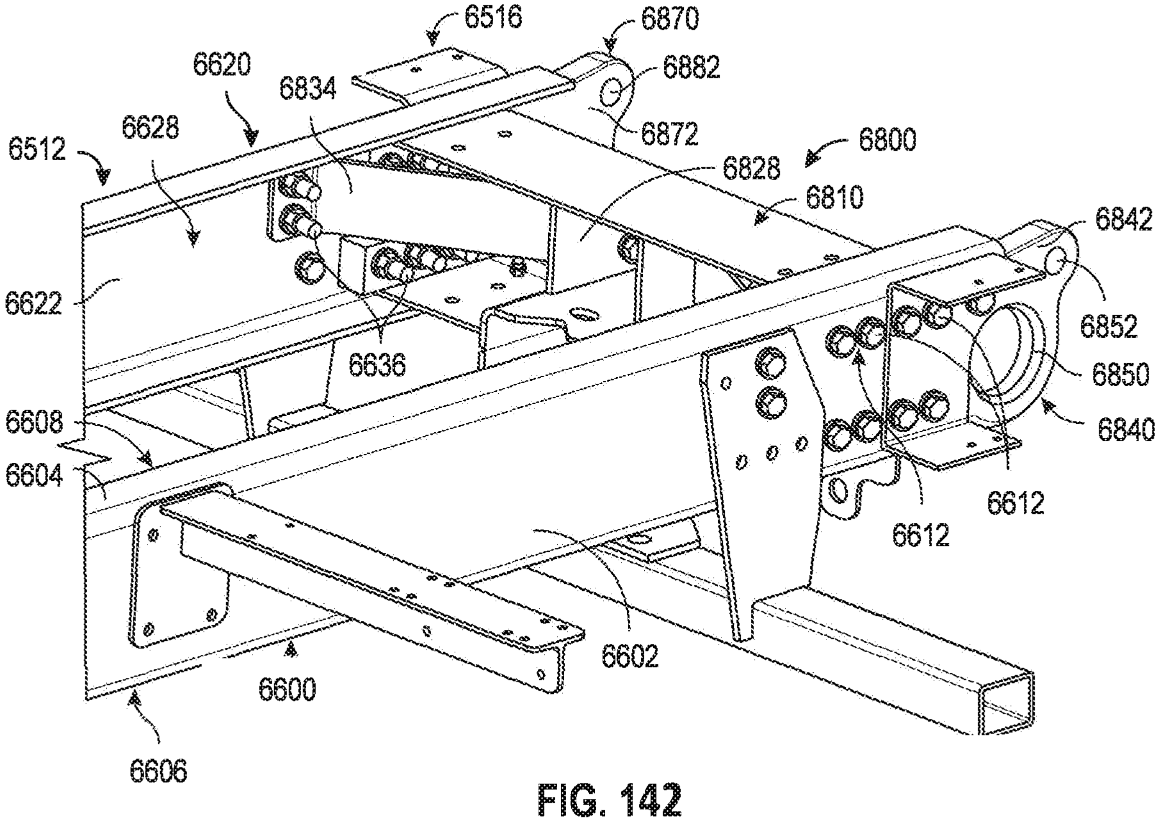

FIG. 142 is a detailed perspective view of a rear cross member assembly coupled to the frame assembly of FIG. 139, according to an exemplary embodiment.

Figure 143:
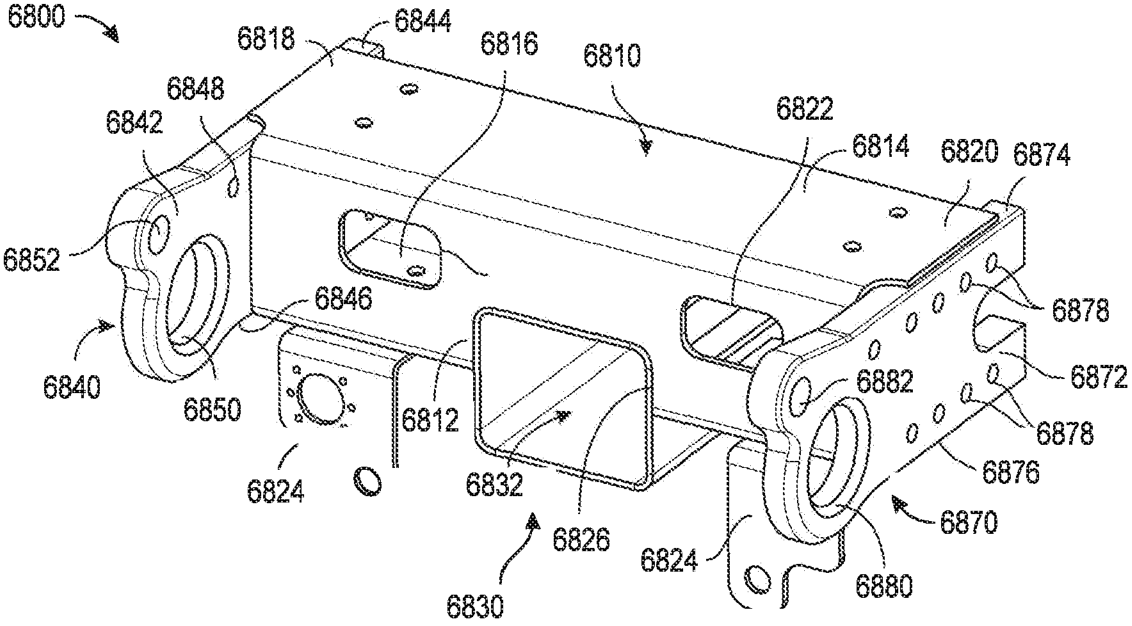

FIG. 143 is a front perspective view of the rear cross member assembly of FIG. 142, according to an exemplary embodiment.

Figure 144:
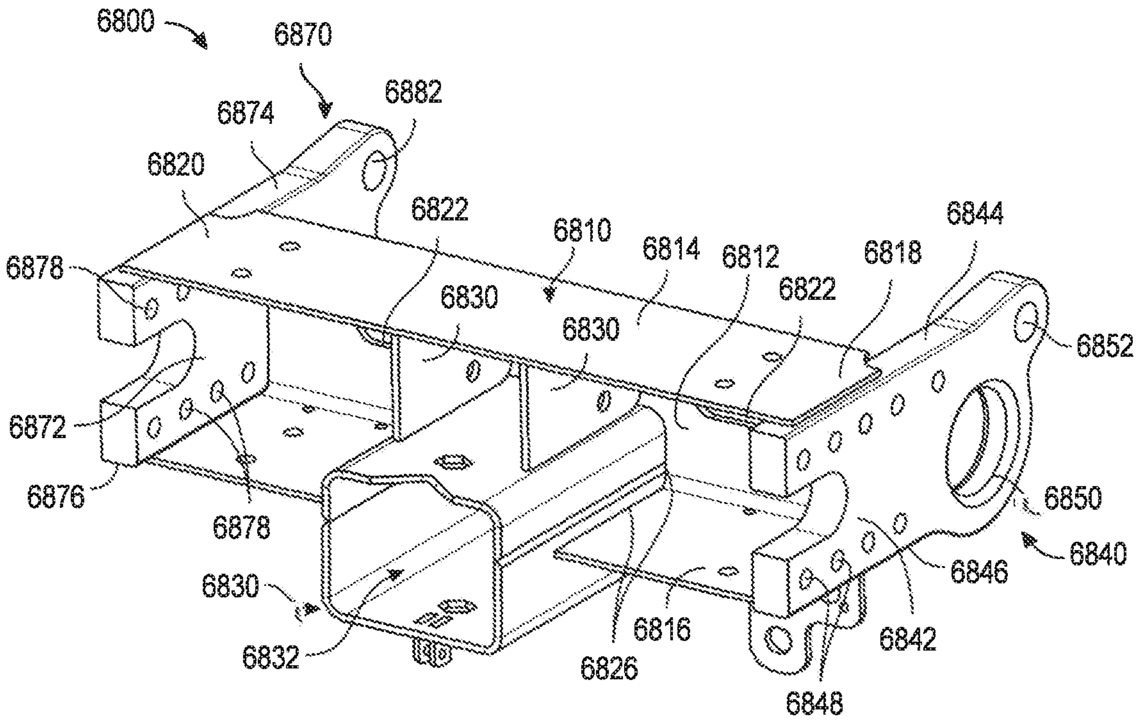

FIG. 144 is a rear perspective view of the rear cross member assembly of FIG. 142, according to an exemplary embodiment.

Figure 145:
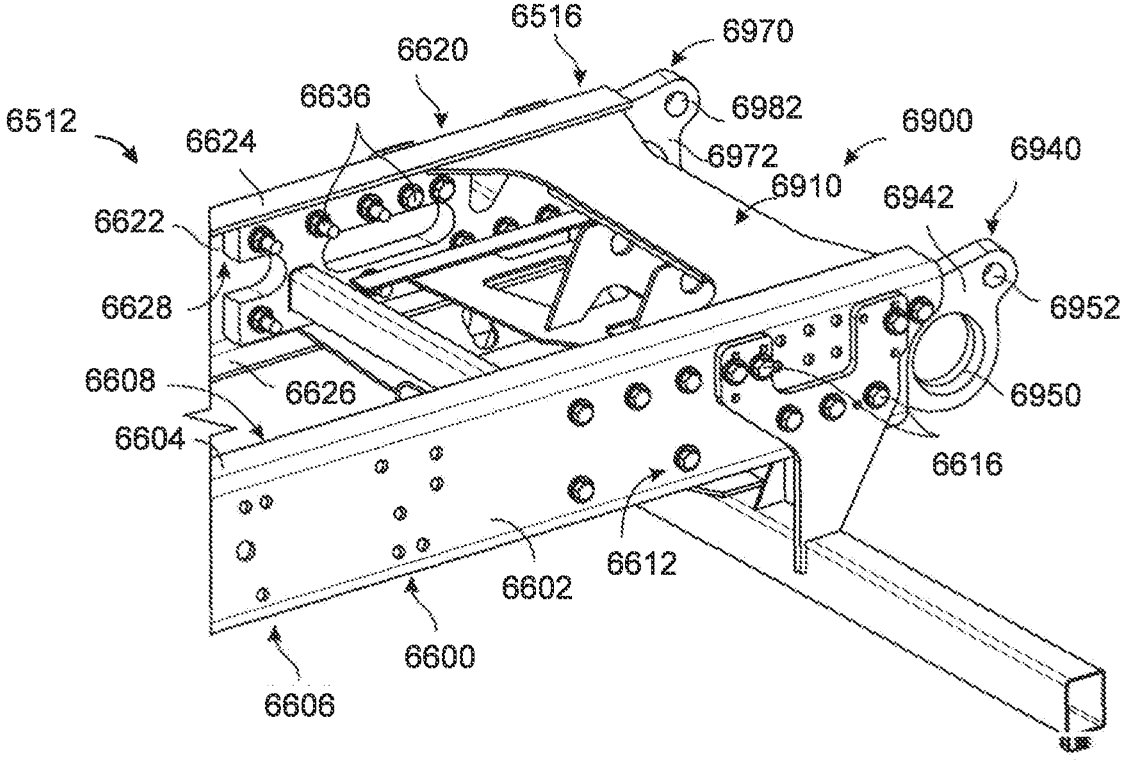

FIG. 145 is a detailed perspective view of a rear cross member assembly coupled to the frame assembly of FIG. 139, according to another exemplary embodiment.

Figure 146:
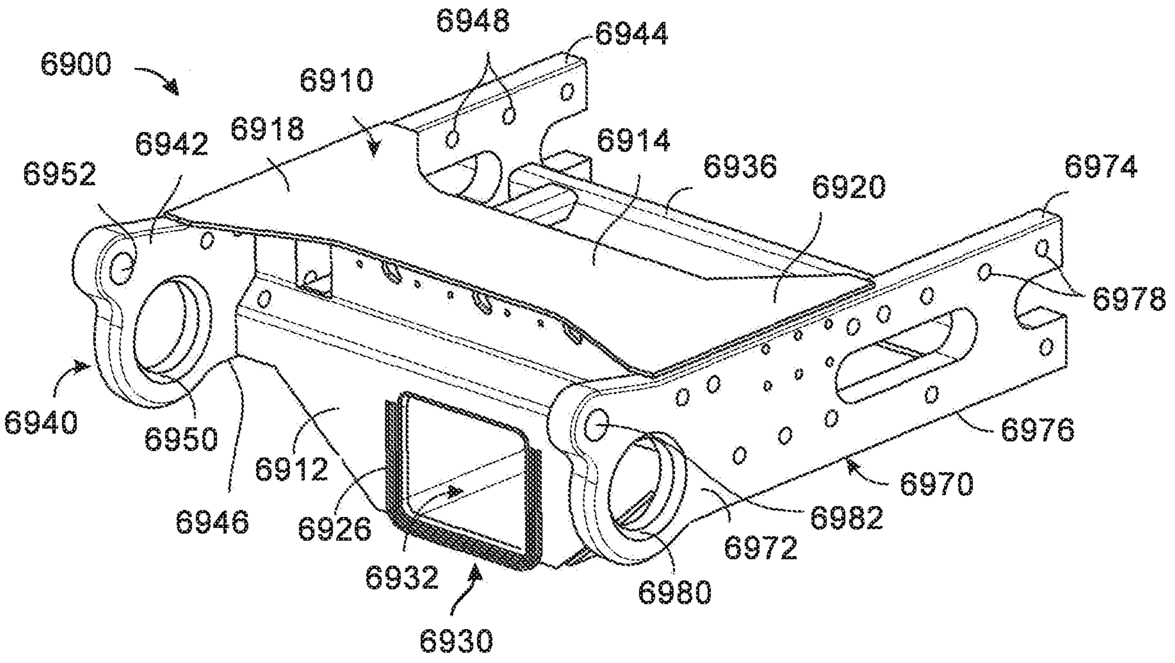

FIG. 146 is a front perspective view of the rear cross member assembly of FIG. 145, according to an exemplary embodiment.

Figure 147:
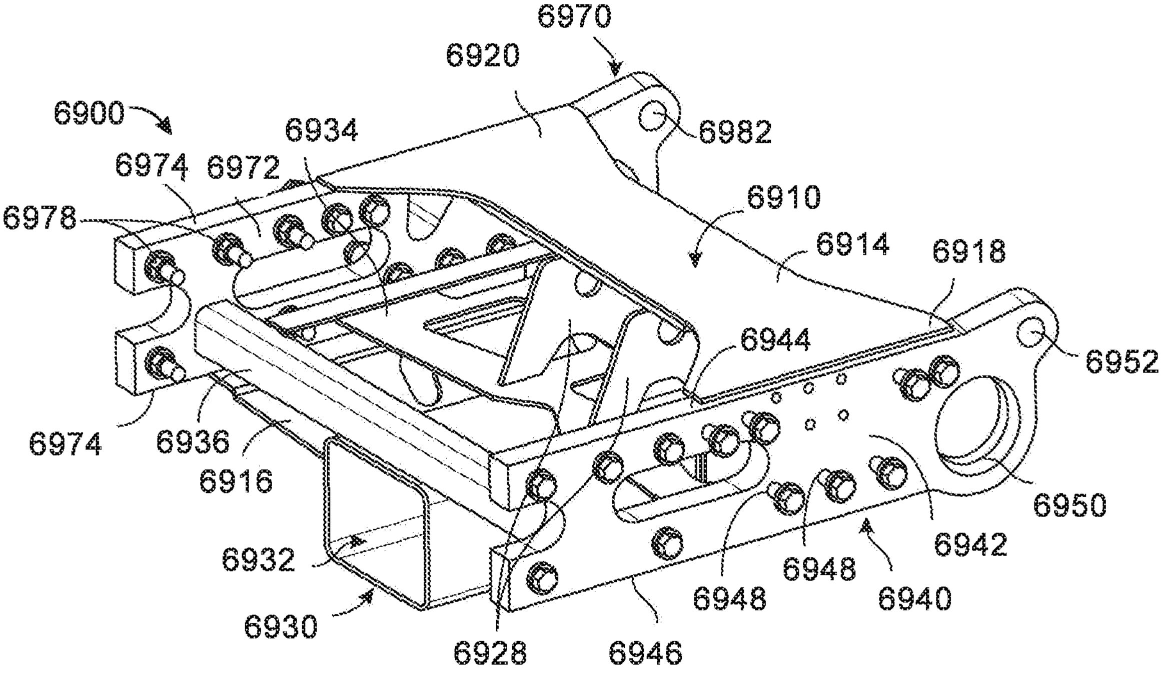

FIG. 147 is a rear perspective view of the rear cross member assembly of FIG. 145, according to an exemplary embodiment.

Figure 148:
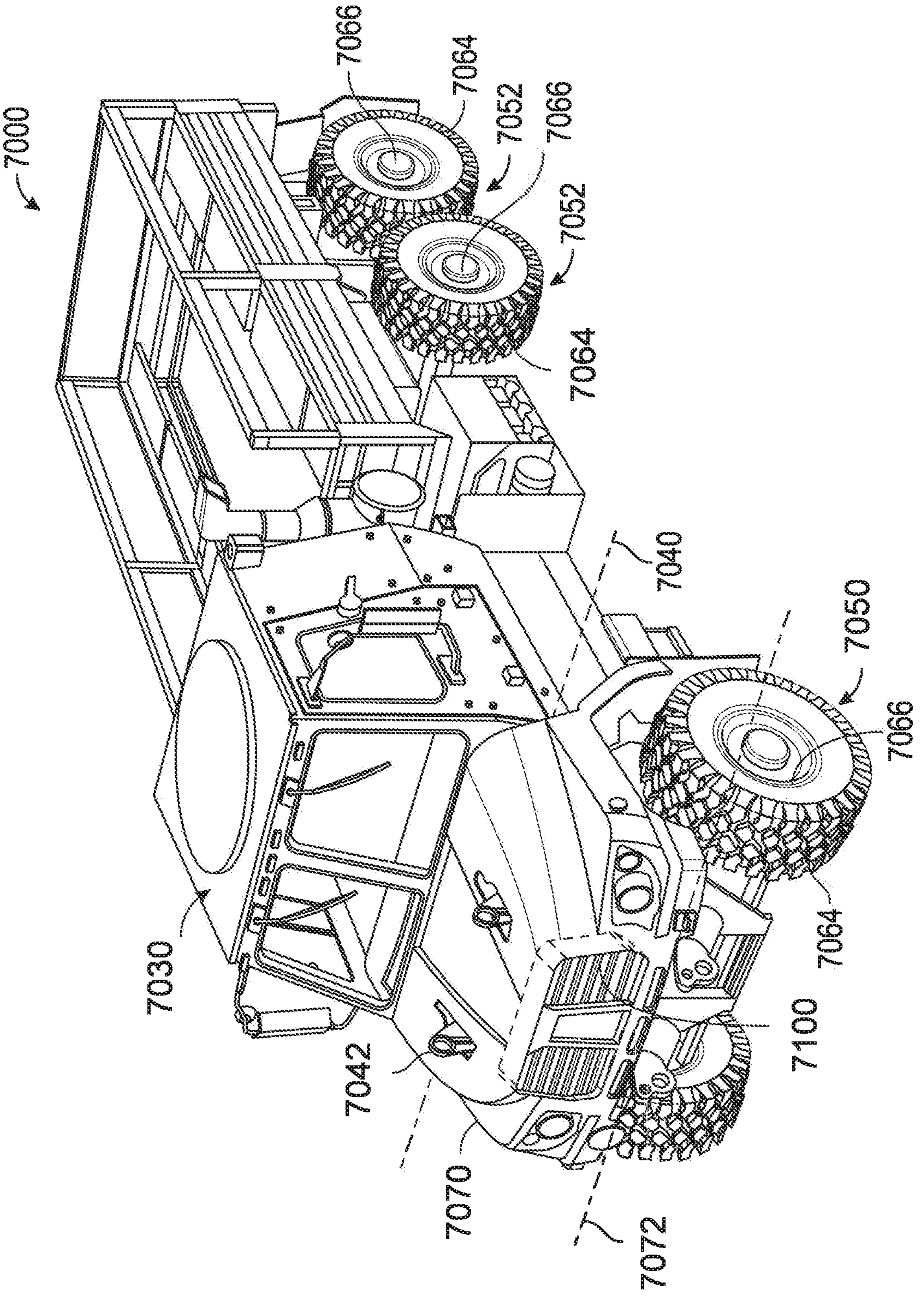

FIG. 148 is a perspective view of a vehicle, according to an exemplary embodiment.

Figure 149:
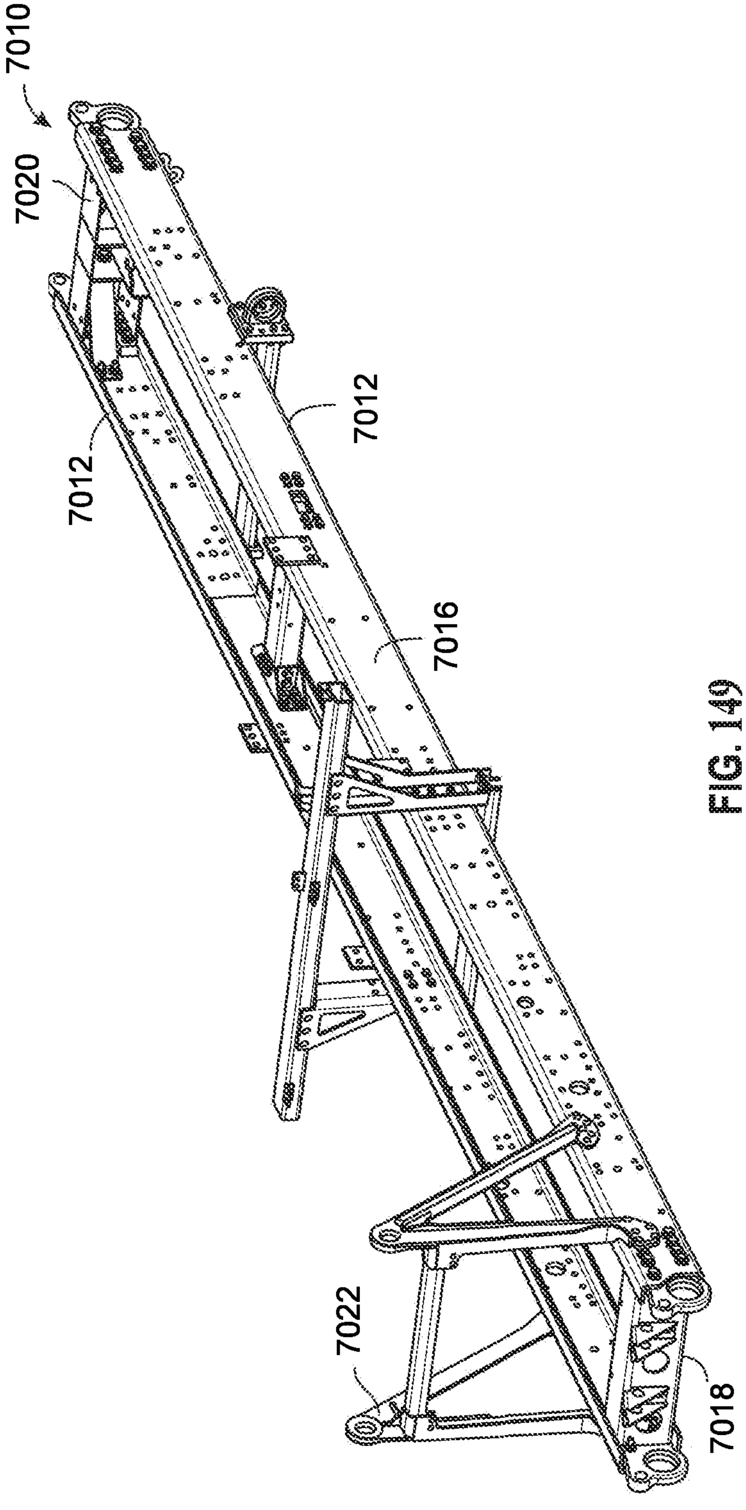

FIG. 149 is a perspective view of a frame of the vehicle of FIG. 148, according to an exemplary embodiment.

Figure 150:
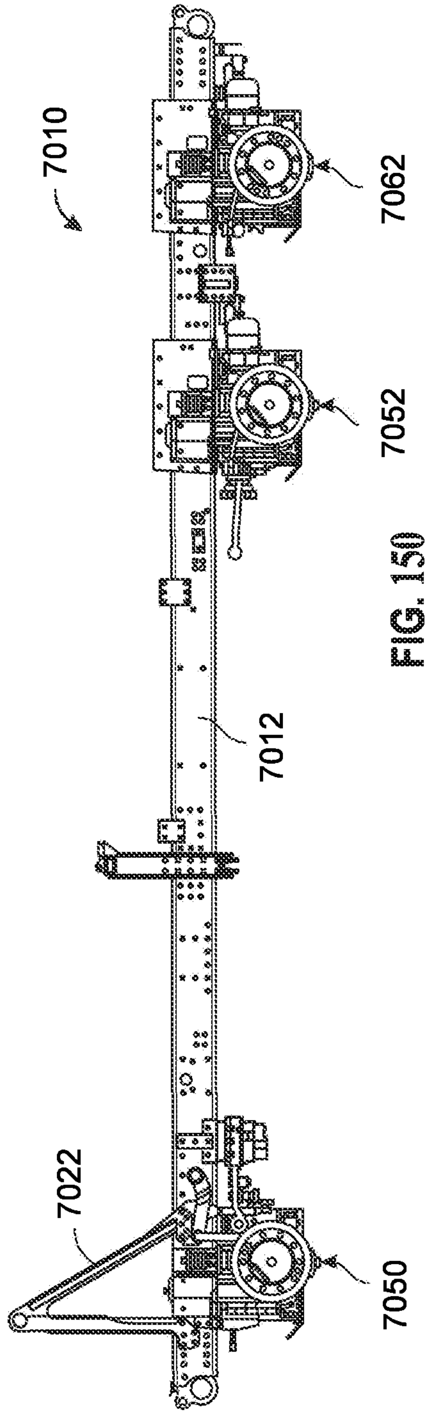

FIG. 150 is a side view of the frame of FIG. 149, according to an exemplary embodiment.

Figure 151:
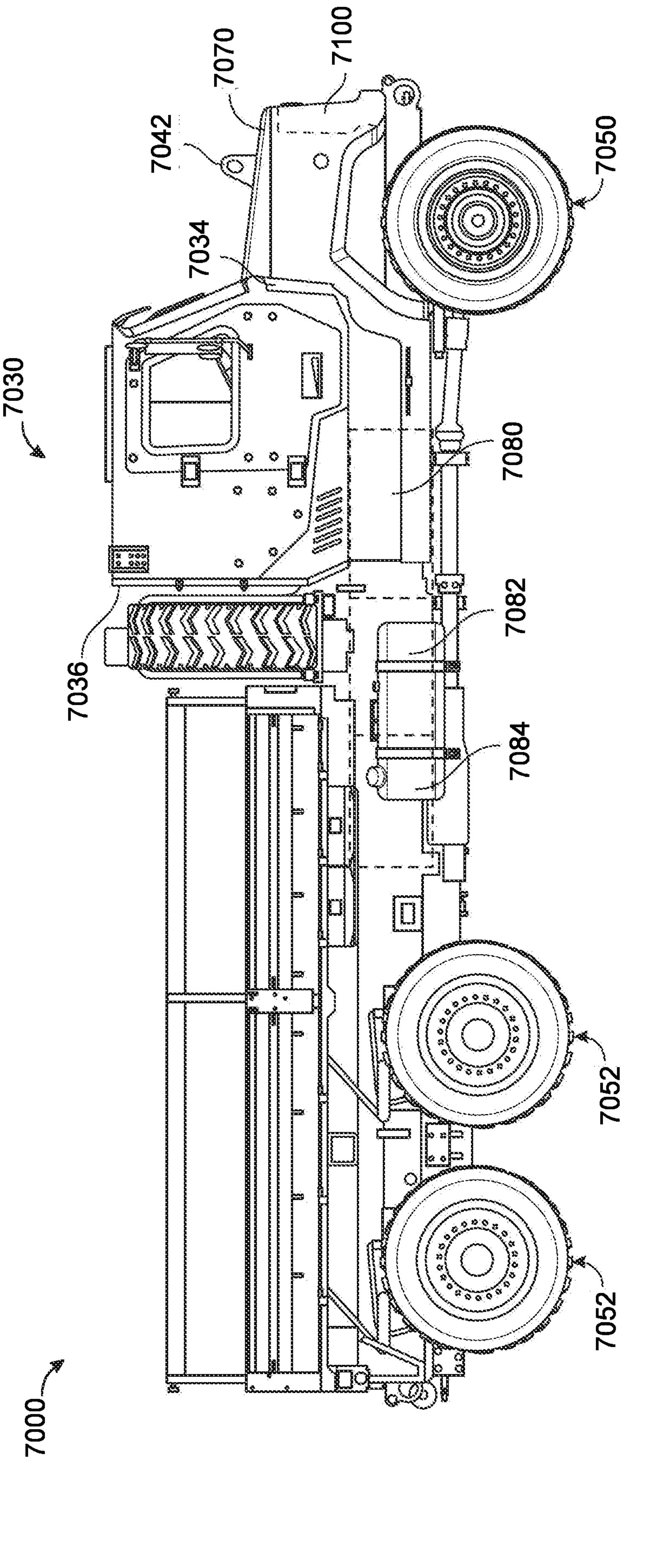

FIG. 151 is a side view of the vehicle of FIG. 148, according to an exemplary embodiment.

Figure 152:
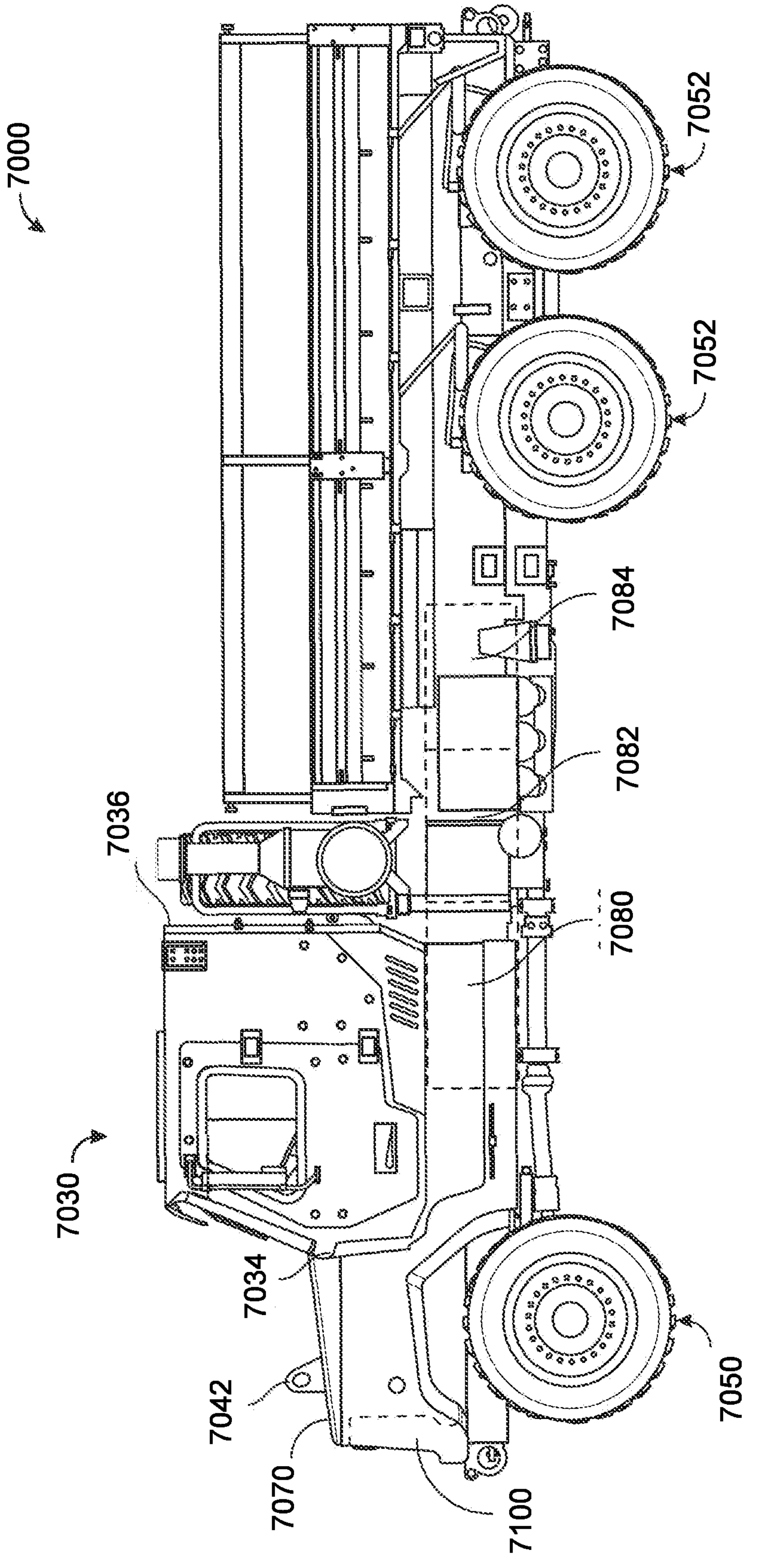

FIG. 152 is a side view of the vehicle of FIG. 148, according to an exemplary embodiment.

Figure 153:
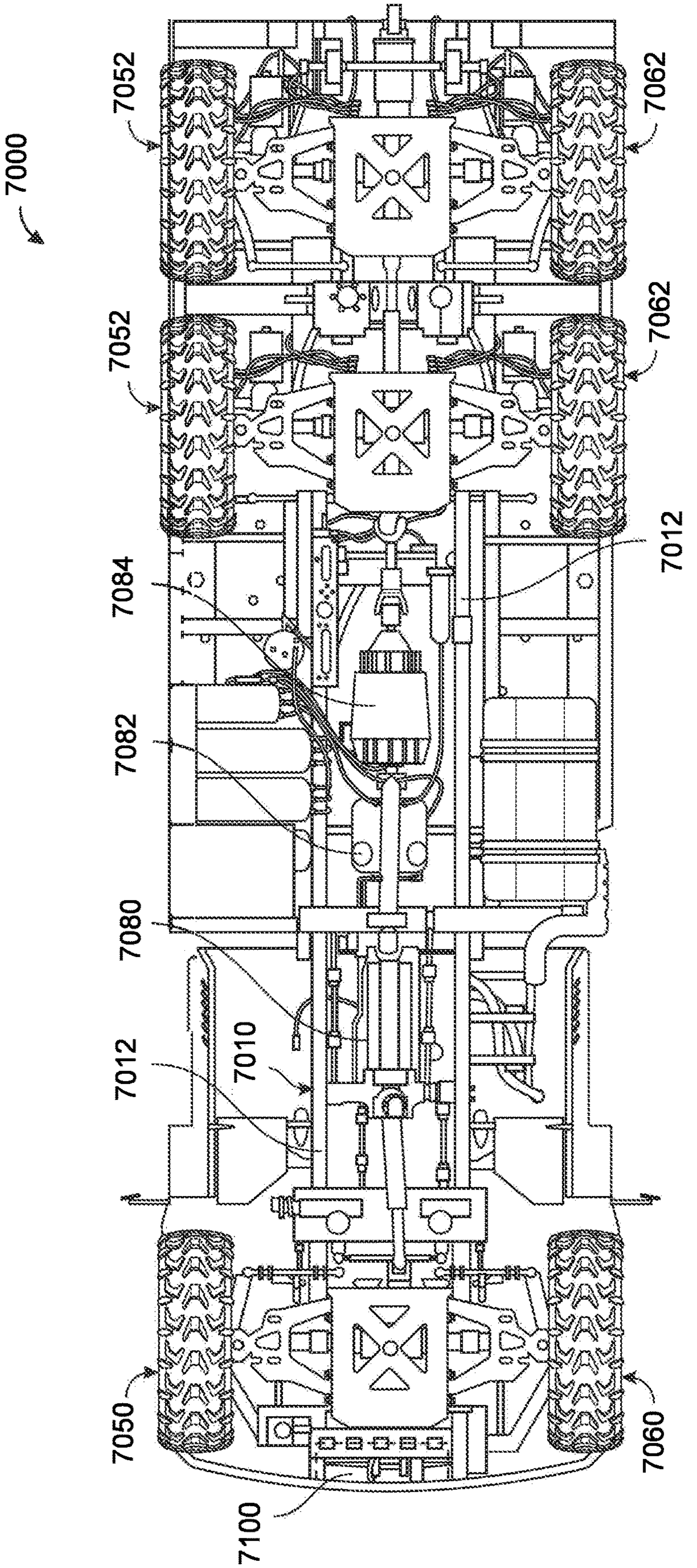

FIG. 153 is a bottom view of the vehicle of FIG. 148, according to an exemplary embodiment.

Figure 154:
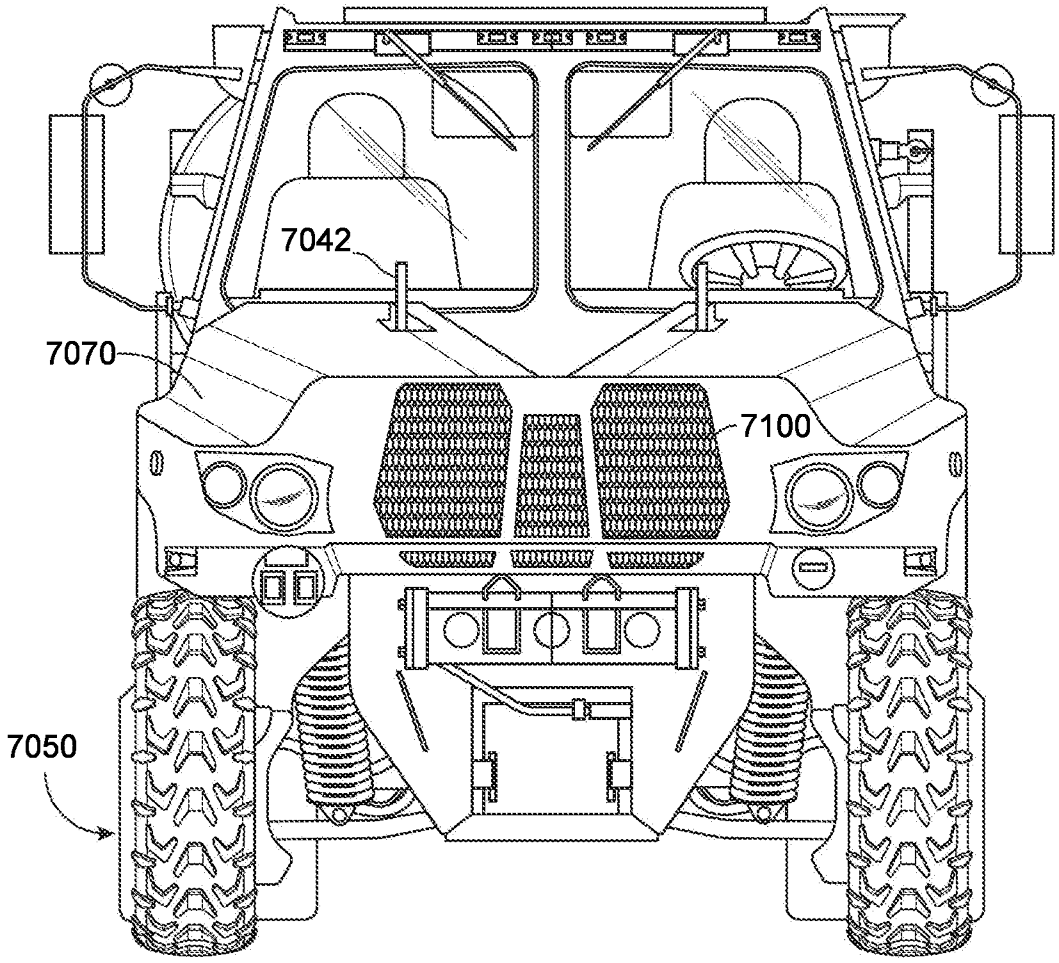

FIG. 154 is a front view of the vehicle of FIG. 148, according to an exemplary embodiment.

Figure 155:
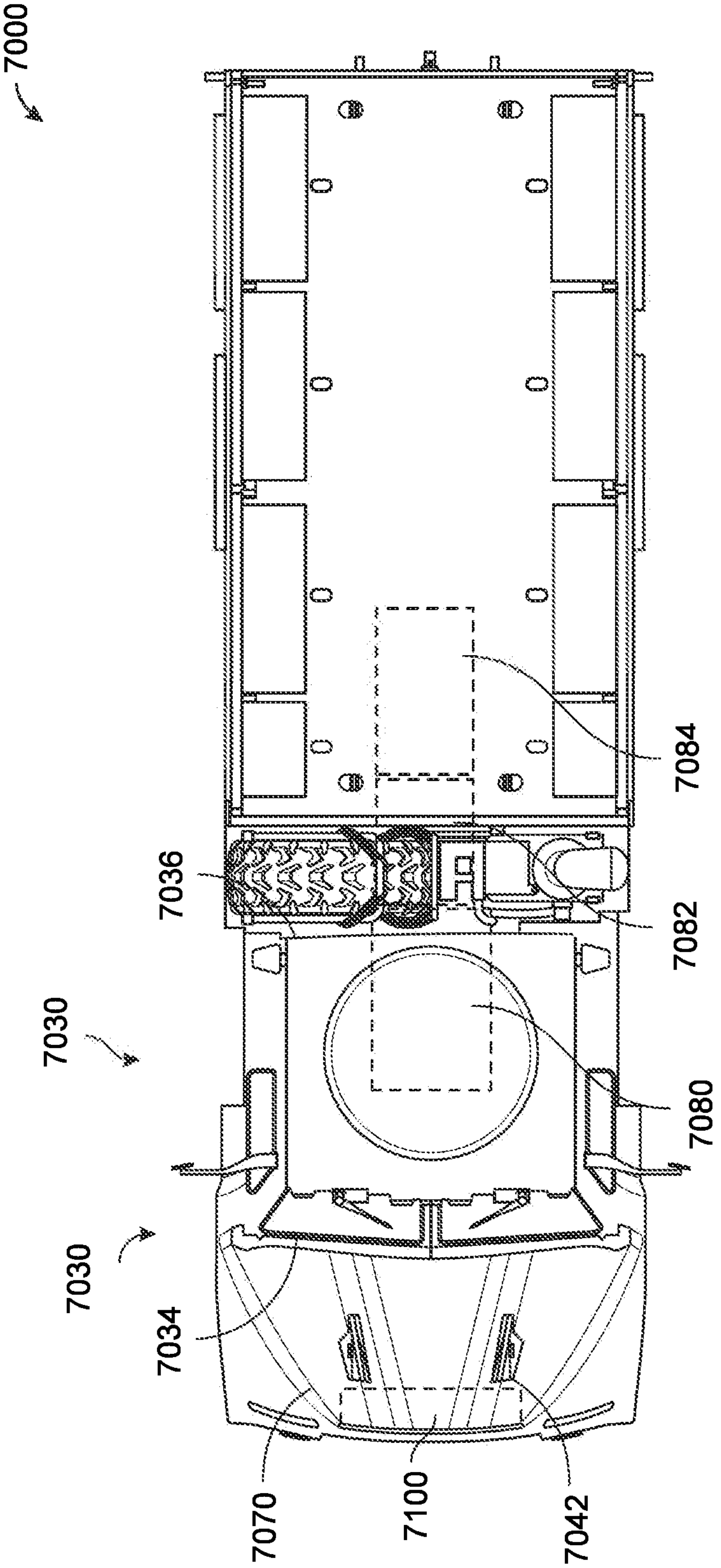

FIG. 155 is a top view of the vehicle of FIG. 148, according to an exemplary embodiment.

Figure 156:
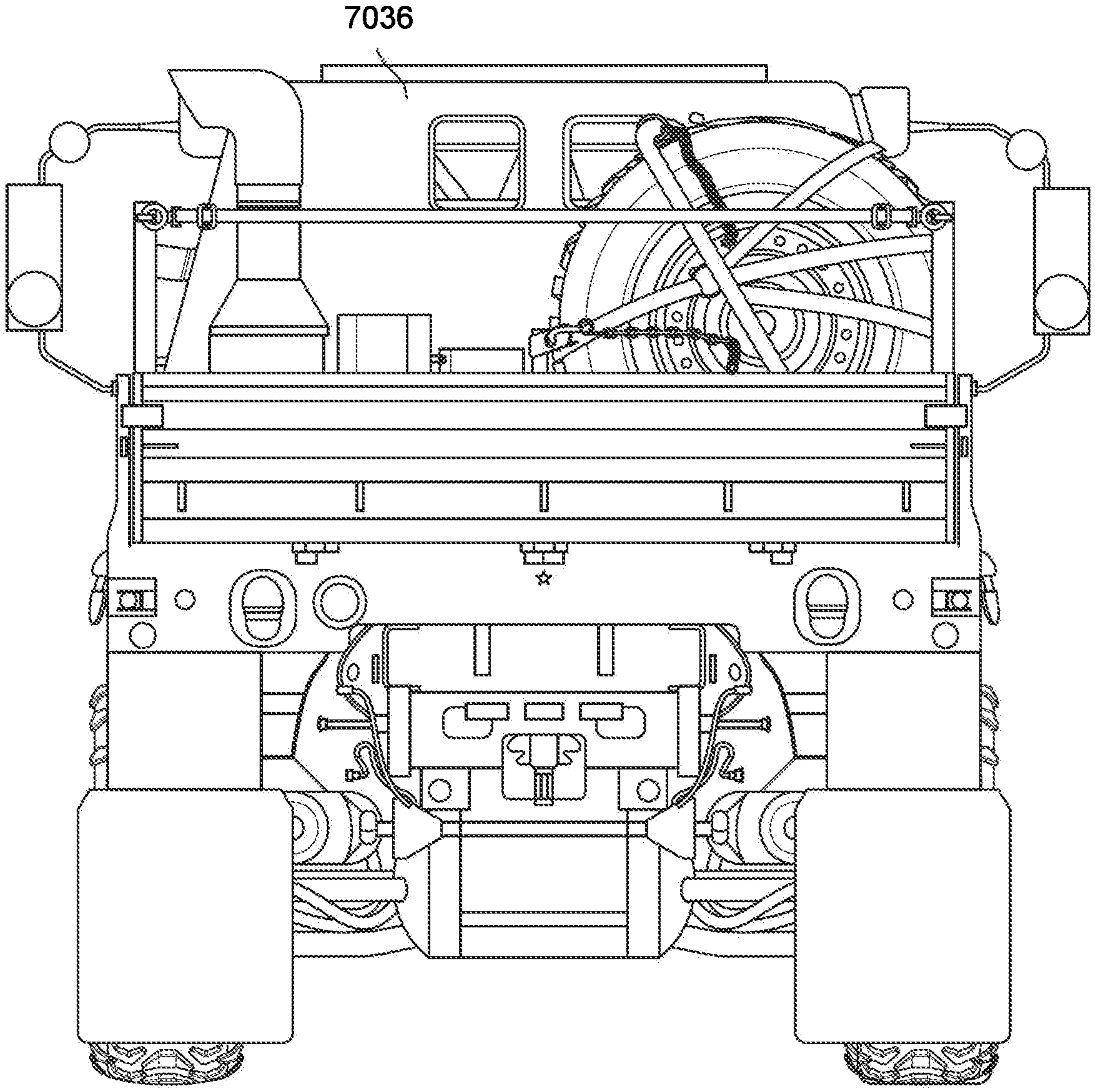

FIG. 156 is a rear view of the vehicle of FIG. 148, according to an exemplary embodiment.

Figure 157:
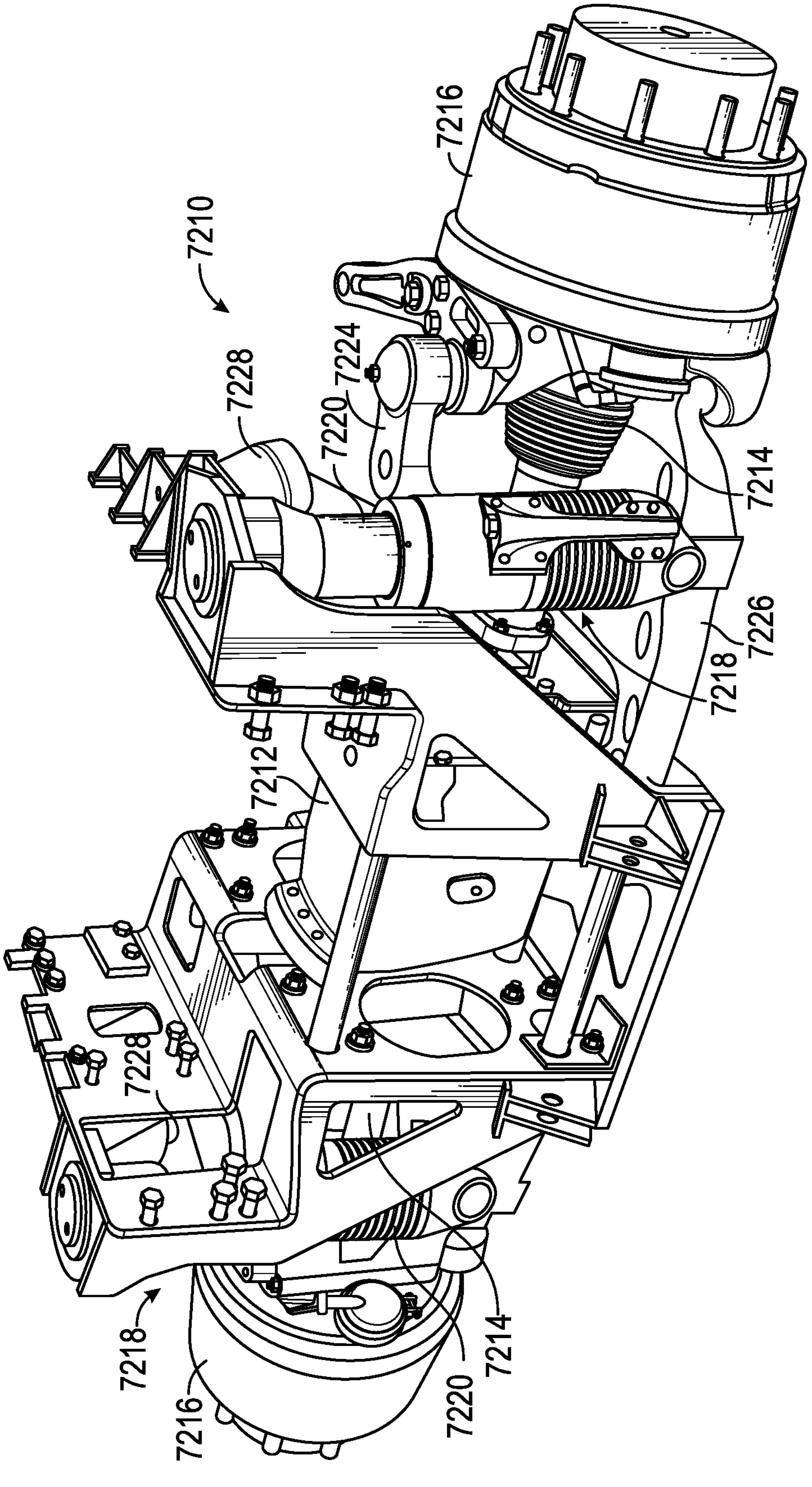
Figure 158:
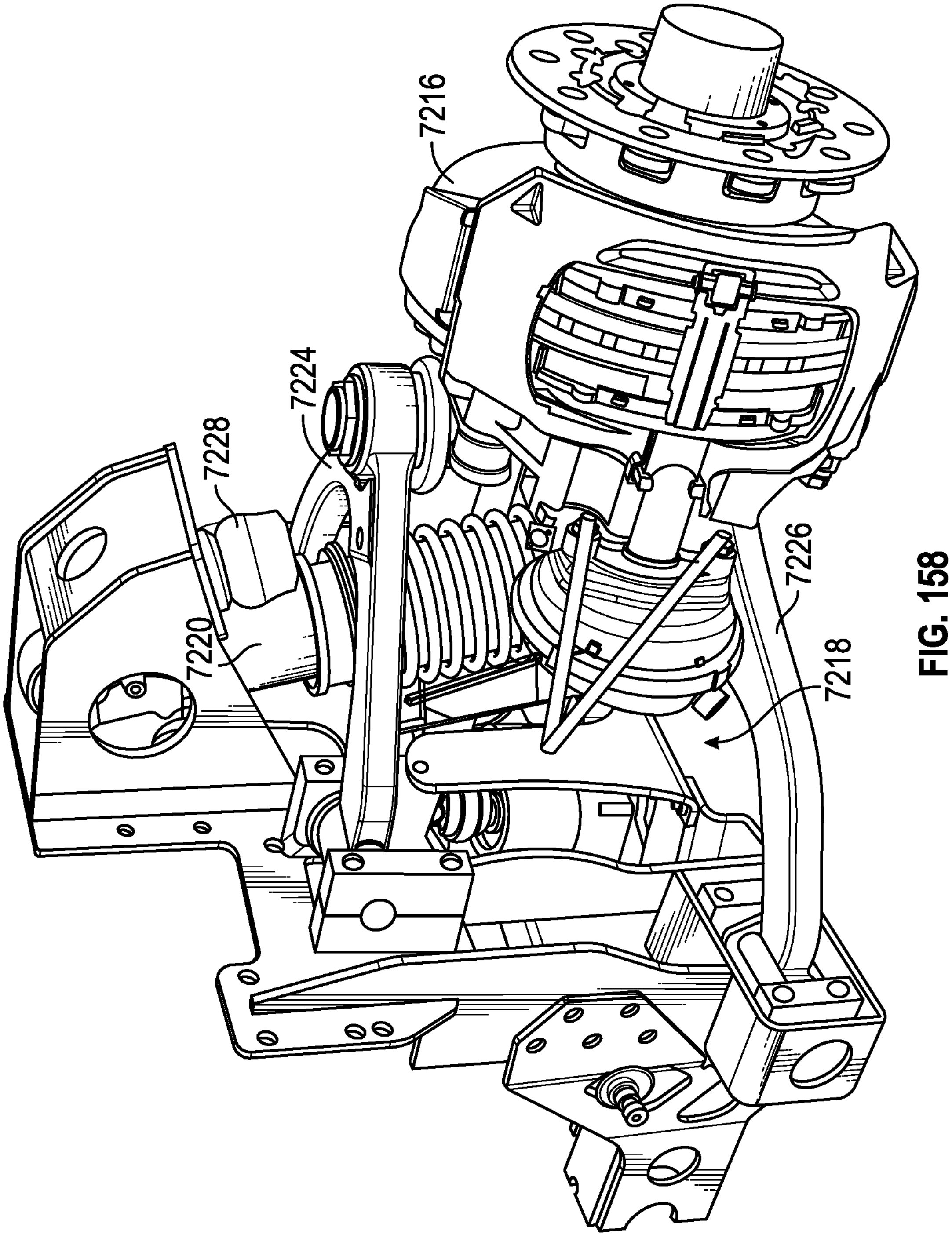

FIGS. 157-158 are perspective views of axle assemblies, according to various exemplary embodiments.

Figure 159A:
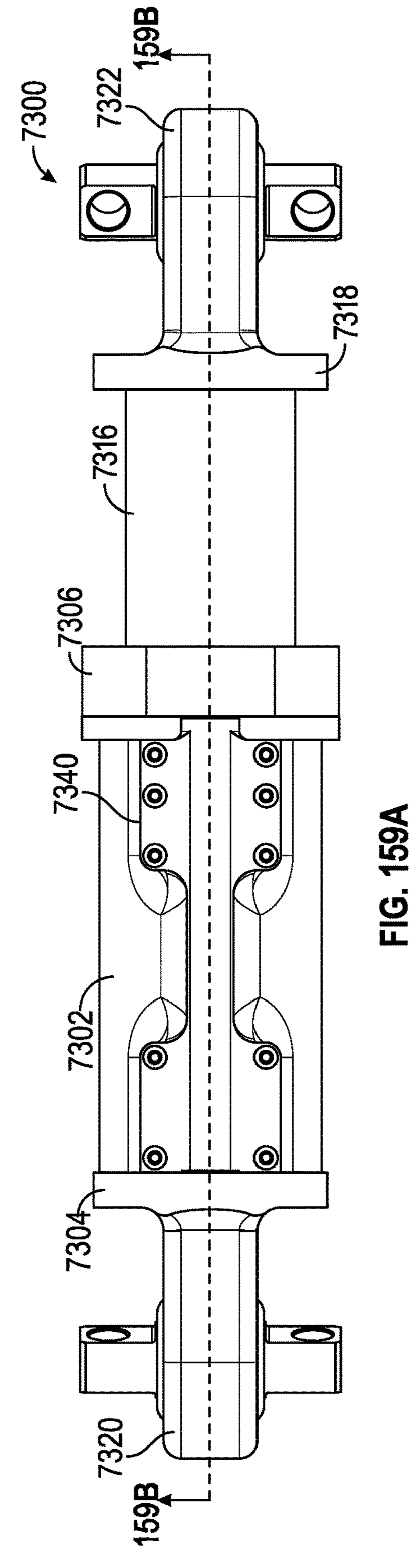

FIG. 159A is a side view of a suspension element, according to an exemplary embodiment.

Figure 159B:
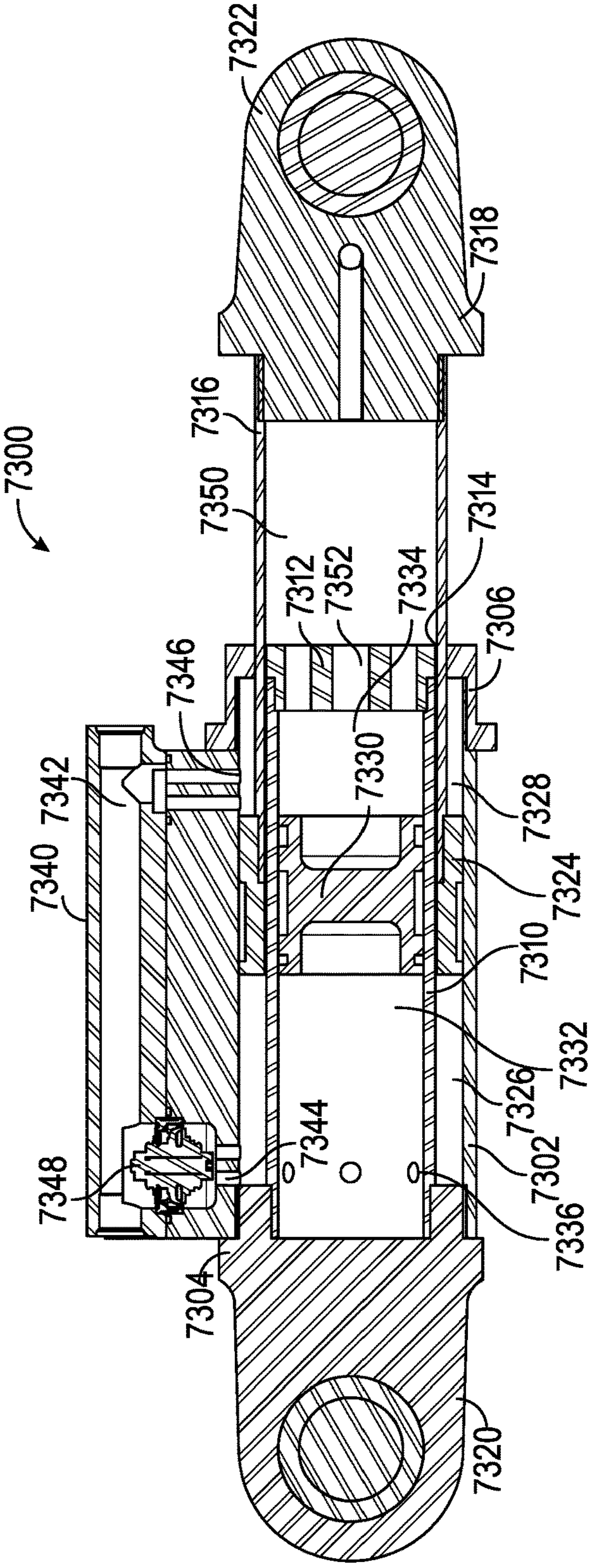

FIG. 159B is a sectional view of the suspension element of FIG. 159A, according to an exemplary embodiment.

Figure 160:
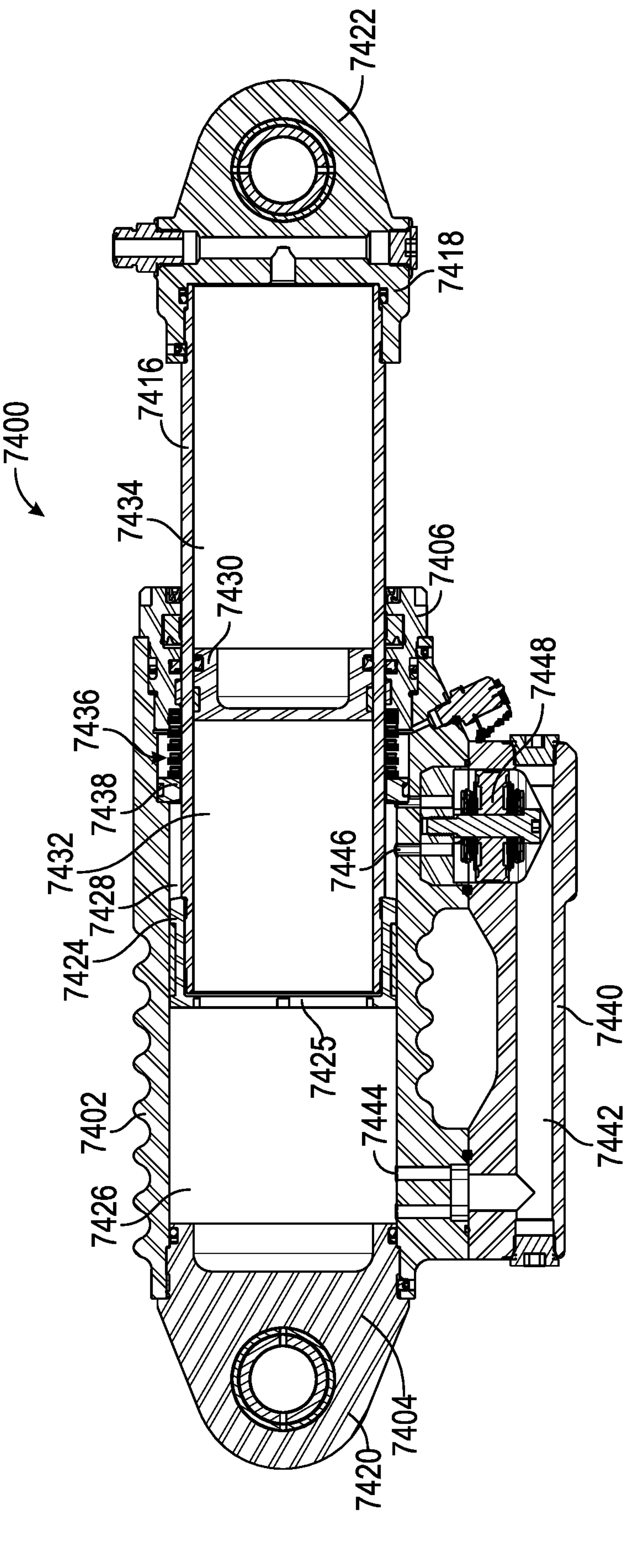

FIG. 160 is a sectional view of a suspension element, according to an exemplary embodiment.

Figure 161:
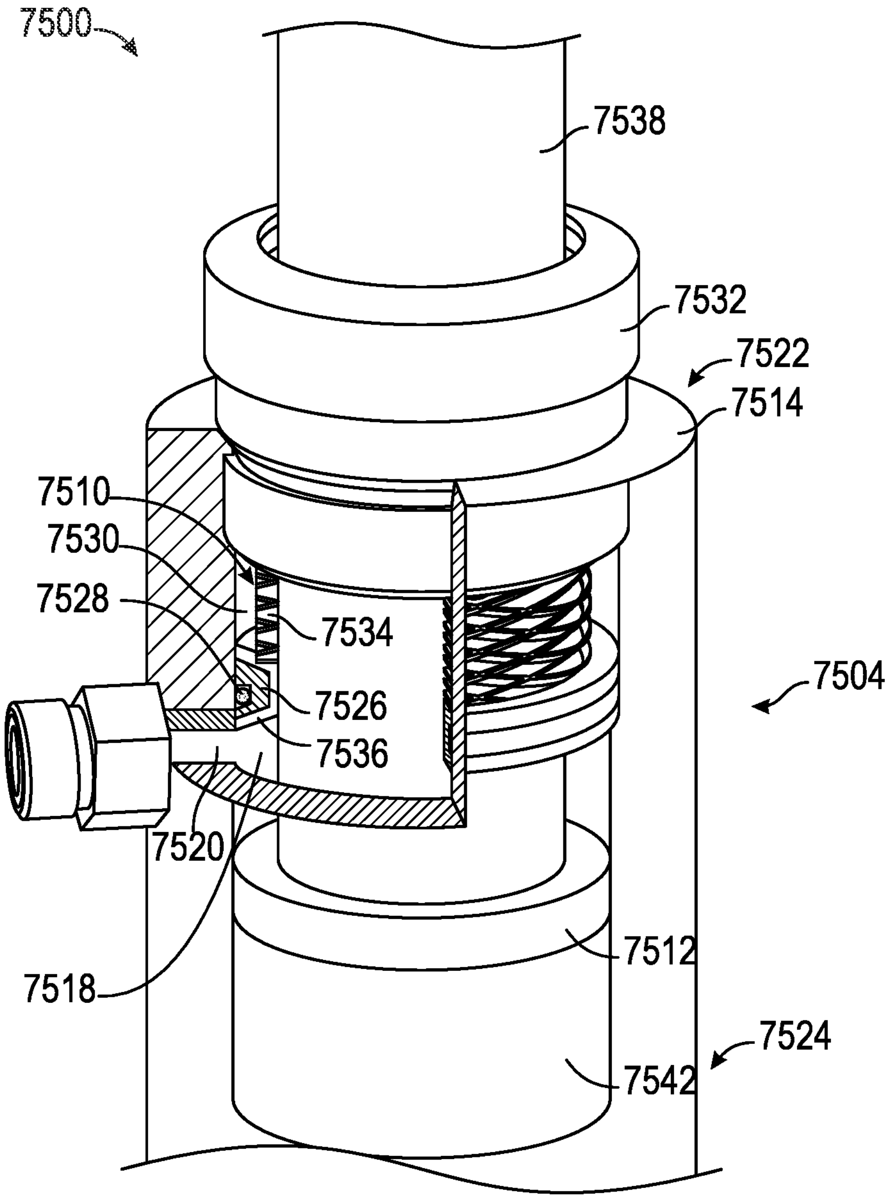

FIG. 161 is an elevation view of a damper assembly having a limiter that dissipates energy, according to an exemplary embodiment.

FIGS. 162A-162D are elevation views of the damper assembly of FIG. 161 in various stages of compression, according to various exemplary embodiments.

Figure 163A:
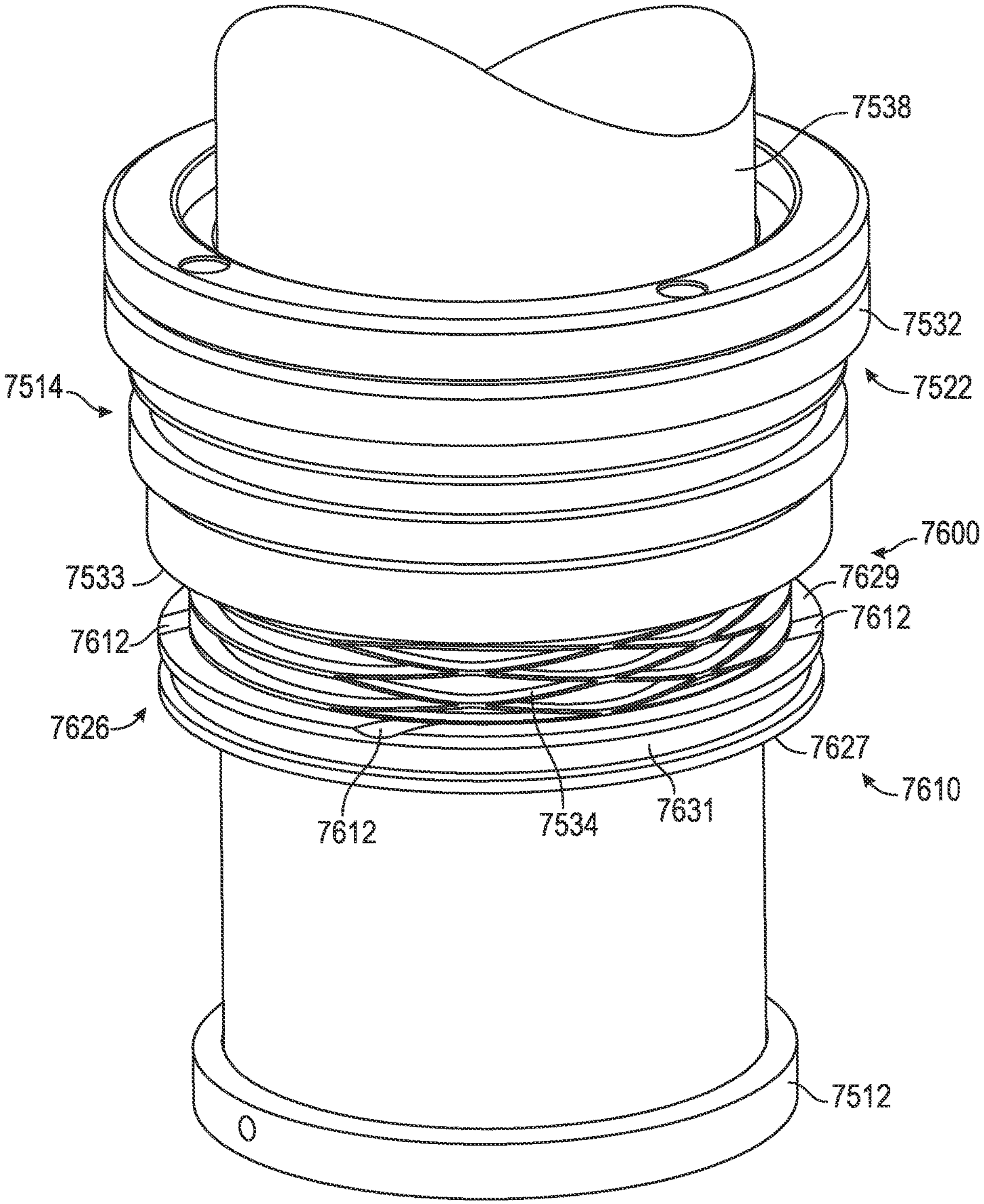

FIG. 163A is an elevation view of a damper assembly, according to an exemplary embodiment.

Figure 163B:
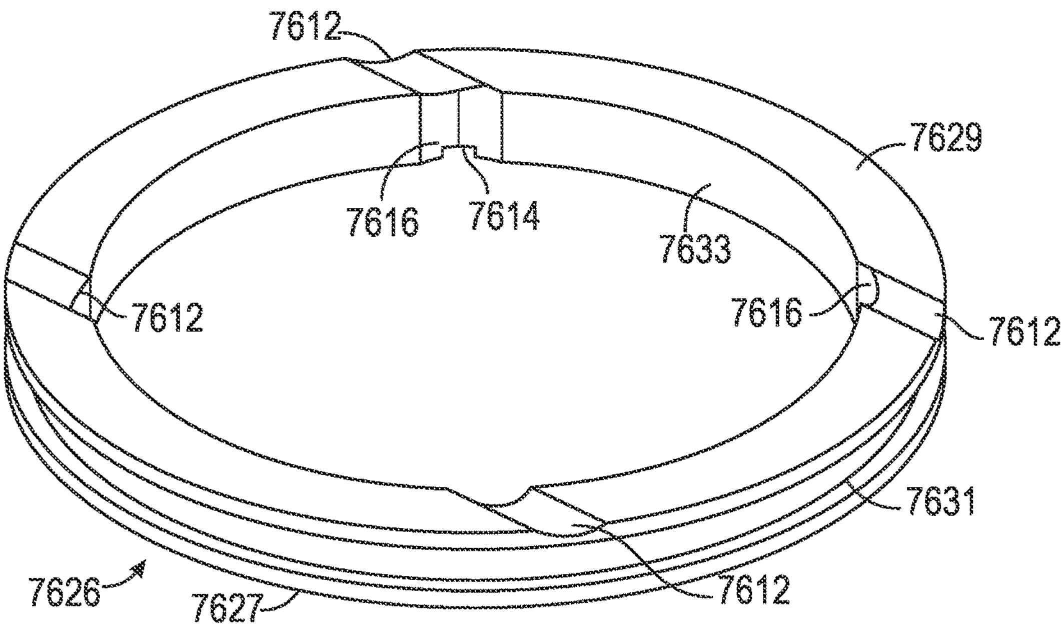

FIG. 163B is an elevation view of a secondary piston of a damper, according to an exemplary embodiment.

Figure 163C:
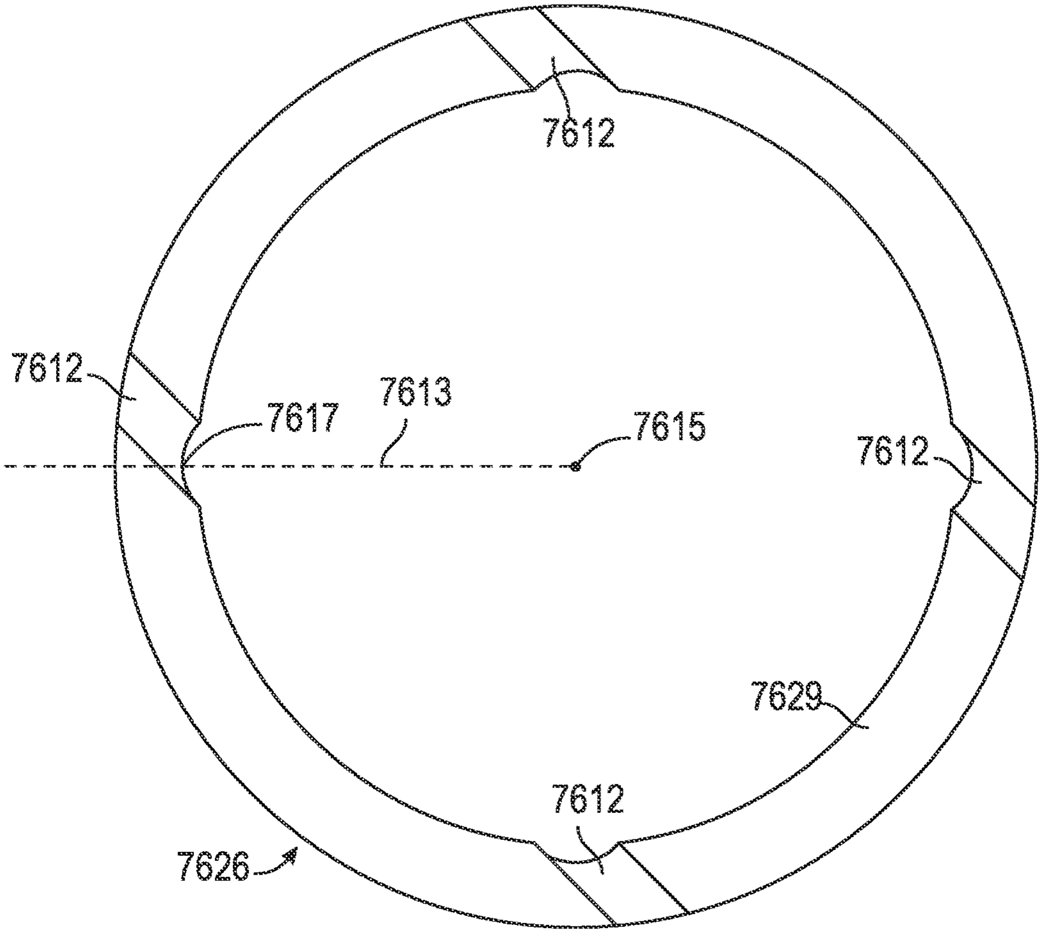

FIG. 163C is a top view of a secondary piston of a damper, according to an exemplary embodiment.

Figure 164:
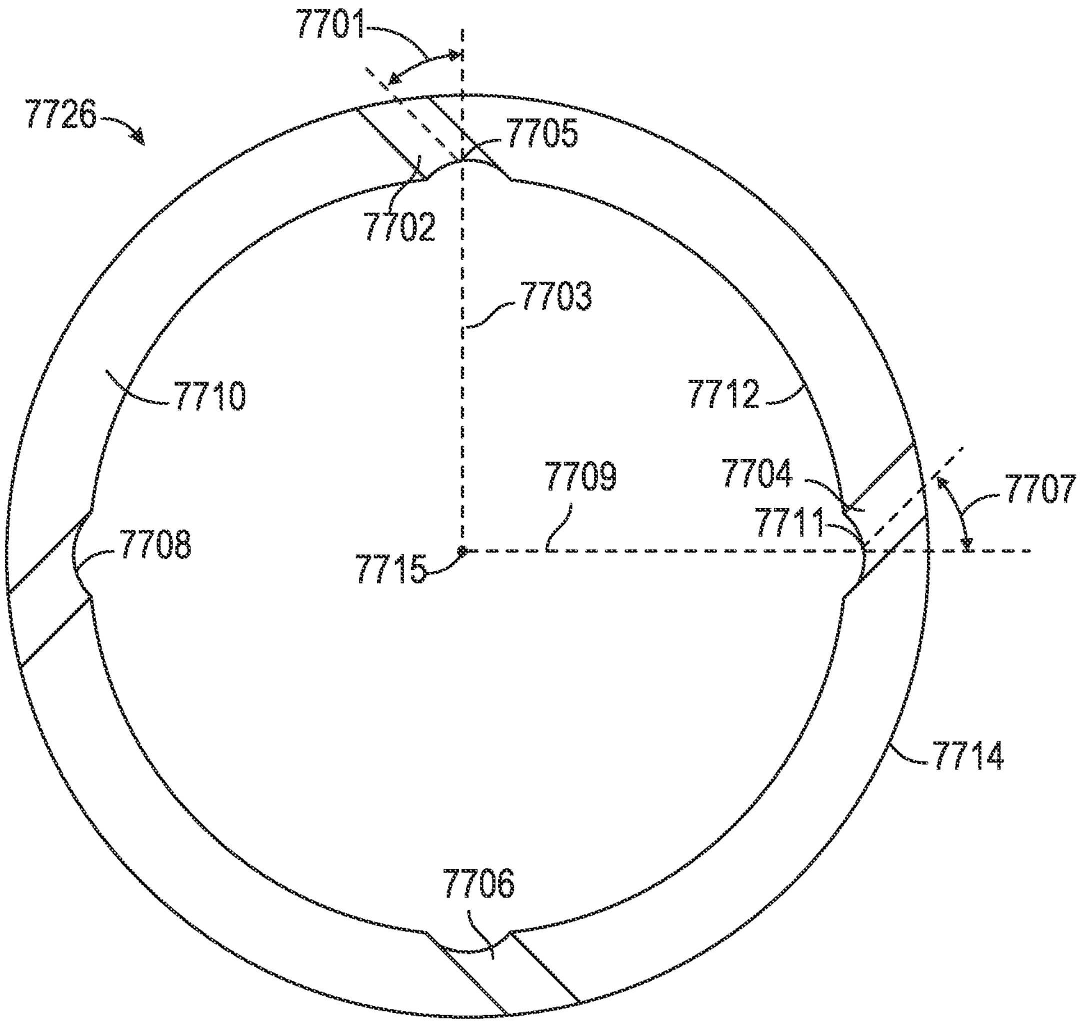

FIG. 164 is a top view of a secondary piston of a damper, according to an exemplary embodiment.

Figure 165A:
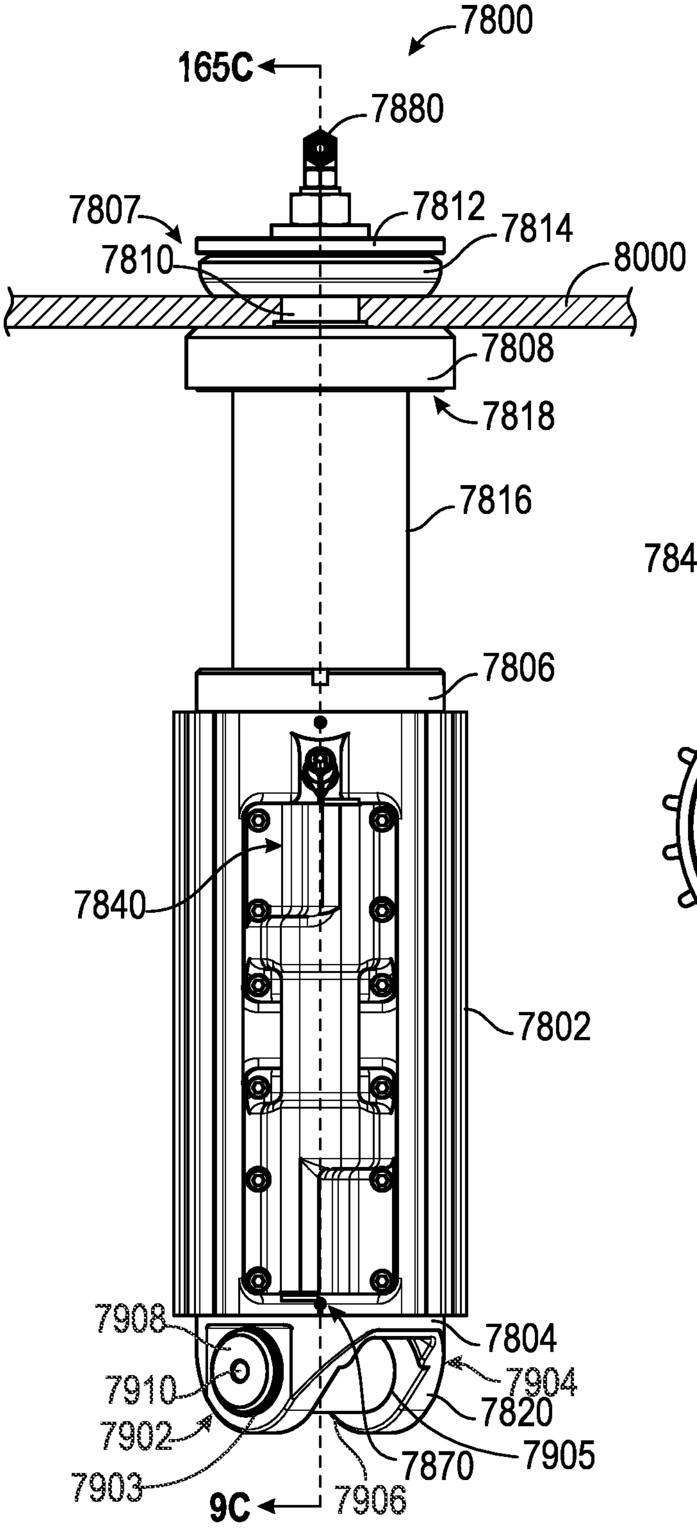

FIG. 165A is a side view of a suspension element, according to an alternative embodiment.

Figure 165B:
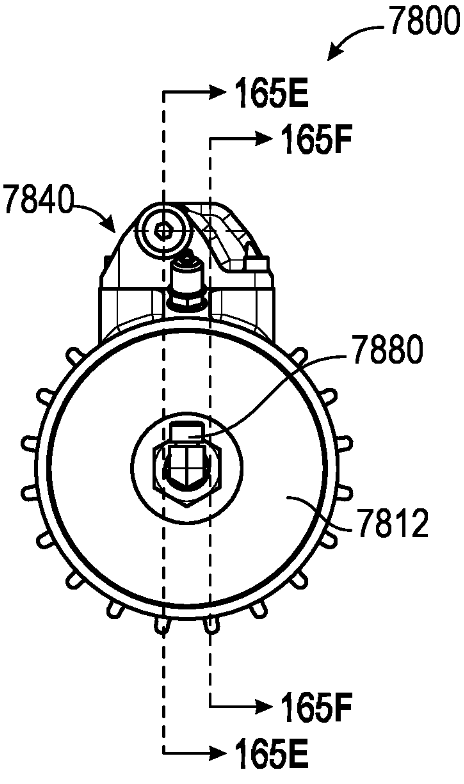

FIG. 165B is a top view of the suspension element of FIG. 165A, according to an exemplary embodiment.

Figure 165C:
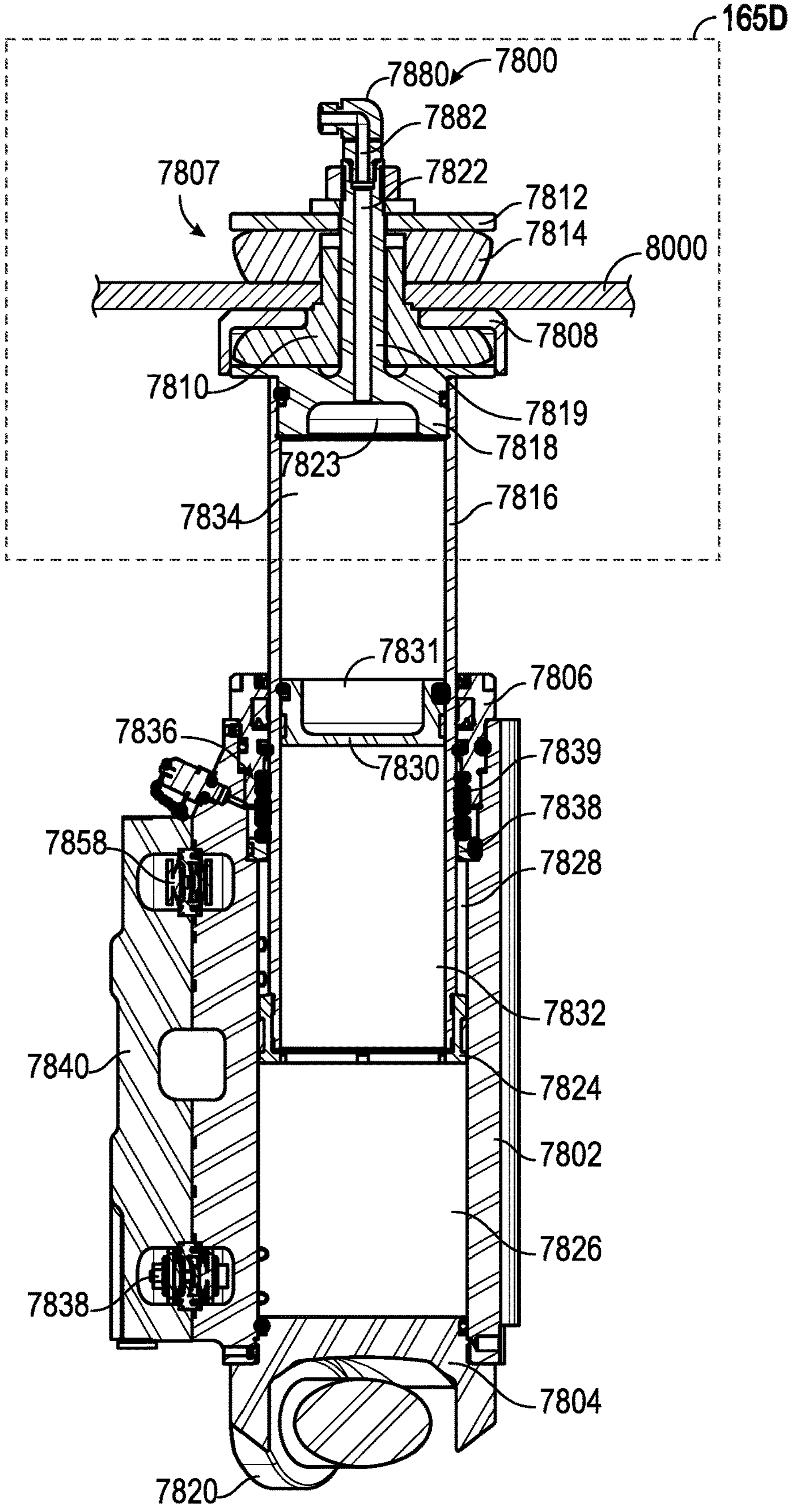

FIG. 165C is a sectional view of the suspension element of FIG. 165A, according to an exemplary embodiment.

Figure 165D:
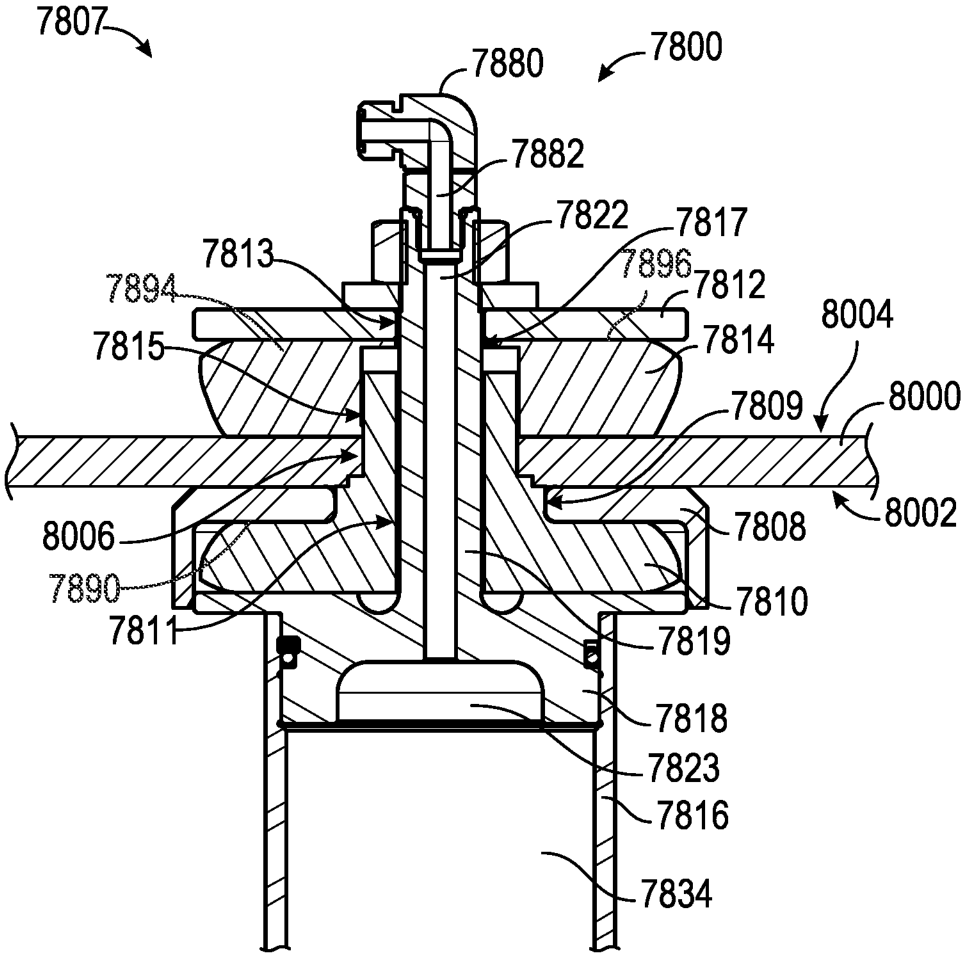

FIG. 165D is a detailed view of an upper mount of the suspension element of FIG. 165C, according to an exemplary embodiment.

Figure 165E:
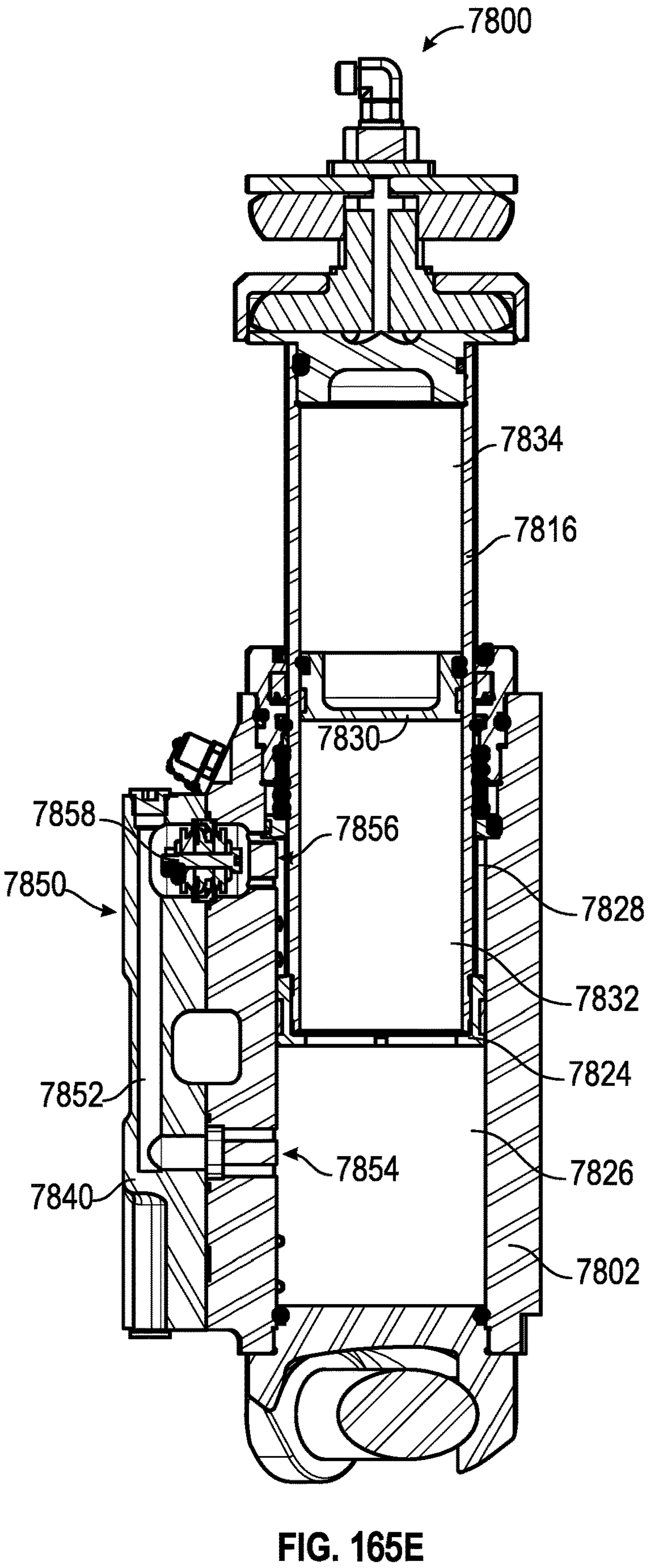

FIG. 165E is sectional view of the suspension element of FIG. 165B, according to an exemplary embodiment.

Figure 165F:
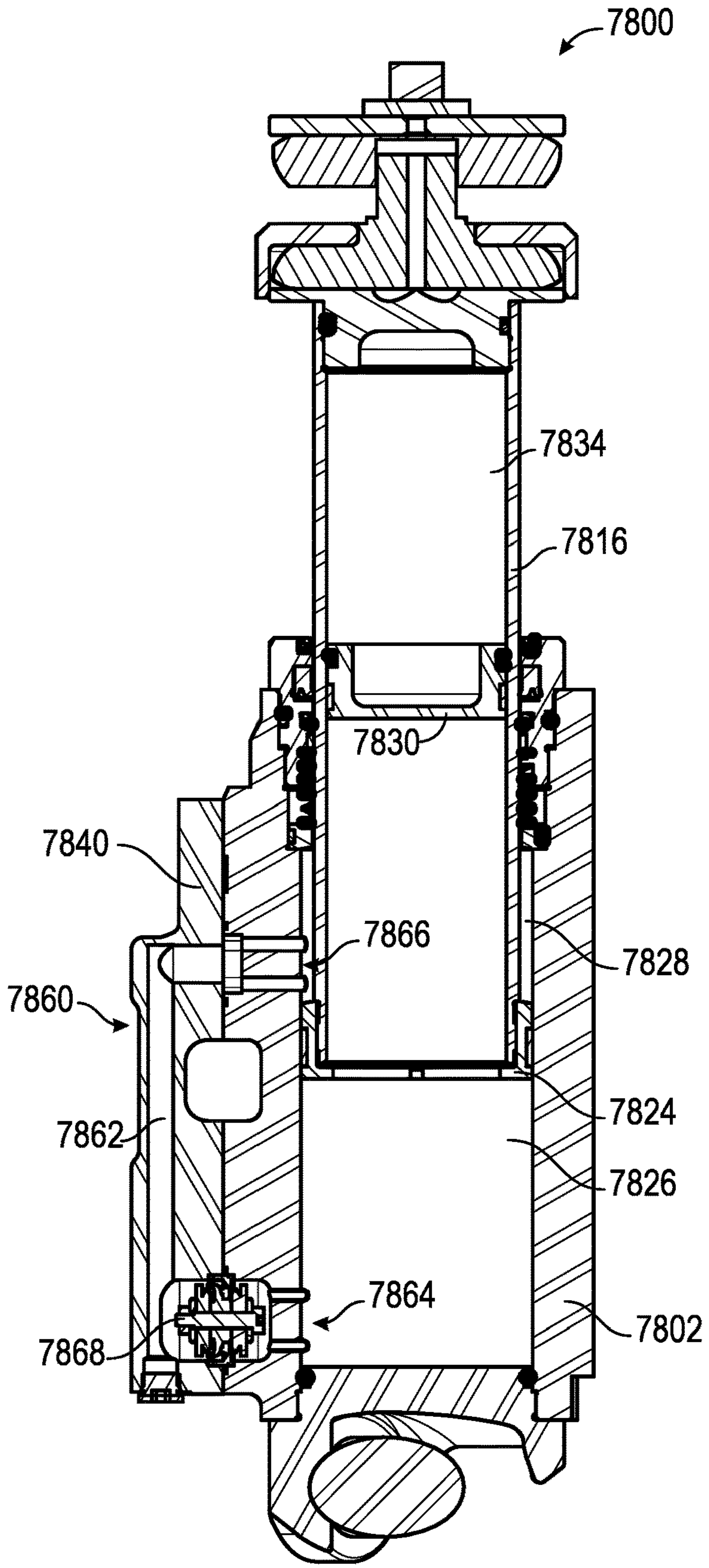

FIG. 165F is another sectional view of the suspension element of FIG. 165B, according to an exemplary embodiment.

Figure 166A:
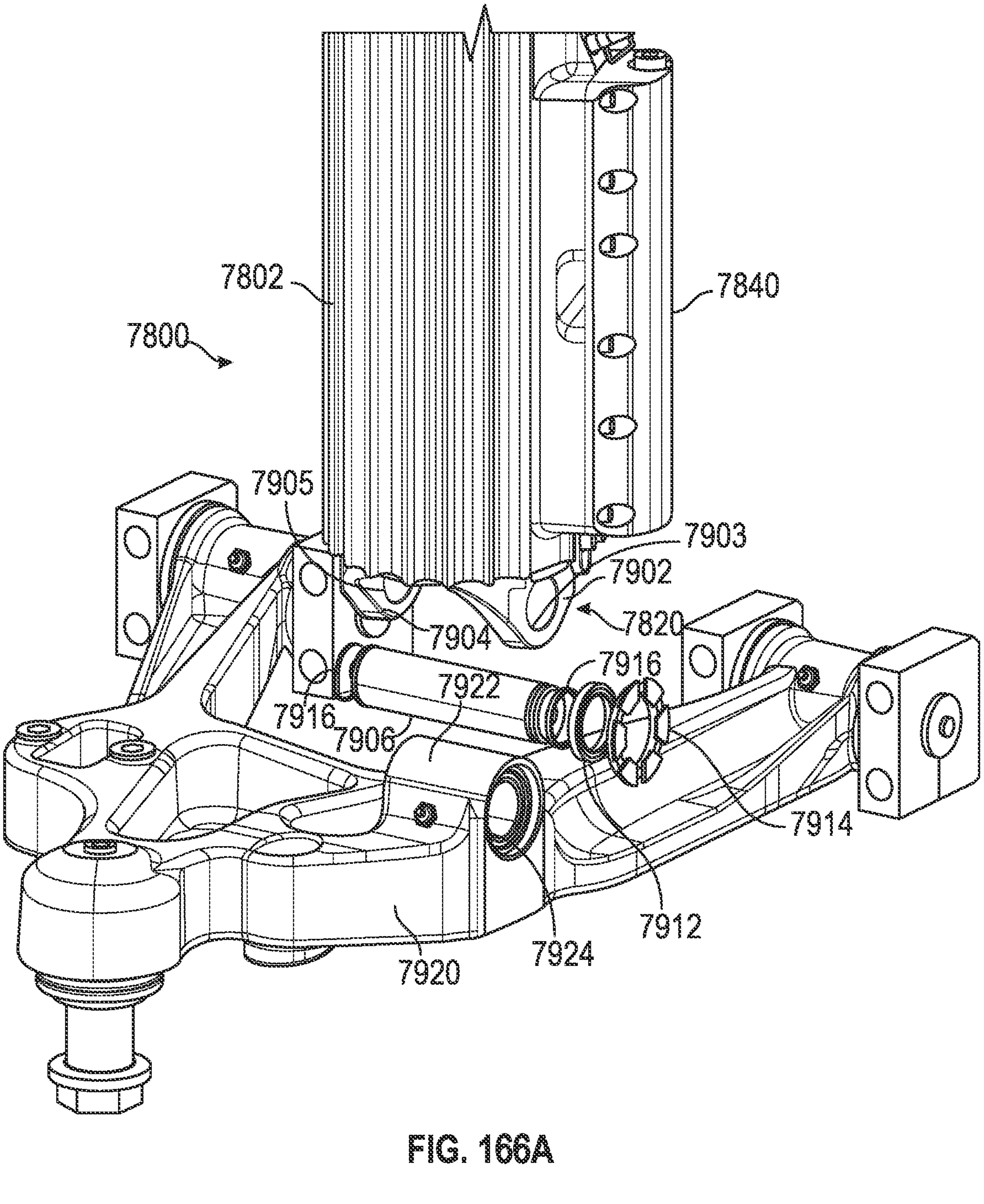

FIG. 166A is an elevated side view of a suspension element and a mounting structure, according to an exemplary embodiment.

Figure 166B:
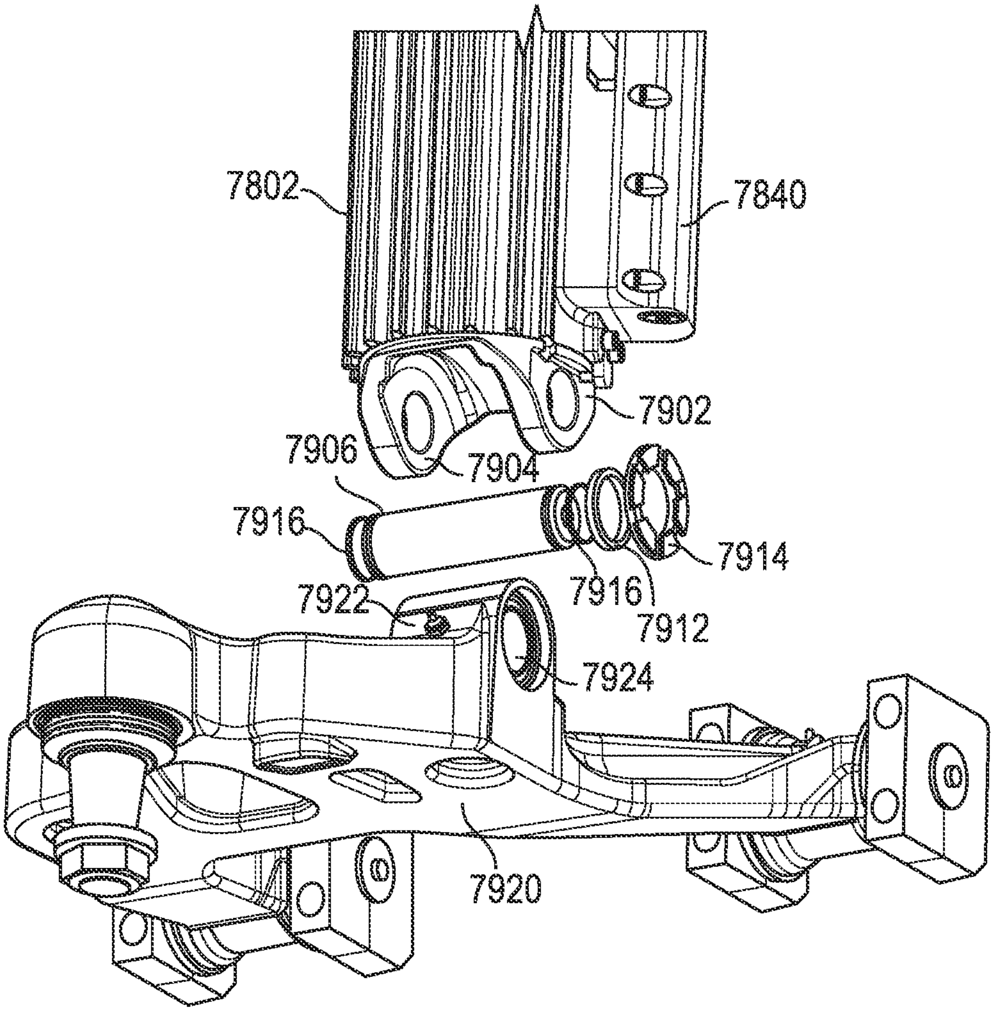

FIG. 166B is a lower view of the suspension element and mounting structure of FIG. 166A, according to an exemplary embodiment.

Figure 166C:
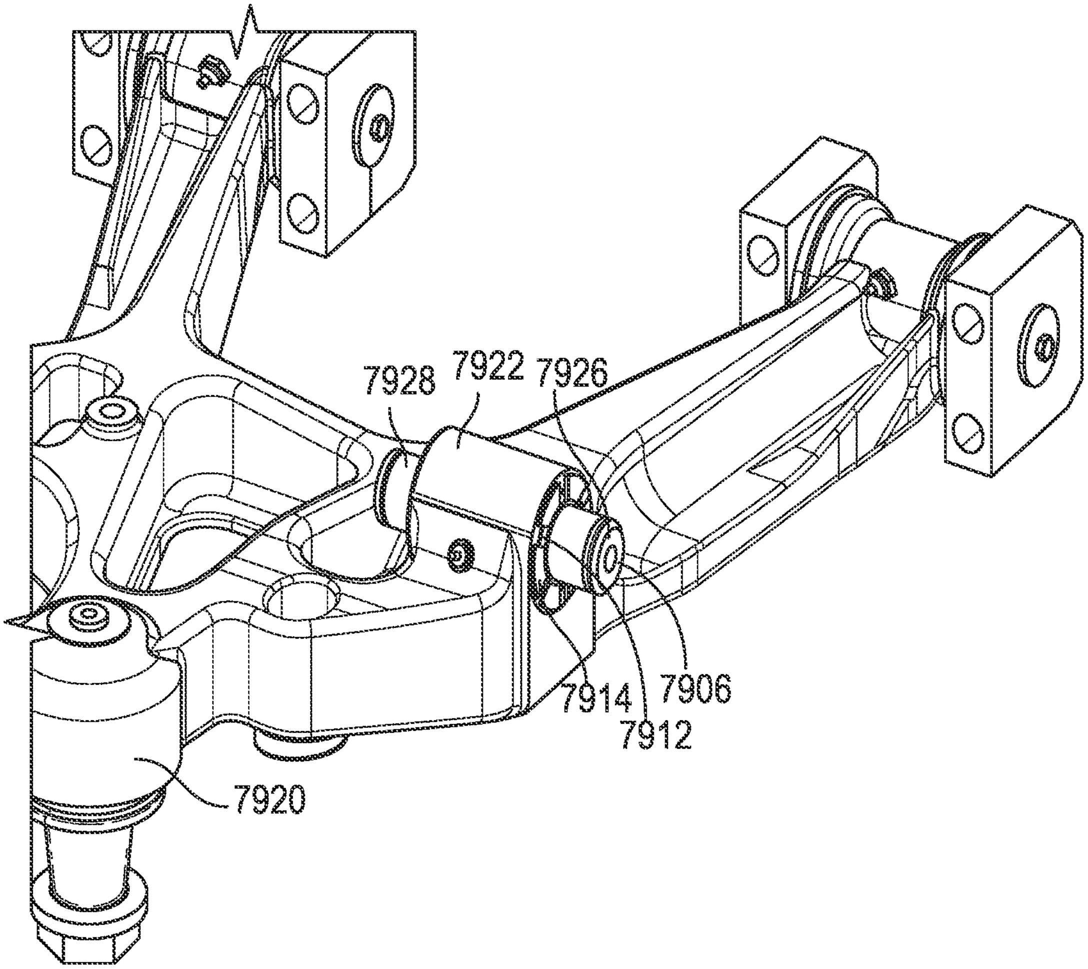

FIG. 166C is an elevated view of the mounting structure of FIG. 166A, according to an exemplary embodiment.

Figure 166D:
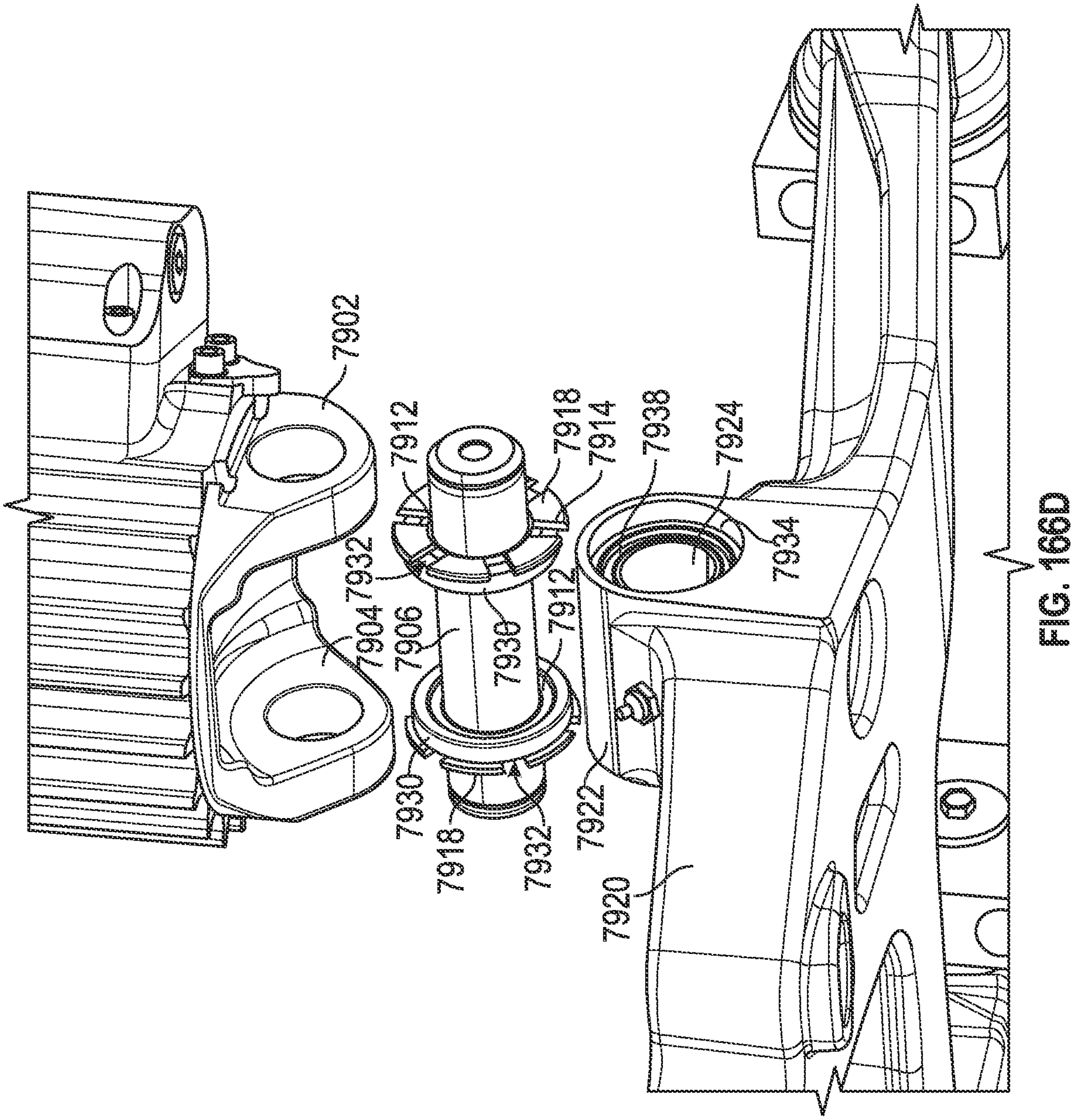

FIG. 166D is a lower view of the suspension element and mounting structure of FIG. 166A, according to an exemplary embodiment.

Figure 166E:
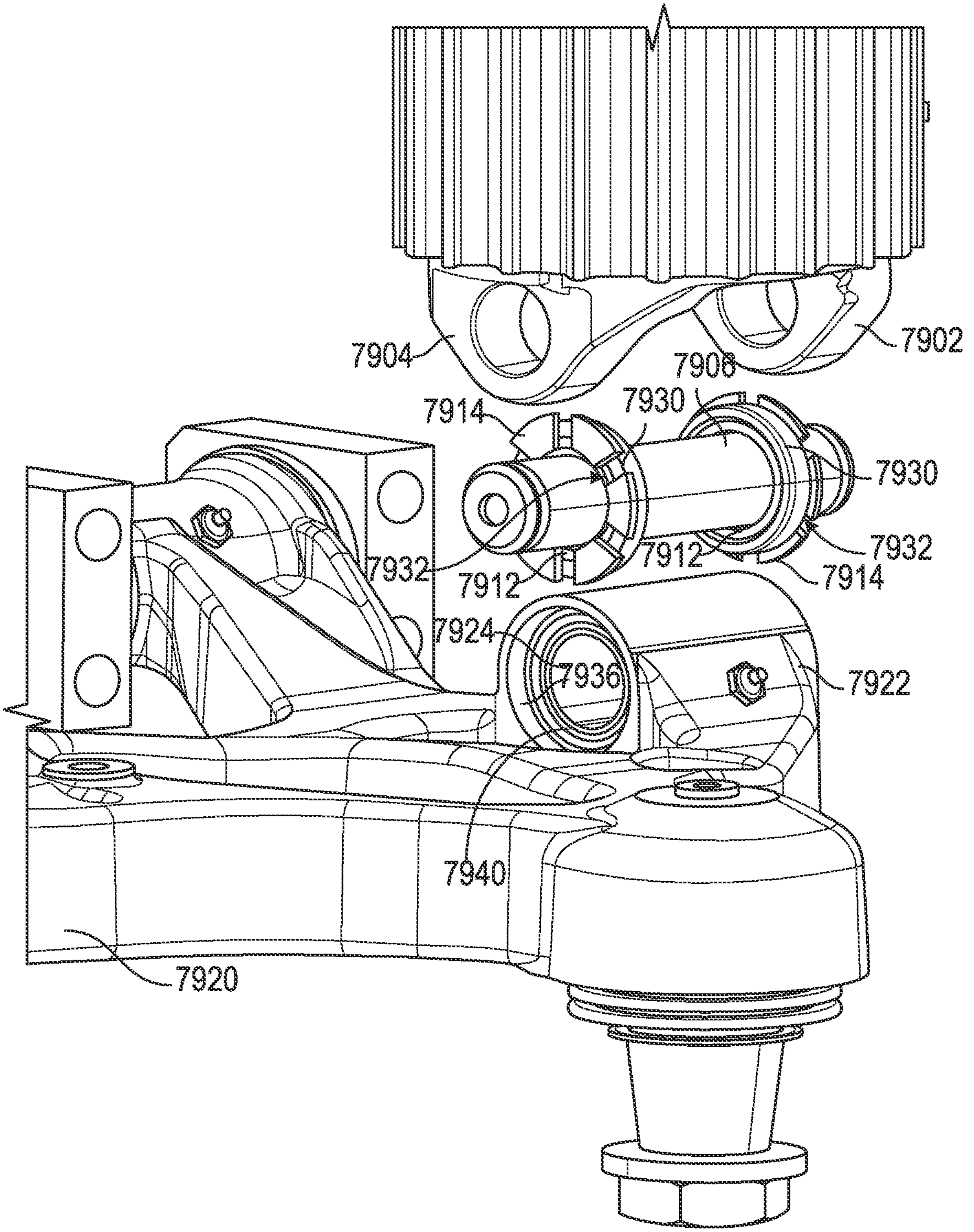

FIG. 166E is a side view of the suspension element and mounting structure of FIG. 166A, according to an exemplary embodiment.

Figure 166F:
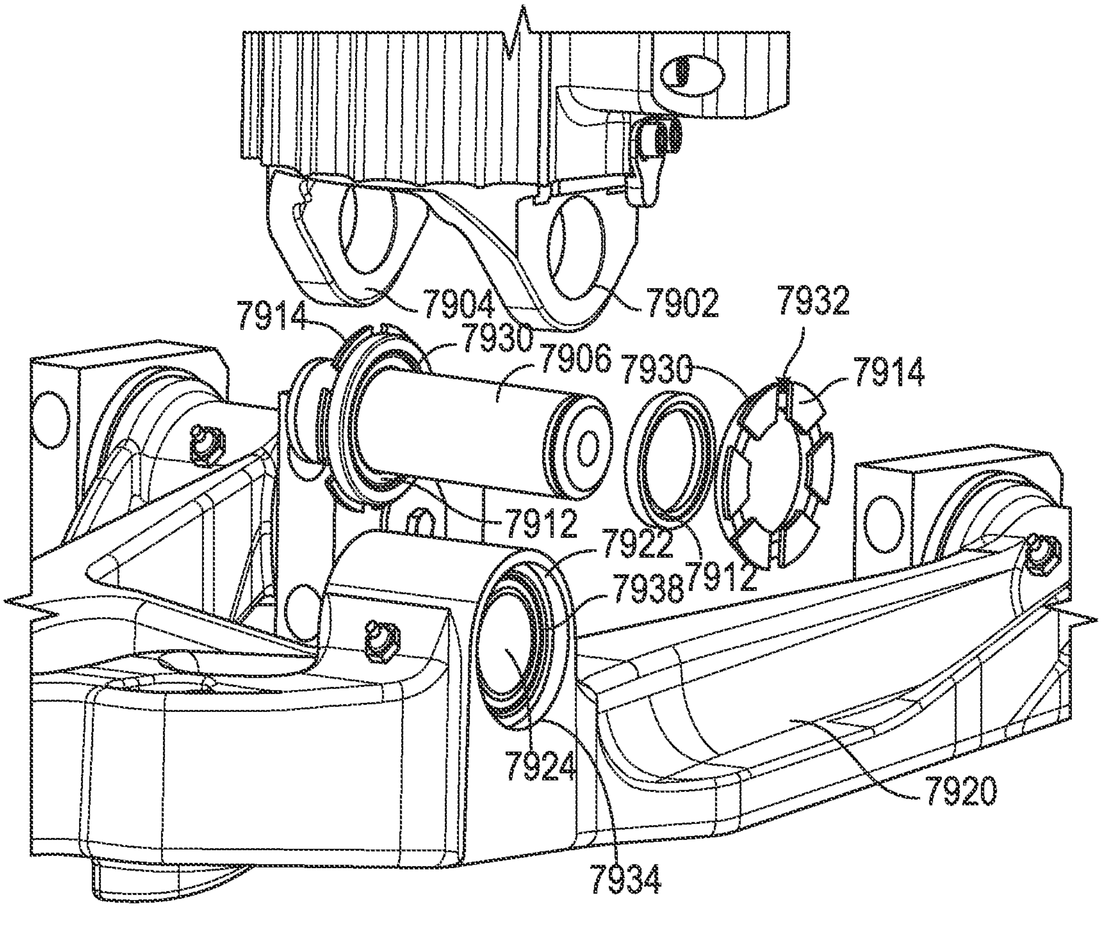

FIG. 166F is an exploded view of the mounting structure of FIG. 166A, according to an exemplary embodiment.

Figure 166G:
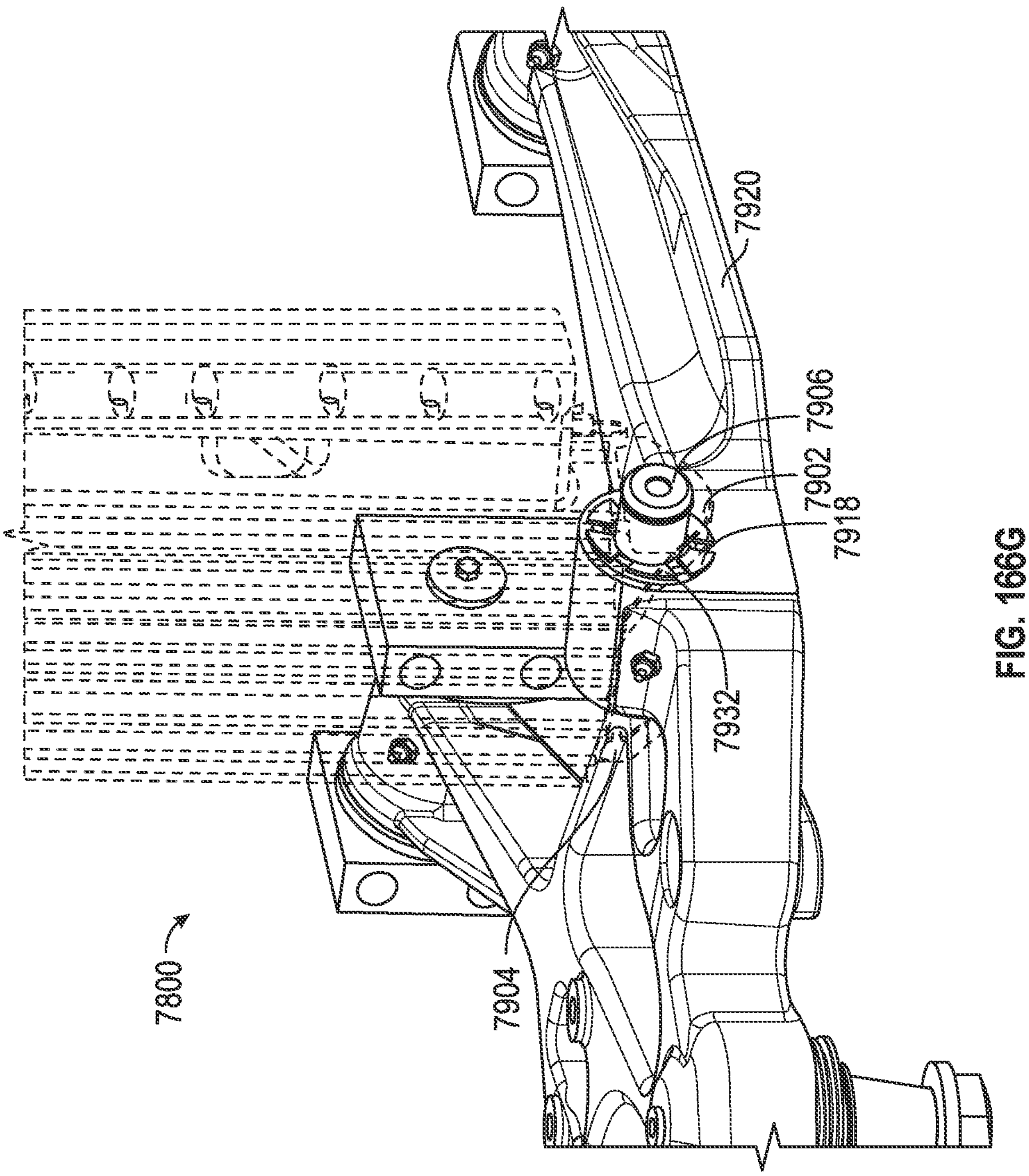

FIG. 166G is a side view of the mounting structure of FIG. 166A, according to an exemplary embodiment.

Figure 166H:
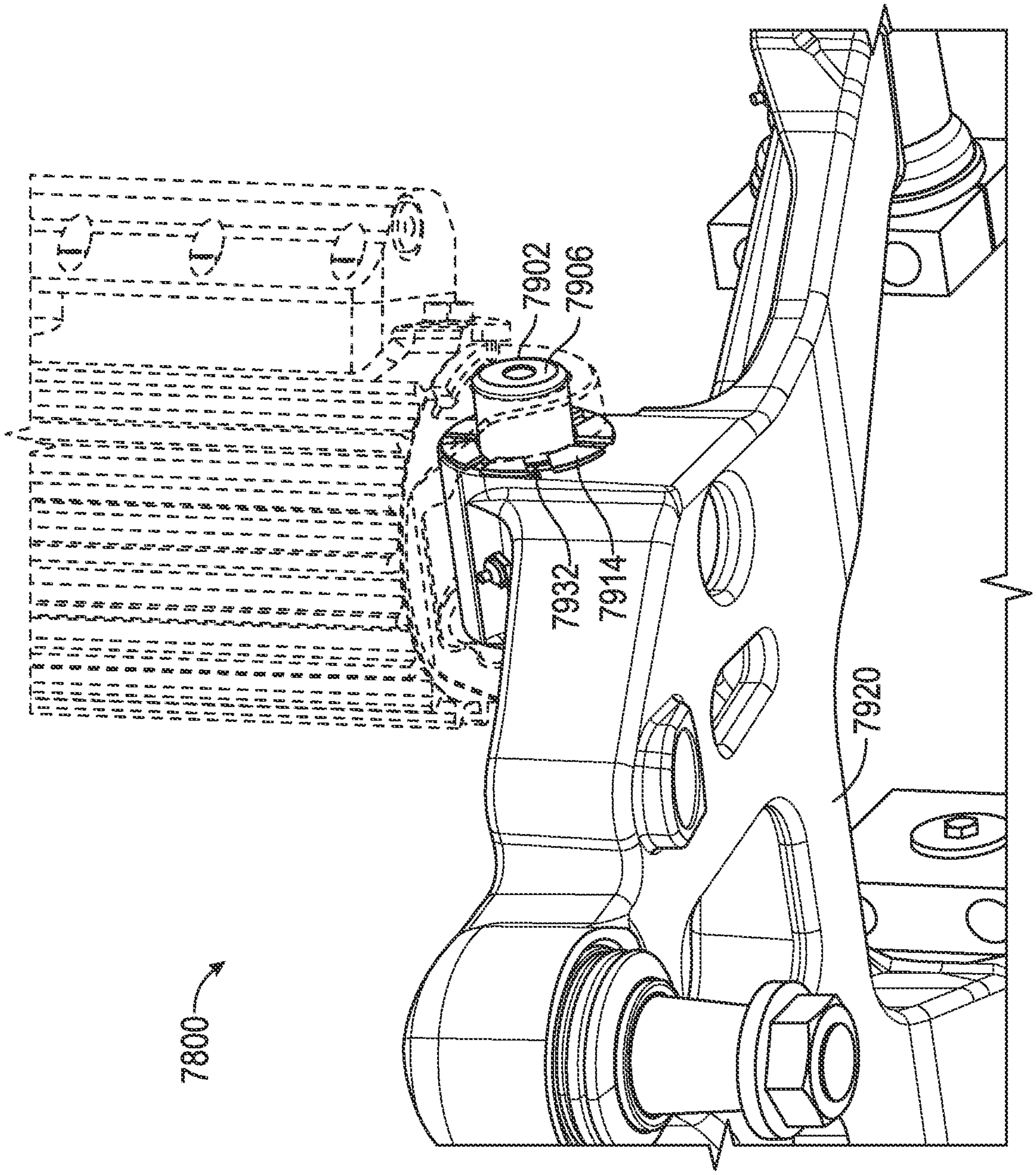

FIG. 166H is a lower view of the mounting structure of FIG. 166A, according to an exemplary embodiment.

Figure 166I:
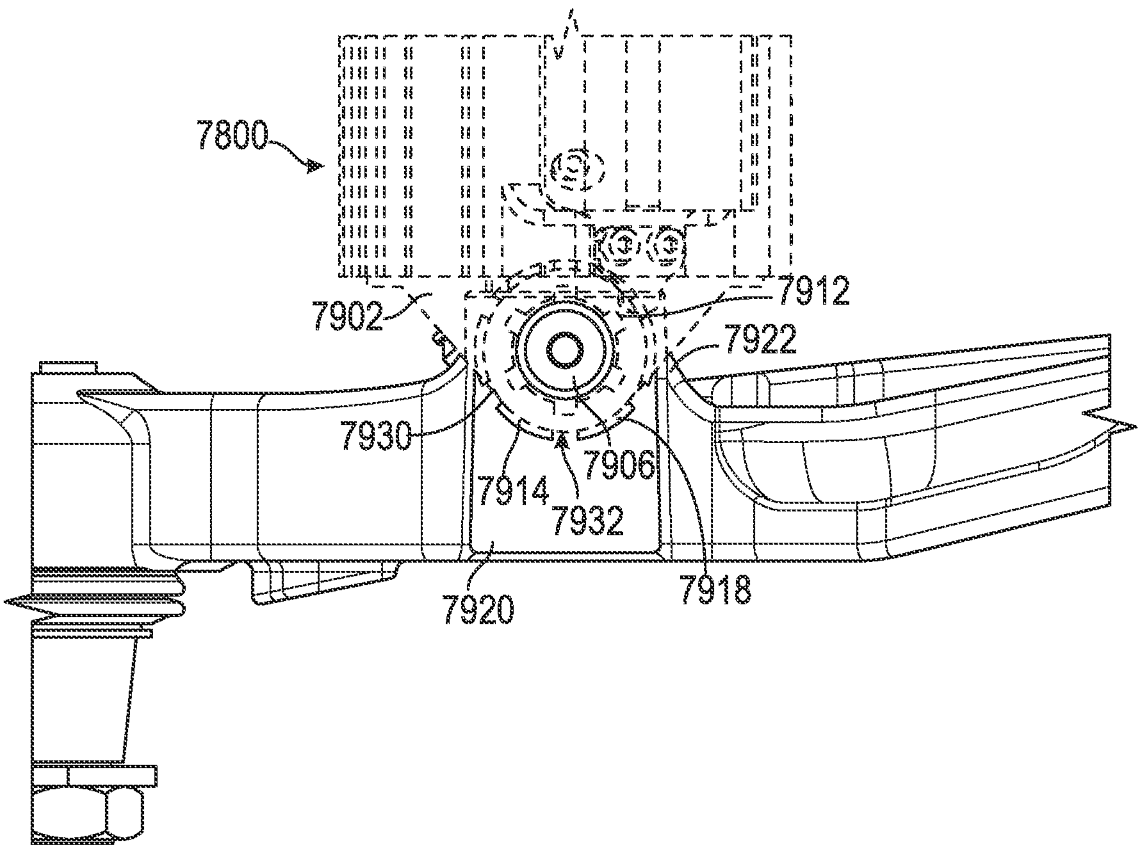

FIG. 166I is a side view of the mounting structure of FIG. 166A, according to an exemplary embodiment.

Figure 167A:
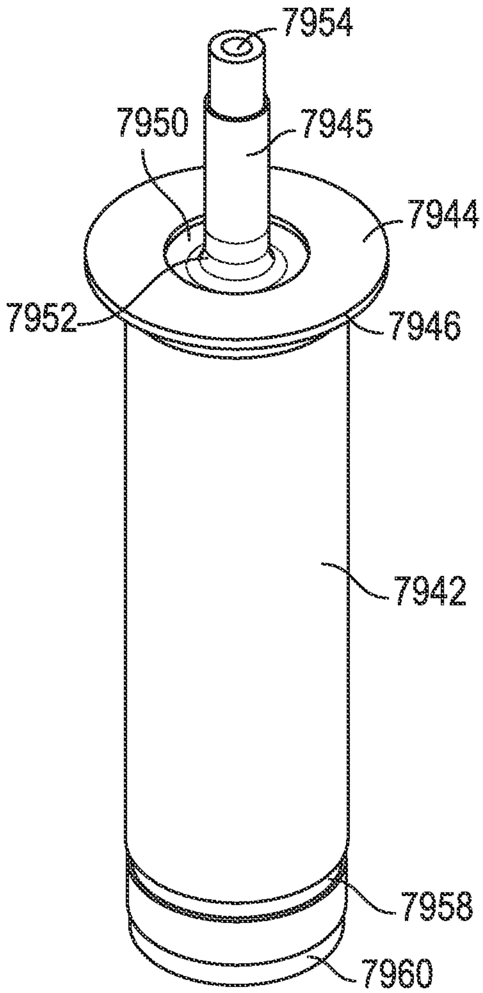

FIG. 167A is a side view of a main tube and cap of a suspension element, according to an exemplary embodiment.

Figure 167B:
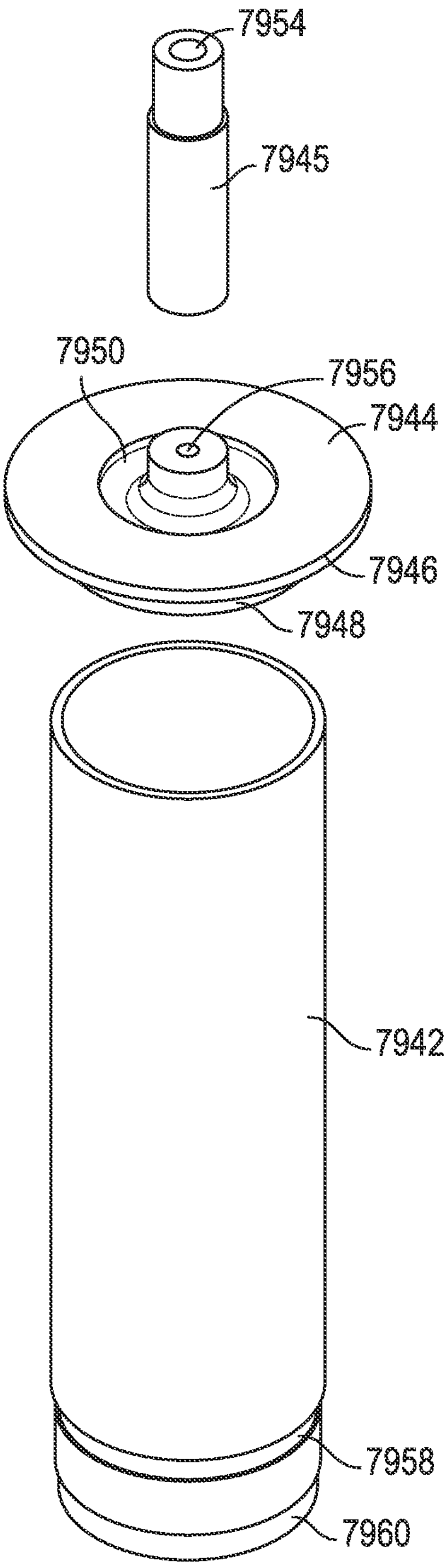

FIG. 167B is an exploded view of the main tube and cap of the suspension element of FIG. 167A, according to an exemplary embodiment.

Figure 168:
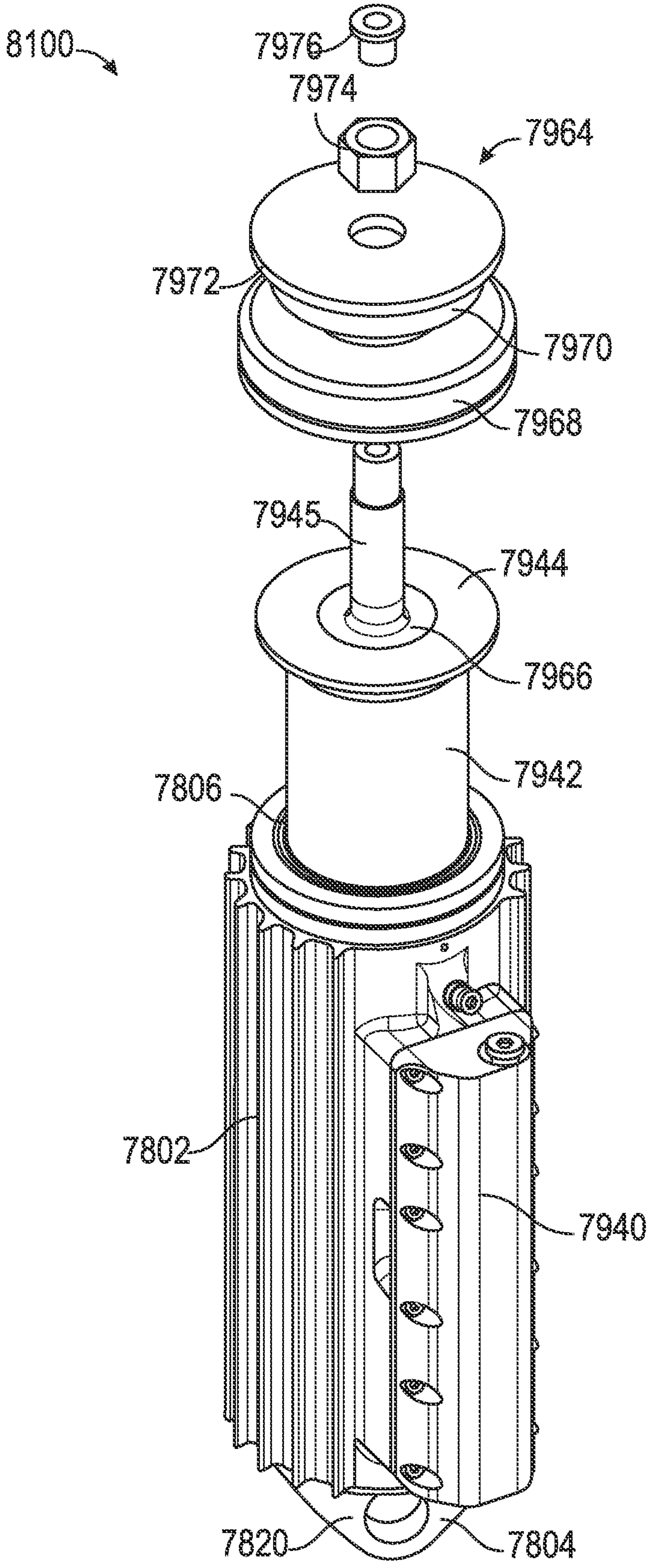

FIG. 168 is a side view of a suspension element and an upper mount, according to an exemplary embodiment.

Figure 169:
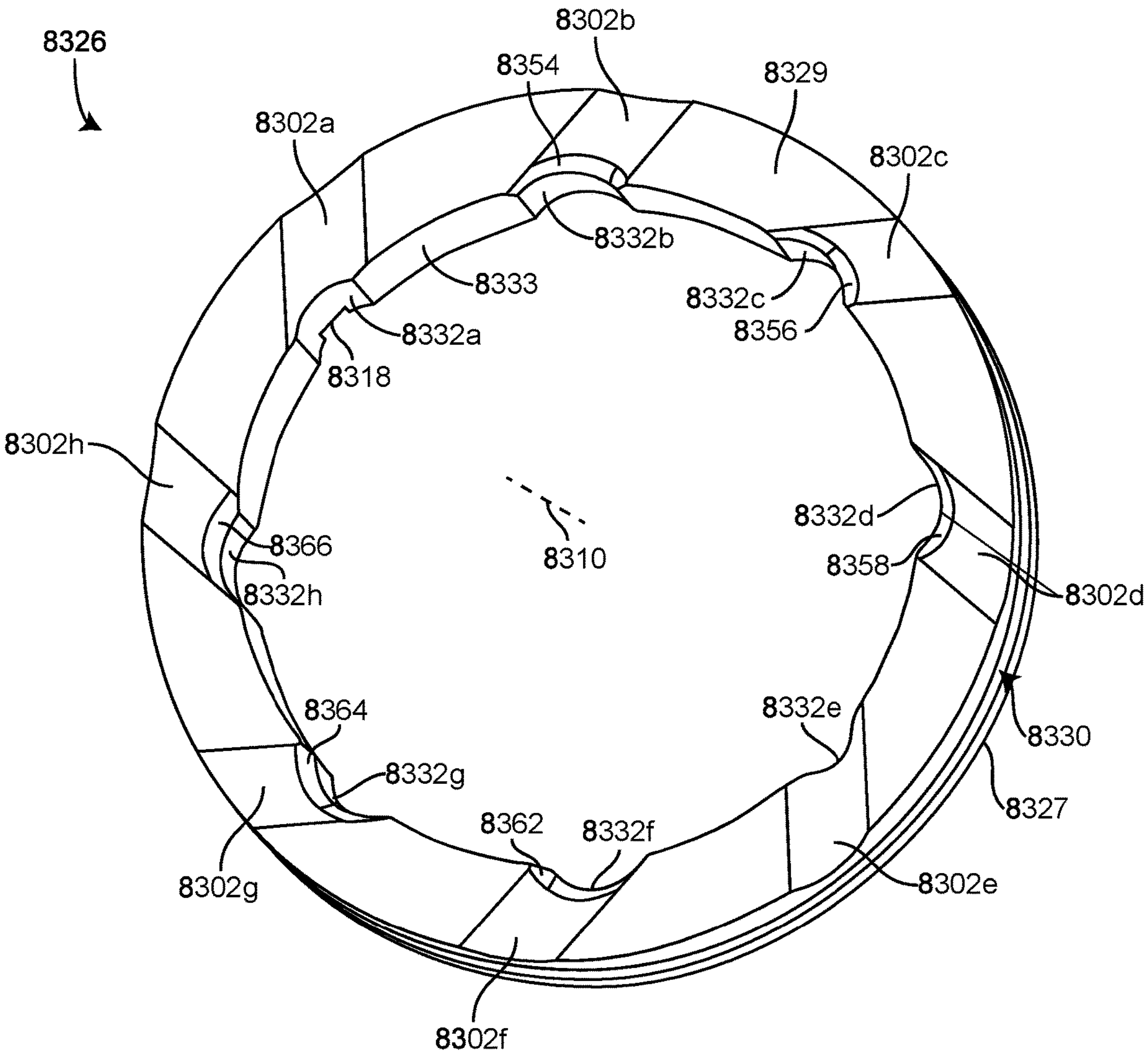

FIG. 169 is an elevation view of a secondary piston of a damper, according to an exemplary embodiment.

Figure 170:
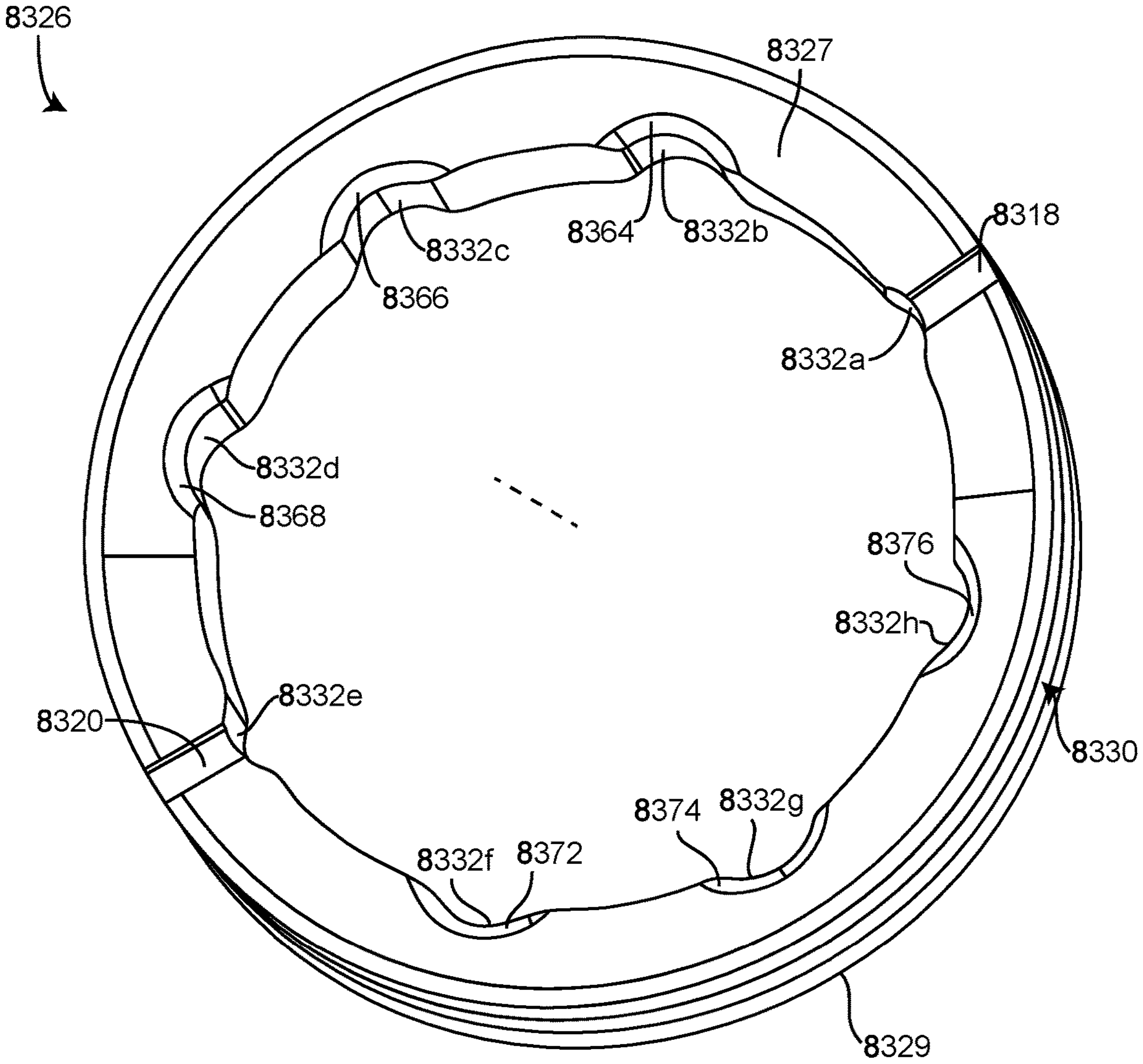

FIG. 170 is a bottom elevation view of the secondary piston of FIG. 169, according to an exemplary embodiment.

Figure 171A:
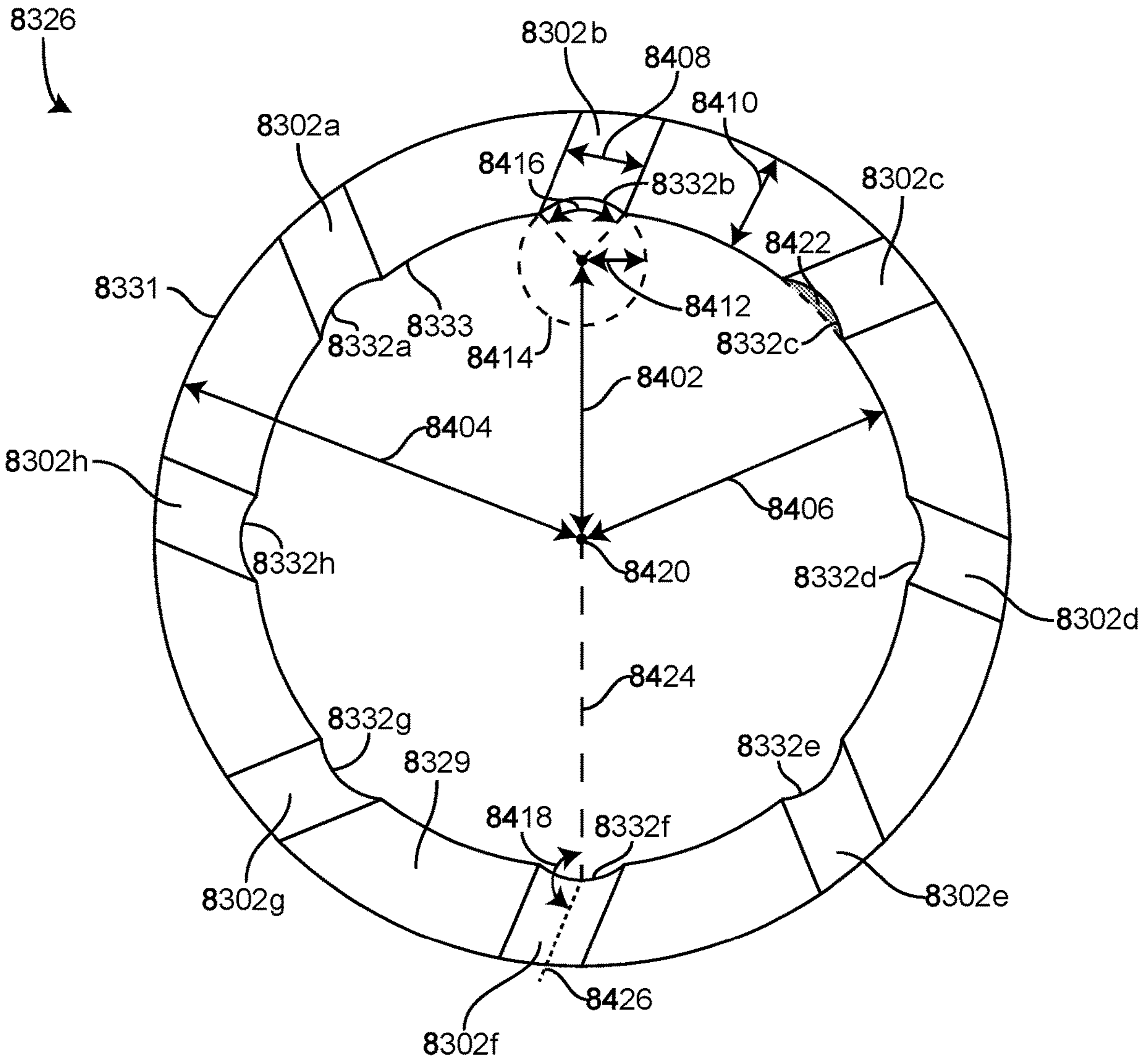

FIG. 171A is a top view of the secondary piston of FIG. 169, according to an exemplary embodiment.

Figure 171B:
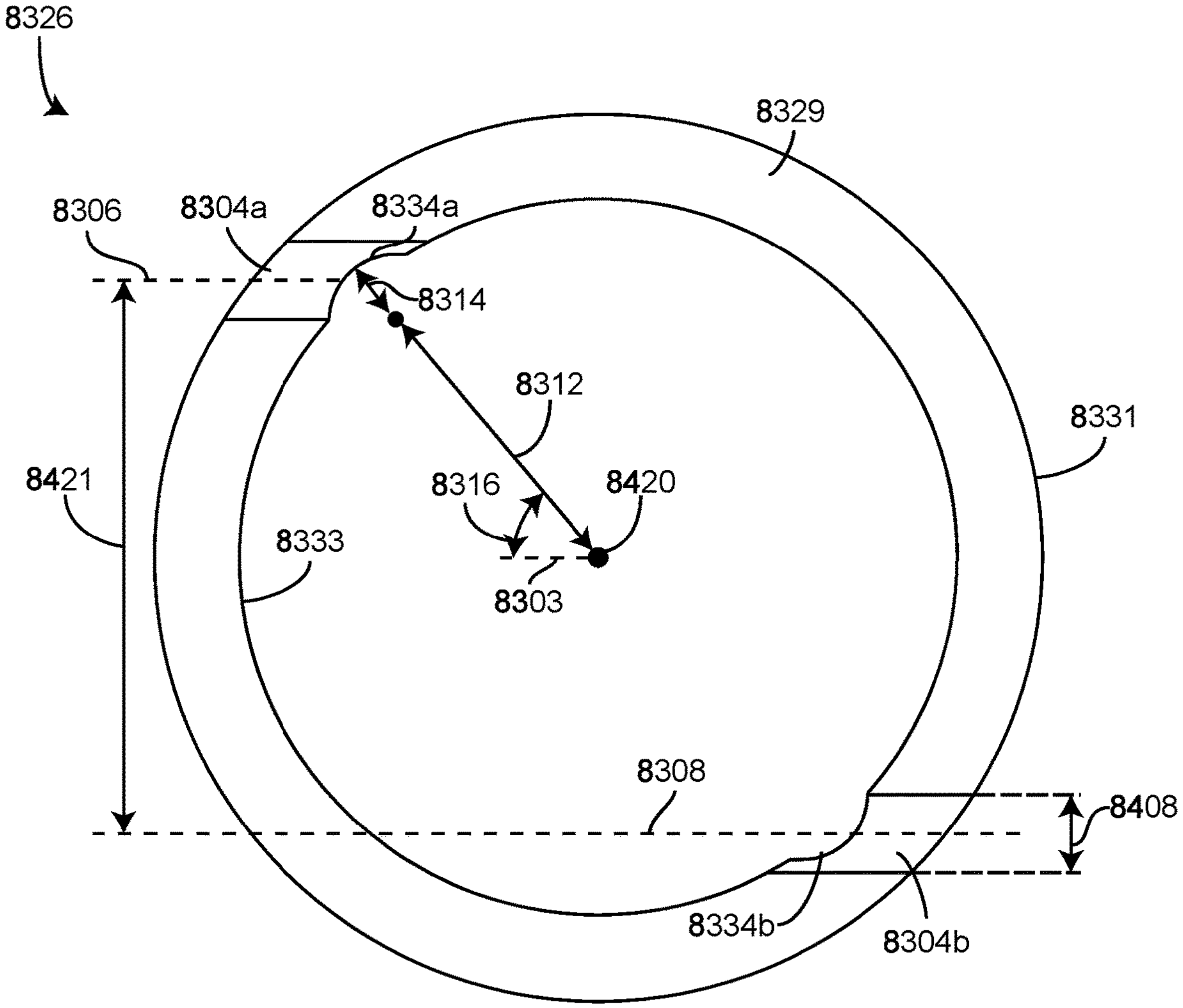

FIG. 171B is a top view of a secondary piston, according to an exemplary embodiment.

Figure 172:
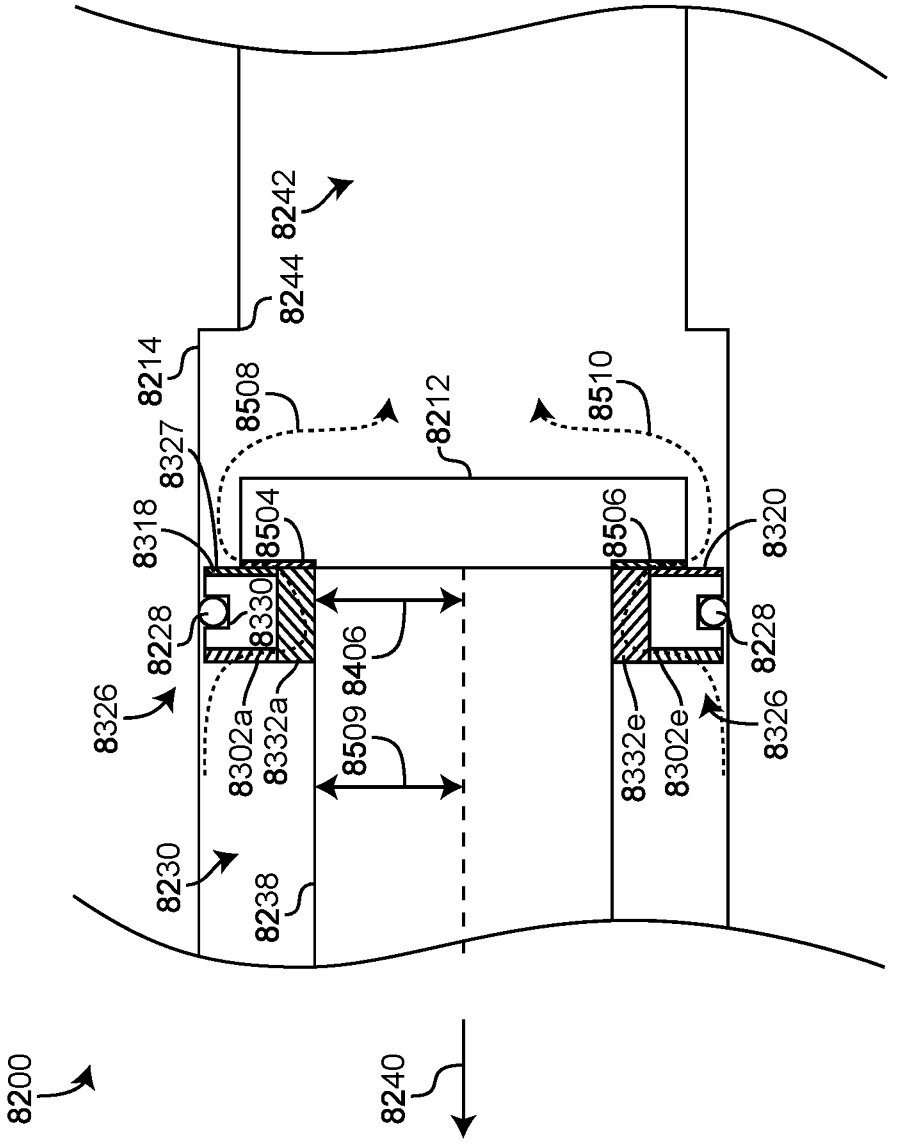

FIG. 172 is a diagram illustrating a flow path of fluid of the damper assembly of FIG. 161.

Figure 173:
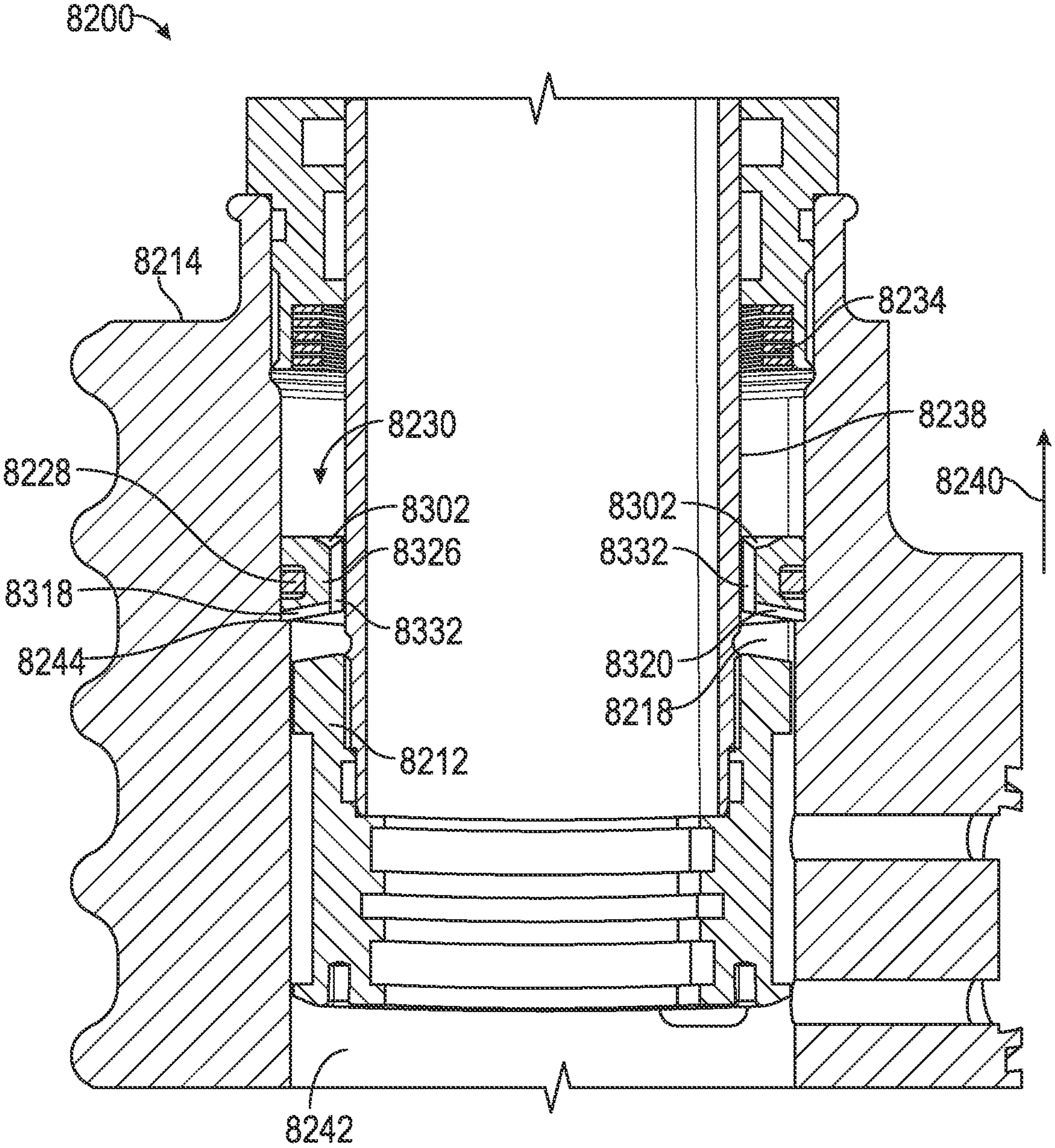

FIG. 173 is a sectional view of a damper assembly in a first position, according to an exemplary embodiment.

Figure 174:
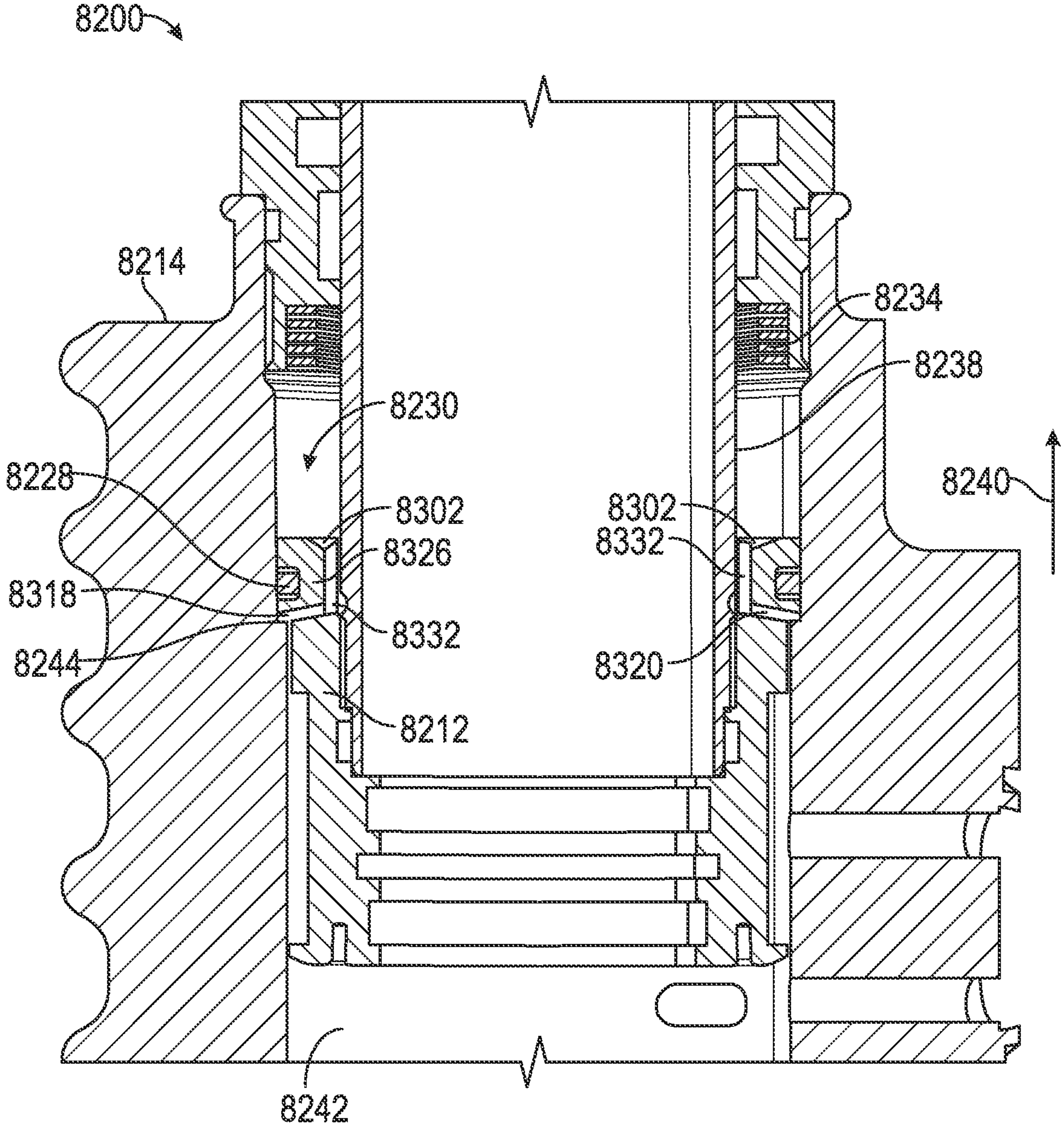

FIG. 174 is a sectional view of the damper assembly of FIG. 173 in a second position, according to an exemplary embodiment.

Figure 175:
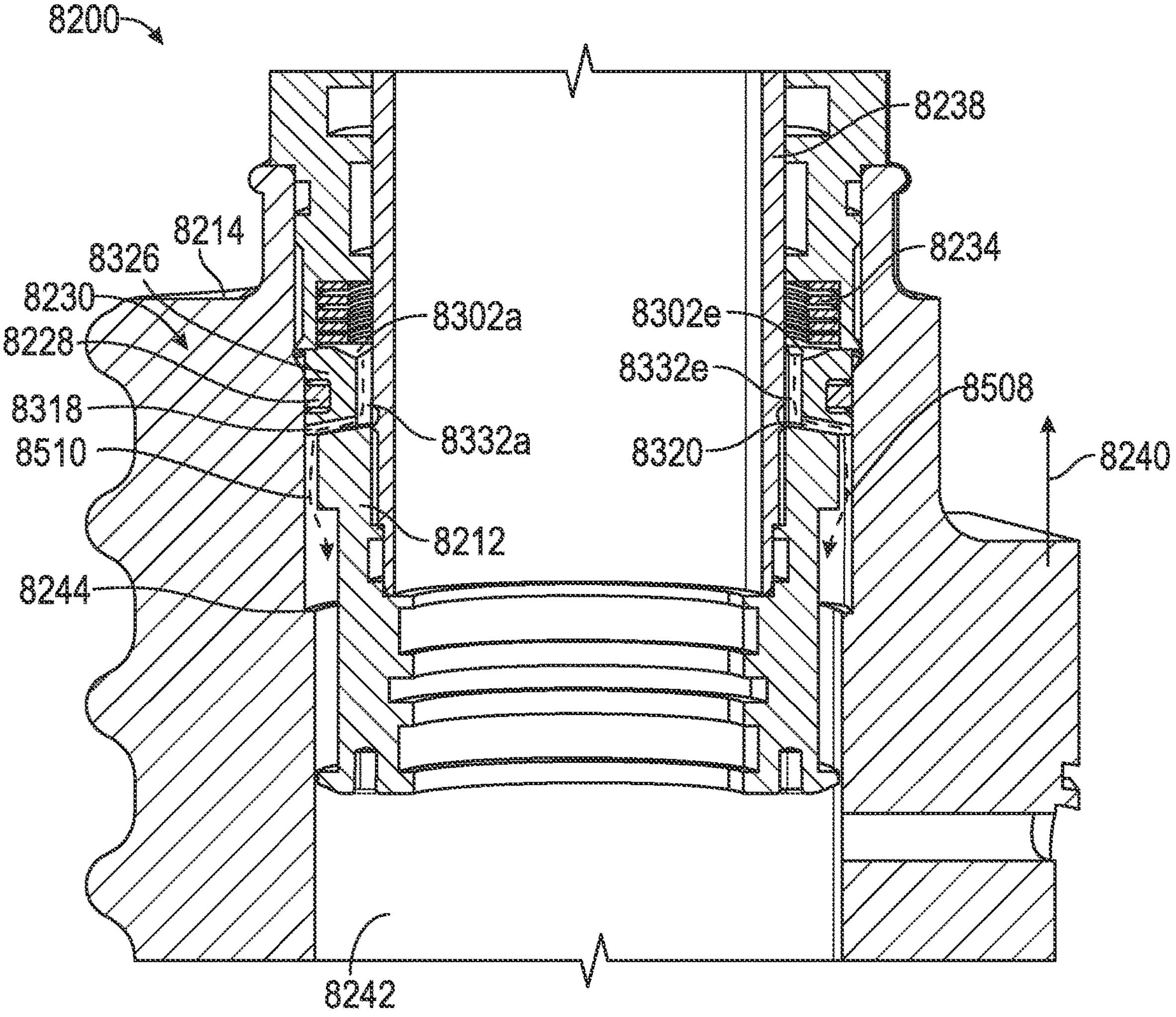

FIG. 175 is a sectional view of the damper assembly of FIG. 173 in a third position, according to an exemplary embodiment.

Figure 176:
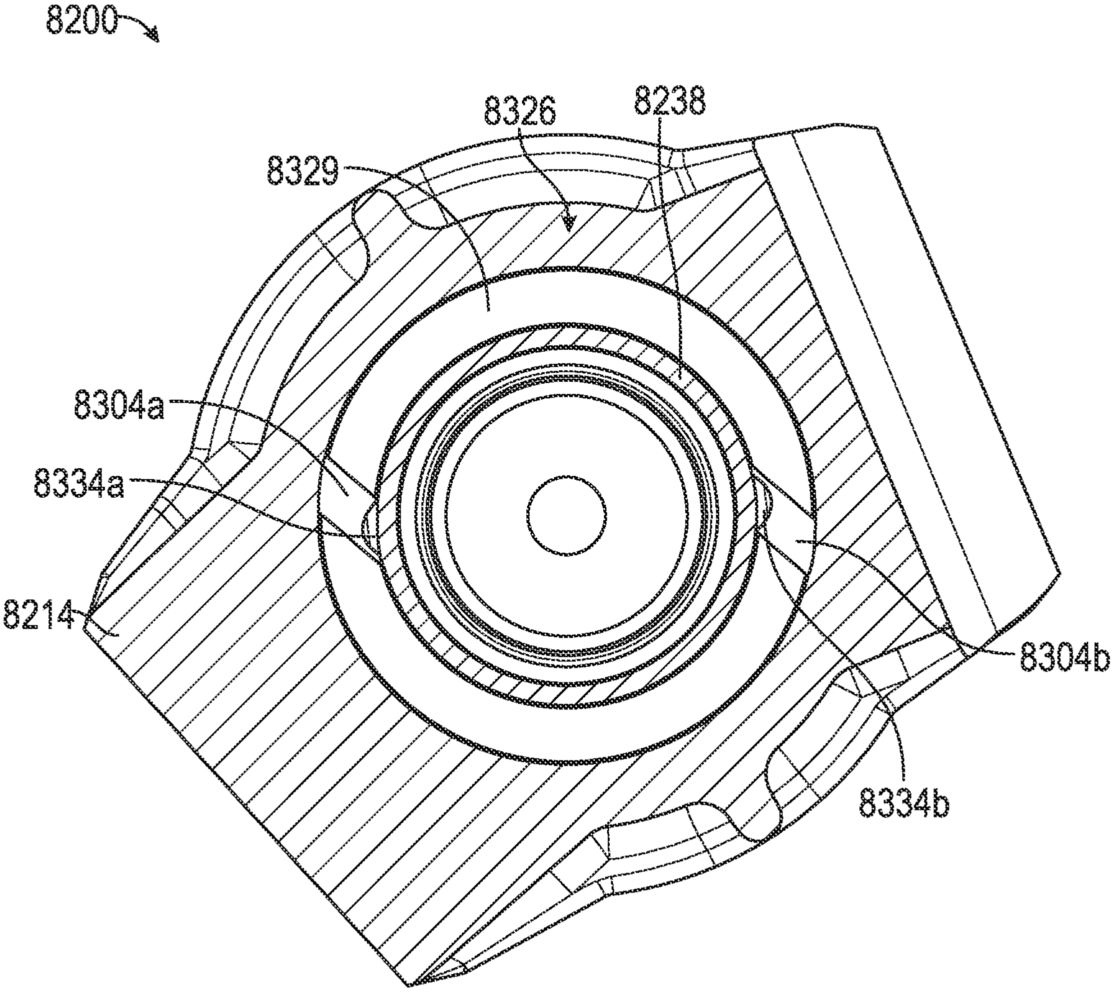

FIG. 176 is a top sectional view of the damper assembly of FIG. 173, according to an exemplary embodiment.

Figure 177:
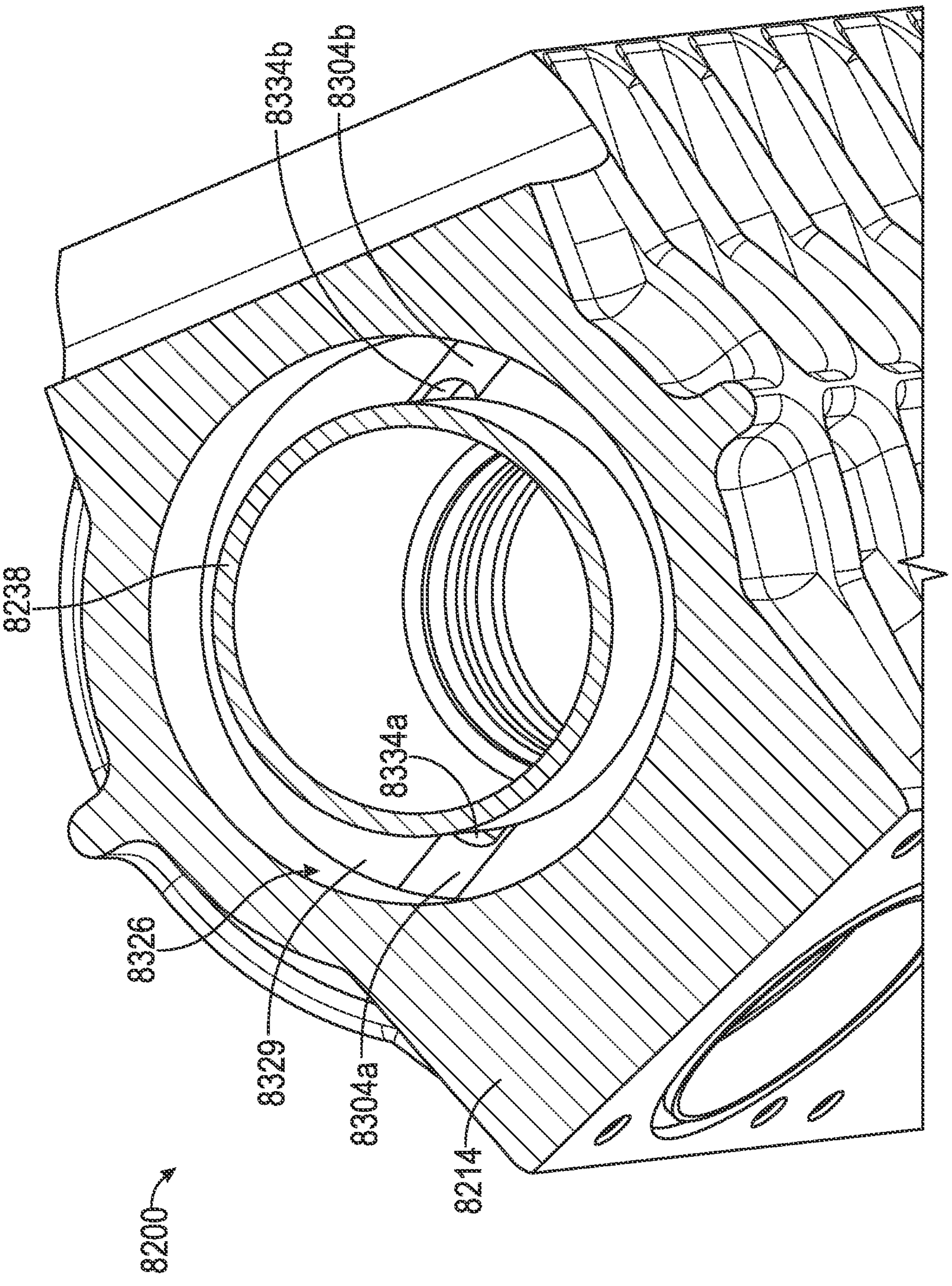

FIG. 177 is an elevated sectional view of the damper assembly of FIG. 173, according to an exemplary embodiment.

Figure 178:
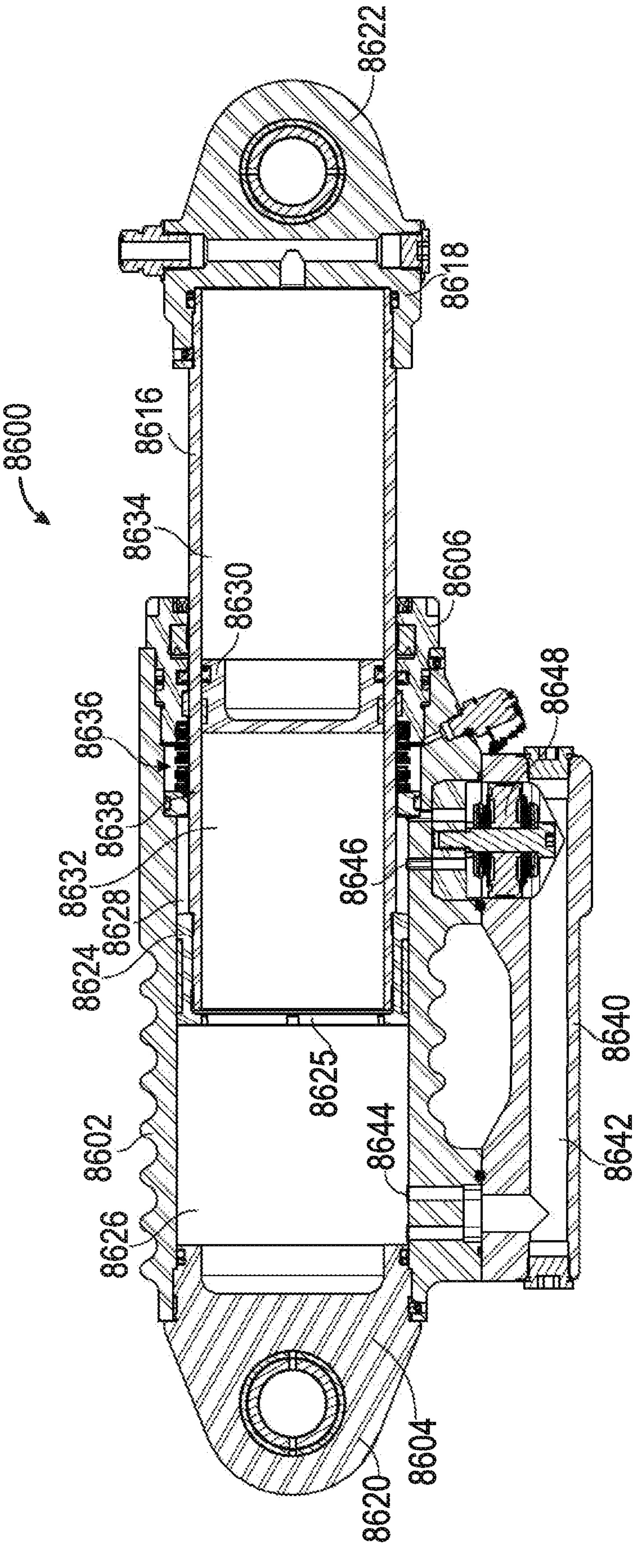

FIG. 178 is a sectional view of a suspension element, according to an exemplary embodiment.

Figure 179A:
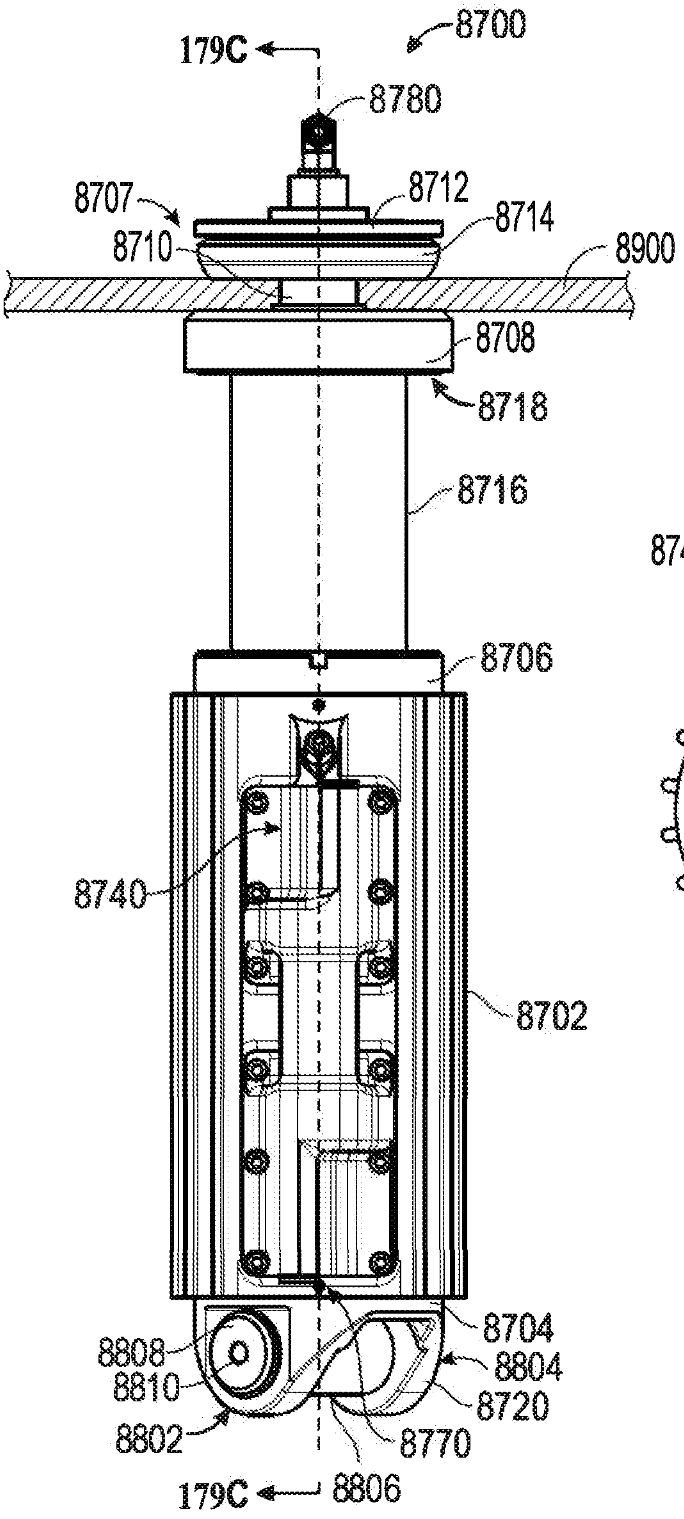

FIG. 179A is a side view of a suspension element, according to an exemplary embodiment.

Figure 179B:
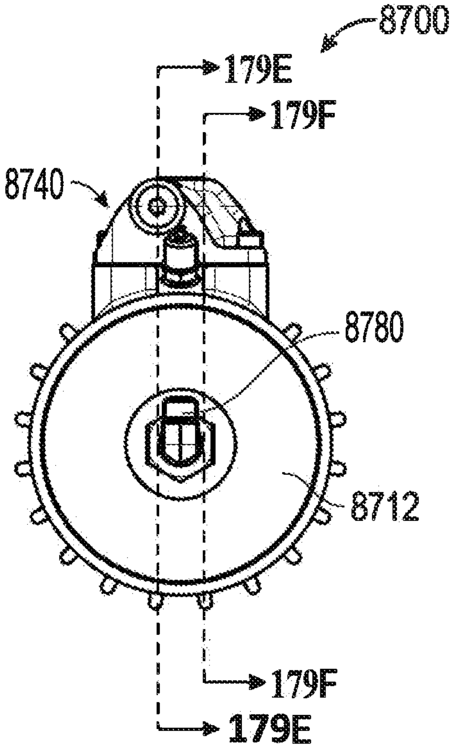

FIG. 179B is a top view of the suspension element of FIG. 179A, according to an exemplary embodiment.

Figure 179C:
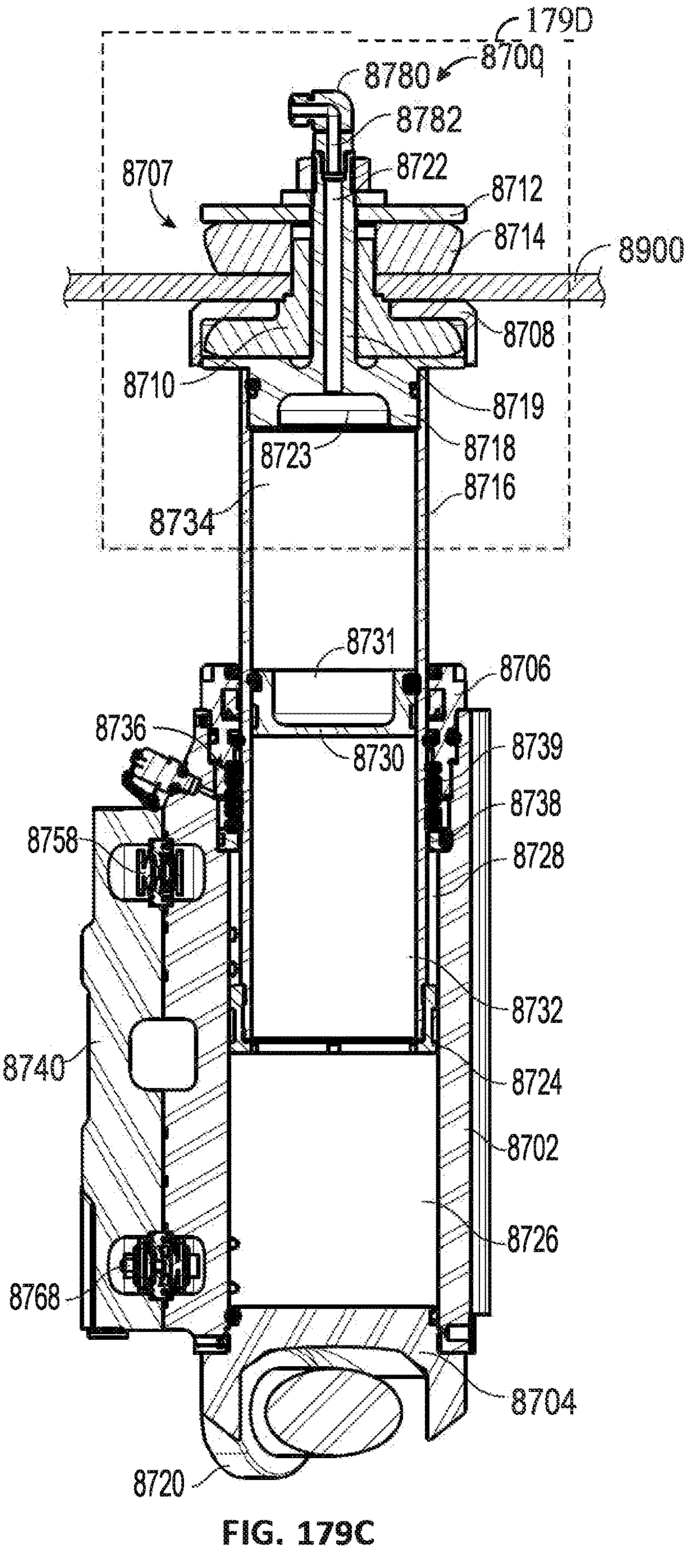

FIG. 179C is a sectional view of the suspension element of FIG. 179A, according to an exemplary embodiment.

Figure 179D:
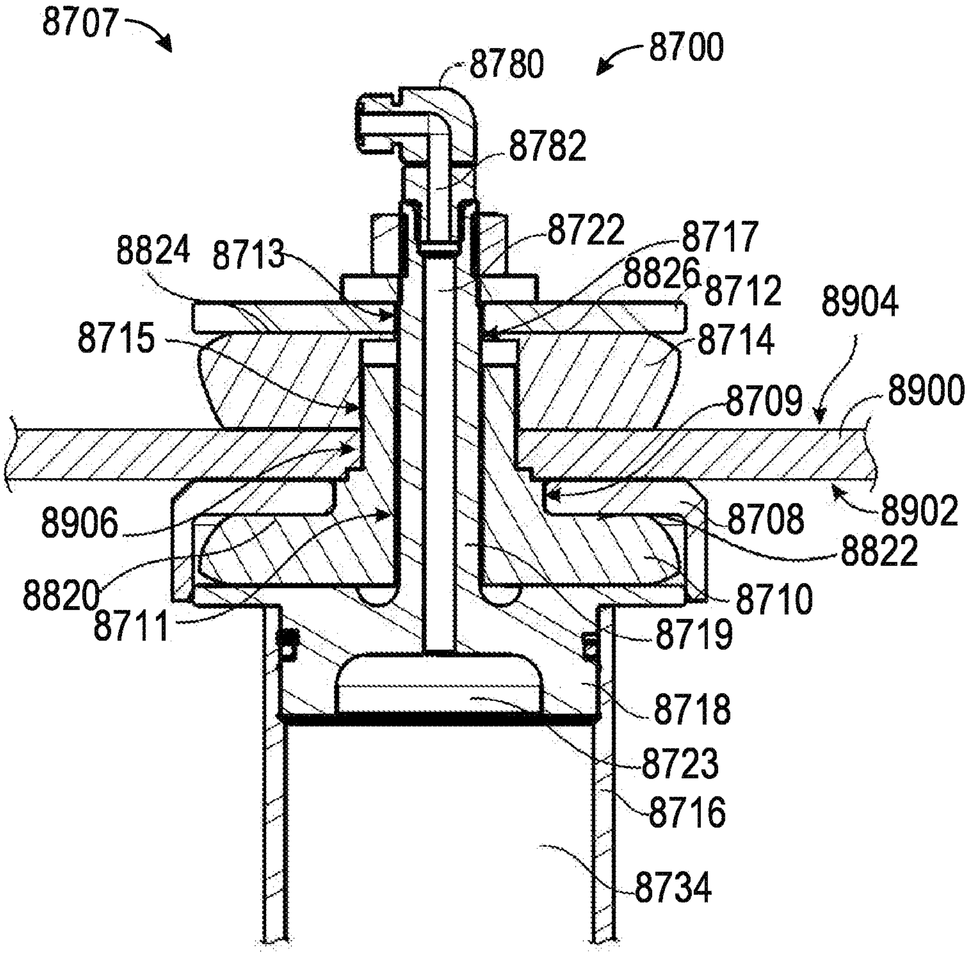

FIG. 179D is a detail view of an upper mount of the suspension element of FIG. 179C, according to an exemplary embodiment.

Figure 179E:
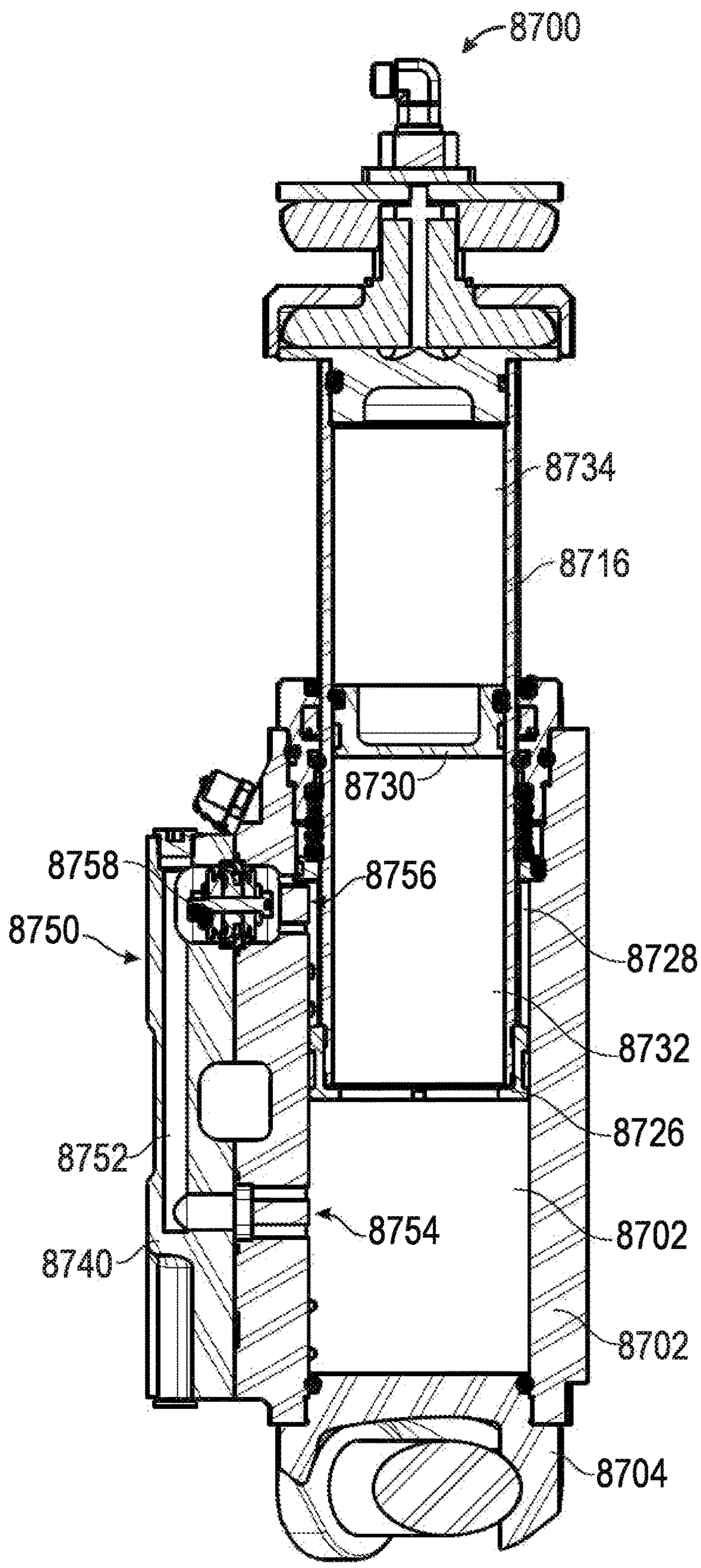

FIG. 179E is sectional view of the suspension element of FIG. 179A, according to an exemplary embodiment.

Figure 179F:
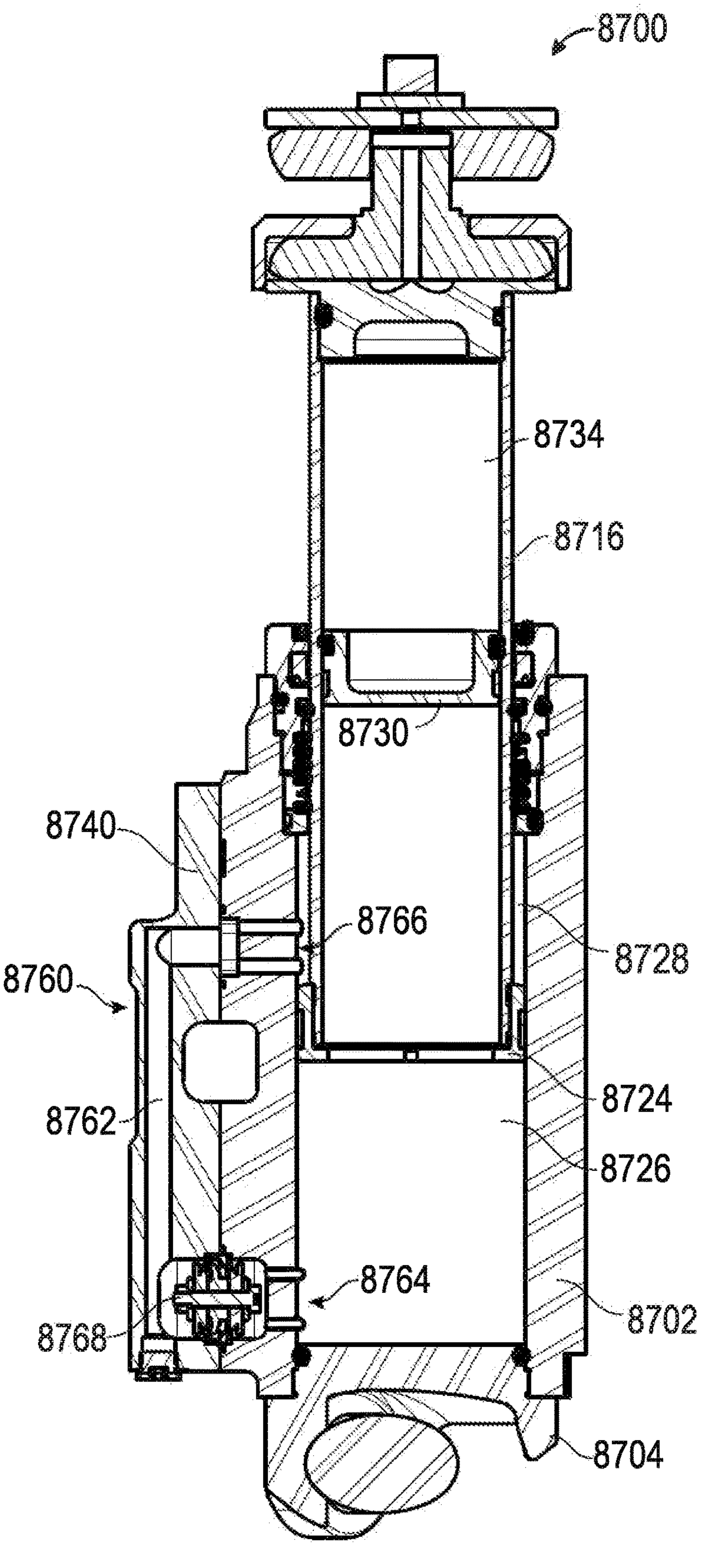

FIG. 179F is another sectional view of the suspension element of FIG. 179A, according to an exemplary embodiment.

Figure 180:
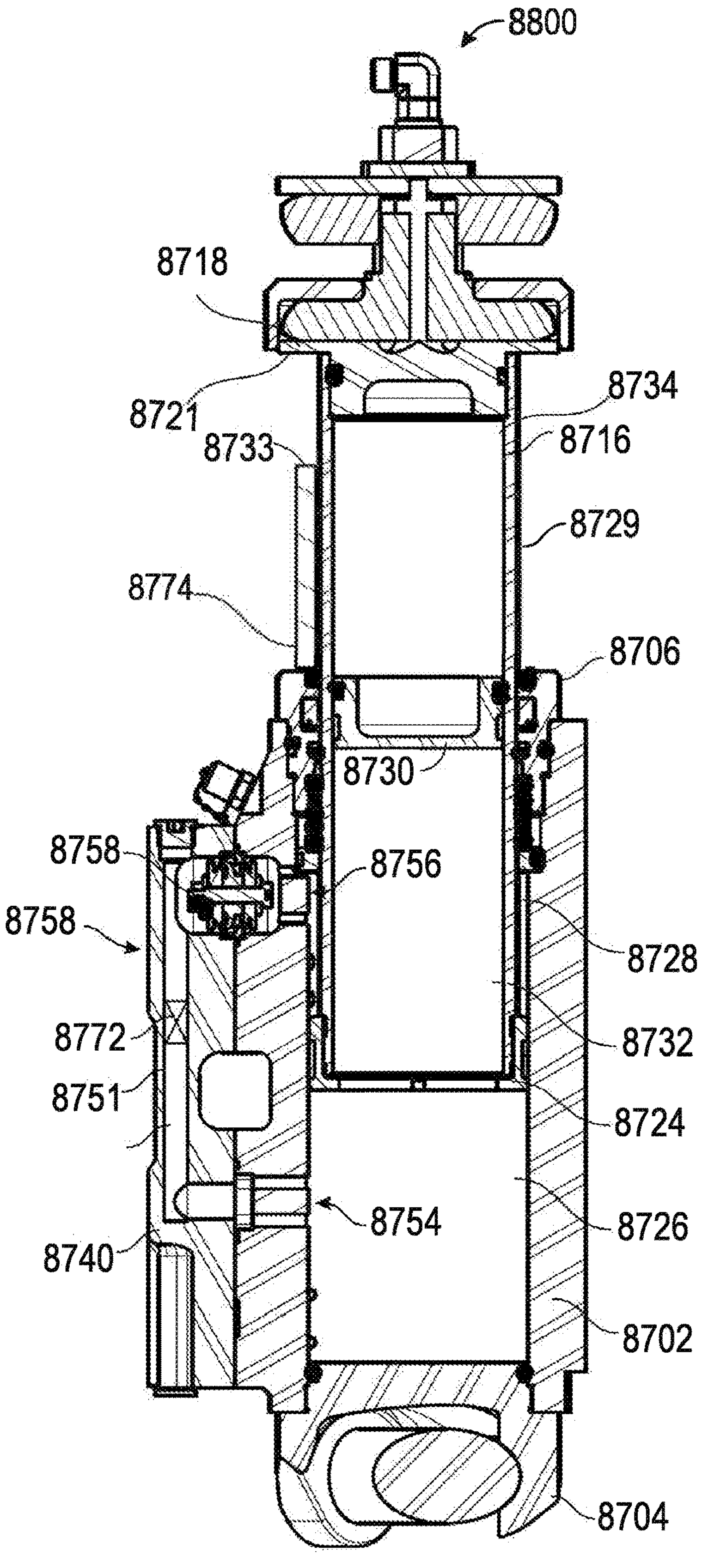

FIG. 180 is a sectional view of a suspension element, according to an exemplary embodiment.

Figure 181:
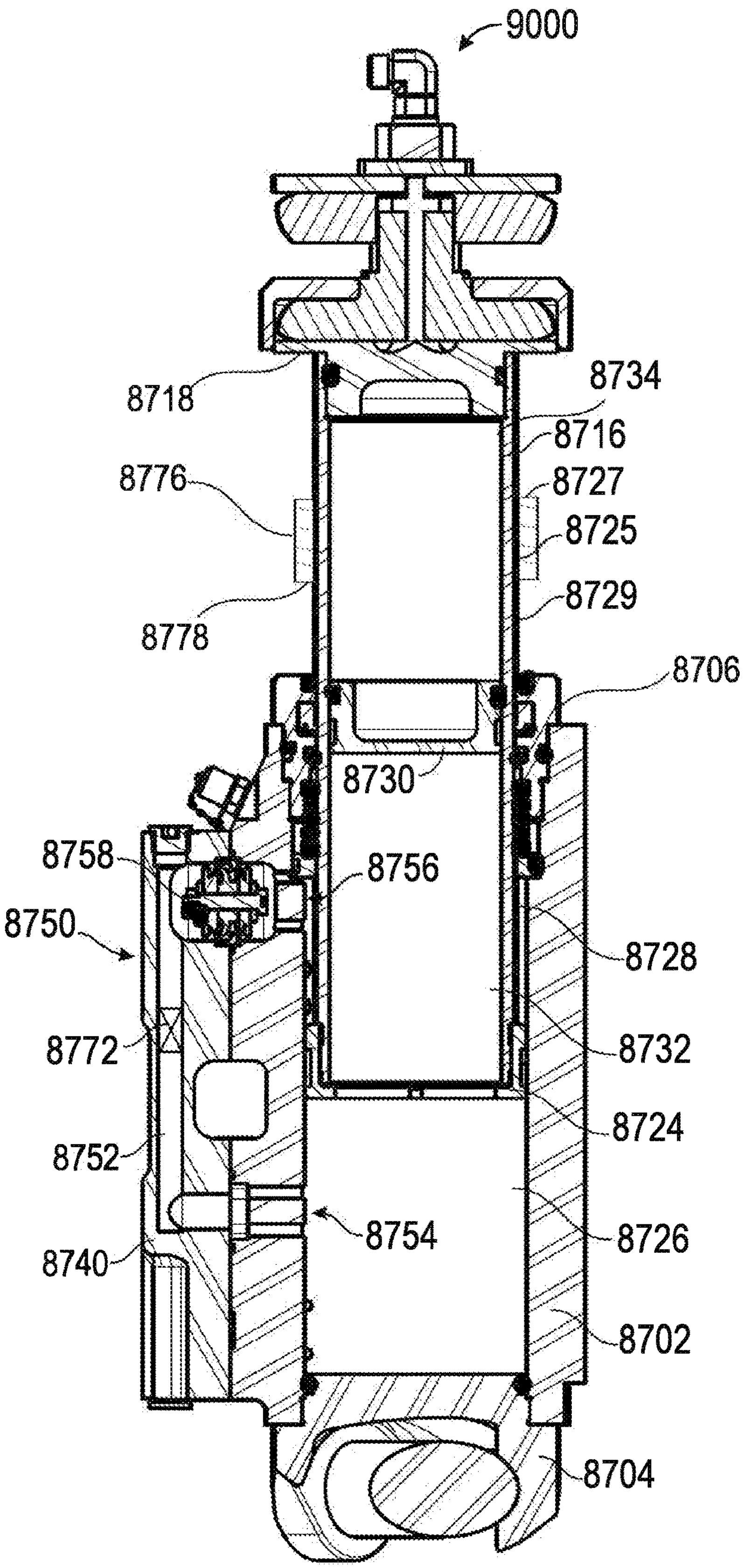

FIG. 181 is a sectional view of a suspension element, according to an exemplary embodiment.

Figure 182:
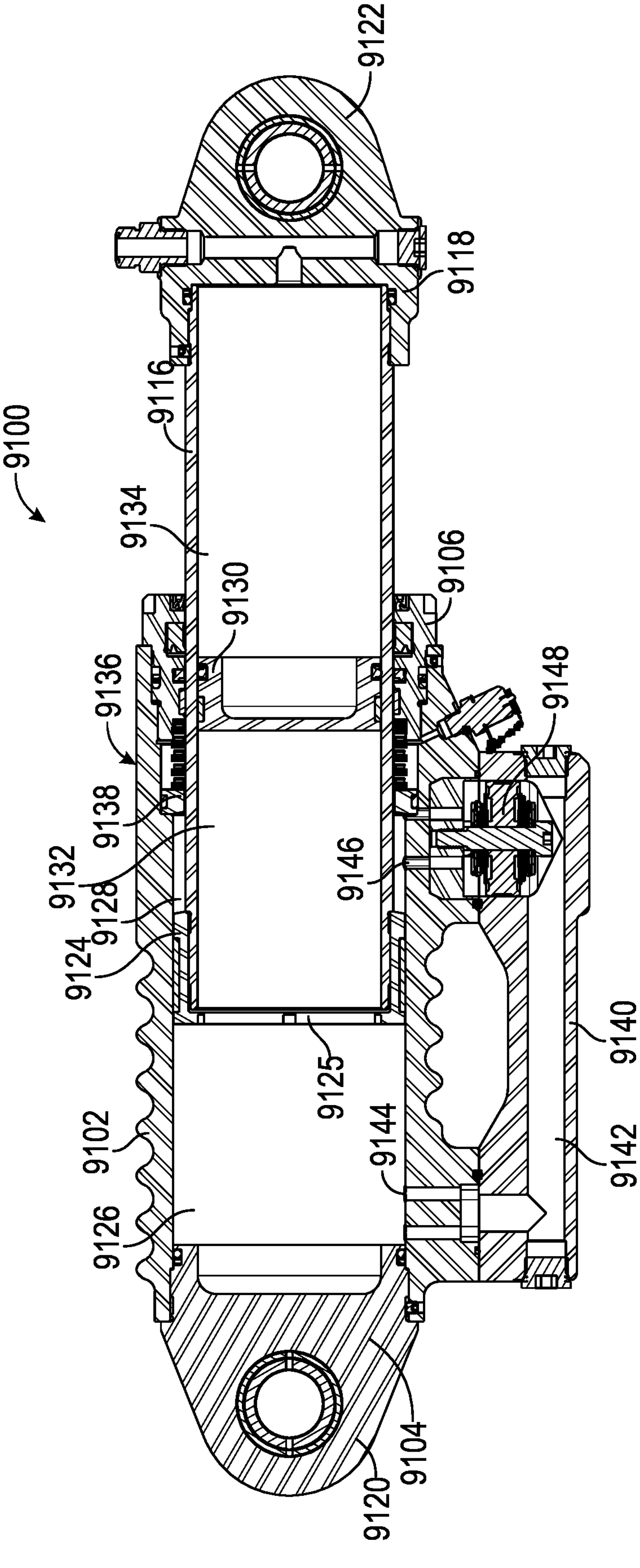

FIG. 182 is a sectional view of a suspension element, according to an exemplary embodiment.

Figure 183:
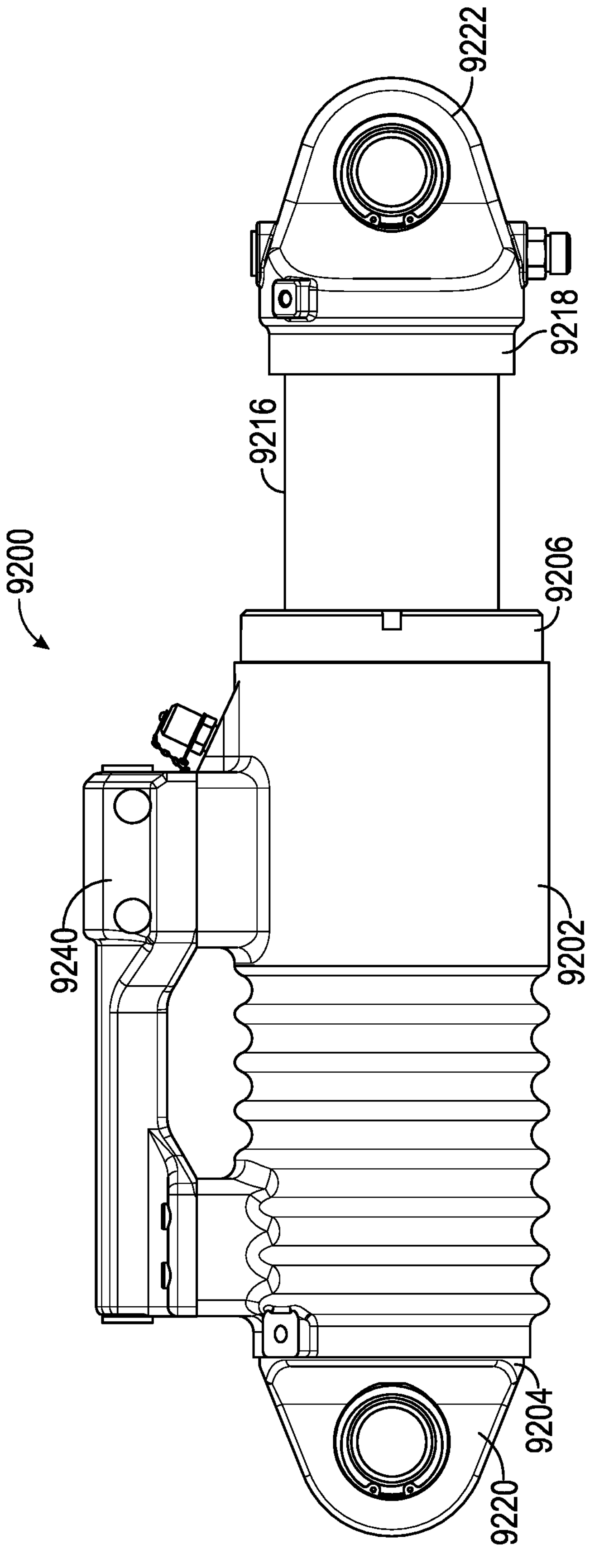

FIG. 183 is side view of a suspension element, according to an exemplary embodiment.

Figure 184:
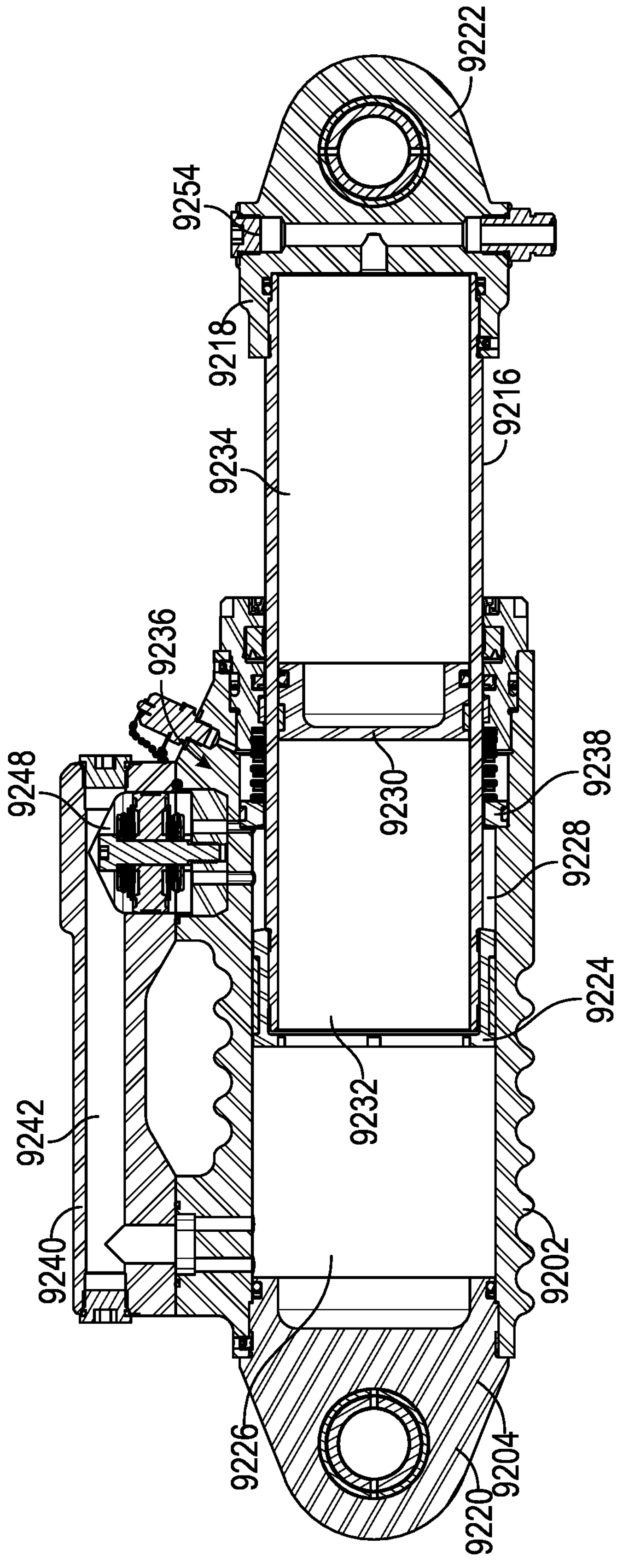

FIG. 184 is a sectional view of the suspension element of FIG. 183, according to an exemplary embodiment.

Figure 185:
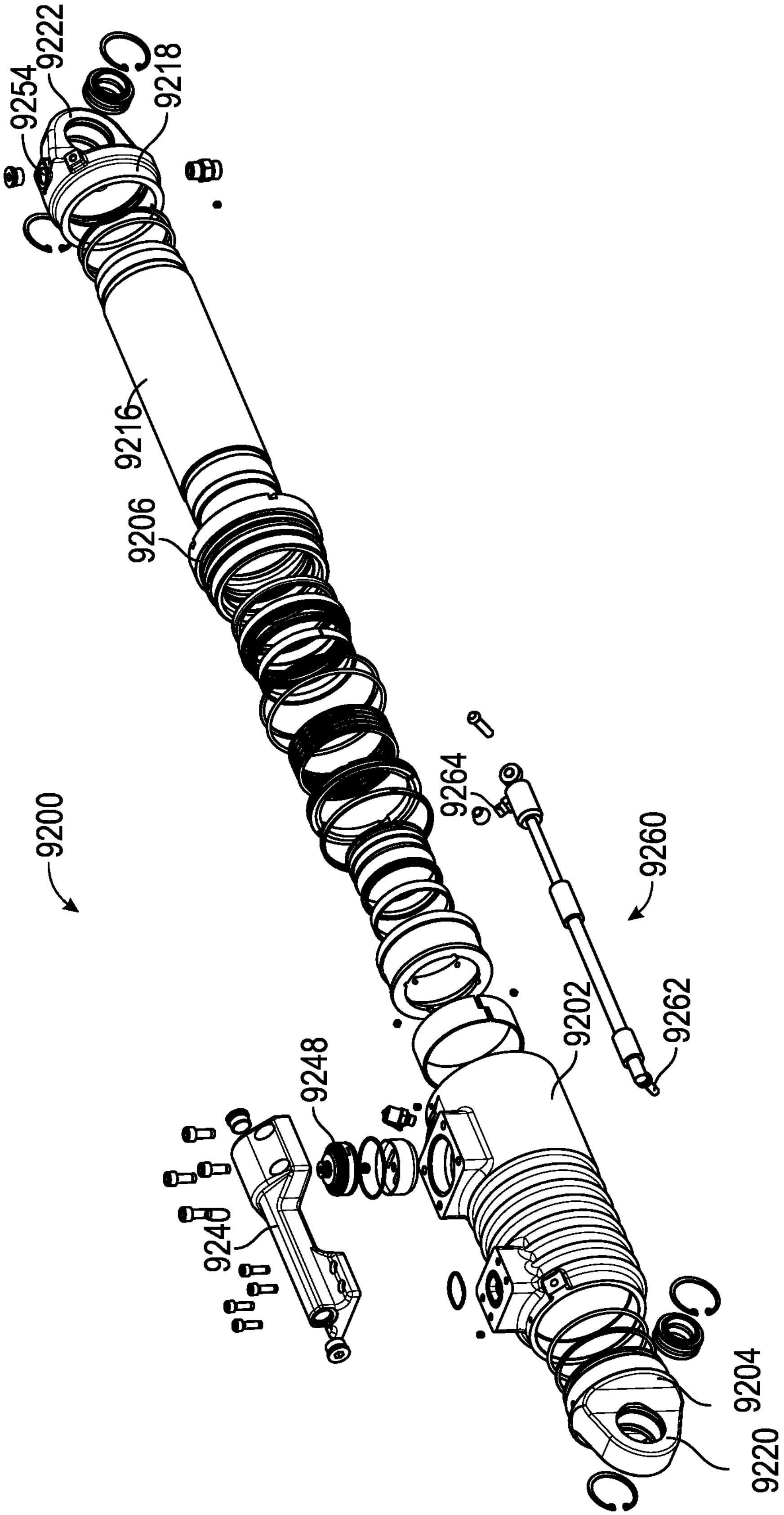

FIG. 185 is an exploded view of the suspension element of FIG. 183, according to an exemplary embodiment.

Figure 186A:
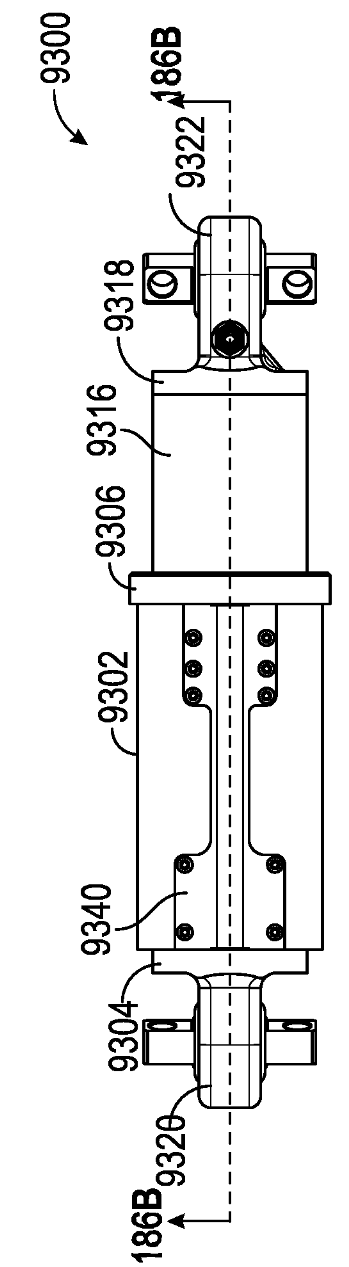

FIG. 186A is a side view of a suspension element, according to an exemplary embodiment.

Figure 186B:
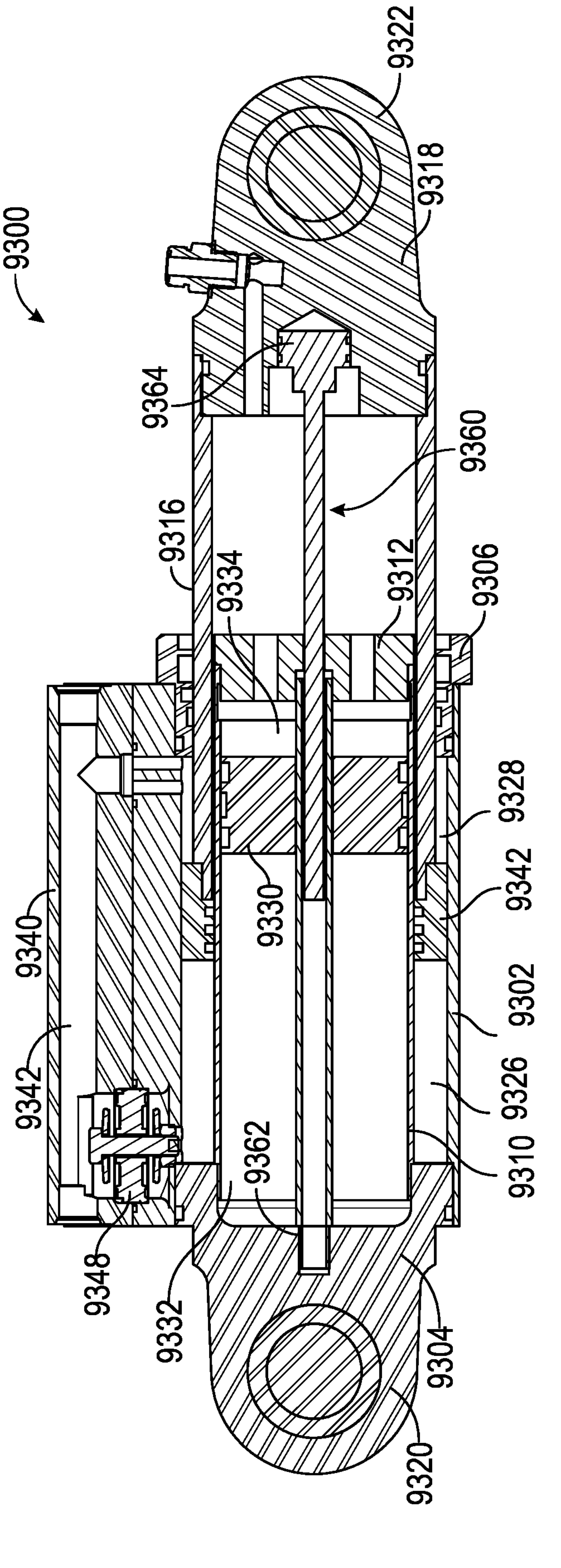

FIG. 186B a sectional view of the suspension element of FIG. 186A, according to an exemplary embodiment.

Figure 187A:
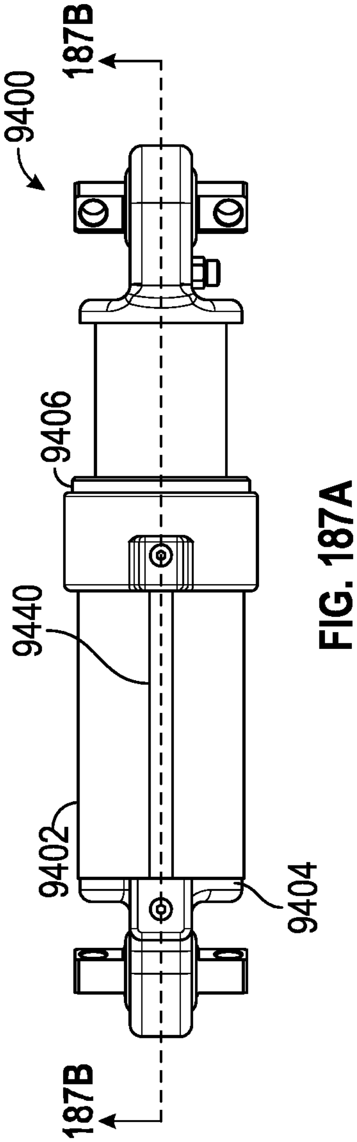

FIG. 187A is a side view of a suspension element, according to an exemplary embodiment.

Figure 187B:
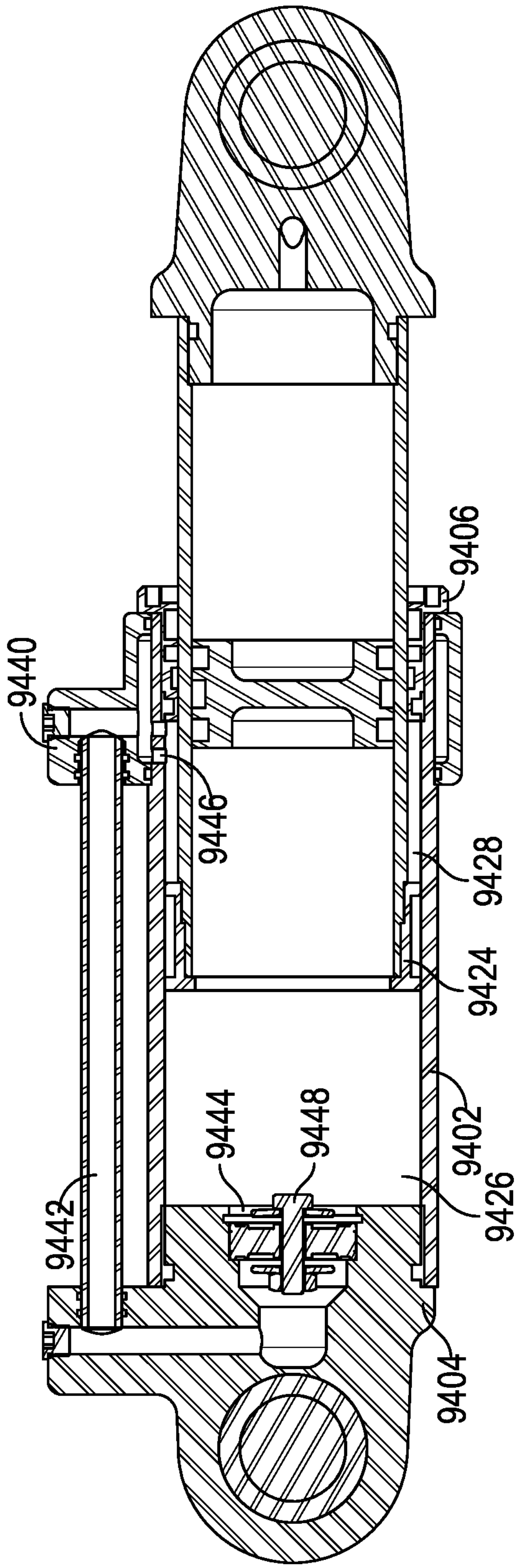

FIG. 187B is a sectional view of the suspension element of FIG. 187A, according to an exemplary embodiment.

Figure 188A:
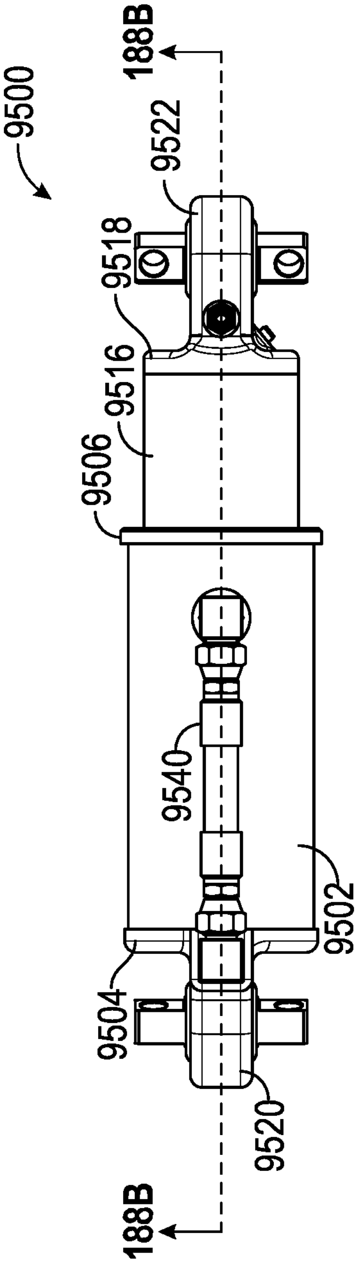

FIG. 188A is a side view of a suspension element, according to an exemplary embodiment.

Figure 188B:
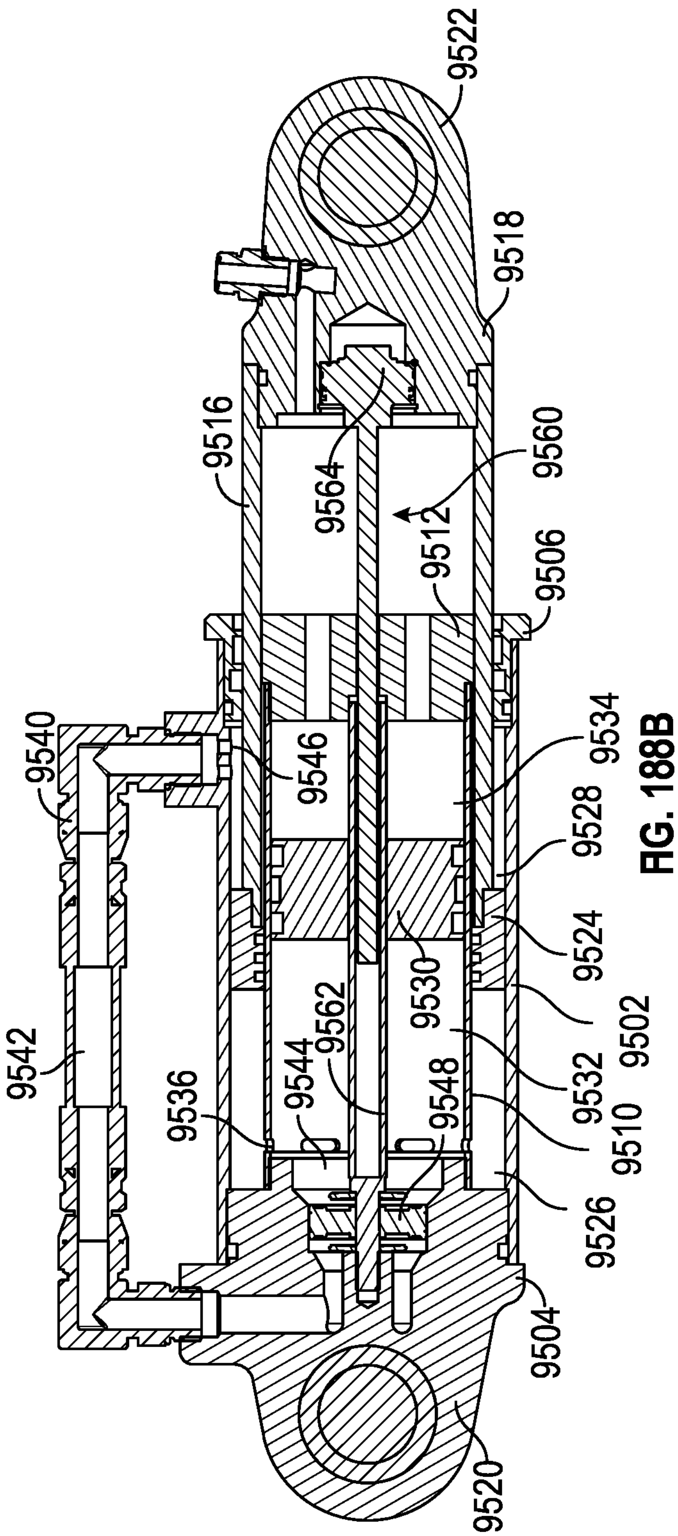

FIG. 188B is a sectional view of the suspension element of FIG. 188A, according to an exemplary embodiment.

Figure 189A:
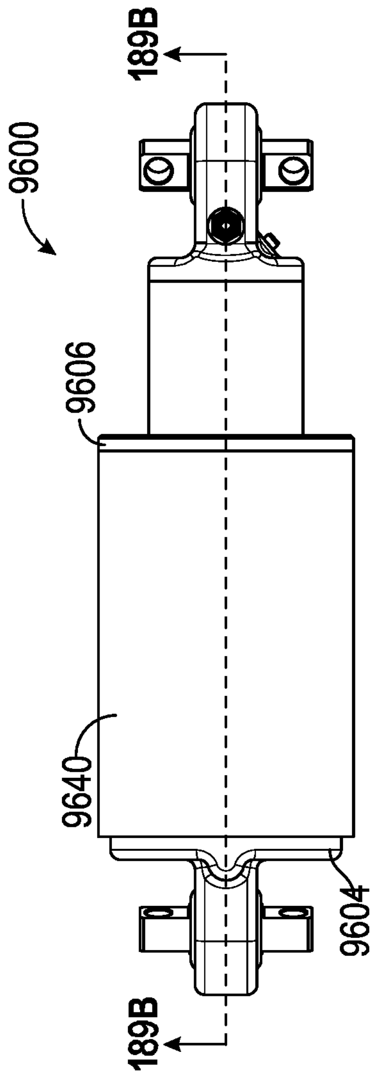

FIG. 189A is a side view of a suspension element, according to an exemplary embodiment.

Figure 189B:
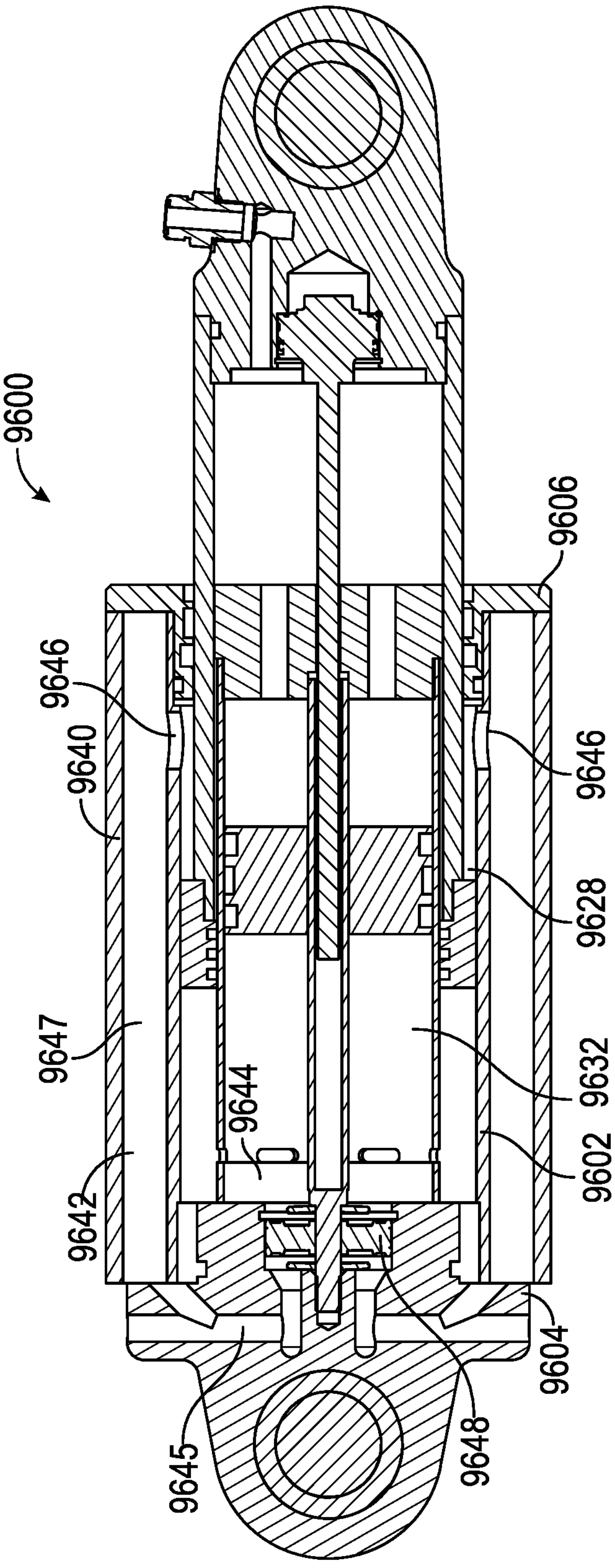

FIG. 189B is a sectional view of the suspension element of FIG. 189A, according to an exemplary embodiment.

Figure 190A:
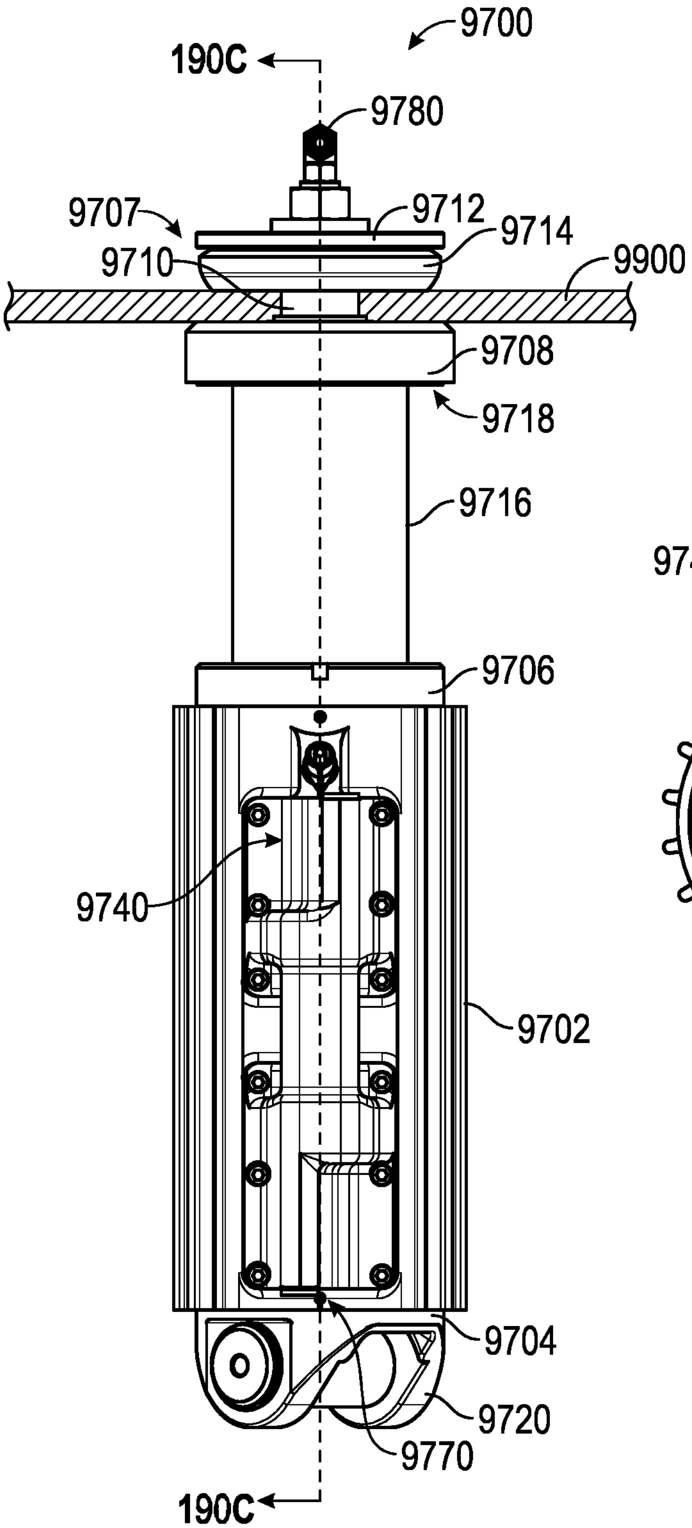

FIG. 190A is a side view of a suspension element, according to an exemplary embodiment.

Figure 190B:
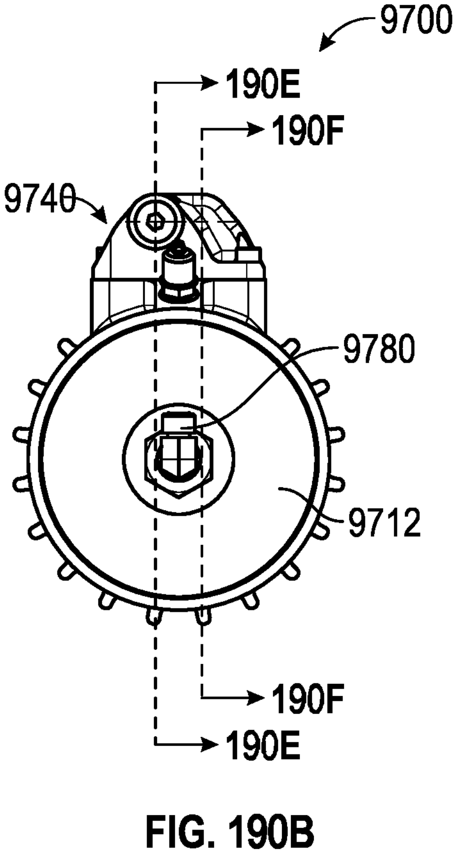

FIG. 190B is a top view of the suspension element of FIG. 190A, according to an exemplary embodiment.

Figure 190C:
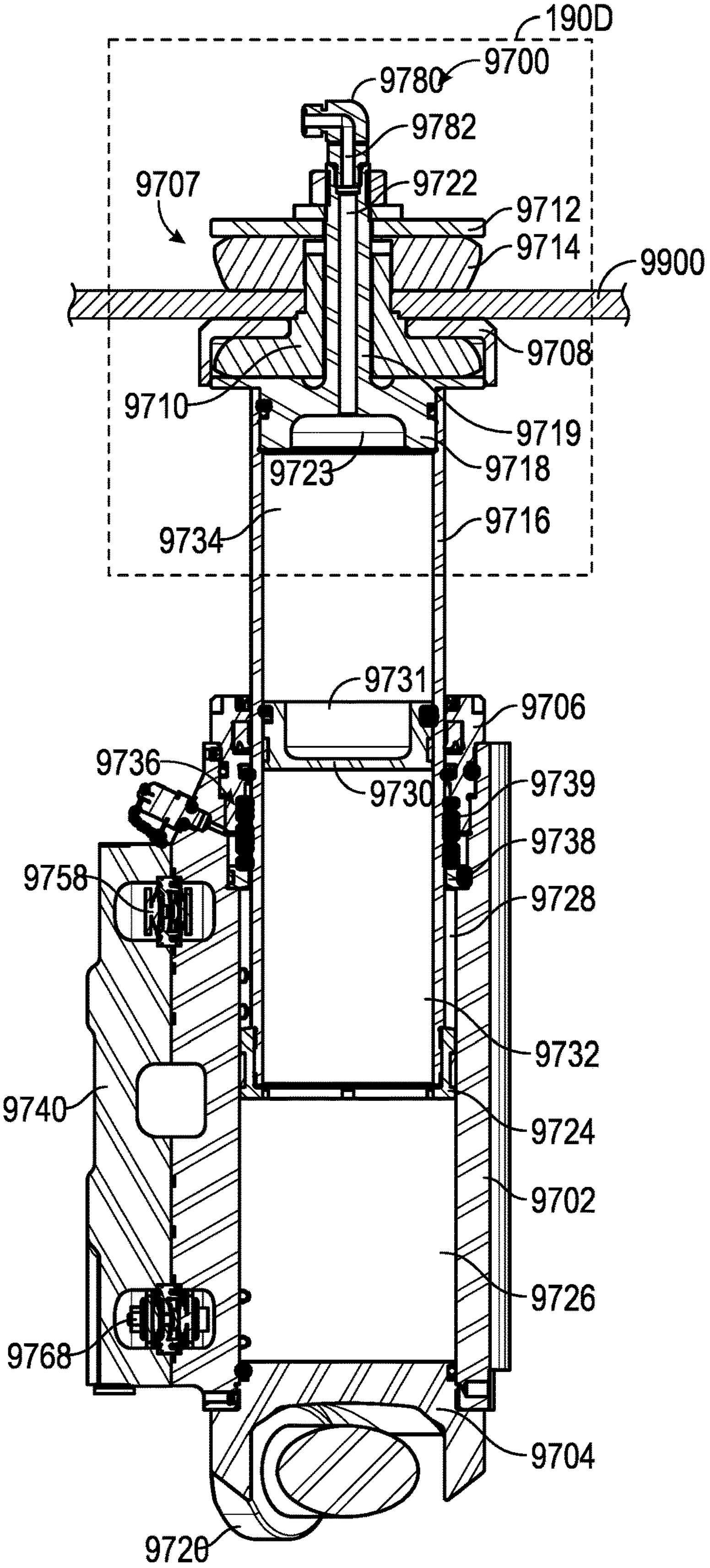

FIG. 190C is a sectional view of the suspension element of FIG. 190A, according to an exemplary embodiment.

Figure 190D:
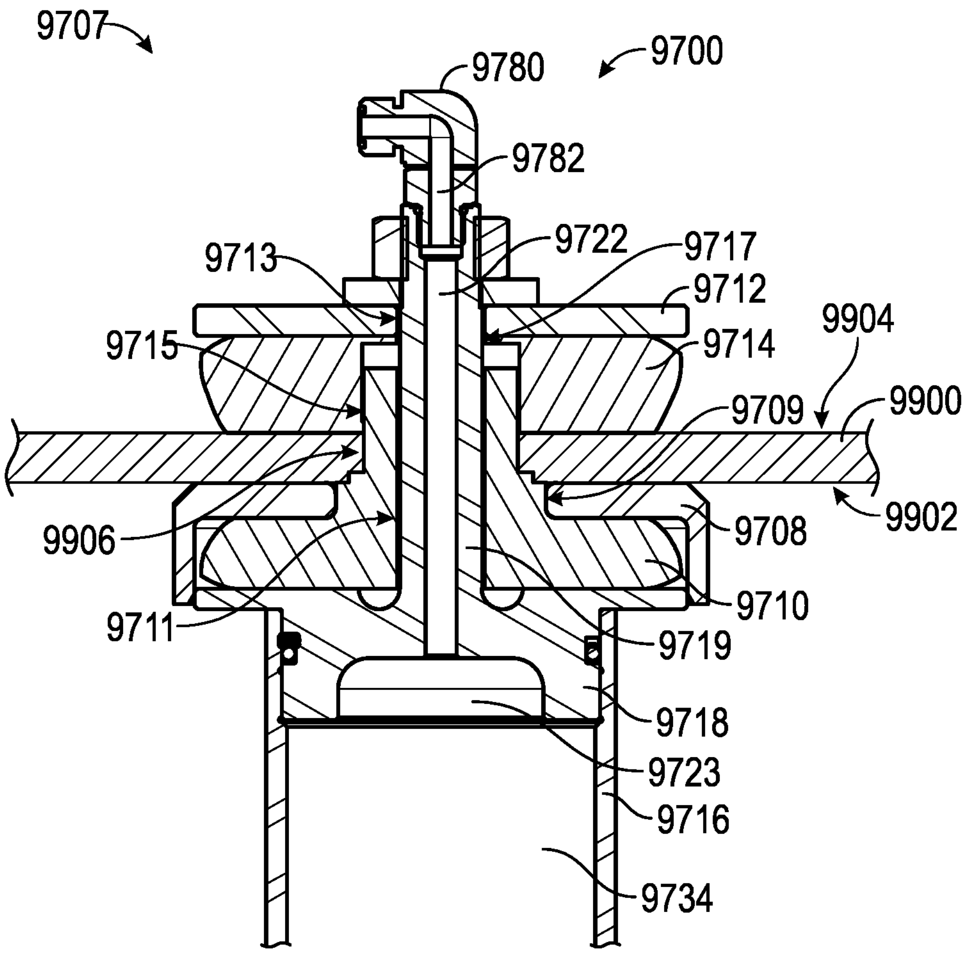

FIG. 190D is a detail view of an upper mount of the suspension element of FIG. 190C, according to an exemplary embodiment.

Figure 190E:
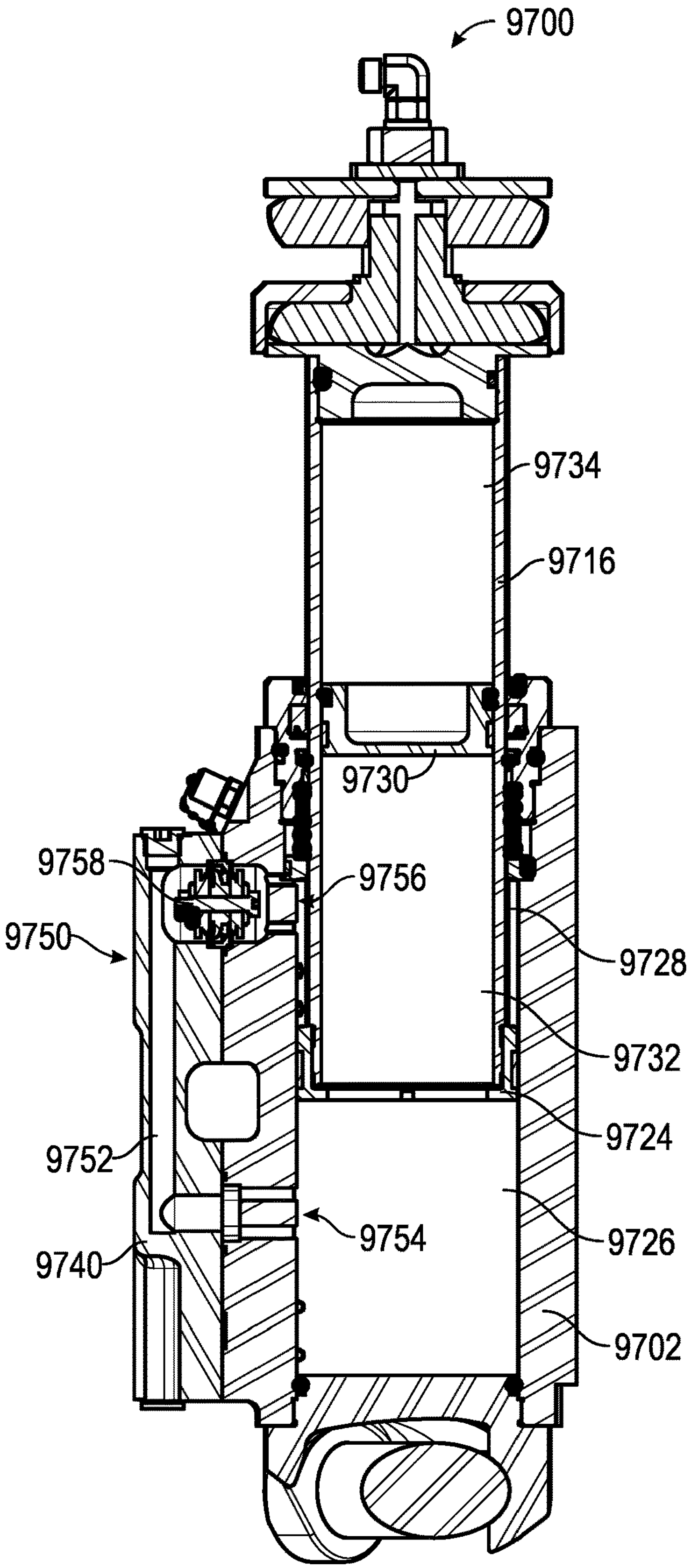

FIG. 190E is sectional view of the suspension element of FIG. 190B, according to an exemplary embodiment.

Figure 190F:
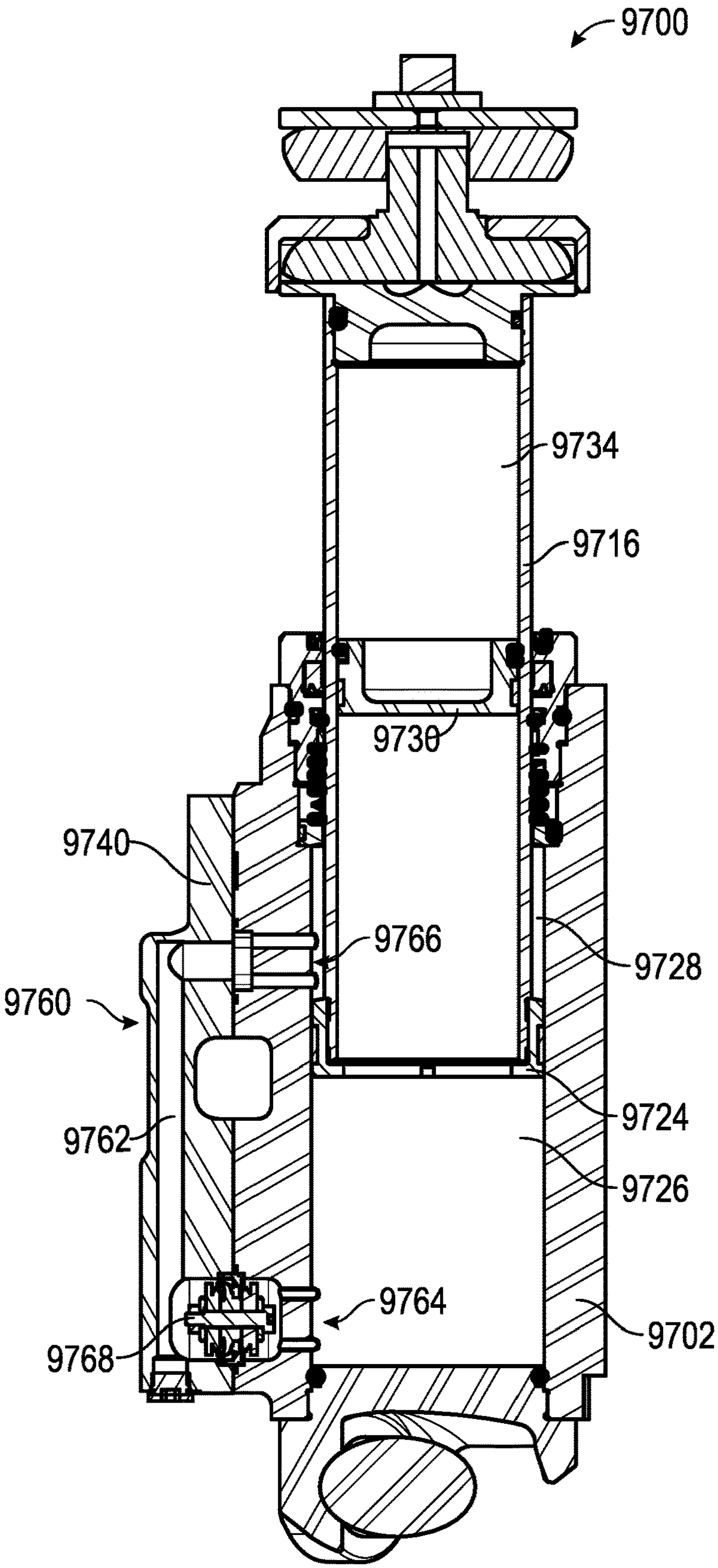

FIG. 190F is another sectional view of the suspension element of FIG. 190B, according to an exemplary embodiment.

Figure 191A:
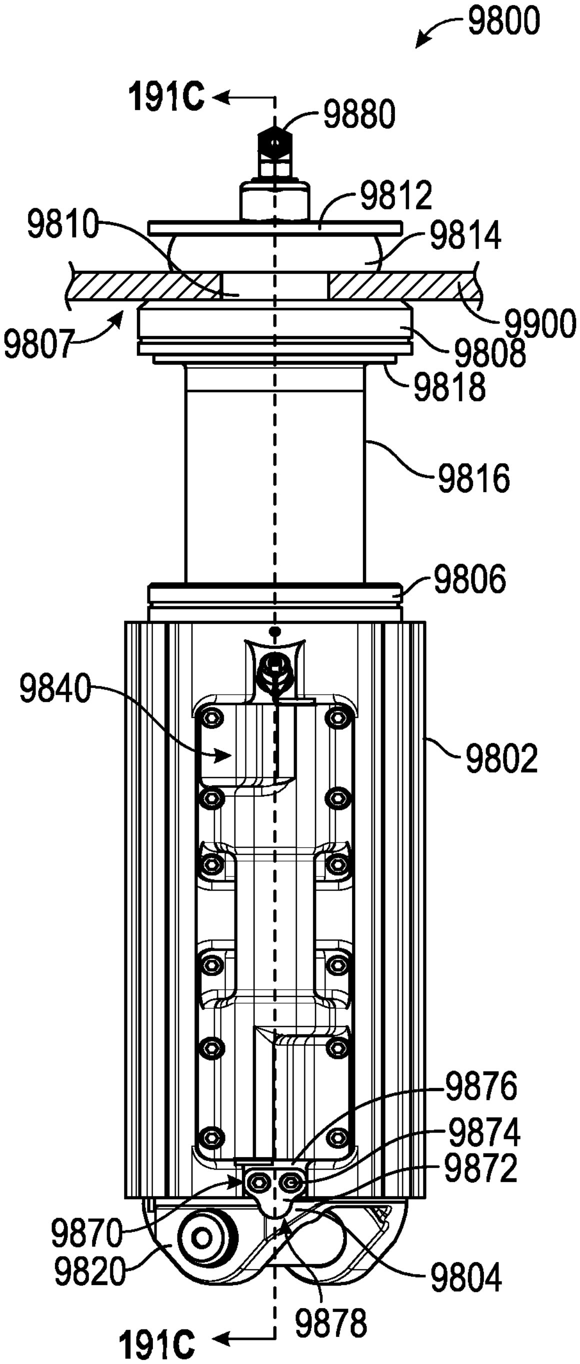

FIG. 191A is a side view of a suspension element, according to an exemplary embodiment.

Figure 191B:
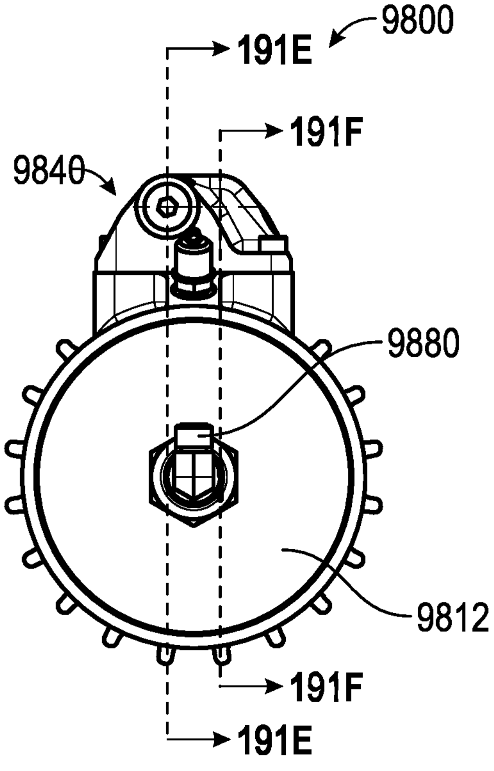

FIG. 191B is a top view of the suspension element of FIG. 191A, according to an exemplary embodiment.

Figure 191C:
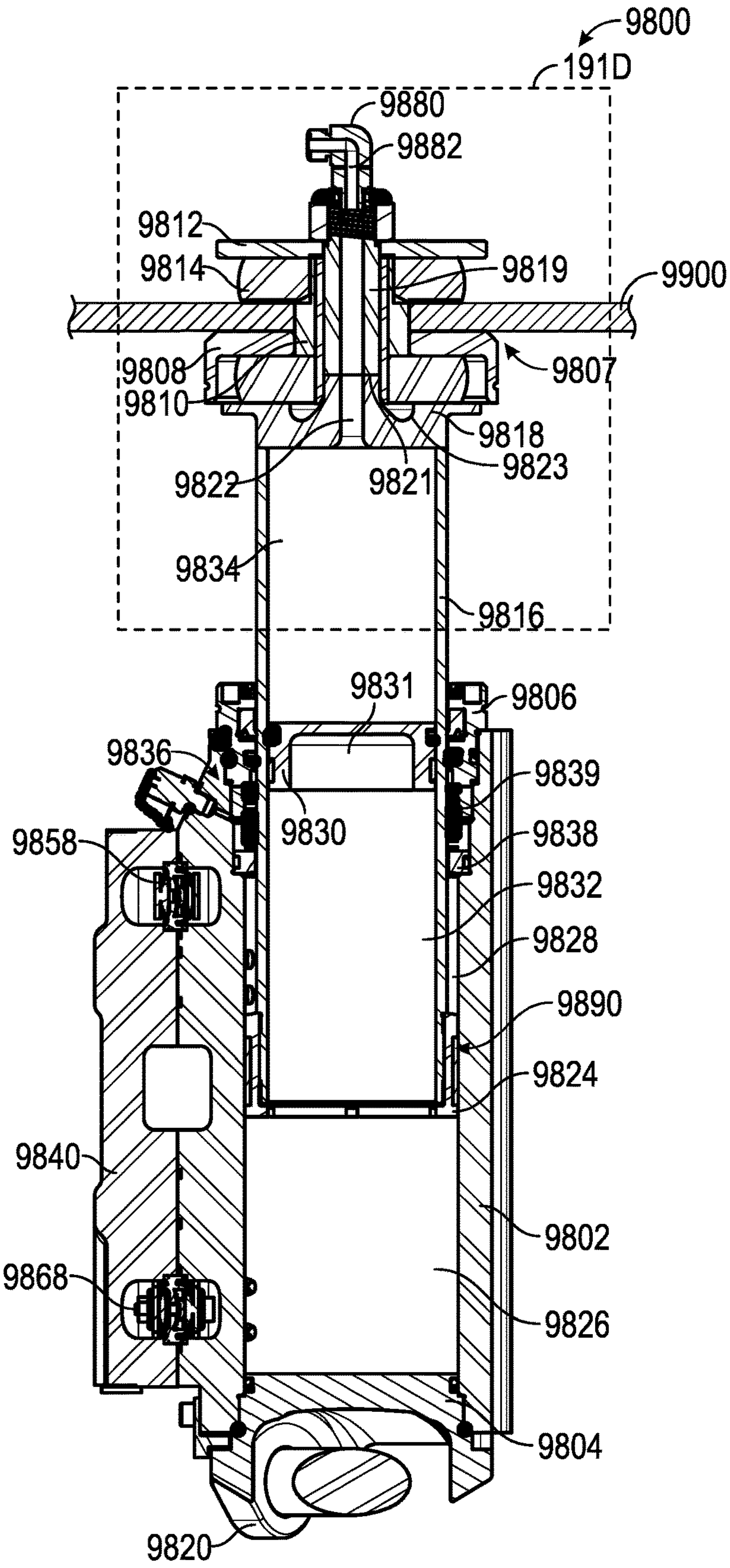

FIG. 191C is a sectional view of the suspension element of FIG. 191A, according to an exemplary embodiment.

Figure 191D:
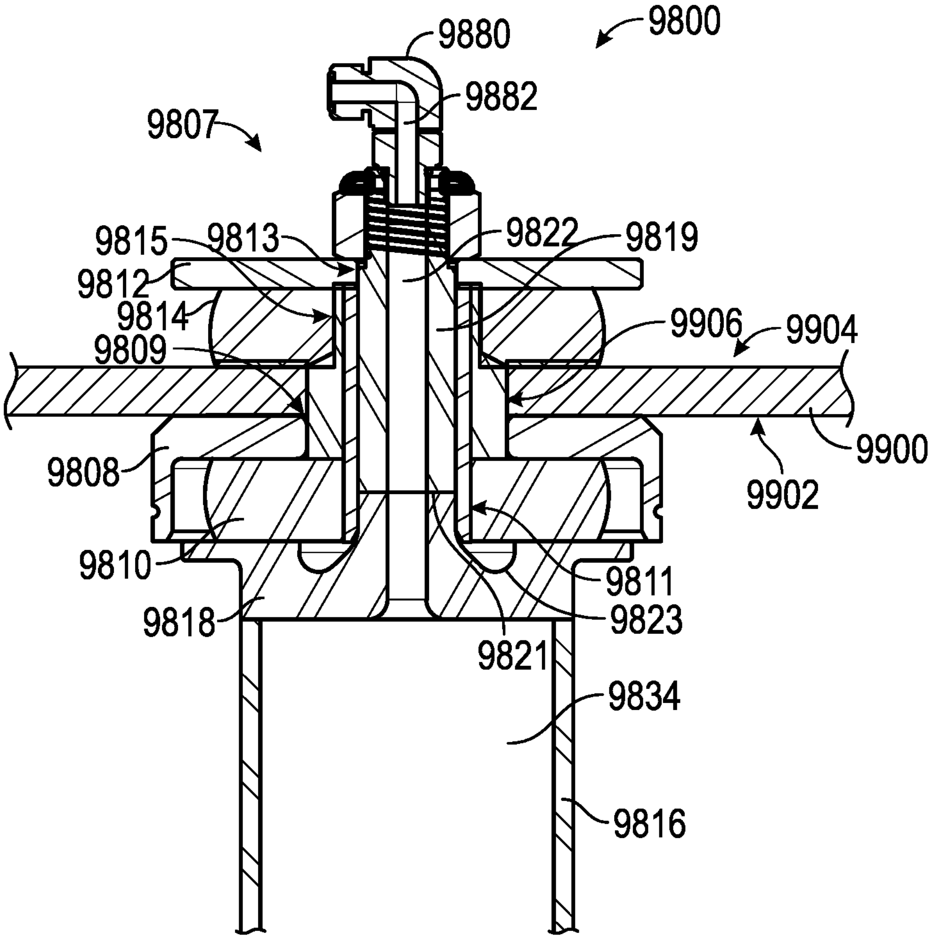

FIG. 191D is a detail view of an upper mount of the suspension element of FIG. 191C, according to an exemplary embodiment.

Figure 191E:
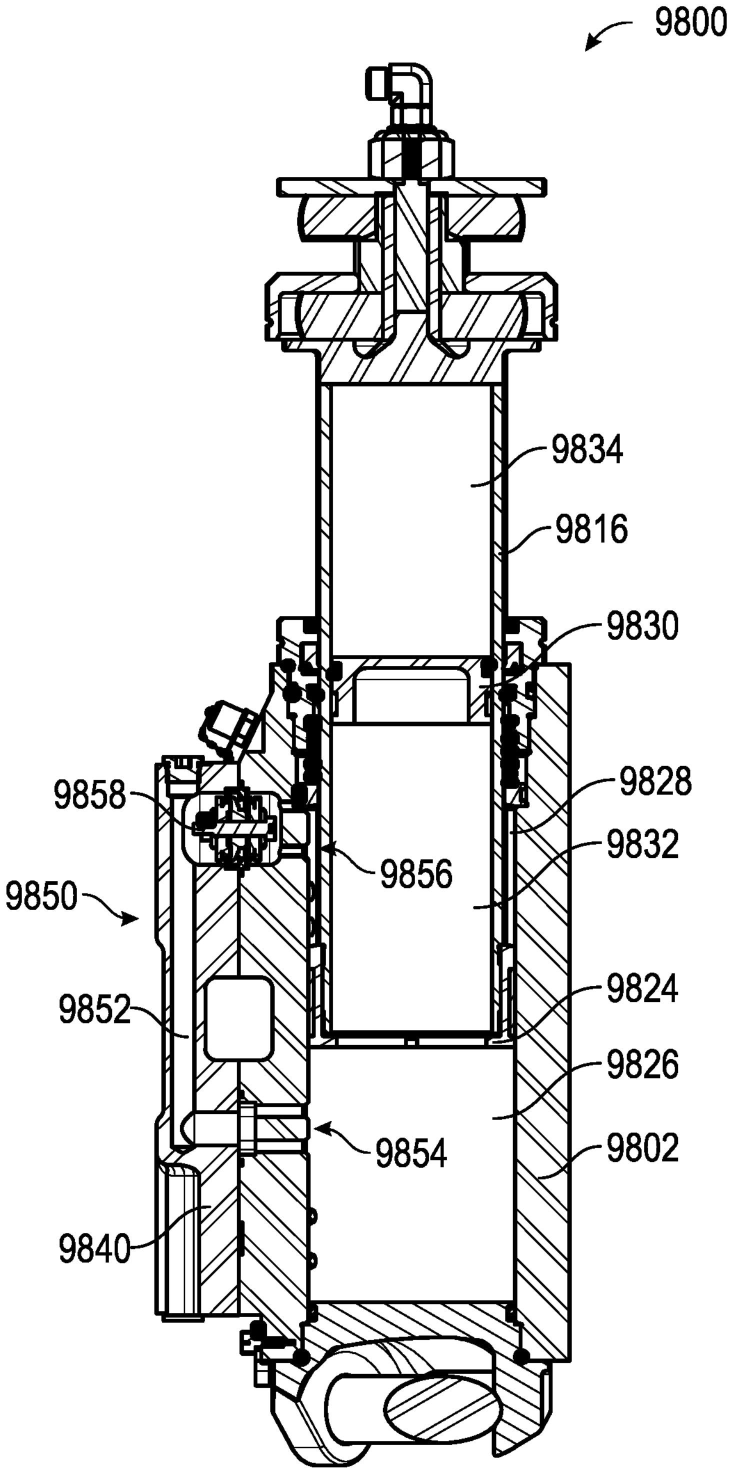

FIG. 191E is sectional view of the suspension element of FIG. 191B, according to an exemplary embodiment.

Figure 191F:
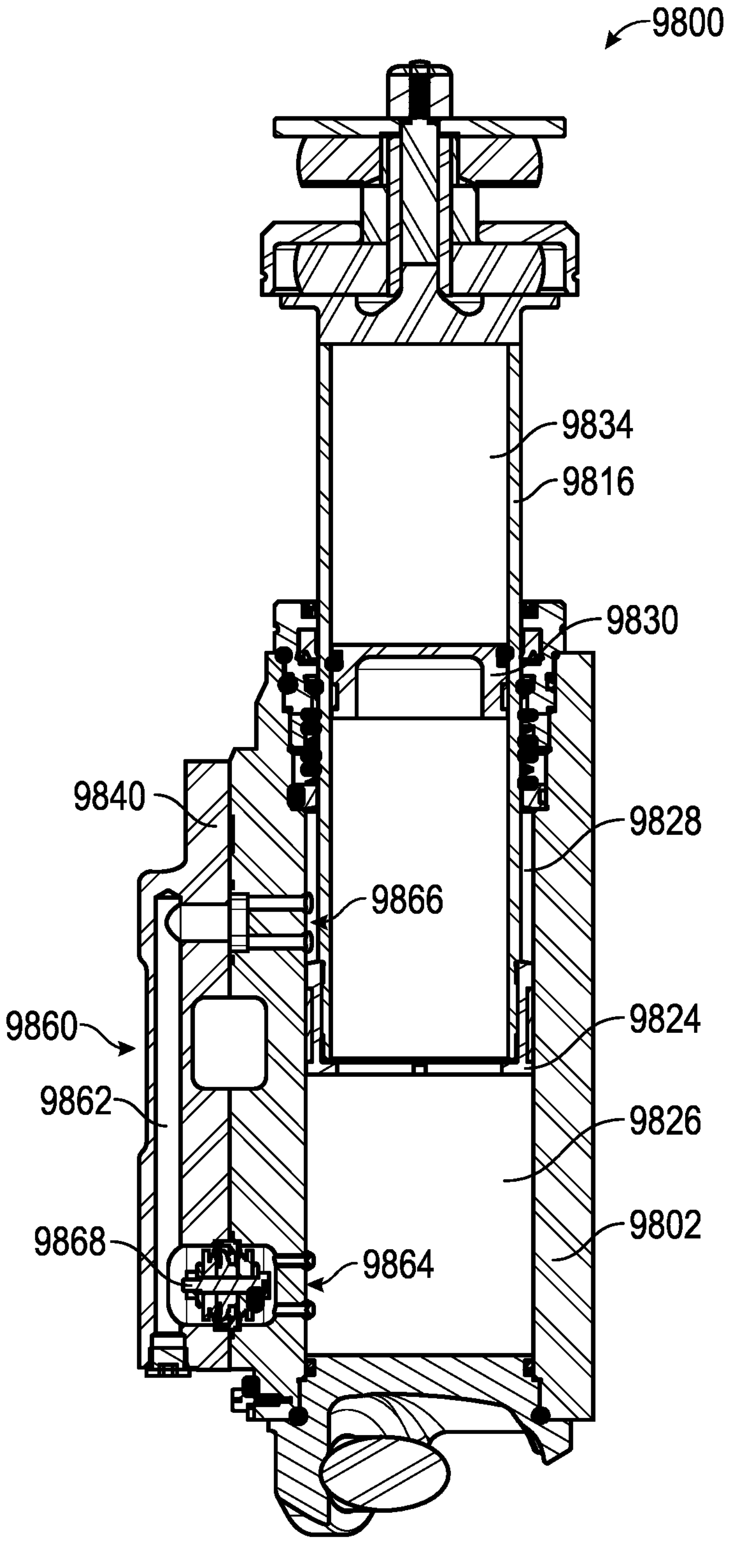

FIG. 191F is another sectional view of the suspension element of FIG. 191B, according to an exemplary embodiment.

Figure 192:
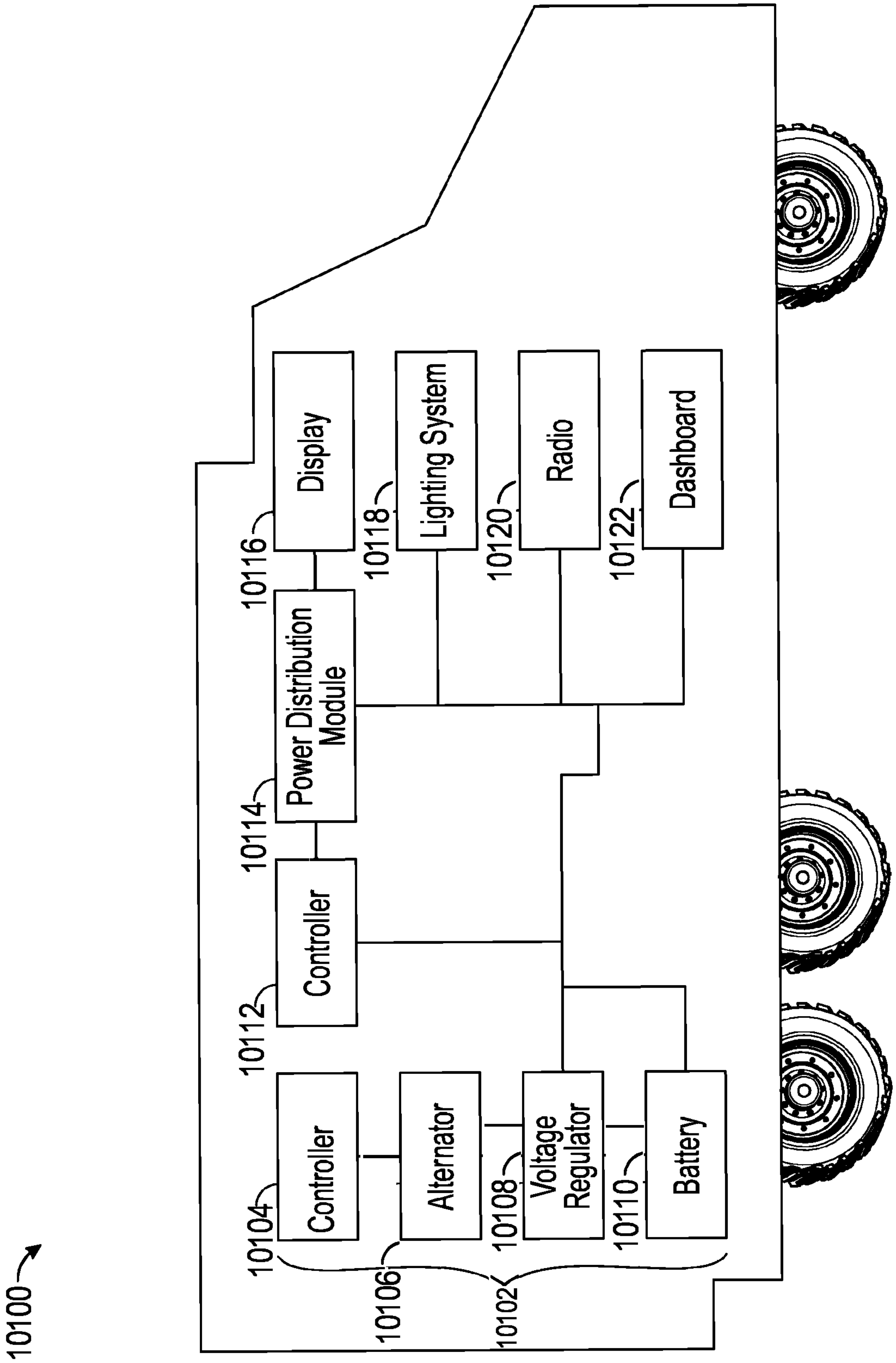

FIG. 192 is a block diagram of a vehicle including various features described herein, according to an exemplary embodiment.

Figure 193:
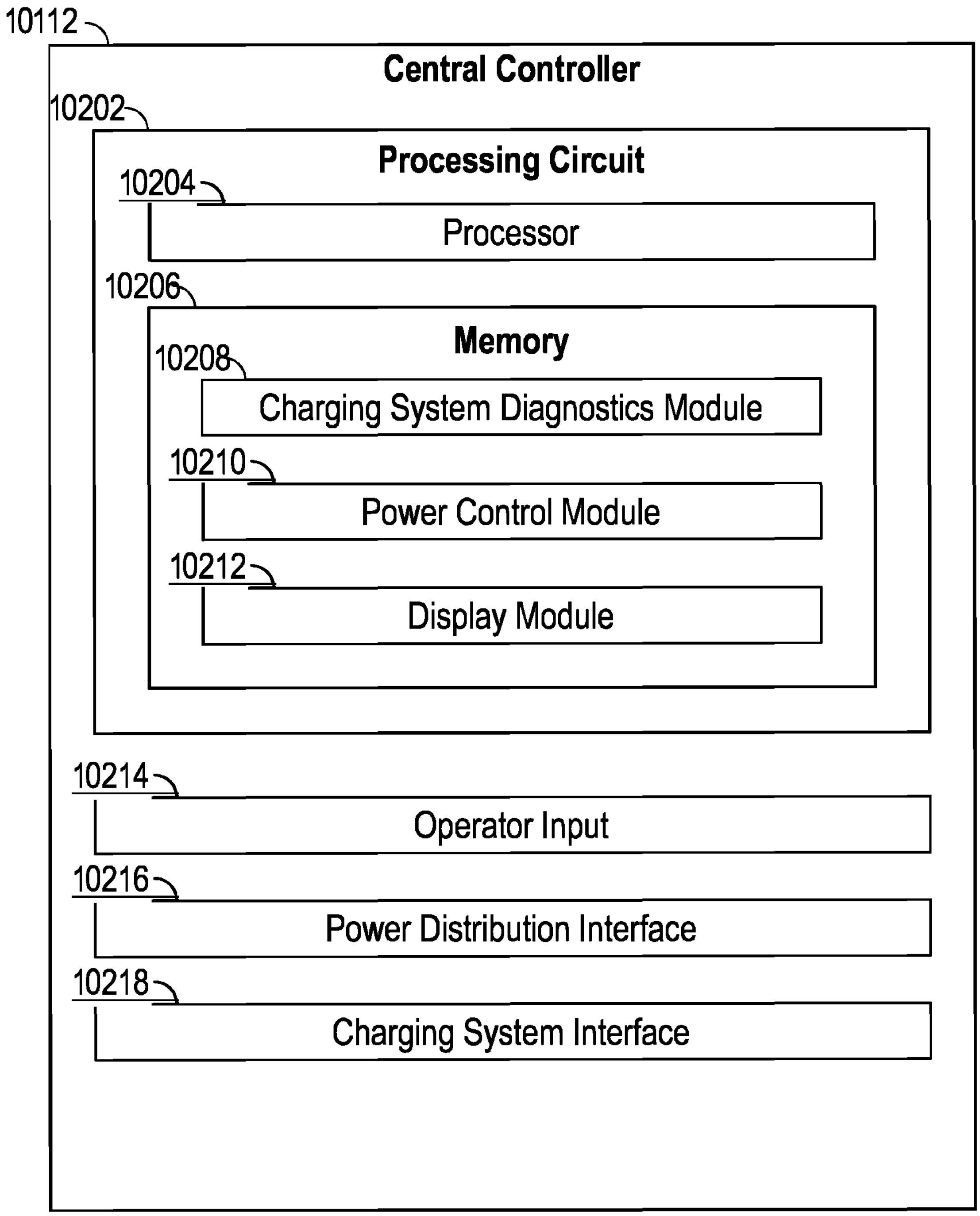

FIG. 193 is a block diagram of a controller for a vehicle, according to an exemplary embodiment.

Figure 194:
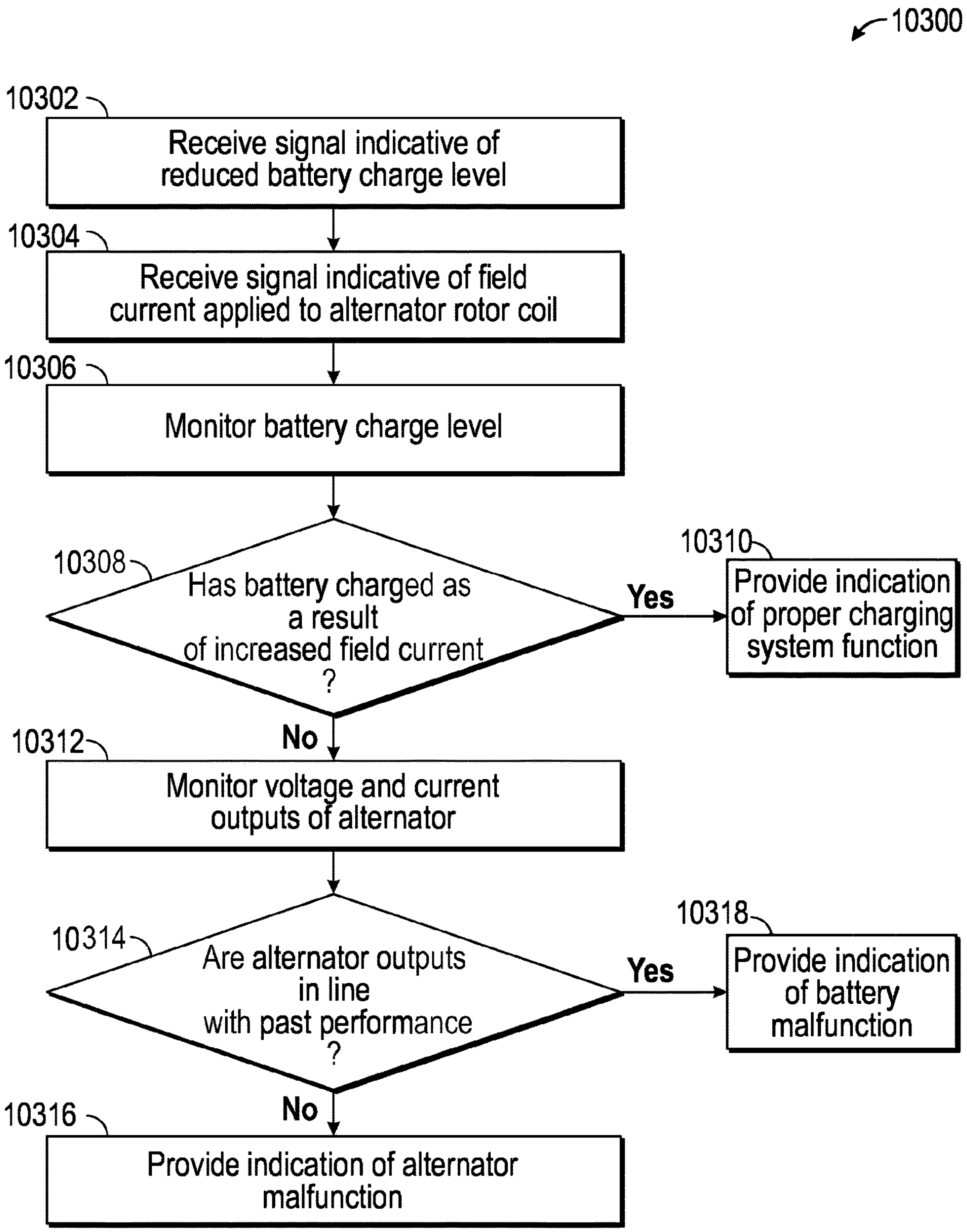

FIG. 194 is a flow chart of a process for detecting a malfunction in a charging system of a vehicle, according to an exemplary embodiment.

Figure 195:
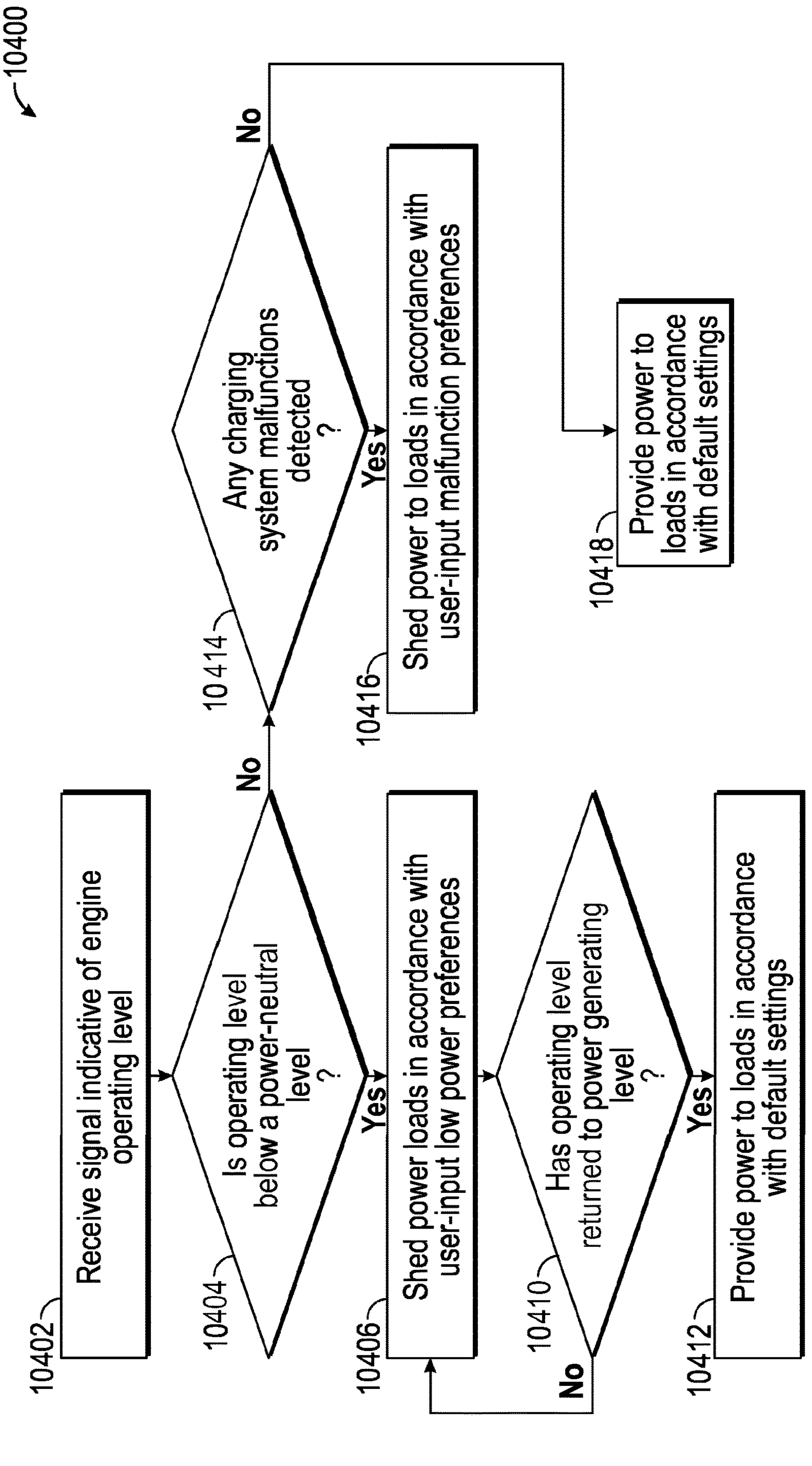

FIG. 195 is a flow chart of a process for selectively shedding electrical loads from a charging system of a vehicle, according to an exemplary embodiment.

Figure 196:
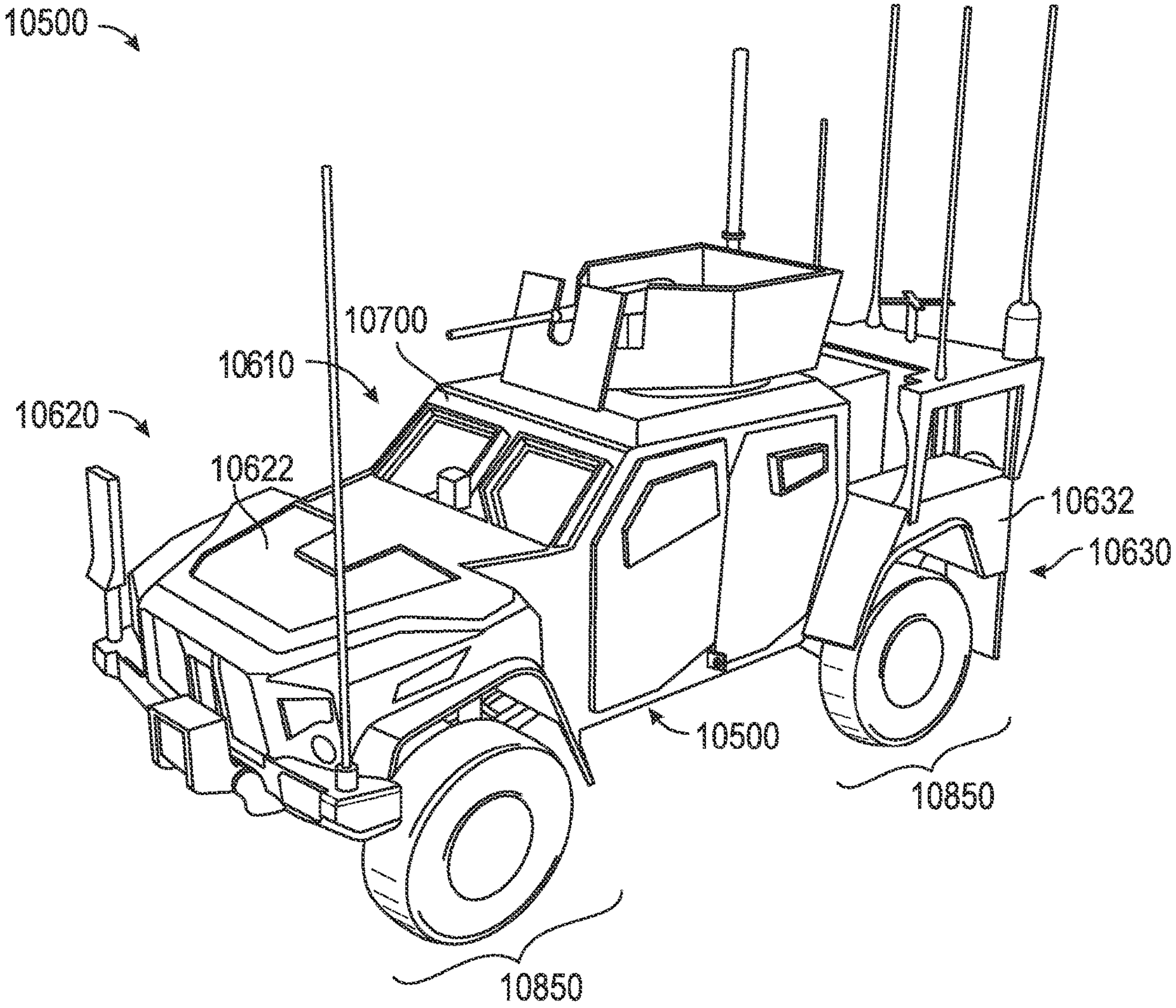

FIG. 196 is a perspective view of a vehicle, according to an exemplary embodiment.

Figure 197:
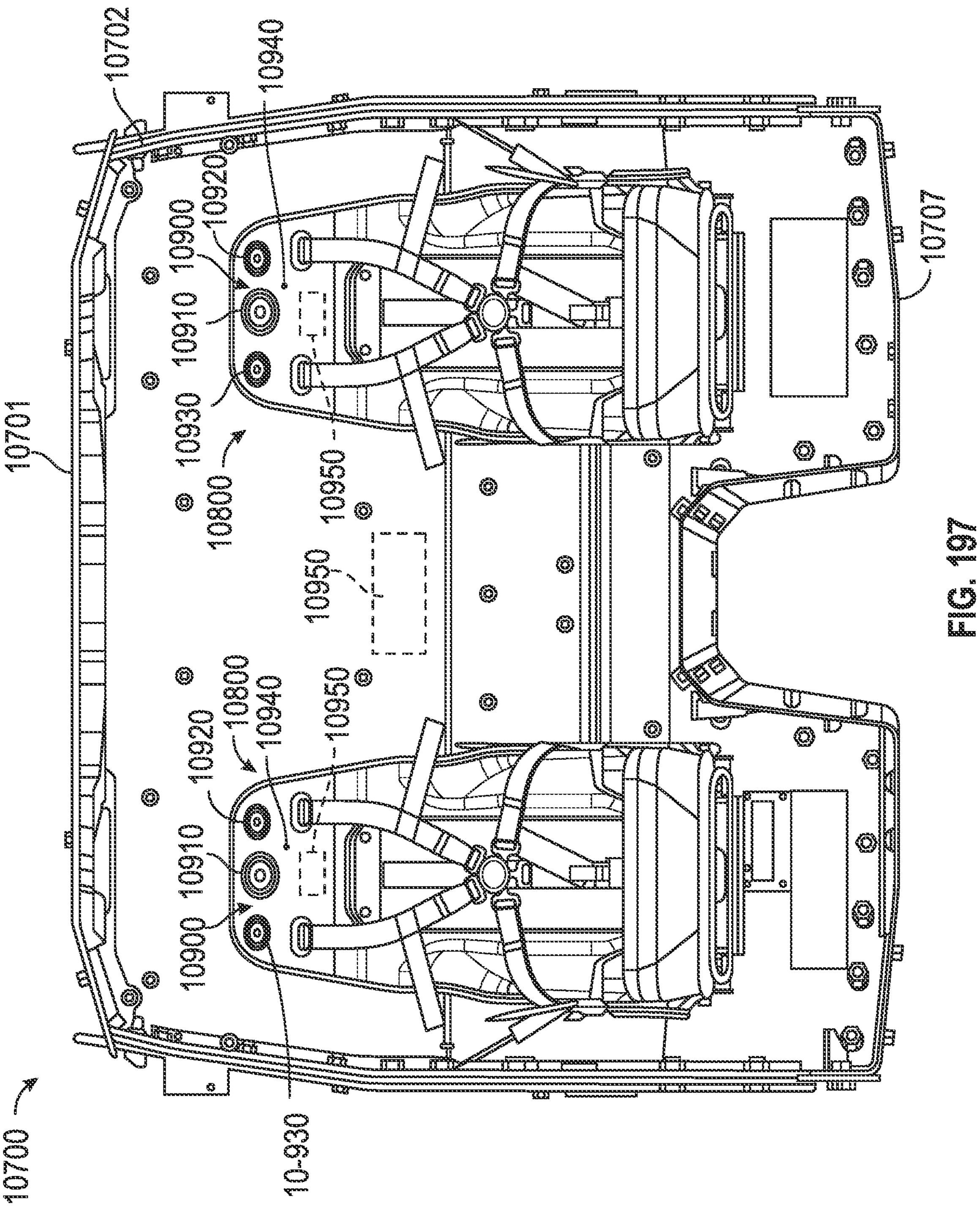

FIG. 197 is a schematic sectional view of a passenger capsule of the vehicle of FIG. 196 having a sound suppression system, according to an exemplary embodiment.

Figure 199:
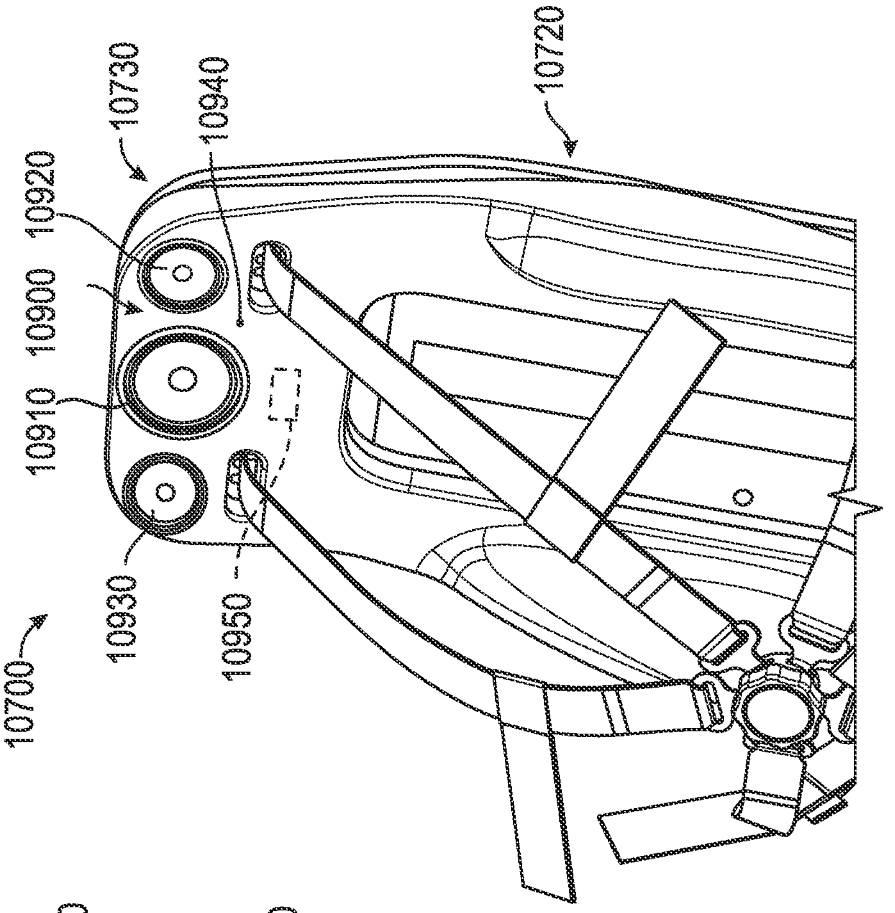
Figure 198:
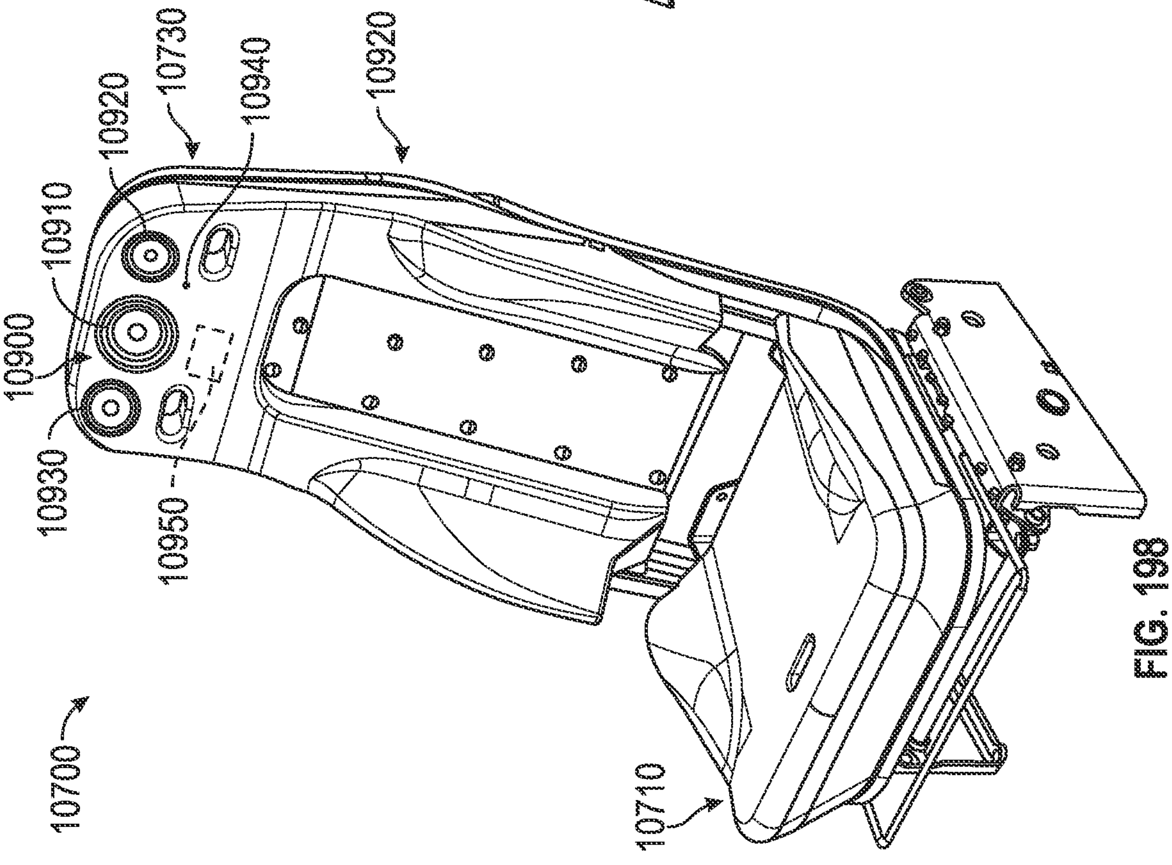

FIGS. 198 and 199 are various views of a seat associated with the passenger capsule of FIG. 197, according to an exemplary embodiment.

Figure 200:
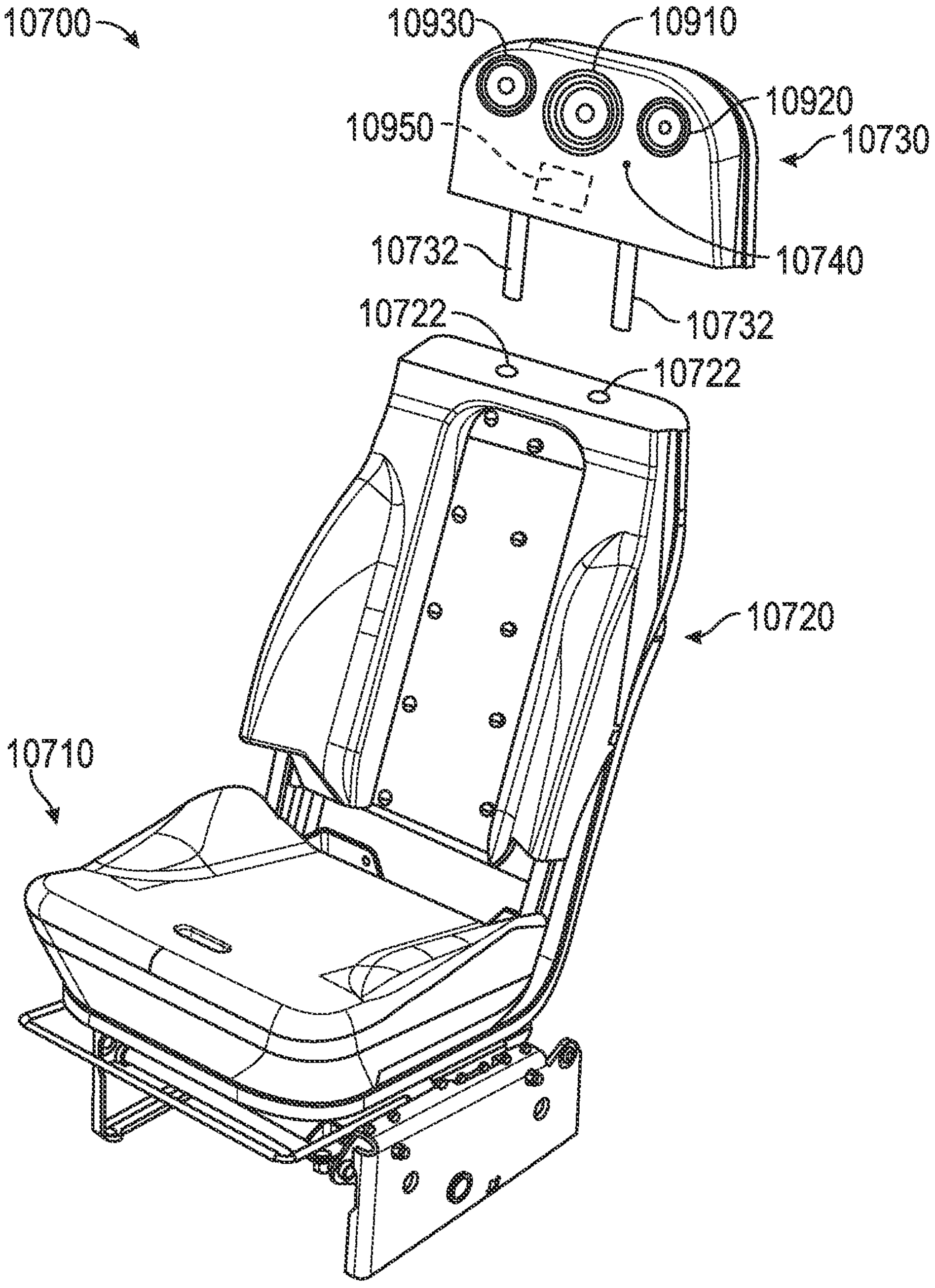

FIG. 200 is a perspective view of a seat associated with the passenger capsule of FIG. 197 having a removable headrest, according to an exemplary embodiment.

Figure 201:
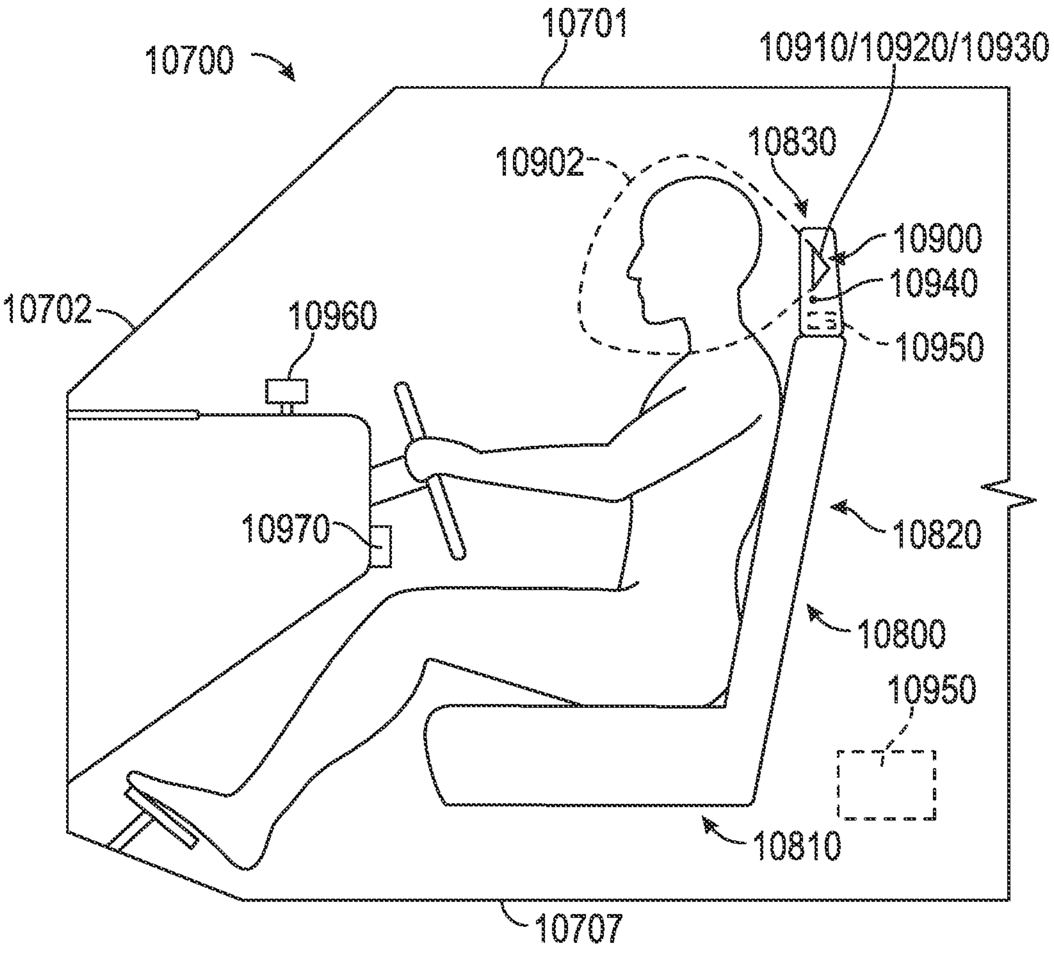

FIG. 201 is a schematic side view of the passenger capsule of the vehicle of FIG. 197, according to an exemplary embodiment.

Figure 202:
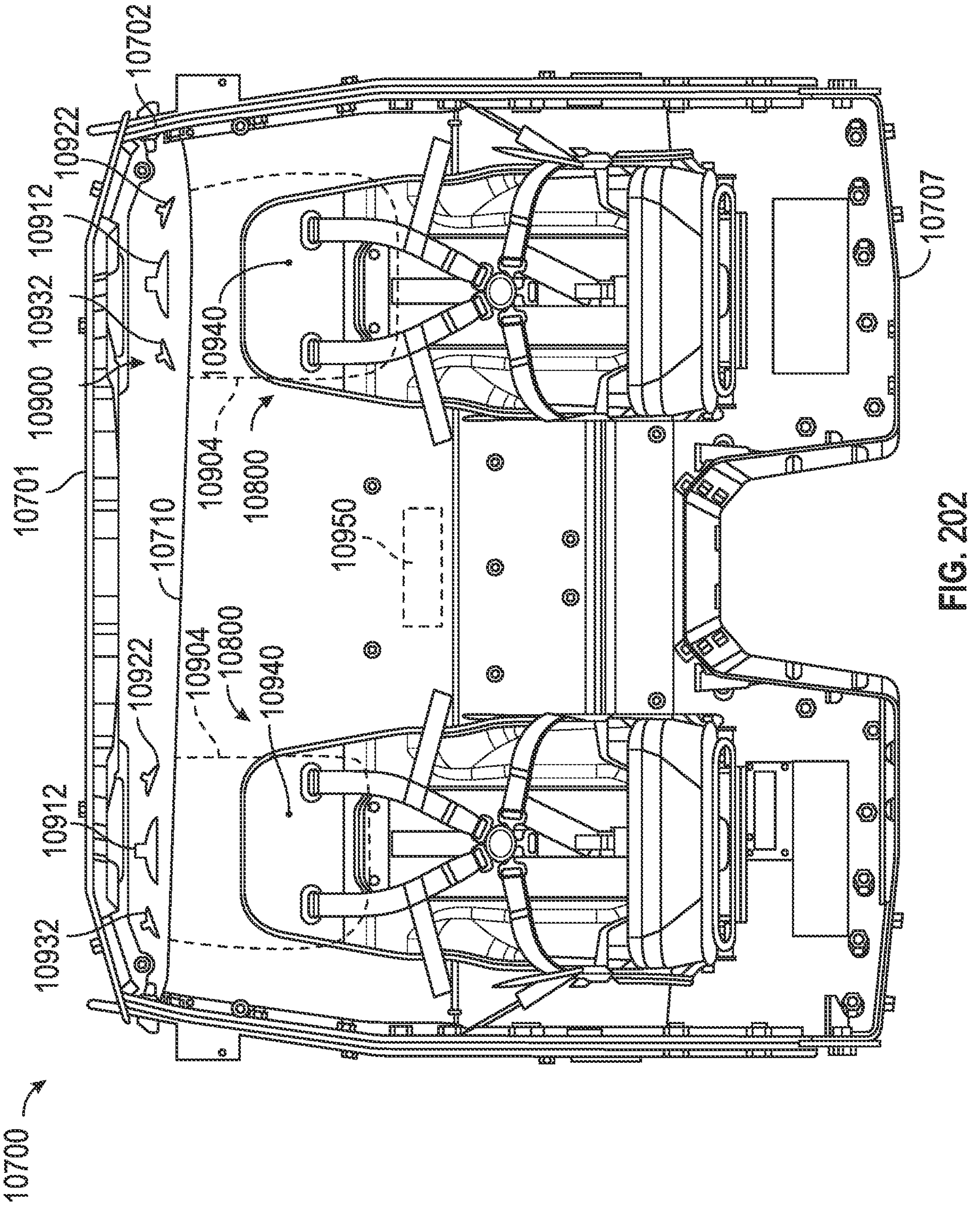

FIG. 202 is a schematic sectional view of a passenger capsule of the vehicle of FIG. 196 having a sound suppression system, according to another exemplary embodiment.

Figure 203:
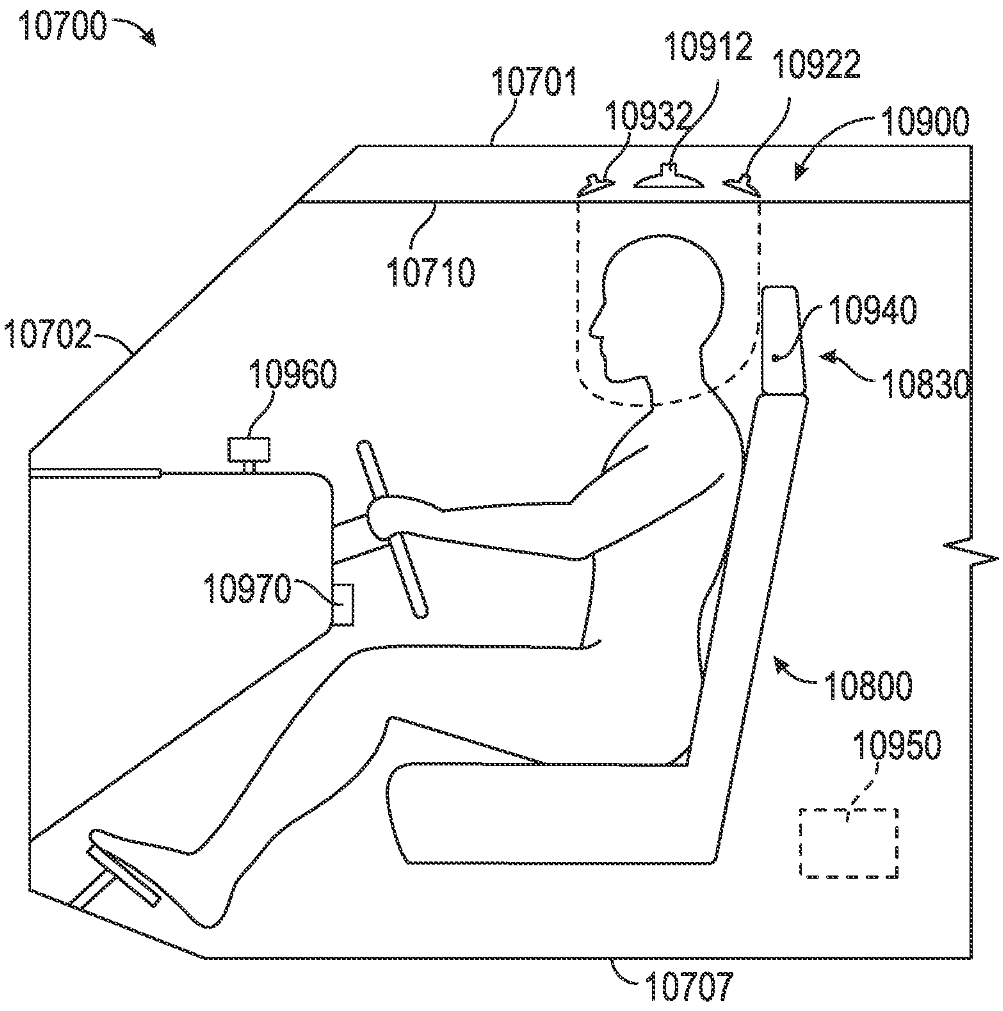

FIG. 203 is a schematic side view of the passenger capsule of the vehicle of FIG. 202, according to an exemplary embodiment.

Figure 204:
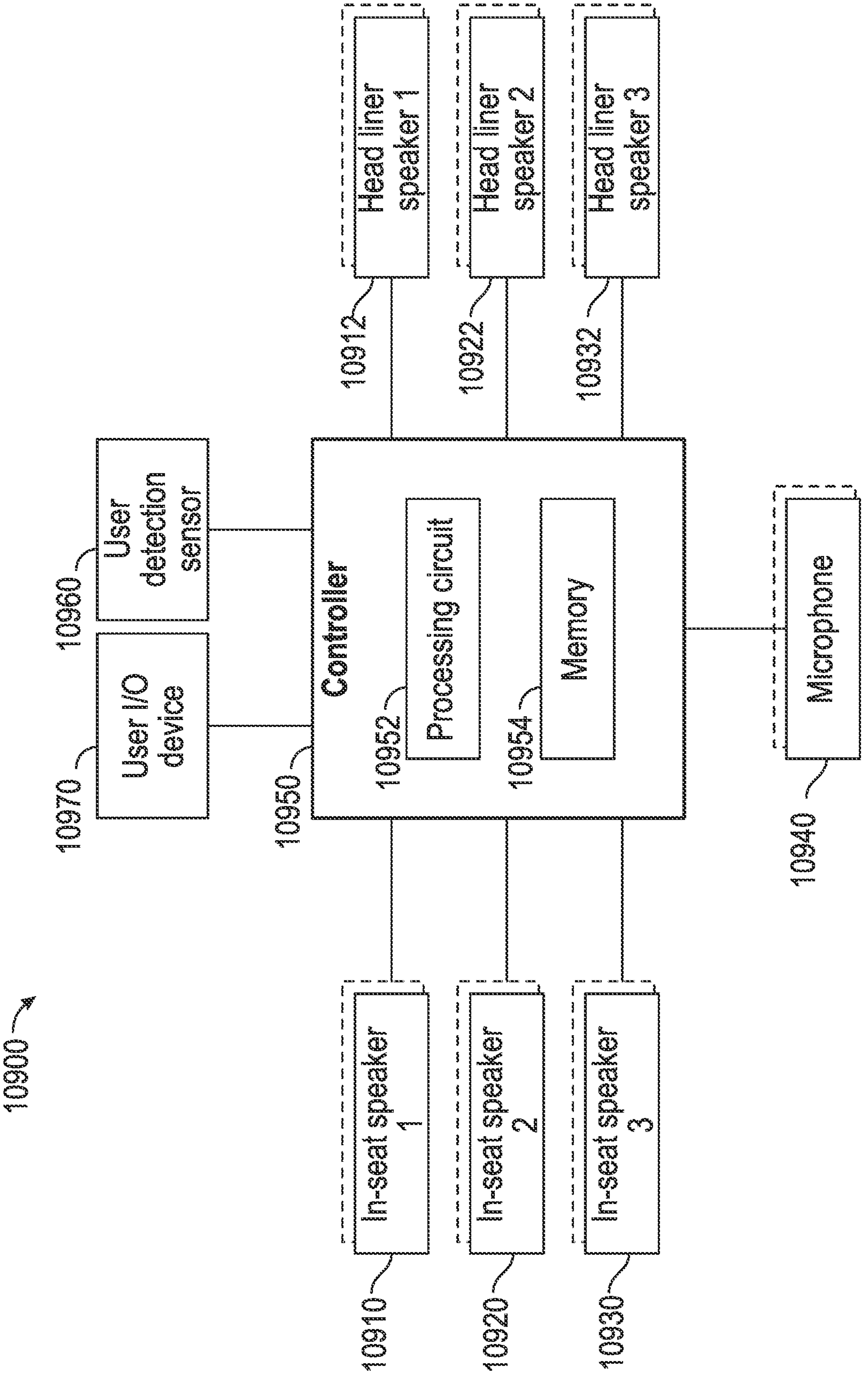

FIG. 204 is a schematic block diagram of the sound suppression system for the passenger capsule of FIGS. 197 and 202, according to an exemplary embodiment.

Figure 205:
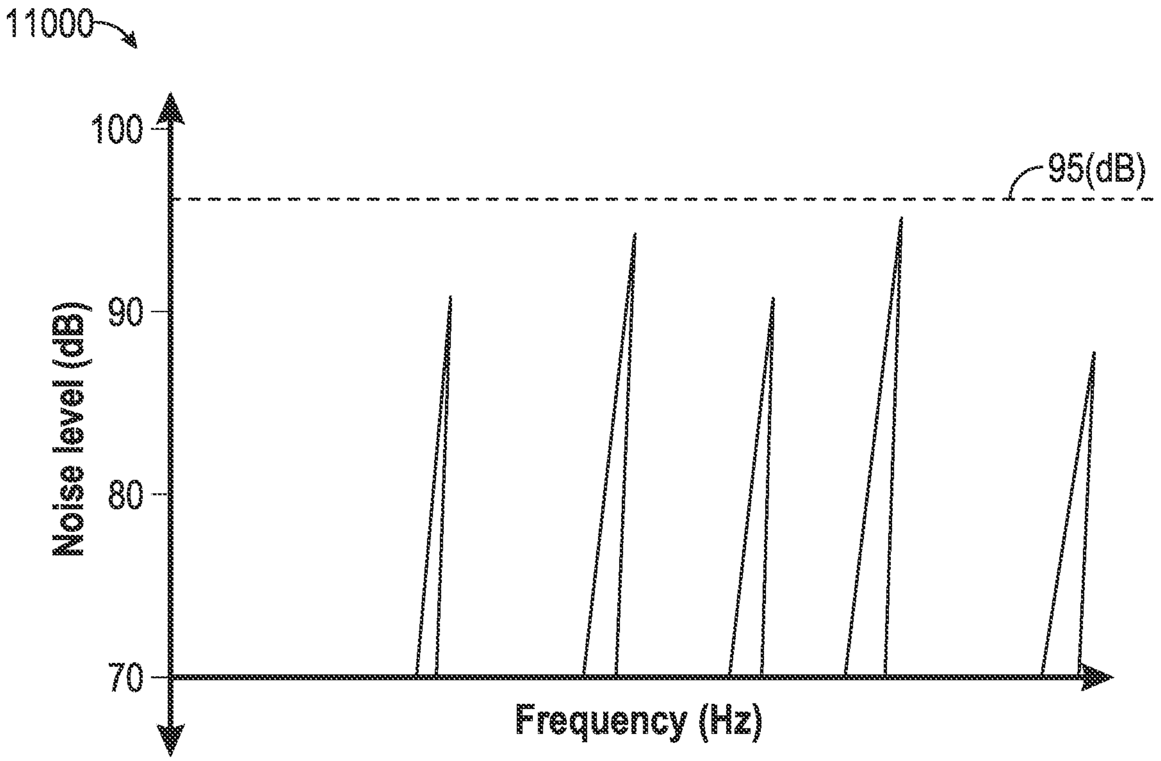
Figure 206:
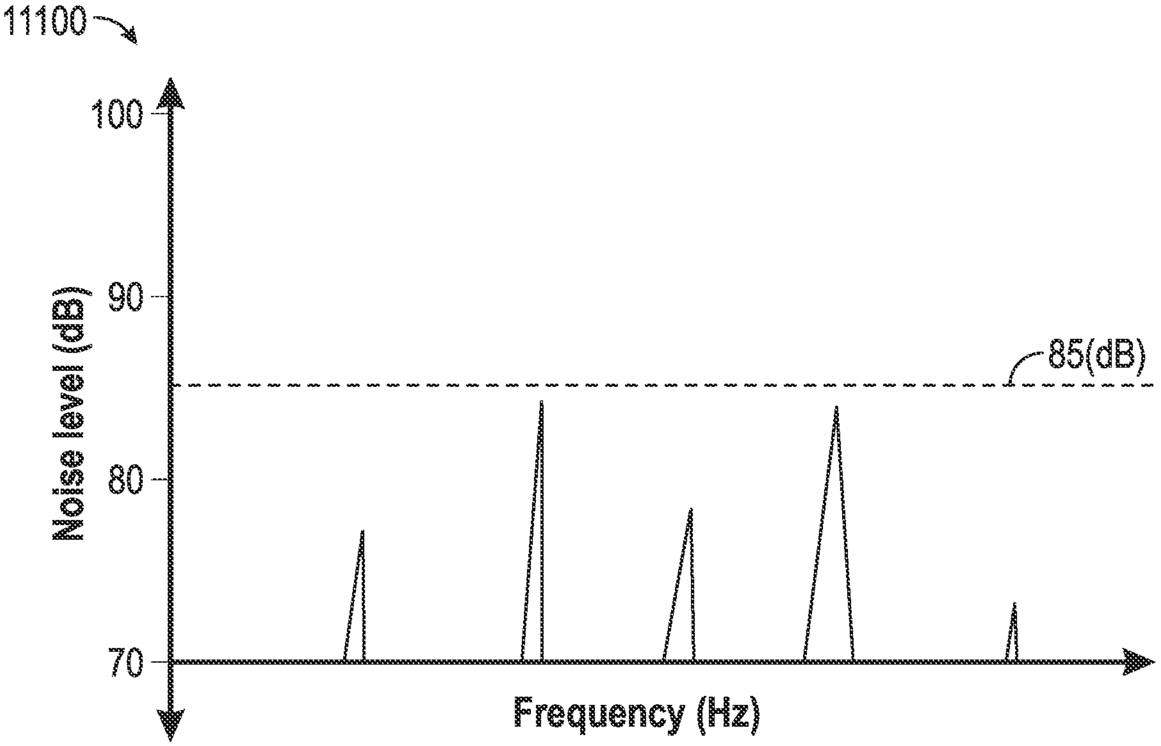

FIGS. 205 and 206 are various graphs depicting volume within the passenger capsule prior to sound suppression and after sound suppression, according to an exemplary embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

According to an exemplary embodiment, a vehicle includes various components that improve performance relative to traditional systems. The vehicle includes a front cabin having a seat for an occupant or passenger and a footwell configured to receive the feet and legs of the occupant. The bottom surface of the footwell is uneven (e.g., angled, etc.) relative to a horizontal reference plane. The vehicle further includes a blast mat disposed within the footwell and configured absorb blast energy from a blast event (e.g., an explosion originating under the front cabin, etc.). According to an exemplary embodiment, a bottom surface of the blast mat is angled relative to a top surface of the blast mat, such that the top surface of the blast mat is level (i.e., is parallel to a horizontal plane) when the bottom surface of the blast mat rests on the bottom surface of the footwell. Having a level top surface to support the feet of the occupant increases the comfort of the occupant relative to conventional blast mats having uneven top surfaces.

According to another exemplary embodiment, a vehicle includes various components that improve performance relative to traditional systems. The vehicle includes a number of components (e.g., supports, a steering tray, a backing plate used to mount an engine, etc.) that have a certain structure (e.g., are structural members of the vehicle, provide structure, are supports, etc.) when the vehicle is in an A-kit configuration. A portion of the one or more components may be removed and replaced with an armor component (e.g., an armor panel, etc.) when the vehicle is reconfigured into a B-kit configuration.

According to another exemplary embodiment, a vehicle includes various components that improve performance relative to traditional systems. In some situations, a disabling event (e.g., a blast event, loss of air pressure in a tire, etc.) prevents the normal operation of a tractive element of the vehicle. The vehicle includes various components that are configured to react to a disabling event and thereby permit the vehicle to continue operation.

According to another exemplary embodiment, a vehicle includes a suspension system that includes a sway bar having various features that improve performance relative to traditional systems. In a first aspect, the sway bar extends through an opening in a frame of the vehicle, and is rotatably coupled to the frame with a bushing that surrounds the sway bar. The bushing is coupled to the frame with a mounting block that centers the bushing and sway bar with respect to a mounting bracket to facilitate the clearance of other components of the vehicle. Additionally, the mounting block may completely surround the bushing such that interfaces between the sway bar and bushing are completely protected from debris.

In another aspect, the sway bar includes a bent portion that is coupled to a swing arm of the vehicle's suspension system. The bent portion is specifically designed to increase (e.g., maximize, etc.) clearance for wheels of the vehicle. As such, the bending portions increase the operational movement range of the suspension system.

In yet another aspect, side plates that couple the suspension system to the frame of the vehicle include openings that are specifically designed to accommodate a brake routing support of a vehicle braking system that a union is mounted to so that a flexible hose of the braking system does not chafe against the side plate. This protects the union from wear and tear.

According to another exemplary embodiment, a vehicle includes various components that improve performance relative to traditional systems. According to an exemplary embodiment, the vehicle of the present disclosure includes a cooling system (e.g., a cooling pack, etc.) positioned remotely from a prime mover (e.g., an engine, etc.) of the vehicle. The cooling system may include a radiator, a fan, a fan shroud, and conduits fluidly coupling the radiator to the engine. According to an exemplary embodiment, the engine is positioned beneath and/or at least partially behind a front cabin of the vehicle and the cooling system is positioned at a front end of the chassis, ahead of the front cabin such that an airgap (e.g., open space, a cab-tilt space, etc.) is formed between the engine and the cooling system. According to an exemplary embodiment, the fan and the fan shroud are coupled to the chassis with a common support structure such that relative movement therebetween may be minimized and/or substantially prevented. Such minimization facilitates reducing the tip clearance between the fan (e.g., the fins, tips, etc. of the fan) and the fan shroud, which may thereby increase the efficiency of the cooling system. According to an exemplary embodiment, the airgap and the minimized tip clearance increases the cooling capacity of the cooling system such that the prime mover may be tuned for increased performance.

According to another exemplary embodiment, the cooling pack of the present disclosure includes a fan system positioned remotely from the prime mover of the vehicle. The fan system may include a fan and a pulley assembly having a plurality of pulleys and a belt. The pulley assembly may be driven by a connecting shaft that extends between the prime mover and the pulley assembly. In other embodiments, the connecting shaft is directly coupled to the fan. The prime mover may thereby drive the remotely positioned fan through the connecting shaft. In some embodiments, the pulley assembly is coupled to an alternator such that the alternator is also positioned remotely from the engine. According to an exemplary embodiment, the engine is positioned beneath and/or at least partially behind a front cabin of the vehicle and the fan system and/or alternator are positioned forward of the front cabin.

According to an exemplary embodiment, a vehicle includes various components that improve performance relative to traditional systems. The vehicle includes a transmission, a transfer case coupled to the transmission, and a manual override system coupled to the transfer case. In other embodiments, the transfer case is not coupled (e.g., not directly coupled, etc.) to the transmission. By way of example, the manual override system may be provided as part of a divorced transfer case. In still other embodiments, the manual override system includes one or more components that are not coupled to the transfer case. The manual override system is configured to facilitate manually reconfiguring the transfer case from a high and/or low mode of operation to a neutral mode of operation. In one embodiment, the manual override system is provided as part of a two speed transfer case. In another embodiment, the manual override system is provided as part of a single speed transfer case. According to an exemplary embodiment, the manual override system includes a pivotal lever and engagement element. Pivotal actuation of the pivotal lever causes the engagement element to engage with a piston system. Such engagement causes the piston system to linearly translate which reconfigures the transfer case from the high and/or low mode of operation into the neutral mode of operation. According to an exemplary embodiment, the pivotal actuation of the lever provides various advantageous over traditional, translational push-pull systems. By way of example, rotary actuation may require less force than linear actuation. By way of another example, rotary actuation may prevent dirt and/or debris from being pulled into the transfer case like traditional, translation push-pull systems. By way of yet another example, rotary actuation may facilitate manufacturing an override system that is more compact than linearly actuated systems.

According to another exemplary embodiment, a vehicle includes various components that improve performance relative to traditional systems. A suspension controller performs a weight estimation of the vehicle using information from gas springs that support the vehicle. The suspension controller monitors a number of vehicle conditions and is configured to permit the weight estimation only when the monitored conditions fall inside of certain ranges. While referred to as an "estimation," the determined weight may, in fact, be the weight of the vehicle. A suspension system of the vehicle incorporates a number of gas springs that support a sprung mass of the vehicle. The suspension controller is configured to locate the center of gravity of the sprung mass using pressure information from the gas springs and information concerning the acceleration of the vehicle.

According to another exemplary embodiment, a vehicle includes various components that improve performance relative to traditional systems. The vehicle may be configured for operation on both paved and rough, off-road terrain. As such, the suspension system may be correspondingly configured to support the weight of the vehicle while providing a comfortable ride quality on both paved and rough, off-road terrain. In some embodiments, the suspension system is configured to change the ride height of the vehicle by lifting or lowering the body of the vehicle with respect to the ground.

According to another exemplary embodiment, a vehicle includes various components that improve performance relative to traditional systems. The vehicle includes a front cabin rotatably coupled to a frame by a pair of pivot mounts. A pair of hydraulic cylinders are arranged beneath the front cabin and configured to rotate the front cabin between a use position and a maintenance position. A pair of rear supports support a rear end of the front cabin in the maintenance position and each include a latch that selectively holds the front cabin in the use position. The pivot mounts and the rear supports include isolators that reduce the vibration transmitted to the front cabin from the frame.

A turret assembly is mounted to a roof of the front cabin. An occupant of the front cabin can extend their upper body through an aperture in the roof to access the turret assembly and fire a weapon. While accessing the turret assembly, the operator can stand on a center floor section that is raised relative to the rest of the floor in the front cabin. When accessing the turret assembly, the operator can sit in a seat coupled to the center floor section. The seat is movable from a stored position to a use position. In the stored position, the seat is located proximate a rear wall of the front cabin where it does not obstruct movement of the occupants in the front of the front cabin. Because the center floor section is raised, if the operator were to sit in the seat in the stored position, their head would likely contact the roof. In the use position, the seat is located directly below the aperture in the roof, providing ample head clearance for the occupant. The inclusion of a movable seat facilitates the seat being stored in an unobtrusive position when not needed, while still providing a comfortable riding experience for the occupant.

The front cabin further includes a door having a frame. The vehicle is reconfigurable between a first configuration and a second configuration, where the vehicle has increased protection for the operator in the second configuration. When changing between the first configuration and the second configuration, a number of components are added to or removed from the door to modify the degree of protection afforded by the door. The frame is configured such that the same frame can be used in the various configurations and interface with the various components.

According to another exemplary embodiment, a vehicle includes various components that improve performance relative to traditional systems. The vehicle includes a frame that is modularly modifiable to suit a number of different applications. Aspects such as the length of the frame rails, the length and location of the frame liners, and the mounting locations of various components can be varied to suit applications that require various carrying capacities and mission equipment. Some aspects of the front end of the vehicle are located in a similar (e.g., identical, etc.) location throughout various embodiments to facilitate providing a consistent front end structure (e.g., consistent cabin and lifting point locations, etc.).

According to another exemplary embodiment, the vehicle includes a frame assembly having a frame, a front cross member assembly, and a rear cross member assembly. The frame has a front end and a rear end. The frame includes a first frame rail defining a first channel and a second frame rail defining a second channel. The front cross member assembly is coupled to the front end of the frame and extends between the first frame rail and the second frame rail. The rear cross member assembly is coupled to the rear end of the frame and extends between the first frame rail and the second frame rail. Each of the front cross member assembly and the rear cross member assembly includes a first end plate positioned within, and releasably received by, the first channel of the first frame rail, a second end plate positioned within, and releasably received by, the second channel of the second frame rail, and a cross member extending between the first end plate and the second end plate. In other embodiments, the first end plate and/or the second end plate are otherwise coupled to the frame rails (e.g., to sides thereof, etc.). Each of the first end plates defines a first tow eye and a first tie down, and each of the second end plates defines a second tow eye and a second tie down. Each of the end plates further defines a plurality of apertures positioned to facilitate releasably coupling the respective end plate to the frame with a plurality of fasteners. According to an exemplary embodiment, the rear cross member assembly has an at least partially different structure than the front cross member assembly. By way of example, the cross member of the rear cross member assembly may define an aperture configured to receive a towing receiver positioned to align with the aperture and extend from the cross member. The towing receiver may be configured to selectively and slidably receive a towing mechanism. According to an exemplary embodiment, releasably coupling the front cross member assembly and the rear cross member assembly to the frame rails provides a modular frame assembly. By way of example, the cross member assemblies may be selectively interchangeable based on various applications (e.g., a light duty cross member assembly, a heavy duty cross member assembly, etc.). By way of another example, repairing and/or replacing damaged cross member assemblies may be performed with relative ease (e.g., without having to cut and weld the frame assembly, etc.).

According to an exemplary embodiment, the vehicle includes a cabin that may be armored for use in a military operation. The cabin may be rotatable to facilitate access to an engine, the majority of which is disposed beneath and/or rearward of the cabin. The vehicle further includes a front axle assembly and one or more rear axle assemblies. The cabin is offset rearward from the front axle assembly, distributing the weight of the armored cabin between the front and rear axle assemblies. Such positioning lowers the amount of weight supported by the front axle assembly.

According to an exemplary embodiment, a vehicle includes a body supported by a suspension system. In some embodiments, the vehicle is a military vehicle. In other embodiments, the vehicle is a utility vehicle, such as a fire truck, a tractor, construction equipment, or a sport utility vehicle. The vehicle may be configured for operation on both paved and rough, off-road terrain. The suspension system may be correspondingly configured to support the weight of the vehicle while providing comfortable ride quality on both paved and rough, off-road terrain. In some embodiments, the suspension system is configured to change the ride height of the vehicle by lifting or lowering the body of the vehicle with respect to the ground.

According to an exemplary embodiment, a vehicle includes a body supported by a suspension system. In some embodiments, the vehicle is a military vehicle. In other embodiments, the vehicle is a utility vehicle, such as a fire truck, a tractor, construction equipment, or a sport utility vehicle. The vehicle may be configured for operation on both paved and rough, off-road terrain. The suspension system may be correspondingly configured to support the weight of the vehicle while providing comfortable ride quality on both paved and rough, off-road terrain. In some embodiments, the suspension system is configured to change the ride height of the vehicle by lifting or lowering the body of the vehicle with respect to the ground.

According to an exemplary embodiment, a vehicle may include a body supported by a suspension system. In some embodiments, the vehicle is a military vehicle. In other embodiments, the vehicle is a utility vehicle, such as a fire truck, a tractor, construction equipment, or a sport utility vehicle. The vehicle may be configured for operation on both paved and rough, off-road terrain. The suspension system may be correspondingly configured to support the weight of the vehicle while providing comfortable ride quality on both paved and rough, off-road terrain. In some embodiments, the suspension system is configured to change the ride height of the vehicle by lifting or lowering the body of the vehicle with respect to the ground.

According to an exemplary embodiment, a controller for a vehicle (e.g., an automobile, emergency response vehicle, broadcasting vehicle, etc.) is provided. The controller interfaces with a charging system of the vehicle to selectively decouple electrical loads from the charging system in the event that certain conditions are detected. For example, the controller may receive an indication that a battery is failing to charge even though the field current supplied to an alternator of the charging system has increased. In response to receiving such an indication, the controller provides a control signal to a power distribution system in the vehicle to decouple a predetermined electrical load from the charging system. As such, the overall electrical load on the charging system is selectively reduced to efficiently use the limited power provided by the malfunctioning charging system.

In some embodiments, the electrical load that is decoupled from the charging system is pre-selected by a user of the vehicle. Thus, the systems and methods disclosed herein allow a user to tailor the set of electrical loads that are powered in the event that limited power is available.

According to an exemplary embodiment, a sound suppression system for a vehicle is configured to generate zones of quiet or sound suppression zones around the heads of passengers sitting within the vehicle without the use of devices worn by the passengers. By way of example, a vehicle may generate noises that reach rather loud levels within the cabin of the vehicle. Ear plugs or other noise canceling devices may be worn by the passengers, however, such devices hinder hearing and communicating capabilities. Accordingly, the sound suppression system of the present disclosure is configured to target various frequencies (e.g., low-frequency noises, pre-identified frequencies, etc.) to suppress noises at the target frequencies without hindering the hearing of the passengers, thereby reducing the sound levels perceived by the passengers while within the generated zones of quiet or sound suppression zones.

Overall Vehicle

According to the exemplary embodiment shown in FIG. 1, a vehicle, shown as vehicle 10, includes a chassis, shown as frame 12, that supports a body assembly including a first portion, shown as front cabin 20, and a second portion, shown as mission equipment 30. As shown in FIG. 1, the mission equipment 30 is disposed behind the front cabin 20. The frame 12 of the vehicle 10 engages a plurality of tractive assemblies, shown as front tractive assemblies 40 and rear tractive assemblies 42. According to an exemplary embodiment, the vehicle 10 is a military ground vehicle. In other embodiments, the vehicle 10 is an off-road vehicle such as a utility task vehicle, a recreational off-highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, and/or still another vehicle.

According to an exemplary embodiment, the frame 12 defines a longitudinal axis. The longitudinal axis may be generally aligned with a frame rail of the frame 12 of the vehicle 10 (e.g., front-to-back, etc.). In some embodiments, the vehicle 10 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 1, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.).

According to an exemplary embodiment, the front cabin 20 includes one or more doors, shown as doors 22, that facilitate entering and exiting an interior of the front cabin 20. The interior of the front cabin 20 may include a plurality of seats (e.g., two, three, four, five, etc.), vehicle controls, driving components (e.g., steering wheel, accelerator pedal, brake pedal, etc.), etc. According to the exemplary embodiment shown in FIG. 1, the mission equipment 30 includes a cargo body configured to facilitate transporting various military equipment (e.g., medical supplies, ammunition, weapons, missiles, personnel, etc.). In other embodiments, the mission equipment 30 includes a truck bed or a flat bed. In some embodiments, the mission equipment 30 additionally or alternatively includes a boom lift. In another embodiment, the mission equipment 30 includes an at least partially enclosed troop transport cabin configured to facilitate transporting troops (e.g., eight, ten, twelve, twenty, etc.) with the vehicle 10.

According to an exemplary embodiment, the vehicle 10 includes a powertrain system. The powertrain system may include a primary driver (e.g., an engine, a motor, etc.), an energy generation device (e.g., a generator, etc.), and/or an energy storage device (e.g., a battery, capacitors, ultracapacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or moves the vehicle 10. In such embodiments, the vehicle 10 may not include the generator and/or the energy storage device. The powertrain of the vehicle 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, hydrogen, electricity, etc.).

Blast Mat Configuration

Figure 2:
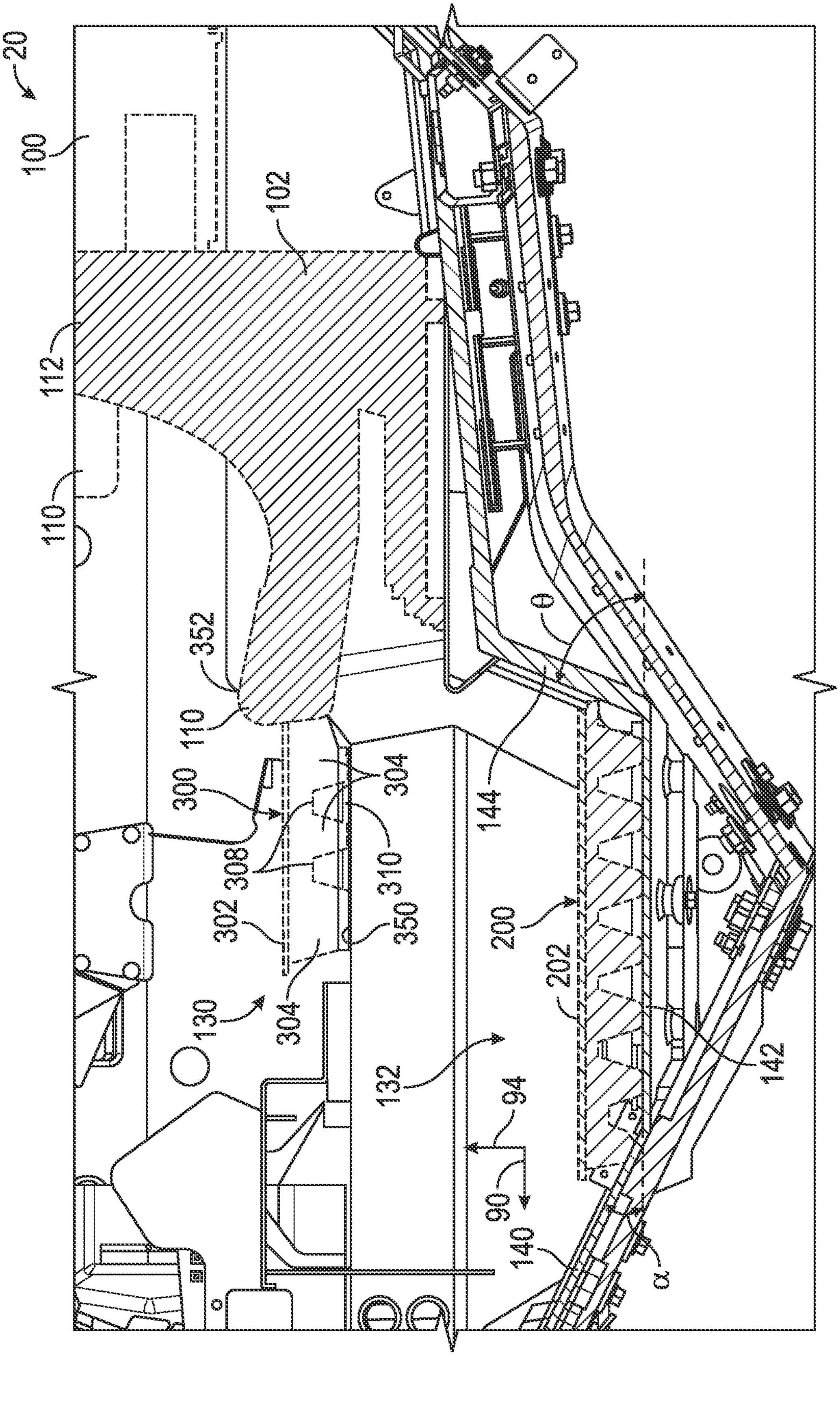
FIG. 2 is a section view of a front cabin of the vehicle of FIG. 1, according to an exemplary embodiment.
Figure 3:
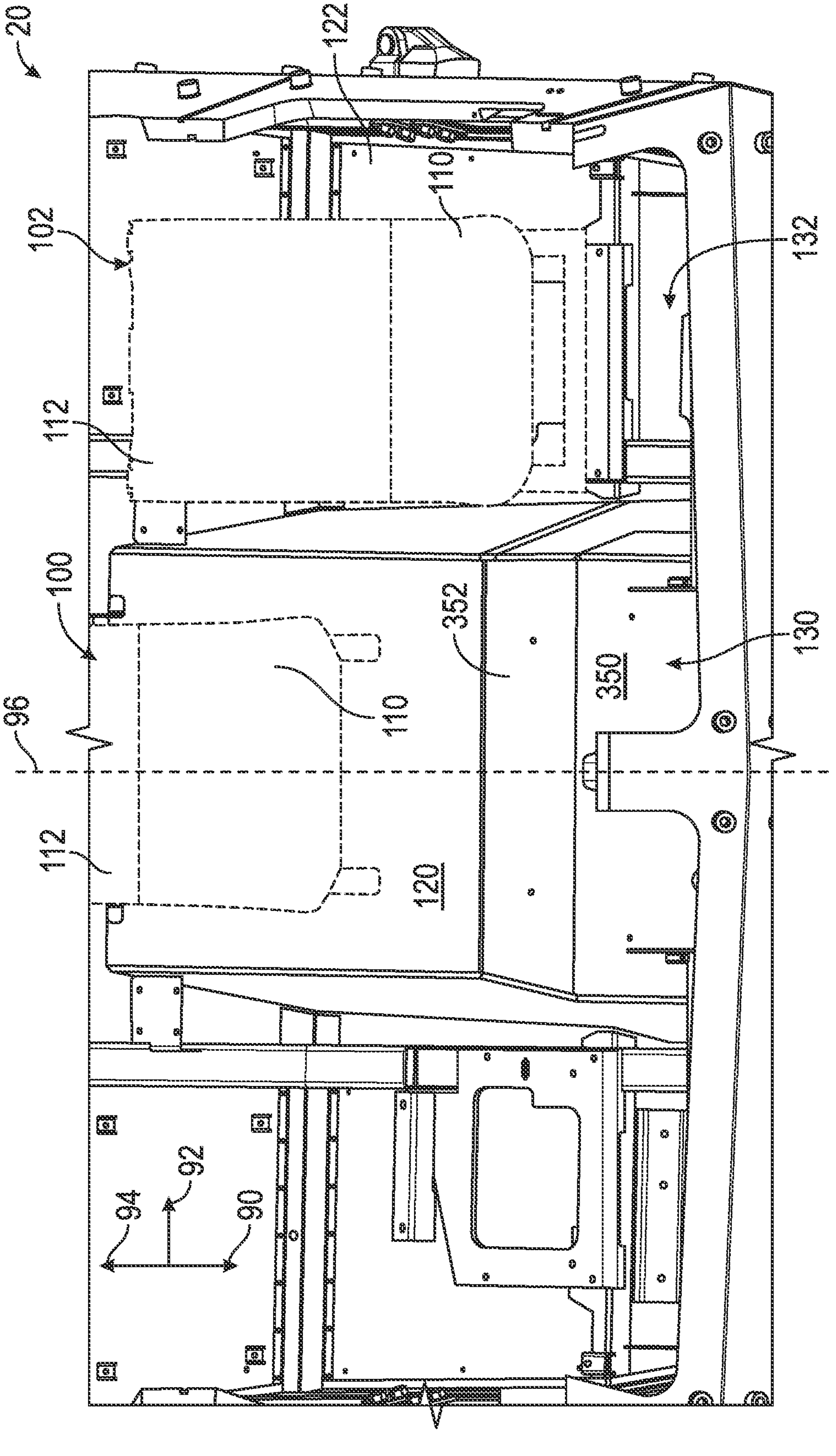
FIG. 3 is a perspective view of an interior of the front cabin of FIG. 2, according to an exemplary embodiment.

Referring to FIGS. 2 and 3, an interior of the front cabin 20 is shown. The front cabin 20 is configured to carry one or more occupants during normal operation of the vehicle 10. A number of axes are defined with respect to the front cabin 20. A longitudinal axis 90 is defined parallel to the direction of travel of the vehicle 10 and oriented toward the front of the front cabin 20. A lateral axis 92 is defined perpendicular to the longitudinal axis 90, is disposed entirely within a horizontal plane, and is pointed toward a left side of the front cabin 20. A vertical axis 94 is oriented perpendicular to both the longitudinal axis 90 and the lateral axis 92 and is oriented upwards towards a top of the front cabin 20. The locations of the longitudinal axis 90, the lateral axis 92, and the vertical axis 94 may be arbitrary. A center plane 96 is centered laterally across the front cabin 20. The center plane 96 extends parallel to and/or contains the longitudinal axis 90 and the lateral axis 92.

As shown in FIG. 3, the front cabin 20 includes a seat 100 and a seat 102 each configured to hold one occupant. In other embodiments, the front cabin 20 includes a single seat configured to hold multiple occupants (e.g., a bench style seat, etc.). Seat 100 and seat 102 each include a bottom 110 and a back 112 that support the bottom and the back of an occupant, respectively. The seat 100 and the seat 102 may be substantially similar in construction. The seat 100 is disposed along the center plane 96. The seat 102 is laterally offset from the seat 100. The seat 100 is coupled to a floor section 120. The seat 102 is coupled to a floor section 122. The floor section 122 is vertically offset from, and positioned lower than, the floor section 120 such that the seat 102 is positioned lower than the seat 100. The seat 102 may be longitudinally offset forward of the seat 100. Below and longitudinally forward of the seat 100, the front cabin 20 defines a center footwell 130. Below and longitudinally forward of the seat 102, the front cabin 20 defines a side footwell 132. The center footwell 130 and the side footwell 132 each provide a space for the feet and legs of the occupants sitting in the seat 100 and the seat 102, respectively.

Figure 4:
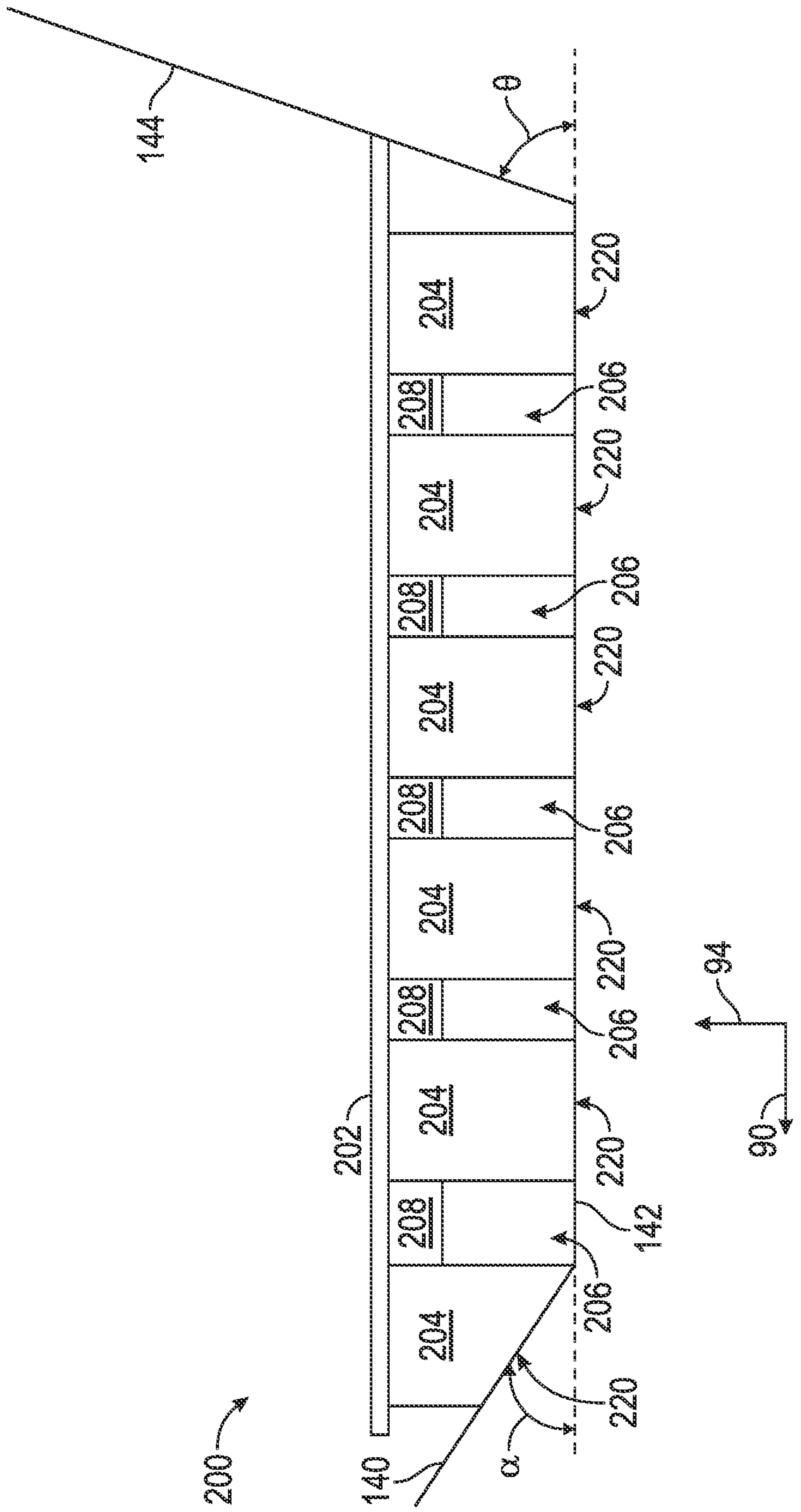
FIG. 4 is a side section view of a blast mat for use with the front cabin of FIG. 2, according to an exemplary embodiment.
Figure 5:
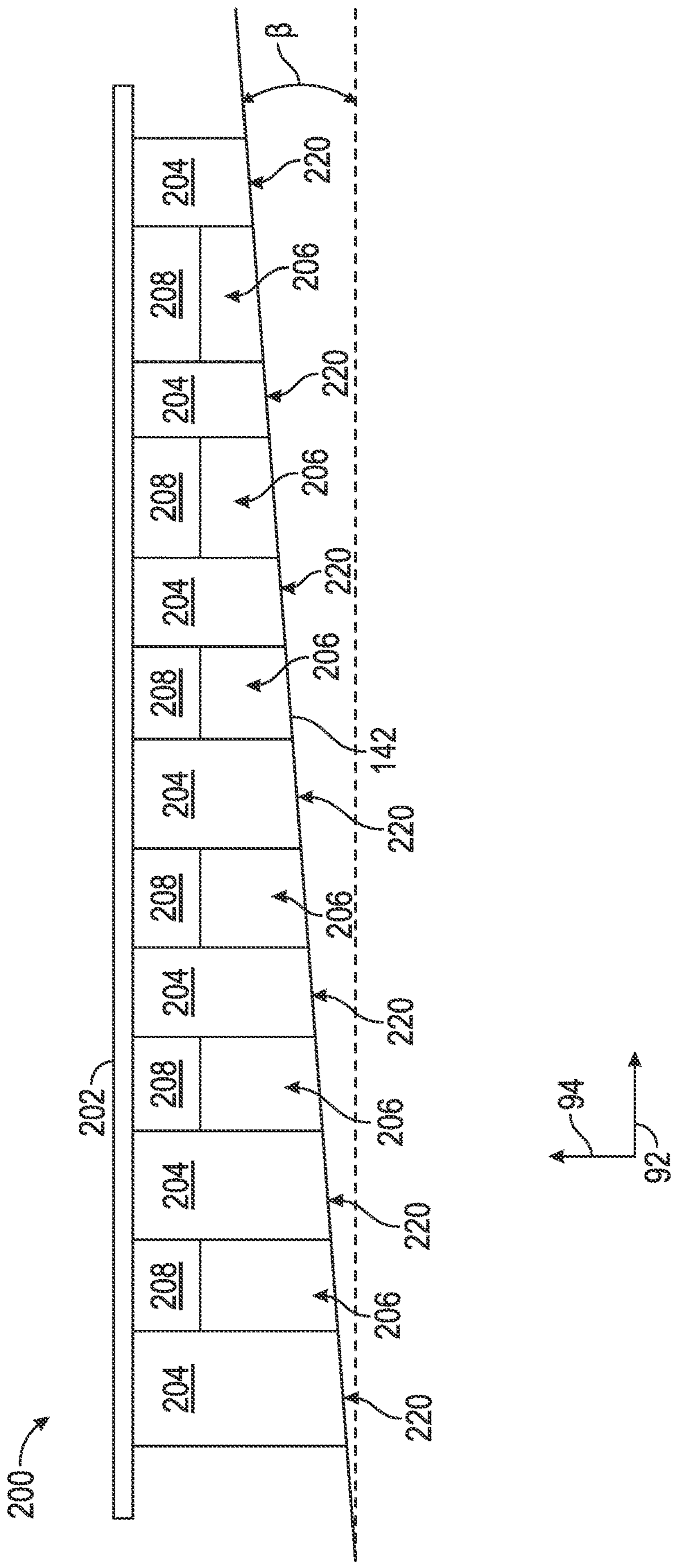
FIG. 5 is a front section view of the blast mat of FIG. 4, according to an exemplary embodiment.

Referring to FIGS. 2, 4, and 5, the side footwell 132 is defined in part by a front wall 140, a bottom wall 142, and a rear wall 144 of the front cabin 20. In other embodiments, the side footwell 132 is otherwise defined. The front wall 140, the bottom wall 142, and the rear wall 144 are planar, according to the exemplary embodiment shown in FIG. 2. The front wall 140 and the rear wall 144 intersect the bottom wall 142 at an angle $\alpha$ and at an angle $\theta$, respectively, when viewed from the side (e.g., in a plane parallel to the center plane 96, with respect to the longitudinal axis 90). The angle $\theta$ may be greater than the angle $\alpha$. The front wall 140 extends vertically upward (e.g., inclines) toward the front of the vehicle 10. The rear wall 144 extends vertically upward (e.g., inclines) toward the rear of the vehicle 10. The bottom wall 142 may be parallel to the longitudinal axis 90. The bottom wall 142 is angled relative to the lateral axis 92 at an angle β such that the bottom wall 142 extends vertically downward (e.g., declines) as it extends towards the center plane 96. In some embodiments, the front wall 140 and/or the rear wall 144 are angled relative to the lateral axis 92.

According to the exemplary embodiment shown in FIG. 2, the front cabin 20 includes an energy absorbing device, shown as blast mat 200. The blast mat 200 is disposed within the side footwell 132, according to an exemplary embodiment. The blast mat 200 rests atop (e.g., engages) the front wall 140 and the bottom wall 142, according to an exemplary embodiment. The blast mat 200 is configured to at least partially support the feet and legs of the occupant located in the seat 102. The blast mat 200 is configured to absorb and dissipate energy from a blast event (e.g., an explosion originating underneath the front cabin 20, etc.). Without the blast mat 200, more energy from the blast event would travel upwards into the feet and legs of the occupant and impart a greater force on the feet and legs of the occupant. The blast mat 200 may be manufactured from an energy absorbing material (e.g., foam, rubber, etc.) and/or may be shaped (e.g., with a series of holes or cutouts) to facilitate the absorption and dissipation of blast energy.

Figure 6:
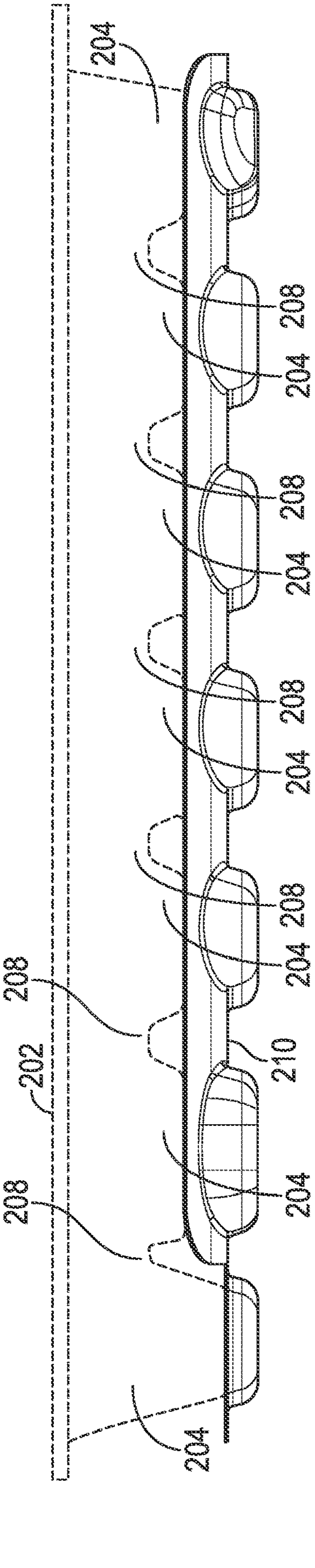
FIG. 6 is a side view of the blast mat of FIG. 4, according to an exemplary embodiment.

FIG. 4 shows a section view of the blast mat 200 along a plane parallel to the center plane 96. FIG. 4 is a left side view of the blast mat 200, according to an exemplary embodiment. FIG. 5 shows a section view of the blast mat 200 along a plane that is perpendicular to the center plane 96 and the longitudinal axis 90. FIG. 5 is a front side view of the blast mat 200, according to an exemplary embodiment. The blast mat 200 includes a planar member, shown as top pad 202, that is oriented parallel to a horizontal plane containing the longitudinal axis 90 and the lateral axis 92. In some embodiments, the top pad 202 is stiff (e.g., relative to the other materials used to construct other portions of the blast mat 200, etc.). In other embodiments, the top pad 202 is flexible. The top pad 202 defines a top surface of the blast mat 200 and is configured to contact the feet of the occupant seated in the seat 102. A number of projections 204 extend downward from the top pad 202. The projections 204 may extend parallel to the vertical axis 94 and define spaces 206 between the individual projections 204. In some embodiments, the projections 204 are arranged in a grid pattern (e.g., along lateral and longitudinal lines, etc.). As shown in FIGS. 4 and 5, the projections 204 have a rectangular cross section. In other embodiments, the projections 204 have other shapes (e.g., cylindrical, frustoconical, etc.). In some embodiments, the blast mat 200 includes webbing, shown as webbing 208, extending between the projections 204. The webbing 208 may be formed from the same or a similar material as the projections 204. As shown in FIGS. 4 and 5, the webbing 208 extends downward from the top pad 202 and between the projections 204. The webbing 208 may cover the entire bottom surface of the top pad 202 or may leave portions of the bottom surface of the top pad 202 exposed, according to various embodiments. According to the exemplary embodiment shown in FIG. 6, the blast mat 200 further includes a cover 210. In one embodiment, the cover 210 is coupled to the bottom of the projections 204. The cover 210 may span the bottom of the blast mat 200 laterally and longitudinally (e.g., entirely, other than ends of the projections 204, etc.).

Terminal ends of the projections 204 contact a bottom surface of the side footwell 132 (e.g., a support surface), which is defined by the top surfaces of the front wall 140, the bottom wall 142, and the rear wall 144. The portion of each projection 204 that contacts the bottom surface of the side footwell 132 is a bottom surface 220 of the projection. Together, the bottom surfaces 220 of the projections 204 define a bottom surface of the blast mat 200. In embodiments that include the cover 210, the bottom surfaces 220 may contact the cover 210, and the cover 210 may contact the bottom wall 142 and the front wall 140. In such embodiments, the portions of the cover 210 disposed below the bottom surfaces 220 that contact the bottom wall 142 and the front wall 140 define the bottom surface of the blast mat 200. The cover 210 may be configured to match the shape of the bottom surfaces 220 and may be relatively thin compared to the overall thickness of the blast mat 200.

The projections 204 are shaped such that the bottom surfaces 220 match (e.g., are a negative impression of, follow, correspond with, extend along, etc.) the longitudinal and lateral inclines and/or declines of the front wall 140 and the bottom wall 142. As shown in FIG. 4, the majority of the projections 204 terminate at the bottom wall 142 and are oriented parallel to the longitudinal axis 90 in an orientation that matches the bottom wall 142. As shown in FIG. 4, one row of projections 204 (e.g., the leftmost projection 204 shown in FIG. 4, etc.) terminates at the front wall 140. The bottom surfaces 220 of those projections 204 are angled relative to the longitudinal axis 90 (e.g., when viewed from the side) to match the contour of the front wall 140 (e.g., at angle α, etc.). As shown in FIG. 5, the bottom surfaces 220 of the projections 204 that terminate at the bottom wall 142 are angled relative to the lateral axis 92 (e.g., when viewed from the front, etc.) to match the contour of the bottom wall 142 (e.g., at angle β, etc.). In some embodiments, the front wall 140 is angled relative to the lateral axis 92 (e.g., when viewed from the front, etc.), and the bottom surfaces 220 of the projections 204 that terminate at the front wall 140 are angled relative to the lateral axis 92 to match the contour of the front wall 140. Accordingly, the bottom surfaces 220 may be angled relative to both the lateral axis 92 and the longitudinal axis 90 (e.g., when viewed from the side and the front, etc.). As shown, none of the projections 204 terminate at the rear wall 144. In other embodiments, however, one or more of the projections 204 terminate at the rear wall 144, and the bottom surfaces 220 of those projections are oriented to match the rear wall 144. In still other embodiments, the projections 204 are otherwise shaped based on the shape of the side footwell 132.

In addition to orienting the bottom surfaces 220 of the projections 204 such that they match the bottom surface of the side footwell 132, the thicknesses of the projections 204 are varied throughout the blast mat 200 such that the top pad 202 maintains a level orientation (e.g., parallel to a horizontal plane, etc.). The thickness of the blast mat 200 is defined as the distance between the top surface of the blast mat 200 and the portions of the bottom surfaces of the blast mat 200 that engage the support surface (e.g., the front wall 140, the bottom wall 142, the rear wall 144, etc.). The overall thickness of the blast mat 200 (i.e., the maximum distance between the bottom surface of the blast mat 200 and the top surface of the blast mat 200) is thicker than that of a conventional blast mat. The increased thickness of blast mat 200 facilitates maintaining the top pad 202 in a level orientation while still maintaining a desired thickness of the blast mat 200 for blast energy dissipation. By way of example, the thinnest portion of the blast mat 200 may correspond to a projection 204 above the front wall 140, as shown in FIG. 2. The thickness of this projection 204 is reduced to accommodate the angled surface of the front wall 140. However, the thickness of the blast mat 200 at the thinnest portion may still be thick enough to provide sufficient blast energy dissipation to prevent injury. The seat 102 is occupied by a driver of the vehicle 10 during operation of the vehicle. The blast mat 200 is configured such that it does not interfere with the operation of accelerator pedals or brake pedals used by the driver.

The thickness of the blast mat 200 may additionally or alternatively account for varying blast resistance throughout different portions of a human foot. By way of example, a front portion of the blast mat 200 (e.g., the projections 204 above the front wall 140) may support a front portion of a foot (e.g., the toes) of the occupant. The front portion of the foot may be more resistant to blast energy than a rear portion of the foot (e.g., the heel), which is supported by a rear portion of the blast mat 200 (e.g., projections 204 located rearward from the front wall 140). The rear portion of the blast mat 200 has a greater thickness than the front portion of the blast mat 200. The reduced thickness of the front portion of the blast mat 200 still provides sufficient blast energy dissipation, particularly because the front portion of the occupant's foot may be more resistant to blast energy than the rear portion of the portion of the foot.

The varying thicknesses of the projections 204 and the angled orientations of the bottom surfaces 220 facilitate maintaining the top of the blast mat 200 in a level orientation (i.e., parallel to a horizontal plane), taking into account the shape of the floor upon which the blast mat 200 rests. In certain embodiments, such as shown in FIG. 5, the blast mat 200 has different thickness at different lateral positions thereof when viewed from the front. The different thickness may facilitate accounting for lateral variations (e.g., a lateral slope, etc.) in the floor of the side footwell 132. Accounting for lateral variations in the floor of the side footwell 132 may facilitate maintaining a level orientation of the top surface. Maintaining a level orientation of the top surface of the blast mat 200 facilitates both of the occupant's feet resting on the blast mat 200 at the same height, which is optimally comfortable for the occupant.

In other embodiments, the projections 204 are contiguous such that the spaces 206 are omitted. In some such embodiments, the blast mat 200 is formed from one or more pieces of foam or other energy absorbing material that are formed, cut, or otherwise shaped to provide the desired orientations of the bottom surfaces 220. Accordingly, the bottom surface of the blast mat 200 may be formed by one continuous piece of material without any holes or spaces.

Figure 7:
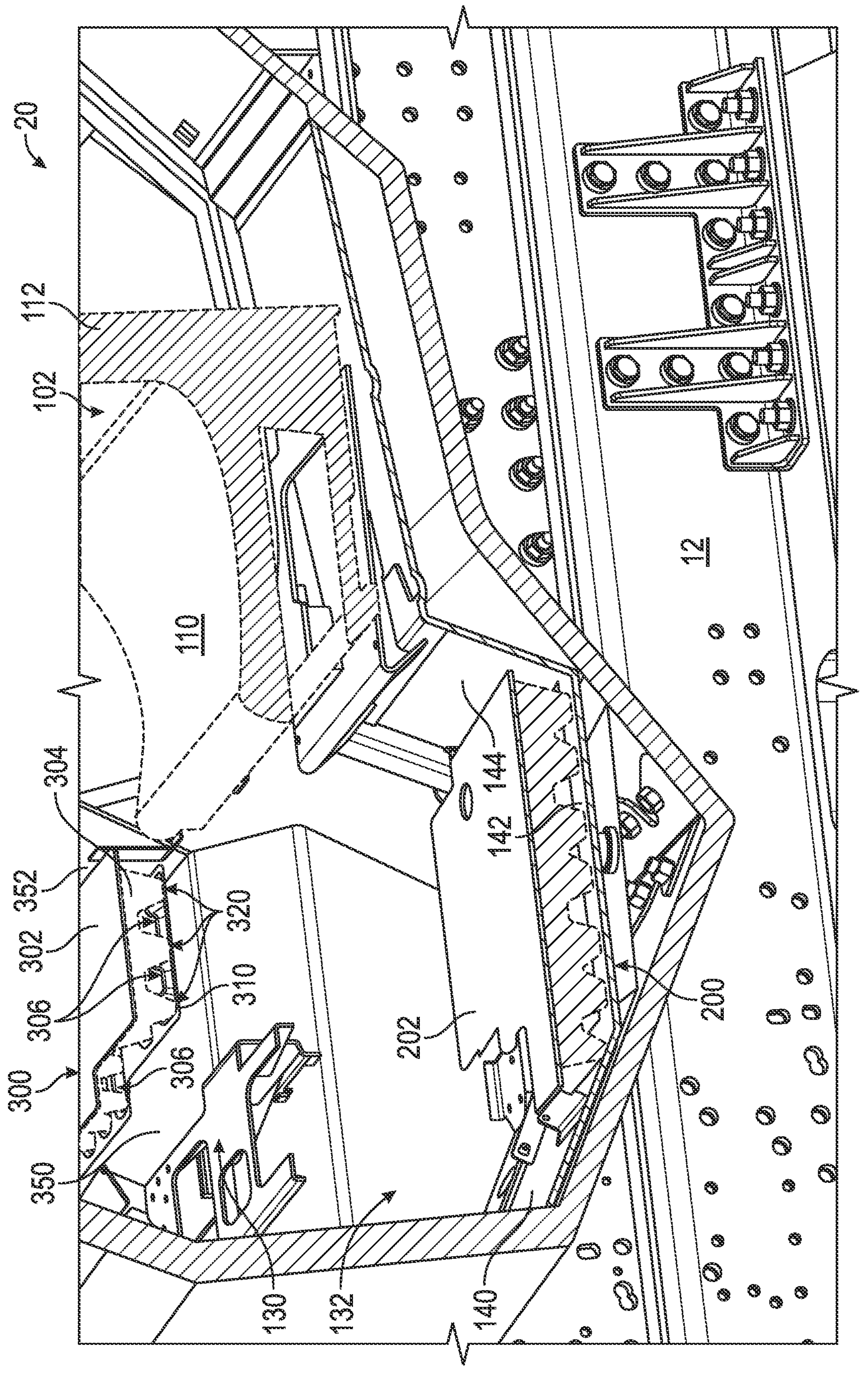
FIG. 7 is a perspective section view of the front cabin of FIG. 2, according to an exemplary embodiment.

Referring to FIGS. 2 and 7, the front cabin 20 includes a blast mat 300 located within the center footwell 130. The blast mat 300 is configured to support the feet and legs of an occupant seated in the seat 102. The blast mat 300 may be of a substantially similar construction to the blast mat 200, having a top pad 302, projections 304 defining spaces 306, and webbing 308. In some embodiments, the blast mat 300 further includes a cover 310. The cover 310 may be substantially similar to the cover 210. The projections 304 have bottom surfaces 320 shaped to match the bottom surface of the center footwell 130. The bottom surface of the center footwell 130 is defined by a bottom wall 350 and a rear wall 352. The bottom wall 350, at which all the projections 304 terminate, has a level orientation (i.e., an orientation parallel to a horizontal plane) such that the projections 304 each have the same thickness. The rear wall 352 is angled relative to the bottom wall 350. In other embodiments, the bottom wall 350 does not have a level orientation. The bottom wall 350 and the rear wall 352 are vertically offset upward from the bottom wall 142 and the rear wall 144 of the side footwell 132, respectively.

Figure 8:
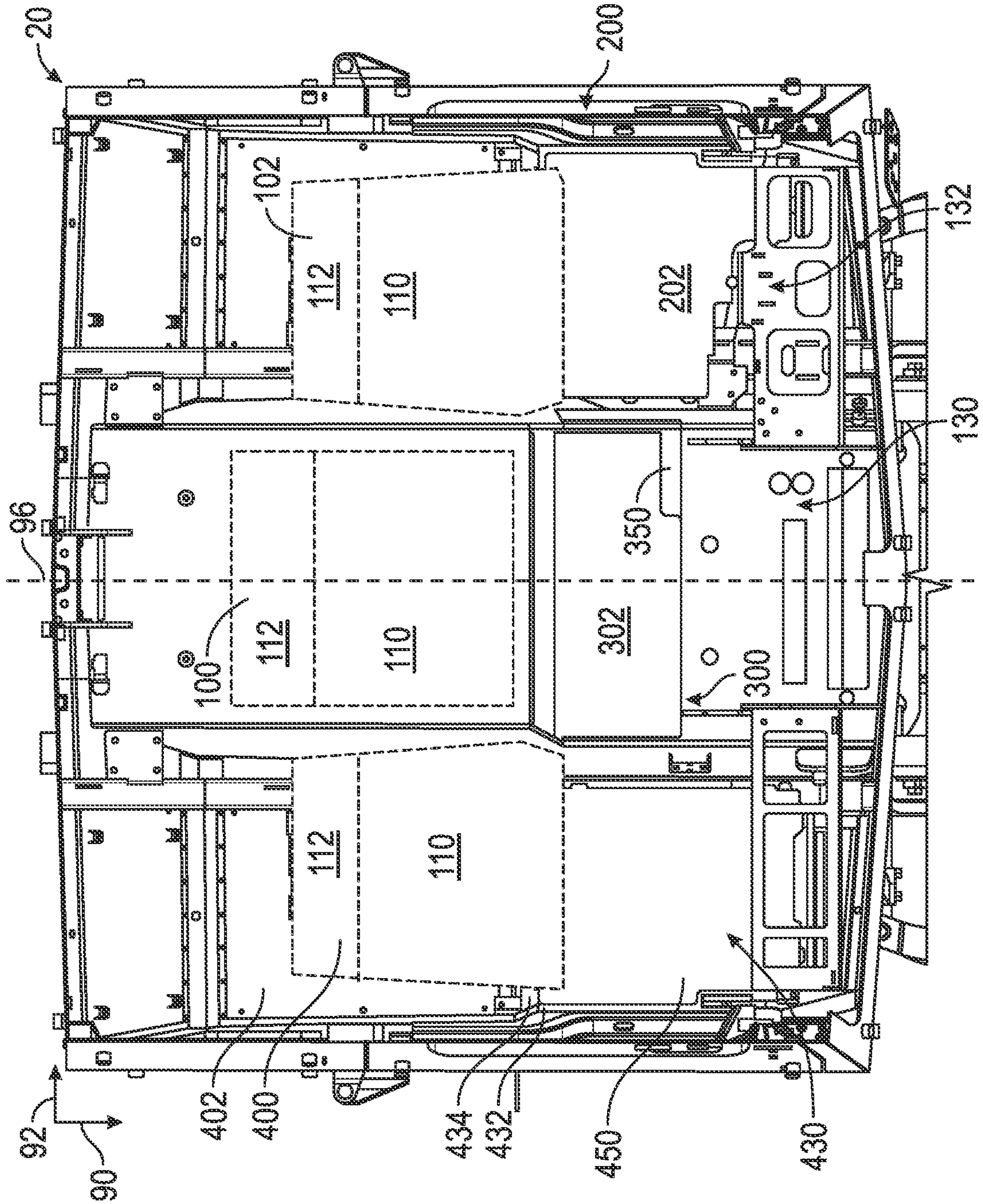
FIG. 8 is a top view of the interior of a front cabin of FIG. 2 including an additional seat, according to an exemplary embodiment.
Figure 9:
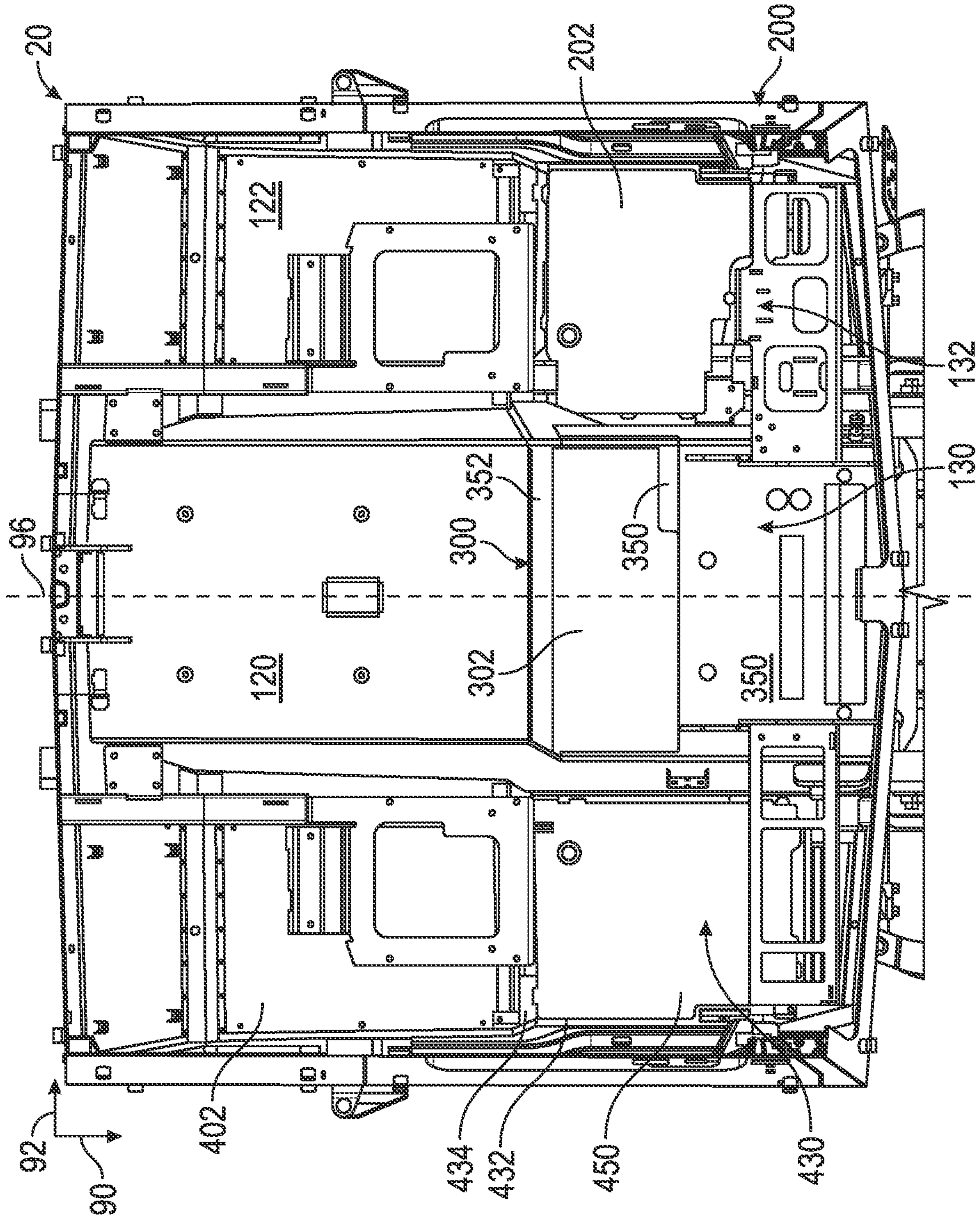
FIG. 9 is a top view of the interior of the front cabin of FIG. 2 with all of the seats removed, according to an exemplary embodiment.

Referring to FIGS. 8 and 9, the front cabin 20 further includes a seat 400 coupled to a floor section 402. A footwell 430 is defined in part by a bottom wall 432 and a rear wall 434 of the front cabin 20. The footwell 430 is configured to receive the feet and legs of an occupant seated in the seat 400. The seat 400, the floor section 402, and the footwell 430 are arranged symmetrically with the seat 102, the floor section 122, and the side footwell 132 across the center plane 96. The seat 400, the floor section 402, and the footwell 430 are substantially similar to the seat 102, the floor section 122, and the side footwell 132 except for being mirrored across the center plane 96. A blast mat 450 is positioned within the footwell 430. The blast mat 450 may be substantially similar in construction to the blast mat 200. The blast mat 450 may be differently shaped than the blast mat 200 to facilitate placement thereof around components within the footwell 430. By way of example, the blast mat 450 may have a bottom surface and/or projections that are shaped to correspond with the top surfaces of a front wall, the bottom wall 432, and the rear wall 434 of the footwell 430 such that a top surface of the blast mat 450 is oriented parallel to a horizontal plane.

Vehicle Armor Improvements

Figure 18:
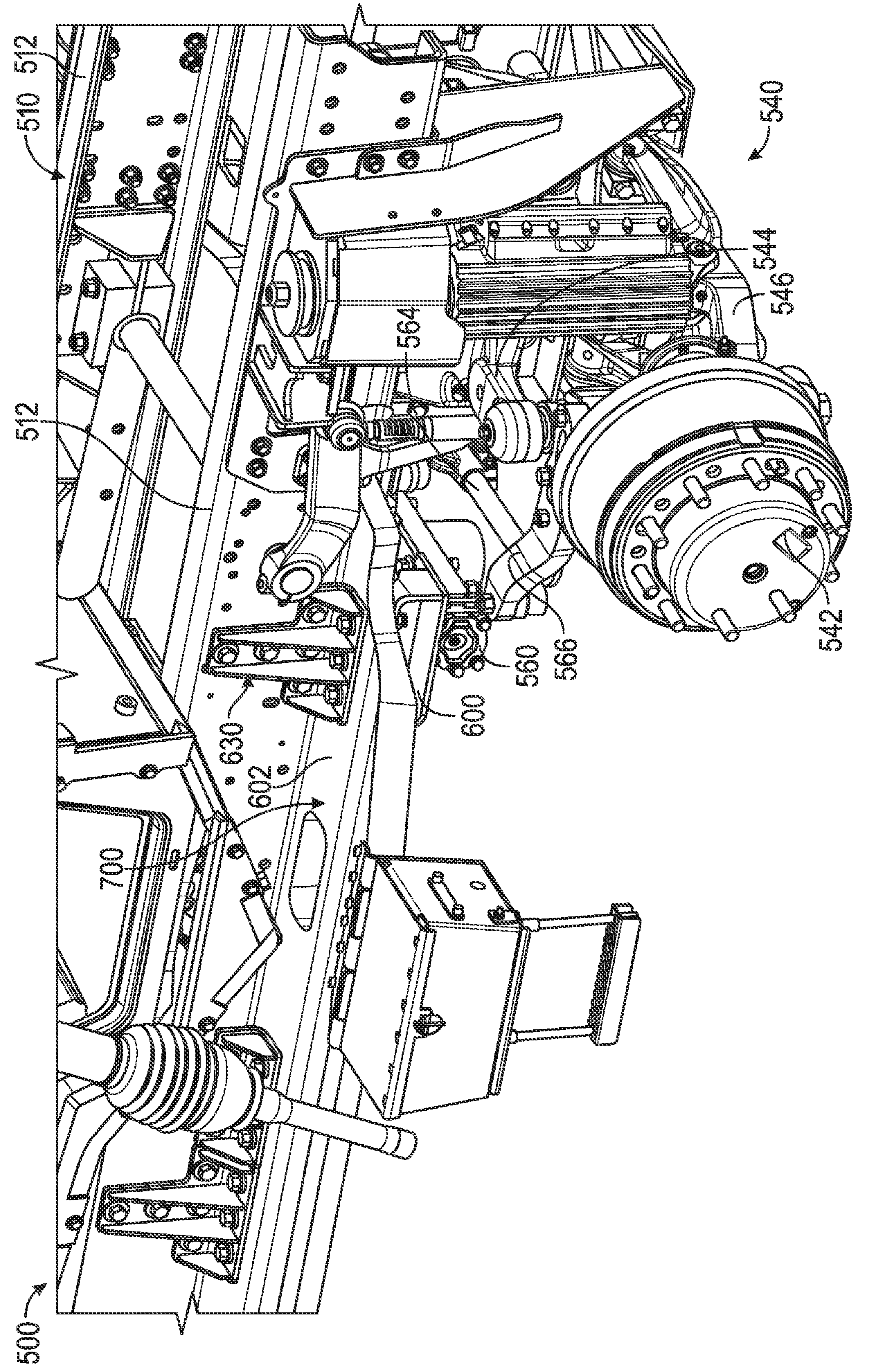
FIG. 18 is another perspective view of the vehicle of FIG. 17, according to an exemplary embodiment.
Figure 19:
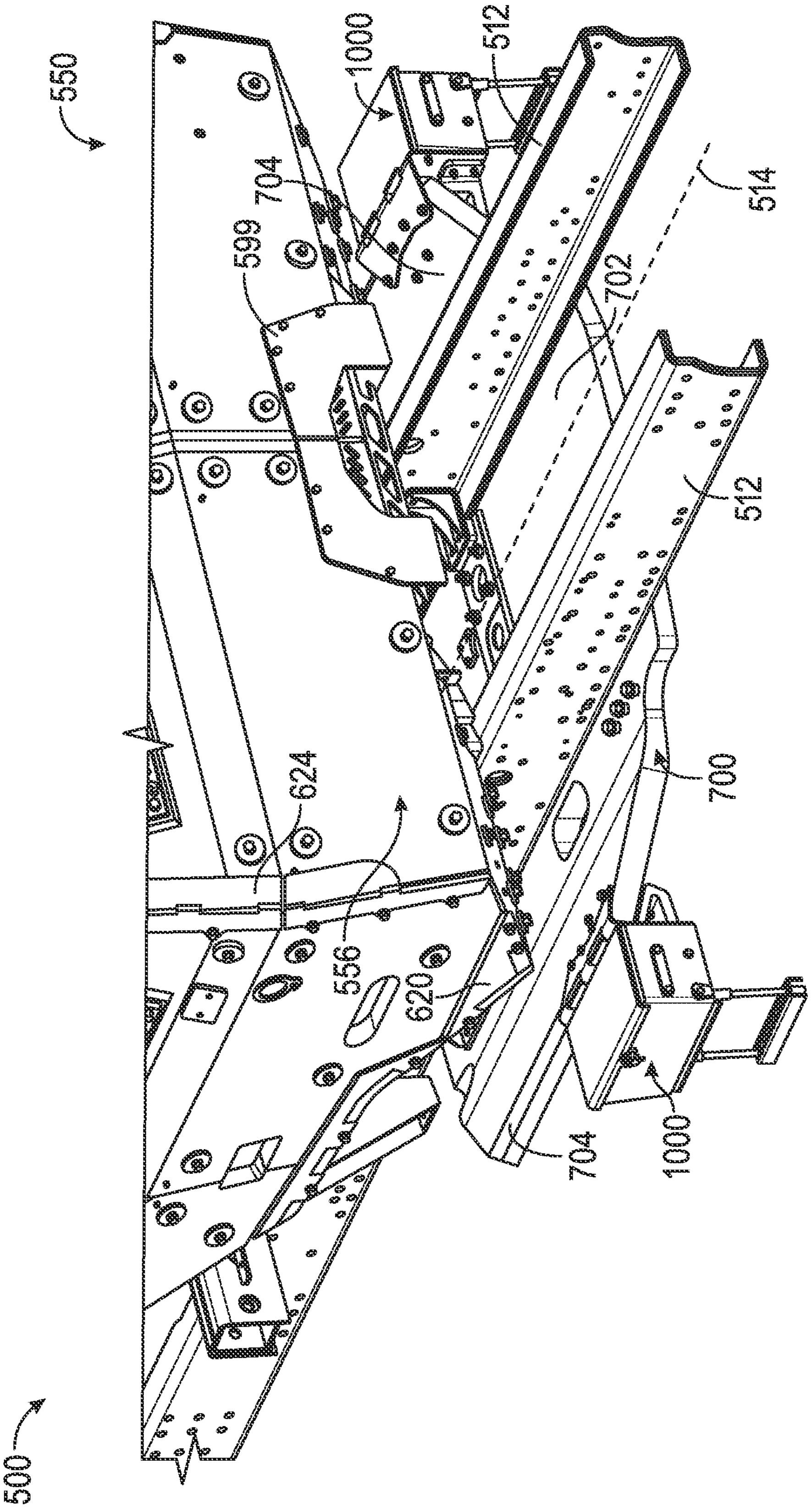
FIG. 19 is a perspective view of the vehicle of FIG. 17, with components of a suspension system removed, according to an exemplary embodiment.
Figure 20:
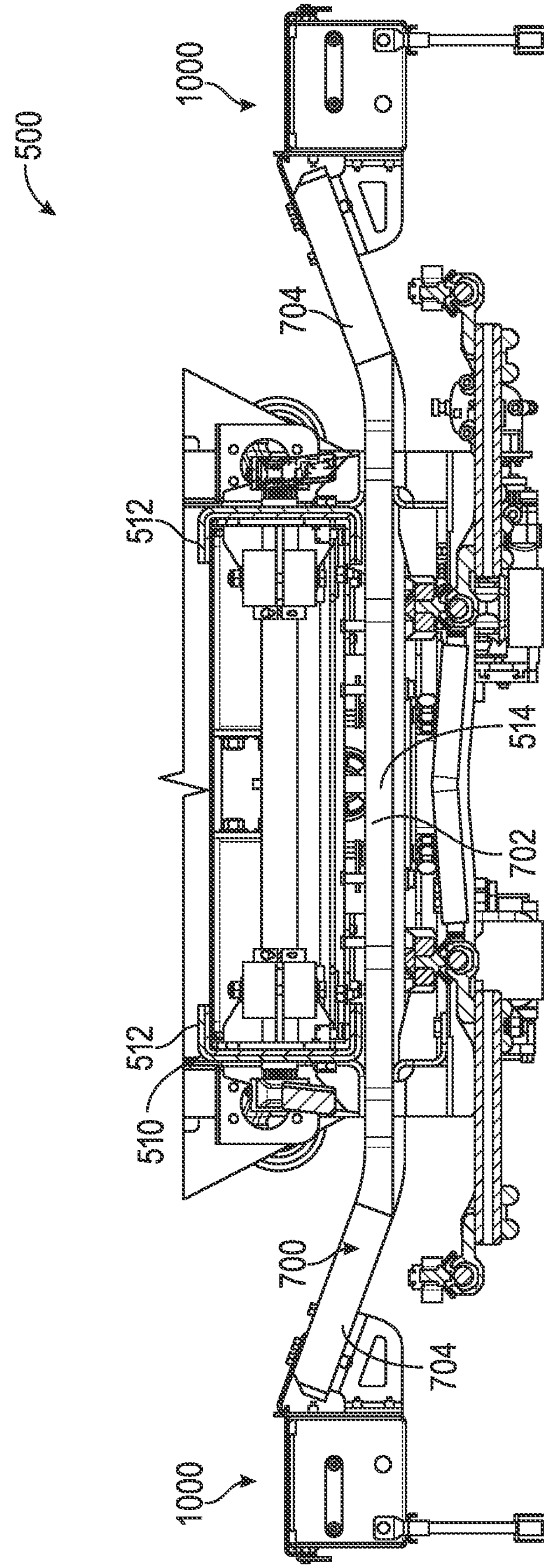
FIG. 20 is a section view of the vehicle of FIG. 17, according to an exemplary embodiment.
Figure 21:
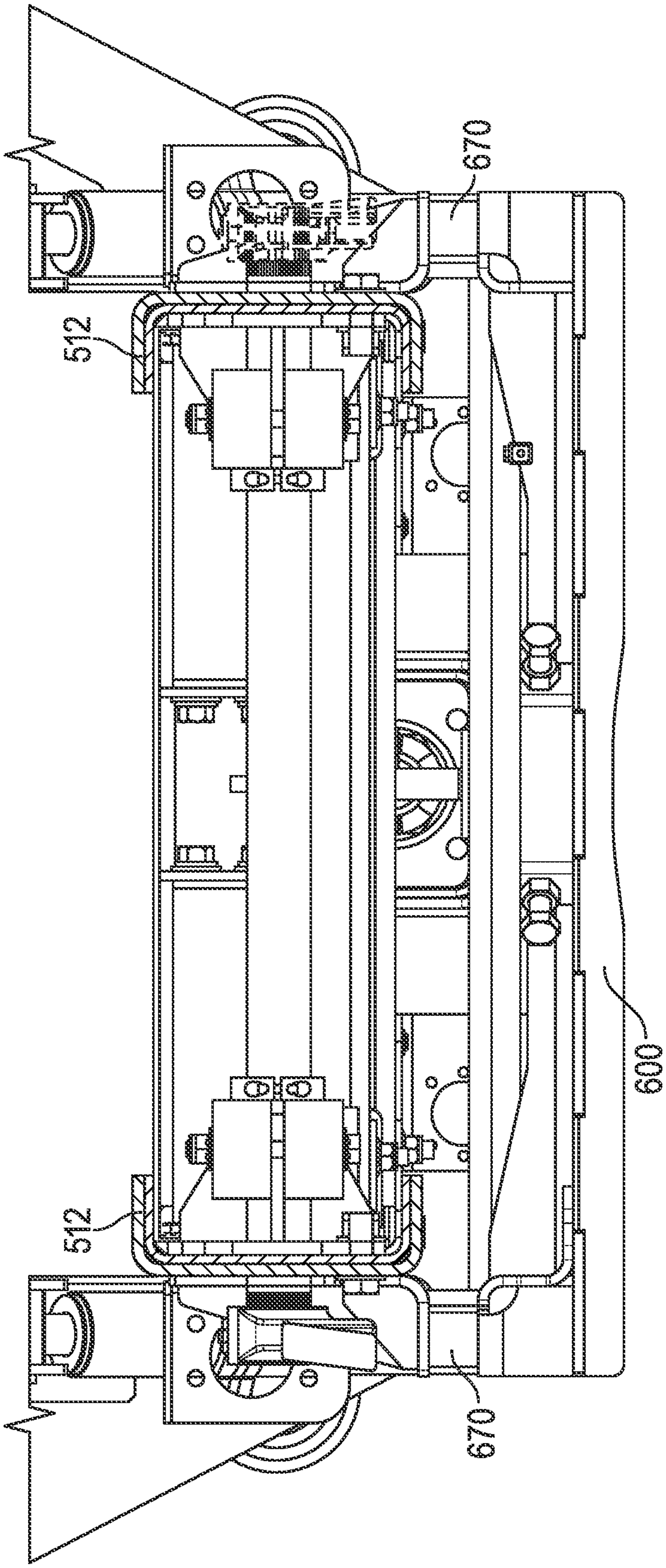
FIG. 21 is a section view of the vehicle of FIG. 14, according to an exemplary embodiment.

Referring to FIG. 18, a vehicle 500 includes a frame assembly, shown as frame 510. The vehicle 500 may be substantially similar to the vehicle 10 (shown in FIG. 1). The frame 510 may include a plurality of frame rails 512. The embodiment of FIG. 10 includes a pair of longitudinally-extending frame rails 512. The frame rails 512 may have a C-shaped cross section including a base section and two leg sections that are substantially perpendicular to the base section. Many components of the vehicle 500 couple to the base section of the frame rails 512, either directly or through another component such as a side plate, mounting bracket, etc. A longitudinal centerline 514 of the vehicle 500 is defined between the two frame rails 512 running parallel to the frame rails 512. A primary driver, shown as engine 530, is located along the longitudinal centerline 514. Coupled near a front end of the frame rails 512 is a front cabin 550. The front cabin 550 is disposed above the engine 530. In the embodiment shown in FIG. 10, the front cabin 550 is rotatable relative to the frame 510 between an in-use position and a maintenance position. In the in-use position, front cabin 550 is oriented approximately parallel to the frame 510, and the vehicle 500 may be driven normally. In the maintenance position, the front cabin 550 is rotated upwards to facilitate access to the engine 530. Referring to FIGS. 19-21, an arch-shaped recess is disposed on a bottom side 549 of the front cabin 550, shown as tunnel 552. As shown in FIGS. 19-21, the tunnel 552 extends rearward from the front wall 556. As shown in FIGS. 19-20, the front end of the tunnel 552 is defined by a cutout 554 in a front wall 556 of the front cabin 550. The engine 530 (shown in FIG. 10) is received by the tunnel 552 when the front cabin 550 is in the in-use position. The tunnel 552 facilitates the front cabin 550 sitting lower on the frame 510, lowering the center of gravity of the vehicle 500.

Referring again to FIG. 10, the vehicle 500 is reconfigurable from a lightly armored or unarmored configuration (i.e., an A-kit configuration) to a more heavily armored configuration (i.e., a B-kit configuration). In the A-kit configuration, the vehicle 500 may be relatively lightly armored. In the B-kit configuration, various armor components provide additional protection to the occupants of the vehicle 500. In the A-kit configuration, the protection the vehicle 500 is reduced, which is suitable for low-risk situations. In the B-kit configuration, the protection of the vehicle 500 is increased, which is suitable when traveling in an area where a blast event is more likely. Having the vehicle 500 easily reconfigurable between an A-kit configuration and a B-kit configuration increases the utility of the vehicle 500, facilitating dynamic use thereof in multiple situations. Additionally, expeditious reconfigurability facilitates having a relatively small number of armor kits that may be used on any vehicle in a fleet, as opposed to permanently outfitting every vehicle with armor.

Figure 11:
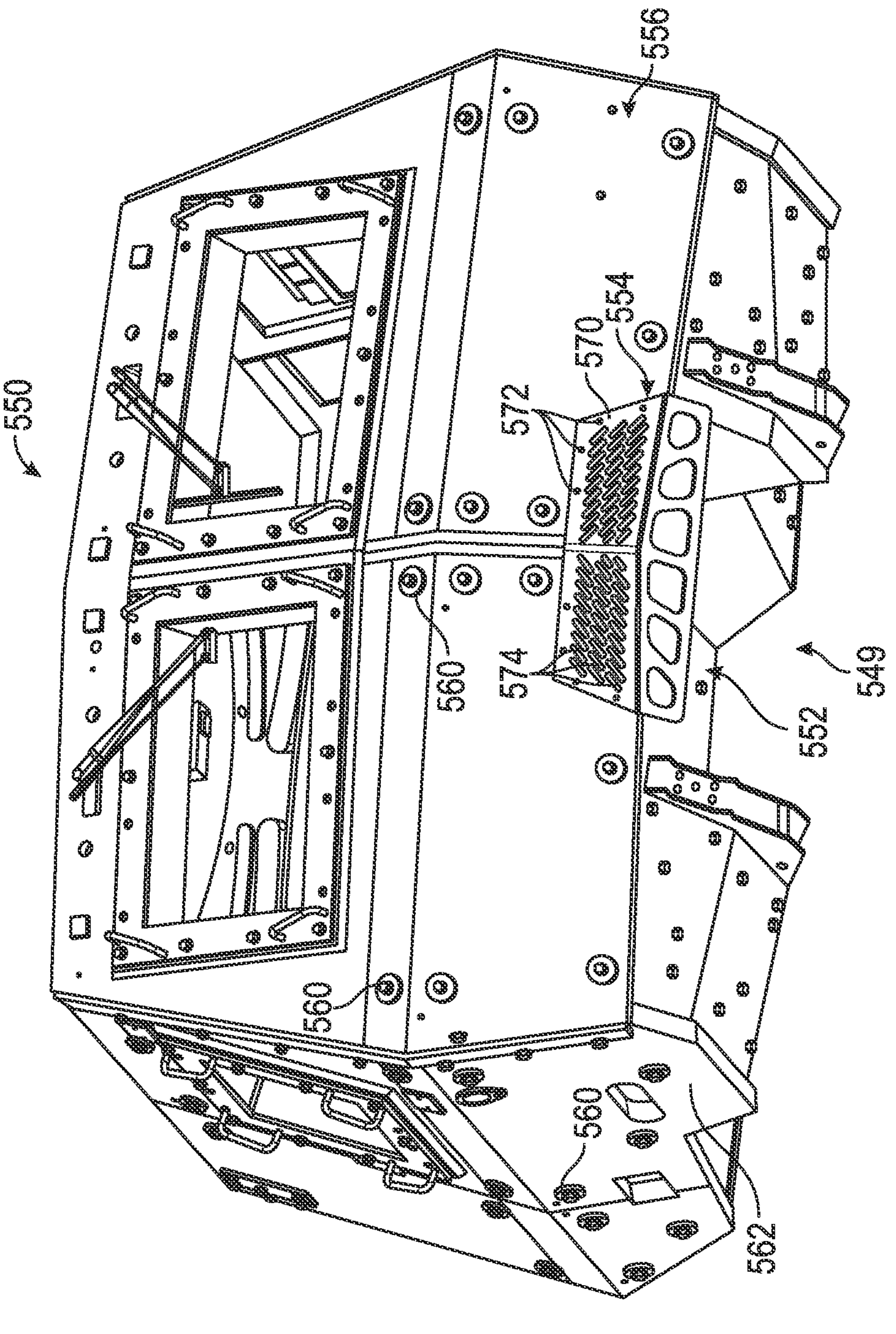
FIG. 11 is a perspective view of a front cabin of a vehicle, according to an exemplary embodiment.
Figure 12:
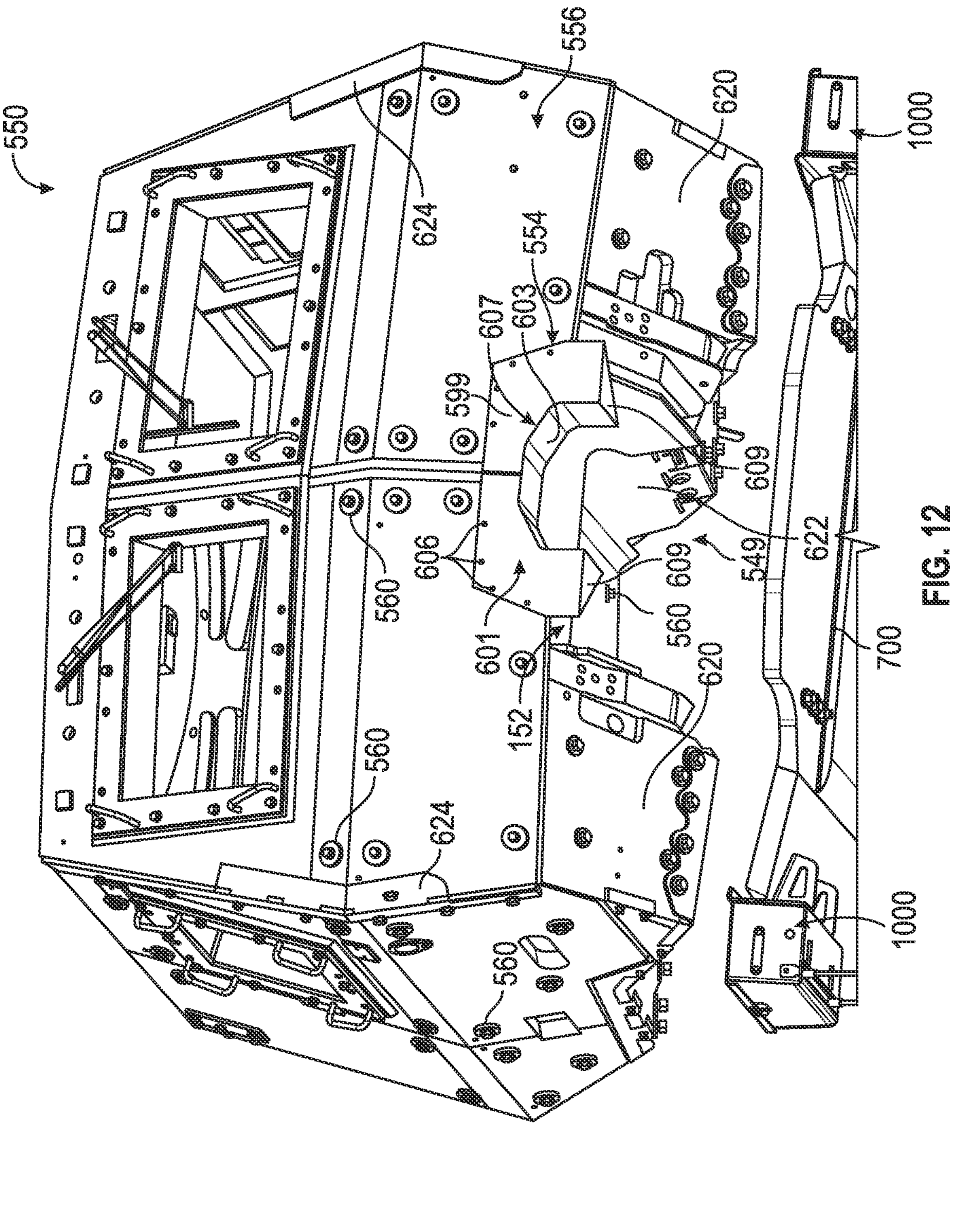
FIG. 12 is a perspective view of a front cabin of a vehicle in a B-kit configuration, according to an exemplary embodiment.

In the embodiment shown in FIGS. 11-12, the front cabin 550 includes a plurality of bosses 560 extending from the exterior surfaces of the front cabin 550. In the B-kit configuration, a set of overlapping armor plates (not shown) are configured to be coupled to the bosses 560 (e.g., via a threaded connection). These overlapping armor plates increase the overall thickness of the walls of the front cabin 550, increasing the degree of protection afforded to the occupants. The overlapping armor plates cover the front walls 556 of the front cabin 550 as well as the side walls 158 of the front cabin 550.

Figure 10:
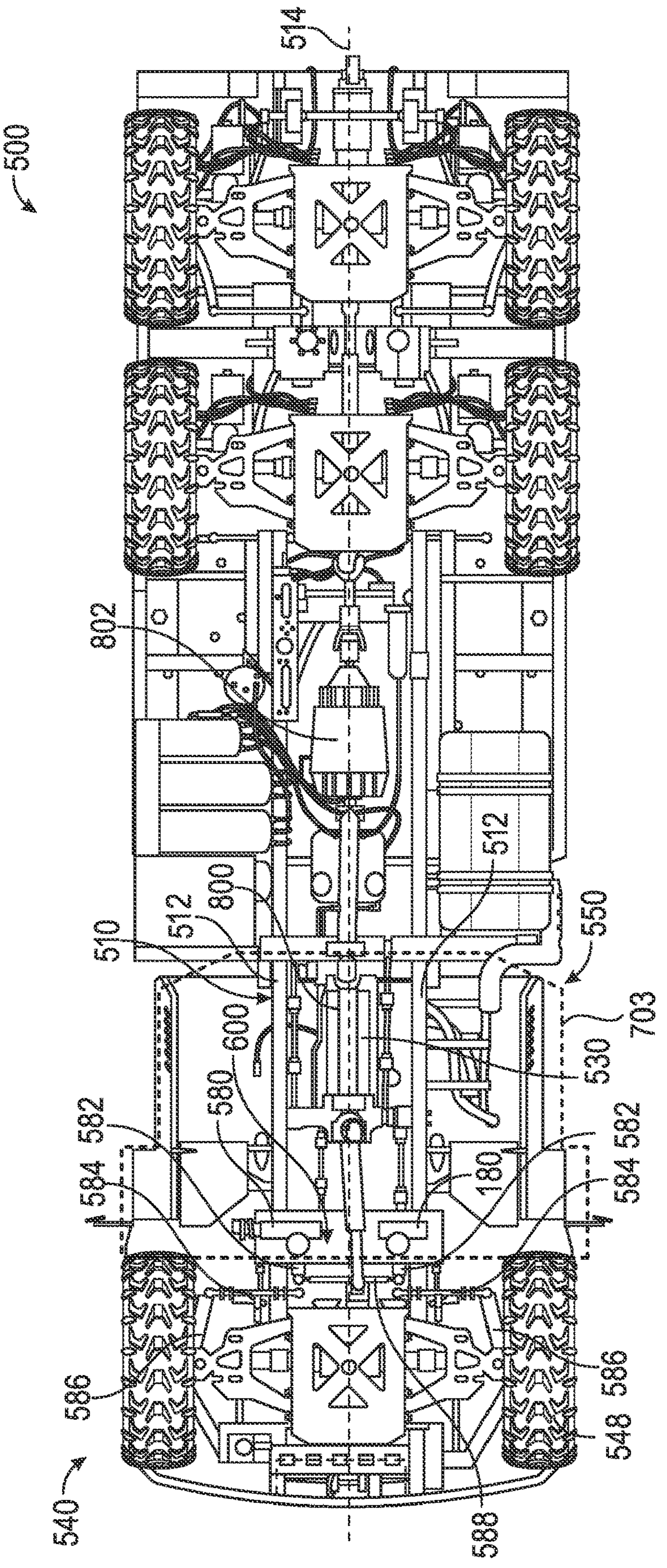
FIG. 10 is a bottom view of a vehicle, according to an exemplary embodiment.

In the embodiment of FIG. 11 a tunnel guard 570 is coupled to the front end of the tunnel 552. As shown in FIG. 11, the tunnel guard 570 is a single flat piece of material coupled to the front wall 556. A number of bolts run through apertures 572 defined near the perimeter of the tunnel guard 570 and through corresponding apertures in the front wall 556 of the front cabin 550. The tunnel guard 570 provides some protection to the front cabin 550 from blasts originating in front of the front cabin 550. The tunnel guard 570 also includes a number of ventilation holes 574 (e.g., to facilitate airflow through the tunnel 552 and across the engine 530, which is shown in FIG. 10). As shown in FIG. 12, in another embodiment a tunnel guard 599 does not include ventilation holes (and may be placed over the existing tunnel guard 570). The tunnel guard 599 includes a front portion, shown as front plate 601, coupled to a rear portion, shown as tunnel portion 603. The front plate 601 defines a set of mounting apertures 205 arranged in the same relative locations as the apertures 572 of FIG. 11. The tunnel guard 599 can be coupled to the front wall 556 similarly to the tunnel guard 570 of FIG. 11. The front plate 601 defines a cutout 607 that is arch-shaped similarly to the tunnel 552, however, the cutout 607 is smaller than the tunnel 552. Other than the mounting apertures 205 and the cutout 607, the front plate 601 is solid. The tunnel portion 603 extends rearward from the front plate 601 into the tunnel 552. The tunnel portion 603 is formed such that an inside wall of the tunnel portion 603 matches the shape of the cutout 607. A number of ribs 609 extend between the tunnel portion 603 and the front plate 601, increasing the structural rigidity of the tunnel guard 599.

Figure 13:
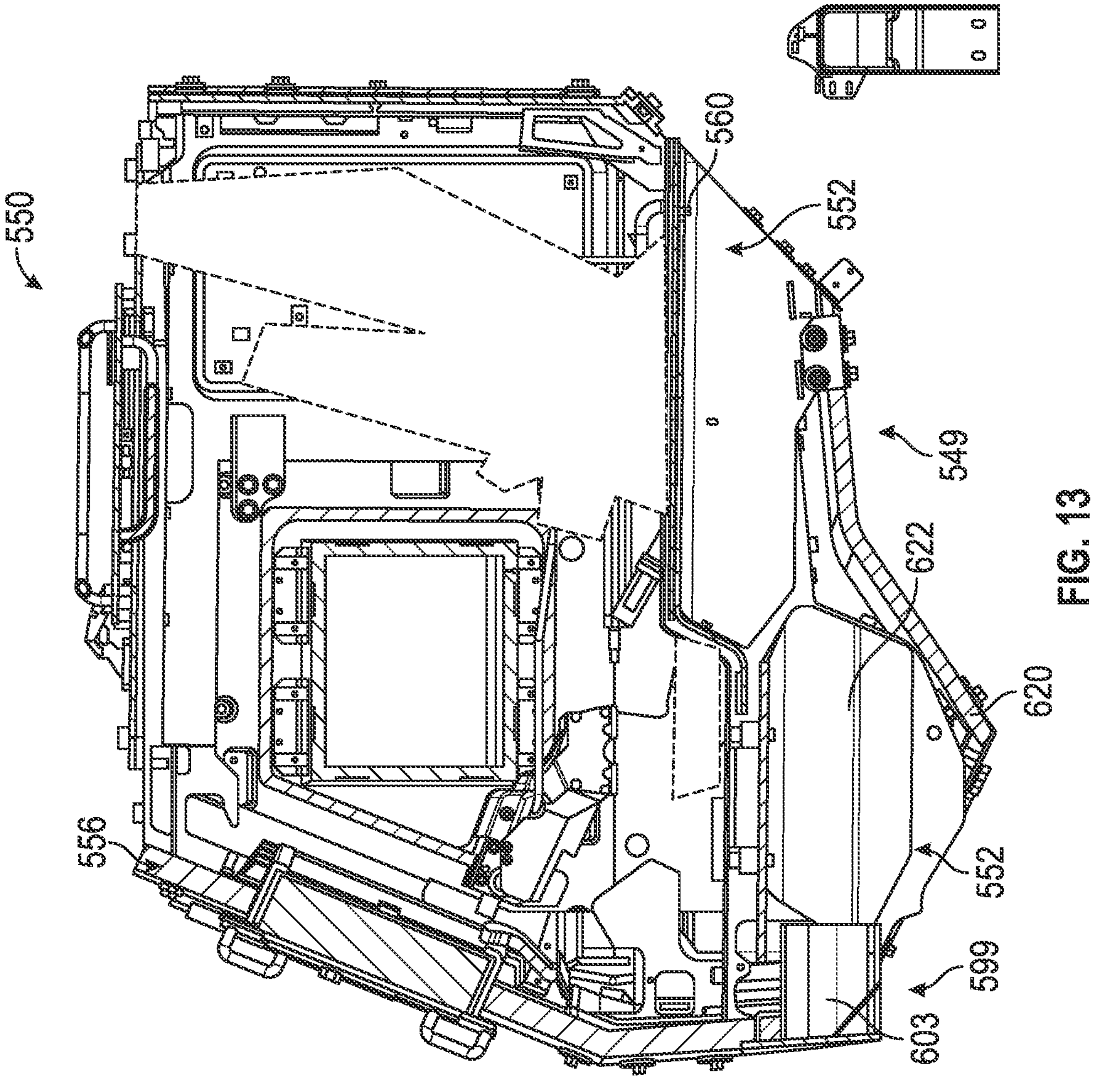
FIG. 13 is a section view of the front cabin of FIG. 12, according to an exemplary embodiment.

As shown in the embodiment of FIG. 12, in the B-kit configuration the front cabin 550 is coupled to a number of lower armor panels 620, a tunnel armor panel 622, and a number of corner armor panels 624. Like the overlapping armor panels 562, any of the lower armor panels 620, tunnel armor panel 622, and corner armor panels 624 may be coupled to the bosses 560. As shown in FIG. 12, the lower armor panels 620 are disposed on the bottom side 549 of the front cabin 550. A side view of the lower armor panels 620, at a cross-section through the front cabin 550, is shown in FIG. 13. The lower armor panels 620 increase the protection afforded to the occupants from a blast originating underneath the front cabin 550. As shown in FIG. 12, the corner armor panels 624 are disposed on both the front wall 556 and the side wall 556 simultaneously. The corner armor panels 624 increase the blast resistance of the corners of the front cabin 550, where overlapping armor plates 562 on the side walls 158 of the front cabin 550 meet with the overlapping armor plates 562 on the front walls 556 of the front cabin 550. As shown in FIGS. 12 and 13, the tunnel armor panel 622 is coupled to the front cabin 550 via a number of bosses 560 extending from an upper surface of the tunnel 552. As shown in FIG. 13, the tunnel armor panel 622 extends along a portion of the tunnel 552 such that there is a gap between the tunnel armor panel 622 and the front wall 556. The tunnel portion 603 of the tunnel guard 599 extends across this gap, between the front wall 556 and the tunnel guard 599. The tunnel guard 599 supplements the blast protection afforded to the front cabin 550 by the overlapping armor plates 562, providing protection from blasts originating in front of and below the front cabin 550. The B-kit may provide additional armor (e.g., armor panels, transparent armor panels as windows of increased thickness and made with materials that absorb energy, etc.) to other areas of the vehicle as well (e.g., on the doors, walls, and windows of the cabin, etc.).

Figure 14:
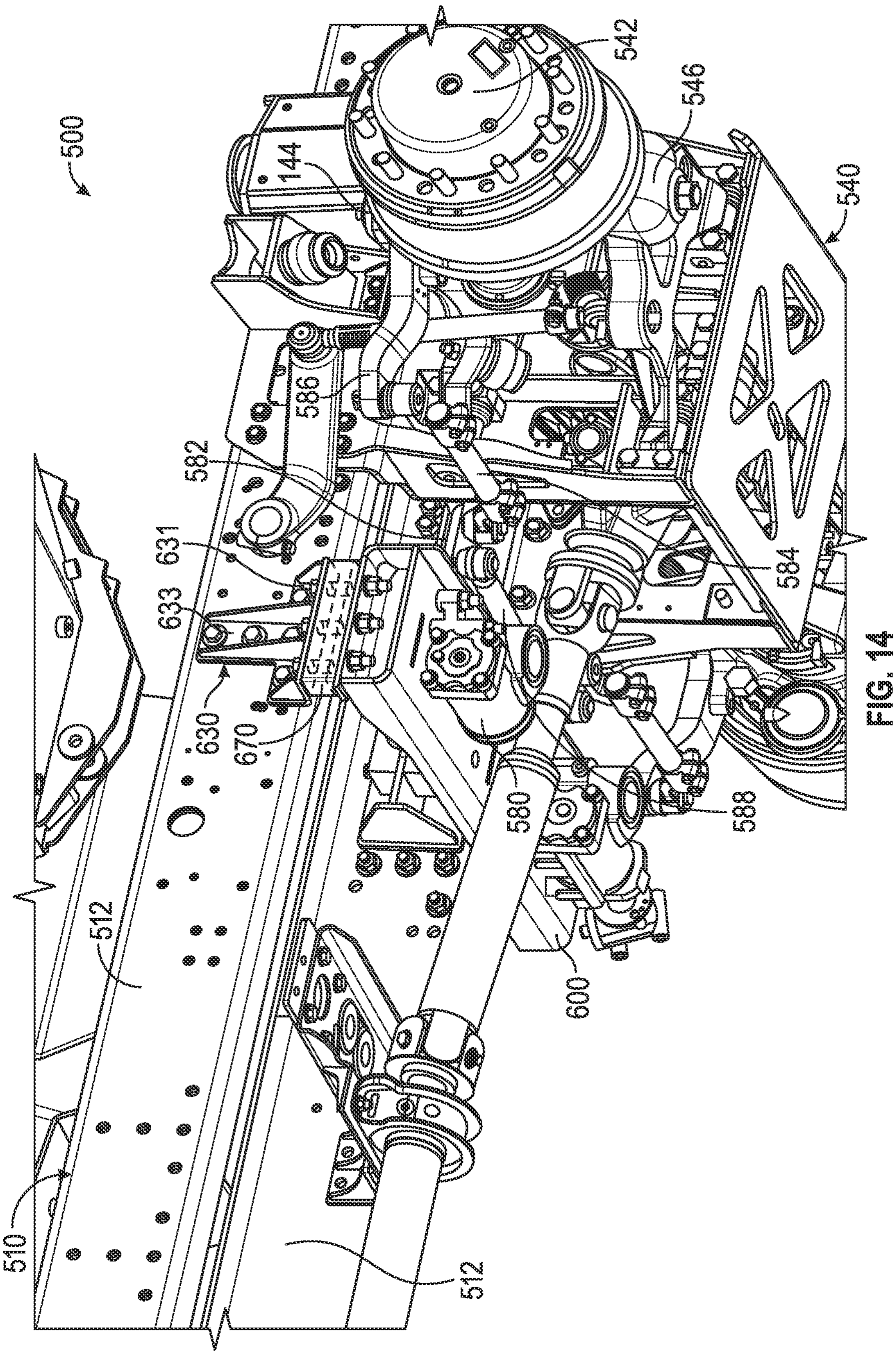
FIG. 14 is a perspective view of a vehicle in an A-kit configuration, according to an exemplary embodiment.

Returning now to FIG. 10, coupled near a front end of the frame rails 512 is a front tractive assembly 540. A prospective view of an embodiment of the front tractive assembly 540 for the vehicle 500 is shown in FIG. 14. As shown in FIG. 14, each side of the front tractive assembly 540 includes a wheel hub 542 coupled to an upper control arm 544 and a lower control arm 546. Each wheel hub 542 (shown in FIG. 10) supports a tractive element, shown as wheel and tire assembly 548, configured to contact the ground. As shown in FIGS. 10 and 14, a pair of actuators, shown as steering boxes 580, are configured to turn the wheel hubs 542 to facilitate steering of the vehicle 500. As shown in FIGS. 10 and 14, each steering box 580 is coupled to a wheel hub 542 with a first linkage, shown as arm 582, a second linkage, shown as tie rod 584, and a third linkage, shown as linkage 586. A fourth linkage, shown as connecting link 588, is rotatably coupled to both arms 582. In operation, each steering box 580 imparts a torque on its corresponding arm 582. The torque moves the tie rod 584, pulling or pushing one of the linkages 586. The linkages 586 move the hubs 542, causing the wheel hubs 542 and the wheel and tire assemblies 548 to turn. The connecting link 588 maintains a consistent distance between the arms 582, preventing one wheel and tire assembly 548 from turning without the other. In some embodiments, the lengths of the tie rods 584 are adjustable to modify the toe alignment of the wheel and tire assemblies 548.

Figure 15:
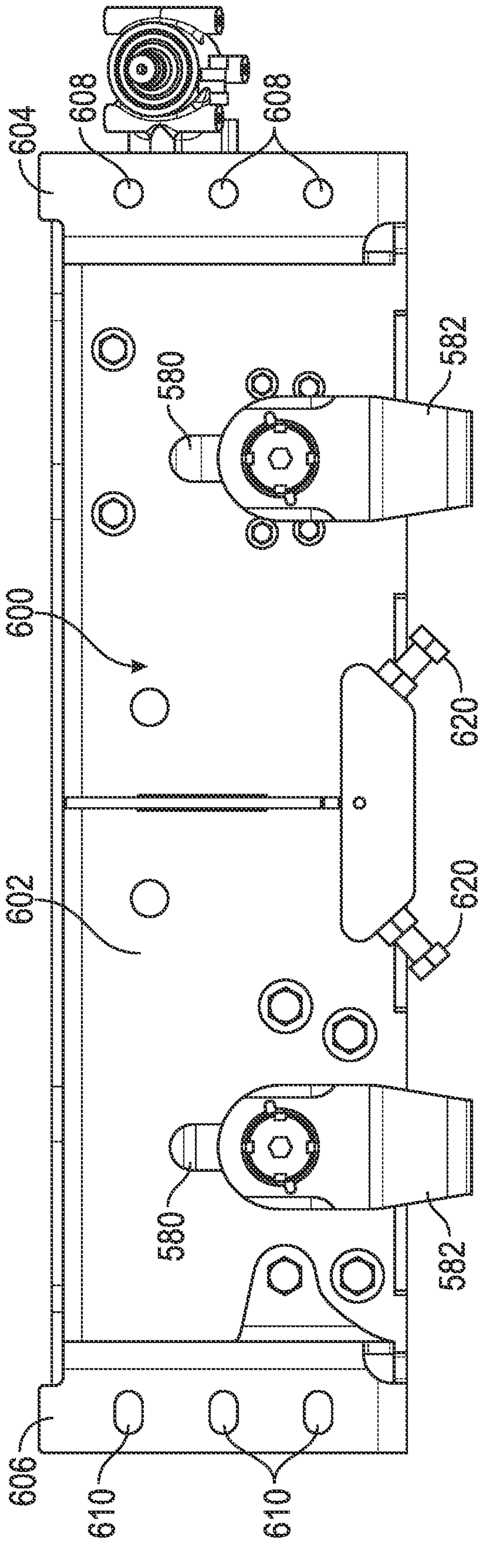
FIG. 15 is a top view of a steering tray of a vehicle, according to an exemplary embodiment.
Figure 16:
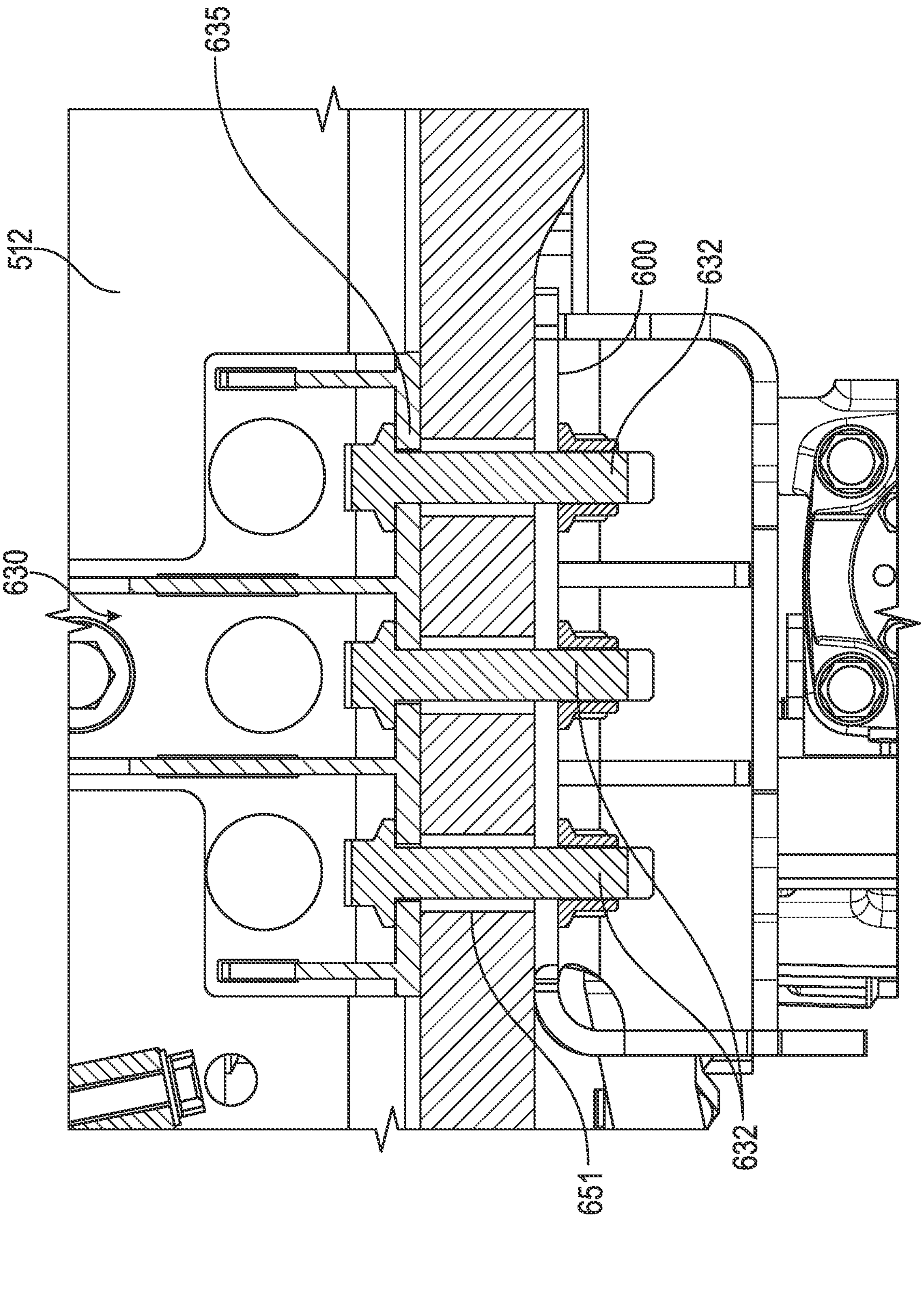
FIG. 16 is a section view of a steering tray of a vehicle, according to an exemplary embodiment.

Referring still to FIGS. 10 and 14, the steering boxes 580 are both coupled to a support, shown as steering tray 600. A bottom view of the steering tray 600 is shown in FIG. 15. As shown in FIG. 15, the steering tray 600 includes a first portion, shown as main portion 202. In one embodiment, the steering boxes 580 are coupled to the main portion 202 (e.g. rotatably coupled, etc.). A first protrusion, shown as first flange 604, is disposed at or near one end (e.g. a first end) of the main portion 202, and a second protrusion, shown as second flange 606, is disposed at or near an opposing end (e.g., a second end) of the main portion 202. The first flange 604 defines a first set of tray apertures 608 extending therethrough. The second flange 606 defines a second set of tray apertures 610 extending therethrough. A pair of stops 620 are coupled to, and extend from the main portion 202. The stops 620 are positioned such that they prevent movement of the arms 582 past predefined rotational positions. As shown in FIG. 14, the steering tray 600 is coupled to the frame rails 512 using a pair of brackets, shown as brackets 630. In the embodiment of FIG. 14, the brackets 630 are T-shaped. The brackets 630 are coupled (e.g., using bolts, etc.) to the base section of each frame rail 512. Each bracket 630 includes a horizontal portion 631 and a vertical portion 633 oriented in a direction that is substantially perpendicular to the horizontal portion 631. The horizontal portion 631 and the vertical portion 633 may be formed from a single bent piece of material. As shown, the horizontal portion 631 and the vertical portion 633 are coupled together via a number of ribs 236 that increase the structural rigidity of the bracket 630. As shown in FIG. 16, a number of fasteners, shown as bolts 632, pass through bracket apertures 635 defined in the brackets 630 and the tray apertures 608 and 610 (shown in FIG. 15) of the steering tray 600, thereby coupling the steering tray 600 to the frame 510.

Figure 17:
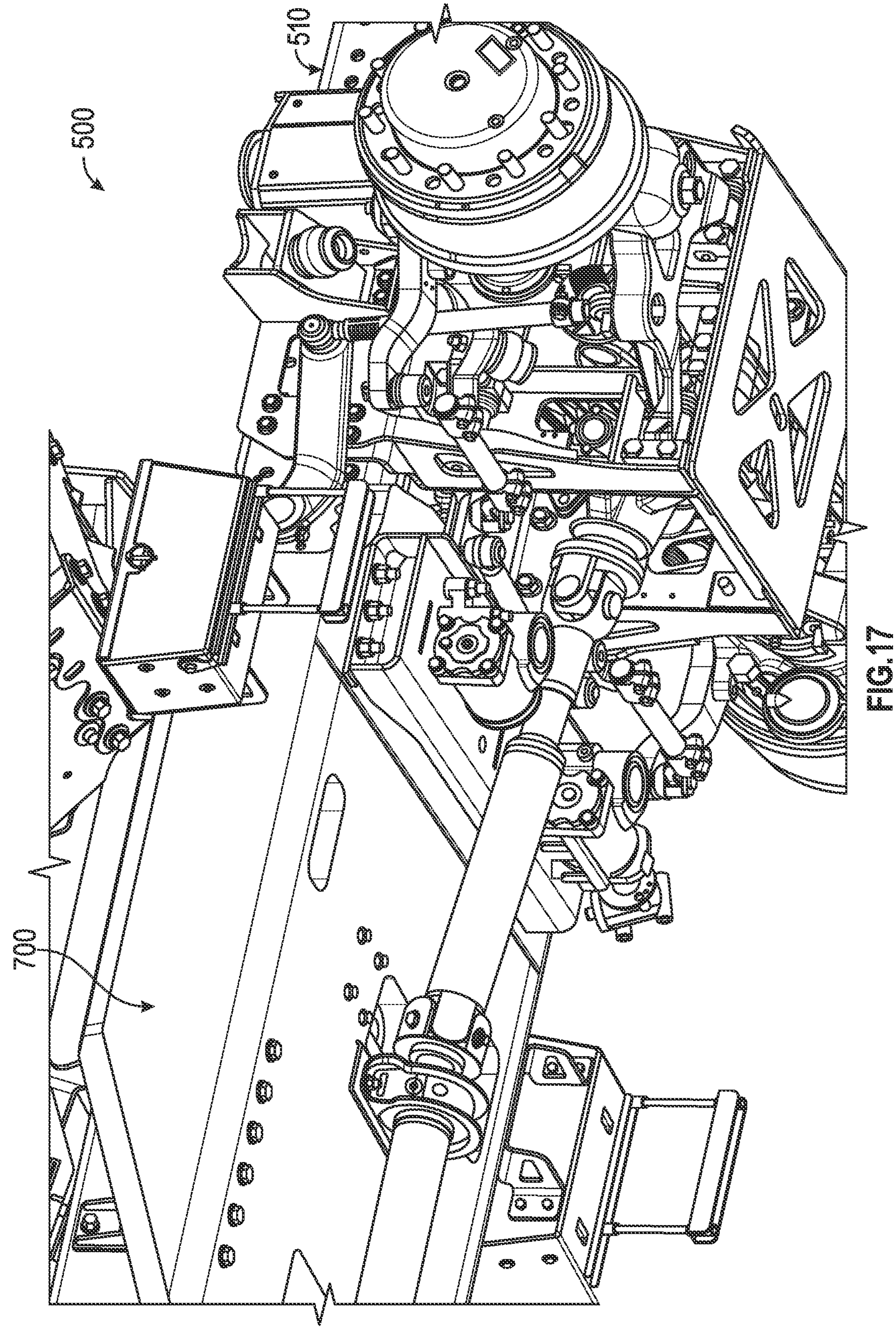
FIG. 17 is a perspective view of the vehicle of FIG. 14 in a B-kit configuration, according to an exemplary embodiment.

To provide additional protection against an underbody blast event, in the B-kit configuration, the vehicle 500 includes one or more underbody armor panels. A prospective view of an embodiment of the front tractive assembly 540 in a B-kit configuration is shown in FIGS. 17 and 18. A prospective view of the front cabin 550 is shown in FIG. 19. As shown in FIGS. 17-19, the vehicle 500 includes an underbody armor panel 700. In an embodiment, the underbody armor panel 700 is disposed directly underneath the front cabin 550. As shown in FIG. 19, the underbody armor panel 700 extends underneath the frame 510 from near a front wall 556 of the front cabin 550 to near a rear end of the front cabin 550 of the vehicle 500 (e.g., the front cabin 20, etc.). In alternative embodiments, the underbody armor panel 700 may have a greater or lesser length along the longitudinal centerline 514. In some embodiments, the underbody armor panel 700 has a uniform thickness throughout its entirety. In other embodiments, portions of the underbody armor panel 700 have varied thicknesses (e.g., to facilitate clearance around certain components). In some embodiments, the underbody armor panel 700 defines cutouts through which other components extend. Among the various benefits, the underbody armor panel 700 may protect passengers in the front cabin 550 and the engine 530 (shown in FIG. 10) from a blast originating from underneath the vehicle 500. As shown in the embodiment of FIG. 14, in the A-kit configuration, the underbody armor panel 700 is removed.

FIG. 500 shows a section view of the vehicle in a B-kit configuration. As shown in FIGS. 19-20, the underbody armor panel 700 is formed from a single piece (e.g., a single piece of material, multiple pieces of material formed together into one single piece) that forms a main section 702 and two side sections, shown as wings 704. The wings 704 are angled upwards relative to the main section 702. In some embodiments, the underbody armor panel 700 is made from aluminum. The angle of the wings 704 relative to the main section 702 deflects some of the blast to the sides of the vehicle 500 as opposed to absorbing the full energy of the blast into the underbody armor panel 700. FIG. 10 shows an approximate area 703 covered by the underbody armor panel 700, and FIG. 17 shows the width of the underbody armor panel 700 relative to the frame 510. As shown in FIG. 17, the main section 702 of the underbody armor panel 700 extends in a lateral direction beyond (i.e., farther from the longitudinal centerline 514 than) the frame rails 512, and the wings 704 are located laterally beyond the frame rails 512. In some embodiments, the wings 704 extend to approximately the same lateral position and have approximately the same width as the front cabin 550. In other embodiments, the wings 704 extend laterally beyond the front cabin 550.

Referring to FIG. 18, the main section 702 of the underbody armor panel 700 is coupled to the each of the frame rails 512 via a bracket, shown as bracket 630 (may be the same as bracket 630 used to secure the steering tray 600 of FIG. 14). The horizontal portion 631 of the bracket 630 is attached (e.g. bolts) to a top surface of the main section 702. The vertical portion 633 of the bracket 630 is attached (e.g. bolts) to a vertical surface of the frame rail 512 (e.g., the surface opposite the longitudinal centerline 514, the base section of the C-shaped cross section of the frame rail 512, etc.). In the embodiment of FIG. 18, each frame rail 512 is coupled to the main section 702 via three brackets 630: one near the front of the underbody armor panel 700 and two arranged proximate one another near the rear of the underbody armor panel 700. This coupling arrangement facilitates the coupling of other components on the opposite side of the underbody armor panel 700 relative to the frame 510. In the B-kit configuration of FIG. 18, the underbody armor panel 700 is disposed between the brackets 630 and the steering tray 600. To facilitate coupling the steering tray 600 to the brackets 630, the underbody armor panel 700 defines a set of apertures, through which the bolts 632 extend; for example, panel apertures 651 shown in FIG. 16.

Figure 101:
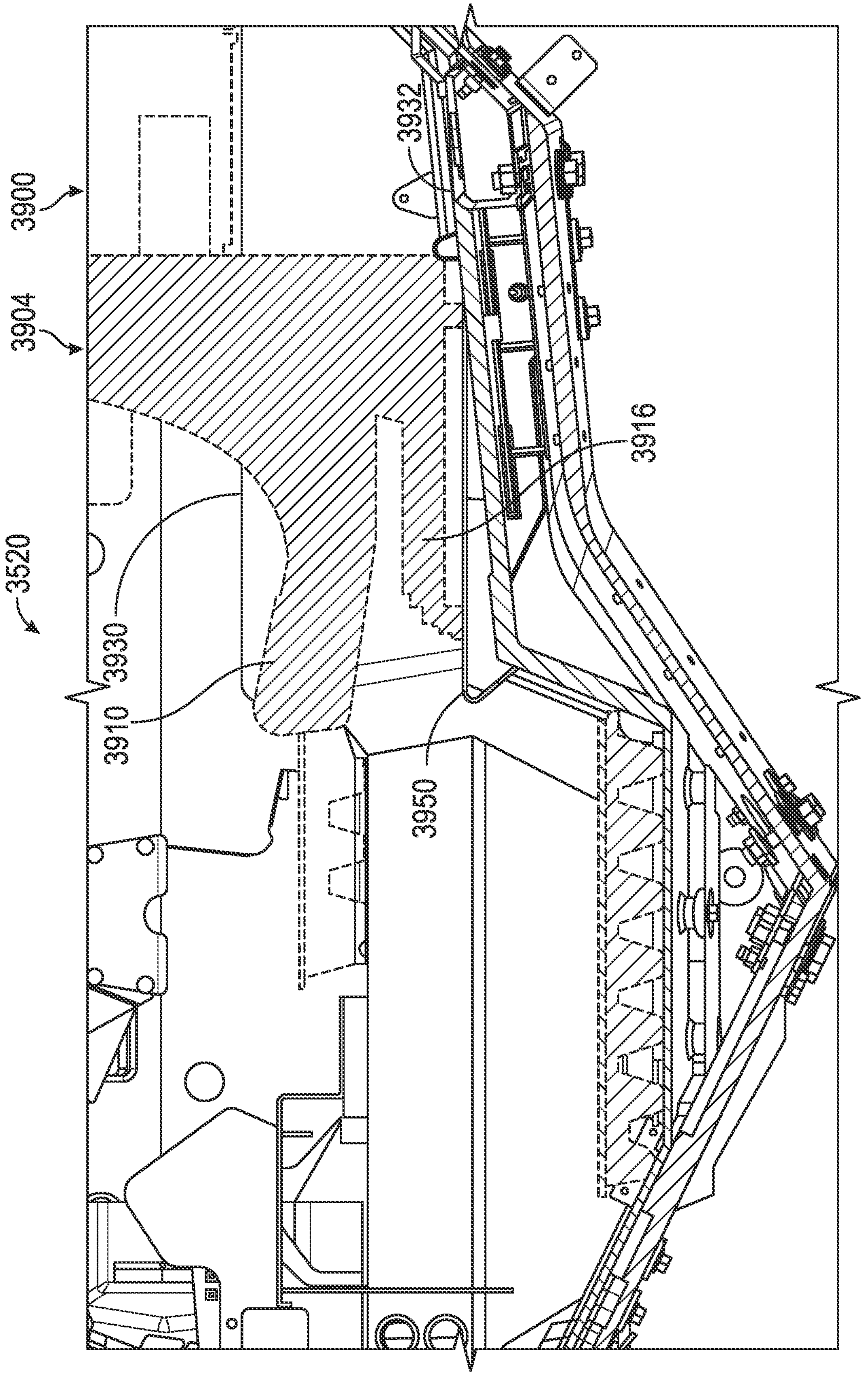
FIG. 101 is a side section view of the front cabin of FIG. 87, according to an exemplary embodiment.

FIG. 101 shows a sectional view of the A-kit configuration. As shown in FIGS. 14 and 21, the underbody armor panel 700 is removed and replaced with a pair of spacers 670, one on either side of the steering tray 600. As shown in FIG. 14, each spacer 670 defines a set of apertures (similar to the panel apertures 651 of FIG. 16) through which the bolts 632 extend (also see FIG. 16). As shown in FIGS. 14 and 21, the spacer 670 may have the same or a similar thickness as the underbody armor panel 700 such that the steering tray 600 maintains a similar vertical location relative to the rest of the vehicle 500, regardless of the configuration of the vehicle 500 (e.g., regardless of whether the vehicle 500 is in an A-kit configuration or a B-kit configuration, etc.). In the A-kit configuration shown in FIGS. 14 and 21, the spacer 670 is a structural member, coupling the steering tray 600 to the frame 510. In the B-kit configuration, shown in FIGS. 18 and 20, the underbody armor panel 700 is a structural member, coupling the steering tray 600 to the frame 510. The spacer 670 (FIG. 101) and the underbody armor panel 700 (FIG. 500) are replacements for one another, facilitating expeditious changes in reconfiguration of the vehicle 500 (e.g., without needing to adjust one or more features of the steering system to account for the lower position of the steering tray 600 when changing from the A-kit configuration to the B-kit configuration, etc.).

Referring to FIG. 15, the first set of tray apertures 608 and the second set of tray apertures 610 are specifically sized, shaped, positioned, etc. to facilitate removal and replacement of the steering tray 600 when changing the configuration of the vehicle 500. The first set of tray apertures 608 are sized to fit tightly around fasteners, shown as bolts 632 (shown in FIG. 16) in both the lateral and longitudinal directions with respect to the direction of travel of the vehicle 500 (e.g., a longitudinal direction oriented substantially parallel to the longitudinal axis 514 of the vehicle 500 as shown in FIG. 10, and a lateral direction that is substantially perpendicular the longitudinal axis 514 of the vehicle 500). The corresponding bracket apertures 635 (shown in FIG. 16) in the brackets 630 through which the bolts 632 extend may similarly be sized to fit tightly around bolts 632. This tight tolerance facilitates indexing the steering tray 600 with the bolts 632, reducing the risk of the steering tray 600 being misaligned with the frame 510 after changing the configuration of the vehicle 500. Conventionally, the first set of tray apertures 608 may have a looser, clearance fit with the bolts 632, allowing the position of the steering tray 600 to change when it is removed and replaced to switch between the A-kit and B-kit configurations. This change in position may traditionally require the steering system of the vehicle 500 to be realigned every time the configuration of the vehicle is changed.

The second set of tray apertures 610 are sized to fit tightly around bolts 632 longitudinally, but are slotted laterally. The lateral slotting of the second set of tray apertures 610 facilitates providing longitudinal alignment (similar to the first set of tray apertures 608) while facilitating use of the steering tray 600 frames 510 of varying widths (e.g., by design, due to manufacturing variances, etc.).

Figure 22:
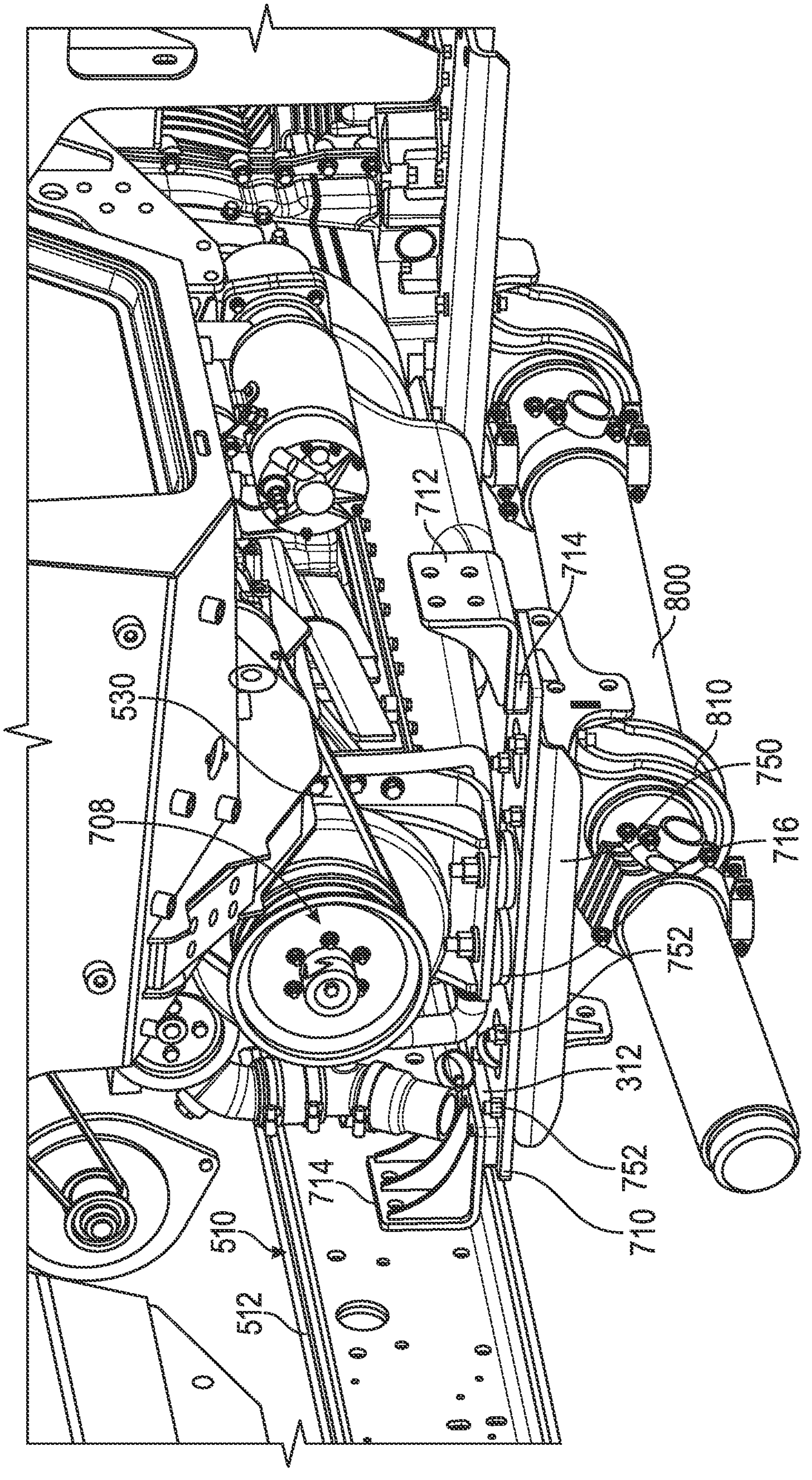
FIG. 22 is a perspective view of the vehicle of FIG. 14, near an engine, according to an exemplary embodiment.
Figure 23:
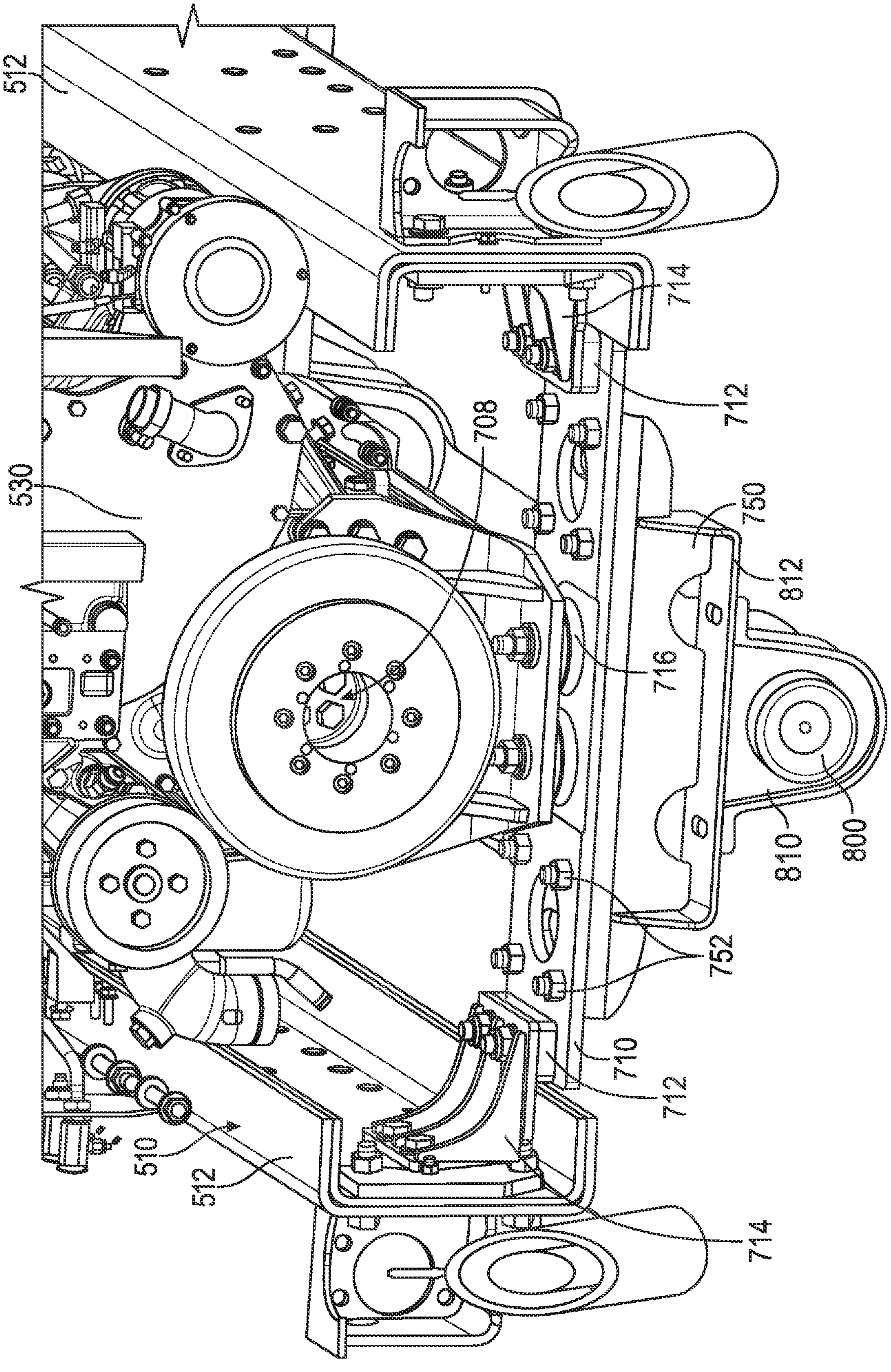
FIG. 23 is another perspective view of the vehicle of FIG. 14, near an engine, according to an exemplary embodiment.
Figure 24:
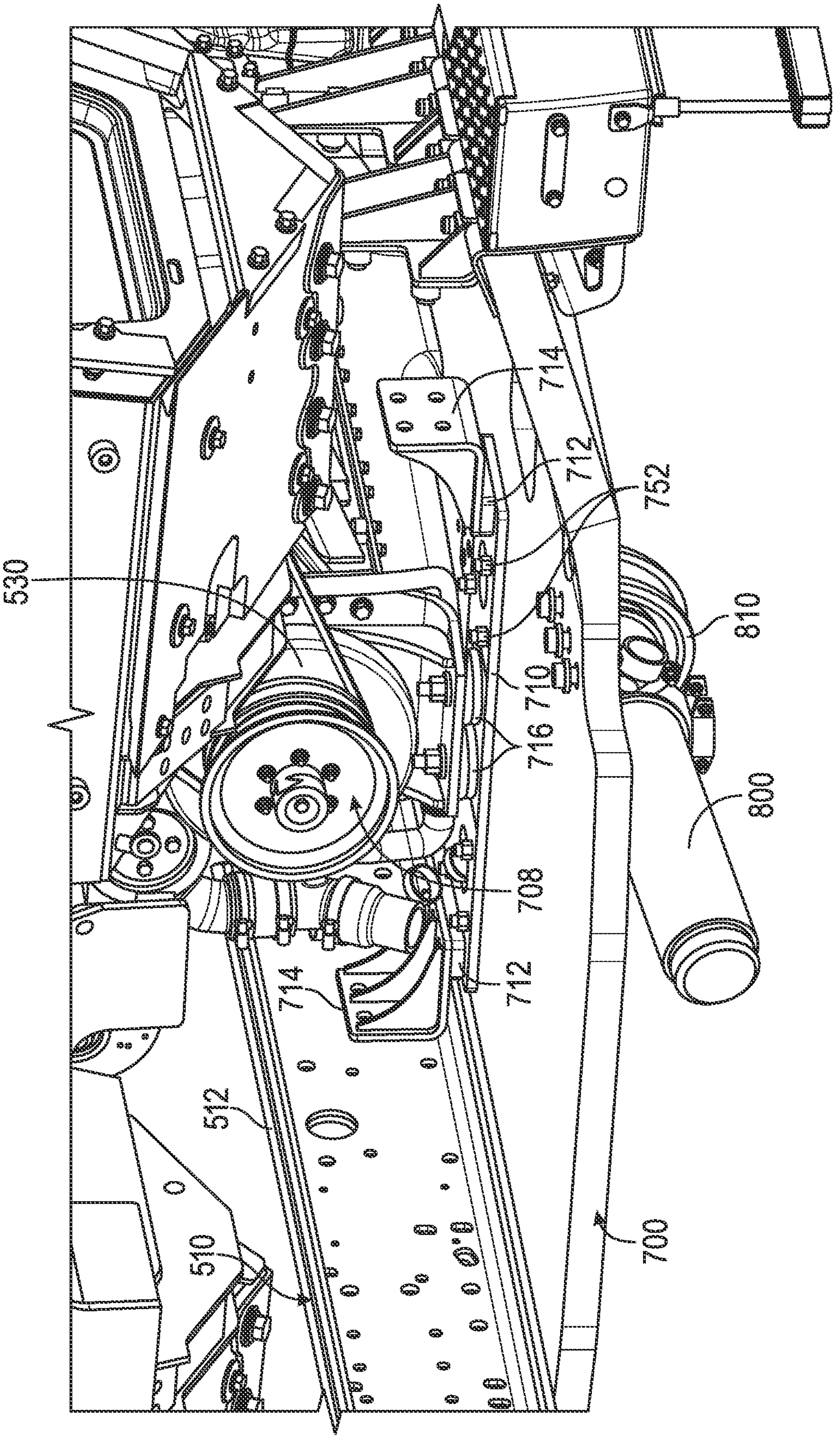
FIG. 24 is a perspective view of the vehicle of FIG. 17, near an engine, according to an exemplary embodiment.
Figure 25:
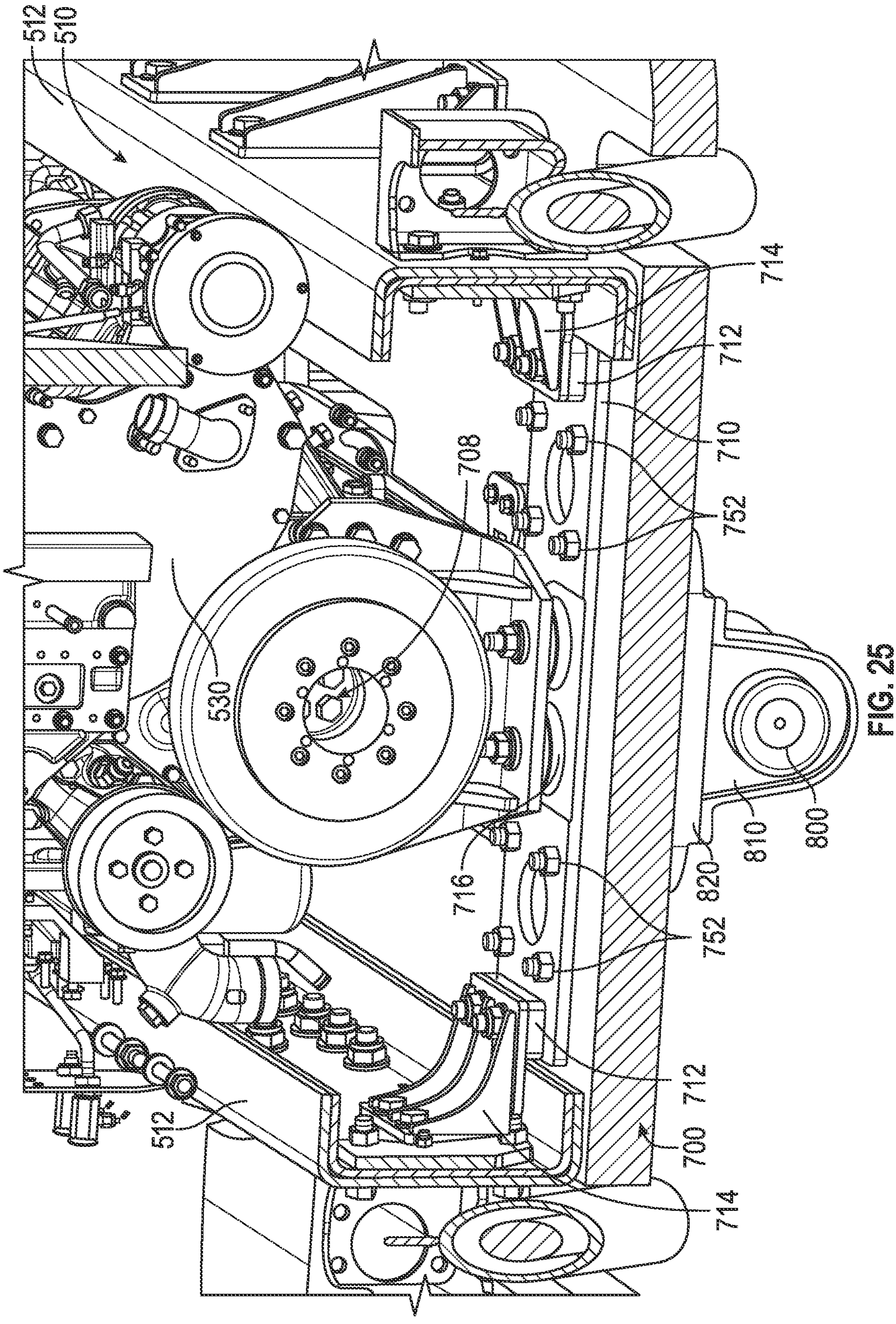
FIG. 25 is a section view through an armor component of the vehicle of FIG. 17 near an engine, according to an exemplary embodiment.

Referring back to FIG. 10, the vehicle 500 includes a primary driver, shown as engine 530. As shown, the engine 530 is disposed between the frame rails 512 and rearward of the front tractive assembly 540. FIGS. 22-25 show prospective views of the engine 530. FIGS. 22 and 23 show prospective views of the engine 530 in the A-kit configuration, while FIGS. 24 and 25 show prospective views of the engine 530 in the B-kit configuration. As shown in FIGS. 22-25, a front end 708 of the engine 530 is held by a support, shown as backing plate 710. The backing plate 710 is coupled to the internal surfaces of the base sections of both frame rails 512 with offset spacers 712 and mounting brackets 714. The mounting brackets 714 are coupled to the frame rails 512, and the offset spacers 712 are positioned to adjust the vertical location of the backing plate 710. The engine 530 is coupled to the backing plate 710 with isolation mounts 716. The isolation mounts 716 include a flexible portion that absorbs some vibration, preventing some of the vibration from the engine 530 from traveling into the frame 510. In some embodiments, the backing plate 710, mounting brackets 714 and offset spacers 712 are sized, shaped, configured, etc. to support the static load of the engine 530 (e.g., the weight of the engine 530 when the vehicle 500 is stationary, etc.) but not the dynamic load of the engine 530 (e.g., the force required to hold the engine 530 in place when the vehicle 500 is driving and/or encountering obstacles, etc.).

Referring to FIGS. 24 and 25, in the B-kit configuration, the underbody armor panel 700 extends underneath the backing plate 710. In some embodiments, the portion of the underbody armor panel 700 underneath the backing plate 710 and the portion of the underbody armor panel 700 coupled to the steering tray 600 are separate armor panels. As shown in FIGS. 24 and 25, the backing plate 710 is coupled directly to the underbody armor panel 700. The direct coupling of the underbody armor panel 700 to the backing plate 710 facilitates the underbody armor panel 700 cooperating with the backing plate 710 to support the dynamic load of the engine 530. Referring to FIGS. 22 and 23, in the A-kit configuration, the underbody armor panel 700 is omitted, and the vehicle 500 includes a spacer, shown as framework 750. The backing plate 710 is coupled directly to the framework 750. The direct coupling of the framework 750 and the backing plate 710 facilitates the framework 750 cooperating with the backing plate 710 to support the dynamic load of the engine 530. As shown in FIGS. 22 and 23, the framework 750 may have various shapes, but generally includes a portion with a relatively large vertical thickness to support the bending load from the engine 530 that is applied to the backing plate 710. As shown in FIGS. 22 and 23, the framework 750 has a width that is narrower than that of the backing plate 710. In other embodiments, the framework 750 extends to the frame rails 512.

As shown in FIGS. 24 and 25, both the framework 750 (shown in FIGS. 22 and 23) and the underbody armor panel 700 are coupled to the backing plate 710 using bolts 752 that extend through the same hole pattern in the backing plate 710. The addition of the backing plate 710 facilitates changing between the A-kit and the B-kit configurations more readily than an arrangement where the engine 530 is coupled directly to the framework 750 and/or to the underbody armor panel 700. The backing plate 710 supports the engine 530 at all times, even during a change in configuration (e.g., from the A-kit configuration to the B-kit configuration, etc.). During the change in configuration, the framework 750 (shown in FIGS. 22 and 23) is removed and replaced by the underbody armor panel 700. If the engine 530 were directly coupled to the framework 750 or the underbody armor panel 700 (e.g., if the vehicle 500 did not include the backing plate 710, etc.), then the engine 530 would need to be supported externally (e.g., by attachment of a lift to the engine 530) when the framework 750 or underbody armor panel 700 is removed. Instead, the backing plate 710 supports the static load of the engine 530, simplifying the process of changing configurations.

Referring to FIG. 10, a shaft, shown as drive shaft 800, includes multiple sections runs longitudinally along the vehicle 500 (shown in FIG. 10) underneath the framework 750 (shown in FIGS. 22 and 23) or the underbody armor panel 700 (shown in FIGS. 24 and 25) of the A-kit configuration or the B-kit configuration, respectively. In the A-kit configuration, the framework 750 is disposed between the engine 530 and the drive shaft 800. The drive shaft 800 provides power from a transfer case 802 to the front tractive assembly 540. As shown in FIGS. 12-25, the drive shaft 800 is supported by a bearing, shown as bearing assembly 810. The bearing assembly 810 holds the drive shaft 800 in place while permitting free rotation thereof. As shown in FIGS. 22 and 23, in the A-kit configuration, the bearing assembly 810 is coupled to the framework 750. The framework 750 includes an extension 812 to which the bearing assembly 810 is coupled. In some embodiments, the extension 812 contacts the bearing assembly 810 along a flat, horizontally extending surface. The distance between the backing plate 710 and the bearing assembly 810 is defined by the geometry of the framework 750. As shown in FIGS. 24 and 25, in the B-kit configuration, the bearing assembly 810 is coupled to the underbody armor panel 700. As shown in FIG. 25, in some embodiments, the bearing assembly 810 is coupled to the underbody armor panel 700 with a plate, shown as spacer plate 420. In other embodiments, the bearing assembly 810 is coupled directly to the underbody armor panel 700. The spacer plate 420 may be coupled to the underbody armor panel 700 and the backing plate 710 using the bolts 752. The distance between the backing plate 710 and the bearing assembly 810 is defined by the combined thickness of the underbody armor panel 700 and the spacer plate 420. The underbody armor panel 700 and the spacer plate 420 may combine to provide a thickness that locates the drive shaft 800 in a specific vertical location (e.g., the same vertical location as that of the drive shaft 800 in the A-kit configuration when the bearing assembly 810 is coupled to the framework 750, etc.). The interchangeability of the underbody armor panel 700, the framework 750 (shown in FIGS. 22 and 23), and the spacer plate 420 reduces the risk of one or more sections of the drive shaft 800 being oriented at a steep angle relative to one another in different configurations, which could otherwise produce premature wear on the joints between the sections of the drive shaft 800.

Figure 26:
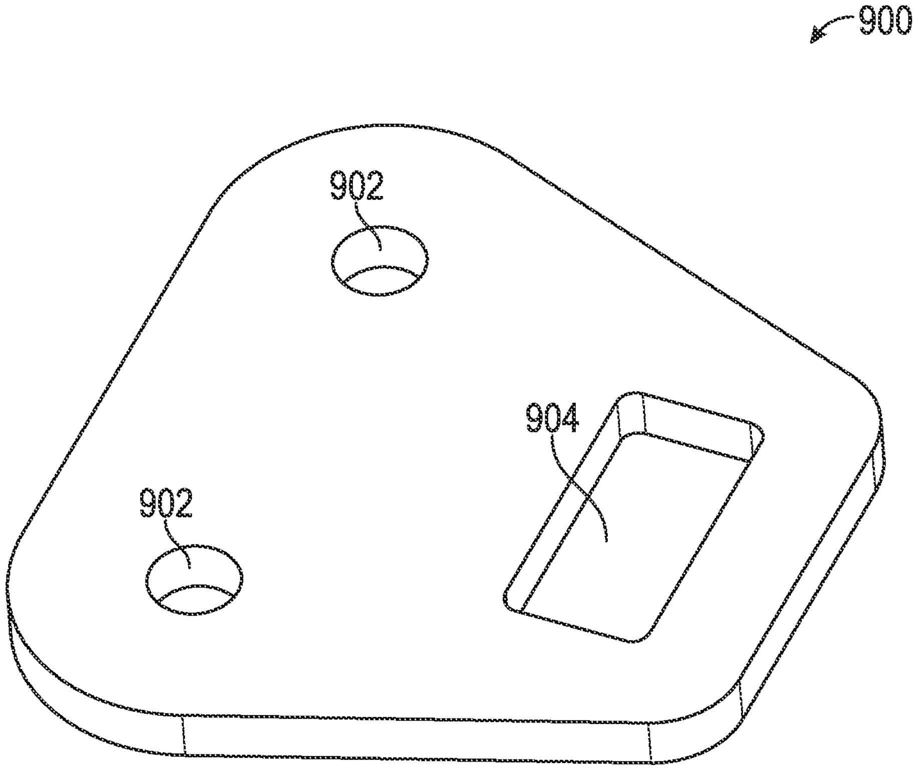
FIG. 26 is a perspective view of a retainer, according to an exemplary embodiment, according to an exemplary embodiment.
Figure 27:
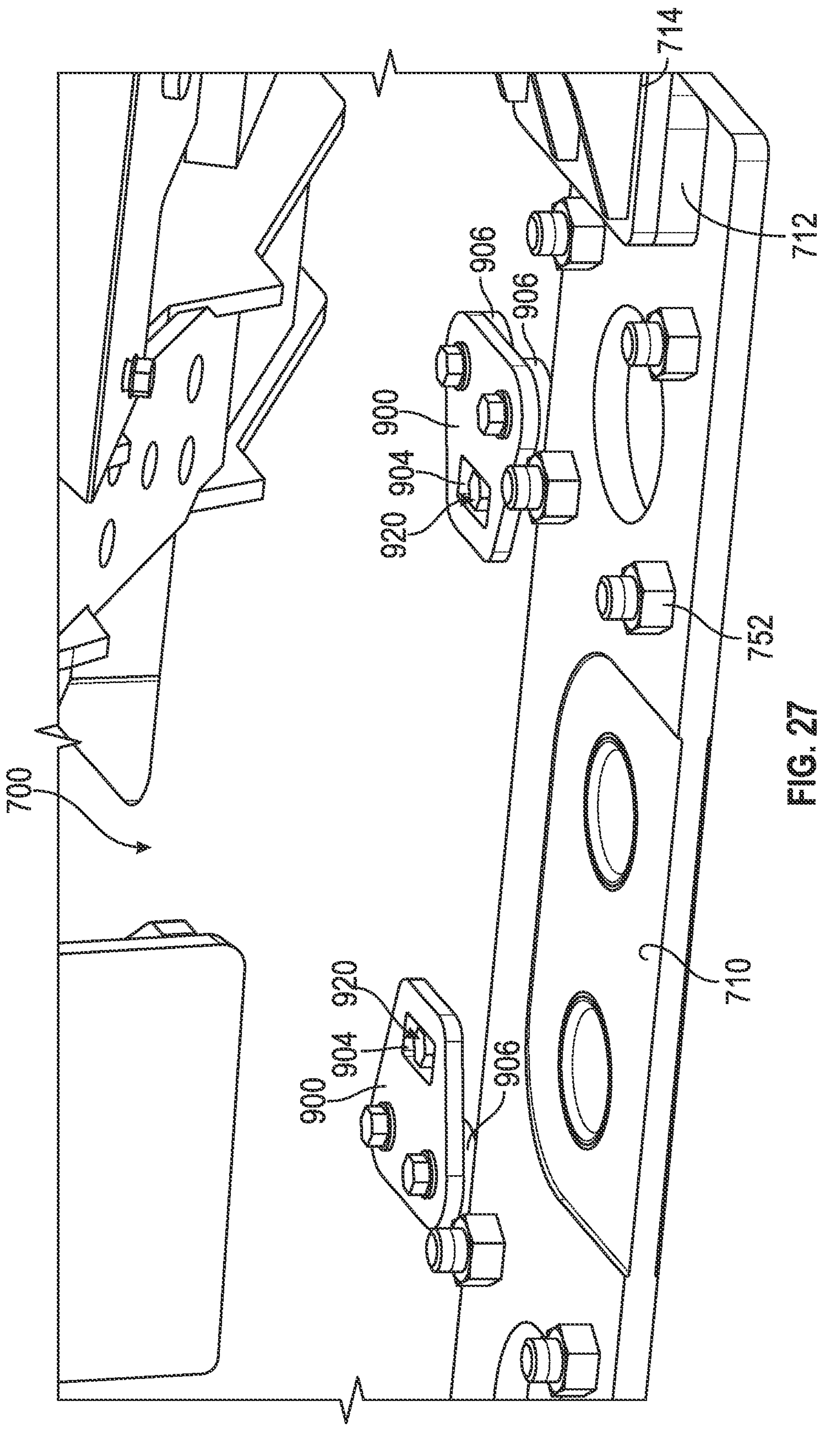
FIG. 27 is a perspective view of the retainer of FIG. 26 assembled on an armor component, according to an exemplary embodiment.
Figure 28:
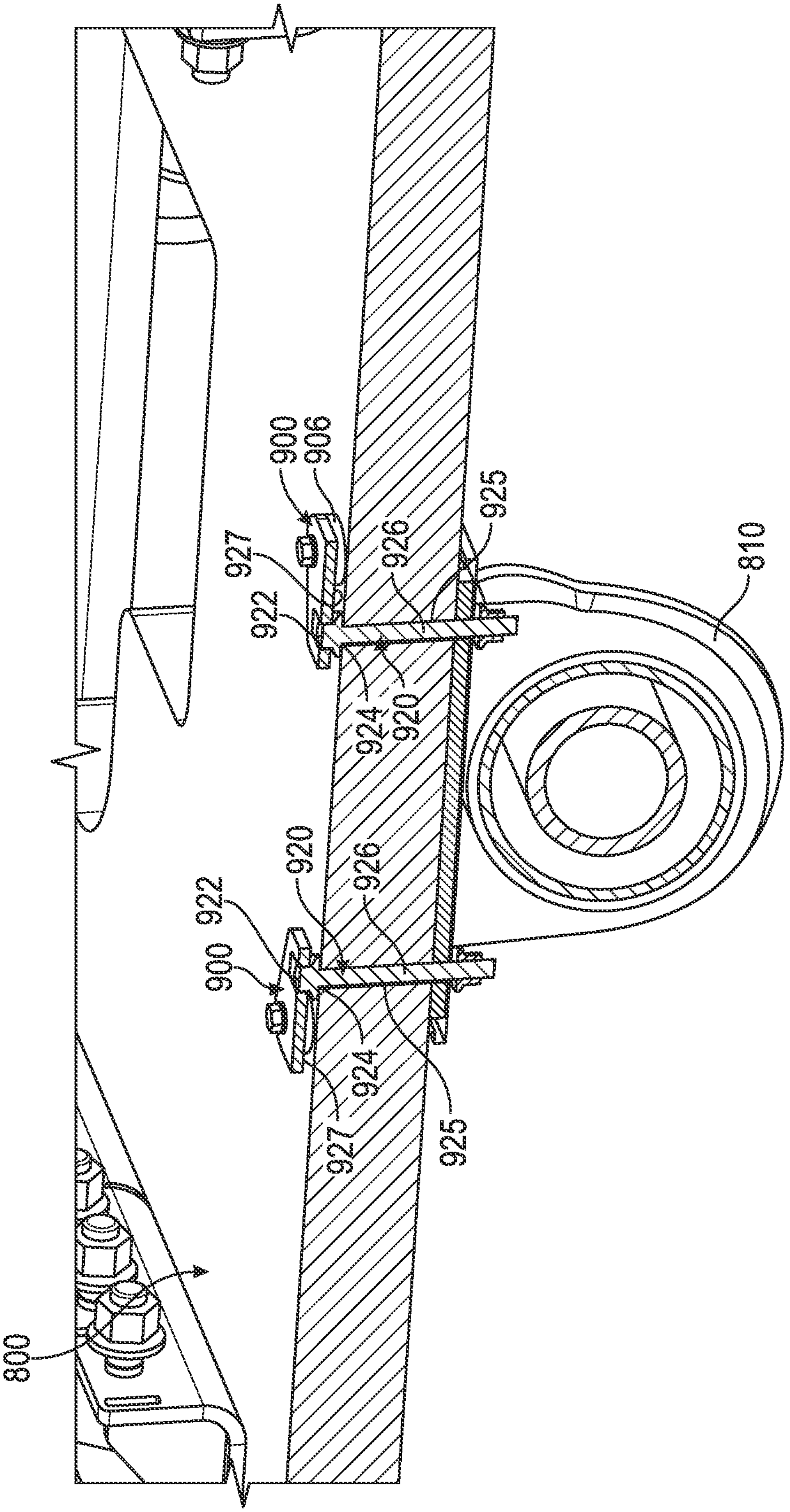
FIG. 28 is a sectional view through the retainer of FIG. 27, according to an exemplary embodiment.
Figure 107:
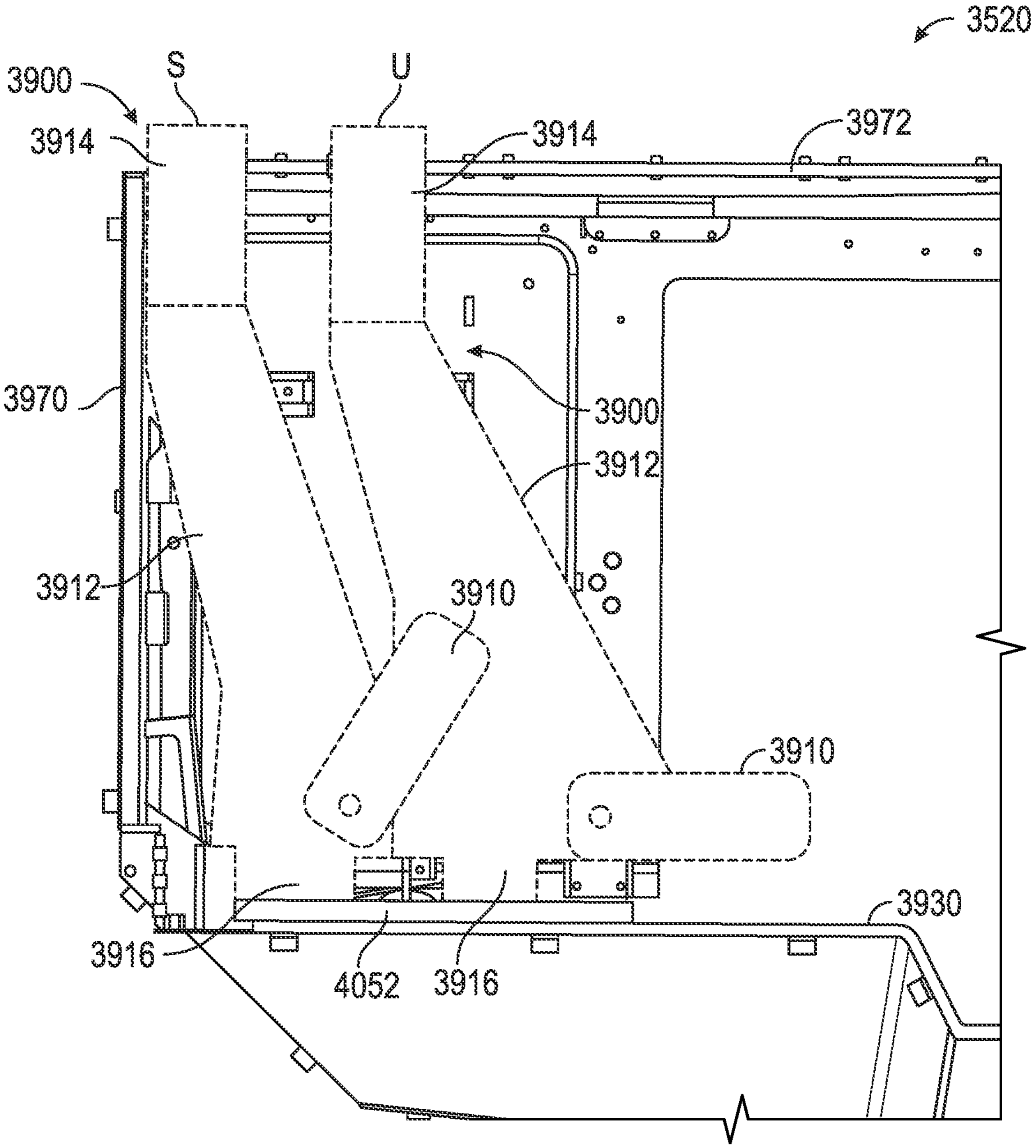
FIG. 107 is a side section view of the front cabin of FIG. 87 illustrating two positions of a seat, according to an exemplary embodiment.

Referring to FIGS. 26-28, a retainer is shown as locking plate 900. As shown in FIG. 26, the locking plate 900 defines a pair of connecting apertures 902 offset laterally from one another. The locking plate 900 also includes a slot 904 extending laterally across a portion of the locking plate 900, according to the exemplary embodiment shown in FIGS. 26-28. The locking plate 900 is attached (e.g., bolted) to a component of the vehicle 500 (e.g., the underbody armor panel 700 of FIGS. 24 and 25, etc.) through the connecting apertures 902. As shown in FIG. 107, the locking plate 900 is offset from the component (e.g., the underbody armor panel 700 of FIGS. 24 and 25, etc.) by retainer spacers 906. The locking plate 900 retains a bolt 920. As shown in FIG. 28, the bolt has a head 922, a flange 924 extending outward from a bottom portion of the head 922, and a shaft 926 extending from the bottom of the head 922. The shaft 926 extends through a receiving aperture 925 in the component (e.g., a receiving aperture 925 in the underbody armor panel 700 of FIGS. 24 and 25, etc.). In some embodiments, the receiving aperture 925 in the component is slotted to facilitate alignment of the bolt 920 with a second component (e.g., the bearing assembly 810, etc.).

As shown in FIG. 28, the head 922 has a hexagonal cross sectional shape, and the width of the slot 904 (shown in FIG. 27) is configured to tightly receive a fastener (e.g., opposing flats of hexagonal head of a bolt). The slot 904 (shown in FIG. 27) facilitates translation of the head 922 (e.g., front to back, side to side, etc.), but limits (e.g., prevents, etc.) rotation of the bolt 920. In one embodiment, a bottom surface 927 of the locking plate 900 contacts the flange 924, preventing the bolt 920 from being pushed outwards or away from a threaded end of the shaft 926. In some embodiments, the retainer spacers 906 are thicker than the flange 924 to facilitate translation of the bolt 920. Among its various uses, the locking plate 900 is useful in a situation where one side of a bolted connection is difficult to reach. By way of example, tightening the bolt 920 without the locking plate 900 would require an operator to reach over both sides of the underbody armor panel 700 simultaneously. In some instances, such a maneuver would prove difficult for a single operator due to the distance from the edge of the underbody armor panel 700 to the bolts 920. The locking plate 900 prevents the bolt 920 from rotating or being removed from its slot 904, requiring access to only one side (e.g., the underside, etc.) of the underbody armor panel 700 when tightening the bolt 920.

Referring to FIG. 20, extending the wings 704 laterally (e.g., in a lateral direction) beyond the frame rails 512 facilitates coupling a step assembly, shown as step 500, to the vehicle 500 to facilitate entry into and egress out of the front cabin 550 (shown in FIG. 19). As shown in FIG. 19, the step is coupled to the underbody armor panel 700 at a lateral position beyond the frame rails 512 and front cabin 550. As shown in FIG. 19, the vehicle 500 may include one or more steps 500 configured to facilitate access to the front cabin 550. By way of example, a front cabin 550 with two doors may include two of the steps 500, one proximate each door. As shown in FIG. 500, the step 500 couples to one of the wings 704 of the underbody armor panel 700 and extends in a lateral direction (e.g., laterally outward), away from the longitudinal centerline 514. FIGS. 20 and 29-31 show the position of the step 500 relative to the frame 510.

Figure 29:
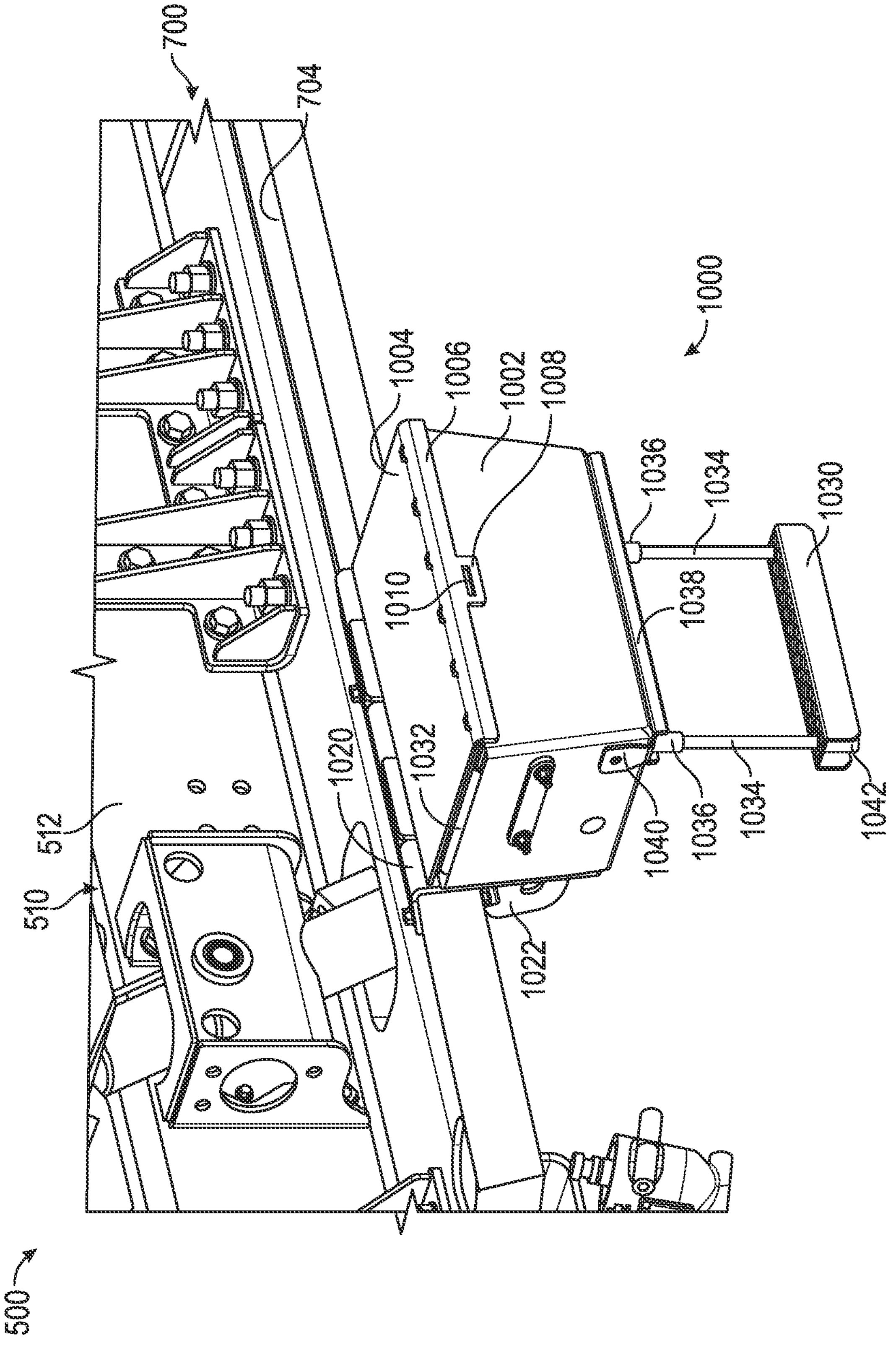
FIG. 29 is a perspective view of a step attached to an armor component, according to an exemplary embodiment.
Figure 30:
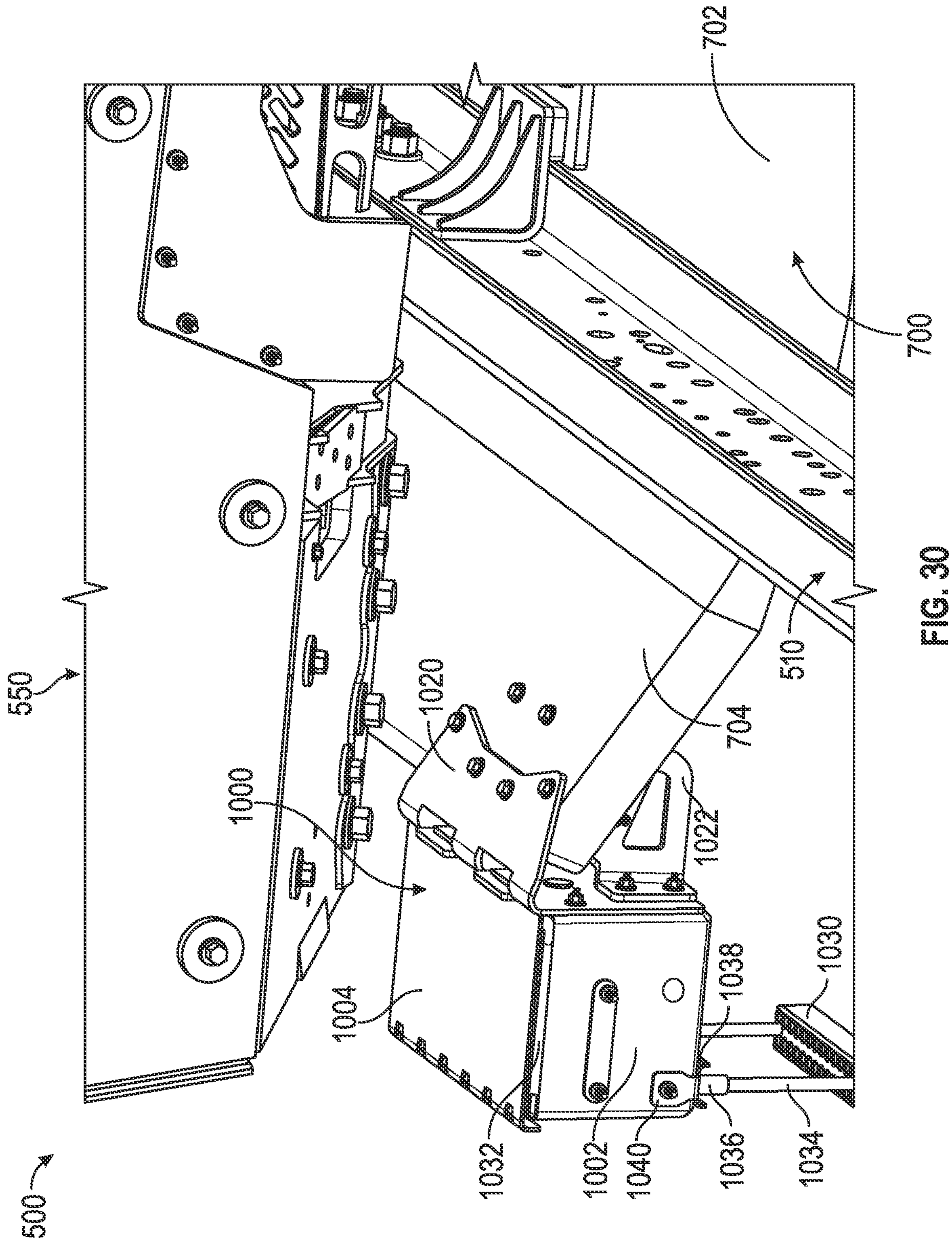
FIG. 30 is another perspective view of the step of FIG. 21, according to an exemplary embodiment.
Figure 31:
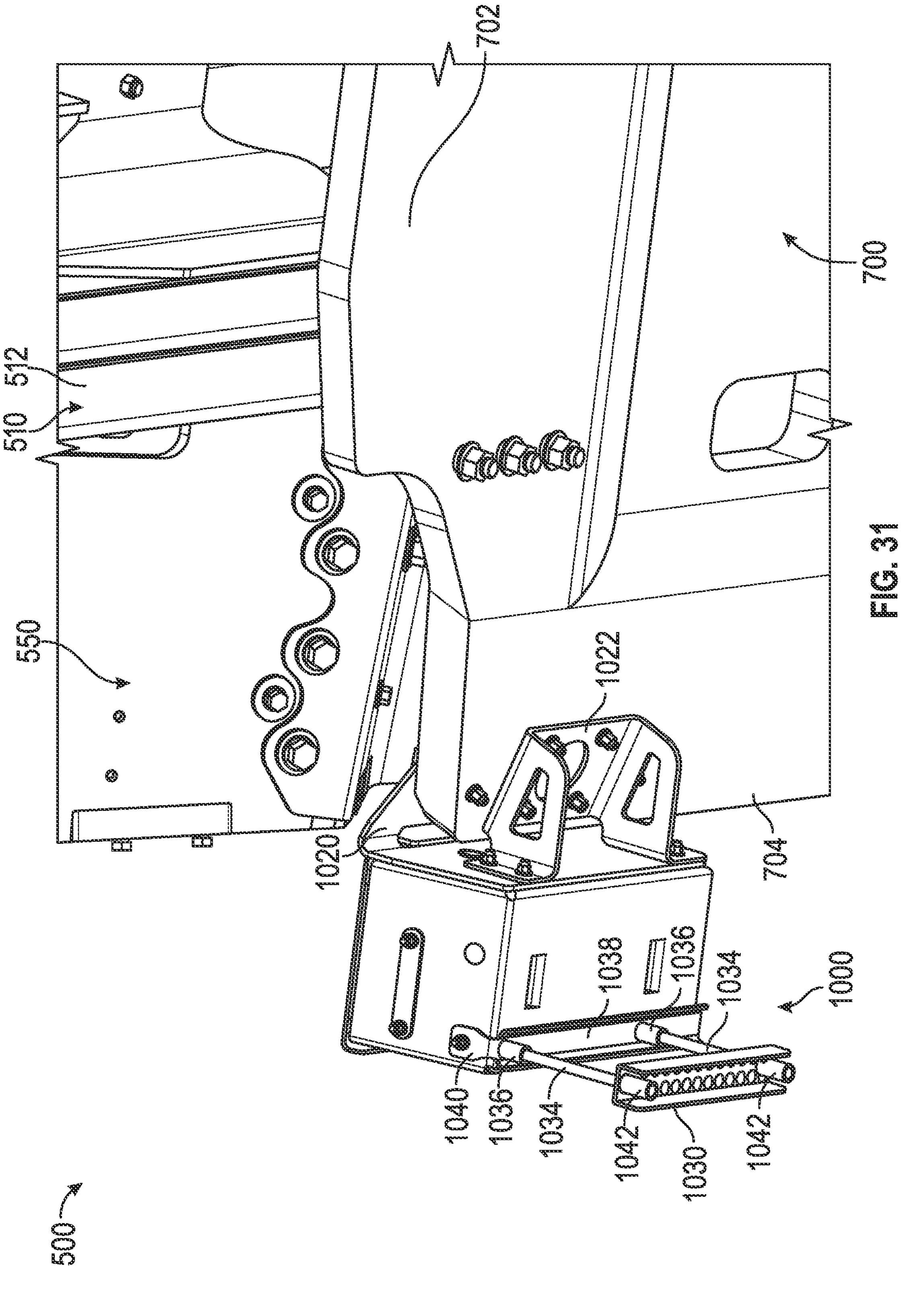
FIG. 31 is another perspective view of the step of FIG. 21, according to an exemplary embodiment.

Referring to FIGS. 29-31, the step 500 includes a main body 502 that is box-shaped and formed from four vertical walls and a bottom wall defining an interior space. A lid 504 is coupled to the main body 502 and movable between an open position and a closed position. In the closed position, the lid 504 obstructs access to the interior space defined by the main body 502 such that objects placed in the interior space are prevented from leaving the interior space. In the open position, the lid is positioned to facilitate access to the interior space (e.g., the lid 504 is moved away from the main body 502). Accordingly, the step 500 may be used as a storage container. In some embodiments, the lid 504 is pivotally coupled to the main body 502 such that the lid 504 can be rotated between the open and closed positions. In other embodiments, the lid 504 is slidable between the closed position, where the lid 504 is fixed to the main body 502 and where in the open position, the lid 504 can be removed from the step 500. In some embodiments, the lid 504 includes a locking mechanism to selectively hold the lid in the closed position. As shown in FIG. 20, by way of example, the lid 504 may have a flange 506 extending downward from the lid 504 and along an outside surface of the main body 502. The flange 506 may define an aperture 508 that receives a protrusion 1010 extending from the main body 502. Alternatively, a pin may be selectively extended through an aperture and the main body 502, fixing the lid 504 relative to the main body 502. In other embodiments, the step 500 includes a different locking mechanism that may be any conventional locking mechanism (e.g., a hasp, a latch, a strap, etc.). The locking mechanism may be activated using a key to prevent access by unauthorized parties to the interior space of the main body 502.

Again referring to FIGS. 29-31, the step 500 includes a bracket, shown as first bracket 1020, having a first portion coupled to a back side of the main body 502 and a second portion coupled to the top side of the wing 704. A second bracket, shown as second bracket 1022, has a first portion coupled to the first portion of the first bracket 1020 and a second portion coupled to the bottom side of the wing 704. In other embodiments, the first portion of the second bracket 1022 is coupled directly to the main body 502. The first bracket 1020 and the second bracket 1022 couple the step 500 to the wing 704. In some embodiments, one or more bolts extend through the first bracket 1020, the wing 704, and the second bracket 1022, tightening the first bracket 1020 and the second bracket 1022 against their respective sides of the wing 704. The angle between the first portion and the second portion of each of the first bracket 1020 and the second bracket 1022 may be configured such that the lid 504 is oriented in a specific fashion relative to the rest of the vehicle 500 (e.g., such that the lid 504 is approximately parallel to the main section 702 of the underbody armor panel 700).

Again referring to FIGS. 29-31, the step 500 includes a bottom step 1030 disposed a distance below the main body 502. The bottom step 1030 and the lid 504 may be oriented approximately horizontally such that an occupant of the vehicle 500 can place their feet on the top surface of the bottom step 1030 and/or the lid 504 to climb into the front cabin 550. By way of example, an occupant may place one foot on the bottom step 1030, then one foot on the lid 504 when climbing into the front cabin 550 (shown in FIGS. 30 and 31), similar to how one might use a conventional household ladder. As shown in FIGS. 29 and 30, the top surfaces of the bottom step 1030 and the lid 504 may be textured to prevent slipping.

Again referring to FIGS. 29 and 30, one or more flanges 1032 proximal the lid 504 may extend into the interior space of the main body 502 from the sides of the main body 502. These flanges 1032 may be positioned just beneath the lid 504 (e.g. to partially occupy a space between the lid 504 and the interior space) and contact the lid 504. These flanges 1032 may be configured to support the weight of the occupant on the lid 504 to prevent the lid 504 from deforming during use. As shown in FIGS. 29-31, a pair of vertical members, shown as rods 1034, extend between the bottom step 1030 and the main body 502. An upper end of each of the rods 1034 is coupled to the main body 502 via a boss 1036 extending from a support bracket 1038. The support bracket 1038 includes flanges 1040 that extend along the sides of the main body 502 and through which the support bracket 1038 may be coupled to the main body 502. A lower end of each of the rods 1034 is coupled to the bottom step 1030 via a boss 1042. The bosses 1036 and the bosses 1042 facilitate a strong connection between the rods 1034 and the support bracket 1038 and the rods 1034 and the bottom step 1030, respectively.

The concepts expressed herein may be applied in other ways not explicitly described herein. Expressed generically, a component (e.g., the steering tray 1300, the backing plate 1210) of a vehicle can have a certain structure when the vehicle is in an A-kit configuration. A portion of this structure (e.g., the spacers 1370, the framework 750) may be removed and replaced with an armor component (e.g., the underbody armor panel 700) when reconfigured to a B-kit configuration. This invention takes advantage of the structure of the armor component, to which conventionally other components are not coupled, while still facilitating expeditious removal of the armor panel when the vehicle is reconfigured. In addition to a steering tray or an engine mount, this invention may be applied to various other components such as sway bars, exhaust mounting systems, hydraulic valves, electrical components, etc. The component may be coupled to any portion of the vehicle, such as a body assembly, a frame, or mission equipment. By way of example, a front cabin of a body assembly of a vehicle may have armor panels attached to it in a B-kit configuration that protect passengers during a blast event. These armor panels may replace a portion of the structure of a component that is attached to the front cabin, where the portion is normally present in an A-kit configuration.

Limp Home System

Figure 32:
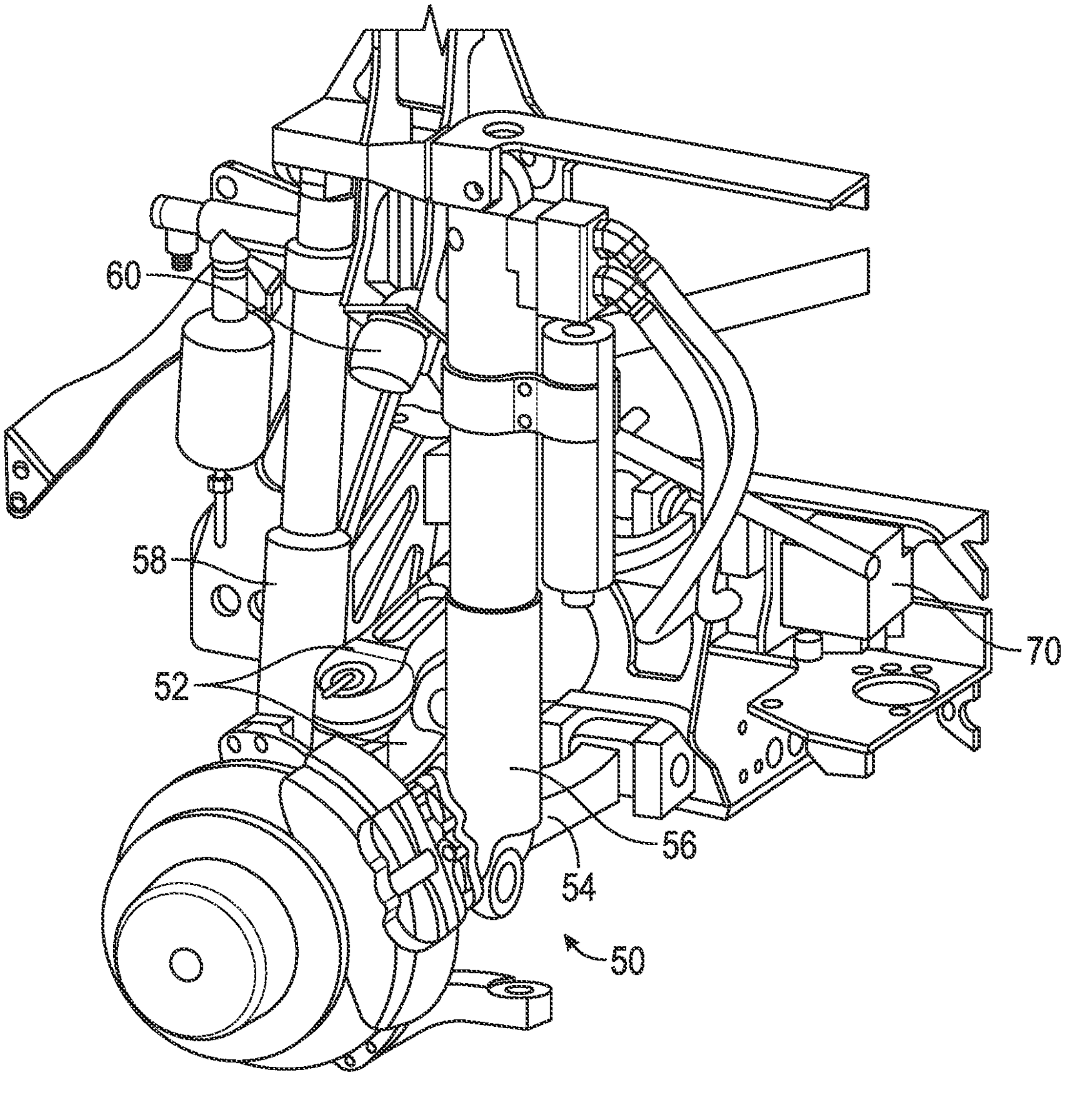
FIG. 32 is a perspective view of a tractive assembly of the vehicle of FIG. 1, according to an exemplary embodiment.

Referring to FIG. 32, according to an exemplary embodiment, the suspension assembly 50 includes one or more high-pressure gas components. The spring 1158 may be a high-pressure gas spring 1158. In some embodiments, the suspension system further includes at least one high-pressure gas source 1170 (e.g., a pump, a high-pressure reservoir, an accumulator, etc.) configured to selectively provide gas, under pressure, to the high-pressure gas spring 1158. In some such embodiments, the suspension assembly 50 includes separate high-pressure gas sources 1170 associated with each high-pressure gas spring 1158. In some embodiments, the suspension assembly 50 further includes at least one low-pressure gas sink (e.g., a pump, a low-pressure reservoir, an accumulator, etc.) configured to selectively remove gas from the high-pressure gas spring 1158. In some embodiments, the high-pressure gas source 1170 is a different configuration of the low-pressure gas sink (e.g., a pump configured to provide gas in one configuration and remove gas in a second configuration).

Figure 33:
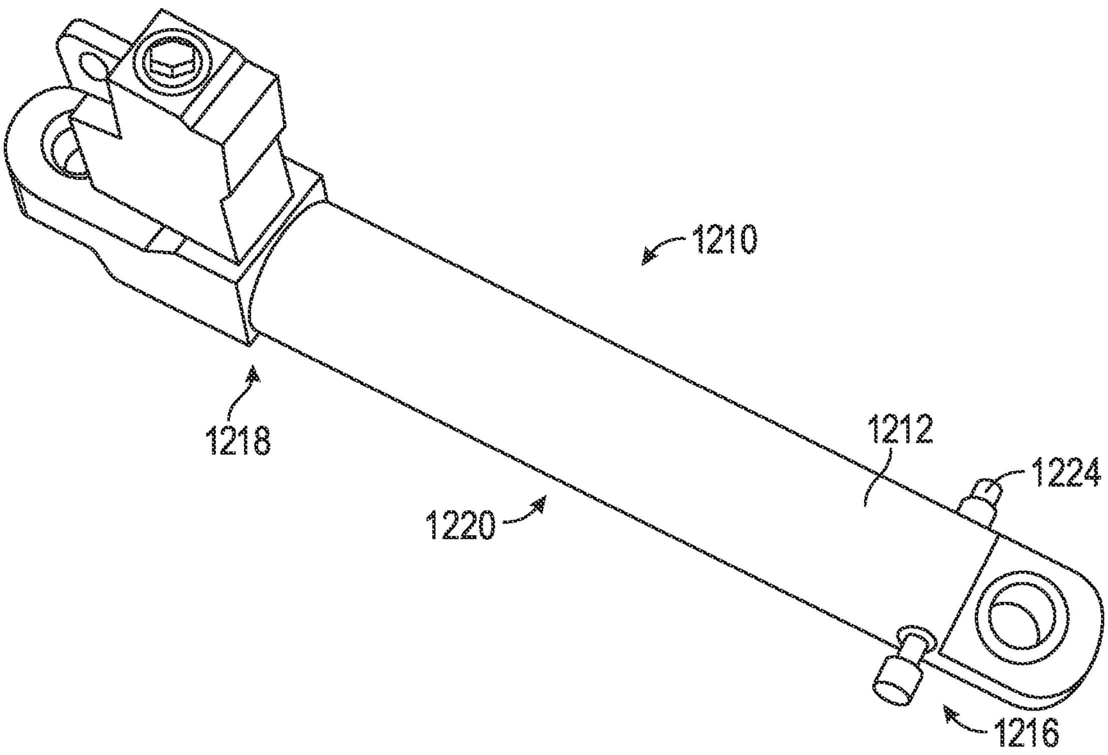
FIG. 33 is a perspective view of a gas spring of the tractive assembly of FIG. 32, according to an exemplary embodiment.
Figure 34:
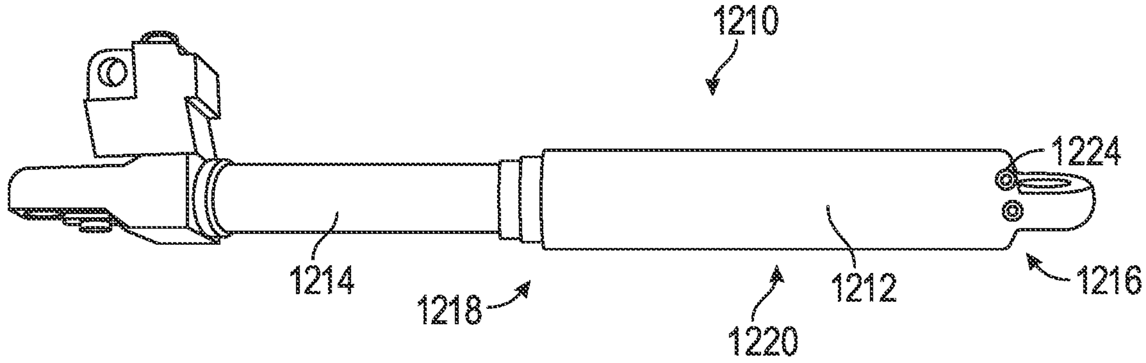
FIG. 34 is a top view of the gas spring of FIG. 33, according to an exemplary embodiment.

Referring to FIG. 33 and FIG. 34, gas spring 1210 includes a single acting cylinder 1212 coupled to a rod 1214. The cylinder 1212 has a cap end 1216, a rod end 1218, and a side wall 1220 (e.g., a cylindrical side wall) extending between the cap end 1216 and the rod end 1218. A chamber is formed between the cylinder 1212 and the rod 1214. The chamber may be a space defined by the interior of the cylinder 1212 surrounded by side wall 1220 and between the cap end 1216 and rod end 1218. The rod 1214 is configured to translate with respect to the cylinder 1212. According to an exemplary embodiment, the rod 1214 is coupled to or includes a piston that forms a wall of the chamber. When the rod 1214 translates relative to the cylinder 1212, the piston changes the volume of the chamber, compressing the gas in the chamber or facilitating expansion of the gas. The gas resists compression, providing a force that is a function of the compressibility of the gas, the area of the piston, the volume and geometry of the chamber, and the current state (e.g., initial pressure) of the gas, among other factors.

In some embodiments, the gas spring 1210 includes at least one port 1224 (e.g., aperture, inlet) that may be opened to facilitate providing gas (e.g., inert gas) to or from the chamber. The chamber of the gas spring is substantially sealed when the port 1224 is not open. In some embodiments, the port 1224 may be coupled to a high-pressure gas source, increasing the pressure in the gas spring 1210 and extending the rod 1214 from the cylinder 1212. In some embodiments, the port 1224 may be coupled to a low-pressure gas sink, decreasing the pressure in the chamber and facilitating retraction of the rod 1214 into the cylinder 1212.

Figure 35:
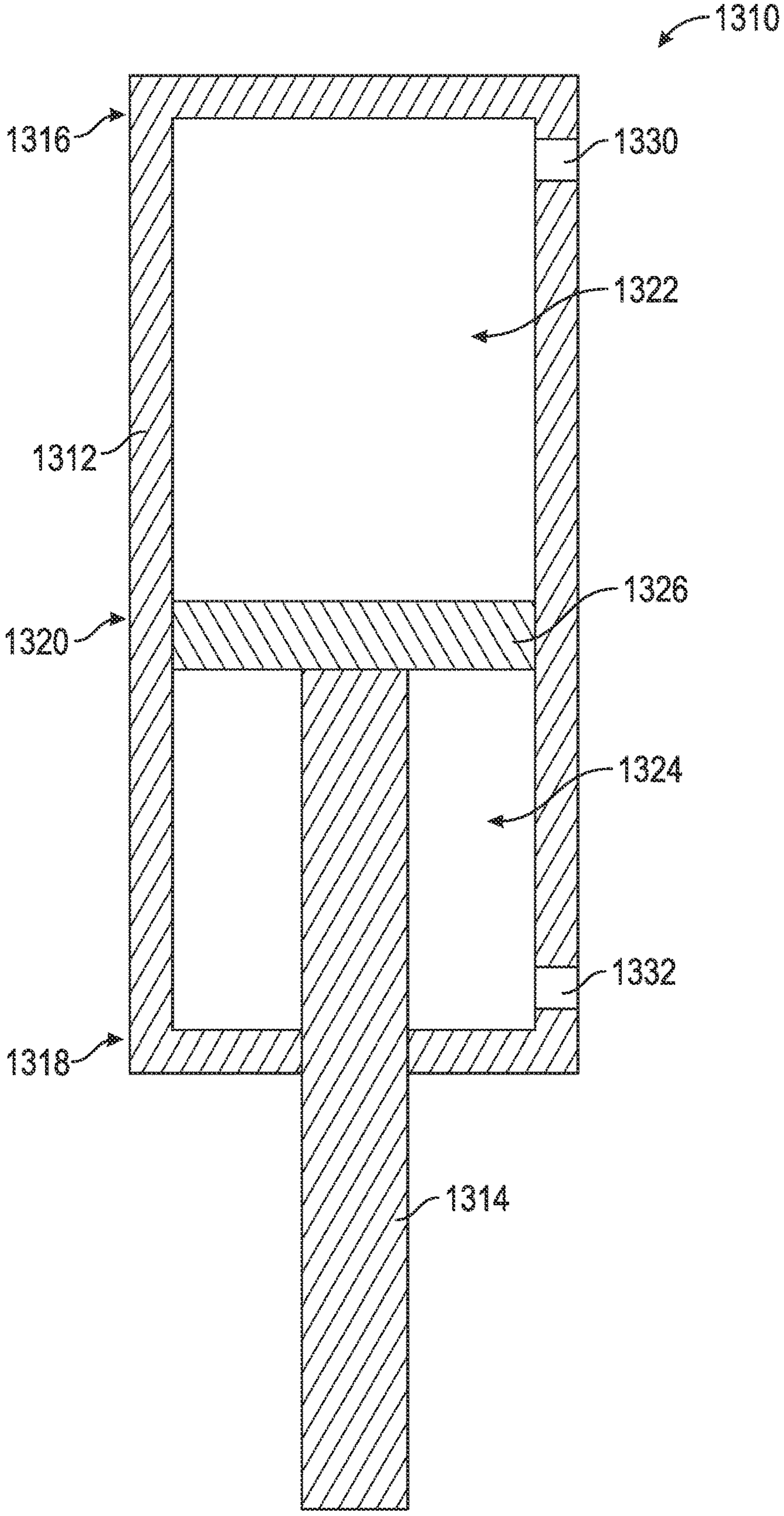
FIG. 35 is a schematic view of a gas spring of the tractive assembly of FIG. 33, according to an exemplary embodiment.

Referring to FIG. 35, a gas spring 1310 includes a double acting cylinder 1312 coupled to a rod 1314. The cylinder 1312 has a cap end 1316, a rod end 1318, and a side wall 1320 extending between the cap end 1316 and the rod end 1318. An extension chamber 1322 is formed between the cylinder and the rod. The extension chamber 1322 may be interior to the cylinder 1312, between the cap end 1316, the side wall 1320, and the rod 1314, which extends through the rod end of the cylinder. A retraction chamber 1324 is formed on the opposite side of the rod. The retraction chamber 1324 may be interior to the cylinder 1312, between the rod end 1318, the side wall 1320, and the rod 1314. The rod 1314 is configured to translate with respect to the cylinder 1312. According to an exemplary embodiment, the rod 1314 is coupled to or includes a piston 1326 that forms a wall of the chamber. When the rod 1314 translates relative to the cylinder 1212, the piston 1326 increases the volume of either the extension chamber 1322 or the retraction chamber 1324 and decreases the volume of the other chamber, compressing or expanding the gas in the extension chamber 1322 and the retraction chamber 1324. The gas in the chamber resists compression, providing a force that is a function of the compressibility of the gas, the area of the piston, the volume and geometry of the chamber, and the current state (e.g., initial pressure) of the gas, among other factors.

In some embodiments, the gas spring 1310 includes at least one extension port 1330 and at least one retraction port 1332 that may be opened to facilitate providing gas to or from the extension chamber 1322 and the retraction chamber 1324, respectively. The extension chamber 1322 and the retraction chamber 1324 of the gas spring may be substantially sealed when the extension ports 1330 and the retraction ports 1332 are not open. In some embodiments, the extension ports 1330 may be fluidly coupled to a high-pressure gas source, and the retraction ports 1332 may be fluidly coupled to a low-pressure gas sink, creating a pressure differential across both sides of the piston 1326. This pressure differential may force the rod 1314 to extend from the cylinder 1312. In some embodiments, the extension ports 1330 may be coupled to a low-pressure gas sink, and the retraction ports 1332 may be coupled to a high-pressure gas source to retract the rod 1314 into the cylinder 1312.

In still another embodiment, a gas spring 1310 further includes at least one port that may be opened to facilitate providing hydraulic fluid (e.g., oil) to or from an internal volume of the gas spring. In such embodiments, adding or removing of hydraulic fluid from the internal volume changes the overall length of the gas spring for different ride heights of the suspension system. In such embodiments, the high-pressure sources and the low-pressure sinks are configured to provide and receive hydraulic fluid instead of pressurized gas.

Figure 36:
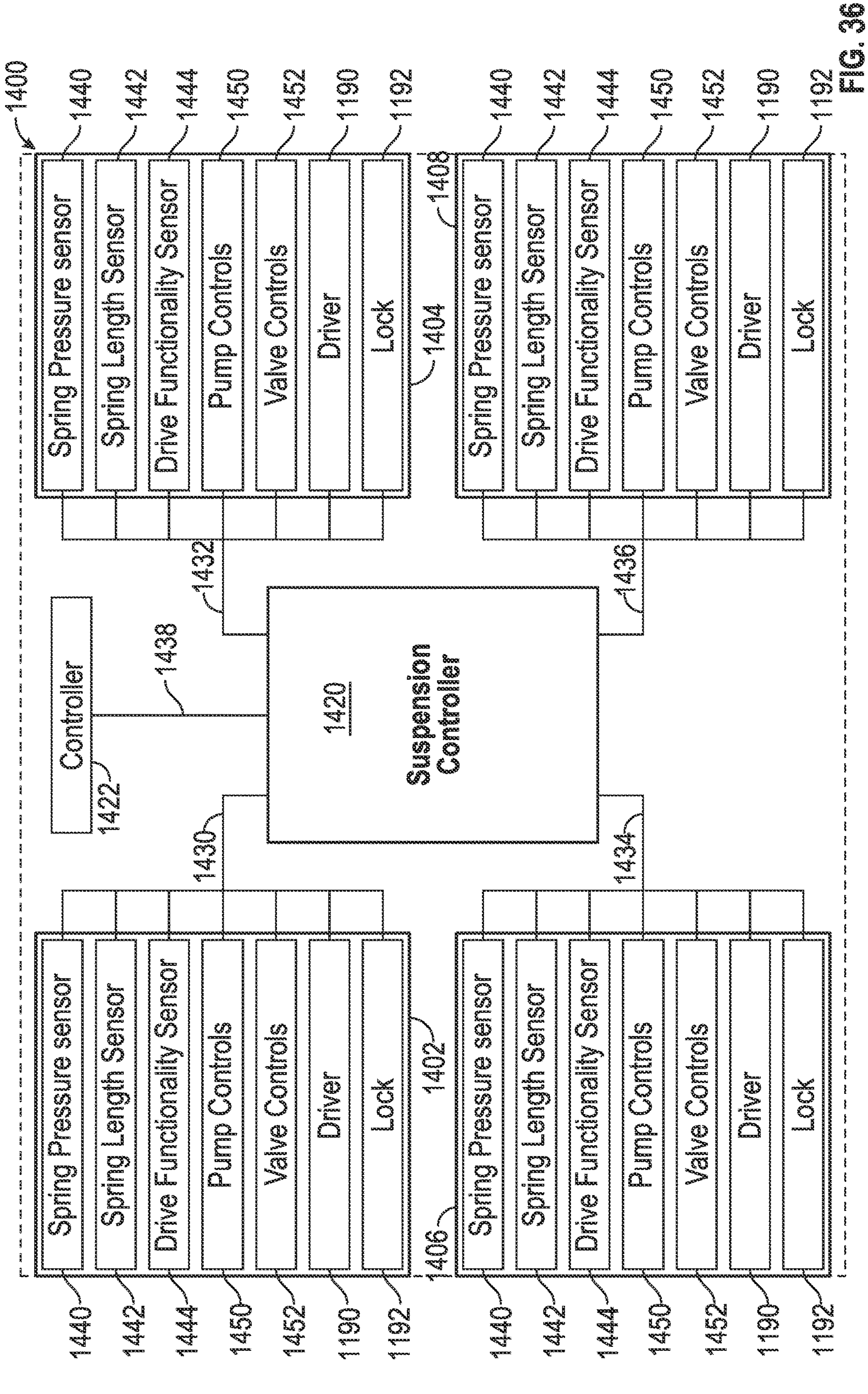
FIG. 36 is a schematic view of the vehicle of FIG. 1, according to an exemplary embodiment.

As shown in FIG. 36, the suspension assembly 50 further includes a driver 1190. Driver 1190 is configured to raise part or all of a front tractive assembly 40 or a rear tractive assembly 42 (e.g., the wheel and tire assembly 44, the upper support arm 1152, the lower support arm 1154, and the spring 1158) such that the tractive assembly is no longer in contact with the support surface (e.g., the ground). Driver 1190 may include a rotary actuator and/or a linear actuator. Driver 1190 may include one or more of a hydraulic cylinder, a pneumatic cylinder, a rack and pinion assembly, a pulley and cable assembly, a lead screw assembly, an electric motor, and a linkage assembly. In some embodiments, the suspension assembly 50 further includes a lock, shown in FIG. 36 as lock 1192. In some embodiments, driver 1190 raises and holds a tractive assembly in place. In other embodiments, the driver 1190 raises the tractive assembly, and the lock 1192 holds the tractive assembly in place. Lock 1192 may include one or more of a hydraulic cylinder, a pneumatic cylinder, an electric motor, a solenoid, a latch, a magnet, a pin, and a clamp. In some embodiments, the lock 1192 is passively engaged once the rear tractive assembly 42 is raised past a threshold height. In some embodiments, the lock 1192 can be actively engaged or disengaged (e.g., by applying a high-pressure gas, by applying an electrical current, etc.).

Referring now to FIG. 36, a detailed diagram of a vehicle suspension control system is shown, according to an exemplary embodiment. Vehicle 1400 is shown to include suspension assemblies 1402, 1404, 1406, and 1408 coupled to each of the rear tractive assemblies 42. In some embodiments, the front tractive assemblies 40 also include suspension assemblies. In some embodiments, the suspension assemblies 1402, 1404, 1406, and 1408 include the gas spring 1210. In other embodiments, the suspension assemblies 1402, 1404, 1406, and 1408 include the gas spring 1310. In some embodiments, the suspension assemblies 1402, 1404, 1406, and 1408 further include driver 1190 and lock 1192. Suspension controller 1420 communicates with suspension assemblies 1402, 1404, 1406, and 1408 through data lines 1430, 1432, 1434, and 1436, respectively. Suspension controller 1420 also communicates with controller 1422 (for instance, an engine control unit) through data line 1438. Suspension controller 1420 allows each suspension assembly to be controlled individually. Data lines 1430, 1432, 1434, and 1436 may be any type of communications medium capable of conveying electronic data between suspension controller 1420 and suspension assemblies 1402, 1404, 1406, and 1408, and controller 1422. Data lines 1430, 1432, 1434, and 1436 may be wired connections, wireless connections, or a combination of wired and wireless connections. In some embodiments, data lines 1430, 1432, 1434, and 1436 are redundant connections. For example, data line 1430 may include two or more independent connections between suspension controller 1420 and suspension assembly 1402. In another example, data line 1430 may include individual connections between suspension controller 1420 and the sensors and controls of suspension assembly 1402 (e.g., spring pressure sensor 1440, valve controls 648, etc.).

Suspension assemblies 1402, 1404, 1406, and 1408 each include sensor and control equipment coupled to data lines 1430, 1432, 1434, and 1436. For example, suspension assembly 1402 may have a spring pressure sensor 1440, a spring length sensor 1442, a drive functionality sensor 1444, pump controls 1450, valve controls 1452, a driver 1190, and a lock 1192. Pump controls 1450 control the operation of one or more pumps that provide pressurized gas to or from a gas spring in suspension assembly 1402. Valve controls 1452 control one or more valves that regulate gas flow between the one or more high-pressure gas sources, the one or more low-pressure sinks, and the gas springs. The actuation of driver 1190 and lock 1192 are controlled by suspension controller 1420. Driver 1190 and lock 1192 may be controlled either directly (e.g., the suspension controller 1420 communicates with the driver 1190 and lock 1192 through data line 1430) or indirectly (e.g., the suspension controller 1420 controls a valve that controls the flow of hydraulic fluid to the driver 1190). Spring pressure sensor 1440 measures the pressure or pressures in the gas spring of suspension assembly 1402 and provides the measured data to suspension controller 1420 with data line 1430. Spring length sensor 1442 measures the current length of the gas spring in suspension assembly 1402. Drive functionality sensor 1444 measures parameters of the tractive assembly coupled to the suspension assembly 1402. The drive functionality sensor 1444 generates data corresponding to the functionality of the tractive assembly, and is used to determine if the tractive assembly is functioning properly. The drive functionality sensor 1444 provides the generated data to suspension controller 1420 with data line 1430. In some embodiments, the drive functionality sensor 1444 measures the pressure in the tire coupled to the tractive assembly. In other embodiments, suspension assemblies 1402, 1404, 1406, and 1408 may include any number of sensors and controls. For example, drive functionality sensor 1444 may include two or more pressure sensors to provide redundancy for the suspension system in vehicle 1400.

Figure 37:
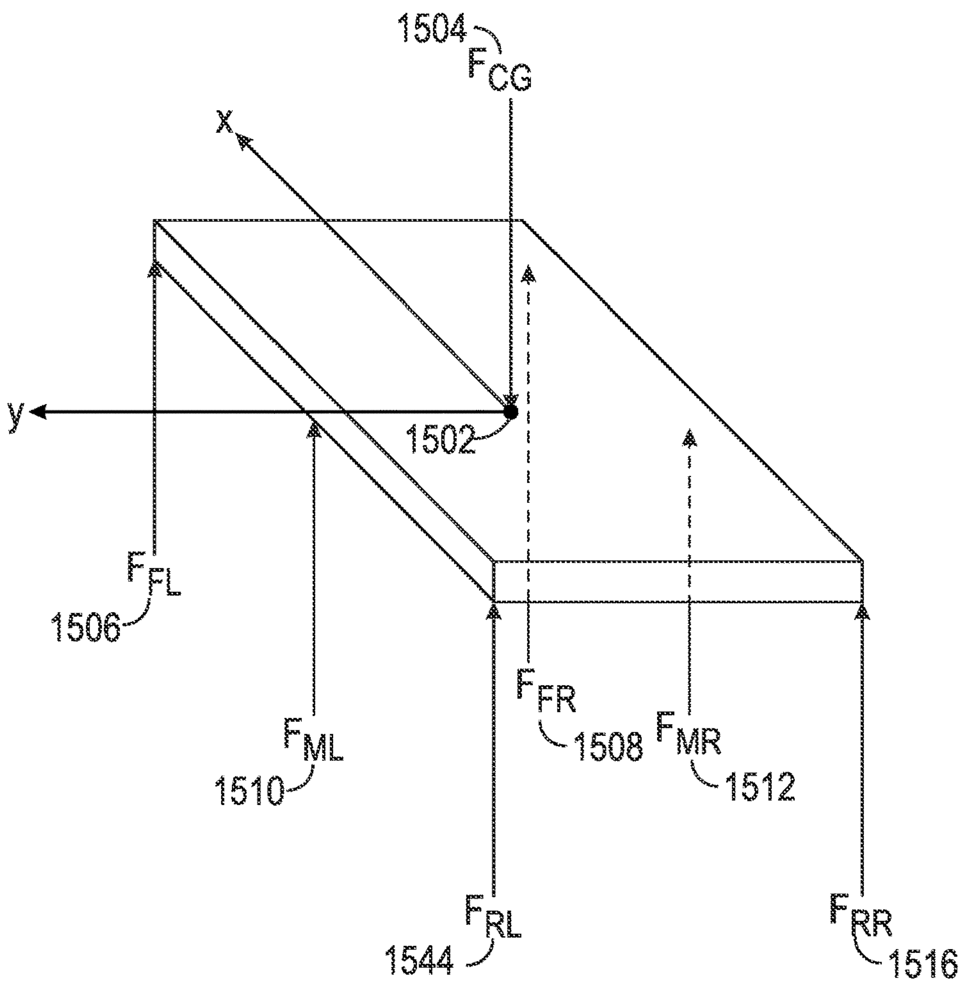
FIG. 37 is a force diagram of the vehicle of FIG. 1, according to an exemplary embodiment.

Referring now to FIG. 37, a force diagram of the vehicle suspension system of vehicle 1400 is shown, according to an exemplary embodiment. The wheels of vehicle 1400 experience resistance forces $F_{FL}$ 1506, $F_{FR}$ 1508, $F_{ML}$ 1510, $F_{MR}$ 1512, $F_{RL}$ 1514, and $F_{RR}$ 1516 from the ground, which correspond to the front left, front right, middle left, middle right, rear left, and rear right tires, respectively. Vehicle 1400 is also shown to have a center of mass (e.g., center of gravity), shown as center of mass 1502, which also provides downward force $F_{CG}$ 1504.

Figure 38:
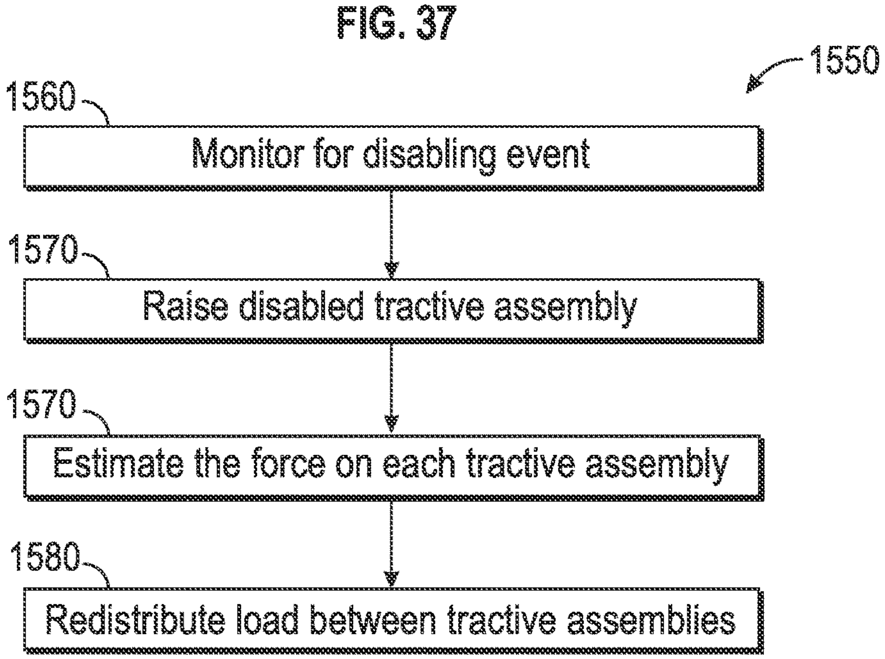
FIG. 38 is flow diagram of a limp home system, according to an exemplary embodiment.

In some situations, a vehicle may experience a disabling event that prevents normal operation of a tractive assembly of the vehicle. By way of example, a blast event (e.g., caused by an explosive device) may cause a tire to lose pressure or become partially or completely decoupled from the vehicle. If powered movement is continued after a disabling event without adjustment to the suspension of the vehicle, the vehicle may experience a partial or total loss of stability that prevents further powered movement of the vehicle. The vehicle 1400 utilizes a limp home system 1550, illustrated in FIG. 38, to improve stability after a disabling event. The limp home system 1550 removes the disabled tractive assembly from contact with the support surface (e.g., the ground) and adjusts the pressures in the remaining gas springs to redistribute the load of the vehicle 1400 among the remaining functional tractive assemblies. In some embodiments, in step 1560, the suspension controller 1420 is configured to monitor the drive functionality sensor 1444 and determine if any of the rear tractive assemblies 42 are not operating normally. By way of example, the drive functionality sensor 1444 may be configured to measure a tire pressure of the wheel and tire assembly 44. If the tire pressure drops below a threshold value (e.g., 30 psi, 10 psi, etc.), then a disabling event may have occurred. In response to such an indication, the disabled tractive assembly is removed from contact with the support surface in step 1570.

In some embodiments, the suspension assemblies include a gas spring with a single acting cylinder (e.g., the gas spring 1210). In step 1570, the suspension controller 1420 is configured to fluidly couple the chamber of the gas spring 1210 of the disabled tractive assembly to the low-pressure gas sink, reducing the force on the gas spring 1210. Such coupling may be provided by pump controls 1450 and/or valve controls 1452. The driver 1190 is activated by suspension controller 1420, which raises the disabled tractive assembly from contact with the ground. In some embodiments, the driver 1190 secures the tractive assembly in place after it is raised. In other embodiments, the suspension controller is configured to activate the lock 1192 in order to mechanically secure the tractive assembly in place.

In some embodiments, the suspension assemblies include a gas spring with a single acting cylinder (e.g., the gas spring 1210). In step 1570, the suspension controller 1420 may be configured to additionally or alternately fluidly couple the chambers of the gas springs 1210 of the functional tractive assemblies to the high-pressure gas source 1170, increasing the length of those gas springs. This raises the frame 12, and the disabled track assembly is raised from contact with the ground. In some embodiments, the suspension controller 1420 is configured to not change the volume of gas in the gas spring of the disabled tractive assembly.

In some embodiments, the suspension assemblies include a gas spring with a double acting cylinder (e.g., the gas spring 1310). In step 1570, the suspension controller 1420 may be configured to fluidly couple the retraction chamber 1324 of the gas spring 1310 of the disabled tractive assembly to the high-pressure gas source 1170 and the extension chamber 1322 of the gas spring 1310 of the disabled tractive assembly to the low-pressure gas sink. The resultant pressure differential on the rod 1314 causes the gas spring 1310 to retract and raise the disabled tractive assembly. In some such embodiments, the gas spring 1310 holds the disabled track assembly in the raised position, and the lock 1192 is omitted.

In some embodiments, the limp home system optionally includes a step 1580 where the force supported by each remaining tractive assembly is estimated. Referring again to FIG. 37, the forces $F_{FL}$ 1506, $F_{FR}$ 1508, $F_{ML}$ 1510, $F_{MR}$ 1512, $F_{RL}$ 1514, and $F_{RR}$ 1516 are calculated using the pressure measured in by the spring pressure sensor 1440 in each suspension assembly. An assumption may be made that the vehicle spring mass is only supported by gas pressure. This assumption may not apply when the spring is at a travel range limit (e.g., the spring is fully compressed or fully extended). Additionally, an assumption may be made that the force supported by the disabled tractive assembly is negligible.

In step 1590, the load on the individual tractive assemblies is redistributed. The suspension controller 1420 is configured to selectively fluidly couple the gas springs to either the high-pressure gas source 1170 or the low-pressure gas sink to vary the volume of gas in the chambers of the springs using one or both of the pump controls 1450 and the valve controls 1452. The suspension controller 1420 determines if gas should be added or removed from each gas spring using feedback from the various sensors in the tractive assemblies (e.g., the spring pressure sensor 1440, the spring length sensor 1442). By way of example, the suspension controller 1420 may be configured to provide control and actuation until the gas springs reach a target length. By way of another example, the suspension controller may be configured to provide control and actuation until the gas springs reach a target force supported.

Sway Bar and Bushing

Figure 39A:
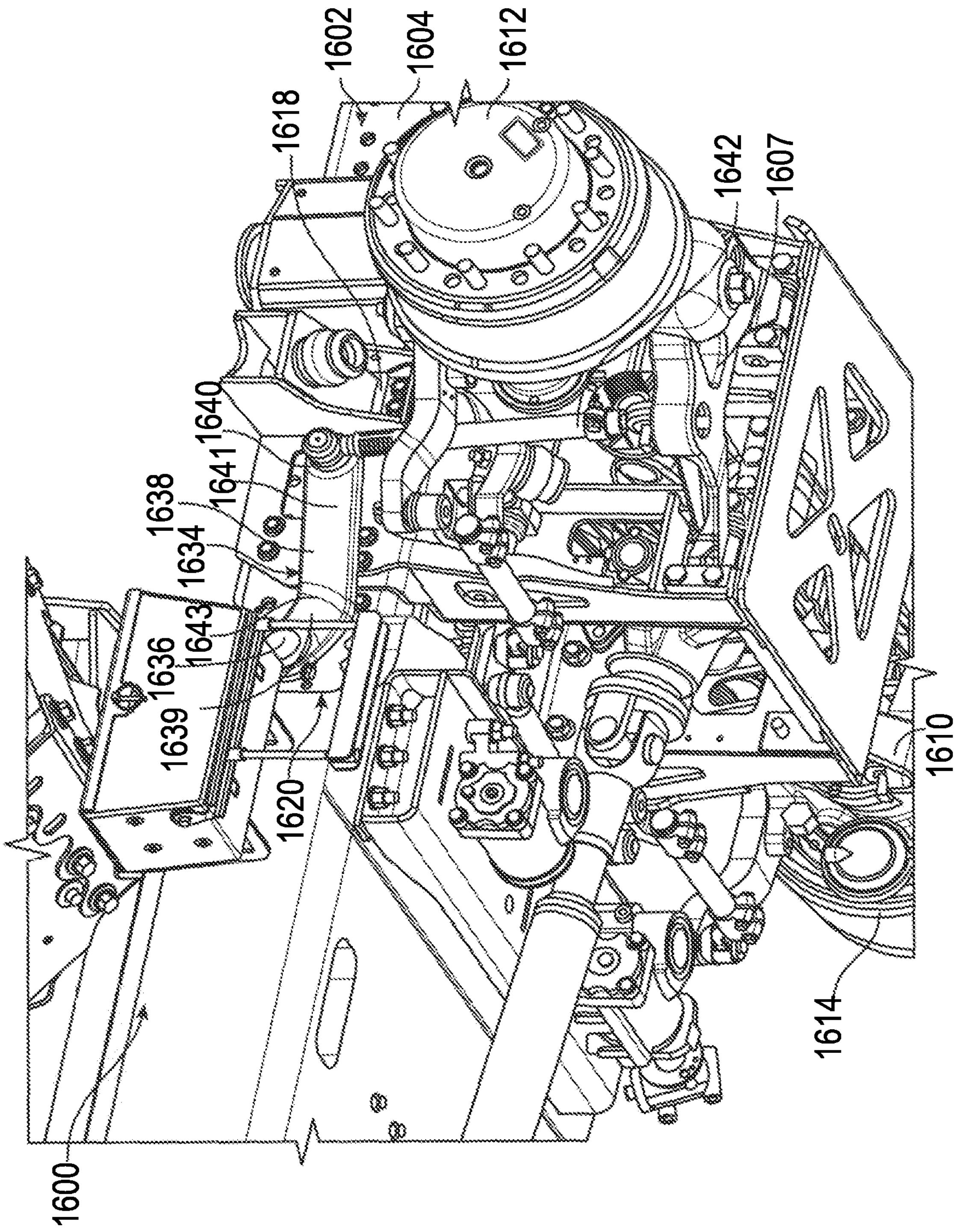
FIG. 39A is a perspective view of a suspension system of a vehicle, according to an exemplary embodiment.
Figure 39B:
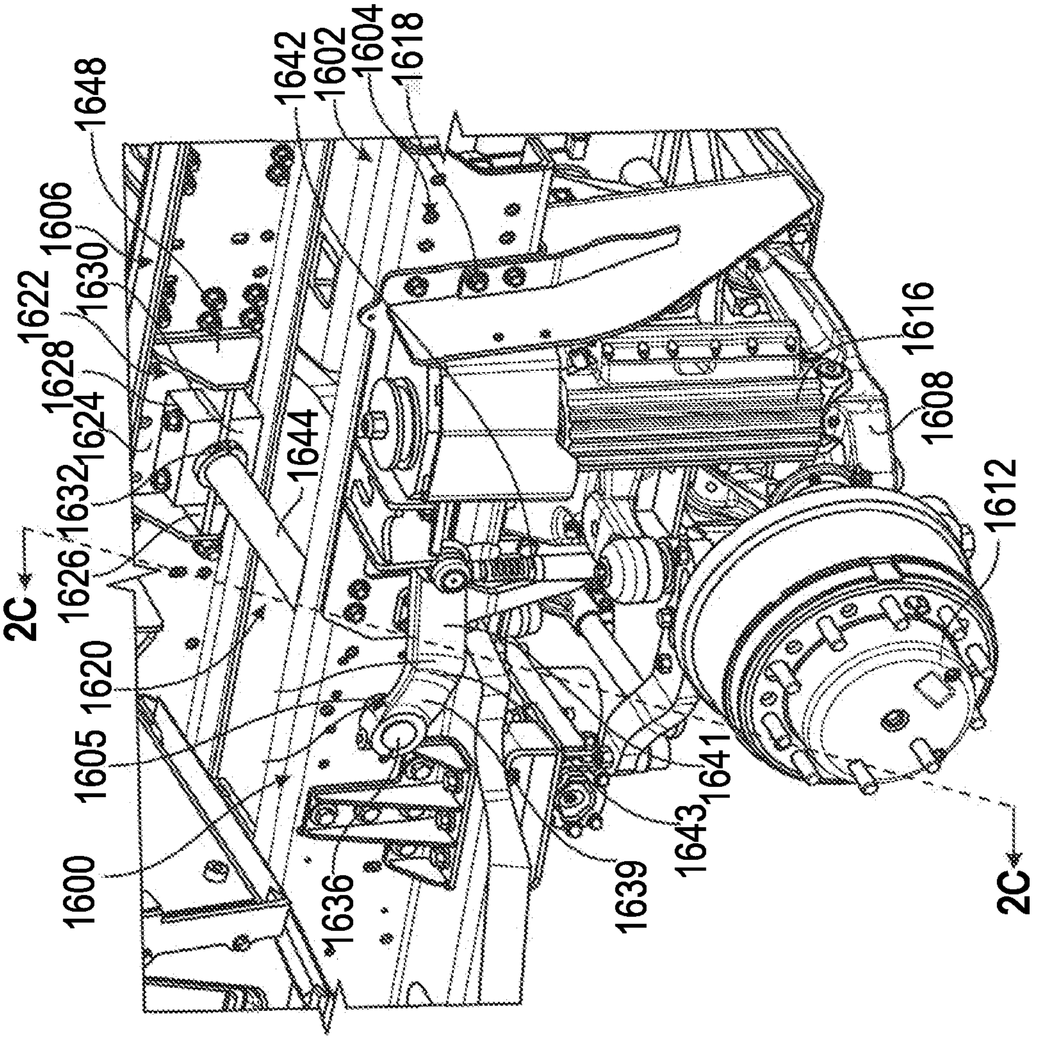
FIG. 39B is a perspective view of the suspension system of FIG. 39A, according to an exemplary embodiment.
Figure 39C:
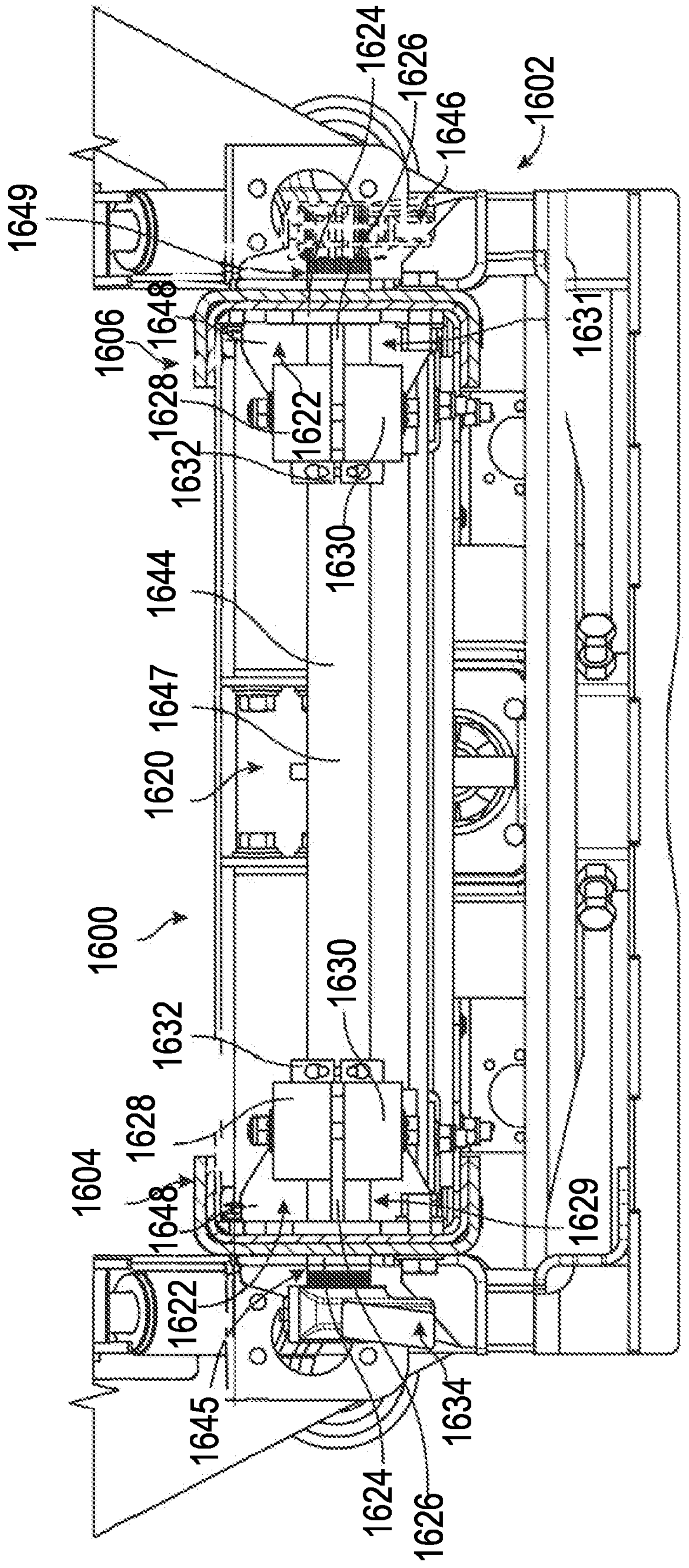
FIG. 39C is a front view of the suspension system of FIG. 39A, at a cross-section through part of the suspension system, according to an exemplary embodiment.

Referring now to FIGS. 39A-39C, a vehicle, such as the vehicle 160 (shown in FIG. 1), may include a suspension system, shown as suspension system 1600. Suspension system 1600 is intended to aid in isolating a vehicle body from forces imparted on the vehicle from a road surface, an obstacle, or another input (e.g., explosion, etc.). Such isolation may include absorbing forces imparted on suspension system 1600 or may include directing forces within suspension system 1600 to modify the reaction experienced by the vehicle body.

As shown in FIGS. 39A-39C, suspension system 1600 is coupled to a vehicle frame, shown as frame 1602. Frame 1602 includes a first member and a second member, shown as a first frame rail 1604 and a second frame rail 1606, that define a longitudinal axis of the frame 1602. As shown in FIG. 39C, the first frame rail 1604 and the second frame rail 1606 are substantially parallel in at least one position and are spaced a distance apart from one another in at least one position.

As shown in FIGS. 39A-39C, suspension system 1600 includes a first suspension member, shown as first swing arm 1608, and a second suspension member, shown as second swing arm 1610. First swing arm 1608 and second swing arm 1610 may be arranged on opposing sides of a central longitudinal axis of the suspension system 1600 (see FIG. 39B). Suspension system 1600 further includes a wheel end, shown as hub 1612, coupled to an end of first swing arm 1608. Hub 1612 is configured to rotate about its axis and interface with a driven member (e.g., tire, etc.) that couples suspension system 1600 to a road surface. According to an exemplary embodiment, hub 1612 includes various internal components (e.g., bearings, bushings, washers, brake assemblies, etc.) to facilitate the operation of a vehicle or suspension system 1600. Suspension system 1600 further includes another wheel end, shown in FIG. 39A as hub 1614, coupled to an end of the second swing arm 1610. Hub 1614 is of generally similar construction to the hub 1614.

As shown in FIG. 39B, suspension system 1600 further includes a first suspension element, shown as an integrated spring damper 1616, coupled to the first swing arm 1608. The integrated spring damper 1616 is configured to provide both the functionality of a gas spring and the damping functionality of a hydraulic damper. The integrated spring damper 1616 facilitates raising and/or lowering the ride height of the suspension system 1600 to be raised or lowered (e.g., a kneel function). The integrated spring damper 1616 is smaller and a more robust package than a typical gas spring. The integrated spring damper 1616 also utilizes less hydraulic fluid than traditional dampers, provides increased damping control, and offers increased service life. According to an exemplary embodiment, the integrated spring damper 1616 includes at least two variable volume internal chambers containing a hydraulic fluid and dampens forces imparted on the suspension system 1600 resulting from encountering various obstacles by enabling fluid to flow between the chambers. Suspension system 1600 further includes second suspension element (not shown) coupled to the second swing arm 1610 (shown in FIG. 39A) that is similar in structure and function to the integrated spring damper 1616.

As shown in FIGS. 39A-39B, first swing arm 1608 is coupled to the first frame rail 1604 with a first mounting member, shown as a first side plate 1618. The first side plate 1618 is attached to an outer surface of the first frame rail 1604 with a number of fasteners (e.g., bolts, etc.). In an alternative embodiment, the first side plate 1618 is otherwise attached to the first frame rail 1604 (e.g., welding). The suspension system 1600 also includes a second side plate (not shown) that similarly couples the second swing arm 1610 (shown in FIG. 39A) to the second frame rail 1606.

In the embodiment shown in FIGS. 39A-39B, a first end (e.g., a lower end) of the integrated spring damper 1616 is rotatably coupled to first swing arm 1608, and a second end (e.g., an upper end) of the integrated spring damper 1616 is fixedly coupled to the first side plate 1618. As such, upon the vehicle encountering an obstacle, the integrated spring damper 1616 rotates with respect to the first side plate 1618 due to the movement of the first swing arm 1608. Such rotation causes the volumes of internal chambers in the integrated spring damper 1616 to change. Resistance to flow of the fluid in the internal chambers of the integrated spring damper 1616 dampens the forces imparted on the frame 1602 (and thus any occupants of the vehicle) resulting from the obstacles.

As shown in FIGS. 39A-39C, the suspension system 1600 further includes a bar, shown as sway bar 1620, that is configured to couple the first swing arm 1608 to the second swing arm 1610 (shown in FIG. 39A). Such coupling encourages movement of one side of the suspension system 1600 upon the movement of the other. This way, any leaning of the vehicle that may result from any obstacles encountered (e.g., fast turns, large positive or negative obstacles on the road, etc.) is reduced (e.g., prevented, etc.).

To facilitate a counterbalancing movement by one of the swing arms 1608 and 1610 in the event that the vehicle encounters an obstacle on a side of the other one of the swing arms 1608 and 1610, the sway bar 1620 is configured to rotationally couple the first swing arm 1608 to the second swing arm 1610 (shown in FIG. 39A). To facilitate such a rotational coupling, the sway bar 1620 is coupled to the first and second frame rails 1604 and 1606 with mounting structures, shown as mounting brackets 1622 (shown in FIGS. 39B and 39C). In the embodiment shown in FIGS. 39C, a first mounting bracket 1622 is disposed proximal the first frame rail 1604, while a second mounting bracket 1623 is disposed proximal a second frame rail 1606. As shown in FIGS. 39B and 39C, each of the mounting brackets 1622 includes a first panel 1624 that is substantially parallel to surfaces of the first and second frame rails 1604 and 1606. In the example shown, first panels 1624 include several openings into which various fasteners (e.g., screws, etc.) are inserted to attach the mounting brackets 1622 to the first and second frame rails 1604 and 1606. First panels 1624 also include bar openings that are configured to receive a bar, shown as rod portion 1644 of the sway bar 1620. Likewise, each of the first and second frame rail 1604 and 1606 include an opening, a first opening in the first frame rail 1604 and a second opening in the second frame rail 1606 (e.g., second opening 1605 shown in FIG. 39B) that is configured to receive a rod portion 1644 of the sway bar 1620. Additionally, the mounting brackets 1622 are mounted to the first and second frame rails 1604 and 1606 in such a position that openings in the first and second frame rails 1604 and 1606 substantially align with the openings in the first panels 1624. This way, a rod portion 1644 of the sway bar 1620 may be inserted through the combination of the first panels 1624 and the first and second frame rails 1604 and 1606. In other embodiments, the sway bar 1620 may extend above or below the first and second frame rails 1604 and 1606.

In the embodiment shown in FIGS. 39B-39C, the mounting brackets 1622 further include second panels 1626 that are substantially perpendicular to the first panels 1624. The second panels 1626 are substantially centered on the first panels 1624 and extend towards the center of the suspension system 1600. The second panels 1626 include gaps configured to receive both a rod portion 1644 of the sway bar 1620 and bushings coupled to the rod portion 1644. The gaps align with the openings in the first panel 1624 and the openings in the first and second frame rails 1604 and 1606. Ends of the rod portion 1644 extend through the openings and outward of the first and second frame rails 1604 and 1606, a first end 1645 of the rod portion 1644 extending outward (e.g., in a direction away a central axis 1647 parallel the first and second frame rails 1604 and 1606 and centered between the first and second frame rails 1604 and 1606) of the first frame rail 1604 and a second end 1649 of the rod portion 1644 extending outward of the second frame rail 1606 (shown in FIG. 39C).

In the embodiment shown in FIGS. 39B-39C, the sway bar 1620 is rotatably coupled to the mounting brackets 1622 with mounting devices, shown as first mounting blocks 1628 and second mounting blocks 1630. The first mounting blocks 1628 and the second mounting blocks 1630 are substantially symmetrical. In the example shown, both the first mounting blocks 1628 and the second mounting blocks 1630 include a semi-circular opening (shown in FIG. 39B). The semi-circular openings align with one another such that, when the first and second mounting blocks are affixed to one another with openings in faces thereof, substantially circular openings are formed. The substantially circular openings are configured to receive a rod portion 1644 of the sway bar 1620 and bushings that surround the sway bar 1620. As such, upon the tightening of fasteners that couple the first mounting blocks 1628 to the second mounting blocks 1630 when the bushing and sway bar 1620 are disposed in the gaps in the second panels 1626, the bushings are securely enclosed in the substantially-circular opening. Thus, the sway bar 1620 is rotatably coupled to the first and second frame rails 1604 and 1606.

As shown in FIGS. 39B-39C, the sway bar 1620 further includes mounting rings, shown as mounting rings 1632, disposed on a the rod portion 1644 of the sway bar 1620 adjacent to the first and second mounting blocks 1628 and 1630. As such, the surfaces at which the sway bar 1620, the bushings, and the first and second mounting blocks 1628 and 1630 join are unexposed to the outside of the vehicle. As such, the coupling points between the sway bar 1620 and frame 1602 are protected from debris, and a long-lasting, sound rotational coupling is provided.

Referring now to FIGS. 39A-39B, sway bar 1620 further includes a member, shown as bending portion 1634, that is coupled to a first end of the rod portion 1644 (shown in FIG. 39B) of the sway bar 1620, outward from the first frame rail 1604 (e.g., on the opposite side of the first frame rail 1604 at the first panel 1624). Bending portion 1634 includes an interface portion, shown as a cap 1636. In one embodiment, cap 1636 defines an internal volume defined by a surface including various connecting grooves that correspond to an outer surface of the first end of the rod portion 1644 (shown in FIG. 39B). In some embodiments, the cap 1636 is fixedly coupled (e.g., not rotatably coupled to) the first end of the rod portion 1644 (shown in FIG. 39B) of the sway bar 1620.

As shown in FIGS. 39A and 39B, bending portion 1634 further includes a body, shown as body 1638. Body 1638 includes a first portion 1639 that extends in a first direction from the cap 1636 towards (e.g., at least partially towards) the first swing arm 1608 and a second portion 1641 that extends in a second direction at an angle from the first direction away from the first swing arm 1608. Body 1638 further includes a bend 1643 at an angle separating the first portion 1639 from the second portion 1641. In various embodiments, the angle is an obtuse angle. In some embodiments, the angle is between 1610 and 1670 degrees. In an embodiment, at least a part (e.g., cap 1636, etc.) of the first portion 1639 of the body 1638 extends outward from the center of the suspension system (e.g. away from the first frame rail 1604), while the second portion 1641 extends substantially parallel to the first frame rail 1604. As such, the bend 1643 in the body 1638 may change the direction of the extension of the body 1638; for example, such that (16) as the body 1638 extends away from the cap 1636, the distance between the lower surface of the body 1638 and the first swing arm 1608 gets greater and (2) as the body 1638 extends away from the cap 1636, the distance between the body 1638 and the first frame rail 1604 remains relatively constant. Such a configuration facilitates providing clearance for various other components (e.g., wheels, etc.) of the vehicle.

As shown in FIGS. 39A-39B, body 1638 further includes an end portion, shown as end 1640 that includes an end opening. In the embodiment of FIGS. 39A-39B, the second portion 1641 is disposed between the end 1640 and the bend 1643. In an embodiment, the end opening is substantially circular. In alternative embodiments, the end opening may be various other shapes. The end opening is configured to receive a linking portion, shown as link 1642. A first end of the link 1642 includes a portion that is inserted through the openings in the end 1640 of the body 1638 of the bending portion 1634. A second end of the link 1642 is attached to the first swing arm 1608. In one embodiment, the first end of the link 1642 is fixedly engaged (e.g., not rotatably coupled to) the end 1640 of the body 1638. Alternatively, the first end of the link 1642 is rotatably coupled to the end 1640 of the body 1638. In either configuration, upon vertical displacement of the first swing arm 1608 (e.g., resulting from the vehicle encountering an obstacle) the end 1640 of the body 1638 is displaced in a manner that corresponds to the displacement of the first swing arm 1608. Such displacement will result in rotation of the rod portion 1644 (e.g., because the cap 1636 is fixedly mounted to the rod portion 1644). Thus, the rod portion 1644 rotates as a result of displacement of the first swing arm 1608.

Figure 40A:
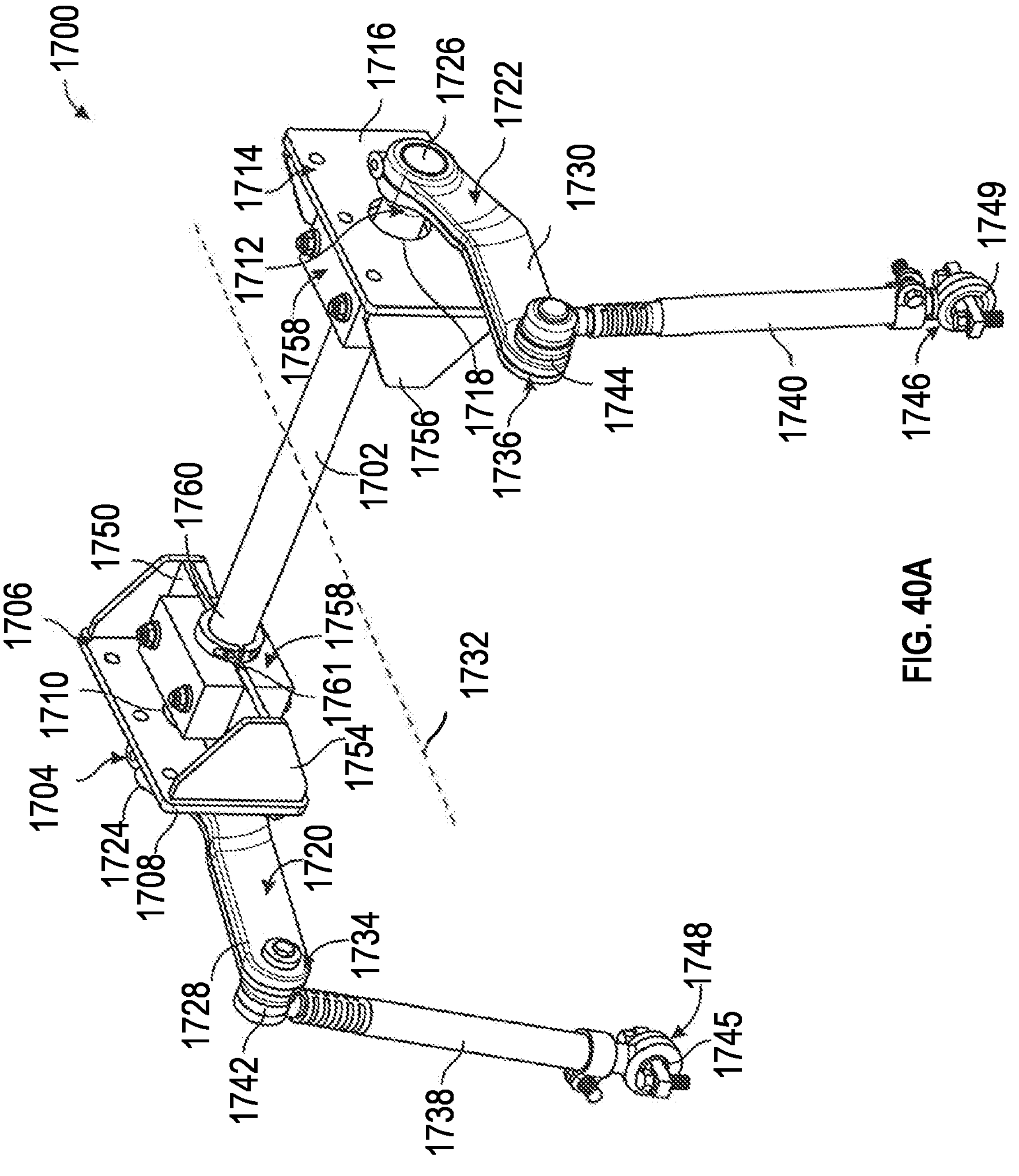
FIG. 40A is perspective view of a sway bar system, according to an exemplary embodiment.
Figure 40B:
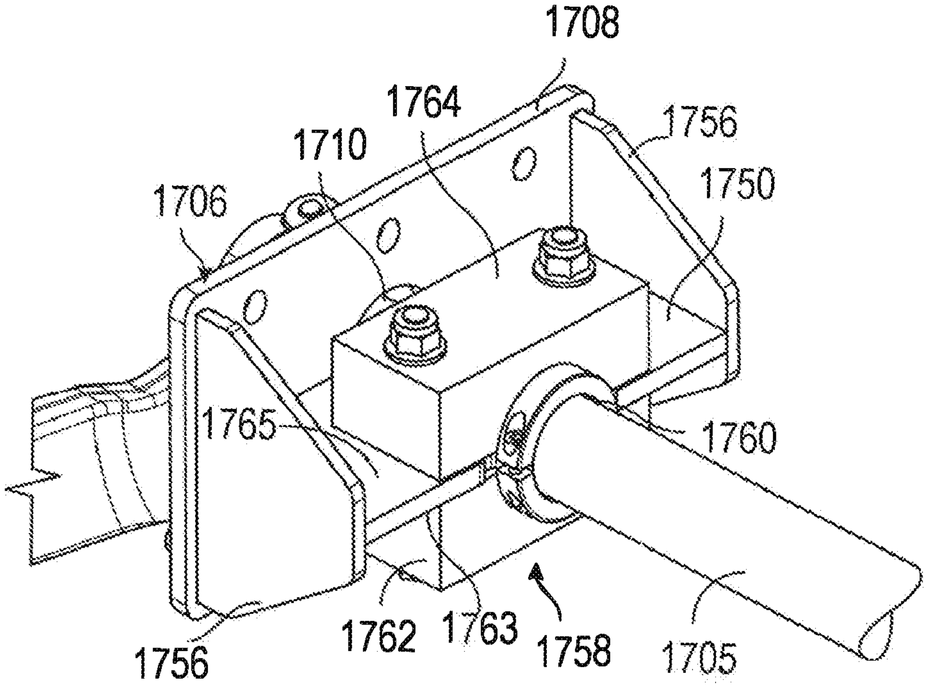
FIG. 40B is a perspective view of a sway bar system of FIG. 40A, according to an exemplary embodiment.
Figure 40C:
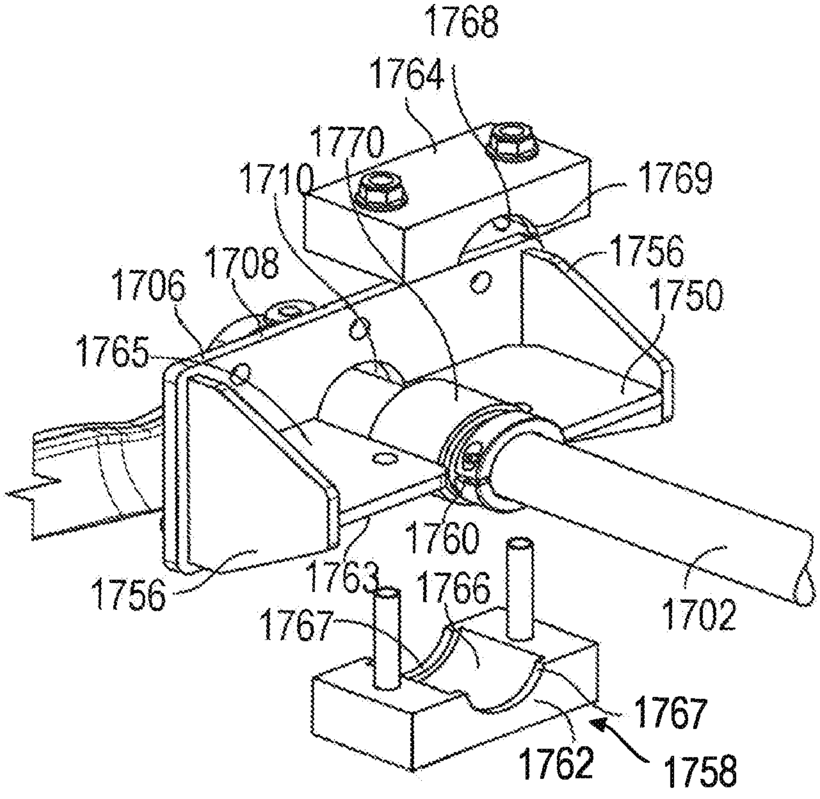
FIG. 40C is an exploded prospective view of a mounting device from the sway bar system of FIG. 40B, according to an exemplary embodiment.

As shown partially in FIG. 40C, a second end of the rod portion 1644 is coupled to a second bending portion 1646 similar in structure to the bending portion 1634 (e.g. a mirror image of bending portion 1634). The second bending portion 1646 is coupled to the second swing arm 1610 with a second link that is similar to the link 1642 (e.g. a copy of link 1642). As such, rotation of the rod portion 1644 resulting from displacement of the first swing arm 1608 results in the application of rotational energy to the second swing arm 1610 with the sway bar 1620. Such counterbalancing forces prevent swaying of the vehicle, and ensure safety despite any obstacles that may be encountered by the vehicle.

Also as shown in FIG. 39C, each of the mounting brackets 1622 further include two support panels 1648 (also see FIG. 39B). In the embodiment shown, the support panels are substantially triangular shaped and extend in a direction that is substantially perpendicular to both the first panel 1624 and the second panel 1626. Support panels 1648 extend inwardly, towards the center of the suspension system 1600 on either side of the rod portion 1644 of the sway bar 1620. As such, the first and second mounting blocks 1628 and 1630 are substantially surrounded by the support panels 1648, which further protects the point of coupling between the rod portion 1644 and the first and second frame rails 1604 and 1606 from debris. In other embodiments, support panels 1648 have another shape.

Additionally, there are offset gaps 1629 and 1631 between the first and second mounting blocks 1628 and 1630 and the first panels 1624 of the mounting brackets 1622. These offset gaps 1629 and 1631 provide clearance between bushings (e.g., that are affixed to the rod portion 1644) and surfaces of the first panels 1624 of the mounting brackets 1622, and thus prevent rotation of the bushing from wearing down the surface of the first panels 1624.

As shown in FIG. 39C, symmetrical shaping of the first and second mounting blocks 1628 and 1630 facilitates the centering of the rod portion 1644 such that the second panels 1626 cover any joints in the bushing (described below) that are affixed to the rod portion 1644. As such, the unique design of the suspension system 1600 facilitates a secure, protected rotational coupling between the sway bar 1620 and the frame 1602.

As shown in FIGS. 40A-40H, a sway bar assembly 1700 is shown according to an exemplary embodiment. The sway bar assembly 1700 is similar in construction and function to the sway bar 1620 shown in FIGS. 39A-39C.

As shown in FIG. 40A, the sway bar assembly 1700 includes a bar, shown as tubular rod 1702. A first end 1704 of the rod 1702 extends through a first bar opening 1710 in a first panel 1708 of a first mounting bracket 1706, and a second end 1712 of the rod 1702 extends through a second bar opening 1718 of a first panel 1716 of a second mounting bracket 1714. A first bending portion 1720 is coupled to the first end 1704, and a second bending portion 1722 is coupled to the second end 1712. The first and second bending portions 1720 and 1722 each include caps 1724 and 1726 that include openings into which the first and second ends 1704 and 1712 of the rod 1702 are inserted. First and second bending portions 1720 and 1722 have bodies 1728 and 1730 extending from the caps 1724 and 1726. In the example shown, the bodies 1728 and 1730 extend substantially parallel to one another towards an end (e.g., a rear end) of a vehicle.

Bodies 1728 and 1730 each include a first portion and a second portion. A bend on each body 1728 and 1730 separates the first and second portions of the bodies 1728 and 1730 such that the first portions extend at a first angle with respect to a first axis (e.g., a longitudinal axis, a central axis 1732) and the second portions extend at a second angle with respect to the first axis. In one embodiment, in at least one position, the first portions of the bodies 1728 and 1730 extend downward from the first axis at an acute angle and the second portions of the bodies 1728 and 1730 extend substantially parallel to the first axes. In one embodiment, the first portions of the bodies 1728 and 1730 extend outwardly (e.g., away from) a central axis 1732 of the sway bar assembly 1700 at an angle from the central axis 1732, and the second portions of the bodies 1728 and 1730 are substantially parallel to the central axis 1732. Such bending of the bodies 1728 and 1730 facilitates providing clearance for various components (e.g., wheels) of a vehicle to which the sway bar assembly 1700 is mounted.

As shown in FIG. 40A, ends 1734 and 1736 of the bodies 1728 and 1730 each include end openings (see for example end opening 1735 in end 1734 in FIG. 40D) through which portions of first ends 1742 and 1744 of links 1738 and 1740 are inserted. In the example shown, fasteners are tightened to the portions of the first ends 1742 and 1744 of the links 1738 and 1740 at inner surfaces of the ends 1734 and 1736 of the bodies 1728 and 1730. As such, links 1738 and 1740 are coupled to the bodies 1728 and 1730 of the bending portions 1720 and 1722. Links 1738 and 1740 extend downward from the mounting brackets 1706 and 1714. In one embodiment, links 1738 and 1740 extend outwardly (e.g., away) from the central axis 1732 of the sway bar assembly 1700. Second ends 1746 and 1748 of the links 1738 and 1740 also include openings, shown as link openings 1745 and 1749, respectively, configured to receive at least one fastener. The fastener(s) may be inserted to couple the links 1738 and 1740 to components (e.g., the first or second swing arms 108 or 110 as shown in FIG. 39A, etc.) of a suspension system of a vehicle.

The first mounting bracket 1706 includes a second panel 1750 that extends substantially perpendicular to the first panel 1708. The second panel 1750 is substantially centered in the first panel 1708 and extends inwardly towards the central axis 1732. As shown in FIG. 40F, the second panel 1750 may include a first extension **1750*a* and a second extension 1750*b*. In the embodiment shown, the second mounting bracket 1714 is identical to the first mounting bracket 1706. The second mounting bracket 1714 also includes a second panel (not shown) that extends substantially perpendicular to the first panel 1716. The second panel (not shown) of the second mounting bracket 1714 is substantially centered in the first panel 1716 and extends inwardly towards the central axis 1732. As shown in FIG. 40A, the second panel 1750 of the first mounting bracket 1706 includes a gap configured to receive the first end 1704 of the rod 1702. The gap is substantially aligned with the first bar opening 1710 on the first panels 1708**.

The first mounting bracket 1706 additionally includes a pair of substantially parallel support panels 1754 with ends thereof extending from the first panel 1708 towards the central axis 1732. The second panel 1750 extends between the pair of substantially support panels 1754 from the centers thereof. In an embodiment, the first panel 1708, second panel 1750, and pair of substantially support panels 1754 are integrally formed. In another embodiment the first panel 1708, second panel 1750, and pair of substantially support panels 1754 are separately formed and welded together. Again, in the embodiment shown, the second mounting bracket 1714 is identical to the first mounting bracket 1706. The second mounting bracket 1714 includes a pair of substantially support panels 1756 with ends thereof extending from the first panel 1716 towards the central axis 1732. The second panel (not shown) extends between the pair of substantially support panels 1754 from the centers thereof. In an embodiment of the second mounting bracket 1714, the first panel 1716, second panel (not shown), and pair of substantially support panels 1754 are integrally formed. In another embodiment of the second mounting bracket 1714, the first panel 1716, second panel (not shown), and pair of substantially support panels 1756 are separately formed and welded together.

Still referring to FIG. 40A, mounting devices, shown as sets of mounting blocks 1758 are affixed to the second panels 1750 and 1752 of the first and second mounting brackets 1706 and 1714. Each set of mounting blocks 1758 includes a pair of mounting blocks that are symmetrically shaped. Each mounting block includes an opening (e.g., semi-circular, etc.) such that, when the sets of mounting blocks 1758 are affixed to the first and second mounting brackets 1706 and 1714, an opening, configured to receive a combination of the rod 1702 and bushings coupled to the rod 1702, is formed. Mounting rings 1760 are inserted at faces of the sets of mounting blocks 1758 to substantially cover and protect the point of coupling between the bushings and the mounting blocks 1758 from debris (e.g., covers a joint 1761 between the bushings and the mounting blocks).

As shown in FIGS. 40B-40C, each set of mounting blocks 1758 includes a first mounting block 1762 configured to engage with a lower face 1763 of the second panel 1750 and a second mounting block 1764 configured to engage with an upper face 1765 of the second panel 1750. According to an exemplary embodiment, the second panel 1750 is disposed between the first mounting block 1762 and the second mounting block 1764. In traditional systems, mounting blocks may be in contact with one another and be positioned on the same side of a support panel (e.g., such that one of the mounting blocks is separated from the second panel). The split block arrangement of the present invention may provide packaging advantages. In one embodiment, the split block arrangement is configured to position the rod 1702 with respect to the second panel 1750 (e.g., directly through, etc.) in a structurally effective manner. The first mounting bock 1762 includes a groove 1766 (e.g., recessed area) configured to be rotatably coupled to a bushing 1770. In the example embodiment shown, the groove 1766 is substantially semi-cylindrical. However, in various embodiments, any shape that facilitates the rotational coupling of the bushing 1770 surrounding the rod 1702 may be used in accordance with the systems and methods disclosed herein. Inner and outer surfaces of the first mounting block 1762 each include extending portions 1767 that cover end portions of the groove 1766. The second mounting block 1764 includes a groove 1768. In the exemplary embodiment shown, the groove 1768 is substantially semi-cylindrical. However, in various other embodiments, another shape that facilitates the rotational coupling of a bushing 1770, which may surround the rod 1702, may be used. Inner and outer surfaces of the second mounting block 1764 each include extending portions 1769, similar to extending portions 1767 for the first mounting block 1762, that cover portions of the groove 1768.

Bolts extend through openings in the first and second mounting blocks 1762 and 1764 such that the set of mounting blocks 1758 may be tightly secured around the second panel 1750 of the first mounting bracket 1706. When coupling surfaces of the first and second mounting blocks 1762 and 1764 are approximately flush with (e.g., contact) the second panel 1750, the extending portions 1767 and 1769 of the inner and outer surfaces of the mounting blocks 1762 and 1764 are configured to cover the axial ends of the bushing 1770 whose thickness is reduced (e.g., outer diameter) compared with the remainder of the bushing 1770. Thus, the uniquely designed structure of the set of mounting blocks 1758 facilitates the isolation of the coupling interface between the body of the bushing 1770 and the mounting blocks 1758. As such, the coupling interface is protected from debris.

Figure 40D:
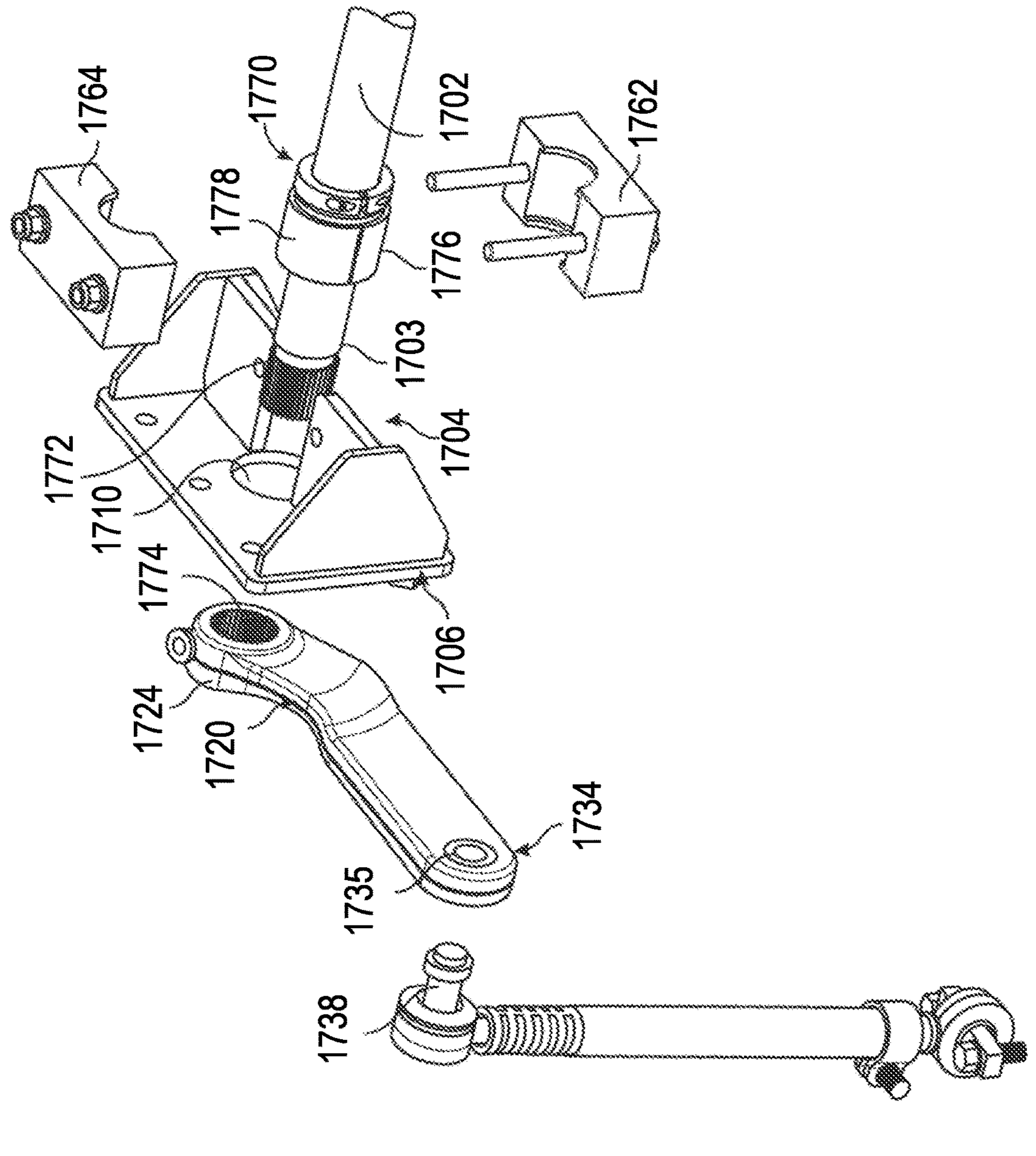
FIG. 40D is an exploded prospective view of the mounting device of FIG. 40B including a bending portion and a link, according to an exemplary embodiment.
Figure 40E:
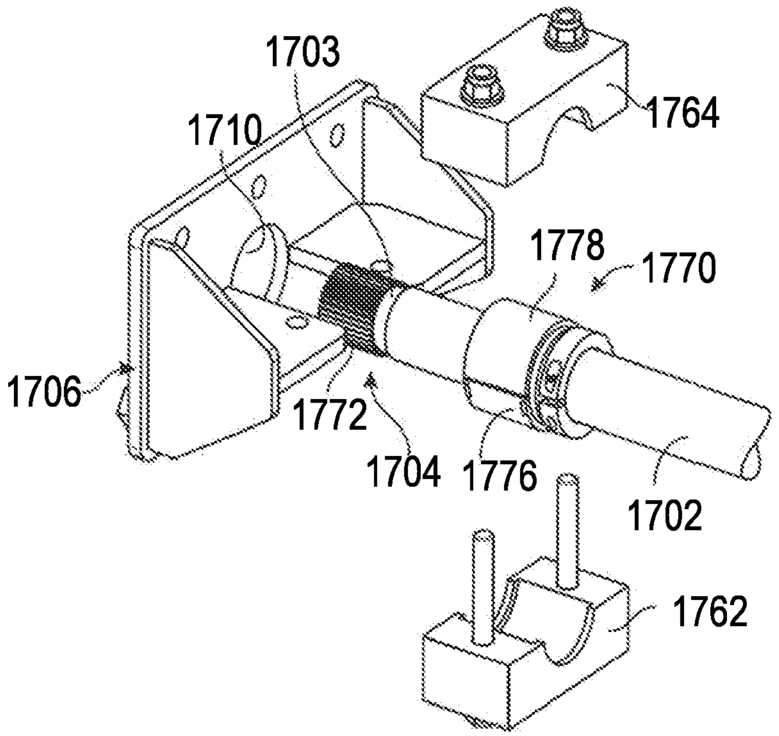
FIG. 40E is a reproduction of FIG. 40D near a bushing for the sway bar system, according to an exemplary embodiment.
Figure 40F:
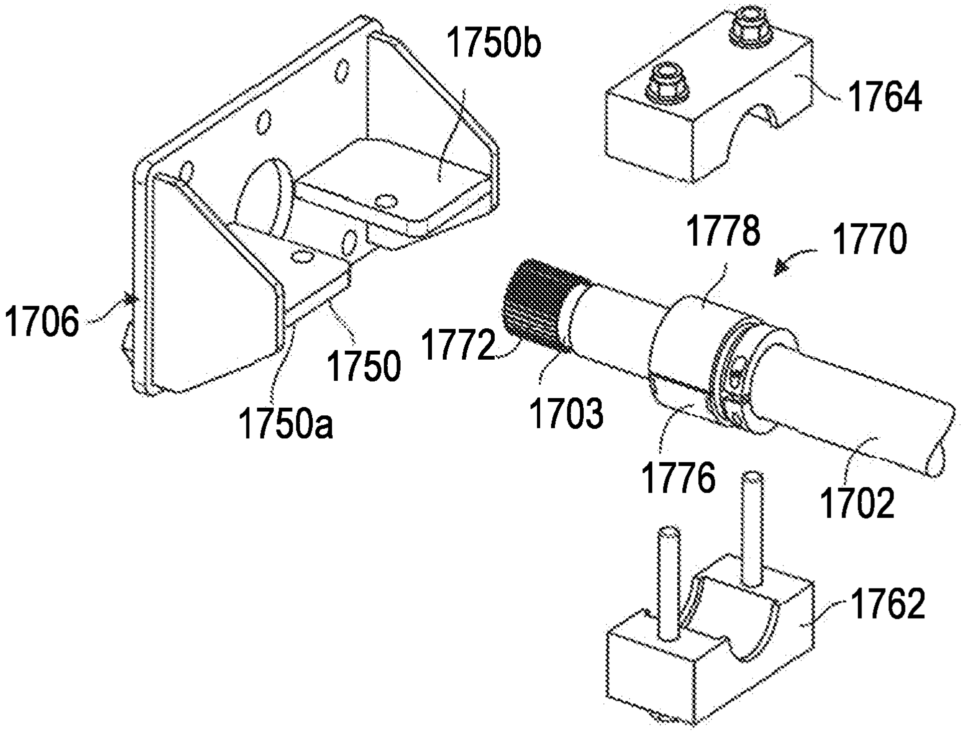
FIG. 40F is an exploded view of the mounting system of FIG. 40B with a bar from the sway bar system separated from a mounting bracket, according to an exemplary embodiment.
Figure 40G:
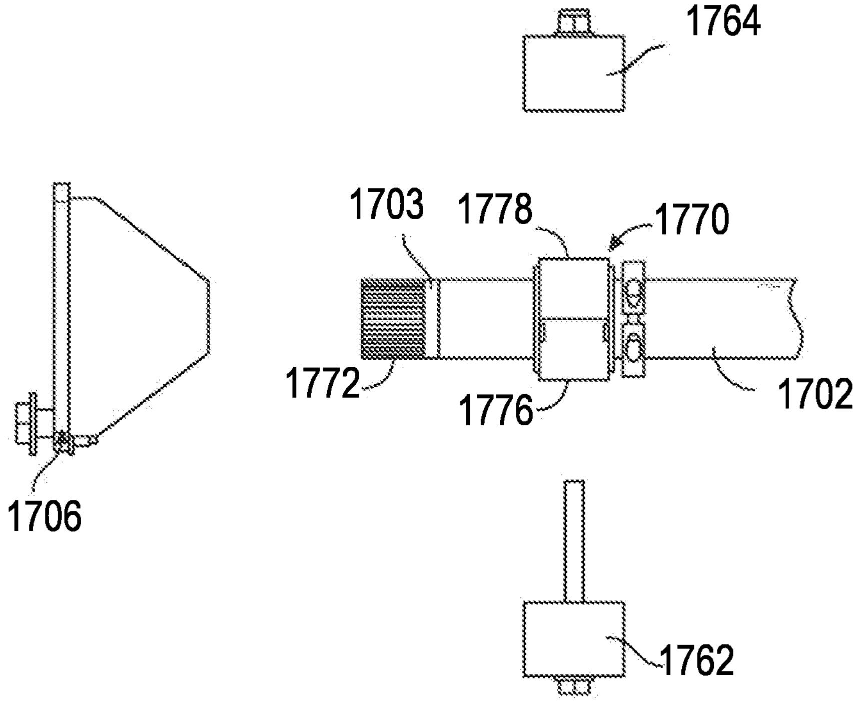
FIG. 40G is an exploded view of the mounting system of FIG. 40B, shown from the side, according to an exemplary embodiment.

As shown in FIGS. 40D-40G, the rod 1702 includes a separation groove 1703 that separates the main body of the rod 1702 from the first end 1704. In one embodiment, the first end 1704 includes an interface member, shown as a splined end 1772 that is substantially the same diameter as the main body of the rod 1702. As shown in FIG. 40D, splined end 1772 engages (e.g., is coupled to) an interface portion, shown as splined receiver 1774 of the cap 1724 of the bending portion 1720. Such engagement may interlock the movement of the bending portion 1720 resulting from movement of link 1738 to the rod 1702. As such, the rod 1702 rotates with the coupling of the bushing 1770 and the mounting bracket 1706, and rotational torsion is transferred to the other side of the sway bar assembly. According to an alternative embodiment, rod 1702 may be otherwise coupled to bending portion 1720 (e.g., welding, a bolted connection, a press fit connection, thermal fit connection, etc.).

Also as shown in FIGS. 40D-40G, the bushing 1770 is constructed of a first section, shown as first shell 1776 and a second section, shown as second shell 1778. In the example shown, the first shell 1776 and the second shell 1778 are substantially semi-cylindrical. The first shell 1776 and the second shell 1778 interlock to substantially encapsulate (e.g., surround, cover, etc.) a portion of the rod 1702 and provide a rotational coupling between the bushing 1770 and the grooves of the first and second mounting blocks 1762 and 1764. As such, a junction is formed between the first shell 1776 and the second shell 1778.

Figure 40H:
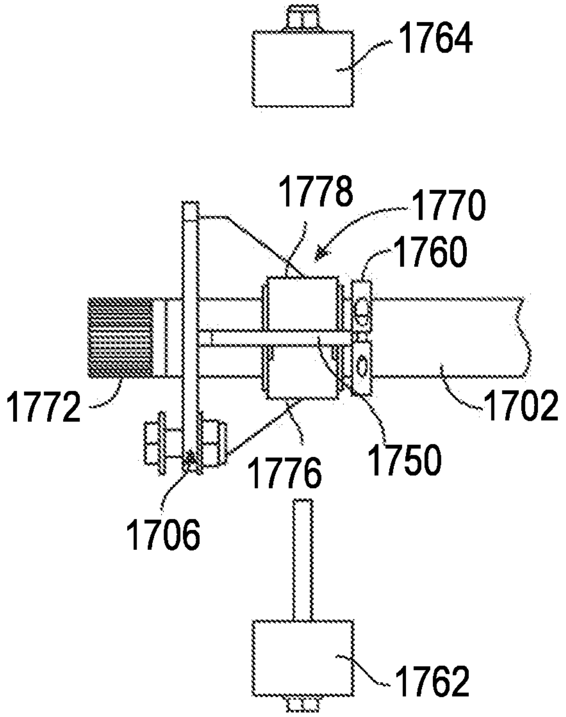
FIG. 40H is a partially exploded view of the mounting system of FIG. 40B, shown from the side, according to an exemplary embodiment.

As shown in FIG. 40H, the symmetrical shaping of the first mounting block 1762 and the second mounting block 1764 centers the bushing 1770 such that the junction between the first and second shells 1776 and 1778 is substantially aligned with the second panel 1750 of the first mounting bracket 1706. As such, the junction is protected from the influence of debris that may be projected towards the mounting bracket 1706, and a long-lasting rotational coupling of the bushing 1770 and the first and second mounting blocks 1762 and 1764 is ensured.

Cooling Pack Placement

According to the exemplary embodiment shown in FIGS. 41-45, the vehicle 10 include a cooling system, shown as cooling pack 1900. As shown in FIGS. 1 and 41-44, the cooling pack 1900 is positioned forward of the front cabin 20 and the prime mover 1850 such that an airgap (e.g., open space, a cab-tilt space, etc.), shown as airgap 1890, is formed between the cooling pack 1900, the frame 1812, the prime mover 1850, the hood 24, and/or the front cabin 20. As shown in FIGS. 41-45, the cooling pack 1900 includes a heat exchanger, shown as radiator 1910; a cooling element, shown as fan 1920; a ring, shown as fan ring 1930; a shroud, shown as fan shroud 1940; and a plurality of fluid conduits, shown as coolant conduits 1950.

Figure 41:
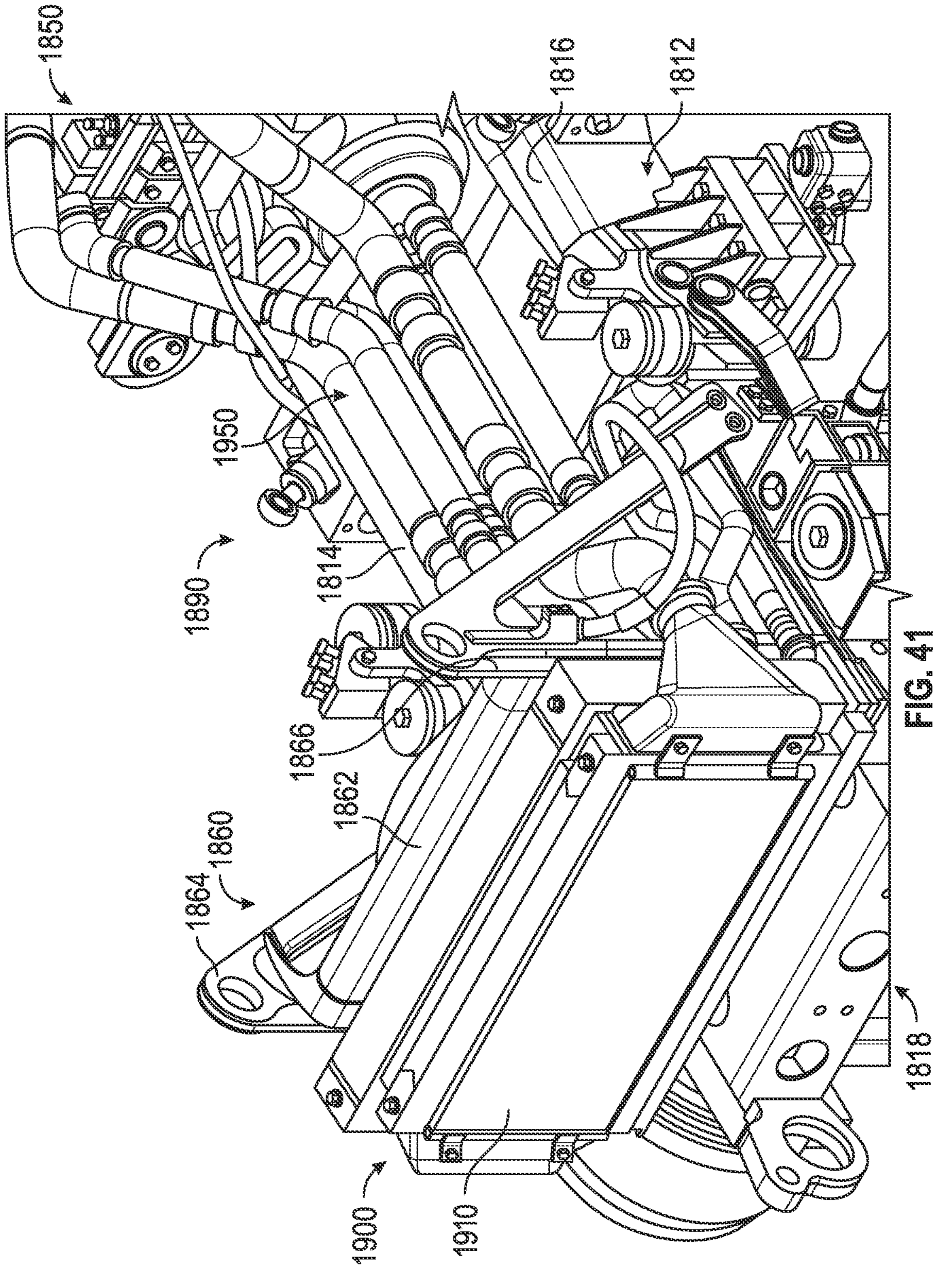
FIG. 41 is a front perspective view of a cooling pack for a prime mover of the vehicle of FIG. 1, according to an exemplary embodiment.
Figure 42:
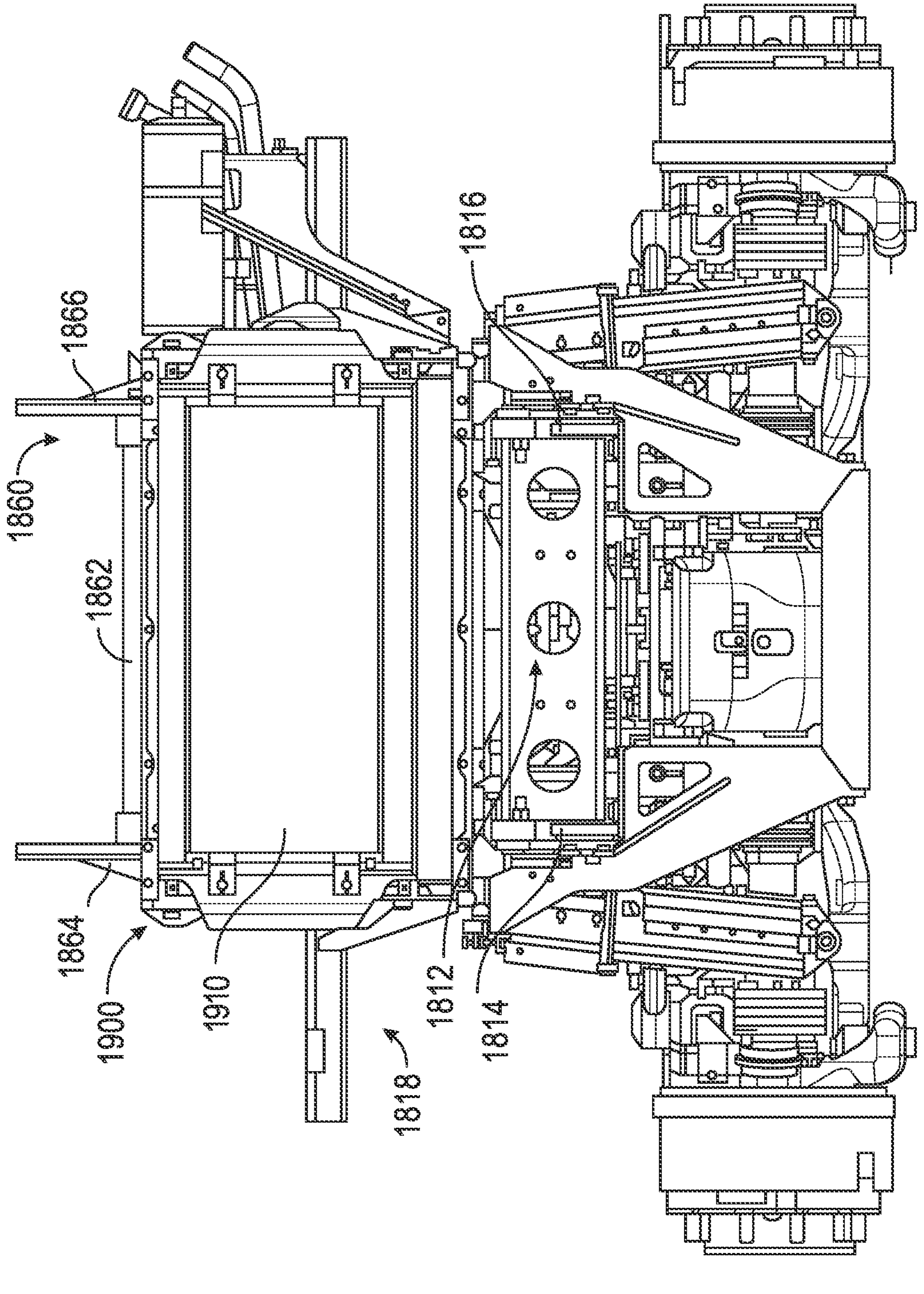
FIG. 42 is a front view of the cooling pack of FIG. 41, according to an exemplary embodiment.
Figure 43:
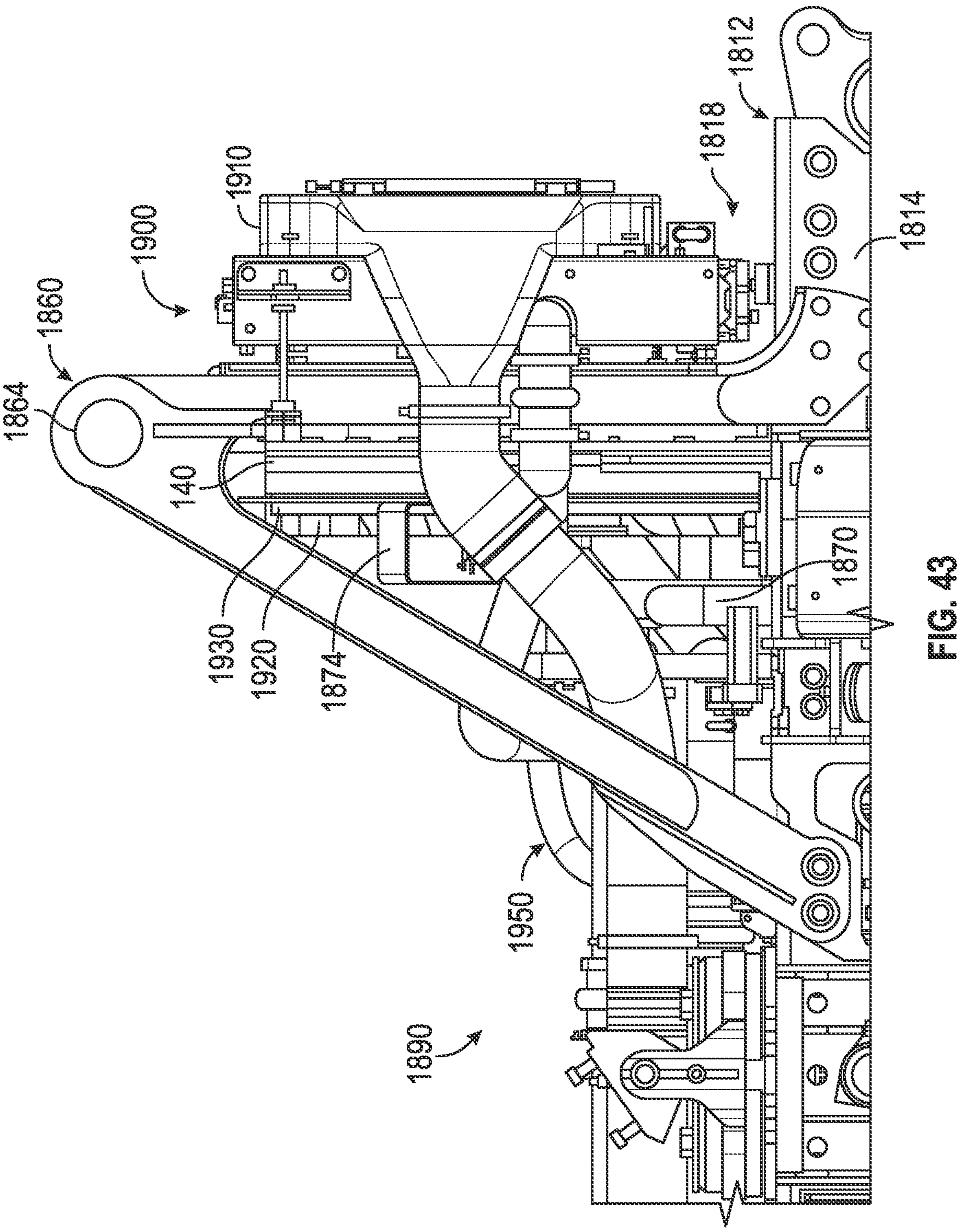
FIG. 43 is a right view of the cooling pack of FIG. 41, according to an exemplary embodiment.
Figure 44:
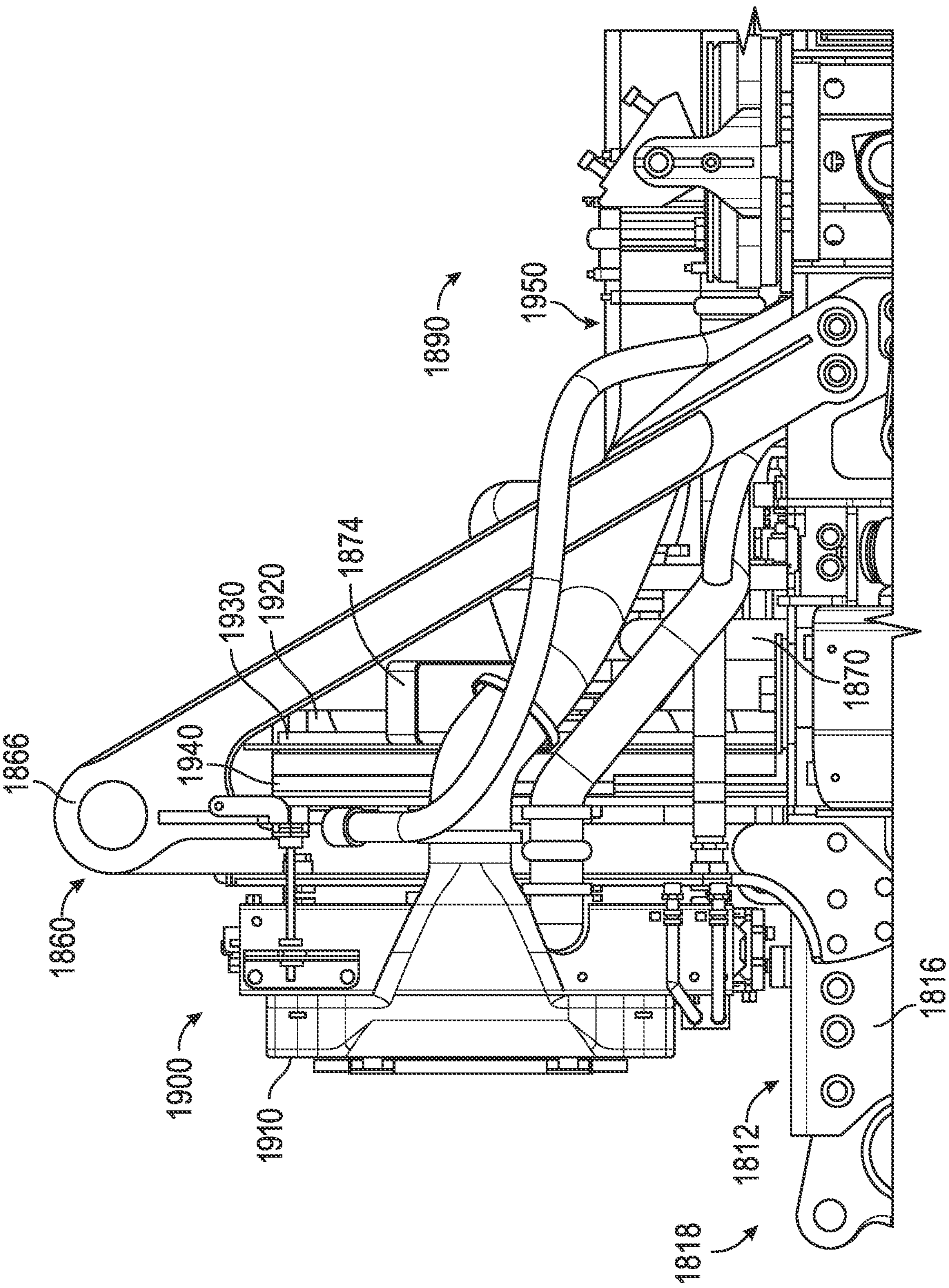
FIG. 44 is a left side view of the cooling pack of FIG. 41, according to an exemplary embodiment.

As shown in FIGS. 41-44, the radiator 1910 is positioned at an end of the frame 1812, shown as front end 1818. The radiator 1910 is coupled to the frame 1812 by a first support structure, shown as A-arm support 1860. The A-arm support 1860 includes a first member, shown as cross member 1862; a second member, shown as right A-arm 1864; and a third support member, shown as left A-arm 1866. As shown in FIG. 43, the right A-arm 1864 is coupled to and extends from a first frame rail of the frame 1812, shown as right frame rail 1814. As shown in FIGS. 41 and 44, the left A-arm 1866 is coupled to and extends from a second frame rail, shown as left frame rail 1816, of the frame 1812 spaced from the right frame rail 1814. As shown in FIGS. 41 and 42, the cross member 1862 extends between the right A-arm 1864 and the left A-arm 1866.

As shown in FIGS. 41 and 42, the radiator 1910 is positioned above (e.g., on top of, etc.) the right frame rail 1814 and the left frame rail 1816 of the frame 1812. In one embodiment, the radiator 1910 is sized such that radiator 1910 extends between the right frame rail 1814 and the left frame rail 1816. According to the exemplary embodiment shown in FIG. 41, the radiator 1910 is wider than the spacing between the right frame rail 1814 and the left frame rail 1816 (e.g., the radiator 1910 extends beyond the right frame rail 1814 and the left frame rail 1816, etc.). In other embodiments, the radiator 1910 has a width equal to or less than the distance between the right frame rail 1814 and the left frame rail 1816. According to an exemplary embodiment, the radiator 1910 is configured to facilitate cooling a fluid or coolant (e.g., engine coolant, etc.) within the radiator 1910 (e.g., through a heat exchange process with air flowing therethrough, etc.). As shown in FIGS. 41, 43, and 44, the coolant conduits 1950 extend from the radiator 1910 to the prime mover 1850 to facilitate providing the coolant between the radiator 1910 and the prime mover 1850 (e.g., with a coolant pump, etc.).

Figure 45:
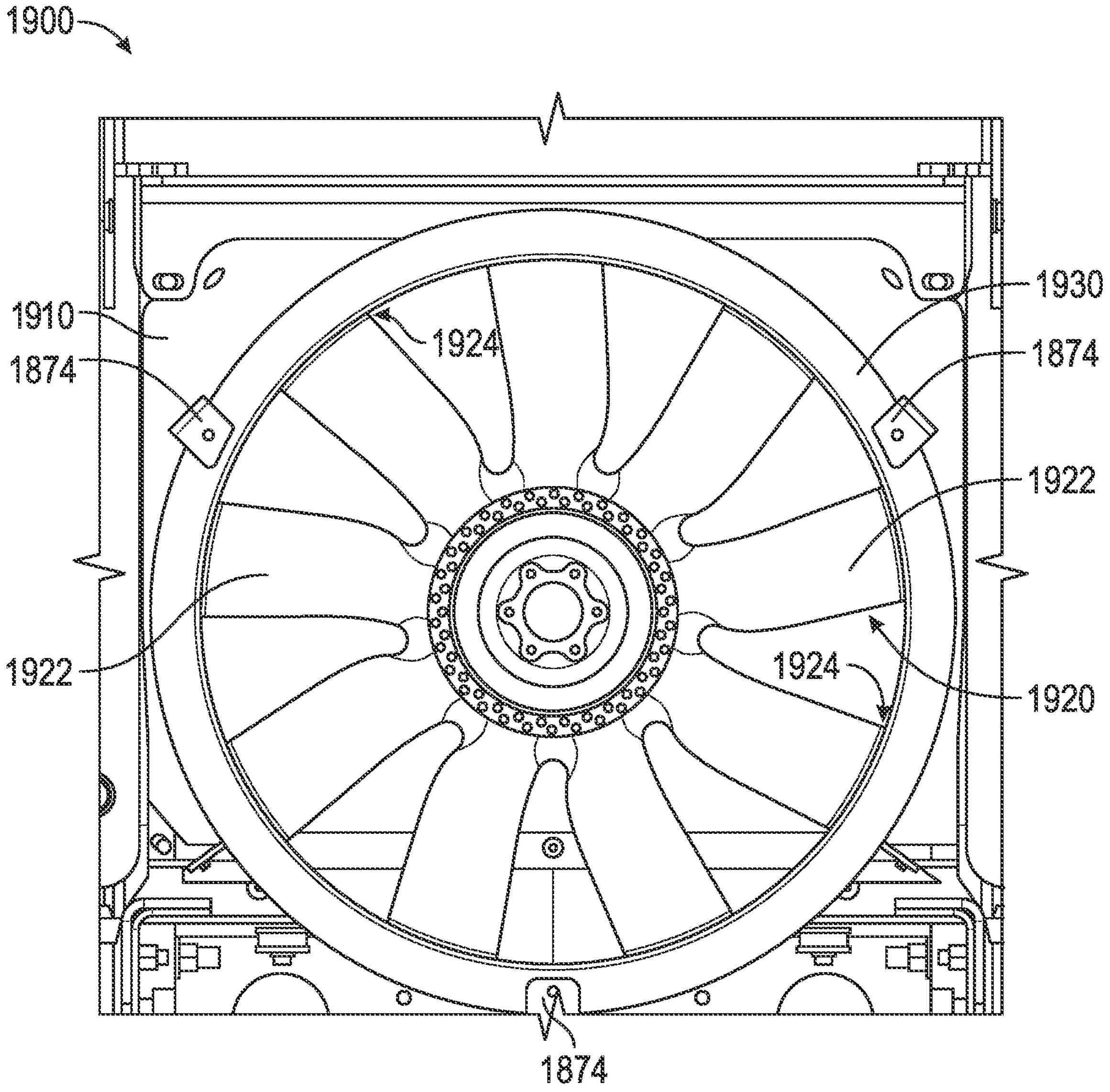
FIG. 45 is a rear view of the cooling pack of FIG. 41, according to an exemplary embodiment.

As shown in FIGS. 43-45, the fan 1920 is positioned behind and proximate the radiator 1910. According to an exemplary embodiment, the fan 1920 is configured to draw air through the radiator 1910 to cool the coolant within the radiator 1910. According to an exemplary embodiment, the fan 1920 is coupled to a pulley assembly, and a drive shaft extends between the pulley assembly and a power take-off ("PTO") of the prime mover 1850. The drive shaft and pulley assembly may be configured to facilitate remotely driving the fan 1920 with the prime mover 1850. In other embodiments, the drive shaft is directly coupled to the fan 1920.

As shown in FIGS. 43 and 44, a second support structure, shown as fan support 1870, is positioned to couple the fan 1920 to the frame 1812 of the vehicle 10. As shown in FIGS. 43-45, the fan support 1870 includes a plurality of brackets, shown as arms 1874, the extend from the fan support 1870. The arms 1874 are positioned to couple the fan ring 1930 around the fan 1920. As shown in FIGS. 43 and 44, the fan shroud 1940 is positioned between (i) the fan 1920 and the fan ring 1930 and (ii) the radiator 1910. According to an exemplary embodiment, the fan shroud 1940 is supported by the fan support 1870.

As shown in FIG. 45, the fan 1920 includes a plurality of tips or fins, shown as fan tips 1922, that are spaced a distance from the fan ring 1930 (and the fan shroud 1940), shown as fan tip clearance 1924. According to an exemplary embodiment, the efficiency of the cooling pack 1900 is based at least in part on the fan tip clearance 1924. By way of example, the smaller the fan tip clearance 1924 is, the greater the efficiency of the cooling pack 1900 may be. According to an exemplary embodiment, the arrangement of the cooling pack 1900 facilitates minimizing the fan tip clearance 1924 such that efficiency of the cooling pack 1900 is increased. In traditional cooling pack arrangements, a fan is coupled to the engine and a shroud is coupled to a radiator (e.g., which is separately coupled to the chassis, etc.). Such an arrangement causes increased relative movement between the fan and the shroud (e.g., the fan moves with the engine under varying loading conditions, etc.). The increased relative movement forces a corresponding increase in the fan tip clearance to provide sufficient clearance for accommodating the increased relative movement therebetween, which disadvantageously decreases the efficiency of such a cooling pack. According to the exemplary embodiment shown in FIGS. 43-45, mounting the fan 1920, the fan ring 1930, and the fan shroud 1940 together with a single support structure (i.e., the fan support 1870) proximate the radiator 1910 minimizes relative movement between the fan 1920 and the fan shroud 1940 such that the fan tip clearance 1924 may be minimized, which advantageously increases the efficiency of the cooling pack 1900.

Another advantage of the arrangement of the cooling pack 1900 includes the positioning of the cooling pack 1900 relative to the prime mover 1850 such that the airgap 1890 is formed therebetween. According to an exemplary embodiment, the airgap 1890 facilitates increased cooling of the prime mover 1850 and/or the radiator 1910. Traditional cooling system arrangements include a radiator and a fan immediately positioned in front of an engine under the hood of a vehicle. Such close positioning between the cooling system and the engine restricts the flow of the air through the fan (e.g., due to the close proximity of the fan to the engine, etc.). The cooling pack 1900 of the present disclosure is advantageously positioned ahead of the prime mover 1850 such that the flow of air through the fan 1920 and pushed rearward of the cooling pack 1900 is not restricted, but can freely flow into the airgap 1890, increasing the cooling capability of the cooling pack 1900 (e.g., more air is drawn through the radiator 1910, increased airflow to the prime mover 1850, etc.).

According to an exemplary embodiment, the minimization of the fan tip clearance 1924 and the formation of the airgap 1890 between the cooling pack 1900 and the prime mover 1850 facilitate expelling increased thermal load/energy generated by the prime mover 1850. The arrangement of the cooling pack 1900 therefore facilitates increasing the performance of the prime mover 1850 (e.g., horsepower output, torque output, etc. thereof) by facilitating the tuning of the prime mover 1850 for increased performance (e.g., which then generates increased thermal load during operation which is able to be removed by the cooling pack 1900, etc.).

Fan Drive Arrangement

According to the exemplary embodiment shown in FIGS. 46-50, the cooling pack 1900 includes a fan system, shown as fan system 2000. It should be understood that the fan system 2000 may be or include many of the components of the cooling pack 1900 (e.g., the fan 1920, the fan ring 1930, the fan shroud 1940, etc.) described and shown herein in relation to FIGS. 41-45. As shown in FIGS. 46-50, the fan system 2000 includes a plate, shown as support plate 2010; a first support member, shown as first pulley support 2020; a second support member, shown as second pulley support 2030; a pulley assembly supported by the first pulley support 2020 and the second pulley support 2030; a cooling element (e.g., the fan 1920, etc.), shown as fan 2070, supported by the second pulley support 2030 (e.g., the fan support 1870, etc.); and an energy generation device, shown as alternator 2090. In some embodiments, the fan system 2000 does not include the alternator 2090. As shown in FIGS. 46-50, the pulley assembly includes a plurality of rotational members (e.g., pulleys, sheaves, wheels, etc.) including a first rotational member, shown as drive pulley 2050; a second rotational member, shown as fan pulley 2052; a third rotational member, shown as first intermediate pulley 2054; a fourth rotational member, shown as alternator pulley 256; a fifth rotational member, shown as second intermediate pulley 2058; and a belt, shown as pulley belt 2060. In other embodiments, the pulley assembly does not include each of the drive pulley 2050, fan pulley 2052, the first intermediate pulley 2054, the alternator pulley 256, and the second intermediate pulley 2058 (e.g., the pulley assembly does not include at least one of the first intermediate pulley 2054, the alternator pulley 256, and the second intermediate pulley 2058 in embodiments where the fan system 2000 does not include the alternator 2090, etc.).

As shown in FIGS. 46 and 48-50, the support plate 2010 extends between a first frame rail of the frame 1812, shown as right frame rail 1814, and a second frame rail of the frame 1812 spaced from the right frame rail 1814, shown as left frame rail 1816. As shown in FIGS. 46 and 48-50, the first pulley support 2020 and the second pulley support 2030 are coupled to and extend from the support plate 2010, coupling the pulley assembly and the fan 2070 to the support plate 2010. According to an exemplary embodiment, the second pulley support 2030 is a tubular member having a U-shape profile. According to the exemplary embodiment shown in FIGS. 46 and 48-50, the support plate 2010 is positioned along the frame 1812 such that the support plate 2010 is proximate the front end 1818 of the frame 1812 and the vehicle 10. According to an exemplary embodiment, the fan system 2000 (e.g., the support plate 2010, the first pulley support 2020, the second pulley support 2030, the fan 2070, the pulley assembly, the alternator 2090, etc.) is positioned forward of the prime mover 1850 and the front cabin 20 (e.g., under the hood of the vehicle 10, etc.).

Figure 46:
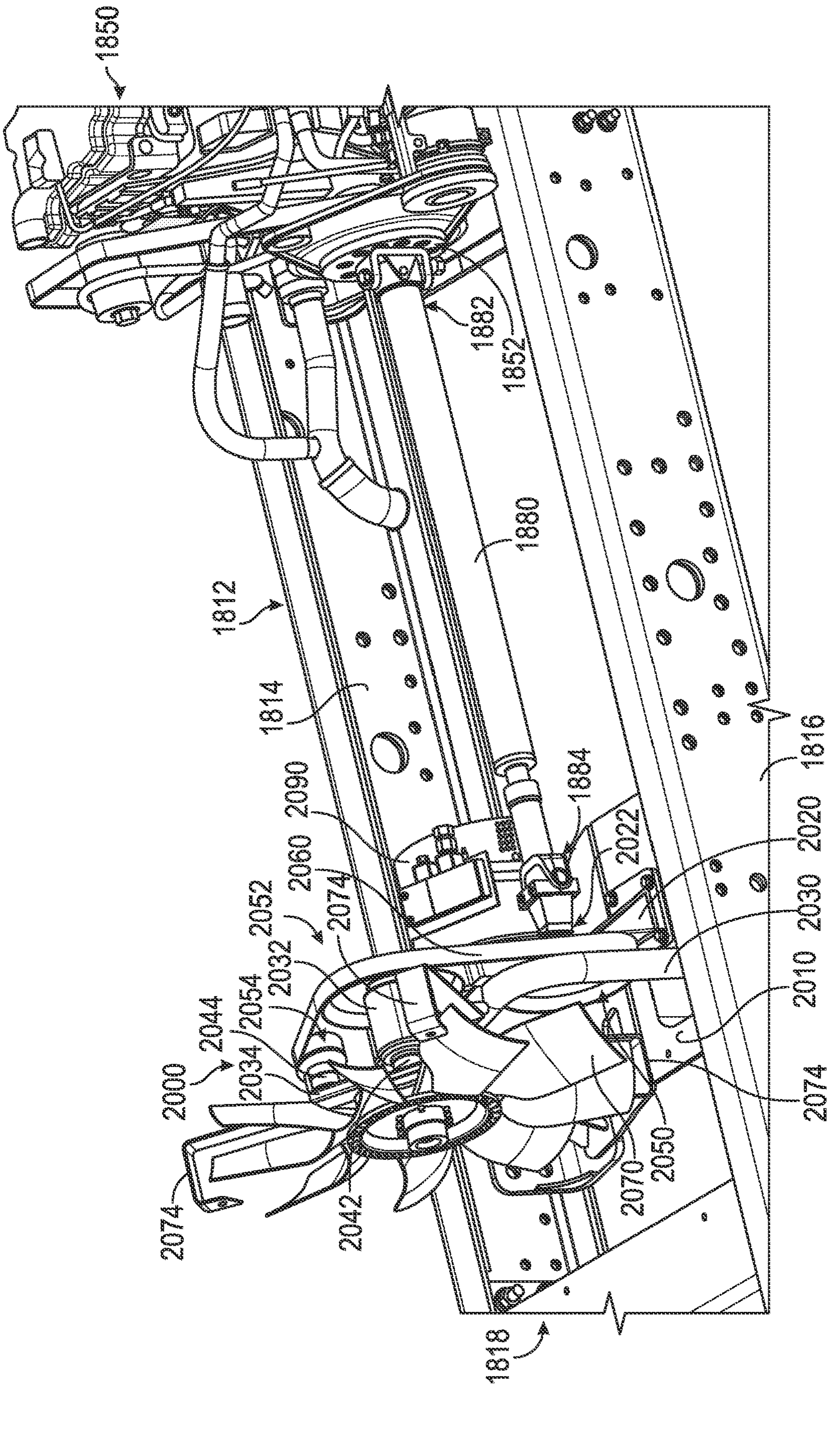
FIG. 46 is a front perspective view of a fan system coupled to a prime mover of the vehicle of FIG. 1, according to an exemplary embodiment.
Figure 48:
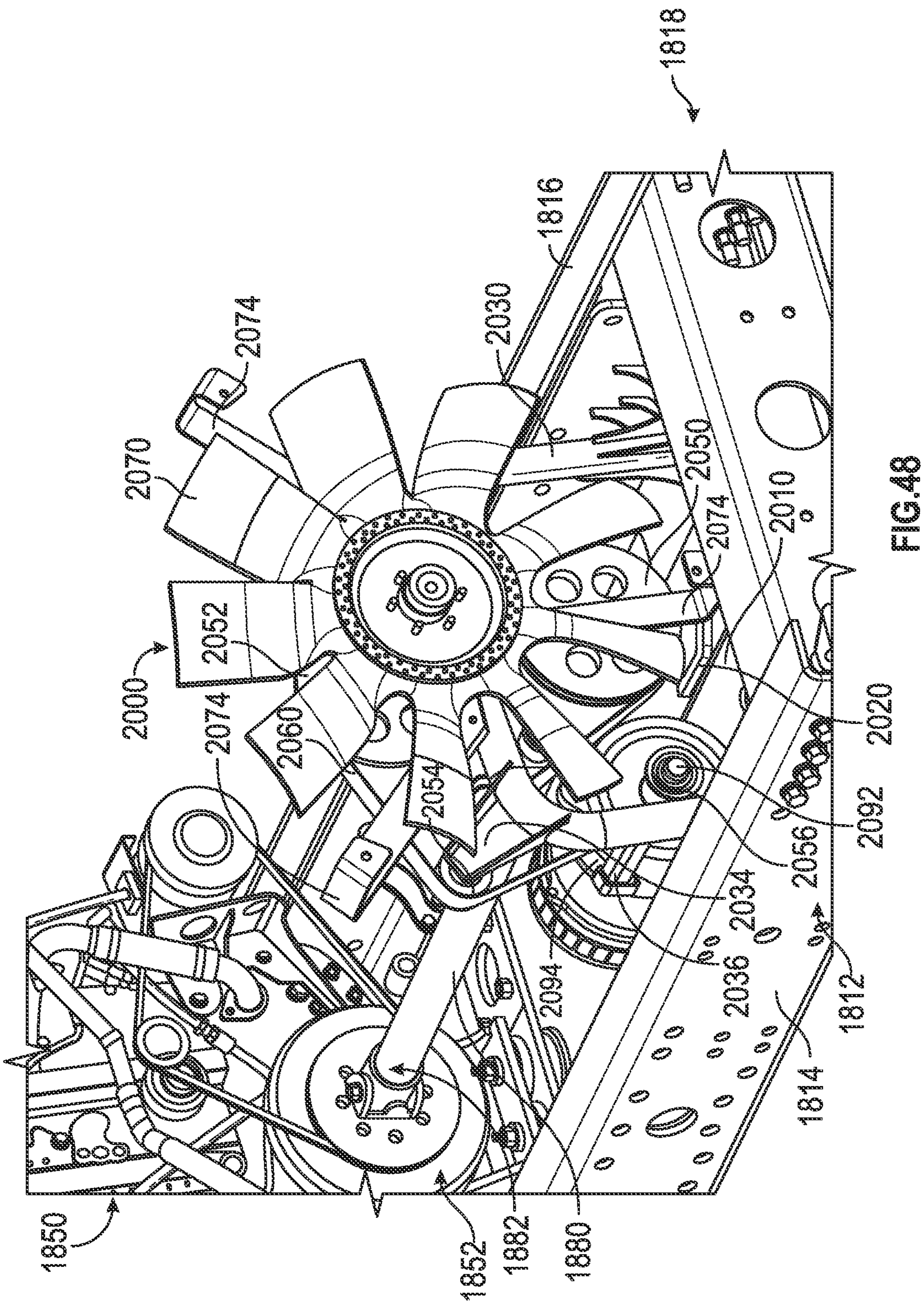
FIG. 48 is a detailed front perspective view of the fan system of FIG. 46, according to an exemplary embodiment.
Figure 49:
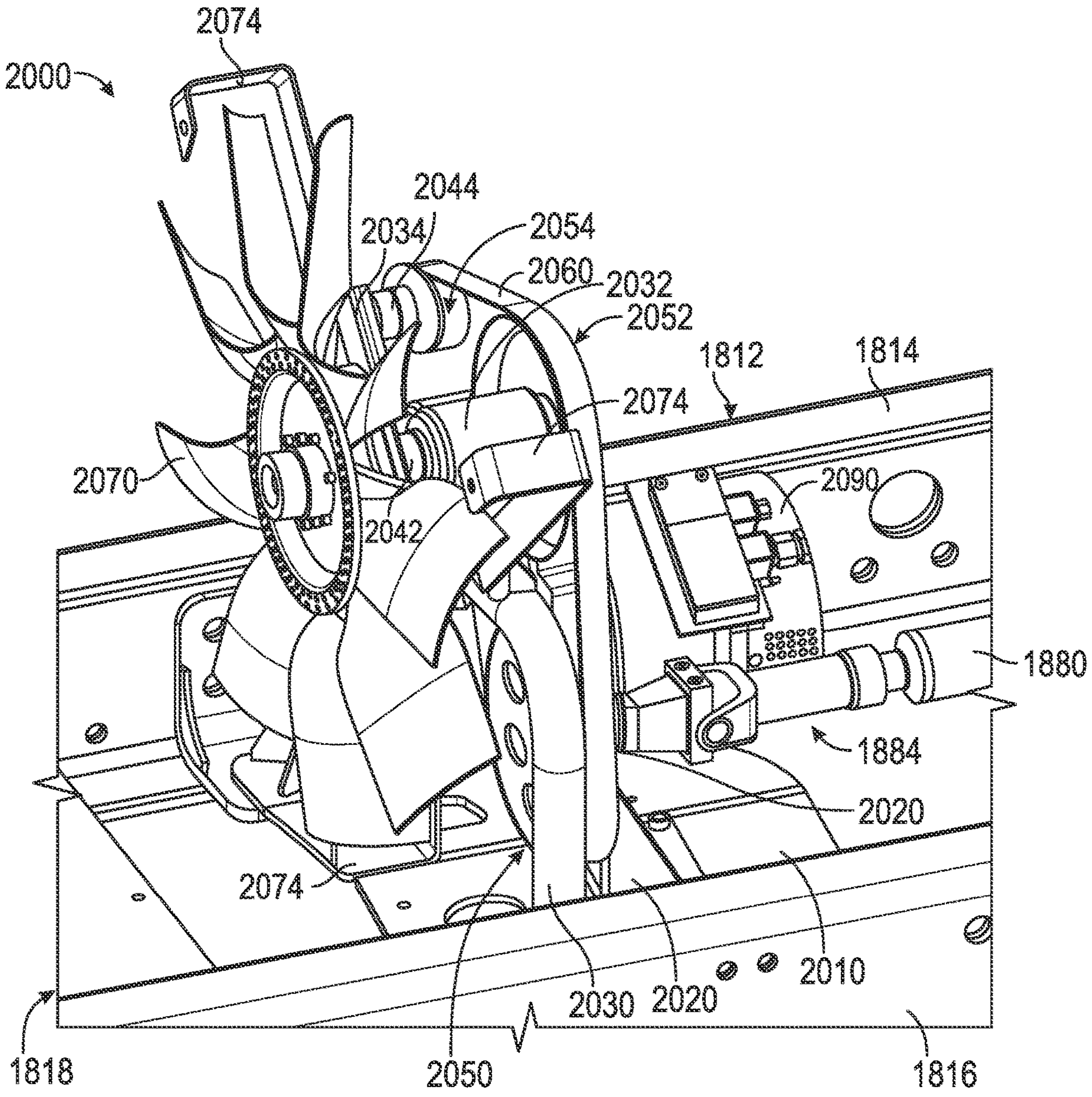
FIG. 49 is a detailed side view of the fan system of FIG. 46, according to an exemplary embodiment.
Figure 50:
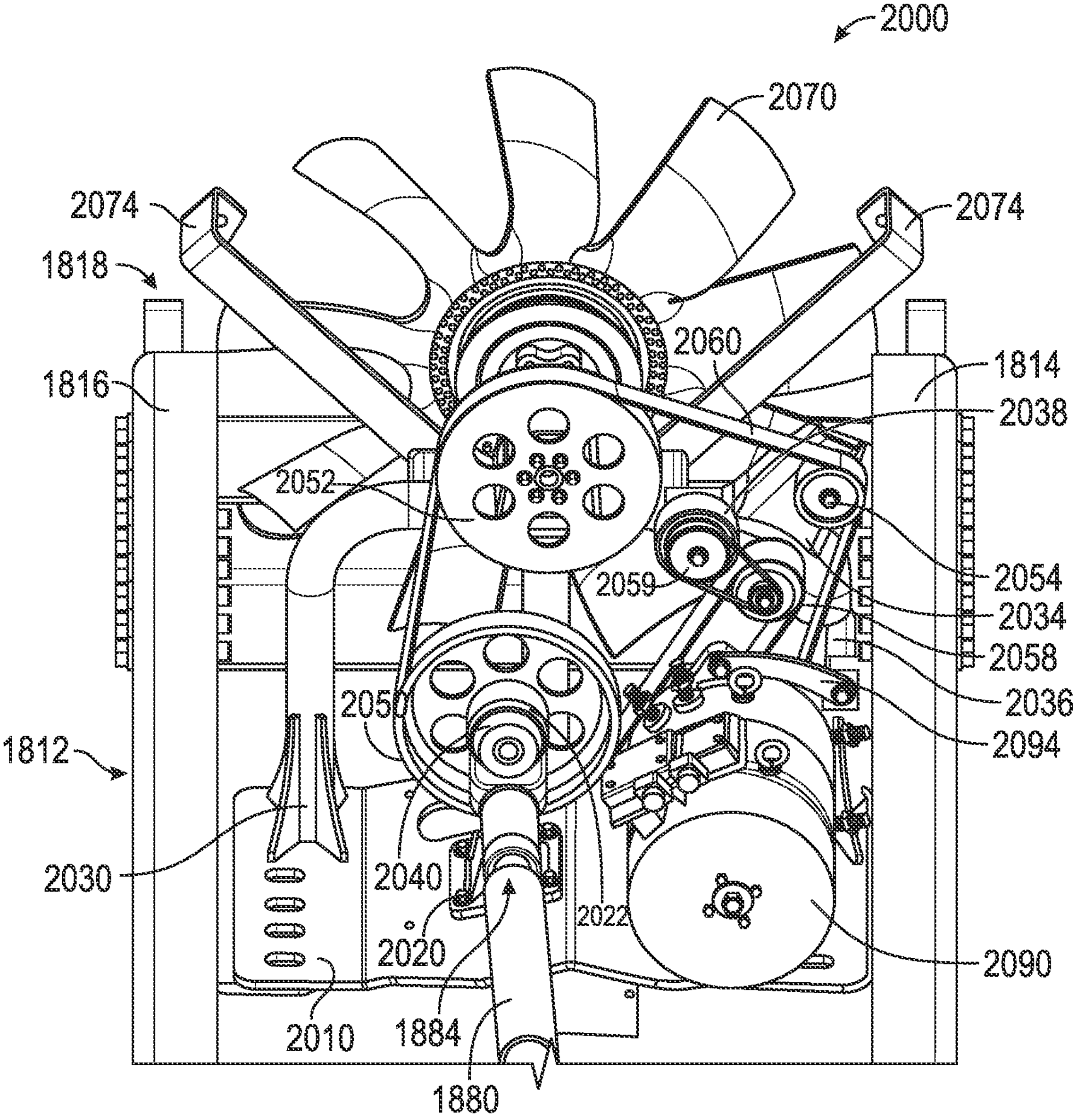
FIG. 50 is a detailed rear view of the fan system of FIG. 46, according to an exemplary embodiment.
Figure 51:
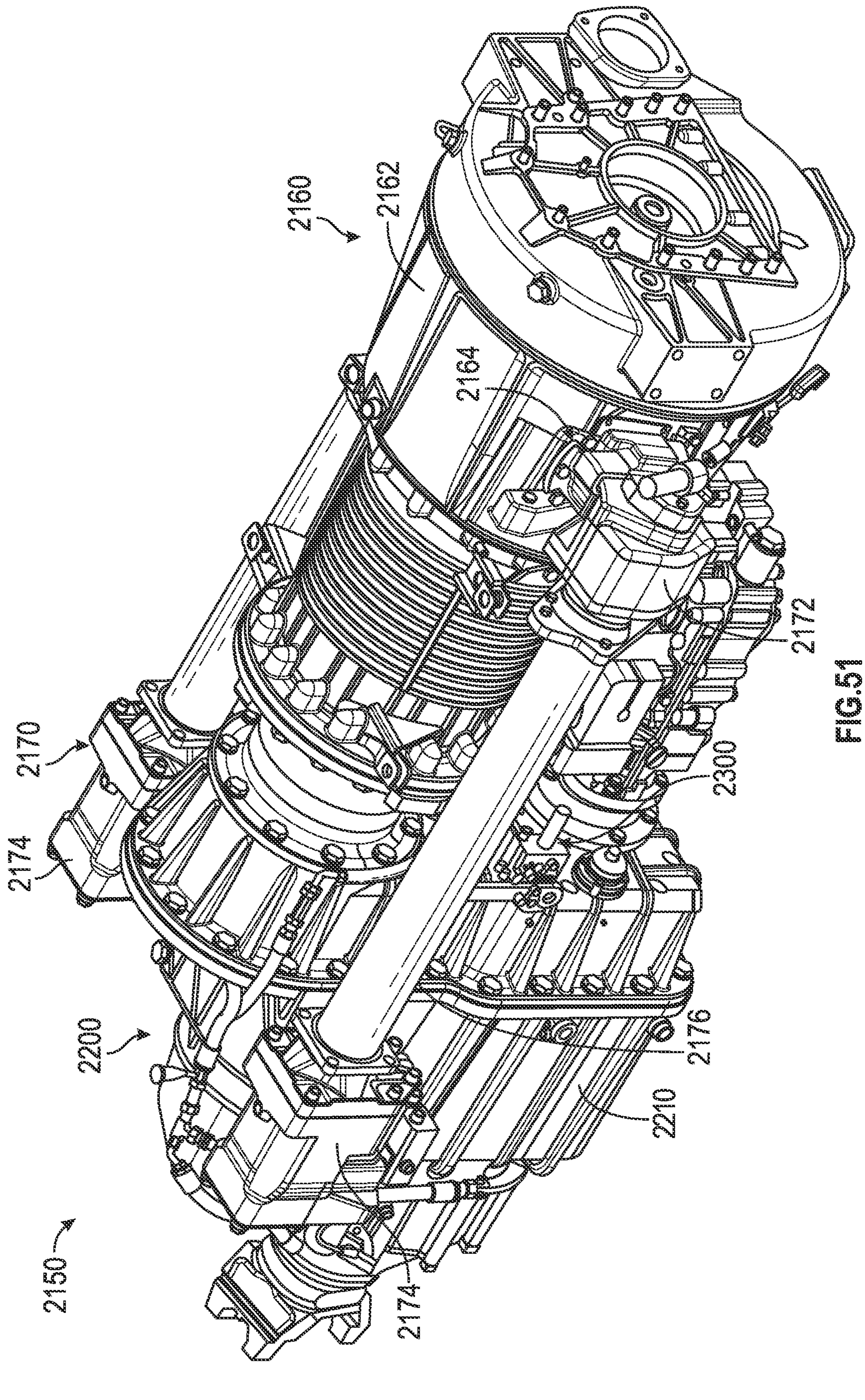
FIGS. 51-54 are various perspective views of a transmission and a transfer case of a powertrain of the vehicle of FIG. 1, according to an exemplary embodiment.
Figure 52:
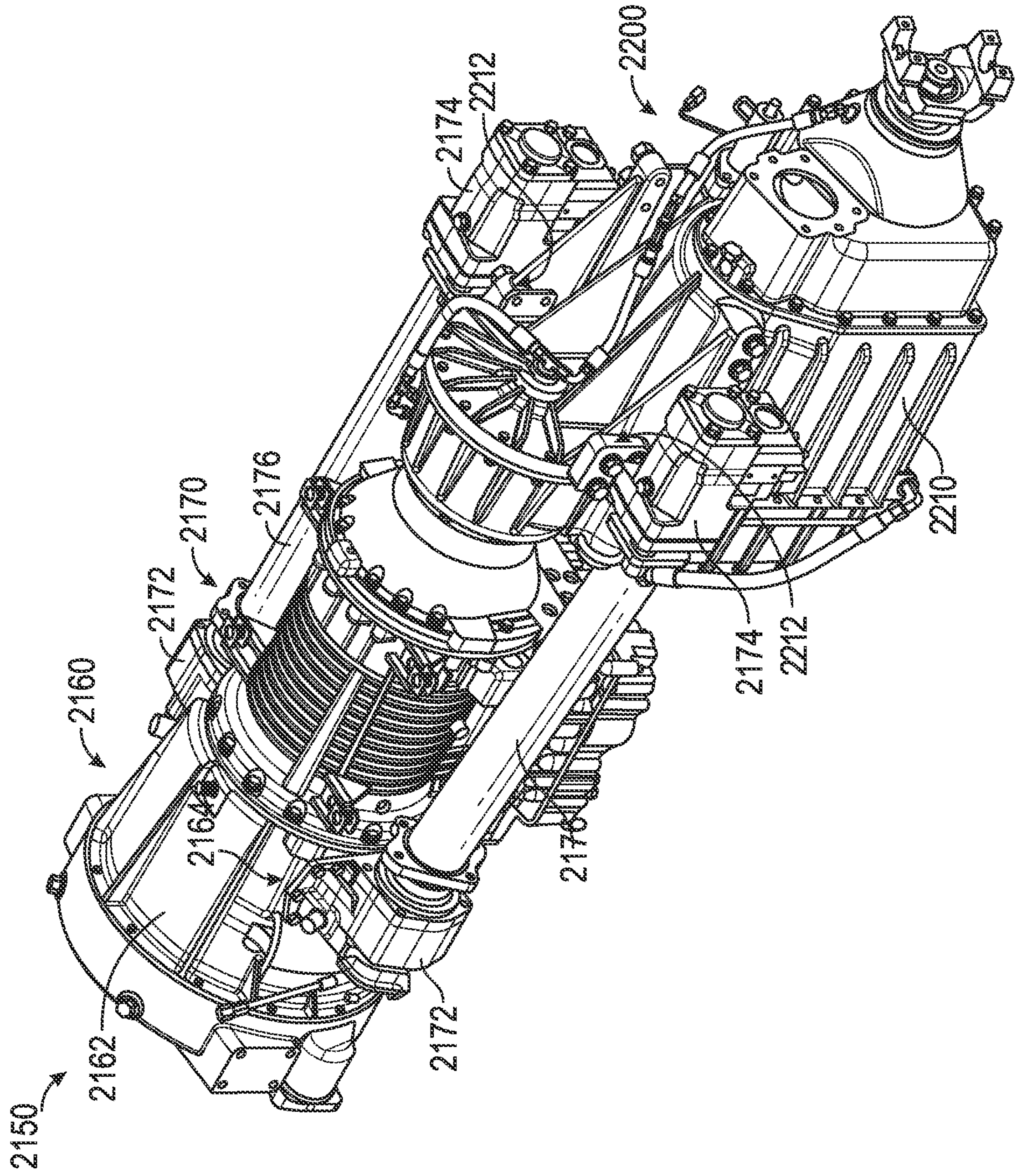
Figure 53:
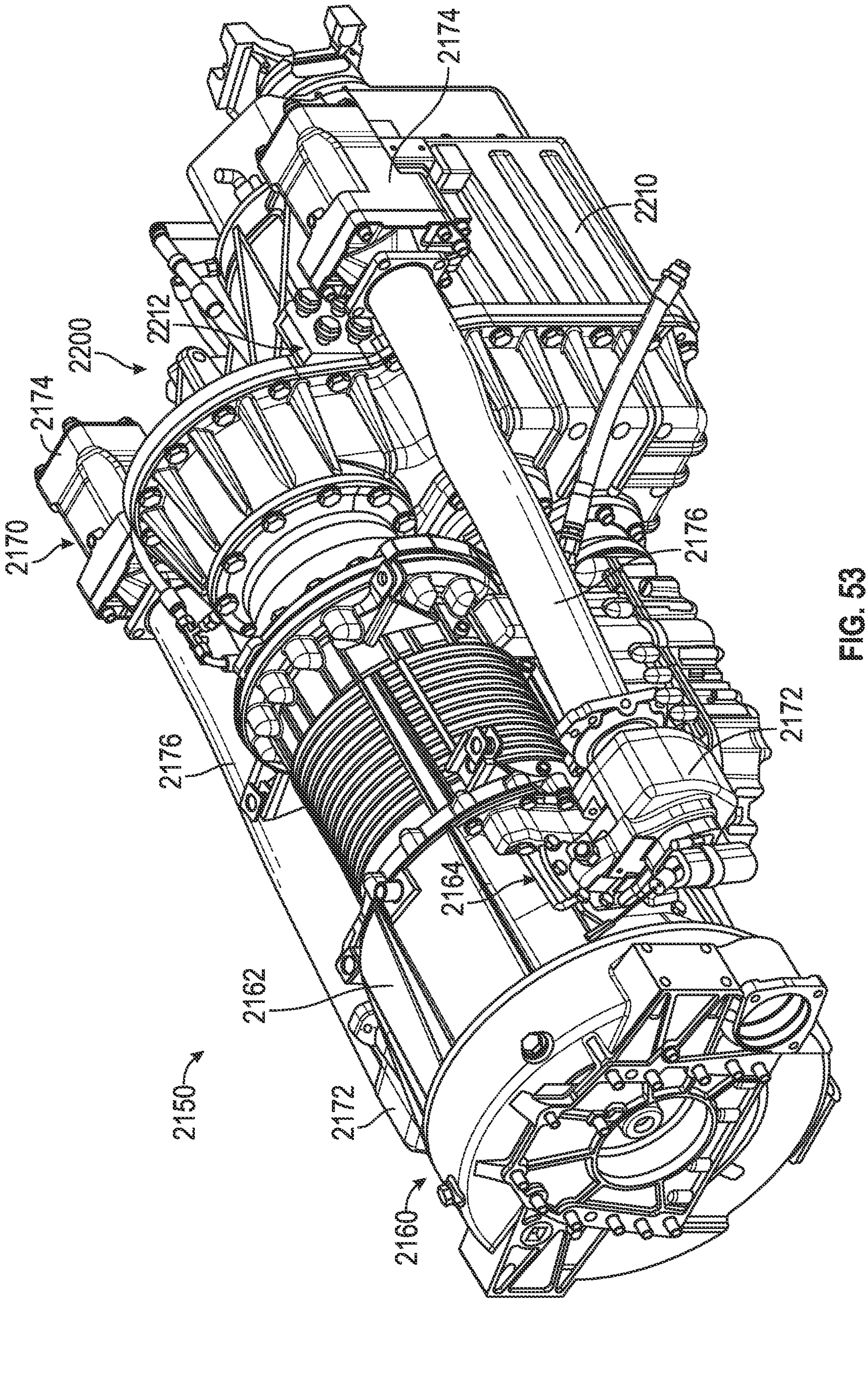
Figure 54:
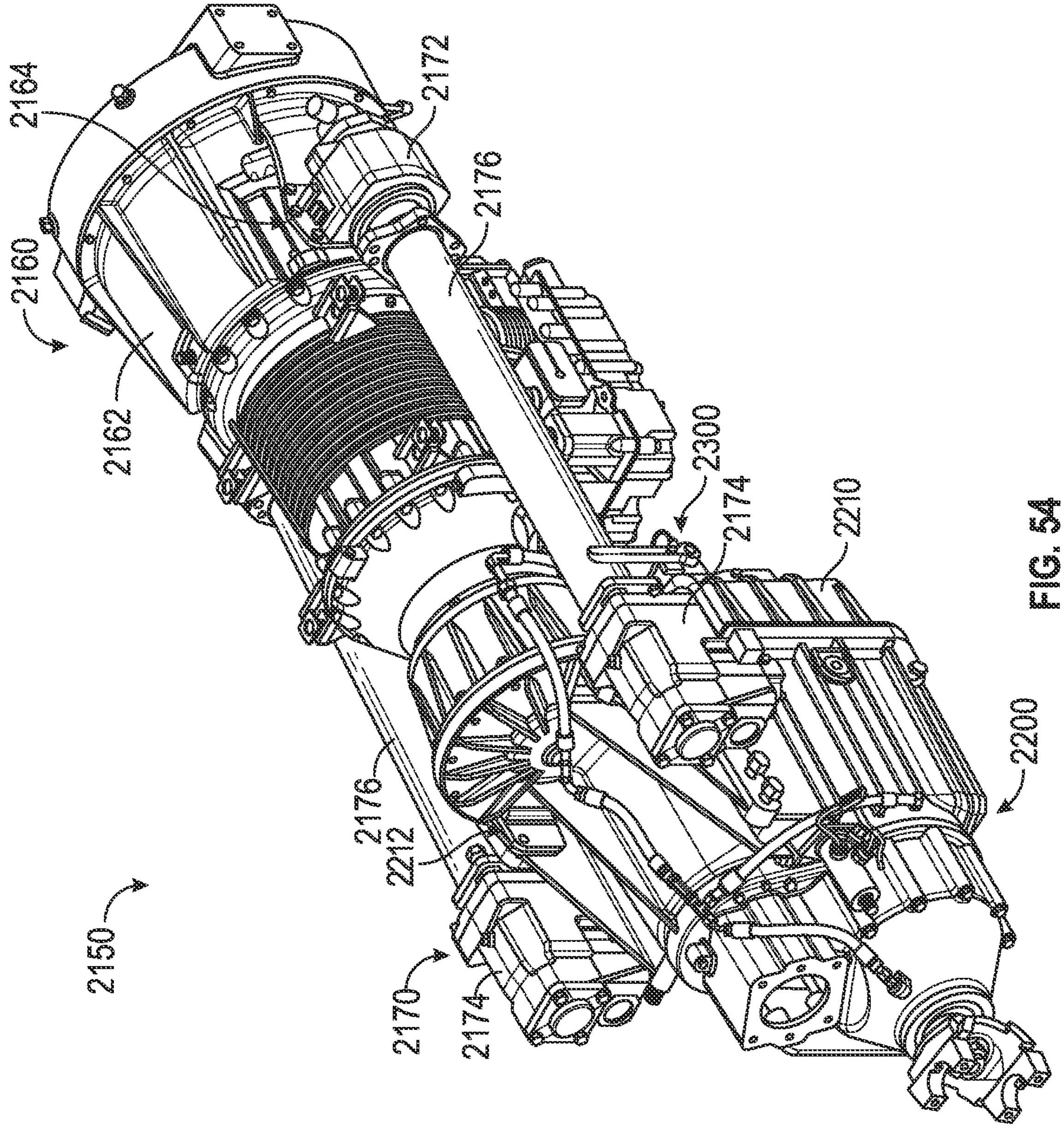

As shown in FIGS. 46, 49, and 50, the first pulley support 2020 includes a first interface, shown as drive interface 2022. As shown in FIG. 50, the drive interface 2022 engages with (e.g., receives, etc.) a first shaft, shown as drive shaft 240, configured to rotationally couple the drive pulley 2050 to the first pulley support 2020. As shown in FIGS. 46 and 48-50, the first pulley support 2020 extends upward from the support plate 2010 such that the drive pulley 2050 is elevated relative to the support plate 2010. As shown in FIGS. 46-50, the vehicle 10 includes a connector, shown as connecting shaft 1880, having a first end, shown as first end 1882, coupled to an prime mover interface, shown as prime mover power take-off ("PTO") 1852, of the prime mover 1850, and an opposing second end, shown as second end 1884, coupled to the drive shaft 240 of the pulley assembly. The connecting shaft 1880 is thereby positioned to extend between and couple the prime mover 1850 to the fan system 2000. The connecting shaft 1880 may be manufactured from steel, a composite material (e.g., carbon fiber, etc.), and/or still another material. According to an exemplary embodiment, the prime mover PTO 1852 is connected to and driven by a crankshaft of the prime mover 1850. The crankshaft of the prime mover 1850 may thereby directly drive the connecting shaft 1880 and the drive pulley 2050. In other embodiments, the drive pulley 2050 is replaced with the fan 2070 such that the fan 2070 is directly coupled to the second end 1884 of the connecting shaft 1880 such that the fan 2070 is directly driven by the crankshaft of the prime mover 1850 off of the prime mover PTO 1852.

Figure 47:
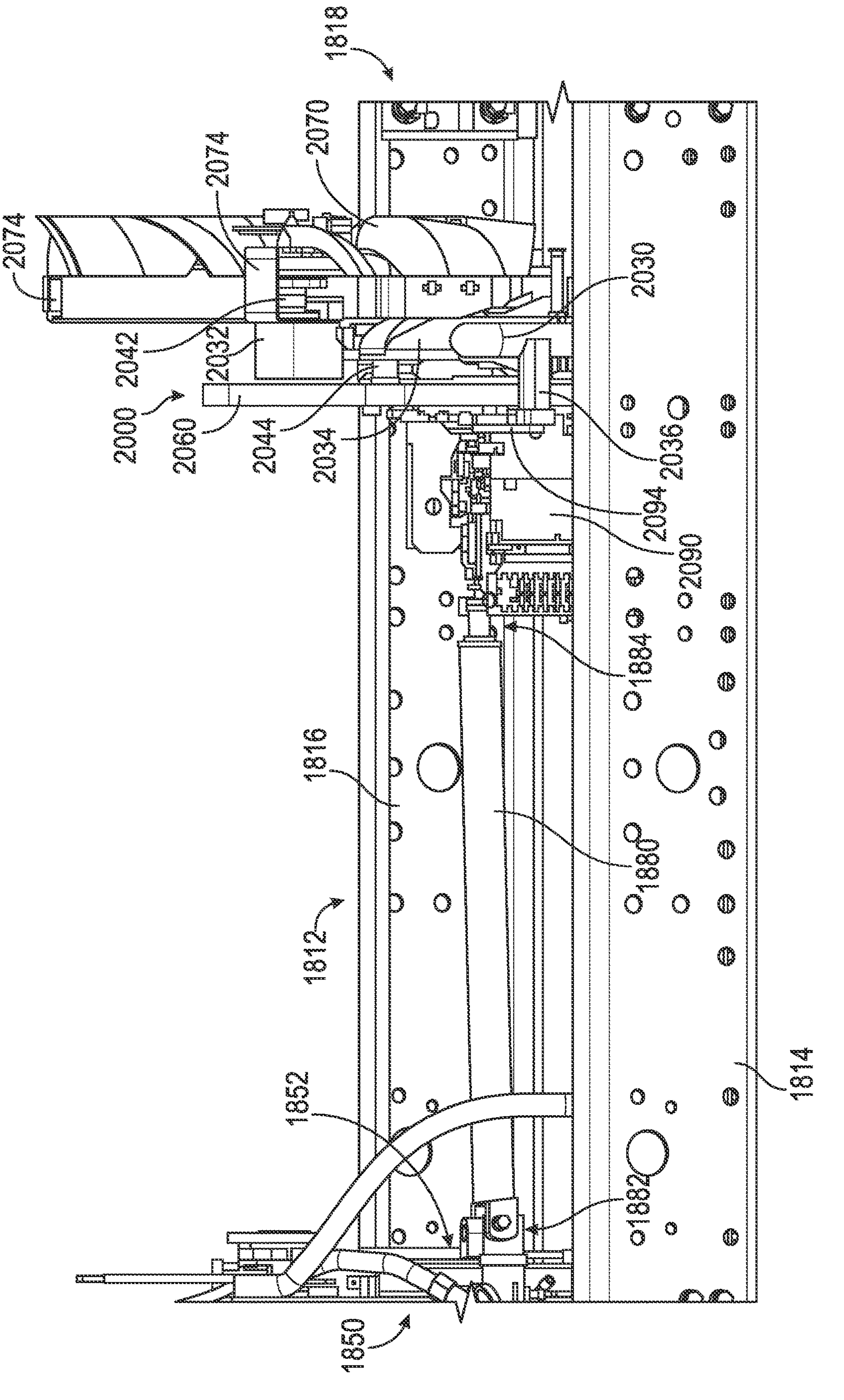
FIG. 47 is a side view of the fan system of FIG. 46, according to an exemplary embodiment.

As shown in FIGS. 46-50, the second pulley support 2030 includes a second interface, shown as fan interface 2032; a third interface, shown as first intermediate interface 2034; a fourth interface, shown as alternator interface 2036; and a fifth interface, shown as second intermediate interface 238. As shown in FIGS. 46, 47, and 49, the fan interface 2032 engages with (e.g., receives, etc.) a second shaft, shown as fan shaft 2042, configured to rotationally couple the fan pulley 2052 and the fan 2070 to the second pulley support 2030. As shown in FIGS. 46-50, the second pulley support 2030 extends upward from the support plate 2010 such that the fan pulley 2052 and the fan 2070 are elevated relative to the support plate 2010. According to an exemplary embodiment, the second pulley support 2030 elevates the fan 2070 such that the fan 2070 is positioned substantially (e.g., completely, mostly, etc.) above the right frame rail 1814 and the left frame rail 1816. In other embodiments, the fan 2070 is at least partially disposed between the right frame rail 1814 and the left frame rail 1816. Positioning the fan 2070 above the frame 1812 may provide additional space along the right frame rail 1814 and the left frame rail 1816 to position various auxiliary components of the vehicle 10 along the frame 1812. As shown in FIGS. 46-50, the fan system 2000 includes a plurality of brackets (e.g., the arms 1874, etc.), shown as support arms 2074, that extend from the second pulley support 2030. According to an exemplary embodiment, the support arms 2074 are configured to facilitate coupling a fan ring (e.g., the fan ring 1930, etc.) and/or a fan shroud (e.g., the fan shroud 1940, etc.) around the fan 2070.

As shown in FIGS. 46-50, the first intermediate interface 2034 engages with (e.g., receives, etc.) a third shaft, shown as first intermediate shaft 2044, configured to rotationally couple the first intermediate pulley 2054 to the second pulley support 2030. As shown in FIGS. 47, 48, and 50, the alternator interface 2036 extends from the second pulley support 2030 (e.g., away from the front end 1818, etc.) and engages with a bracket, shown as alternator bracket 2094. The alternator bracket 2094 extends from the alternator interface 2036 to the alternator 2090 such that the alternator bracket 2094 couples the alternator 2090 to the alternator interface 2036. In some embodiments, the alternator 2090 is additionally coupled to the support plate 2010 (e.g., with brackets or pads on the bottom of the alternator 2090, etc.). As shown in FIG. 48, the alternator 2090 includes an input, shown as input shaft 2092, that engages (e.g., receives, etc.) and rotationally couples the alternator pulley 256 to the alternator 2090. As shown in FIG. 1850, the second intermediate interface 238 engages with an arm, shown as carrier arm 2059. The carrier arm 2059 is configured to couple the second intermediate pulley 2058 to the second intermediate interface 238, offset relative to the second intermediate interface 238. In other embodiments, the second intermediate pulley 2058 is otherwise coupled to the second intermediate interface 238 (e.g., the second intermediate interface 238 engages with a second intermediate shaft configured to rotationally couple the second intermediate pulley 2058 to the second pulley support 2030, etc.).

As shown in FIGS. 46-50, the pulley belt 2060 is configured to couple the fan pulley 2052, the first intermediate pulley 2054, the alternator pulley 256, and the second intermediate pulley 2058 to the drive pulley 2050 such that the crankshaft of the prime mover 1850 drives the fan 2070 (e.g., through the fan pulley 2052, to provide a cooling operation to a radiator of the vehicle 10, etc.) and the alternator 2090 (e.g., through the alternator pulley 256, to generate electrical energy, etc.). According to an exemplary embodiment, the pulley belt 2060 and the pulley assembly facilitate mounting the fan 2070 in the most optimal position to increase the cooling capacity thereof.

According to an exemplary embodiment, the connecting shaft 1880 facilitates remotely positioning the fan 2070 and the alternator 2090 ahead of the front cabin 20 towards the front end 1818 of the frame 1812 away from the prime mover 1850 (e.g., which is positioned beneath and/or behind the front cabin 20, etc.). Remotely positioning the alternator 2090 ahead of the front cabin 20 may reduce the risk of contact between the alternator 2090 and the front cabin 20 during a blast event (e.g., prevents the alternator 2090 from becoming a projectile that engages with the front cabin 20, etc.).

Transfer Case Neutral Override and Remote Pump Mounting

According to the exemplary embodiment shown in FIGS. 51-72, a portion of a powertrain, shown as powertrain 2150, of the vehicle 10 includes a transmission, shown as transmission 2160, at least one remote mount power take-off ("PTO") system, shown as PTO assemblies 2170, and a transfer case, shown as transfer case 2200, including at least one of a first neutral override system, shown as cam override system 2300, and a second neutral override system, shown as helical override system 2400, coupled thereto.

As shown in FIGS. 51-54, the powertrain 2150 includes two PTO assemblies 2170. In other embodiments, the powertrain 2150 includes one PTO assembly 2170. In still other embodiments, the powertrain 2150 includes more than two PTO assemblies 2170 (e.g., three, four, etc.). As shown in FIGS. 51-54, each PTO assembly 2170 includes a PTO, shown as PTO 2172, a PTO driven device, shown as pump 2174, and a shaft, shown as PTO shaft 2176, extending between the PTO 2172 and the pump 2174 thereof. As shown in FIGS. 51-54, the transmission 2160 includes a housing, shown as transmission housing 2162. The transmission housing 2162 defines at least one mounting location (e.g., one, two, three, etc.), shown as PTO mounts 2164. The PTO mounts 2164 are configured (e.g., structured, shaped, positioned, etc.) to facilitate coupling the PTOs 2172 to the transmission housing 2162. As shown in FIGS. 51-54, the transfer case 2200 includes a housing, shown as transfer case housing 2210. The transfer case housing 2210 defines at least one mounting location (e.g., one, two, three, etc.), shown as pump mounts 2212. The pump mounts 2212 are configured (e.g., structured, shaped, positioned, etc.) to facilitate coupling the pumps 2174 to the transfer case housing 2210 and positioned to align the pumps 2174 with the PTOs 2172. According to an exemplary embodiment, the transmission 2160 is configured to directly drive each of the PTOs 2172 such that rotational mechanical energy is provided by each PTO 2172 to a respective PTO shaft 2176. The PTO shafts 2176 may then provide the rotational mechanical energy to the pumps 2174. The pumps 2174 may be or include hydraulic pumps, pneumatic pumps, water pumps, coolant pumps, and/or any other device that may be driven by a PTO used to power various systems of the vehicle 59 (e.g., engine accessories, vehicle accessories, etc.).

Figure 61:
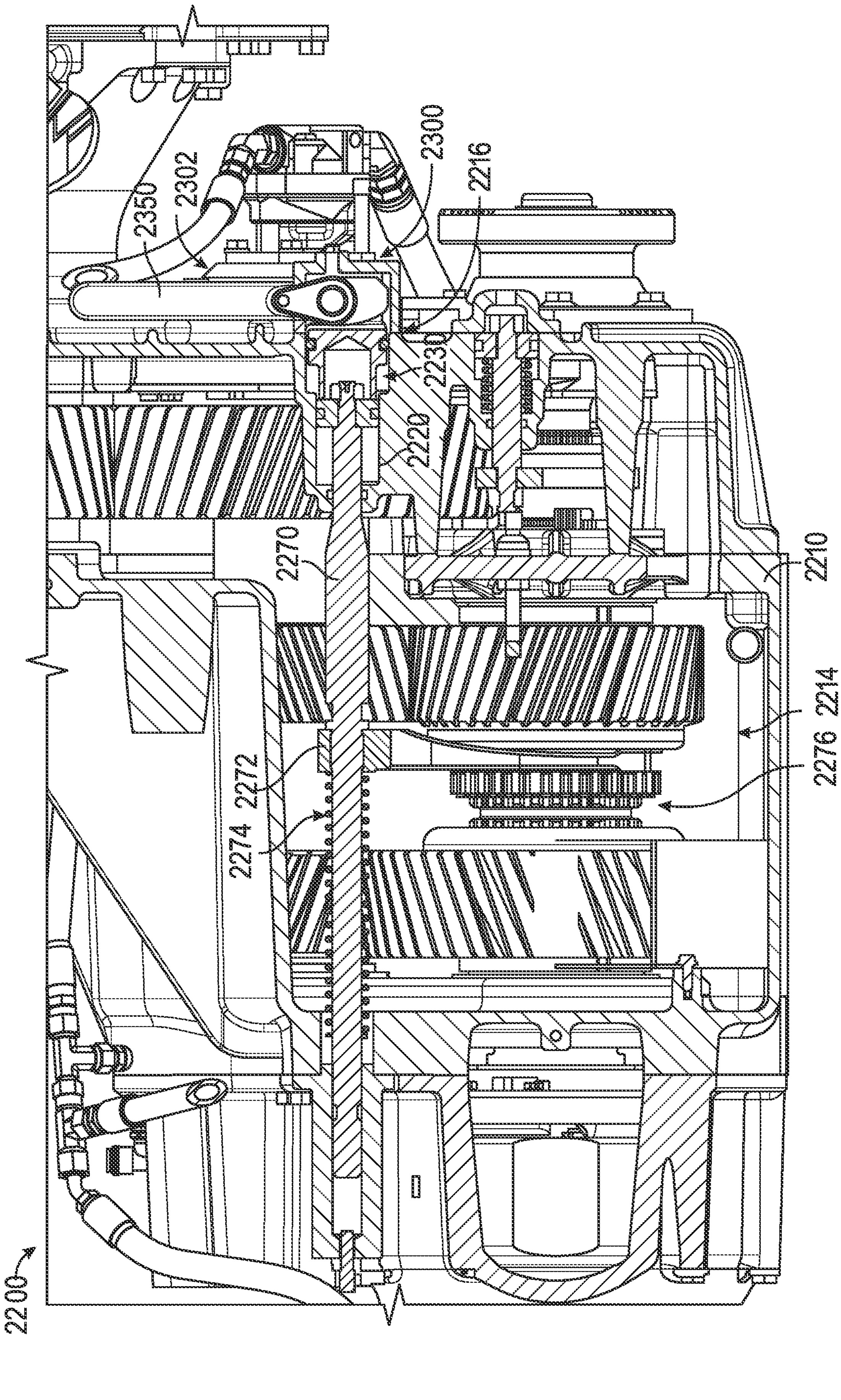
FIGS. 61 and 62 are various views of the first neutral override system coupled to the transfer case and selectively reconfigured into the first configuration, according to an exemplary embodiment.
Figure 62:
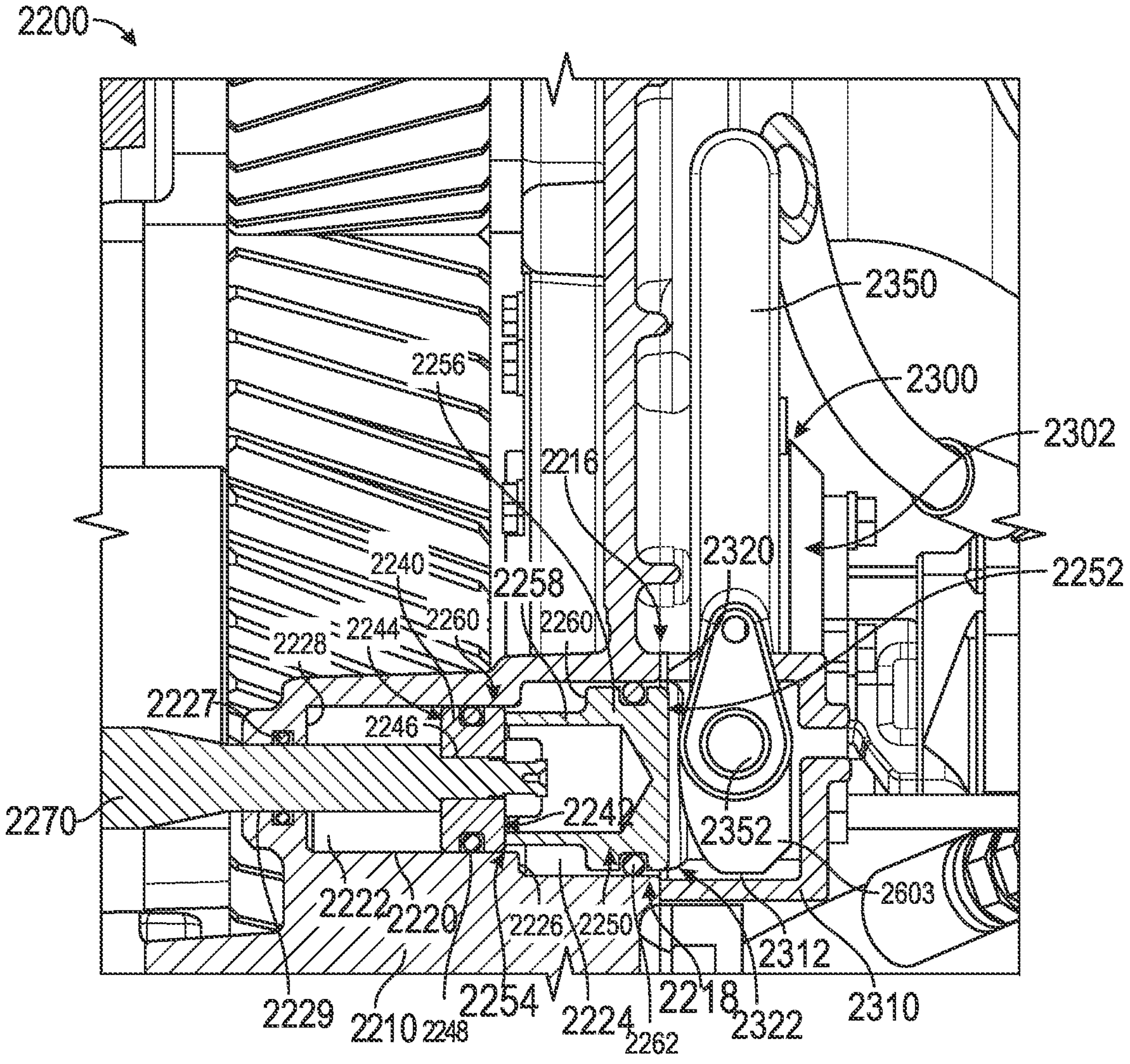
Figure 63:
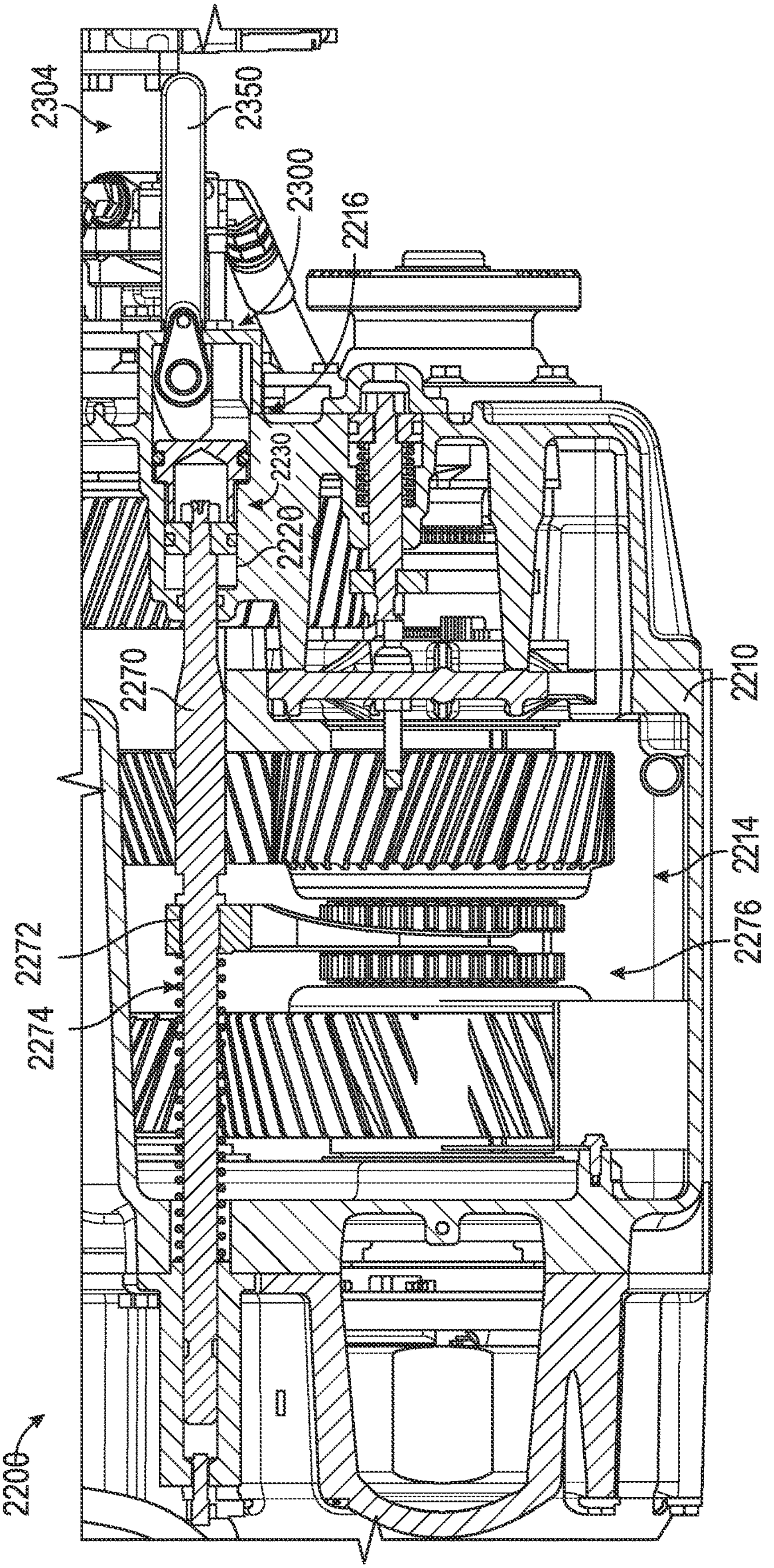
FIGS. 63 and 64 are various views of the first neutral override system coupled to the transfer case and selectively reconfigured into the second configuration, according to an exemplary embodiment.

As shown in FIGS. 61-64, 71, and 72, the transfer case housing 2210 defines a first interior cavity, shown as gearing cavity 2214, a second mounting location, shown as override system mount 2216, and a second interior cavity, shown as piston cavity 2220. As shown in FIGS. 61 and 63, the gearing cavity 2214 houses at least a portion of a rod, shown as shift rod 2270, a fork, shown as shift fork 2272, a resilient member, shown as biasing spring 2274, and a plurality of gears, shown as gearing 2276. The shift fork 2272 is coupled to the shift rod 2270. The shift fork 2272 may thereby translate with the shift rod 2270. The biasing spring 2274 is positioned to bias or force the shift rod 2270 and the shift fork 2272 into a nominal position (e.g., a high position, etc.). The shift fork 2272 is coupled to the gearing 2276. According to an exemplary embodiment, the shift rod 2270 is selectively translatable such that movement of the shift rod 2270 causes the shift fork 2272, and thereby the gearing 2276, to move therewith. Such movement of the shift rod 2270 may facilitate reconfiguring the transfer case 2200 between a high mode, a low mode, and/or a neutral mode of operation.

As shown in FIGS. 62, 64, 71, and 72, the piston cavity 2220 has a first portion, shown as shift chamber 2222, and a second chamber, shown as neutral chamber 2224, connected to the shift chamber 2222. According to the exemplary embodiment shown in FIGS. 62, 64, 71, and 72, the neutral chamber 2224 has a larger diameter than the shift chamber 2222 such that a ledge, shown as retaining lip 2226, is defined therebetween. In other embodiments, the shift chamber 2222 has a larger diameter than the neutral chamber 2224. In still other embodiment, the shift chamber 2222 and the neutral chamber 2224 have the same diameter. As shown in FIGS. 62, 64, 71, and 72, the shift chamber 2222 of the piston cavity 2220 has a wall, shown as end wall 2228, that defines an aperture, shown as rod aperture 2229. As shown in FIGS. 62, 64, 71, and 72, the override system mount 2216 defines an aperture, shown as cavity opening 2218, within the transfer case housing 2210 that is positioned to align with the neutral chamber 2224 of the piston cavity 2220 (e.g., such that an end of the neutral chamber 2224 opposite the shift chamber 2222 is open to the exterior of the transfer case housing 2210, etc.).

As shown in FIGS. 61-64, 71, and 72, the piston cavity 2220 is configured to slidably receive a dual piston system, shown as piston assembly 2230. As shown in FIGS. 62, 64, 71, and 72, the piston assembly 2230 includes a first piston, shown as shift piston 2240, disposed within the shift chamber 2222 and a second piston, shown as neutral piston 2250, disposed within the neutral chamber 2224. According to an exemplary embodiment, the shift piston 2240 is selectively translatable within the shift chamber 2222 and at least a portion of the neutral piston 2250 is selectively translatable within each of the shift chamber 2222 and the neutral chamber 2224. As shown in FIGS. 62, 64, 71, and 72, the shift piston 2240 has a first face, shown as face 2242, and an opposing second face, shown as face 2244. The shift piston 2240 further defines an aperture, shown as rod aperture 2246. The shift piston 2240 includes a sealing member (e.g., a gasket, an O-ring, etc.), shown as seal 2248, positioned to effectively seal the engagement between the shift piston 2240 and a sidewall of the shift chamber 2222 such that the shift chamber 2222 is isolated from the neutral chamber 2224.

As shown in FIGS. 62, 64, 71, and 72, the neutral piston 2250 includes a first portion, shown as piston head 2256, and a second portion, shown as piston plunger 2258. According to the exemplary embodiment shown in FIGS. 62, 64, 71, and 72, the piston head 2256 has a larger diameter than the piston plunger 2258 such that a lip, shown as engagement lip 2260, is defined therebetween. According to an exemplary embodiment, the engagement lip 2260 of the neutral piston 2250 is positioned to engage with the retaining lip 2226 of the piston cavity 2220 such that the translational movement of the neutral piston 2250 is limited. As shown in FIGS. 62, 64, 71, and 72, the piston head 2256 has a first face, shown as face 2252, and the piston plunger 2258 has an opposing second face, shown as face 2254. According to an exemplary embodiment, the face 2254 of the piston plunger 2258 of the neutral piston 2250 is positioned to selectively engage with the face 2242 of the shift piston 2240. According to an exemplary embodiment, the face 2252 of the piston head 2256 of the neutral piston 2250 is positioned to enclose the cavity opening 2218 of the override system mount 2216 and selectively engage with the cam override system 2300 and/or the helical override system 2400. As shown in FIGS. 62, 64, 71, and 72, the piston head 2256 of the neutral piston 2250 includes a sealing member (e.g., a gasket, an O-ring, etc.), shown as seal 2262, positioned to effectively seal the engagement between the piston head 2256 and a sidewall of the neutral chamber 2224 such that the neutral chamber 2224 is isolated from the exterior of the transfer case housing 2210 (e.g., an inner cavity of the cam override system 2300, the helical override system 2400, etc.).

As shown in FIGS. 61-64, 71, and 72, an end of the shift rod 2270 extends into the piston cavity 2220. As shown in FIGS. 62, 64, 71, and 72, the end of the shift rod 2270 extends through the rod aperture 2229 of the end wall 2228 of the shift chamber 2222 of the piston cavity 2220 and engages with the rod aperture 2246 of the shift piston 2240, coupling the shift piston 2240 thereto (e.g., with fasteners, an interference fit, a press fit, a treaded engagement, etc.). As shown in FIGS. 62, 64, 71, and 72, the rod aperture 2229 includes a sealing member (e.g., a gasket, an O-ring, etc.), shown as seal 2227, positioned to effectively seal the engagement between the shift rod 2270 and the rod aperture 2229 such that the piston cavity 2220 is isolated from the gearing cavity 2214.

As shown in FIGS. 61-64, the cam override system 2300 is coupled to the override system mount 2216 of the transfer case housing 2210. As shown in FIGS. 55-60, 62, and 64, the cam override system 2300 includes a housing, shown as cam housing 2310, defining an interior cavity, shown as cam cavity 2312. As shown in FIGS. 55-60, the cam override system 2300 includes a flange, shown as flange 2320, positioned at a front end of the cam housing 2310. As shown in FIGS. 55, 57, 58, and 60, the flange 2320 defines an aperture, shown as aperture 2322. As shown in FIGS. 62 and 63, the flange 2320 is configured to interface with the override system mount 2216 such that the aperture 2322 aligns with the cavity opening 2218 such that the cam cavity 2312 extends the piston cavity 2220. As shown in FIGS. 55-60, the cam override system 2300 includes a plurality of fasteners, shown as fasteners 2330. According to an exemplary embodiment, the fasteners 2330 are configured to selectively couple the cam housing 2310 to the override system mount 2216.

Figure 55:
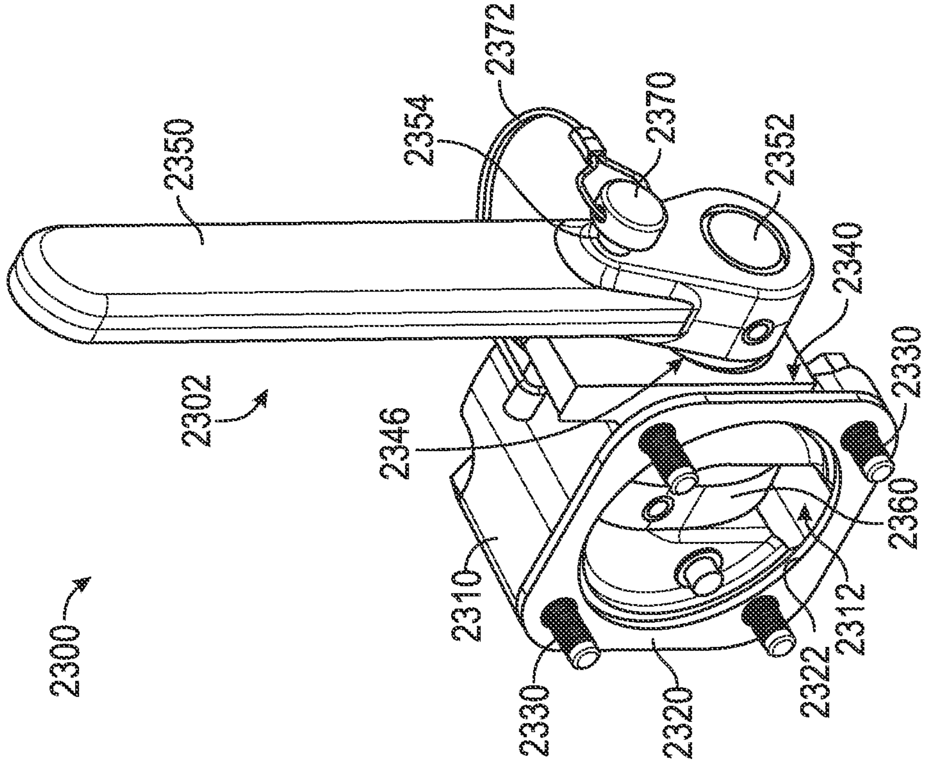
FIGS. 55-57 are various views of a first neutral override system for the transfer case of FIGS. 51-54 arranged in a first configuration, according to an exemplary embodiment.
Figure 56:
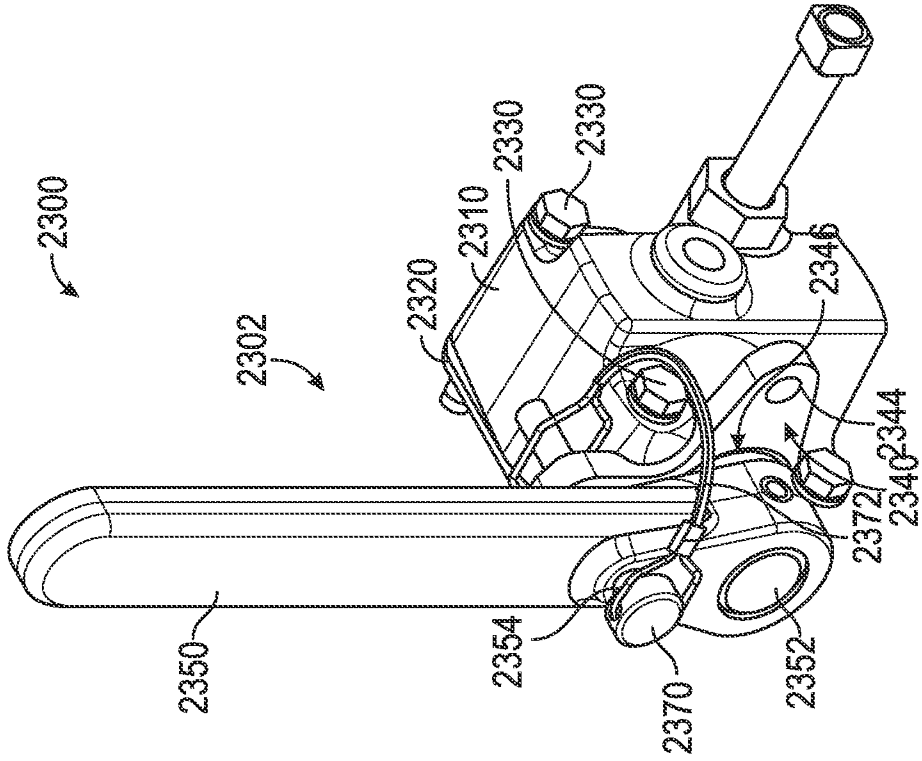
Figure 57:
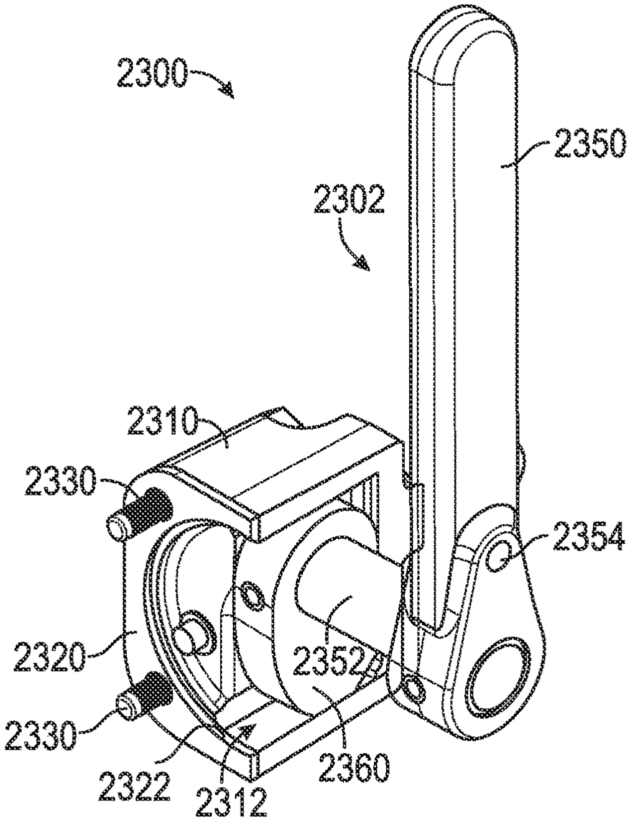
Figure 58:
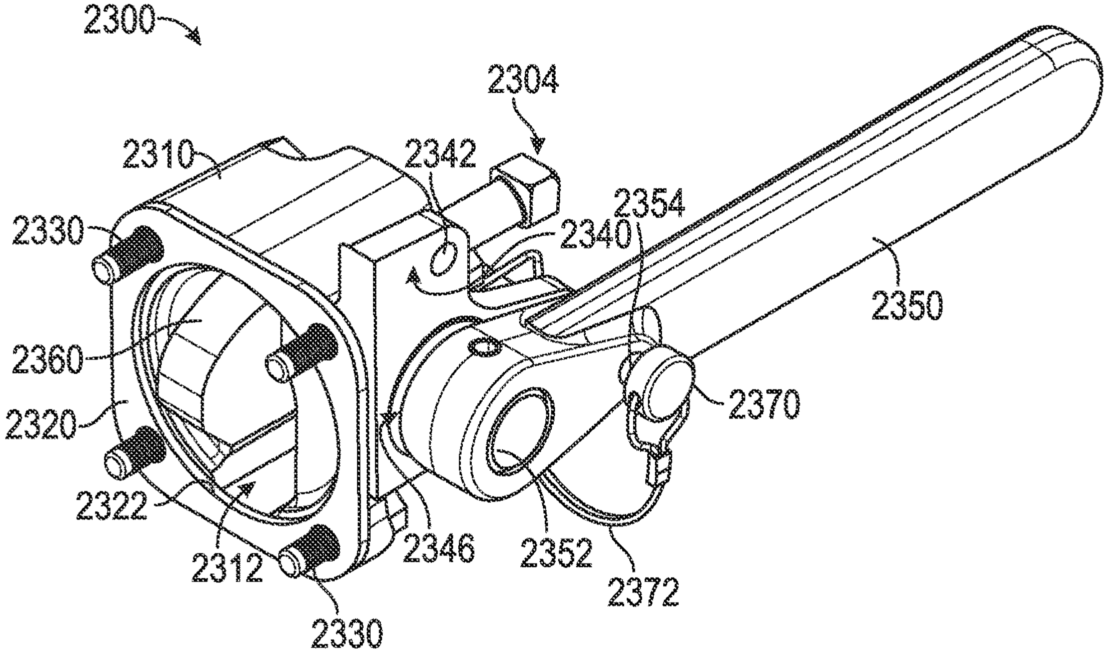
FIGS. 58-60 are various views of the first neutral override system of FIGS. 55-57 arranged in a second configuration, according to an exemplary embodiment.
Figure 59:
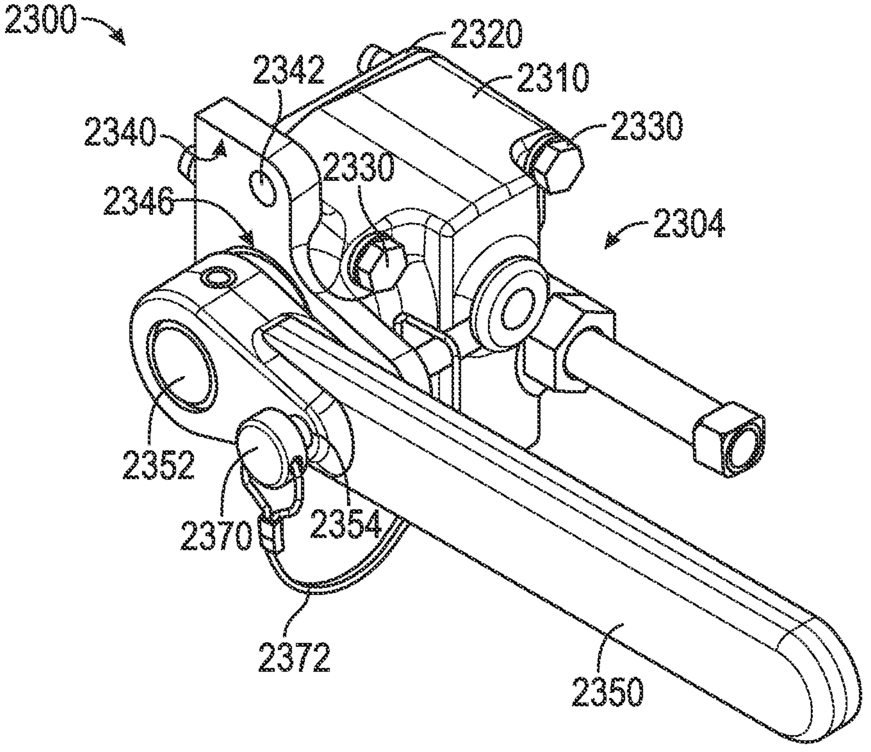
Figure 60:
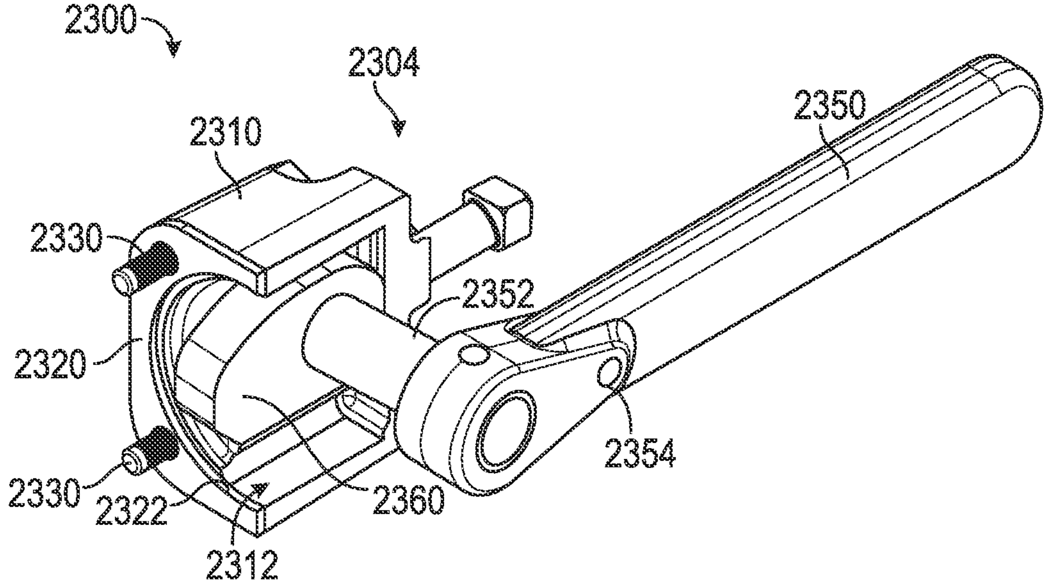

As shown in FIGS. 55, 56, 58, and 59, the cam housing 2310 includes a plate, shown as locking plate 2340, extending from a sidewall thereof. As shown in FIGS. 58 and 59, the locking plate 2340 defines a first aperture, shown as retaining aperture 2342. As shown in FIG. 56, the locking plate 2340 defines a second aperture, shown as retaining aperture 2344. As shown in FIGS. 55, 56, 58, and 59, the locking plate 2340 defines a third aperture, shown as lever aperture 2346. As shown in FIGS. 55-64, the cam override system 2300 includes an actuator, shown as lever 2350. As shown in FIGS. 55-60, 62, and 64, the lever 2350 includes an extension, shown as pivot rod 2352, extending from a lower end thereof. According to an exemplary embodiment, the pivot rod 2352 extends through the lever aperture 2346 of the locking plate 2340 into the cam cavity 2312. As shown in FIGS. 55, 57, 58, 60, 62, and 64, the cam override system 2300 includes a rotary engagement element, shown as cam 2360, disposed within the cam cavity 2312. As shown in FIGS. 57 and 60, an end of the pivot rod 2352 of the lever 2350 is coupled to the cam 2360 such that pivotal movement of the lever 2350 causes the cam 2360 to rotate within the cam cavity 2312.

Figure 64:
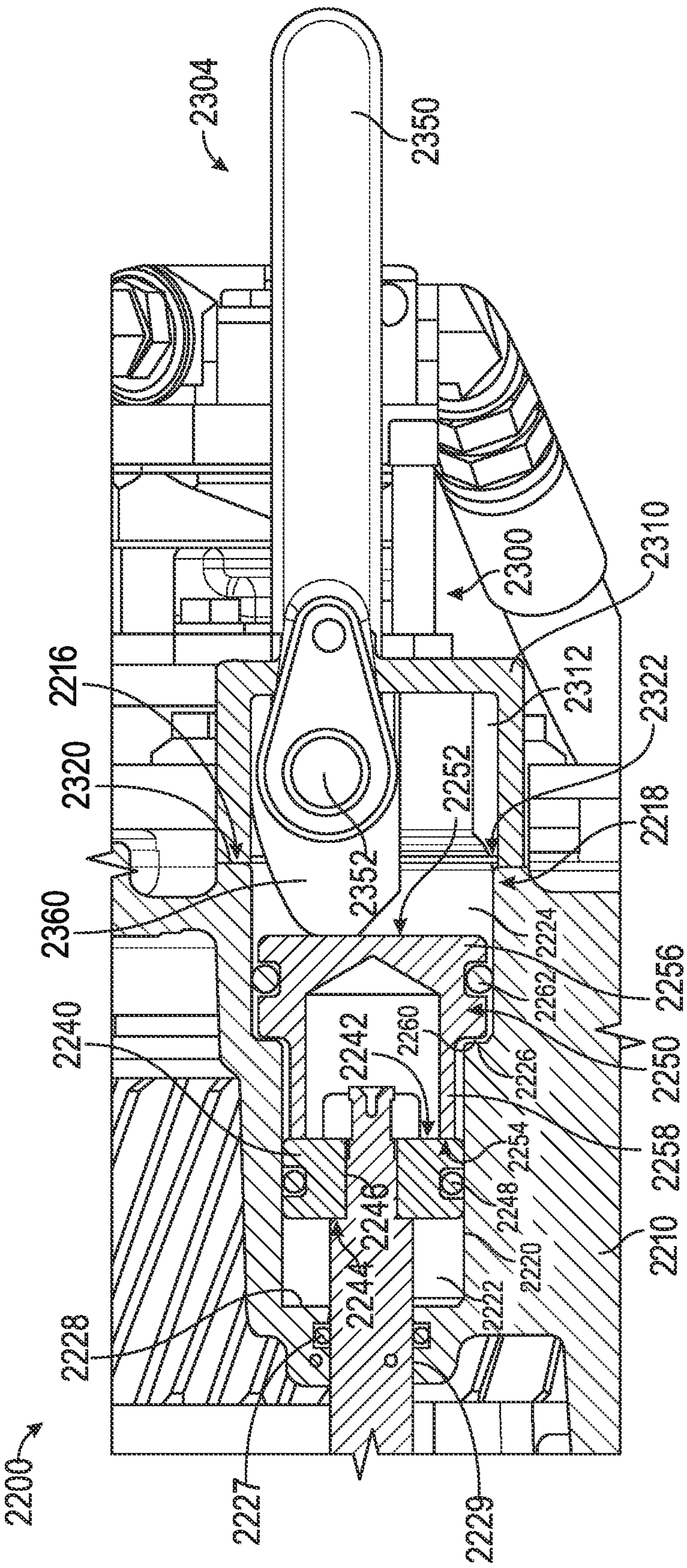

As shown in FIGS. 55-57, 61, and 62, the lever 2350 is oriented in a first position, shown as disengaged position 2302. As shown in FIGS. 58-60, 63, and 64, the lever 2350 is oriented in a second position, shown as engaged position 2304. According to an exemplary embodiment, the lever 2350 may be selectively pivoted between the disengaged position 2302 and the engaged position 2304. As shown in FIGS. 55, 57, and 62, the cam 2360 is entirely disposed within the cam cavity 2312 when the lever 2350 is arranged in the disengaged position 2302. As shown in FIGS. 58, 60, and 64, a portion of the cam 2360 pivots from the cam cavity 2312 through the aperture 2322 of the flange 2320 and the cavity opening 2218 of the override system mount 2216 into the piston cavity 2220 when the lever 2350 is arranged in the engaged position 2304. The cam 2360 may thereby engage with the face 2252 of the piston head 2256 of the neutral piston 2250 when the lever 2350 is arranged in the engaged position 2304.

As shown in FIGS. 55-60, the lever 2350 defines an aperture, shown as locking aperture 2354 positioned to align with (i) the retaining aperture 2342 when the lever 2350 is oriented in the disengaged position 2302 and (ii) the retaining aperture 2344 when the lever 2350 is oriented in the engaged position 2304. As shown in FIGS. 55, 56, 58, and 59, the cam override system 2300 includes a pin, shown as locking pin 2370. According to an exemplary embodiment, the locking pin 2370 is configured to be received by the locking aperture 2354 of the lever 2350 and the retaining aperture 2342 of the locking plate 2340 to selectively lock or hold the lever 2350 in the disengaged position 2302. According to an exemplary embodiment, the locking pin 2370 is configured to be received by the locking aperture 2354 of the lever 2350 and the retaining aperture 2344 of the locking plate 2340 to selectively lock or hold the lever 2350 in the engaged position 2304. As shown in FIGS. 55, 56, 58, and 59, the locking pin 2370 includes a leash, shown as lanyard 2372. According to an exemplary embodiment, the lanyard 2372 is configured to couple the locking pin 2370 to the cam housing 2310 such that the locking pin 2370 is not misplaced when removed from the locking aperture 2354 of the lever 2350.

Figure 70:
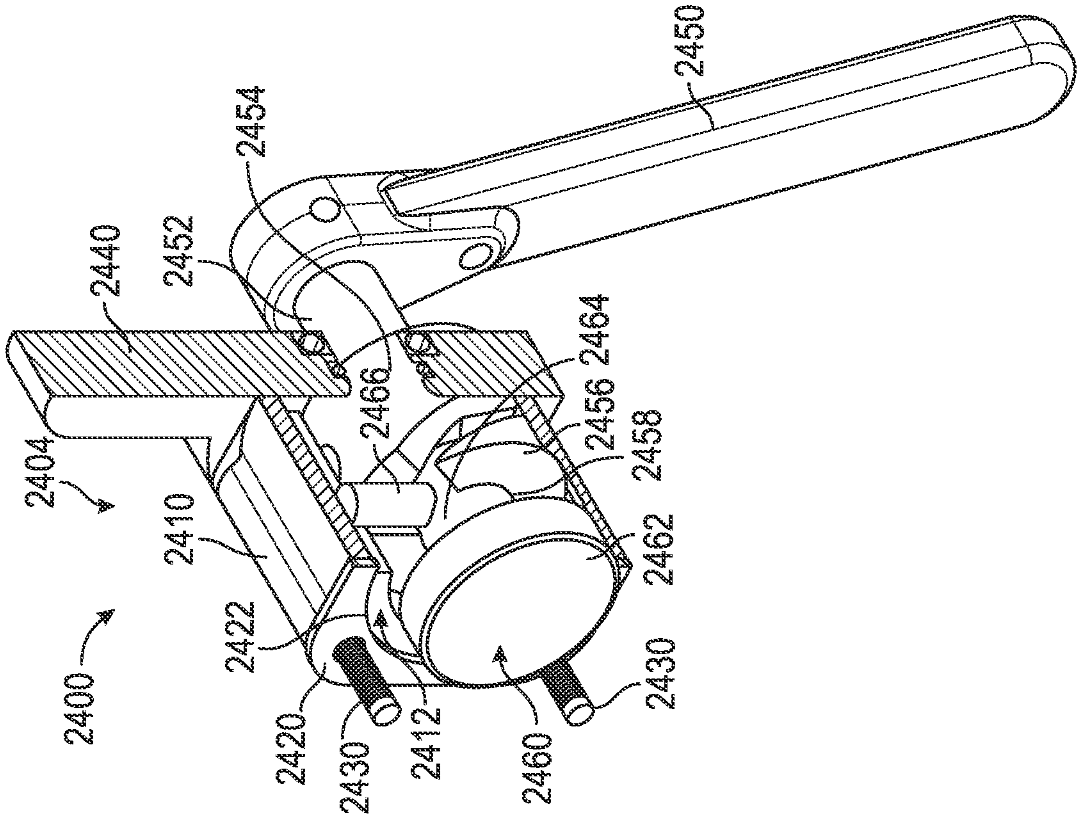
Figure 71:
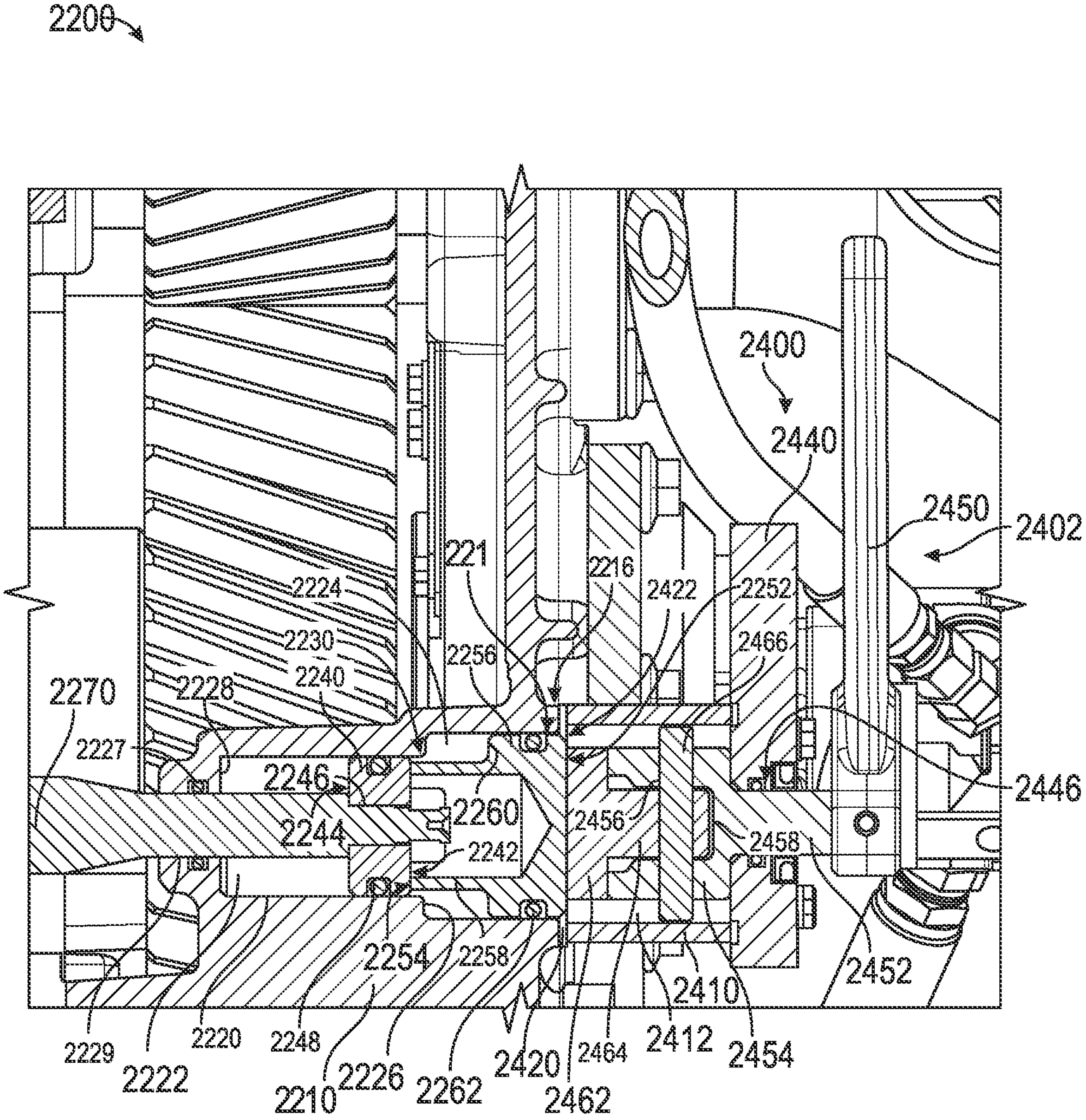
FIG. 71 is a detailed cross-sectional view of the second neutral override system coupled to the transfer case and selectively reconfigured into the first configuration, according to an exemplary embodiment.
Figure 72:
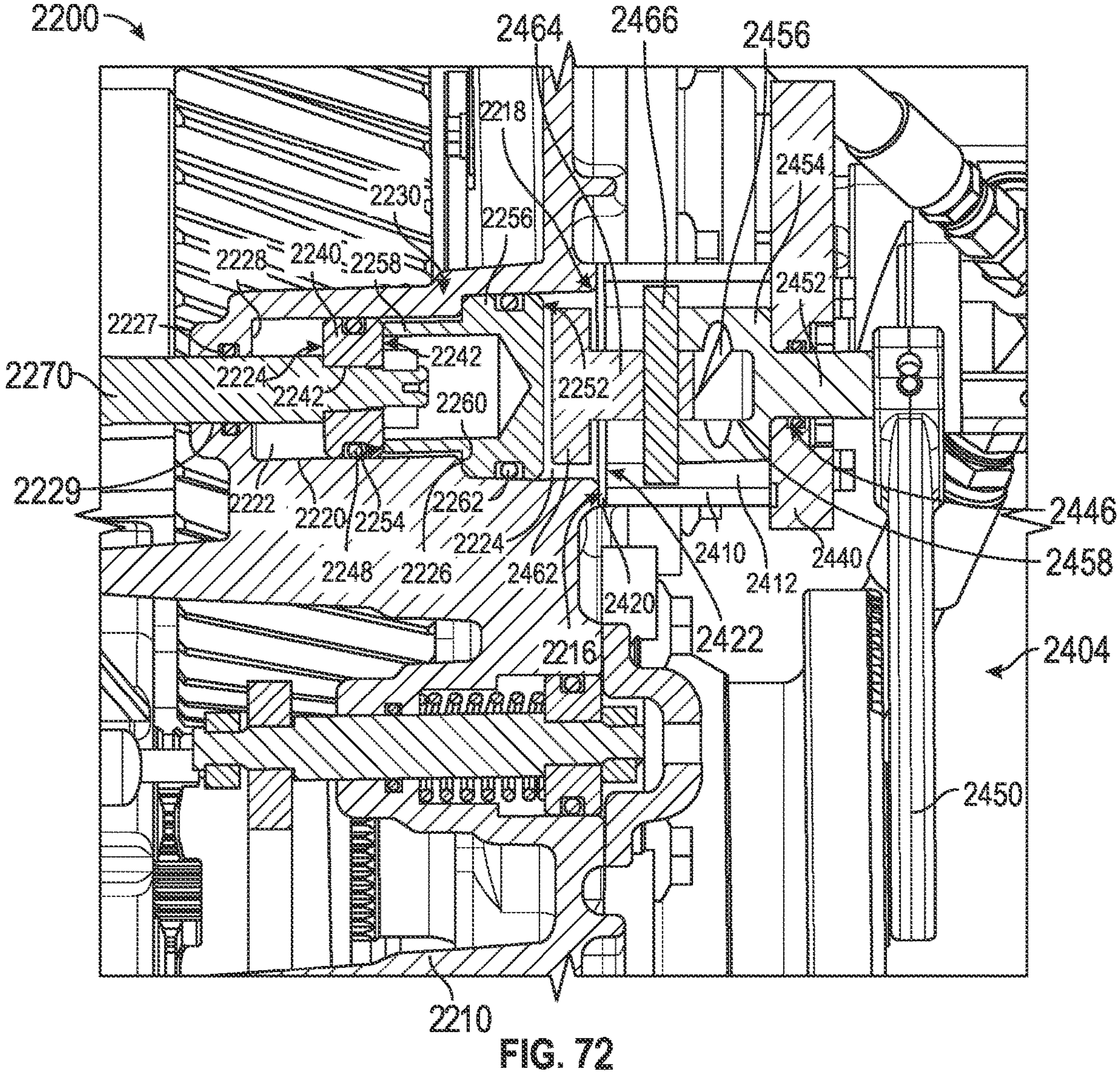
FIG. 72 is a detailed cross-sectional view of the second neutral override system coupled to the transfer case and selectively reconfigured into the second configuration, according to an exemplary embodiment.

As shown in FIGS. 71 and 72, the helical override system 2400 is coupled to the override system mount 2216 of the transfer case housing 2210. As shown in FIGS. 65-72, the helical override system 2400 includes a housing, shown as plunger housing 2410, defining an interior cavity, shown as plunger cavity 2412. The helical override system 2400 includes a flange, shown as flange 2420, positioned at a front end of the plunger housing 2410. As shown in FIGS. 66, 67, and 69-72, the flange 2420 defines an aperture, shown as aperture 2422. As shown in FIGS. 71 and 72, the flange 2420 is configured to interface with the override system mount 2216 such that the aperture 2422 aligns with the cavity opening 2218 such that the plunger cavity 2412 extends the piston cavity 2220. As shown in FIGS. 65-70, the helical override system 2400 includes a plurality of fasteners, shown as fasteners 2430. According to an exemplary embodiment, the fasteners 2430 are configured to selectively couple the plunger housing 2410 to the override system mount 2216.

As shown in FIGS. 65-72, the plunger housing 2410 includes a plate, shown as plate 2440, extending from a rear end thereof. As shown in FIGS. 65, 68, 71, and 72, the plate 2440 defines an aperture, shown as lever aperture 2446. As shown in FIGS. 65-72, the helical override system 2400 includes an actuator, shown as lever 2450. As shown in FIGS. 65, 67, 68, and 70-72, the lever 2450 includes an extension, shown as pivot rod 2452, extending from a lower end thereof. As shown in FIGS. 71 and 72, the pivot rod 2452 extends through the lever aperture 2446 of the plate 2440 into the plunger cavity 2412. As shown in FIGS. 67 and 70-72, the pivot rod 2452 includes a body, shown as plunger cup 2454, coupled to an end thereof. The plunger cup 2454 has a sidewall that defines an interior slot or bore, shown as plunger slot 2458, and a cutout or pathway, shown as helical path 2456, extending through the sidewall of the plunger cup 2454 into the plunger slot 2458 and along the length of the plunger cup 2454 in a helical pattern.

Figure 69:
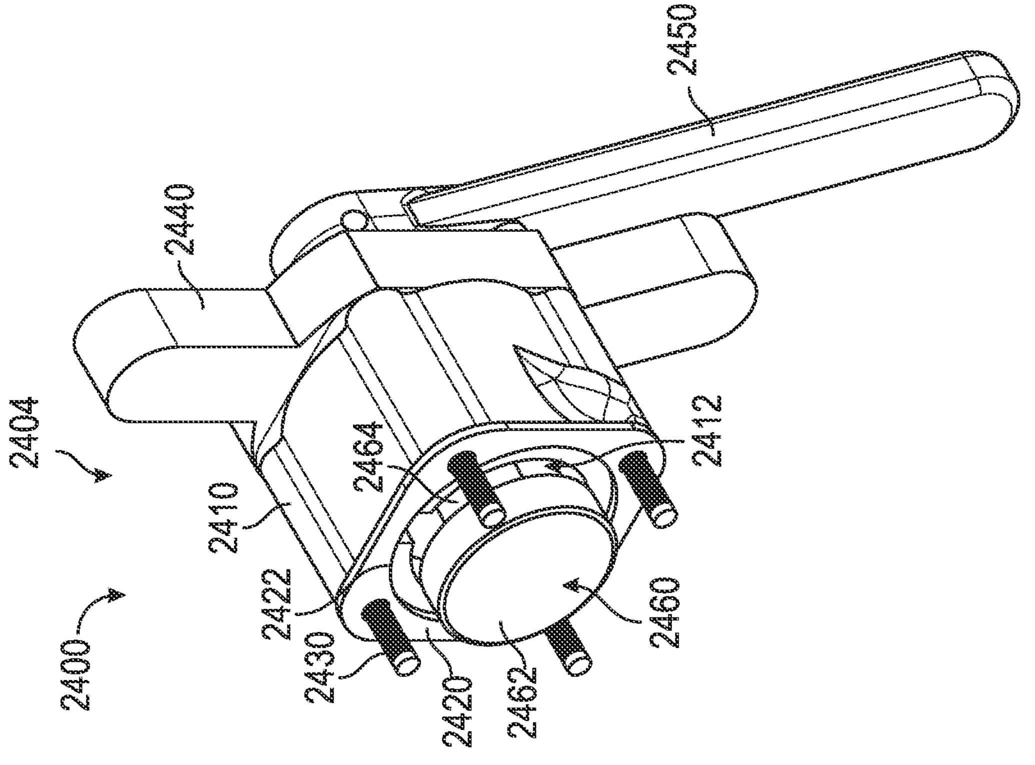

As shown in FIGS. 66, 67, and 69-72, the helical override system 2400 includes an translational engagement element, shown as plunger 2460, including a head, shown as plunger head 2462, a rod, shown as plunger rod 2464, extending from the plunger head 2462, and a pin, shown as plunger pin 2466, extending from the plunger rod 2464. As shown in FIGS. 70-72, the plunger rod 2464 is slidably received within the plunger slot 2458 of the plunger cup 2454. As shown in FIGS. 67 and 70-72, the plunger pin 2466 is received within the helical path 2456. According to an exemplary embodiment, pivotal movement of the lever 2450 causes the plunger cup 2454 to rotate within the plunger cavity 2412 such that engagement between plunger pin 2466 and the helical path 2456 causes the plunger rod 2464 to translate within the plunger slot 2458, thereby facilitating the extension and the retraction of the plunger head 2462 from or into the plunger cavity 2412 through the aperture 2422, respectively.

Figure 66:
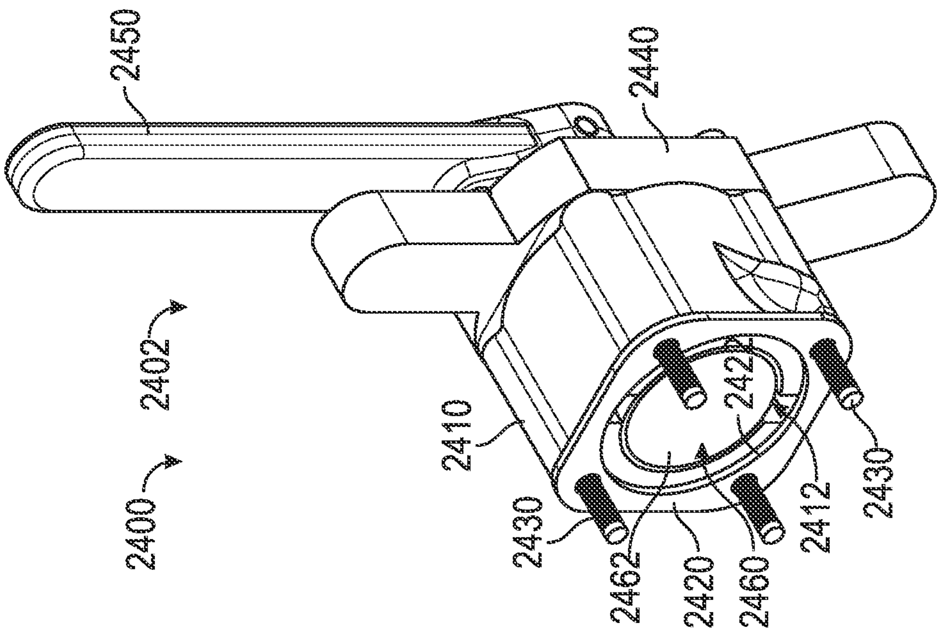
FIGS. 65-67 are various views of a second neutral override system for the transfer case of FIGS. 51-54 arranged in a first configuration, according to an exemplary embodiment.
Figure 65:
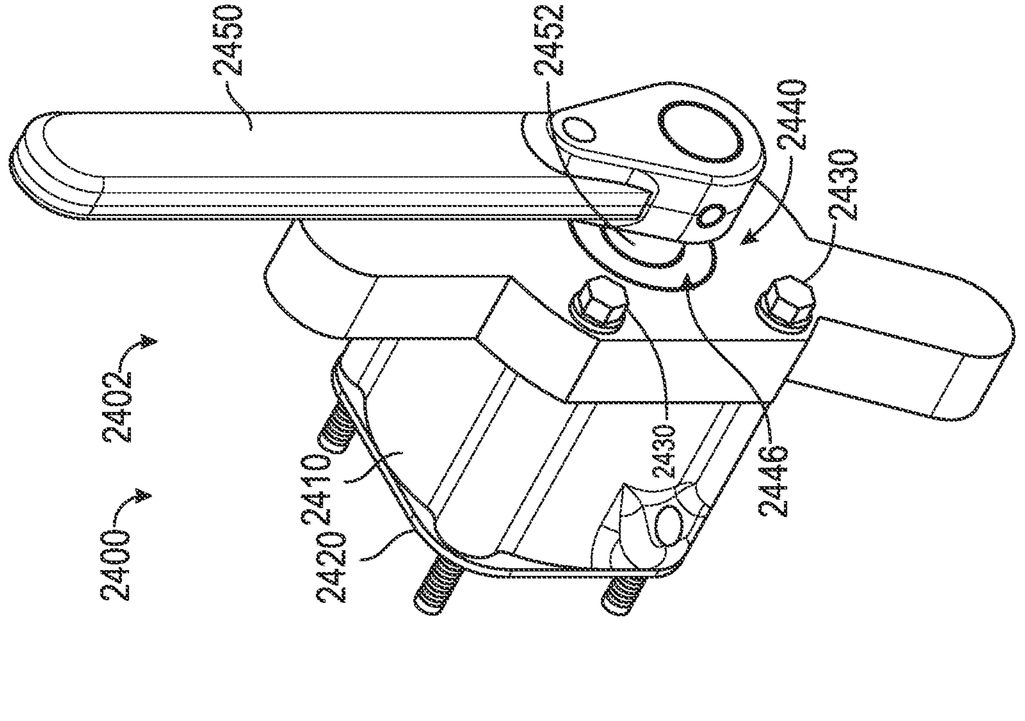
Figure 68:
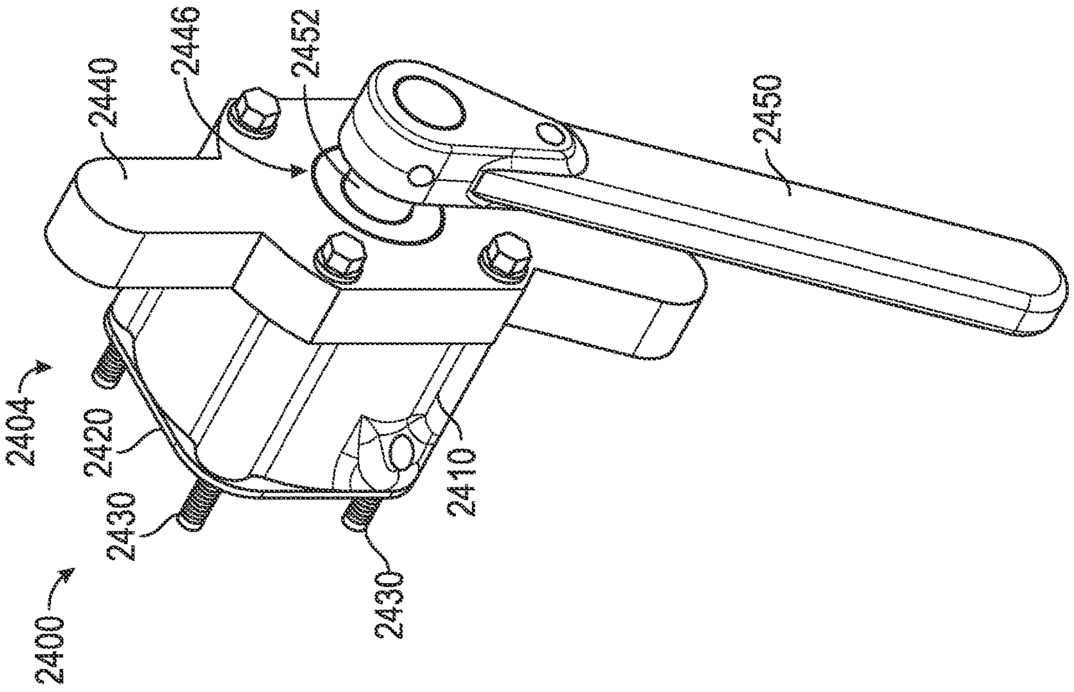
FIGS. 68-70 are various views of the second neutral override system of FIGS. 65-67 arranged in a second configuration, according to an exemplary embodiment.
Figure 67:
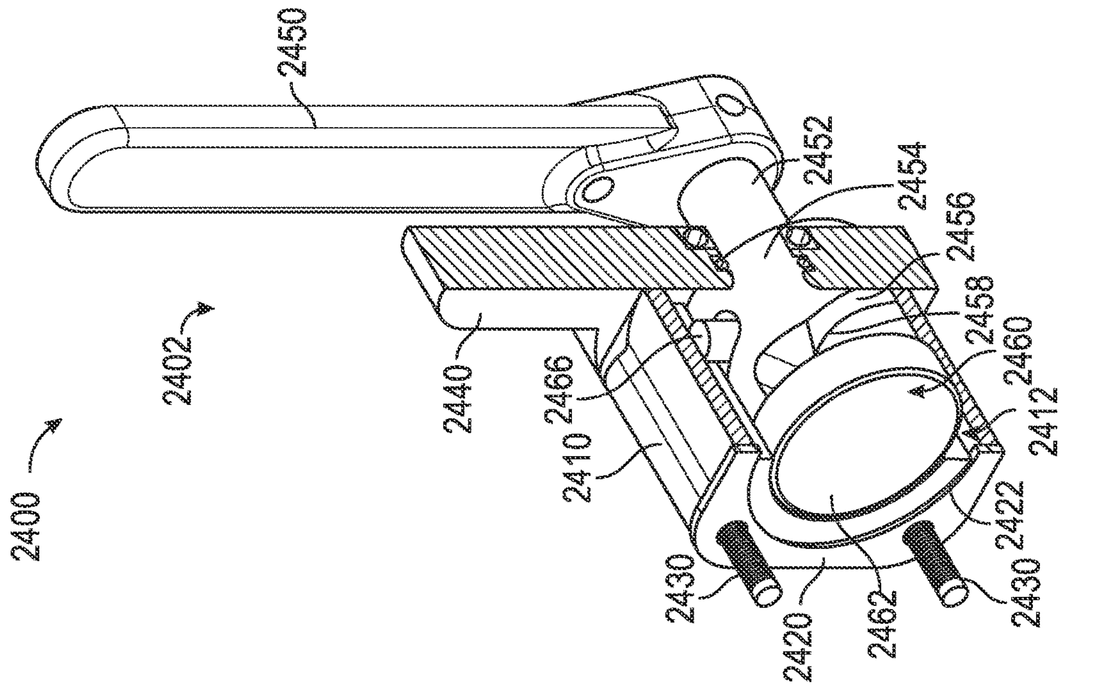

As shown in FIGS. 65-67 and 71, the lever 2450 is oriented in a first position, shown as disengaged position 2402. As shown in FIGS. 68-70 and 72, the lever 2450 is oriented in a second position, shown as engaged position 2404. According to an exemplary embodiment, the lever 2450 may be selectively pivoted between the disengaged position 2402 and the engaged position 2404. As shown in FIGS. 66, 67, and 71, the plunger 2460 is entirely disposed within the plunger cavity 2412 when the lever 2450 is arranged in the disengaged position 2402. As shown in FIGS. 69, 70, and 72, the plunger head 2462 of the plunger 2460 extends from the plunger cavity 2412 through the aperture 2422 of the flange 2420 and the cavity opening 2218 of the override system mount 2216 into the piston cavity 2220 when the lever 2450 is arranged in the engaged position 2404. The plunger head 2462 may thereby engage with the face 2252 of the piston head 2256 of the neutral piston 2250 when the lever 2450 is arranged in the engaged position 2404.

According to an exemplary embodiment, the shift piston 2240 is selectively translatable within the shift chamber 2222 between (i) a first position or high position, (ii) a second position, intermediate position, or neutral position, and (iii) an third position or low position. According to an exemplary embodiment, the biasing spring 2274 is positioned to bias the shift rod 2270, and thereby the shift piston 2240 into the high position. According to an exemplary embodiment, the transfer case 2200 includes a fluid system (e.g., a pneumatic system, a hydraulic system, etc.) configured to selectively provide and/or remove fluid (e.g., air, hydraulic fluid, etc.) into and/or from at least one of the shift chamber 2222, the neutral chamber 2224, the cam cavity 2312, and/or the plunger cavity 2412 (e.g., through an inlet and/or outlet port thereof, etc.) to selectively reposition (e.g., automatically based on operation of the vehicle 59, in response to an operator command provided from within the front cabin 69, etc.) the shift piston 2240 between the high position, the neutral position, and the low position.

By way of example, the fluid system may provide fluid into the shift chamber 2222 (e.g., between the end wall 2228 and the face 2244 of the shift piston 2240, etc.), remove fluid from the neutral chamber 2224 (e.g., between the face 2242 of the shift piston 2240 and the engagement lip 2260 of the neutral piston 2250, etc.), and/or remove fluid from the cam cavity 2312 and/or the plunger cavity 2412 (e.g., between the face 2252 of the neutral piston 2250 and the cam cavity 2312 and/or the plunger cavity 2412, etc.) such that the shift piston 2240 is forced into the high position (e.g., as shown in FIGS. 61, 62, and 71), pulling the shift rod 2270 and the shift fork 2272 which may thereby reconfigure the gearing 2276 such that the transfer case 2200 operates in the high mode. By way of another example, the fluid system may remove fluid from the shift chamber 2222, provide fluid to the neutral chamber 2224, and/or provide fluid to the cam cavity 2312 and/or the plunger cavity 2412 (e.g., such that the neutral piston 2250 engages with the shift piston 2240, etc.) such that the shift piston 2240 overcomes the biasing force of the biasing spring 2274 and is forced into the neutral position (e.g., as shown in FIGS. 63, 64, and 72), pushing the shift rod 2270 and the shift fork 2272 which may thereby reconfigure the gearing 2276 such that the transfer case 2200 operates in the neutral mode. By way of still another example, the fluid system may remove additional fluid from the shift chamber 2222 and/or provide additional fluid to the neutral chamber 2224 such that the shift piston 2240 further overcomes the biasing force of the biasing spring 2274 and is forced into the low position (e.g., such that the face 2244 of the shift piston 2240 is proximate the end wall 2228 of the piston cavity 2220, etc.), pushing the shift rod 2270 and the shift fork 2272 further which may thereby reconfigure the gearing 2276 such that the transfer case 2200 operates in the low mode.

According to an exemplary embodiment, the cam override system 2300 and/or the helical override system 2400 are configured to facilitate manually overriding the fluid system (e.g., if the fluid system were to fail, become damaged, lose pressure, etc.). More specifically, the cam override system 2300 and/or the helical override system 2400 may be used to manually reconfigure the transfer case 2200 into the neutral mode from the high mode. By way of example, during a failure of fluid system, the biasing spring 2274 may provide the biasing force to the shift rod 2270 and shift fork 2272 such that the transfer case 2200 is reconfigured into or maintained in the high mode and the shift piston 2240 is moved into or maintained in the high position. The cam override system 2300 and/or the helical override system 2400 may thereby facilitate manually reconfiguring the transfer case 2200 from the high mode to the neutral mode during situations of fluid system failure to facilitate towing the vehicle 59 (e.g., without having to drop a drive shaft of the vehicle 59, without damaging the transmission 2160, etc.).

As shown in FIG. 64, the lever 2350 is pivoted into in the engaged position 2304 such that a portion of the cam 2360 pivots from the cam housing 2310 into the neutral chamber 2224, engaging the face 2252 of the piston head 2256. Such engagement between the cam 2360 and the piston head 2256 pushes the neutral piston 2250 within the neutral chamber 2224 such that the face 2254 of the piston plunger 2258 extends into the shift chamber 2222 a predetermined depth (e.g., until the engagement lip 2260 engages with the retaining lip 2226, etc.) and engages with the face 2242 of the shift piston 2240. Such engagement between the piston plunger 2258 and the shift piston 2240 pushes the shift piston 2240 within the shift chamber 2222 from the high position to the neutral position, thereby reconfiguring the transfer case 2200 from the high mode to the neutral mode.

As shown in FIG. 72, the lever 2450 is pivoted into in the engaged position 2404 such that the plunger head 2362 translates from the plunger housing 2410 into the neutral chamber 2224, engaging the face 2252 of the piston head 2256. Such engagement between plunger head 2362 and the piston head 2256 pushes the neutral piston 2250 within the neutral chamber 2224 such that the face 2254 of the piston plunger 2258 extends into the shift chamber 2222 a predetermined depth (e.g., until the engagement lip 2260 engages with the retaining lip 2226, etc.) and engages with the face 2242 of the shift piston 2240. Such engagement between the piston plunger 2258 and the shift piston 2240 pushes the shift piston 2240 within the shift chamber 2222 from the high position to the neutral position, thereby reconfiguring the transfer case 2200 from the high mode to the neutral mode.

Vehicle Computational Strategies

Figure 73:
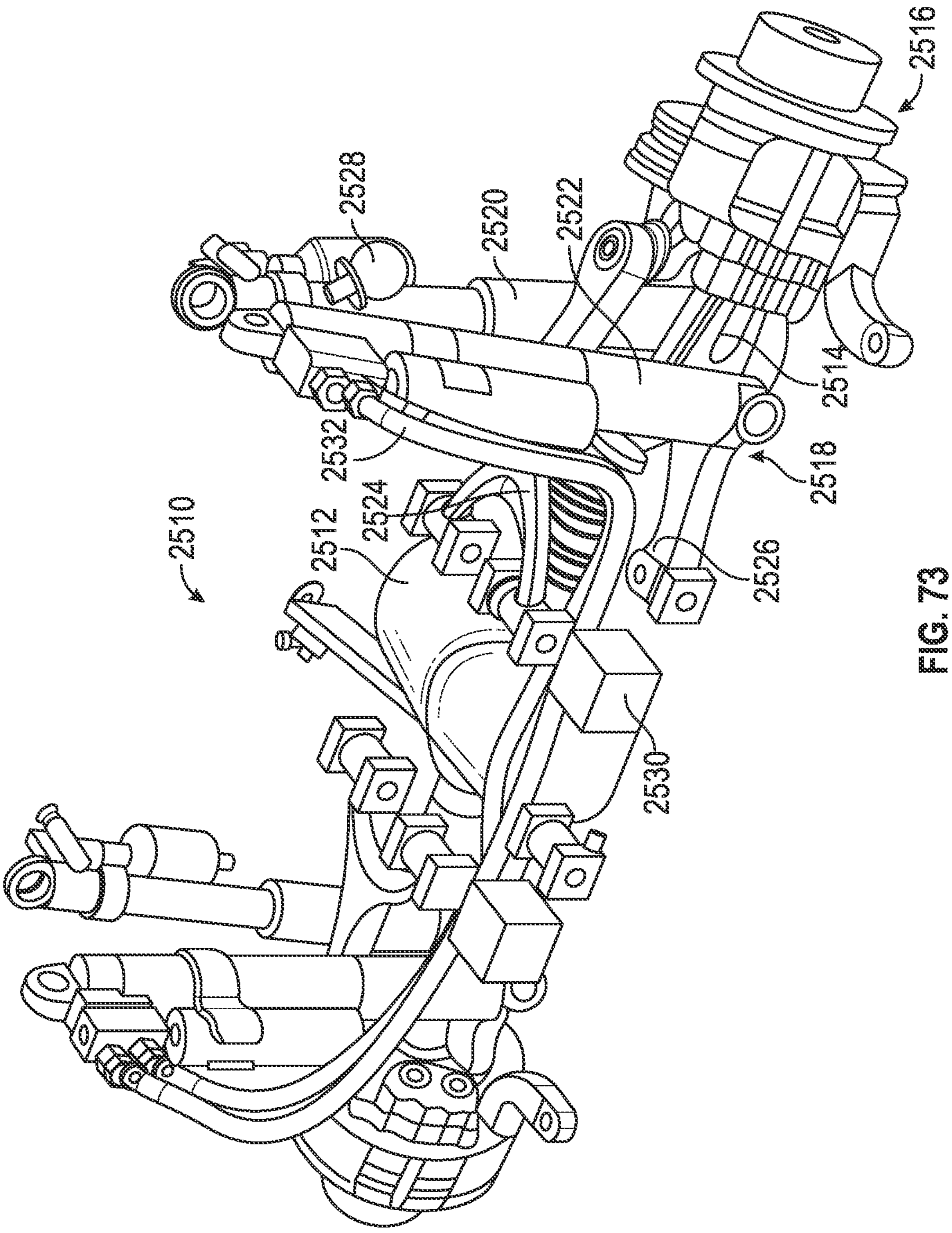
FIG. 73 is a perspective view of an axle assembly, according to an exemplary embodiment.

Referring to FIG. 73, an axle assembly 2510 is configured for use with the vehicle 2610. The axle assembly 2510 may be incorporated into the front tractive assembly 2640 and/or the rear tractive assemblies 2642. According to an exemplary embodiment, the axle assembly 2510 includes a differential 2512 connected to half shafts 2514, which are each connected to a wheel end assembly 2516. The wheel end assembly 2516 is at least partially controlled (e.g., supported) by a suspension system 2518, which includes a spring 2520, a damper 2522, an upper support arm 2524, and a lower support arm 2526 coupling the wheel end assembly 2516 to the vehicle body or part thereof (e.g., the frame 2612, a chassis, a side plate, a hull, etc.). A stop, shown as cushion stop 2528, provides an upper bound to the movement of each wheel end assembly 2516.

Figure 74:
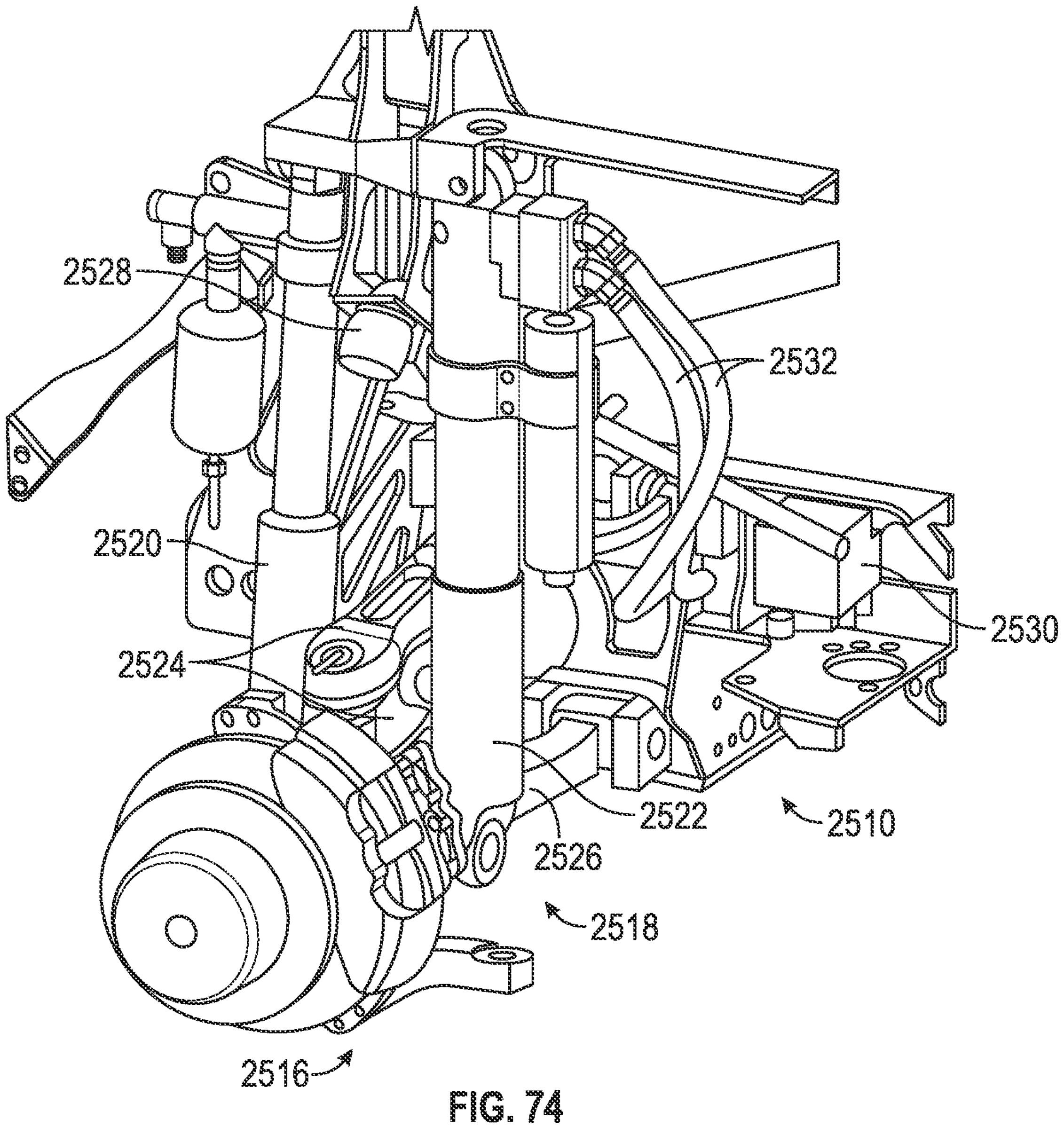
FIG. 74 is another perspective view of the axle assembly of FIG. 73, according to an exemplary embodiment.

Referring to FIG. 74, the suspension system 2518 includes one or more high-pressure gas components, where the spring 2520 is a high-pressure gas spring. In some embodiments, the suspension system 2518 further includes at least one high-pressure gas pump 2530. In some such embodiments, the suspension system 2518 includes separate high-pressure gas pumps 2530 associated with each spring 2520 and damper 2522 set. In preferred embodiments, the gas of the pump 2530 and spring 2520 includes (e.g., is at least 90%, at least 95%) an inert gas such as nitrogen, argon, helium, etc., which may be stored, provided, or received in one or more reservoirs (e.g., a central reservoir, a tank, etc.). In some embodiments, the pump 2530 is used to control the amount of gas in the spring 2520. In other embodiments, one or more valves are used to selectively fluidly couple the spring 2520 to one or more reservoirs (e.g., a high-pressure reservoir maintained by the pump 2530, a low-pressure reservoir maintained by the pump 2530, etc.) to control the amount of gas in the spring 2520. One or more of the spring 2520, the damper 2522, and the pump 2530 may be fluidly coupled by one or more conduits, shown as hoses 2532.

Figure 75:
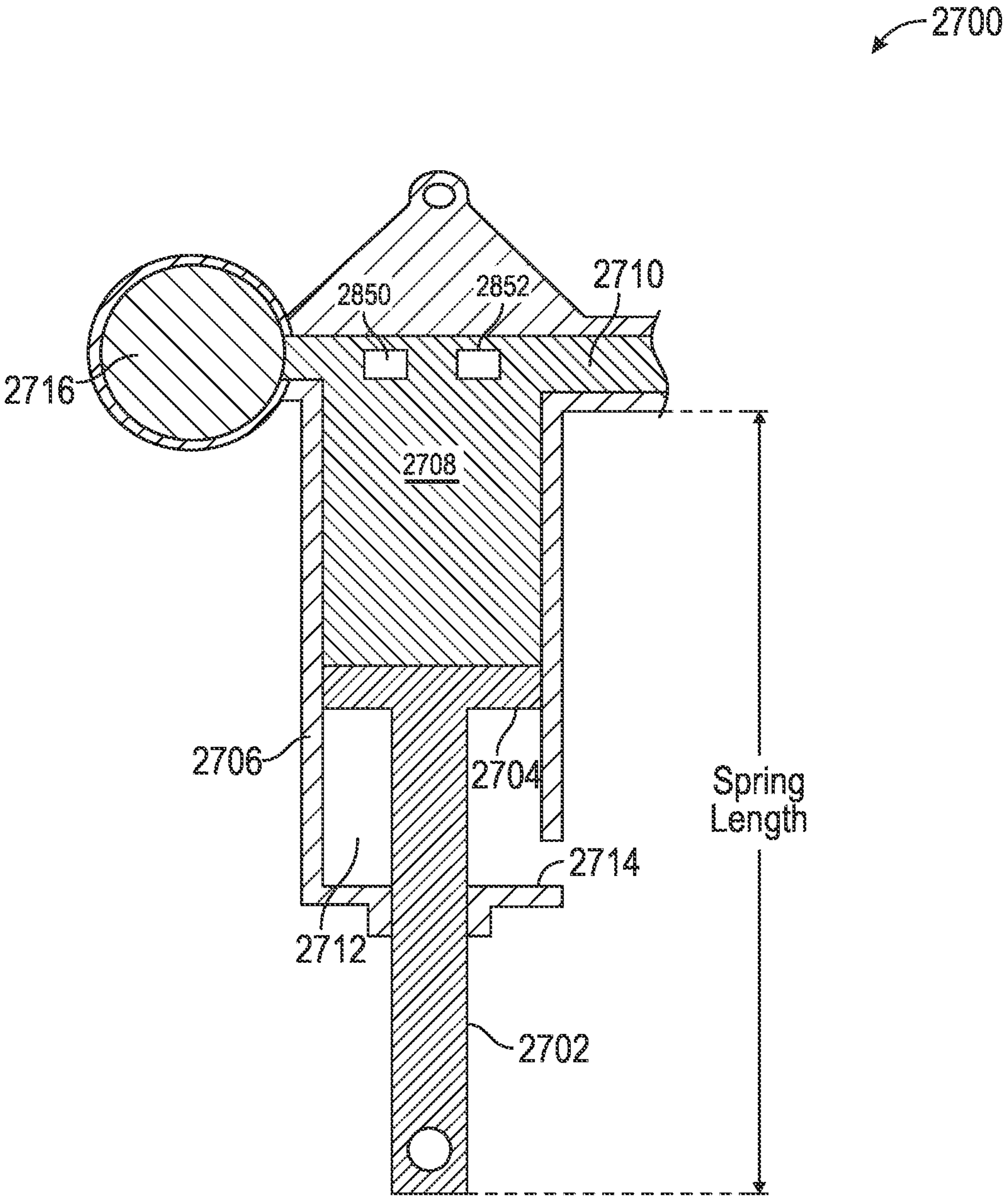
FIG. 75 is a schematic view of a gas spring assembly, according to an exemplary embodiment.

Referring to FIG. 75, a schematic representation of a gas spring 2700 is shown. The spring 2700 may be functionally substantially the same as the spring 2520. The spring 2700 includes a rod 2702 coupled to a piston 2704. The rod 2702 and the piston 2704 translate within a cylinder 2706, and a spring length is defined based on the position of the rod 2702 relative to a portion of the cylinder 2706. A first chamber 2708 is defined between the interior of the cylinder 2706 and a face of the piston 2704 such that the first chamber 2708 expands as the rod 2702 extends out of the cylinder 2706. The first chamber 2708 is configured to be filled with gas such that a pressure is exerted on the piston 2704. In some embodiments, the first chamber 2708 is substantially sealed aside from a port 2710. The port 2710 may be selectively fluidly coupled to a reservoir of a higher or lower pressure than the first chamber 2708 and/or a pump (e.g., the high pressure gas pump 2530) such that the amount of gas in the first chamber 2708 may be varied. The amount of gas in the first chamber 2708 may be varied by selectively activating or engaging a valve fluidly coupled to a reservoir or a pump (e.g., the high pressure gas pump 2530).

The spring 2700 further includes a second chamber 2712 defined between the interior of the cylinder 2706, a face of the piston 2704, and the rod 2702 on the opposite side of the piston 2704 from the first chamber 2708. The second chamber 2712 is substantially sealed other than a port 2714. In some embodiments, the port 2714 fluidly couples the second chamber 2712 to the surrounding atmosphere, such that the second chamber 2712 experiences atmospheric pressure. Alternatively the second chamber 2712 may be pressurized (e.g., by a high pressure gas source such as the pump 2530) to actively retract the rod 2702 into the cylinder 2706. In some embodiments, an accumulator 2716 is fluidly coupled to the first chamber 2708. The accumulator 2716 facilitates the spring 2700 providing two different spring rates, depending upon the pressure inside the first chamber 2708. By way of example, when the pressure inside the first chamber 2708 is less than a charge pressure within the accumulator 2716, the accumulator 2716 remains fully expanded, and the spring 2700 provides a first spring rate. When the pressure inside the first chamber 2708 is greater than the charge pressure, the accumulator 2716 compresses, and the spring 2700 provides a second spring rate.

The amount of force exerted by the spring 2700 varies with the pressure in the first chamber 2708. By way of example, the force exerted by the spring 2700 may be equal to the pressure in the first chamber 2708 times the area of the piston 2704 that is exposed to the first chamber 2708. The pressure in each spring 2700 varies with the temperature and amount of gas in the spring 2700 and a length of the spring 2700 (e.g., the spring length shown in FIG. 75), among other factors. The spring length varies with the ride height of the vehicle 2610, and as such, may be used to determine the height of the body assembly of the vehicle 2610 relative to the ground.

Figure 76:
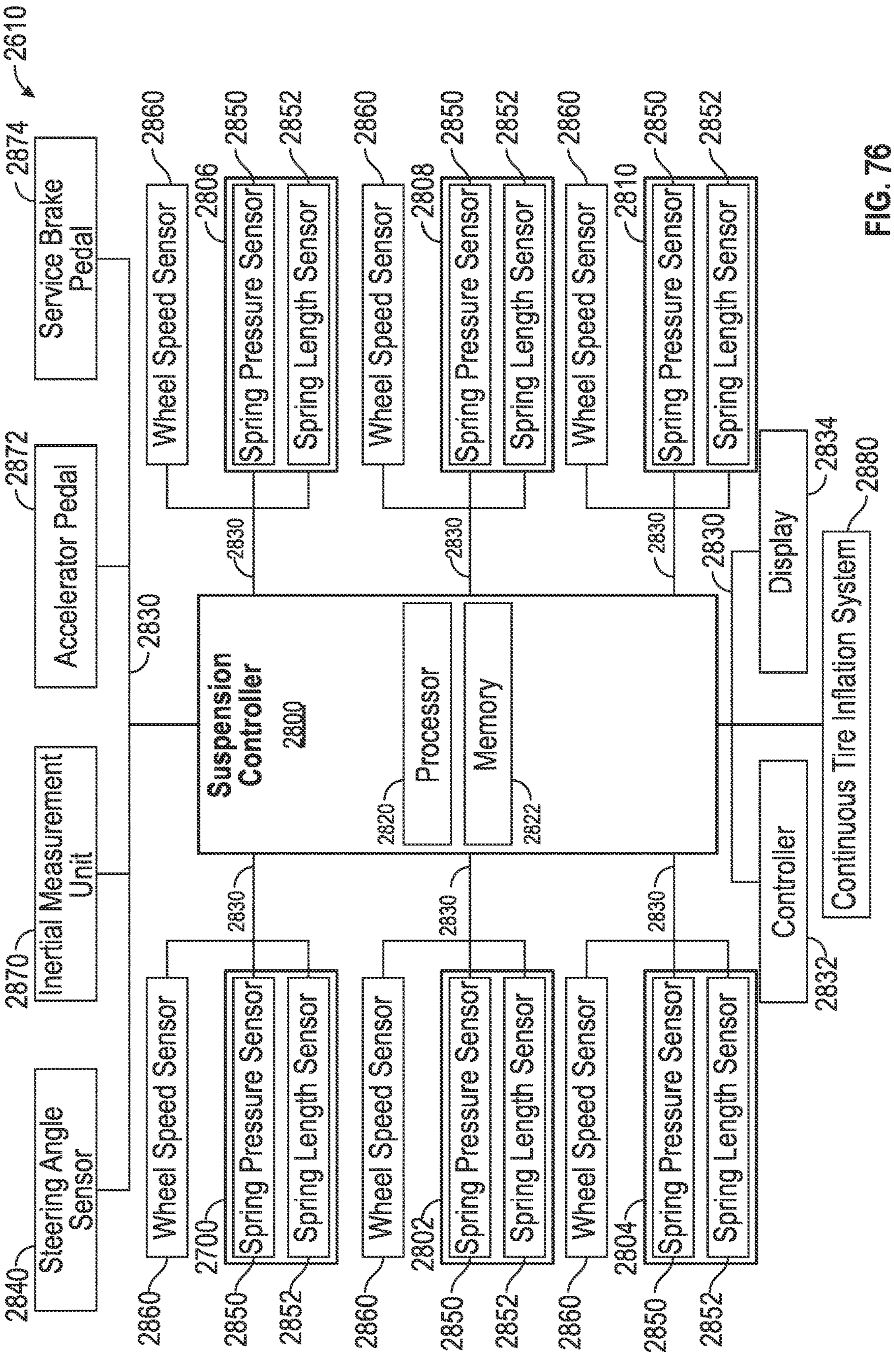
FIG. 76 is a block diagram of a vehicle suspension control system, according to an exemplary embodiment.

Referring now to FIG. 76, a detailed diagram of a vehicle suspension control system is shown, according to an exemplary embodiment. The vehicle suspension control system includes a controller, shown as suspension controller 2800. The vehicle 2610 is shown to include gas springs 2700, 2802, 2804, 2806, 2808, and 2810 each associated with a different wheel end assembly 2516 and wheel and tire assembly 2644 of the vehicle 2610. The gas springs 2700, 2802, 2804, 2806, 2808, and 2810 may be substantially similar to the gas spring 2700. The suspension controller 2800 includes a processor 2820 and a memory 2822. The suspension controller 2800 communicates with the springs 2700, 2802, 2804, 2806, 2808, and 2810 through data lines 2830. The suspension controller 2800 also communicates with an engine control unit, shown as controller 2832, and a display 2834 (e.g., a touchscreen) through the data lines 2830. The data lines 2830 may be any type of communications medium capable of conveying electronic data between the suspension controller 2800, the springs 2700, 2802, 2804, 2806, 2808, and 2810, the controller 2832, the display 2834, and the other various sensors of the vehicle 2610. The data lines 2830 may be wired connections, wireless connections, or a combination of wired and wireless connections. In some embodiments, the data lines 2830 are redundant connections. For example, a data line 2830 may include two or more independent connections between the suspension controller 2800 and the spring 2700. In another example, a data line 2830 may include individual connections between the suspension controller 2800 and the sensors and controls of the spring 2700.

The vehicle 2610 includes sensors operatively coupled to the suspension controller 2800 by data lines 2830. The vehicle 2610 may include one or more angle sensors, shown as steering angle sensors 2840, pressure sensors, shown as spring pressure sensors 2850, linear position or length sensors, shown as spring length sensors 2852, speed sensors, shown as wheel speed sensors 2860, one or more acceleration sensors and/or orientation sensors, shown as inertial measurement units (IMUs) 2870, an accelerator interface or accelerator device, shown as accelerator pedal 2872, and a brake interface or brake device, shown as service brake pedal 2874. Although only these sensors are mentioned specifically, it should be understood that the vehicle 2610 may include other types of sensors.

The steering angle sensors 2840 may be configured to provide a measurement indicative of the angle of one or more of the front wheels (e.g., the wheel and tire assemblies 2644) relative to a longitudinal axis of the vehicle 2610 (e.g., as defined by the frame 2612). Accordingly, the steering angle sensors 2840 provide an indication of (a) if the vehicle 2610 is turning (b) the direction in which the vehicle 2610 is turning and (c) the magnitude with which the vehicle 2610 is turning (e.g., radius of curvature of the current path of the vehicle 2610).

As shown in FIG. 75, the pressure sensor 2850 is fluidly coupled to the first chamber 2708 of the spring 2700 and configured to provide a measurement indicative of the pressure of the gas in the first chamber 2708. A pressure sensor 2850 may be similarly arranged in each of the other springs 2802, 2804, 2806, 2808, and 2810. In other embodiments, the pressure sensors 2850 are otherwise arranged but configured to measure the pressure in the first chamber 2708 of each spring. As shown in FIG. 75, the second chamber 2712 of the spring 2700 is fluidly coupled to the surrounding atmosphere, and accordingly the pressure in the second chamber 2712 may be assumed to be atmospheric pressure. In embodiments where the second chamber 2712 is fluidly coupled to a high pressure gas source, a second pressure sensor 2850 may be used to determine the pressure in the second chamber 2712.

Each spring length sensor 2852 is configured to provide a measurement indicative of the spring length of the corresponding spring (e.g., as it varies due to actuation of the rod 2702). The spring length sensor 2852 may be a linear variable differential transformer (LVDT) or another type of length sensor or linear position sensor.

The wheel speed sensors 2860 are configured to provide a signal indicative of the rotational speed of one of the wheel and tire assemblies 2644. Accordingly, the wheel speed sensor 2860 may be used to determine the longitudinal speed and acceleration of the vehicle 2610. In some embodiments, each wheel end assembly 2516 includes a wheel speed sensor 2860. In other embodiments, only one wheel end assembly 2516 on each side of the vehicle 2610 (e.g., the left and right sides) includes a wheel speed sensor 2860. In yet other embodiments, the wheel speed sensors 2860 are otherwise arranged (e.g., one wheel end assembly 2516 includes a wheel speed sensor 2860).

Figure 77:
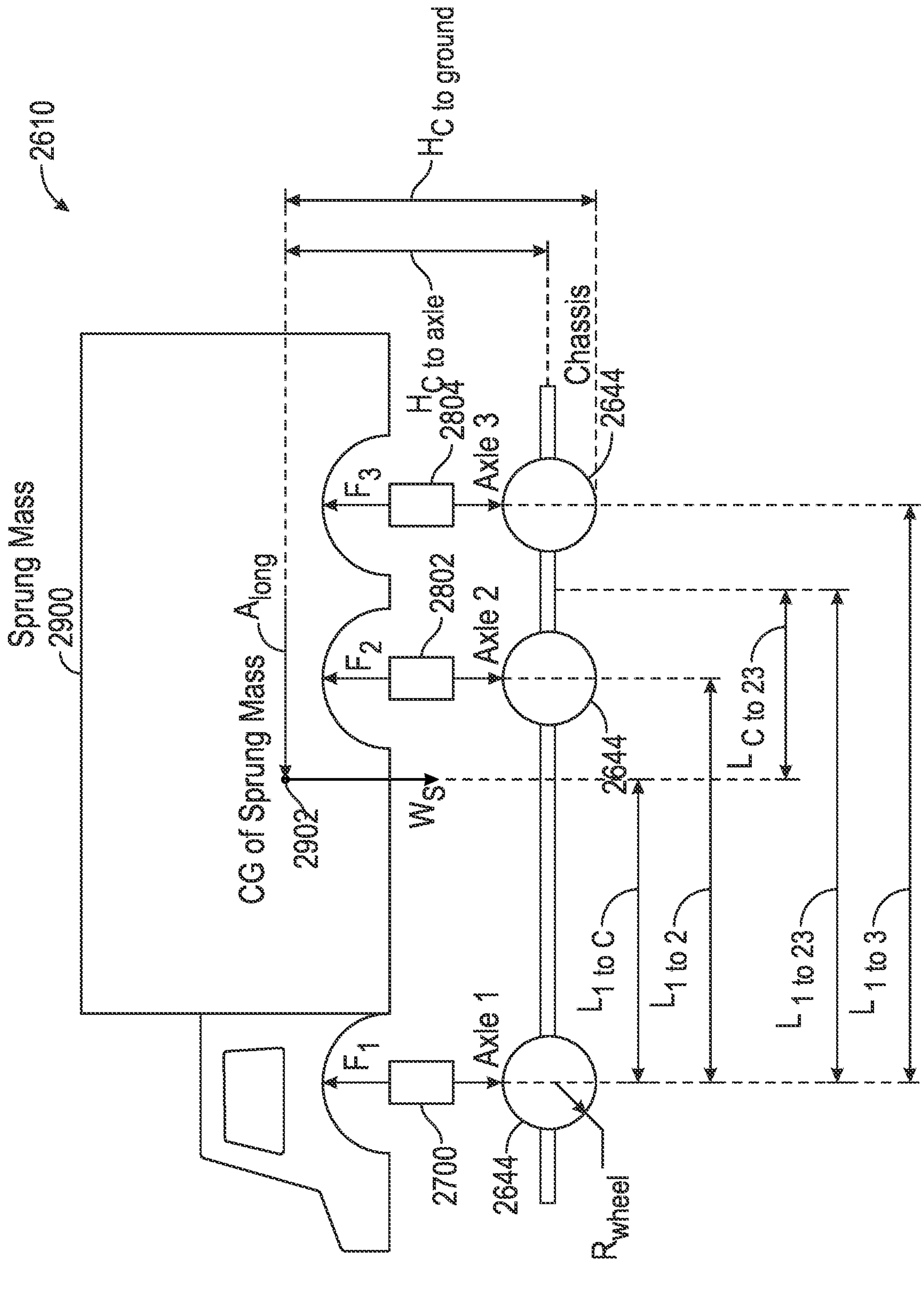
FIG. 77 is a free body diagram of a vehicle as viewed from the left side, according to an exemplary embodiment.

The IMU 2870 is configured to measure an acceleration (e.g., a vertical acceleration, a longitudinal acceleration, a lateral acceleration, an overall acceleration, etc.) and an angular orientation of a body to which it is attached. The IMU 2870 may include one or more accelerometers and/or gyroscopic sensors. As shown in FIG. 77, the springs 2700, 2802, 2804, 2806, 2808, and 2810 support a sprung mass 2900 including the frame 2612, the front cabin 20, and the mission equipment 30. In some embodiments, the IMU 2870 is attached to the sprung mass 2900. In some instances, it is advantageous to locate the IMU 2870 at or near a center of gravity 2902 of the sprung mass 2900. In some embodiments, one or more IMUs 2870 are located elsewhere (e.g., on one of the axle assemblies 2510) and/or the vehicle 2610 includes multiple IMUs 2870.

The accelerator pedal 2872 is configured to be used by an operator to indicate a desired output of the primary driver of the vehicle 2610. By way of example, in response to an operator depressing the accelerator pedal 2872, the vehicle 2610 may control the primary driver to output a greater speed and/or torque, and accordingly cause the vehicle 2610 travel at a greater speed. The service brake pedal 2874 is configured such that the vehicle 2610 applies a braking force (e.g., to one or more of the wheel and tire assemblies 2644) when the service brake pedal 2874 is engaged. The service brake pedal 2874 may be used by an operator to slow the vehicle 2610 during normal operation (e.g., when traveling down a road) and may be included in addition to another brake interface device (e.g., a parking brake lever or valve). The pedals 2872 and 2874 may be mechanical (e.g., connected to another component by a cable) or electrical (e.g., operatively coupled to a controller (e.g., the suspension controller 2800, the controller 2832, etc.), which in turn activates another component (e.g., opens a valve, increases the output of a pump, etc.) in response to a signal from the pedal). In some embodiments, the suspension controller 2800 is configured to receive signals from one or both of the pedals 2872 and 2874 or from sensors coupled to the pedals 2872 and 2874 indicating an extent to which each pedal is engaged (e.g., 76% depressed, etc.).

Referring to FIG. 77, a simplified free body diagram of the vehicle 2610 is shown. The sprung mass 2900 of the vehicle 2610 has a mass M. A weight $W_S$ acts at the center of gravity 2902 of the sprung mass 2900. The mass M is the combined mass of all of the components that are supported by the springs 2700, 2802, 2804, 2806, 2808, and 2810, including the frame 2612, the front cabin 20, the primary driver, and part or all of the mission equipment 30. The weight $W_S$ of the sprung mass 2900 is supported by upward forces from the springs 2700, 2802, 2804, 2806, 2808, and 2810, referred to as vertical wheel forces $F_{1,L}$, $F_{2,L}$, $F_{3,L}$, $F_{1,R}$, $F_{2,R}$, and $F_{3,R}$, respectively, where the subscripts 1-3 indicate the axle assembly 2510 corresponding with the spring and the subscripts L and R indicate the side of the vehicle 2610 (left or right) corresponding with the spring. FIG. 77 is a view of the left side of the vehicle 2610. Forces $F_1$, $F_2$, and $F_3$ are the sum of the left and right vertical wheel forces on each respective axle assembly 2510. A number of horizontal length measurements in the format of $L_{AtoB}$ are shown, where the subscript designates the two points between which the length is measured. The length measurements correspond with longitudinal distances between the centerlines of the axles (corresponding with subscripts 1, 2, and 3), the center of gravity 2902 (corresponding with subscript C), and a point centered between the two rear axles (corresponding with subscript 23). The radius $R_{wheel}$ of the wheel and tire assemblies 2644 is additionally shown. $L_{1to2}$, $L_{1to23}$, $L_{1to3}$, and $R_{wheel}$ may be predetermined using the geometry of the vehicle 2610 and stored in the memory 2822.

Figure 78:
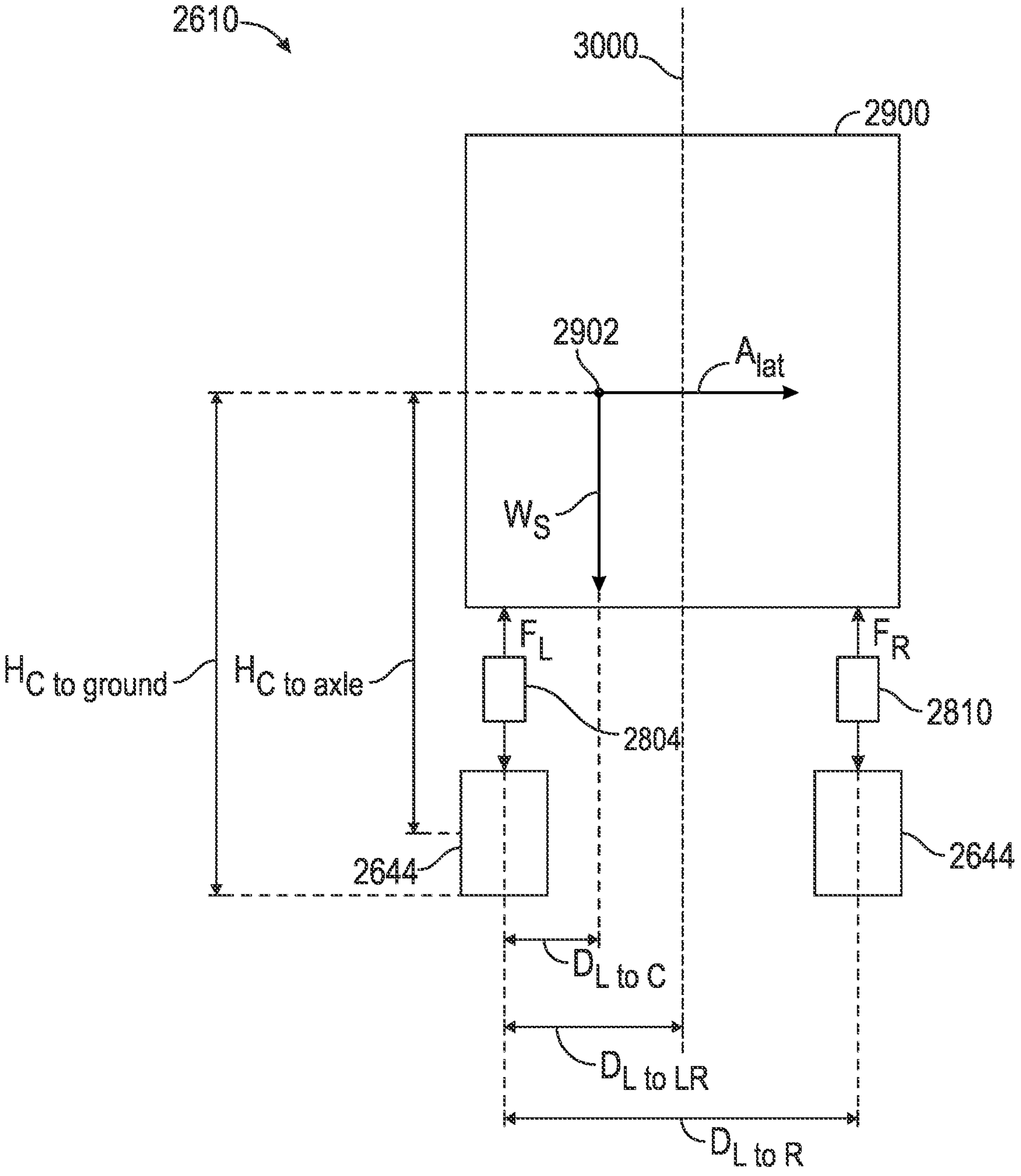
FIG. 78 is a free body diagram of the vehicle of FIG. 77 as viewed from the rear.

Referring to FIGS. 77 and 78, a number of vertical height measurements in the form of $H_{AtoB}$ are shown, where the subscript designates the two points between which the height is measured. In the embodiment shown in FIG. 77, the sprung mass 2900 (e.g., the frame 2612) is oriented parallel with the ground, which is substantially flat. The height measurements correspond with the vertical distances between the center of gravity 2902 (corresponding with the subscript C), a horizontal plane running through the axle centerlines (corresponding with the subscript axle), and a horizontal plane representing the ground (corresponding with the subscript ground). The values associated with the various heights may vary with the geometry of the vehicle 2610 and the length of each spring. Various dimensions associated with the geometry of the vehicle 2610 may be predetermined and stored in memory 2822, and the spring lengths may be determined using the spring length sensors 2852.

Referring to FIG. 78, a rear view of the simplified free body diagram of the vehicle 2610 is shown. A number of horizontal width measurements in the format of $D_{AtoB}$ are shown, where the subscript designates the two points between which the width is measured. In the embodiment shown in FIG. 78, the sprung mass 2900 is oriented parallel to the ground, which is substantially flat. The width measurements correspond with the horizontal distances between the vertical forces of each spring (corresponding with subscripts L and R), the center of gravity 2902 (corresponding with subscript C), and a longitudinally and vertically extending center plane 3000 of the vehicle 2610 (corresponding with subscript LR). As shown, each of the vertical forces act along the centerlines of the left and right wheel and tire assemblies 2644. The values associated with the various widths may depend on the geometry of the vehicle 2610 and the length of each spring. $D_{LtoLR}$ and $D_{LtoR}$ may be predetermined using the geometry of the vehicle 2610 and stored in the memory 2822, and the suspension controller 2800 may be configured to determine the spring lengths using information from the spring length sensors 2852.

The suspension controller 2800 may be configured such that the height dimensions corresponding to each spring length are stored in the memory 2822. In some embodiments, the sprung mass 2900 may have some amount of pitch or roll relative to the ground, and the heights may be determined for each spring individually. In some such embodiments, the IMU 2870 facilitates determining a pitch angle and/or a roll angle of the sprung mass 2900 and the various lengths and heights associated with the vehicle 2610. In other such embodiments, the lengths of each spring or of a number of the springs are used to determine the pitch angle or the roll angle of the sprung mass 2900.

The suspension controller 2800 is configured to determine or estimate the weight $W_S$ of sprung mass 2900. The suspension controller 2800 may be configured to simplify the calculation of the weight estimation using one or more assumptions. For example, a linear relationship may be assumed between spring pressures and vertical wheel forces. Certain geometric relationships in the vehicle 2610 may be assumed to be uniform (e.g., front and rear track widths are identical, each spring and corresponding wheel end assembly 2516 are identical in dimensions, etc.). The sprung mass 2900 may be assumed to be supported only by the springs (e.g., by gas pressure within the first chamber 2708 acting on the piston 2704). In such a case, the suspension controller 2800 may adjust each spring away from a travel range limit prior to the weight estimation. In some embodiments, the suspension controller 2800 performs the adjustment away from the travel range limit without regard to a particular target spring length, and calculates the weight at any spring length that is not at a travel range limit. For example, each spring may be lowered until it is no longer hitting rebound stops (e.g., the cushion top 2528) or raised until it is no longer hitting jounce bumpers. The springs may be assumed to be located in the same longitudinal position with respect to the direction of travel of the vehicle 2610 as the corresponding axles. The locations of the springs may alternatively be used for measurement references. The springs may be assumed to be symmetrically located about the longitudinal centerline of the vehicle 2610. One skilled in the art would appreciate that any calculations presented herein can be modified accordingly to account for variations from these assumptions.

In conventional suspension systems, the weight of a vehicle is estimated while the vehicle is stationary. Stationary weight estimations have a number of disadvantages compared to the moving weight estimation described herein. While stationary, the assumption that gas pressure in the springs supports the entire weight of the vehicle may not be accurate due to static frictional forces in the springs and lateral tire "scrub" forces caused by lateral movement of the wheels during suspension travel. Additionally, while stationary, the pressures in the springs may not be accurate due to later shifting of the center of gravity of the sprung mass as the vehicle accelerates. Some causes of cabin shifting include acceleration, which causes the front of the vehicle to lift, which, in turn, causes pressures in the front springs to be low and pressures in the rear springs to be high, deceleration, which causes the front of the vehicle to lower, which, in turn, causes pressures in the front springs to be high and pressures in the rear springs to be low, and side-to-side shifting while traveling along a curve (e.g., a curved road), which causes the side of the vehicle inside the curve to lift and the side of the vehicle outside the curve to lower, which, in turn, causes the pressures of the inside springs to be low and the pressures of the outside springs to be high.

The suspension controller 2800 is configured to estimate the weight $W_S$ of the sprung mass 2900 while the vehicle 2610 is moving. In some embodiments, the suspension controller 2800 estimates the weight $W_S$ only while the vehicle 2610 is moving along a substantially flat road at a substantially constant velocity. Under these conditions, the suspension controller 2800 may be configured assuming a negligible force is exerted on the sprung mass 2900 by the dampers 2522 (e.g., because the sprung mass 2900 is stationary relative to each axle assembly 2510). Performing the weight estimation while moving reduces or eliminates the static friction and tire "scrub" forces. With minimal acceleration (e.g., traveling at a constant speed along a flat road), the cabin may stay in a normally-balanced or un-shifted state, eliminating the inaccuracies associated with cabin shifting. Due to the reduction or elimination of these inaccuracies, the moving weight estimation of the present invention provides more accurate result than a conventional stationary weight estimation.

The suspension controller 2800 estimates the weight $W_S$ using the pressures P in each of the springs. When performing the weight estimation, the suspension controller 2800 may instruct the operator (e.g., through the display 2834) to drive along a flat road at a constant speed. In other embodiments, the weight estimation is performed while the vehicle 2610 is stationary. In some embodiments, the suspension controller 2800 calculates the vertical force F imparted by each spring on the sprung mass 2900 using the equation:

$$F=PAr \tag{1}$$

where P is the pressure of the gas in the first chamber 2708 (e.g., as measured with the pressure sensor 2850), A is the area of the piston 2707 that is exposed to the pressurized gas, and r is a motion ratio. The motion ratio r is calculated using the equation:

$$r=(\text{Change in spring length})/(\text{Corresponding wheel travel}) \tag{2}$$

and may be constant throughout the travel range of the springs and the same for each spring. The motion ratio r may be predetermined and stored in the memory 2822. In embodiments where the second chamber 2712 is actively pressurized, the suspension controller 2800 may instead calculate the vertical force F for each spring using the equation:

$$F=(P_1A_1-P_2A_2)r \tag{3}$$

where $P_1$ is the pressure in the first chamber 2708, $A_1$ is the area of the piston 2704 exposed to the gas in the first chamber 2708, $P_2$ is the pressure in the second chamber 2712, and $A_2$ is the area of the piston 2704 exposed to the gas in the second chamber 2712. If other types of springs are used (e.g., single acting gas springs including coil springs to retract the rod 2702, etc.), the suspension controller 2800 may be configured to otherwise calculate each vertical force F.

The suspension controller 2800 may be configured to filter (e.g., using a low pass filter) or otherwise alter the measured values (e.g., for pressure) prior to calculating the vertical force F. In some embodiments, the suspension controller 2800 is configured to correct for the effect of a sway bar of the vehicle 2610 on the pressures measured in the springs. A sway bar provides a moment couple about a lateral axis of the vehicle that affects the load supported by each spring. Using information from each spring length sensor 2852, the suspension controller 2800 is configured to determine a difference in spring length between the two springs associated with each axle assembly. The suspension controller 2800 may include a sway bar force table stored in the memory 2822 that relates the vertical wheel force imparted by the sway bar to the difference in length between the two springs. The sway bar force table may account for which spring was more compressed when determining the direction (and sign for mathematical purposes) of the vertical wheel force imparted by the sway bar. The suspension controller 2800 is configured to subtract this imparted force from the measured vertical wheel force corresponding to its respective spring. The result is the vertical wheel force due to the pressure of the gas spring, not including the effect of the sway bar forces. By dividing by the cross sectional area of the piston (e.g., the piston 2704) and the motion ratio, this corrected force may be used to determine a corrected pressure in each spring. This corrected pressure may be filtered (e.g., through a low pass filter) and used to estimate the weight $W_S$ or in other further calculations. The suspension controller 2800 may be configured to repeat this process for each set of springs corresponding to a sway bar.

The controller 2800 is configured to calculate the weight $W_S$ of the sprung mass 2900 as the sum of the individual vertical wheel forces F. In some embodiments, the suspension controller 2800 is configured to calculate the weight $W_S$ multiple sequential times and calculate (e.g., using an average, using a filter, etc.) a refined weight from those individual values. Such a calculation may smooth outlier values (e.g., if the vehicle 2610 hits a bump while performing the weight estimation). The suspension controller 2800 may be configured to calculate the mass M of the sprung mass 2900 by dividing the weight $W_S$ by a gravitational constant g (e.g., 9.81 $m/s^2$). The gravitational constant g may be stored in the memory 2822. The gravitational constant g may be varied depending on location or altitude of operation of the vehicle 2610, etc.

The suspension controller 2800 may use information from the various sensors to determine if the vehicle 2610 meets certain operational conditions that improve the accuracy of the weight estimation. These conditions reduce static friction in the springs, reduce weight transfer in the vehicle 2610, and reduce dynamic forces on the vehicle 2610. These conditions may be used to determine if the vehicle 2610 is traveling along a flat road at a constant velocity. Before and/or while performing the weight estimation, the suspension controller 2800 may instruct the operator (e.g., through a user interface such as the display 2834) to drive along a flat road at a constant speed. If one or more of these operational conditions are not met, the controller 2800 may disable the weight estimation (e.g., prevent the weight estimation from beginning, cancel a weight estimation that has already started, etc.). Once the weight estimation has been disabled, the suspension controller 2800 may continue to disable weight estimation for a period of time. The period of time may be predetermined or based on the operational conditions that triggered the disablement. It should be understood that the suspension controller 2800 is not limited to using the conditions discussed herein. Different conditions that reduce static friction in the springs, reduce weight transfer in the vehicle 2610, and/or reduce dynamic forces on the vehicle 2610 may be used instead of or in addition to the conditions outlined herein. By way of example, the suspension controller 2800 may use the IMU 2870 to determine a roll, pitch, or yaw measurement of the vehicle, and develop a condition that one of roll, pitch, or yaw measurements must remain within an acceptable band.

In some embodiments, the suspension controller 2800 facilitates an adjustment to the suspension (e.g., an adjustment to the ride height of the vehicle, an adjustment to the suspension stiffness or response, etc.). This suspension adjustment may be applied by an operator and stored in the memory 2822 of the suspension controller 2800. If the suspension controller 2800 determines that a suspension adjustment is active, then the suspension controller 2800 may disable the weight estimation operation.

In some embodiments, the suspension controller 2800 controls the vehicle 2610 according to various suspension operating modes. Each mode may have its own parameters and target conditions (e.g., a ride height of the vehicle 2610, a firmness of the suspension response, enabling or disabling certain operator controls, etc.). The suspension controller 2800 may change the mode based on a user input (e.g., pressing a button indicating a desired operating mode) or based on a sensor input (e.g., entering a fault mode when the suspension controller 2800 detects an abnormal condition, such as a pressure within the spring 2700 falling outside of a normal operating range or a loss of connection to one or more sensors). In some embodiments, the suspension controller 2800 disables the weight estimation operation unless the suspension is operating in one or more specific modes (e.g., an operational mode, a manual mode, etc.).

In some such embodiments, the suspension controller 2800 monitors information (e.g., a signal indicative of a pressure) from one or more sensors (e.g., the pressure sensors 2850) and disables the weight estimation operation if the information is not available. Lack of signal may indicate that one or more sensors is not operating correctly. A lack of information from certain sensors may prevent proper weight estimation. By way of example, if one of the pressure sensors 2850 is disconnected from the suspension controller 2800, the suspension controller 2800 may not be able to perform an accurate weight estimation.

In some embodiments, the suspension controller 2800 prevents and/or cancels the weight estimation operation if a speed of the vehicle 2610 is below a threshold speed (e.g., 5 miles per hour, 10 miles per hour, etc.). The suspension controller 2800 may determine the vehicle speed using information from the one or more wheel speed sensors 2860. Alternatively, the suspension controller 2800 may determine the vehicle speed using information from the IMU 2870. Accordingly, the IMU may act as a speed sensor. If the vehicle 2610 is traveling too slowly, static friction and tire "scrub" forces may reduce the accuracy of the resulting weight estimation.

In some embodiments, the suspension controller 2800 monitors the extent to which each of the pedals 2872 and 2874 are engaged and disables the weight estimation operation if their level of engagement is outside of a predetermined range. By way of example, the suspension controller 2800 may disable the weight estimation operation if the accelerator pedal 2872 is pressed past a first threshold level (e.g., beyond 30% engaged, beyond 50% engaged, etc.). If the accelerator pedal 2872 is pressed beyond the first threshold level, the vehicle 2610 may accelerate and no longer travel at a constant speed. By way of another example, the suspension controller 2800 may disable the weight estimation operation if the accelerator pedal 2872 is not pressed past a second threshold level (e.g., beyond 5% engaged, beyond 10% engaged, etc.). If the accelerator pedal 2872 is not pressed beyond the second threshold level, the vehicle 2610 may not be able to maintain a constant speed. By way of another example, the suspension controller 2800 may disable the weight estimation operation if the service brake pedal 2874 is pressed (e.g., past 0% engaged).

In some embodiments, the suspension controller 2800 monitors the extent to which the accelerator pedal 2872 is engaged and disables the weight estimation operation if a rate of change (e.g., an instantaneous rate of change) in accelerator pedal engagement is beyond a certain level. By way of example, the suspension controller 2800 may determine the rate of change of accelerator pedal engagement by dividing the magnitude (e.g., absolute value) of the change in accelerator pedal engagement (e.g., 1.8%) over a period of time (e.g., 50 ms) by the length of the period of time. If the magnitude of the rate of change in accelerator pedal engagement is greater than a threshold rate of change, the operator may be attempting to accelerate the vehicle 2610.

In some embodiments, the suspension controller 2800 monitors a signal from the IMU 2870 and determines a lateral, longitudinal, vertical, or other acceleration of the vehicle 2610. In other embodiments, the suspension controller 2800 determines the acceleration using information from the wheel speed sensors 2860. Accordingly, the wheel speed sensors 2860 may act as acceleration sensors. If the acceleration of the vehicle 2610 in any direction is outside a window of a limited bandwidth (e.g., outside of a predetermined target range), then the suspension controller 2800 may prevent the weight estimation operation. In other embodiments, the suspension controller 2800 determines a rate of change (e.g., an instantaneous rate of change) of the acceleration and disables the weight estimation operation if the rate of change of acceleration in any direction is beyond a threshold level. By way of example, the suspension controller 2800 may determine the rate of change of an acceleration by dividing the absolute value of the change in acceleration over a period of time (e.g., 50 ms) by the length of the period of time.

In some embodiments, the suspension controller 2800 monitors the spring length of each spring using the spring length sensors 2852. In some such embodiments, the suspension controller 2800 disables the weight estimation operation if the difference in spring length between any two springs corresponding to one axle assembly 2510 is above a threshold level. By way of example, if the front left and front right springs have significantly different spring lengths, then the body of the vehicle 2610 may be tiled, which could cause cabin center of gravity shifting. Alternatively, the suspension controller 2800 may disable the weight estimation operation if the difference in spring length between any of the springs is above a threshold level. In other such embodiments, the suspension controller 2800 determines a spring velocity (i.e., a rate of change of spring length) of each of the springs. The suspension controller 2800 may disable the weight estimation operation if the magnitude (e.g., absolute value) of any spring velocity is at or above a threshold spring velocity. In other such embodiments, the suspension controller 2800 determines a rate of change (e.g., an instantaneous rate of change) of the spring velocity (e.g., similarly to the process of determining the rate of change in accelerator pedal position engagement described above) and disables the weight estimation operation if the rate of change of spring velocity is greater than a threshold rate of change.

The weight $W_S$ determined by the suspension controller 2800 may facilitate leveling the vehicle 2610. In certain leveling arrangements, the weight $W_S$ is used by the suspension controller 2800 to determine a target pressure for each of the of gas springs and/or a location of a center of gravity of the vehicle 2610. Conventional stationary, minimum discretion weight estimations may not be accurate, limiting the ability of the suspension controller 2800 to level the vehicle 2610 and calculate the position of the center of gravity 2902. Using this inaccurate weight estimate would cause the vehicle 2610 to level poorly and lead to an inaccurate location of the center of gravity 2902. The weight estimation outlined herein leads to a better leveling of the vehicle 2610 and a more accurate location of the center of gravity than the conventional method.

In some embodiments, the vehicle 2610 further includes a continuous tire inflation (CTI) system 2880 controlled by the controller 2832 or the suspension controller 2800. The CTI system 2880 maintains target tire pressures in each wheel and tire assembly 2644 of the vehicle 2610. The CTI system 2880 may include compressors, reservoirs, accumulators, valves, or other components to facilitate providing or removing pressurized gas (e.g., air) from the wheel and tire assemblies 2644. In some embodiments, the suspension controller 2800 provides different target tire pressures to the CTI system 2880 for each wheel and tire assembly 2644 based on the loading of the vehicle 2610. In some such embodiments, the suspension controller 2800 is configured to use the weight $W_S$ estimated by the suspension controller 2800 to determine the target tire pressure of one or more of the wheel and tire assemblies 2644. The weight $W_S$ may be used to automatically select between one or more configurations (e.g., armored or unarmored configurations). By way of example, the suspension controller 2800 may be configured to determine that the vehicle 2610 is in an armored configuration when the weight $W_S$ is above a threshold weight and otherwise determine that the vehicle 2610 is in an unarmored configuration. The suspension controller 2800 may further select between one or more types of terrain on which the vehicle 2610 will operate (e.g., in response to a user input). The configuration and the selected terrain may be used to determine target tire pressures. Target tire pressures corresponding with different weight estimates, terrains, and configurations may be stored in the memory 2822.

Referring to FIG. 77, after determining the forces $F_1$, $F_2$, and $F_3$ and the weight $W_S$ of the sprung mass 2900, the suspension controller 2800 may be configured to determine a longitudinal position of the center of gravity 2902 of sprung mass 2900 by performing a moment balance on the sprung mass 2900. When performing the longitudinal center of gravity estimation, the suspension controller 2800 may instruct the operator (e.g., through a user interface, the display 2834) to drive straight along a flat road at a constant speed. The suspension controller 2800 may use information from the various sensors to determine if the vehicle 2610 is in an appropriate condition to perform a longitudinal center of gravity estimation (e.g., if the vehicle 2610 is traveling straight along a substantially flat road at a substantially constant speed). By way of example, the suspension controller 2800 may use information from the steering angle sensors 2840, spring length sensors 2852, and wheel speed sensors 2850 and/or the IMU 2870 to determine if the vehicle 2610 is turning, if the road is flat, and if the vehicle 2610 is traveling at a constant speed, respectively. If the steering angle sensors 2840 indicate that one of the wheel and tire assemblies 2644 is rotates beyond a threshold angle relative to a longitudinal axis, the suspension controller 2800 may disable determination of the longitudinal position of the center of gravity 2902. If the spring velocity of any spring is greater than a threshold spring velocity, the suspension controller 2800 may disable determination of the longitudinal position of the center of gravity 2902. If the vehicle speed measured by the wheel speed sensors 2850 varies by greater than a threshold amount while the longitudinal position of the center of gravity 2902 is being determined, the suspension controller 2800 may disable determination of the longitudinal position of the center of gravity 2902. Alternatively, the suspension controller 2800 determine whether or not to disable determination of the longitudinal position of the center of gravity 2902 based on the same operational conditions used to disable the weight estimation operation. In other embodiments, the longitudinal center of gravity estimation is performed while the vehicle 2610 is stationary.

The suspension controller 2800 may be configured to perform a moment balance on the sprung mass 2900 about an axis of the vehicle 2610. By way of example, the suspension controller 2800 may perform a moment balance about an axis running parallel to and through the center of Axle 1, the frontmost axle. The sum of moments about Axle 1 is equal to zero (e.g., $\Sigma M_{Axle1}=0$) because there is no rotational movement or acceleration of the sprung mass 2900 about this axis when the vehicle is traveling along a flat road at a constant speed. Accordingly, the suspension controller 2800 determines the longitudinal position of the center of gravity 2902 using the equation:

$$L_{1toC}=(F_2*L_{1to2}+F_3*L_{1to3})/W_S \quad (4)$$

Alternatively, the moment balance may be performed about a different axis to determine the longitudinal location of the center of gravity 2902 relative to another part of the vehicle 2610.

Once the longitudinal position of the center of gravity 2902 of the vehicle 2610 is determined, the suspension controller 2800 may be configured to determine a vertical position of the center of gravity 2902. When performing the vertical center of gravity estimation, the suspension controller 2800 may instruct the operator (e.g., through a user interface or display) to drive straight along a flat road with a constant acceleration The suspension controller 2800 may use information from the various sensors to determine if the vehicle 2610 is in an appropriate condition to perform a vertical center of gravity estimation (e.g., if the vehicle 2610 is traveling straight along a substantially flat road at a substantially constant acceleration). By way of example, the suspension controller 2800 may use information from the steering angle sensors 2840, spring length sensors 2852, and wheel speed sensors 2850 and/or the IMU 2870 to determine if the vehicle 2610 is turning, if the road is flat, and if the vehicle 2610 is traveling at a constant acceleration, respectively. If the steering angle sensors 2840 indicate that one of the wheel and tire assemblies 2644 is rotates beyond a threshold angle relative to a longitudinal axis, the suspension controller 2800 may disable determination of the vertical position of the center of gravity 2902. If the spring velocity of any spring is greater than a threshold spring velocity, the suspension controller 2800 may disable determination of the vertical position of the center of gravity 2902. If the acceleration in any direction measured by the IMU 2870 varies by greater than a threshold amount while the vertical position of the center of gravity 2902 is being determined, the suspension controller 2800 may disable determination of the vertical position of the center of gravity 2902. Alternatively, the suspension controller 2800 determine whether or not to disable determination of the vertical position of the center of gravity 2902 based on the same operational conditions used to disable the weight estimation operation.

In this set of conditions, the center of gravity 2902 experiences an acceleration $A_{long}$ parallel to a longitudinal axis of the vehicle 2610. In some embodiments, the suspension controller 2800 uses the IMU 2870 to determine the longitudinal acceleration $A_{long}$. In other embodiments, the suspension controller 2800 uses the wheel speed sensors 2860 to determine the longitudinal acceleration $A_{long}$. Depending on the height of the center of gravity 2902, the longitudinal acceleration $A_{long}$ will impart a varying moment effect on the sprung mass 2900. This moment effect increases vertical forces F on the axle assemblies 2501 rearward of the center of gravity 2902 (e.g., Axle 2 and Axle 3 as shown in FIG. 77) and decreases the vertical force F on the axle assemblies 2501 forward of the center of gravity 2902 (e.g., Axle 1 as shown in FIG. 77). The suspension controller 2800 may be configured to perform a summation of forces (e.g., in the longitudinal direction) and/or a summation of moments (e.g., about the center of gravity 2902) to determine the vertical position of the center of gravity 2902. Accordingly, the suspension controller 2800 may calculate the height of the center of gravity 2902 relative to the ground ($H_{CtoAxle}$) or the height relative to the centers of the wheel and tire assemblies 2644 ($H_{CtoGround}$) using the acceleration $A_{long}$, the vertical wheel forces $F_1$, $F_2$, and $F_3$, and the longitudinal dimensions $L_{1to2}$, $L_{1to3}$, and $L_{1toC}$. The suspension controller 2800 may convert between these two heights using the equation:

$$H_{CtoAxle}=H_{CtoGround}-R_{wheel} \quad (5)$$

The suspension controller 2800 may then determine the vertical position of the center of gravity 2902 relative to the sprung mass 2900. By way of example, the ride height of the sprung mass 2900 may be varied and/or the sprung mass 2900 may have some pitch and/or roll relative to the ground. Accordingly, sprung mass 2900 does not have a fixed position relative to the ground or the wheel and tire assemblies 2644. To determine the vertical position of the center of gravity 2902 relative to the sprung mass 2900, the suspension controller 2800 may use the position of the sprung mass 2900 relative to the to the ground or relative to the centers of the wheel and tire assemblies 2644. By way of example, the suspension controller 2800 may use the spring lengths of each spring to determine the position and/or orientation of the sprung mass 2900 relative to the ground or relative to the wheel and tire assemblies 2644. The suspension controller 2800 may additionally or alternatively use the IMU 2870 to determine an orientation (e.g., a pitch angle) of the sprung mass 2900. The relationship of the spring lengths and the information from the IMU 2870 to the position and orientation of the sprung mass 2900 relative to the ground or relative to the wheel and tire assemblies 2644 may be predetermined and stored in the memory 2822. The suspension controller 2800 may then use the height $H_{CtoAxle}$ or the height $H_{CtoGround}$ along with the position and orientation of the sprung mass 2900 relative to the wheel and tire assemblies 2840 or the ground to determine the vertical position of the center of gravity 2902 relative to the sprung mass 2900. In other embodiments, the suspension controller 2800 determines the vertical position of the center of gravity 2902 relative to the sprung mass 2900 directly.

In some embodiments, the suspension controller 2800 is configured to determine the lateral location of the center of gravity 2902 (e.g., relative to the center plane 3000). In some such embodiments, the suspension controller 2800 is configured to determine a weight faction $f_L$, where the weight fraction indicates the fraction of the weight $W_S$ of the sprung mass 2900 that is supported by the gas springs on the left side of the vehicle 2610. The suspension controller 2800 first determines the total weight supported by the springs on the left side of the vehicle $F_L$ and the total weight supported by the springs on the right side of the vehicle $F_R$ by adding the individual vertical wheel forces on each respective side of the vehicle. The suspension controller 2800 then calculates the weight fraction as $f_L=F_L/W_S$. The suspension controller 2800 may use the weight fraction to determine a lateral location of the center of gravity 2902. By way of example a weight fraction $f_L=0.5$ would indicate that the center of gravity 2902 is disposed along a longitudinal centerline of the vehicle 2610.

In other such embodiments, the suspension controller 2800 instructs the operator to drive in a circle such that the center of gravity 2902 follows a circular path. When following a circular path, the center of gravity 2902 experiences a tangential acceleration oriented tangentially to the circular path of the center of gravity 2902 and a centripetal acceleration oriented towards the center of the circular path of the center of gravity 2902. The net acceleration of the center of gravity 2902 includes a longitudinal component $A_{long}$ and a lateral component Alat. Using information from at least one of the IMU 2870, the steering angle sensors 2840, the wheel speed sensors 2860 and the spring pressure sensors 2850, the suspension controller 2800 may be configured to determine the lateral location of the center of gravity 2902.

In some embodiments, the location of the center of gravity 2902 is used by the suspension controller 2800 to control and/or monitor the stability of the vehicle 2610. In some embodiments, the suspension controller 2800 uses the location of the center of gravity 2902 to determine a stability modulus of the vehicle 2610. The suspension controller 2800 may be configured to alter driving characteristics of the vehicle 2610 based at least in part on the location of the center of gravity 2902. By way of example, the controller 2842 may disable the vehicle 2610 (e.g., by disengaging the primary driver, by applying brakes, by preventing adjustment of the suspension, etc.) in response to a determination that the center of gravity 2902 is outside of a predefined region. By way of example, the suspension controller 2800 may disable the vehicle 2610 if the center of gravity 2902 extends a predetermined distance beyond a reference point on the vehicle 2610 or beyond predefined lateral, longitudinal, and/or vertical distance thresholds relative to part of the vehicle 2610. In some embodiments, the suspension controller 2800 is configured to indicate the location of the center of gravity 2902 to an operator (e.g., using the display 2724). The location of the center of gravity 2902 may be used when loading the vehicle 2610 in order to place certain loads in a desired relation to the center of gravity 2902. In some embodiments, the suspension controller 2800 uses the location of the center of gravity 2902 when adjusting the suspension to determine a target pressure in each spring.

High Pressure Gas Spring Controls for Vehicle Leveling

Figure 79:
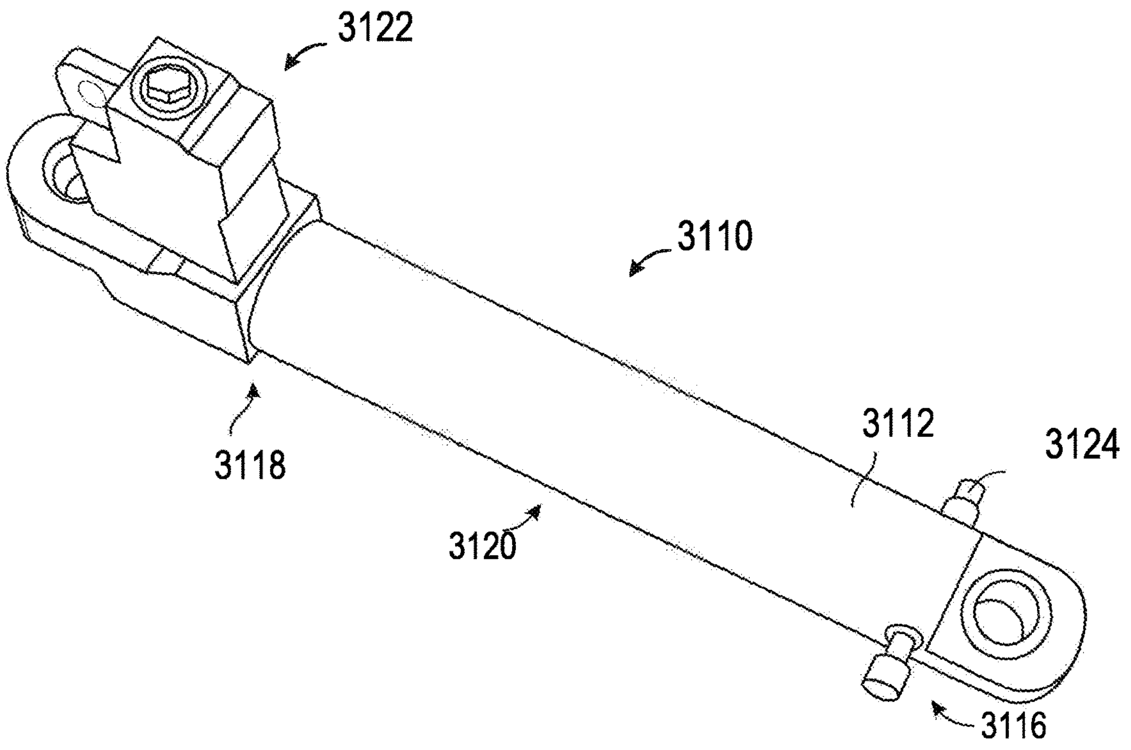
FIG. 79 is a perspective view of a gas spring in a first configuration, according to an exemplary embodiment.
Figure 80:
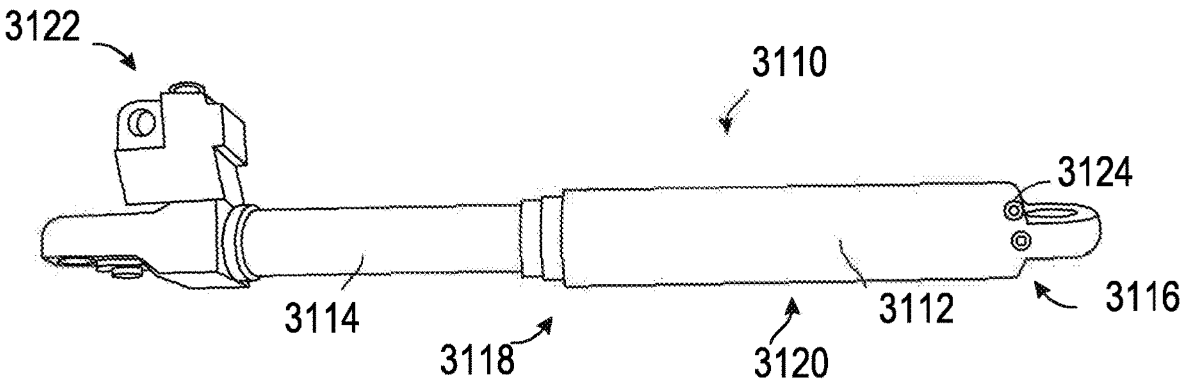
FIG. 80 is a side view of the gas spring of FIG. 79 in a second configuration, according to an exemplary embodiment.

Referring to FIGS. 79 and 80, a gas spring 3110 includes a cylinder 3112 coupled to a rod 3114. The cylinder 3112 has a cap end 3116, a rod end 3118, and a side wall 3120 (e.g., cylindrical side wall) extending between the cap and rod ends 3116, 3118. A chamber is formed between the cylinder 3112 and the rod 3114. The chamber may be a space defined by the interior of the cylinder 3112 surrounded by side wall 3120 and between cap end 3116 and rod end 3118. Nitrogen or another gas held in the chamber compresses or expands in response to relative movement between the rod 3114 and the cylinder 3112 to provide the receipt, storage, or release of potential energy by the gas spring 3110.

The rod 3114 is configured to translate with respect to the cylinder 3112. According to an exemplary embodiment, the rod 3114 is coupled to or includes a piston that forms a wall of the chamber. When the rod 3114 translates relative to the cylinder 3112, the piston changes the volume of the chamber, compressing the gas in the chamber or facilitating expansion of the gas. The gas in the chamber resists compression, providing a force that is a function of the compressibility of the gas, the area of the piston, the volume and geometry of the chamber, and the initial state (e.g., initial pressure) of the gas, among other factors. The gas spring 3110 receives potential energy, stored in the gas, as the gas is compressed and releases the potential energy as the gas expands.

The cylinder 3112 of the gas spring 3110 is preferably cylindrical due to structural benefits associated with cylindrical pressure vessels. However, in other contemplated embodiments, the cylinder 3112 may be substituted for a body having another geometry. In some contemplated embodiments, the chamber is formed in, or at least partially formed in, the rod 3114. In one such embodiment, the chamber spans both the cylinder 3112 and at least a portion of the interior of the rod 3114.

In some embodiments, the gas spring 3110 includes at least one port 3122 (e.g., aperture, inlet) that may be opened to facilitate providing gas (e.g., inert gas) to or from the chamber. The chamber of the gas spring 3110 is substantially sealed when the port 3122 is not open. In some embodiments, the port 3122 is coupled to an accumulator or to one or more reservoirs. In some embodiments, the spring 3110 includes separate ports associated with the accumulator and the pump.

In some embodiments, the gas spring 3110 further includes at least one port 3124 that may be opened to facilitate coupling a pressurized reservoir of a higher or a lower pressure the gas spring 3110. Coupling the higher pressure reservoir to the gas spring 3110 increases the pressure in the gas spring 3110, causing the gas spring 3110 to expand and increasing the ride height of the axle assembly. Conversely, coupling the lower pressure reservoir to the gas spring 3110 decreases the pressure in the gas spring 3110, causing the gas spring 3110 to contract and decreasing the ride height of the axle assembly. In some embodiments, the spring 3110 includes separate ports 3124 for providing hydraulic fluid to the internal volume and for receiving hydraulic fluid from the internal volume.

In other contemplated embodiments, the gas spring 3110 is coupled directly to a pump to increase or decrease pressure in the gas spring 3110 to provide a desired ride height. In still another contemplated embodiment, a gas spring further includes at least one port that may be opened to facilitate providing hydraulic fluid (e.g., oil) to or from an internal volume of the gas spring. The internal volume for hydraulic fluid is separated from the chamber for gas. In such contemplated embodiments, adding or removing of hydraulic fluid from the internal volume changes the overall length of the gas spring for different ride heights of the suspension system. However using pressurized gas to change the length of the gas spring 3110 may be preferable in some embodiments because of reduced losses (e.g., friction, drag) associated with a flow of gas (e.g., nitrogen) compared to losses associated with the flow of hydraulic fluid (e.g., oil).

Referring now to FIG. 81 through FIG. 83B, a gas spring assembly 3210 includes a cylinder 3212 coupled to a rod 3214, and an accumulator 3216. A first chamber 3218 is formed between the cylinder 3212 and the rod 3214 and a second chamber 3220 is formed in the accumulator 3216. According to an exemplary embodiment, the accumulator 3216 includes a rigid exterior 3224 (e.g., shell, housing) and a flexible, inflatable bladder 3226 within the rigid exterior 3224. The second chamber 3220 is located between the rigid exterior 3224 and the bladder 3226. According to an exemplary embodiment, the accumulator 3216 is positioned proximate to the cylinder 3212 and rod 3214, and the second chamber 3220 of the accumulator 3216 is connected to the first chamber 3218, formed between the cylinder 3212 and rod 3214, by way of a gas transfer conduit 3222. The gas transfer conduit 3222 may include a valve 3228 (e.g., check valve, poppet) positioned to control access between the first and second chambers 3218, 3220. The valve 3228 may optionally disconnect the accumulator 3216 from the first chamber 3218 and/or contain gas in the second chamber 3220 having a pressure exceeding or lower than gas in the first chamber 3218.

In some embodiments, when the valve 3228 is open, the first chamber 3218 is in gaseous communication with the second chamber 3220 such that a continuous body of gas extends between the two chambers 3218, 3220. No intermediate hydraulic fluid or mechanical element is included to transfer energy from the first chamber 3218 to the second chamber 3220 or vice versa. In some such embodiments, the only hydraulic fluid associated with the gas spring assembly 3210 is a thin film between the rod and cylinder that moves during compression or extension of the rod 3214. The continuous body of gas for gaseous communication between the first and second chambers 3218, 3220 is intended to reduce frictional losses associated with energy transfer between the first and second chambers 3218, 3220, as may otherwise occur with hydraulic or mechanical intermediate elements. However, in other contemplated embodiments, hydraulic or mechanical intermediate elements may be included.

Figure 83A:
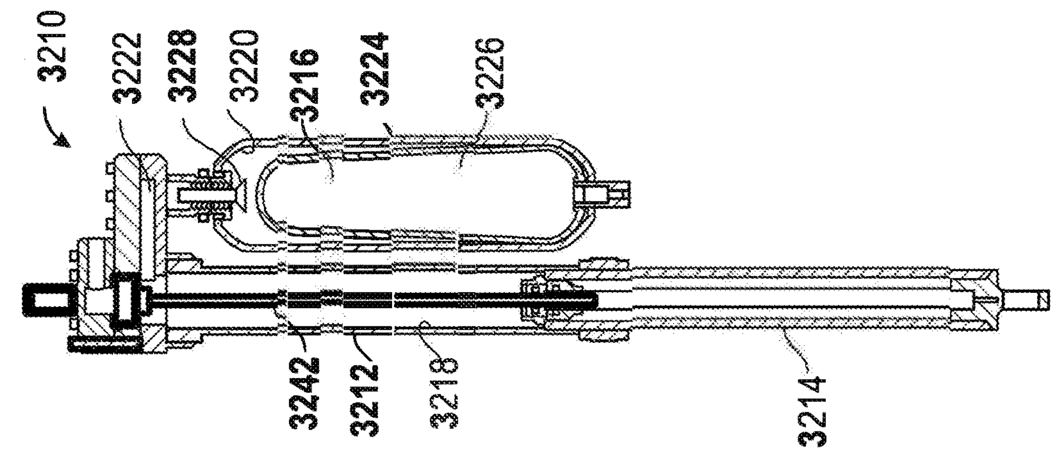
FIG. 83A is a sectional view of the gas spring assembly of FIG. 82, taken along line 8A-8A of FIG. 82, according to an exemplary embodiment.
Figure 82:
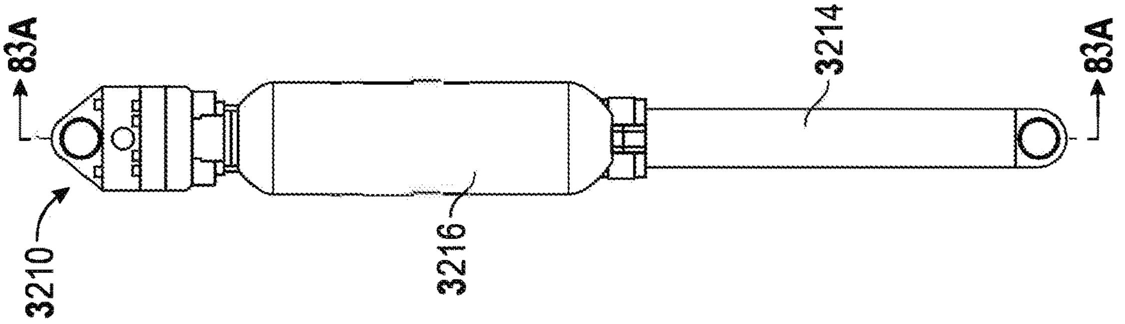
FIG. 82 is a front view of the gas spring assembly of FIG. 80, according to an exemplary embodiment.
Figure 81:
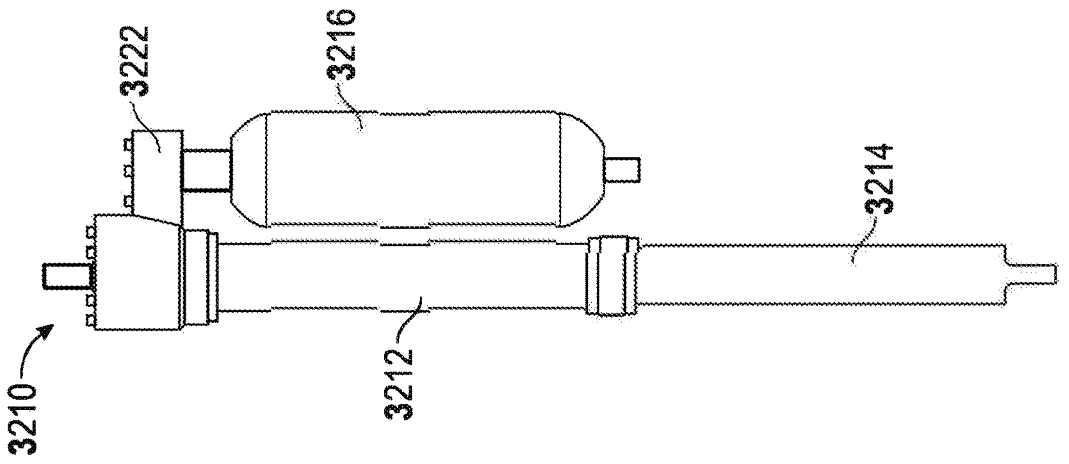
FIG. 81 is a side view of a gas spring assembly, according to an exemplary embodiment.
Figure 83B:
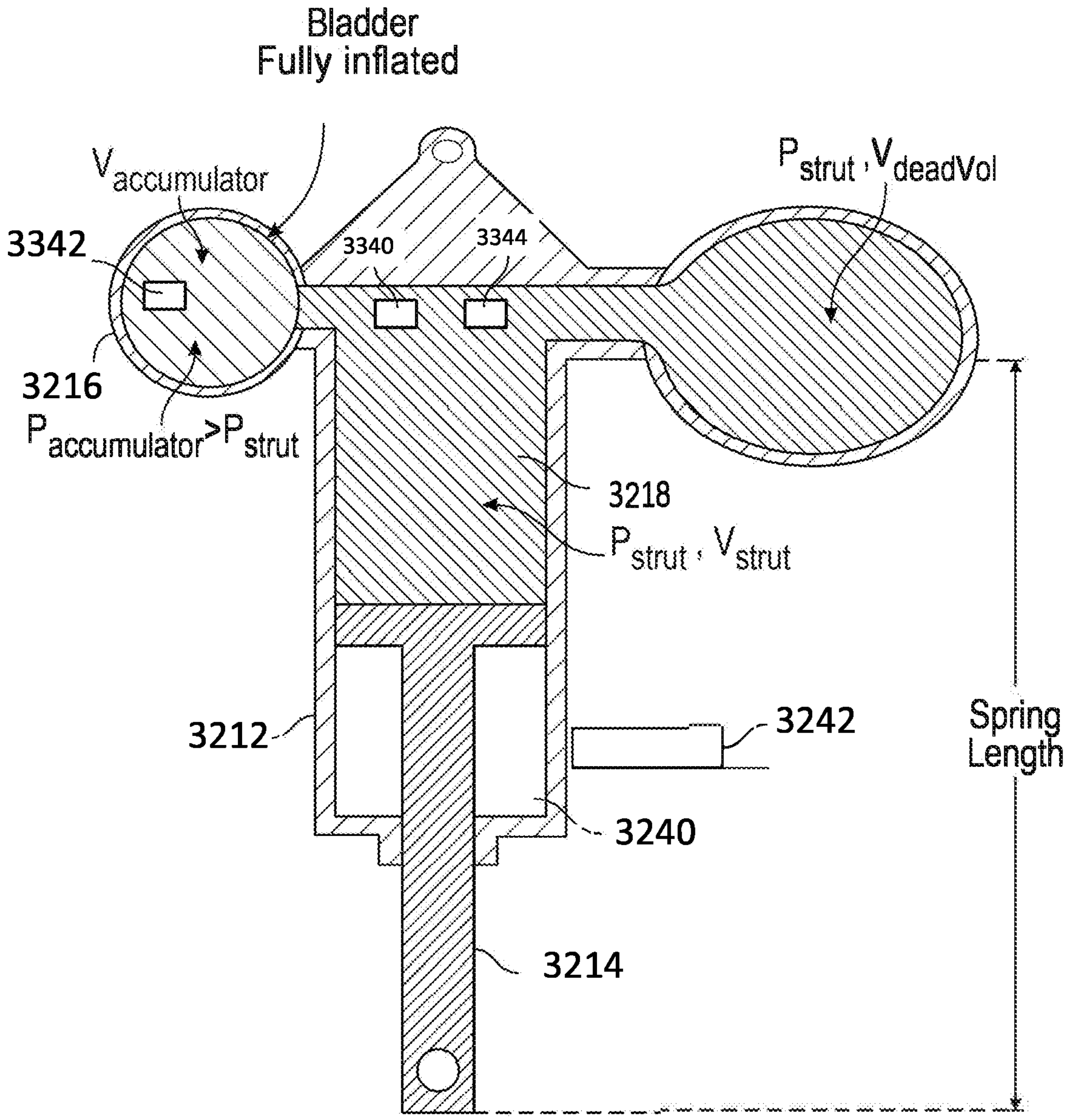
FIG. 83B is a schematic view of a gas spring assembly, according to an exemplary embodiment.

Referring specifically to FIG. 83A and FIG. 83B, in some embodiments, the cylinder 3212 is double acting cylinder such that a third chamber 3240 located on the opposite side of the rod 3214 may additionally be pressurized or depressurized. A gas transfer conduit 3222 facilitates providing gas (e.g., inert gas) to or from the third chamber 3240. In such embodiments, pressurizing the third chamber 3240 actively retracts the rod 3214 (e.g., as opposed to using gravity to retract the rod 3214, etc.). The rod may be retracted more rapidly using a double acting cylinder than with a single acting cylinder. By way of another example, the rod 3214 may be locked in a single location, whereas it may otherwise extend (e.g., if the wheel connected to it was not supported, etc.). By way of another example, the additional force on the rod 3214 from the third chamber 3240 may be used to overcome friction that might otherwise prevent retraction of the rod 3214 (e.g., stiction forces or tire scrub).

During use of the gas spring assembly 3210, in some embodiments, the bladder 3226 is inflated to an initial pressure. As the rod 3214 and cylinder 3212 are moved together, such as when the associated vehicle drives over a bump, gas in the chamber 3218 compresses, providing a first spring rate for the gas spring assembly 3210. In such embodiments, the pressure of the gas in the first chamber 3218 is communicated to the accumulator 3216 through the transfer conduit 3222. If the pressure of the gas communicated from the first chamber 3218 is below the initial pressure of the bladder 3226, the gas spring assembly 3210 will respond to the bump with the first spring rate. However, if the pressure of the gas communicated from the first chamber 3218 exceeds the initial pressure in the bladder 3226, then the bladder 3226 will compress, increasing the effective volume of the second chamber 320, which provides a second spring rate to the gas spring assembly 3210. The bladder 3226 thereby provides a softening of the suspension against heavy vertical loads.

In some such embodiments, a pump is coupled to the bladder 3226 to increase the initial pressure of the bladder 3226 and thereby increase the threshold amount of loading required to achieve compression of the bladder 3226, which would increase the loading required to initiate the second spring rate. Alternatively, gas may be released from the bladder 3226 to decrease the threshold. As such, the value of the initial pressure of the bladder 3226 may be set to achieve a desired responsiveness of the gas spring assembly 3210. The first and second spring rates reduce peak forces on the vehicle, improving the ride quality and durability of the vehicle. Tuning of the threshold facilitates adjustment of the response of the gas spring assembly 3210 depending upon a particular vehicle application.

According to an exemplary embodiment, the gas spring assembly further includes a sensor 3242 integrated with the gas spring assembly 3210 and configured to sense the relative configuration of the rod 3214 and cylinder 3212. In some embodiments, the sensor 3242 provides a signal (e.g., digital output) that is indicative of the ride height of the associated suspension system based upon the relative configuration of the rod 3214 and cylinder 3212. In contemplated embodiments, the sensor 3242 includes a linear variable differential transformer (LVDT), where a shaft of the LVDT extends through the cylinder 3212 to the rod 3214. As the rod 3214 and cylinder 3212 move relative to one another, the shaft of the LVDT provides a signal (e.g., inductive current) that is a function of the movement of the shaft.

Figure 84:
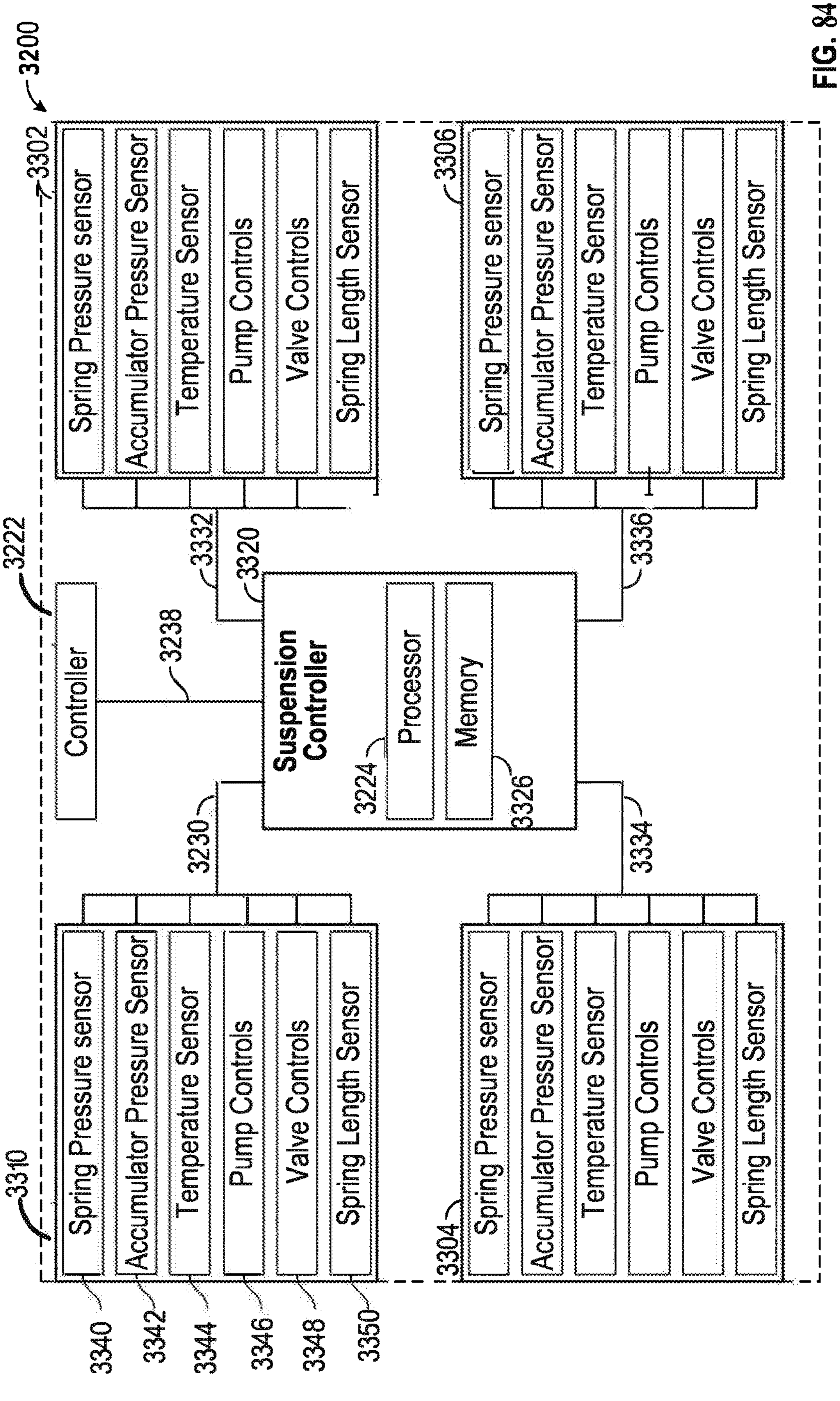
FIG. 84 is a detailed diagram of a vehicle suspension control system, according to an exemplary embodiment.
Figure 85:
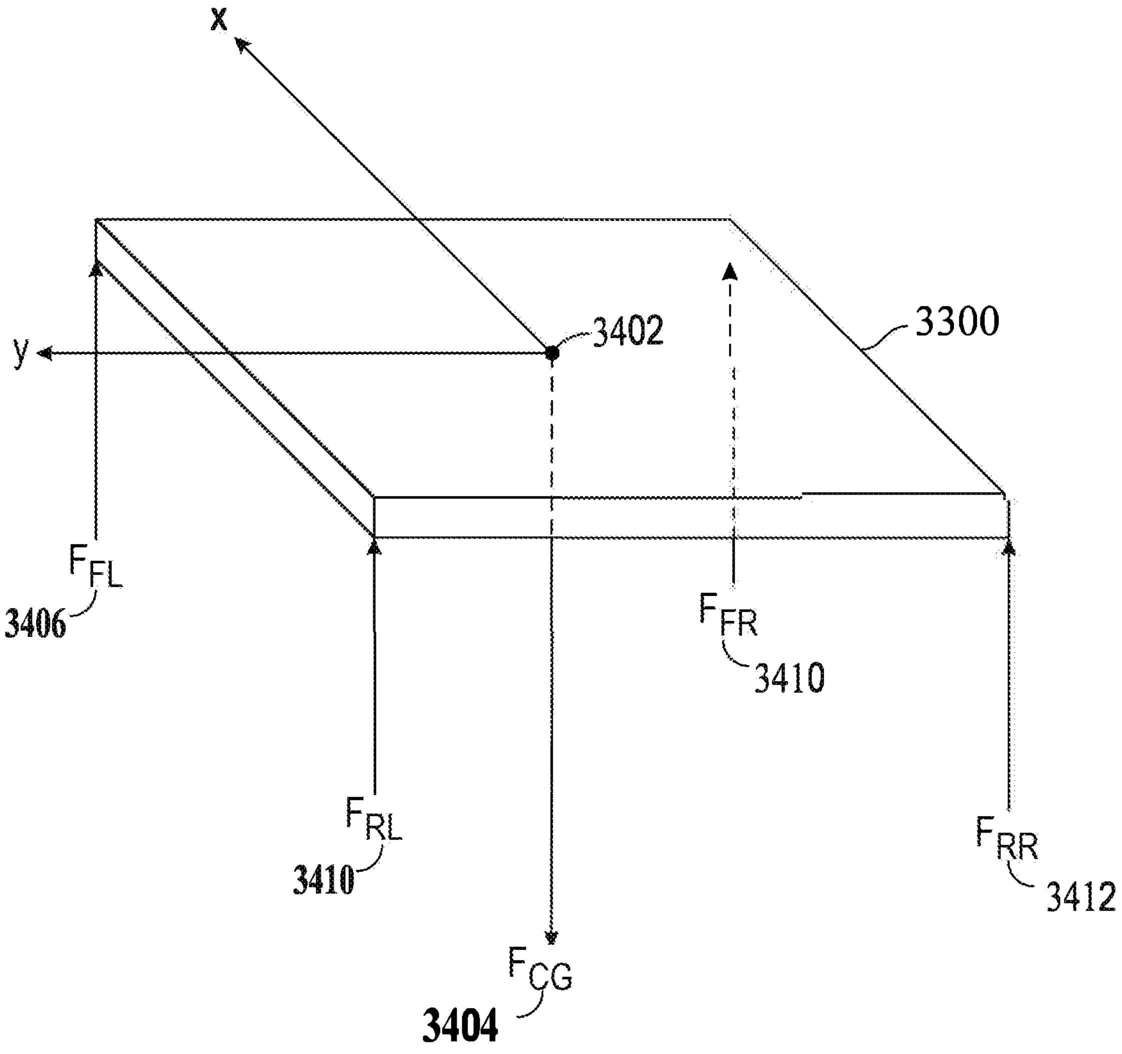
FIG. 85 is a force diagram of a vehicle, according to an exemplary embodiment.

Referring now to FIG. 84, a detailed diagram of a vehicle suspension control system is shown, according to an exemplary embodiment. Vehicle 3300 is shown to include gas spring assemblies 3210, 3302, 3304, and 3306. Although the vehicle suspension control system is shown to control four gas spring assemblies (e.g., two gas spring assemblies coupled to a front tractive assembly 40 and two gas spring assemblies coupled to a rear tractive assembly 42), it should be understood that the vehicle 85 may include any number of gas spring assemblies (e.g., four, six, eight, etc.) and that the vehicle suspension control system may provide associated control. Suspension controller 3320 communicates with spring assemblies 3210, 3302, 3304 and 3306 with data lines 3330, 3332, 3334, and 3336, respectively. Suspension controller 3320 also communicates with controller 3322 with data line 3338. Suspension controller 3320 includes processor 3324 and memory 3326. Data lines 3330, 3332, 3334, 3336, and 3338 may be any type of communications medium capable of conveying electronic data between suspension controller 3320 and spring assemblies 3210, 3302, 3304, 3306, and controller 3322. Data lines 3330, 3332, 3334, 3336, 3338 may be wired connections, wireless connections, or a combination of wired and wireless connections. In some embodiments, data lines 3330, 3332, 3334, 3336, 3338 are redundant connections. For example, data line 3330 may include two or more independent connections between suspension controller 3320 and spring assembly 3210. In another example, data line 3330 may include individual connections between suspension controller 3320 and the sensors and controls of spring assembly 3210 (e.g., spring pressure sensor 3340, valve controls 3348, etc.).

Spring assemblies 3210, 3302, 3304, 3306 each include sensor and control equipment coupled to data lines 3330, 3332, 3334, and 3336. For example, spring assembly 3210 may have a spring pressure sensor 3340, accumulator pressure sensor 3342, temperature sensor 3344, pump controls 3346, valve controls 3348, and spring length sensor 3350. Pump controls 3346 control the operation of one or more pumps and/or high- and/or low-pressure sources that provide pressurized gas to or from a gas spring and/or an accumulator in spring assembly 3210. Valve controls 3348 control one or more valves that regulate gas flow between the one or more pumps, the gas spring, and the accumulator. Spring pressure sensor 3340 measures the pressure in the gas spring of spring assembly 3210 and provides the measured data to suspension controller 3320 with data line 3330. Accumulator pressure sensor 3342 measures the pressure in the accumulator of spring assembly 3210 and provides the measured data to suspension controller 3320 with data line 3330. Spring assembly 3210 may also include temperature sensor 3344 within the accumulator of spring assembly 3210. Spring length sensor 3350 measures the current length of the gas spring in spring assembly 3210. In other embodiments, spring assemblies 3210, 3302, 3304, 3306 include any number of sensors and controls. For example, accumulator pressure sensor 3342 may include two or more pressure sensors to provide redundancy for the suspension system in vehicle 3300.

Suspension controller 3320 is also shown to communicate with controller 3322 with data line 3338. Controller 3322 may be one or more microprocessors that control non-suspension functions of vehicle 3300. For example, controller 3322 may control the timing of the engine in vehicle 3300, the electrical power sent to various lights in vehicle 3300, etc. or control any other non-suspension related electronic functions of vehicle 3300. In some embodiments, controller 3322 is separate from suspension controller 3320 and communicates with suspension controller 3320 with data line 3338. In other embodiments, suspension controller 3320 is a part of (or the same as) controller 3322.

Controller 3322 may also include circuitry that provides an interface for a user. For example, controller 3322 may communicate with a handheld computing device operated by a user, and the controller 3322 may display information to and/or receive input from the user via the handheld computing device. In other embodiments, controller 3322 may communicate with a user interface that includes one or more interactive devices (e.g., a touch-screen display, a keyboard, a mouse, voice-activated controls, etc.) and non-interactive devices (e.g., a monitor, a speaker, etc.) located within vehicle 3300. Controller 3322 provides the user interactive data to suspension controller 3320 with data line 3338 and receives data from suspension controller 3320 to be presented to a user. For example, a user may provide a preferred vehicle height to suspension controller 3320 with controller 3322 and/or view the current pressure for a given spring using data provided by suspension controller 3320 to a user display via controller 3322.

Referring now to FIG. 84, a force diagram of the vehicle suspension system of vehicle 3300 is shown, according to an exemplary embodiment. The wheels of vehicle 3300 experience resistance forces FFL 3406, FFR 3408, FRL 3410, and FRR 3412 from the ground, which correspond to the front left, front right, rear left, and rear right tires, respectively. Vehicle 3300 also has a center of mass (e.g., center of gravity) 3402 which provides downward force FCG 3404.

The suspension controller 3320 may control the suspension system of vehicle 3300 by calculating a target quantity of gas for each spring and controlling the valves and/or pumps in each spring assembly to achieve the target quantity. Suspension controller 3320 may calculate the target quantity of gas using a mass estimate for vehicle 3300 and a spring gas volume target at a target ride height. Ride height may correspond with a level or mostly level position for vehicle 3300. For example, each spring assembly of vehicle 3300 may provide equal spring lengths when vehicle 3300 is at rest on a flat surface. In real world operation, adjustment of the suspension of vehicle 3300 may not provide an entirely level position due to various environmental conditions (e.g., uneven terrain, friction, etc.). However, the effects of these environmental conditions may be mitigated using the gas law: PV=nRT where P is the spring pressure, V is the spring volume, n is the amount of gas, R is the universal gas constant approximately equal to 8.3114 J/(K*mol), and T is the measured temperature in Kelvin. The suspension controller 3320 may assume that the temperature of the gas inside each spring assembly does not change appreciably while adjusting the suspension system such that the amount of gas n is proportional to PV. Hereinafter, the amount of gas will be referred to as Q, where Q=PV and incorporates the constants T and R. In other embodiments, the suspension controller 3320 may account for the temperature change such that Q=PV/T. The suspension controller 3320 may estimate value of Q using data from pressure sensors, temperature sensors, volume sensors, or any other sensor in the suspension system of vehicle 3300. In one embodiment, Q is calculated using data from flow rate sensors without using data from pressure sensors. In other embodiments, Q is estimated using data from pressure sensors. The temperature T may be measured (e.g., using sensor 3344) prior to adjustment of the suspension. The temperature sensor 3344 may be located inside the accumulator 3216 or in the chamber 3218. The suspension controller 3320 may be configured to assume the temperature is the same on both sides of the bladder 3226. In other embodiments, temperature sensors 3344 may be located inside the accumulator 3216 and inside the chamber 3218.

Suspension controller 3320 may be configured to control the suspension system of vehicle 3300 by minimizing an error estimation calculated as error=$Q_{target}$−$Q_{current}$, where $Q_{target}$ and $Q_{current}$ are the target and current amounts of gas in the spring assembly 3210, respectively. Suspension controller 3320 may be configured to treat each spring assembly as a set of smaller volumes, such that $Q_{target}$ and $Q_{current}$ can be calculated from the sum of the amounts of gas in each individual volume. Although the term "minimizing" is used with respect to the error calculation throughout the present specification, it is to be understood that the error calculation is exemplary only and that suspension controller 3320 may perform any number of calculations to reduce the difference between the $Q_{target}$ value and the $Q_{current}$ value. In other embodiments, suspension controller 3320 may be configured to employ other control methods such as adaptive control, robust control, control methods that do not require the calculation of the actual mass, or any other control method.

Figure 86A:
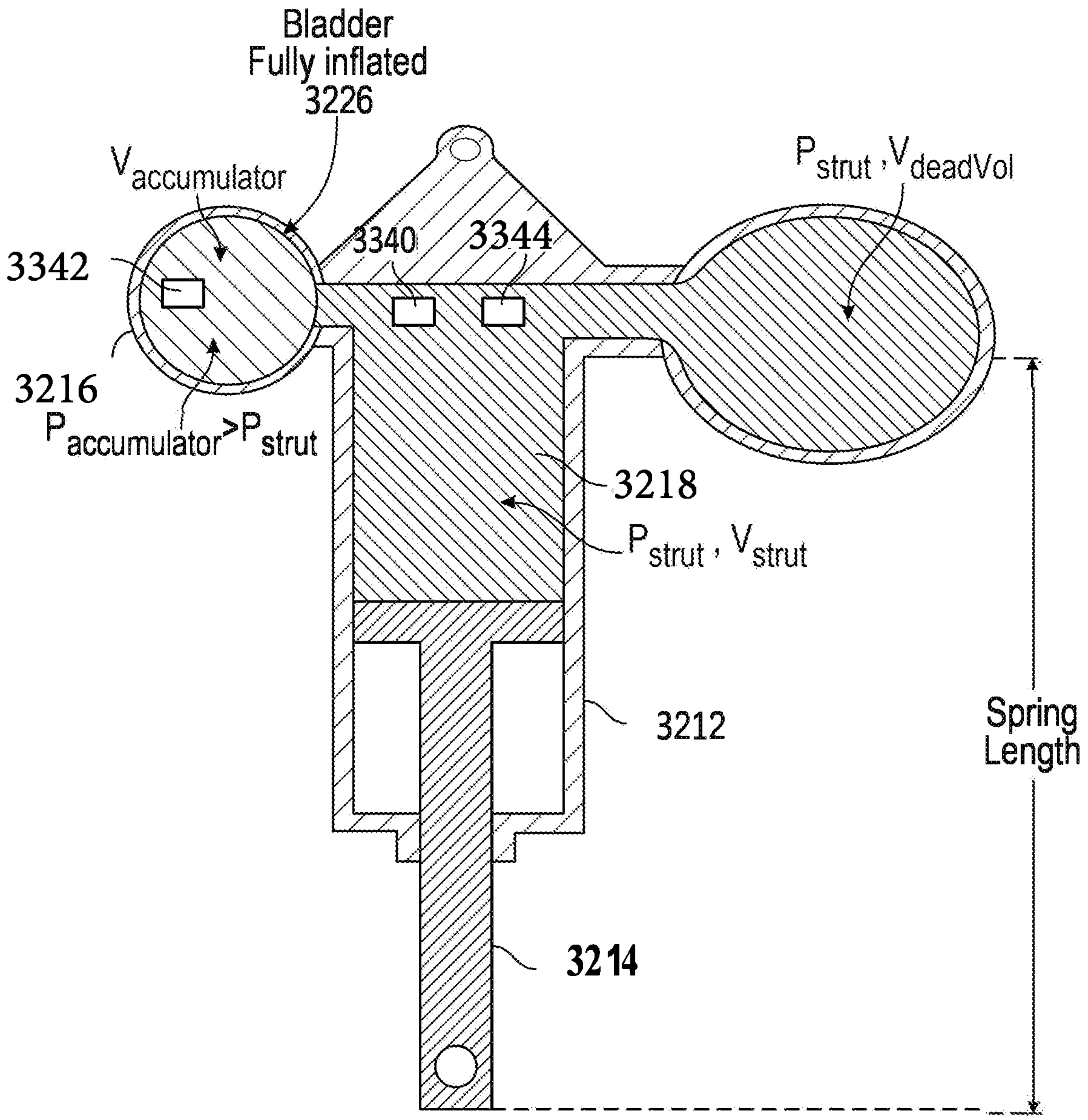
FIGS. 86A and 86B are detailed diagrams of a gas spring assembly, according to an exemplary embodiment.
Figure 86B:
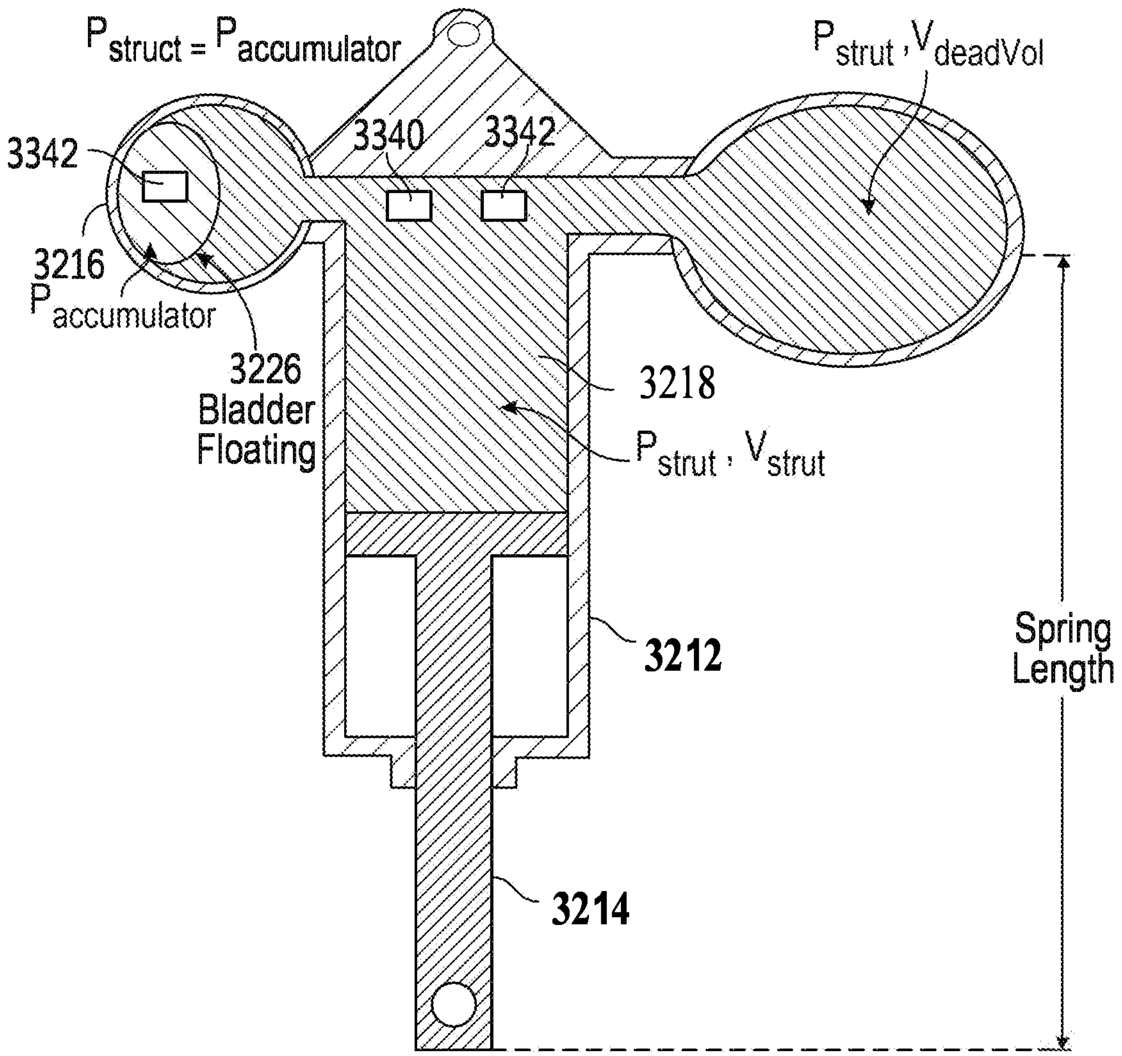

Referring now to FIGS. 86A and 86B, detailed diagrams of spring assembly 3210 are shown, according to an exemplary embodiment. Spring assembly 3210 is shown with accumulator 3216 not compressed (FIG. 86A) and compressed (FIG. 86B).

Suspension controller 3320 is configured to calculate overall gas volumes of each spring assembly, $V_{current}$ and $V_{target}$. $V_{current}$ corresponds to the current conditions of the vehicle 3300 and may be calculated using the internal geometry of the spring assembly 3210 and information from the various sensors. $V_{target}$ corresponds to the "ideal" conditions for vehicle 3300 and is calculated using the internal geometry of the spring assembly 3210 under these conditions. In another example, the target volume may be calculated using the geometry of spring chamber 3218, the geometry of accumulator 3216, and/or the geometry of flexible bladder 3226 at the target ride height. In some embodiments, $V_{target}$ is a fixed value and stored in the memory of suspension controller 3320. In other embodiments, $V_{target}$ may be one or more values that account for different desired heights or non-ideal conditions.

The suspension controller 3320 is configured to calculate volumes $V_{current}$ and $V_{target}$ using the internal geometry of the spring assembly. The volumes $V_{current}$ and $V_{target}$ have three smaller volumes: the volume of the accumulator $V_{accumulator}$, a dead volume $V_{deadVol}$, and the volume inside the chamber 3218 $V_{strut}$. In the calculation performed by the suspension controller 3320, the accumulator volume $V_{accumulator}$ corresponds to the fully inflated volume of the accumulator 3216 and is constant, regardless of the position of the bladder 3226. The dead volume $V_{deadVol}$ corresponds to a volume of gas present even at a minimum (i.e., fully compressed) spring length. The dead volume $V_{deadVol}$ includes the gas volume present in the chamber 3218 when spring is fully compressed and the volume of gas in various tubes that connect the chamber 3218 to other related components such as valves, etc. The suspension controller 3320 may be configured to treat the dead volume $V_{deadVol}$ as a constant. The volume $V_{strut}$ varies with spring length. In one embodiment, the suspension controller 3320 calculates $V_{strut}$ by multiplying the cross-sectional area of the chamber 3218 by the spring length as measured by the spring length sensor 3350. In another embodiment, corresponding values for spring length and $V_{strut}$ are stored in a lookup table in the memory 3326 of suspension controller 3320. The suspension controller 3320 may be configured to reference the lookup table in addition to the spring length as measured by the spring length sensor 3350 to determine $V_{strut}$.

Each volume ($V_{accumulator}$, $V_{deadVol}$, and $V_{strut}$) has an associated pressure ($P_{accumulator}$, $P_{deadVol}$, and $P_{strut}$, respectively). The suspension controller 3320 may be configured to assume that any flow restrictions between the dead volume and the spring chamber 3218 are negligible such that the pressure in the spring chamber 3218, $P_{strut}$, and the pressure in the dead volume, $P_{deadVol}$, are equal. The pressures in the accumulator 3216 and the spring chamber 3218 may differ from one another, however, due to the separation between the two volumes imposed by the bladder 3226. For the purposes of the calculations herein, the pressure in the volume $V_{accumulator}$ may be taken as the greater of the strut pressure $P_{strut}$ and a charge pressure of the accumulator 3216 $P_{charge}$. The charge pressure may be the uncompressed pressure of the accumulator 3216 and may be set by adding or removing gas on the side of the bladder 3226 opposite chamber 3218. In some embodiments, the charge pressure is set by a user prior to operation of the vehicle 3300. In other embodiments, the charge pressure is variable throughout operation of the vehicle (e.g., by control of a pump coupled to the accumulator 3216). In FIG. 86A, accumulator 3216 has not been compressed. The pressure in accumulator 3216 is greater than the pressure in spring chamber 3218 (e.g., $P_{accumulator}>P_{strut}$), and the accumulator pressure is the charge pressure (e.g., $P_{accumulator}=P_{charge}$). In FIG. 86B, accumulator 3216 is shown to be compressed. The pressure in the accumulator 3216 is equal to the pressure in the spring chamber 3218 (e.g., $P_{accumulator}=P_{strut}$). Regardless of the position of the bladder 3226, the pressure in the volume $V_{accumulator}$ will be uniform throughout. By way of example, if bladder 3226 is fully expanded, the pressure in the accumulator 3216 is greater than the pressure in the spring chamber 3218, and the pressure throughout volume $V_{accumulator}$ is pressure $P_{charge}$. By way of another example, if the bladder 3226 is compressed, the pressure on both sides of the bladder 3226 is the same.

The suspension controller 3320 is configured to calculate the amounts of gas $Q_{target}$ and $Q_{current}$ from the sum of the amounts of gas in each individual volume. The amount of gas in each individual volume be found by multiplying each individual volume ($V_{accumulator}$, $V_{deadVol}$, and $V_{strut}$) by its corresponding pressure ($P_{accumulator}$, $P_{deadVol}$, and $P_{strut}$, respectively). Utilizing the pressure relationships stated above, the controller is configured to calculate $Q_{current}=P_{strut,current}(V_{strut,current}+V_{deadVol})+\max(P_{charge}, P_{strut,current})V_{accumulator}$ and $Q_{target}=P_{strut,target}(V_{strut,target}+V_{deadVol})+\max(P_{charge}, P_{strut,target})V_{accumulator}$, where max (A,B) returns the greater of A and B. The suspension controller 3320 is configured to measure the current pressure $P_{strut,current}$ using the spring pressure sensor 3340. The suspension controller 3320 calculates the current volume $V_{strut,current}$ using the spring length value measured by the spring length sensor 3350. The dead volume $V_{deadVol}$ and accumulator volume $V_{accumulator}$ may be constants stored in memory 3326.

The suspension controller 3320 incorporates the max(A, B) term to account for the potential difference in pressure between the strut volume and the accumulator volume. Because of the bladder 3226, the accumulator volume may be the greater of the two pressures $P_{charge}$ and $P_{strut}$. The incorporation of the max(A,B) term facilitates adjusting the height of the vehicle 3300 regardless of whether the accumulator 3216 is compressed. Other controllers without this term do not account for the gas in the accumulator 3216, instead assuming the entire volume of the spring assembly has a consistent pressure. These controllers may not be able to adjust the height of the vehicle accurately when the accumulator 3216 is partially compressed. The value of pressure $P_{charge}$ may be provided by a user or measured by the accumulator pressure sensor 3342 when the accumulator 3216 is not compressed. If the pressure $P_{charge}$ is provided by a user, the vehicle 3300 may not include the accumulator pressure sensor 3342.

The suspension controller 3320 may be configured to determine the volume $V_{strut,target}$ using the desired suspension height. Each suspension height corresponds to a spring length depending on the geometry of the suspension system. The spring length may be used to calculate the strut volume as described above. The suspension controller 3320 may determine the desired suspension height from a variety of factors including, but not limited to, a user input, the location of the center of gravity of the vehicle 3300, and the desired ride height of the vehicle.

The pressure in the strut, $P_{strut}$, forces the rod 3114 out of the chamber and is proportional to the force delivered by the spring assembly. Suspension controller 3320 may calculate a target strut pressure, $P_{strut,target}$, for each spring assembly using a mass estimation for vehicle 3300. Suspension controller 3320 may simplify the calculation of the mass estimation. For example, a linear relationship may be assumed between spring pressures and tire contact forces. Certain geometric relationships in vehicle 3300 may additionally or alternatively be assumed to be uniform (e.g., front and rear track widths are identical, each suspension corner is identical in dimensions, etc.). Suspension controller 3320 may assume that the vehicle spring mass is only supported by gas pressure. This assumption does not hold true when the spring is at a travel range limit (e.g., the spring is fully compressed or fully extended). In such a case, suspension controller 3320 may adjust the spring away from the travel range limit to facilitate calculating the mass. In some embodiments, the adjustment away from the travel range limit is done without regard to a particular target spring length, since the mass estimation is calculable at any spring length that is not at a travel range limit. For example, the suspension may be lowered until it is no longer hitting rebound stops or raised until it is no longer hitting jounce bumpers. One skilled in the art would appreciate that any calculations presented herein can be modified accordingly to account for variations from these assumptions.

The suspension controller 3320 may estimate the mass of the vehicle 3300 using measured pressure information from each of the spring assemblies, from data provided by a user, or from another source. Using the estimated mass of the vehicle 3300, the suspension controller 3320 may then calculate $P_{strut,target}$ for each of the spring assemblies. The suspension controller may perform a force and moment balance on the vehicle 3300 in addition to applying other constraints on the target pressures for each of the spring assemblies to solve for $P_{strut,target}$. By way of example, in embodiments that include four spring assemblies, the suspension controller 3320 may require that a ratio of the pressure in the front spring assembly to the pressure in the rear spring assembly be equal on either side of the vehicle 3300. This is intended to minimize cross-loading (e.g., where the front left and rear right springs have a higher loading than the front right and rear left springs). By way of another example, in embodiments with two rear tractive assemblies 42, the suspension controller 3320 may balance the loading between the two rear tractive assemblies 42.

Cab Assembly

Front Cabin

Figure 87:
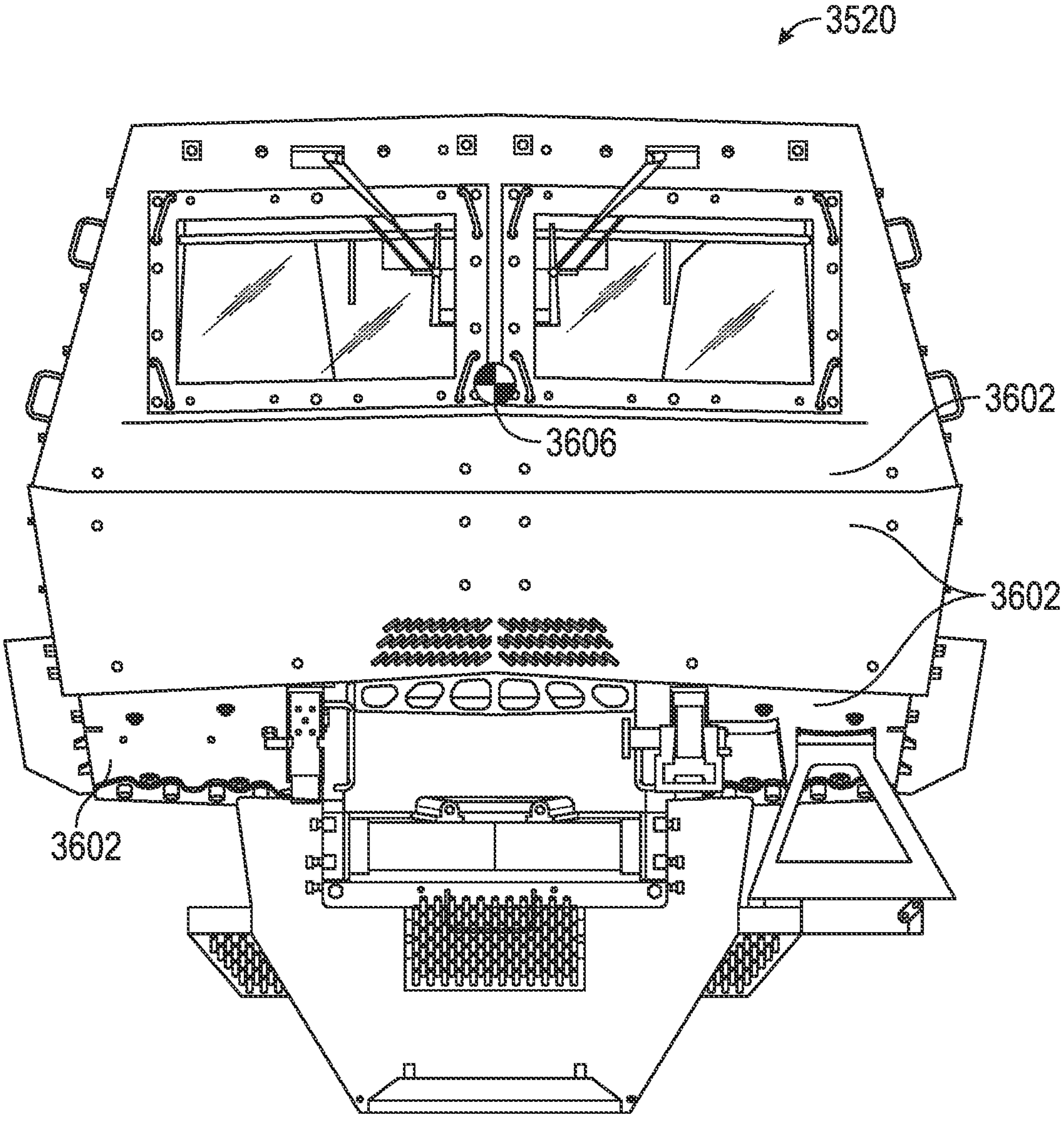
FIG. 87 is a front view of a front cabin of the vehicle of FIG. 1, according to an exemplary embodiment.
Figure 88:
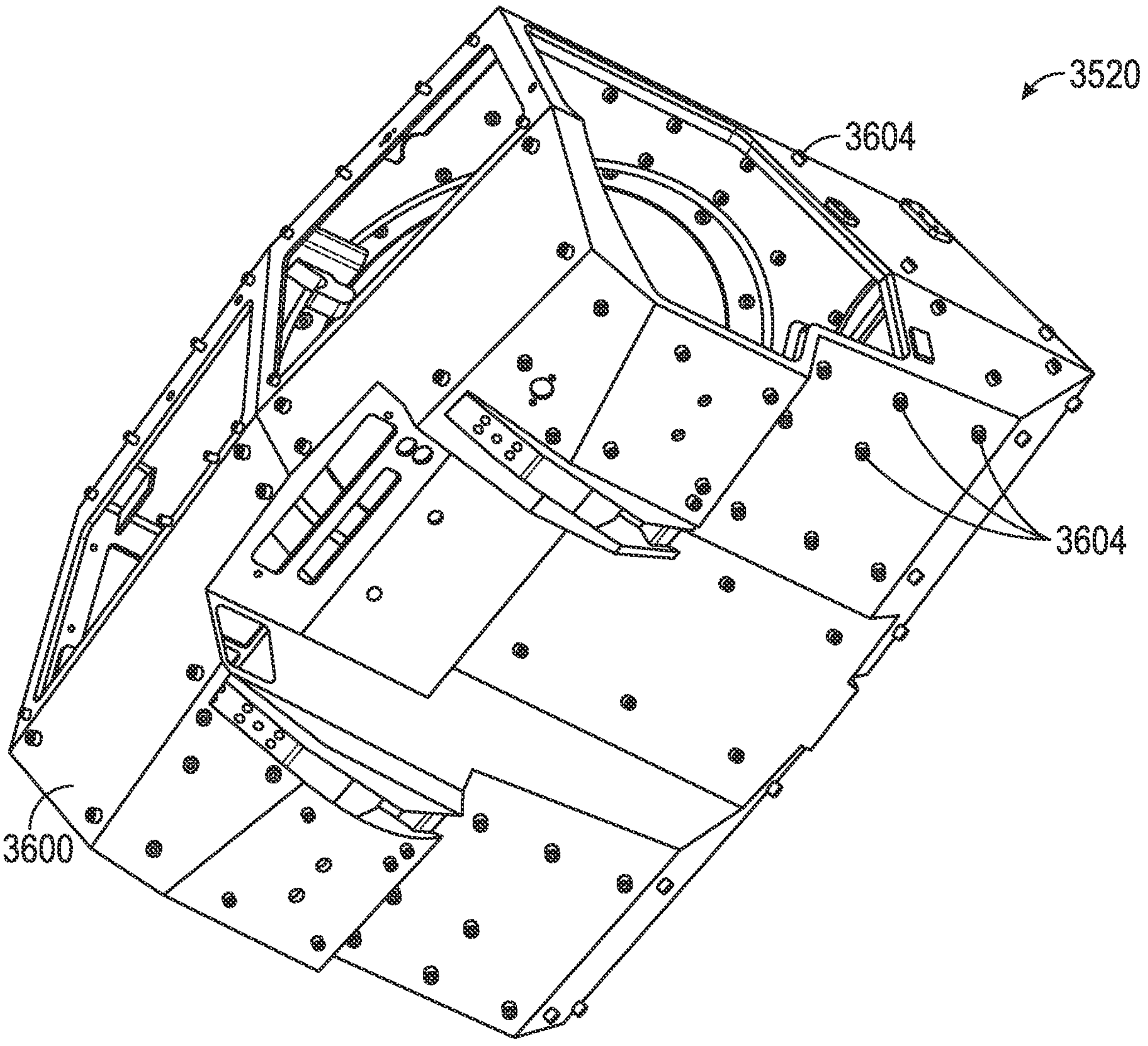
FIG. 88 is a bottom perspective view of the front cabin of FIG. 87.
Figure 89:
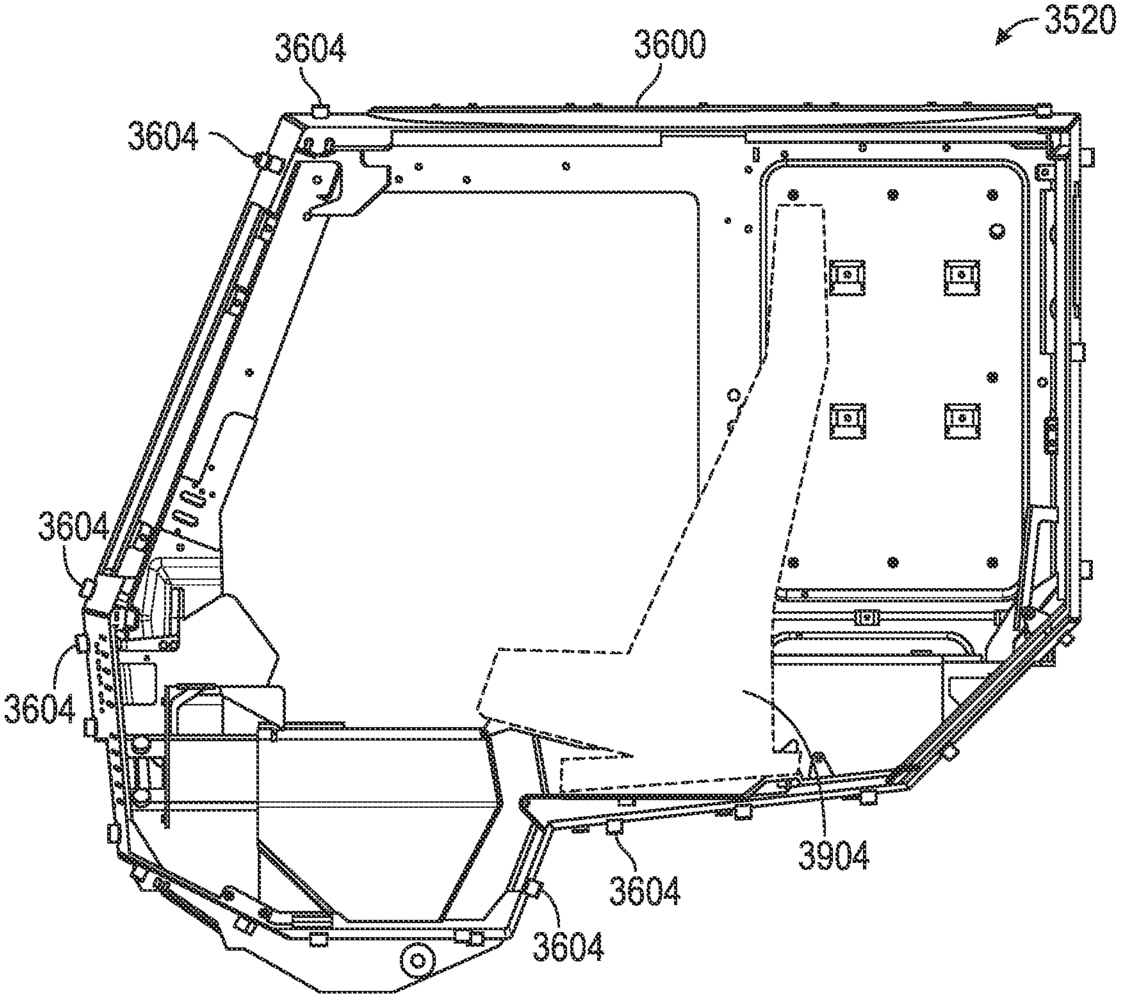
FIG. 89 is a side section view of the front cabin of FIG. 87.

Referring to FIGS. 87-89, the front cabin 3520 is shown. The front cabin 3520 is configured to contain one or more occupants (e.g., drivers, passengers, gunners, etc.). The front cabin 3520 may be reconfigured between an armored configuration and an unarmored configuration. With the front cabin 3520 in the unarmored configuration, the vehicle 3510 is configured to operate in an environment with minimal risk of a blast event (e.g., explosion) occurring. In the armored configuration, the front cabin 3520 is more heavily armored to afford a greater degree of protection to the occupants during a blast event. The front cabin 3520 includes a support structure, shown as frame 3600. In changing between the unarmored and armored configurations, one or more armor panels 3602 may be coupled to the frame 3600. In some embodiments, the armor panels 3602 are coupled to the frame 3600 through protrusions, shown as appurtenances 3604, extending outward from the frame 3600. The appurtenances 3604 may be located on some or all outer surfaces of the frame 3600, including the underside. The appurtenances 3604 may be threaded to accept bolts that pass through the armor panels 3602, coupling the armor panels 3602 to the frame 3600. The appurtenances 3604 may be fixedly coupled (e.g., welded) to the frame 3600 to facilitate assembly. Coupling the appurtenances 3604 to the frame 3600 when initially assembling the vehicle 3510 may facilitate more consistent installation of the armor panels 3602 than a conventional vehicle where the armor panels are welded to the vehicle after the initial assembly. Given that the armor panels 3602 are not present in the unarmored configuration, the front cabin 3520 may be substantially lighter in the unarmored configuration than in the armored configuration. The frame 3600 may be reinforced to support the weight of the armor panels 3602. Referring to FIG. 87, a center of gravity 3606 of the front cabin 3520 is shown. The center of gravity 3606 may be approximately laterally centered along the front cabin 3520.

Figure 90:
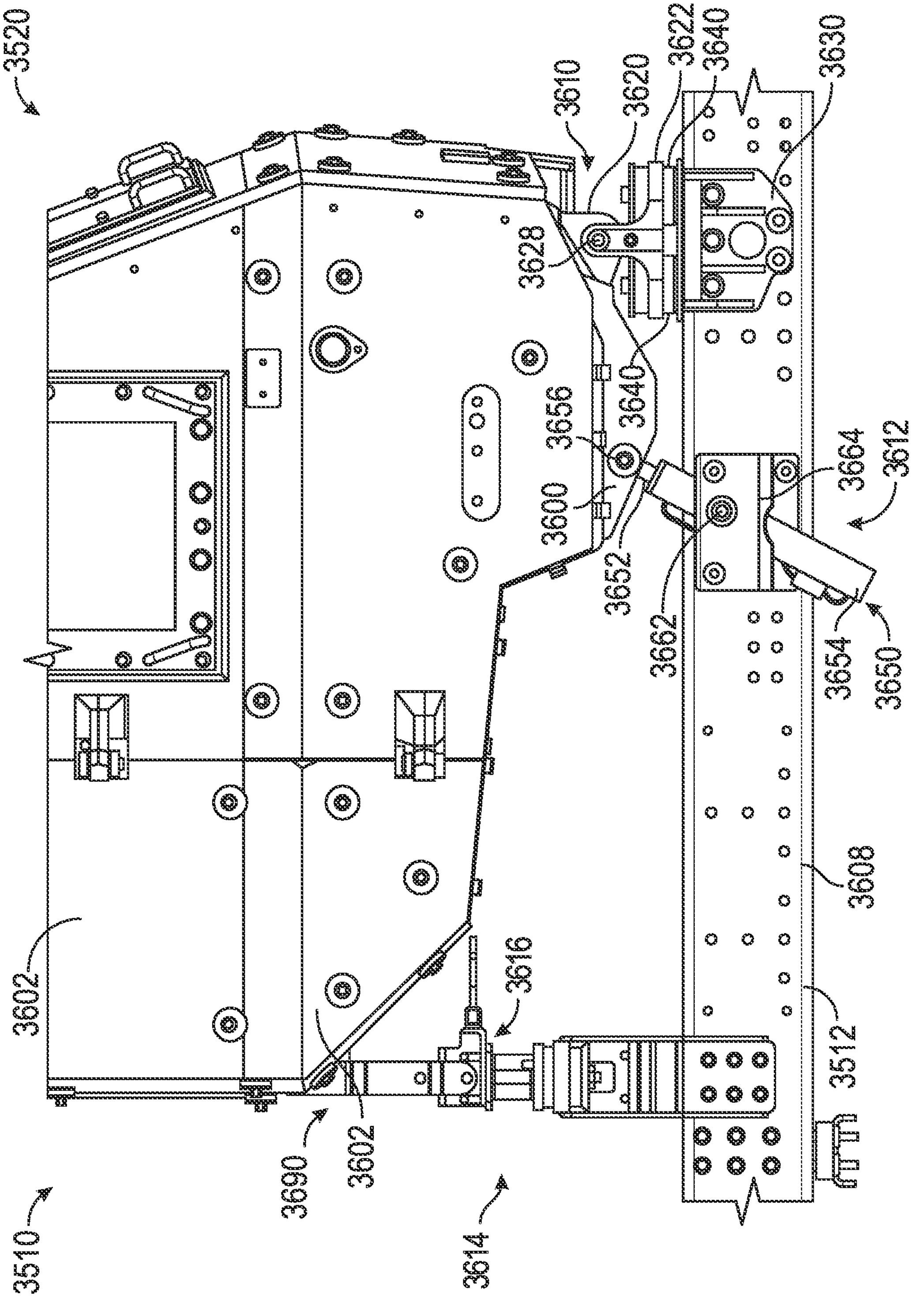
FIG. 90 is a side view of the front cabin of FIG. 87 and a frame of the vehicle of FIG. 1, according to an exemplary embodiment.
Figure 91:
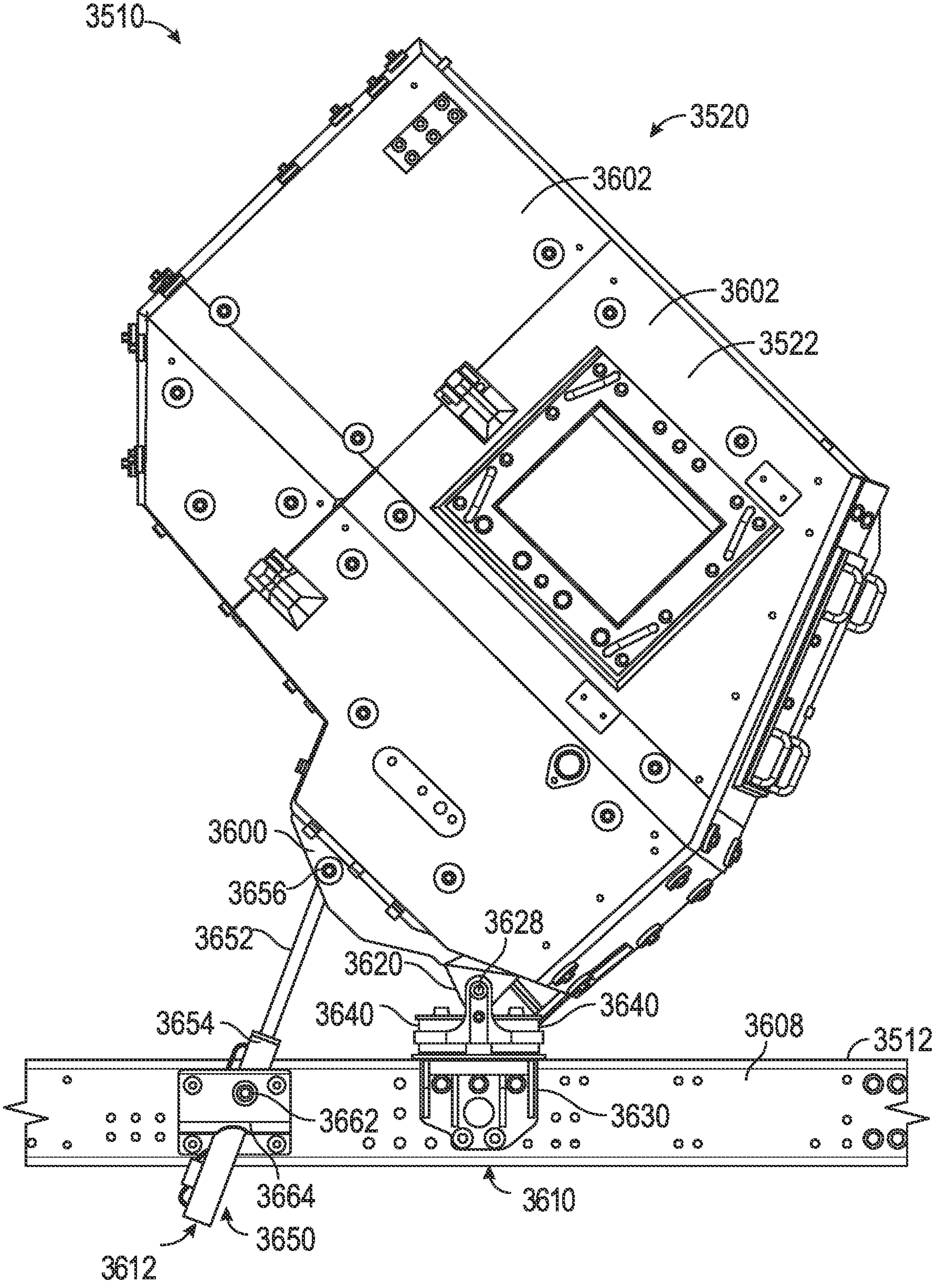
FIG. 91 is another side view of the front cabin of FIG. 87 and the frame of FIG. 90.

Referring to FIGS. 90 and 91, the front cabin 3520 is rotatably coupled to the frame 3512. Specifically, the front cabin 3520 is rotatably coupled to a pair of frame rails 3608 that extend longitudinally. A front end portion of the frame 3600 is rotatably coupled to the frame 3512 through a pivot mount 3610. The front cabin 3520 is rotatable between a use position, shown in FIG. 90, and a maintenance position, shown in FIG. 91. In the use position, the front cabin 3520 is oriented generally horizontally and configured to facilitate entrance into and egress from the vehicle 3510. In the maintenance position, the front cabin 3520 is rotated upwards, exposing components below the front cabin 3520 (e.g., the primary driver) to facilitate maintenance. An actuator assembly, shown as lift assembly 3612, is configured to move the front cabin 3520 between the maintenance and use positions. As the lift assembly 3612 extends, the front cabin 3520 is moved upwards, toward the maintenance position. The rear end portion of the front cabin 3520 is supported by a support structure, shown as rear support 3614. The rear support 3614 supports a portion of the weight of the front cabin 3520 in the use position. In some embodiments, the rear support 3614 includes a latch 3616 that selectively prevents rotation of the front cabin 3520 out of the use position. The vehicle 3510 may include pairs of frame rails 3608, pivot mounts 3610, lift assemblies 3612, and rear supports 3614 symmetrically located about a longitudinal centerline of the vehicle 3510 such that both the left and right sides of the front cabin 3520 are supported.

Referring to FIGS. 90-93, the pivot mount 3610 is shown according to an exemplary embodiment. The pivot mount 3610 includes a protrusion, shown as boss 3620, fixedly coupled to the frame 3600. The boss 3620 is pivotably coupled to a first mount or bracket, shown as bracket 3622. The bracket 3622 includes a plate 3624 that extends horizontally (i.e., parallel to a horizontal plane). A pair of protrusions 3626 extend vertically, perpendicular to a top surface of the plate 3624. The bracket 3622 may include one or more gussets or bracings that extend between the protrusions 3626 and the plate 3624, increasing the strength of the bracket 3622. The protrusions extend 3626 on either side of the boss 3620 and each define an aperture that corresponds with the aperture defined by the boss 3620.

A pin 3628 extends through the apertures in the boss 3620 and the protrusions 3626, defining a laterally-extending axis about which the front cabin 3520 pivots relative to the bracket 3622. As shown, the pin 3628 extends through one pivot mount 3610. In other embodiments, the pin 3628 extends across the full width of the vehicle 3510 and through a boss 3620 and a pair of protrusions 3626 of the other pivot mount 3610. The pivot mount 3610 further includes a retaining pin 3629 extending through an aperture in the pin 3628 and oriented approximately perpendicular to the pin 3628. The retaining pin 3629 is captured in place by a bolt extending through the retaining pin 3629 and into the bracket 3622. The retaining pin 3629 prevents rotational and sideways movement of the pin 3628, while still facilitating disassembly.

A second mount or bracket, shown as bracket 3630, includes a side plate 3632 fixedly coupled to a top plate 3634. The side plate 3632 extends along and is coupled to an outside vertical surface of the frame rail 3608. The top plate 3634 extends horizontally, extending partially along a top surface of the frame rail 3608. This improves the blast resistance of the vehicle 3510, as an explosion originating under the frame 3512 may cause the frame 3512 to move upward, pressing against the top plate 3634 and transferring the load into the pivot mount 3610. A series of ribs 3636 extend between the top plate 3634 and the side plate 3632, increasing the strength of the bracket 3630. A front plate 3638 may be coupled to the ribs 3636 and the top plate 3634 opposite the side plate 3632.

The bracket 3622 is coupled to the bracket 3630 by a pair of isolators 3640. Specifically, the isolators 3640 extend along a top surface of the bracket 3622 and directly between the bracket 3630 and the bracket 3622. The isolators 3640 may be made from rubber or another material that absorbs energy and elastically deforms under a compressive loading. In some embodiments, the isolator is made from a reinforced composite material. Accordingly, the isolators 3640 dampen any vibration passing from the frame 3512 into the front cabin 3520, stabilizing the front cabin 3520 and reducing road noise experienced by the occupants. The plate 3624 of the bracket 3622 and the top plate 3634 of the bracket 3630 each define a pair of corresponding apertures, through which a pair of fasteners 3642 pass. The isolators 3640 are arranged such that each fastener 3642 passes through one isolator 3640. The fasteners 3642 couple the isolators 3640 and the bracket 3622 to the bracket 3630, preventing the bracket 3622 from being lifted away from the bracket 3630. The isolators 3640 may be approximately symmetrically arranged longitudinally about the pin 3628. This symmetrical arrangement facilitates uniform loading of both of the isolators 3640, improving the vibration dampening, the stability, and the noise isolation of the pivot mount 3610. Additionally, this arrangement of the pivot mount 3610 facilitates the use of many of the same parts on both sides of the vehicle 3510, lessening the number of unique parts in the vehicle 3510.

Figure 93:
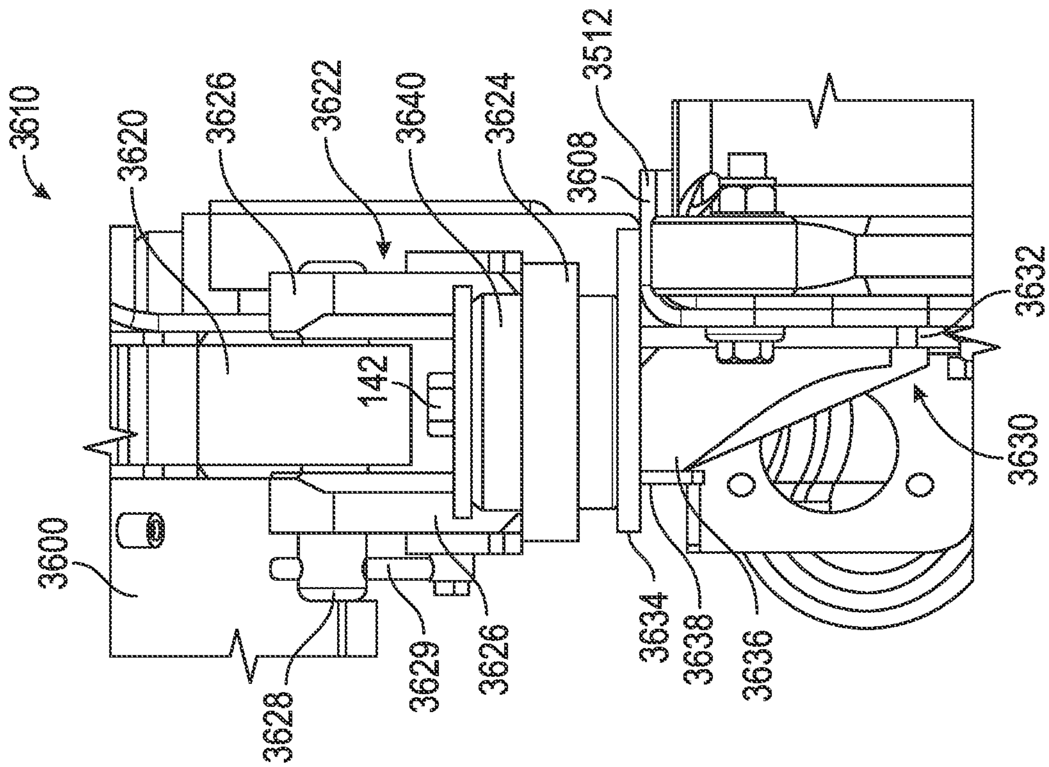
FIG. 93 is a front view of the pivot mount of FIG. 92, according to an exemplary embodiment.
Figure 92:
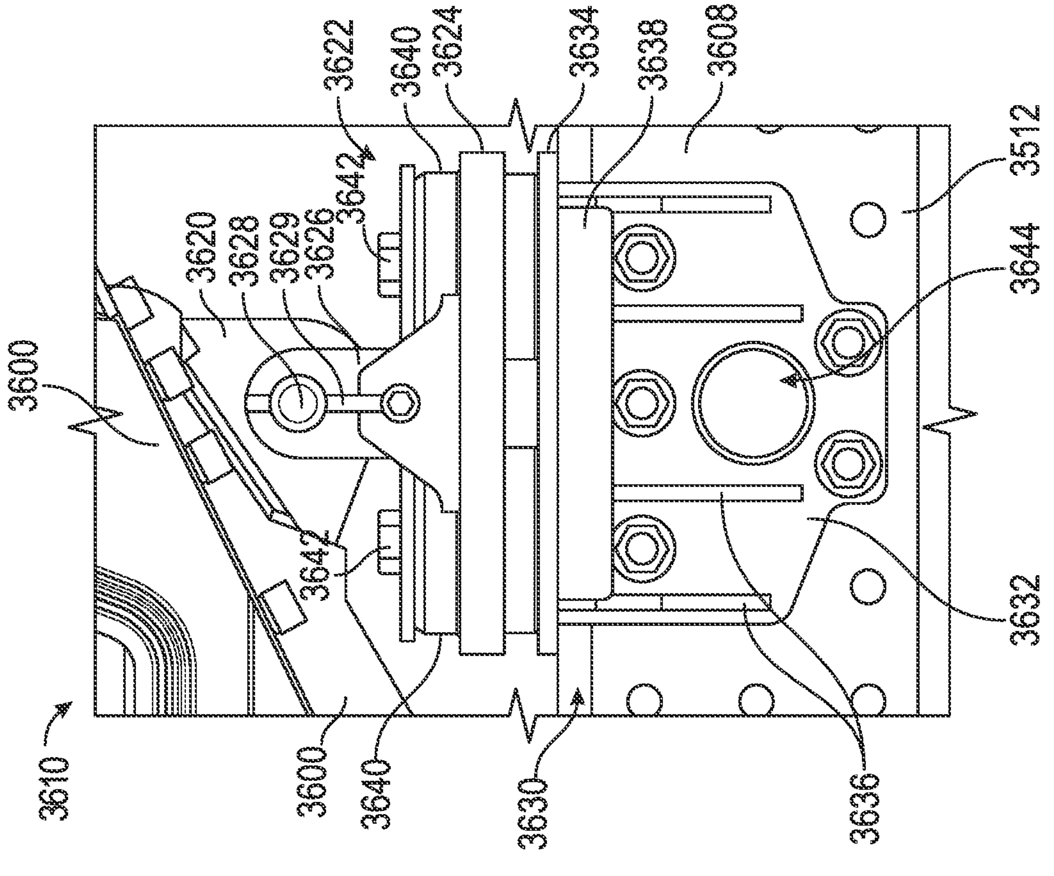
FIG. 92 is a side view of a pivot mount of the vehicle of FIG. 1, according to an exemplary embodiment.
Figure 98:
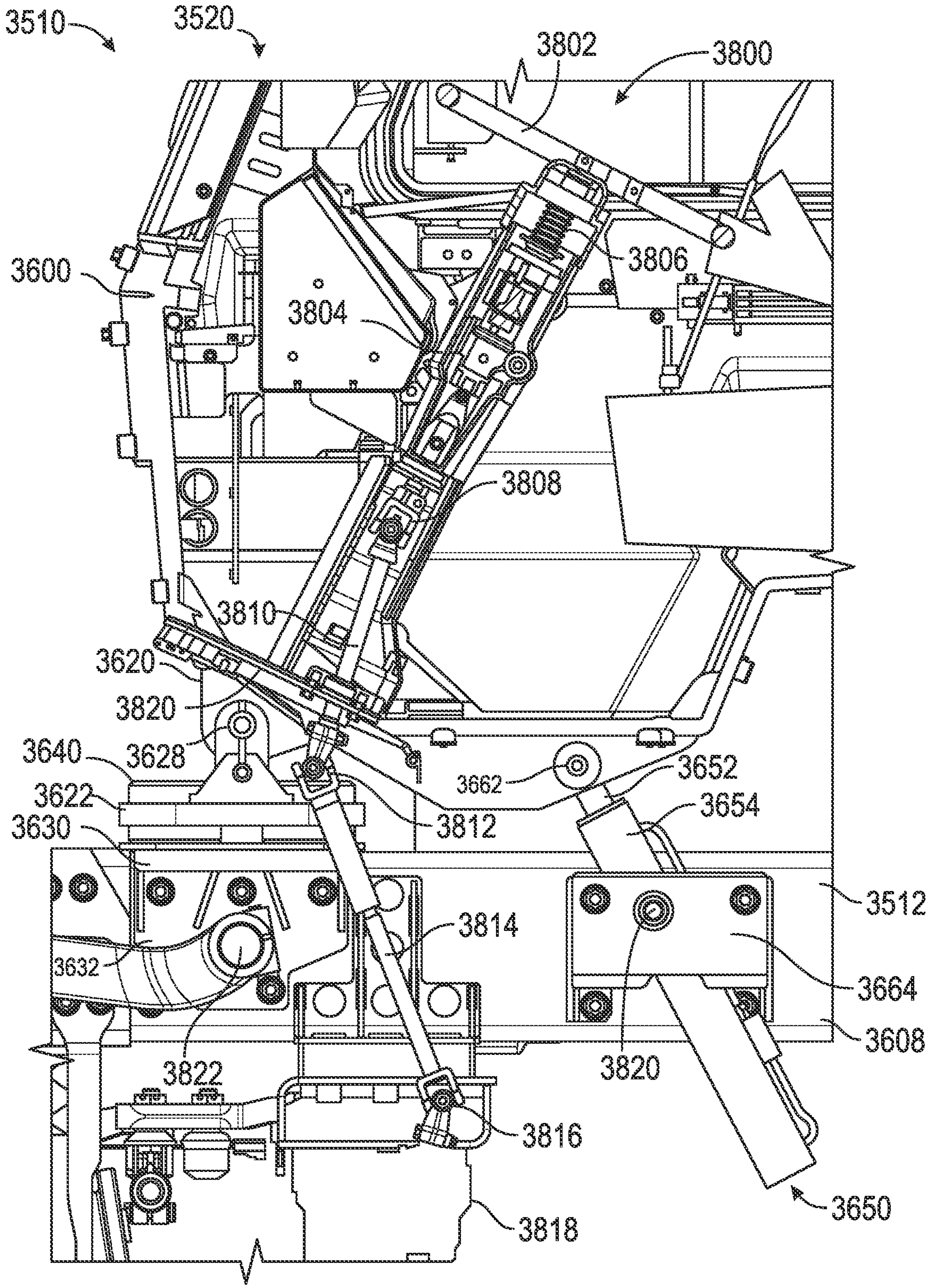
FIG. 98 is a section view of a steering assembly of the vehicle of FIG. 1, according to an exemplary embodiment.

Referring to FIGS. 92 and 93, the vehicle 3510 may include one or more protrusions, such as the anti-sway bar 3822 of FIG. 98, extending laterally outward from the frame 3512. Specifically, the front cabin 3520 is located such that the anti-sway bar 3822 is located directly beneath the axis about which the front cabin 3520 rotates (e.g., directly beneath the pin 3628). To prevent the anti-sway bar 3822 from interfering with the pivot mount 3610, the side plate 3632 defines an aperture 3644, through which the anti-sway bar 3822 extends. The aperture 3644 may be slightly larger than the diameter of the anti-sway bar 3822 to facilitate movement of the anti-sway bar 3822 relative to the pivot mounts 3610. As shown in FIG. 98, the side plate 3632 surrounds the anti-sway bar 3822, increasing the blast resistance of the pivot mount 3610. In a blast event, the anti-sway bar 3822 resists translation of the bracket 3630 (e.g., vertically, longitudinally, etc.) that would impart a shear force on the anti-sway bar 3822. The side plate 3632 is additionally shaped to avoid other components on the surface of the frame 3512. In other embodiments, a portion of the bracket 3630 is cut away such that the side plate 3632 does not surround the anti-sway bar 3822.

Referring to FIGS. 92 and 93, the isolators 3640 are positioned atop the top plate 3634 of the bracket 3630. This facilitates clearance of other components below the top plate 3634. In other embodiments, the isolator 3640 extends along a top surface and a bottom surface of the top plate 3634. Each isolator 3640 may be split (e.g., formed in two separate pieces) to facilitate placement on either side of the top plate 3634 or the plate 3624 during assembly.

In other embodiments, the front cabin 3520 is otherwise pivotably coupled to the frame 3512. By way of example, a side plate may be coupled to the frame rail 3608. A middle link may be pivotably coupled to both the side plate and the boss 3620 (e.g., with pins). The middle link may then rest atop an isolator that is coupled to a top surface of the frame rail 3608.

Figure 94:
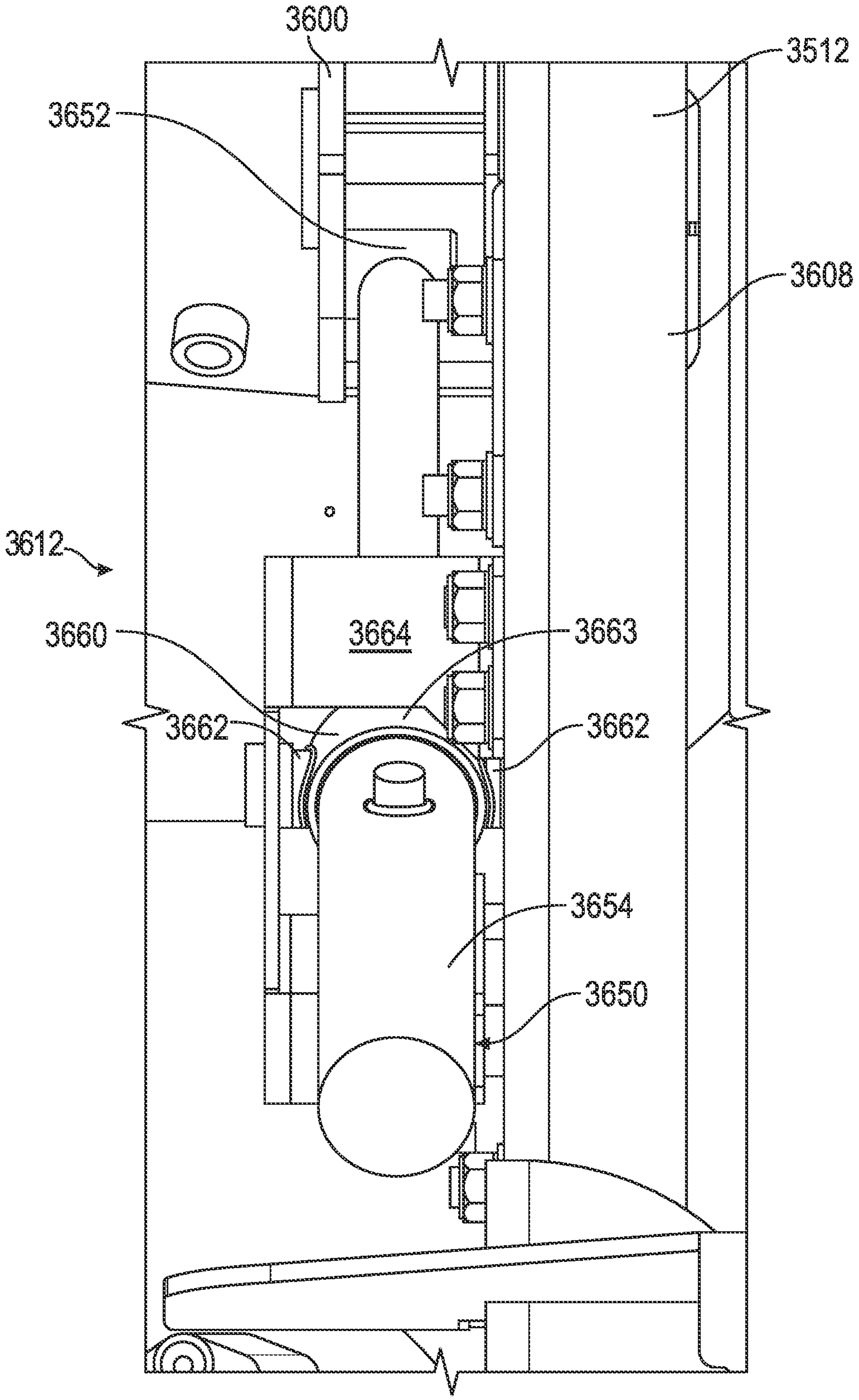
FIG. 94 is a bottom view of a lift assembly of the vehicle of FIG. 1, according to an exemplary embodiment.
Figure 96:
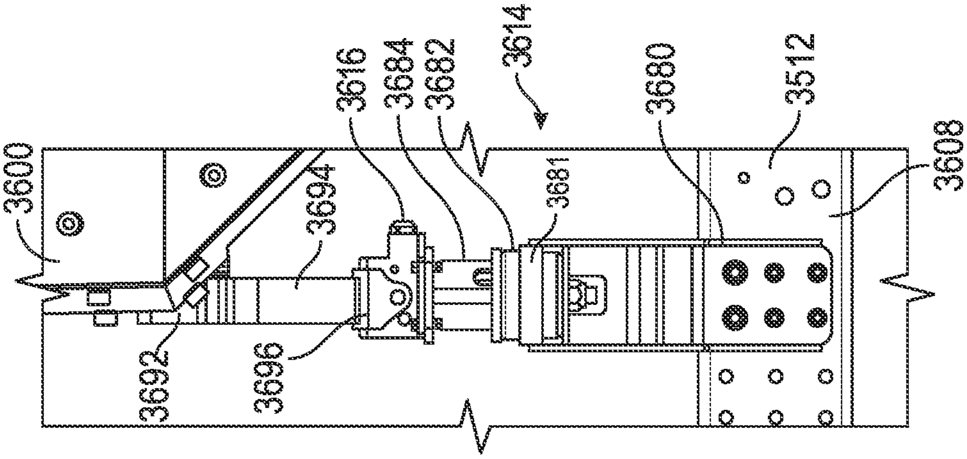
FIG. 96 is a side view of one of the rear supports and the bridge support of FIG. 95, according to an exemplary embodiment.
Figure 95:
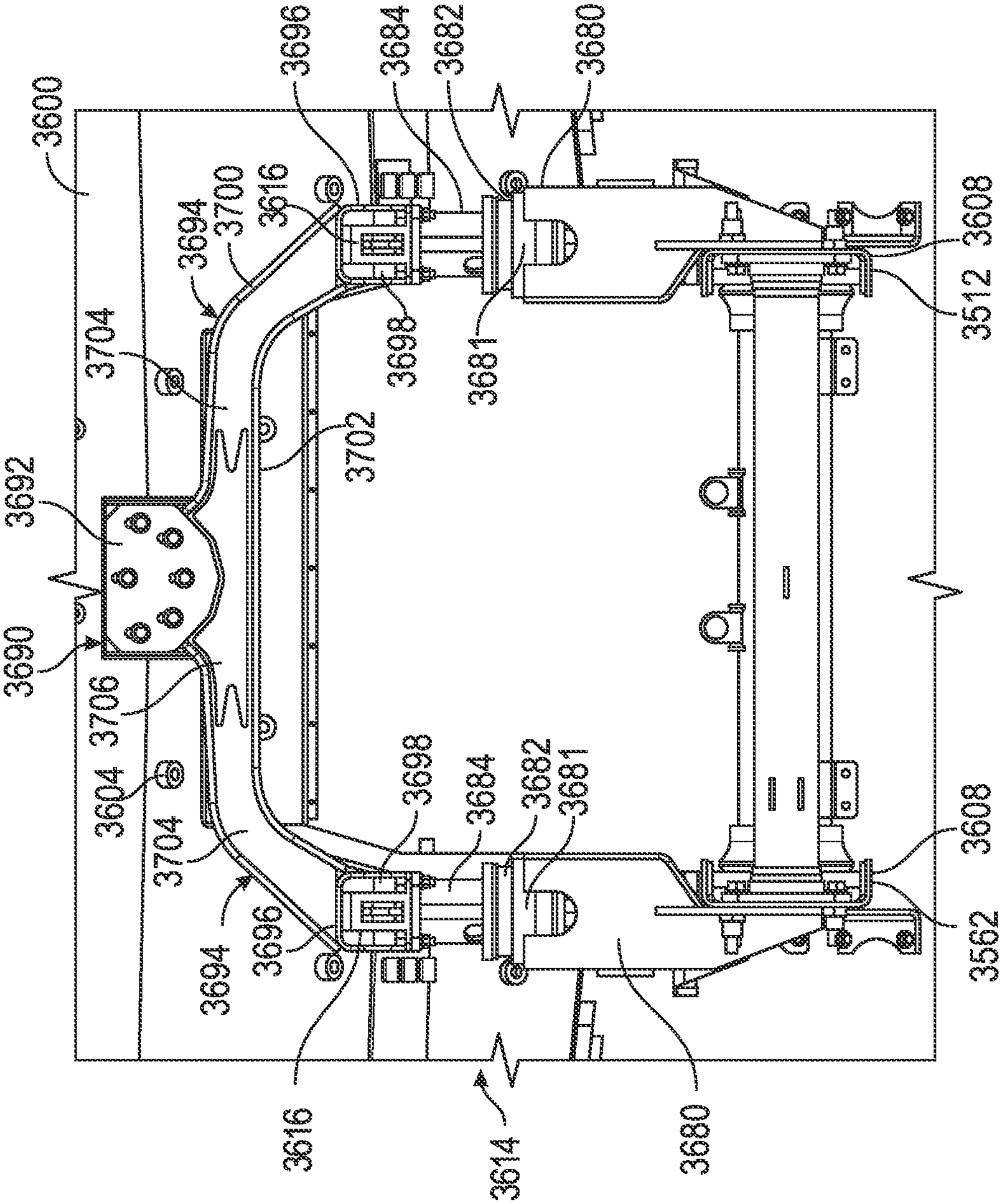
FIG. 95 is a rear view of a pair of rear supports and a bridge support of the vehicle of FIG. 1, according to an exemplary embodiment.

Referring to FIGS. 90, 91, and 94, the lift assembly 3612 is shown according to an exemplary embodiment. The lift assembly 3612 includes a linear actuator, shown as hydraulic cylinder 3650. The hydraulic cylinder 3650 includes a rod 3652 and a cylinder body 3654, and as the hydraulic cylinder 3650 extends, the rod 3652 extends from the cylinder body 3654. The hydraulic cylinder 3650 may be single or double acting. The vehicle 3510 may include valves, pumps, reservoirs, and/or other hydraulic components required to actuate the hydraulic cylinder. In other embodiments, the hydraulic cylinder 3650 is instead an electrically or pneumatically powered actuator.

An end of the rod 3652 is pivotably coupled to the underside of the frame 3600 by a pin 3656. The frame 3600 may include a pair of bushings or bearings configured to receive the pin 3656. The pin 3656 may be spaced rearward from the pin 3628 of the pivot mount 3610 to improve the mechanical advantage of the hydraulic cylinder 3650 and reduce the force required to rotate front cabin 3520. Portions of the front cabin 3520 may be arranged to accommodate the locations of the bushings. The hydraulic cylinder 3650 includes a trunnion mount 3660 disposed partway along the length of the cylinder body 3654. The trunnion mount 3660 includes a pair of round protrusions 3662 extending laterally from opposite sides a collar 3663, which encircles and is coupled to the cylinder body 3654. One protrusion 3662 is received by an aperture defined in the side of the frame rail 3608, and the other protrusion 3662 is received by a mount or bracket 3664. The bracket 3664 is coupled to a vertical outside surface of the frame rail 3608 and at least partially surrounds the hydraulic cylinder 3650. The bracket 3664 and/or the frame rail 3608 may include bushings or bearings that receive the protrusions 3662. The trunnion mount 3660 facilitates spacing the hydraulic cylinder 3650 away from the rail of the frame 3512 such that other components may extend between the hydraulic cylinder 3650 and the rail of the frame 3512.

The hydraulic cylinder 3650 is configured to pivot about a lateral axis extending through the center of both protrusions 3662. Hydraulic fluid may be pumped into an extension chamber of the hydraulic cylinder 3650 to extend the hydraulic cylinder 3650, rotating the front cabin 3520 toward the maintenance position. The hydraulic cylinder 3650 applies a force about the axis of rotation of the front cabin 3520 (e.g., defined by the pins 3628) on an effective lever or moment arm extending perpendicular to the hydraulic cylinder 3650. The trunnion mount 3660 facilitates having a much longer effective lever arm than an arrangement where a cap end (i.e., an end opposite the rod 3652) of the cylinder body 3654 is coupled to the frame rail 3608, as it facilitates lowering the cylinder body 3654. A longer effective lever arm reduces the required hydraulic pressure to lift the front cabin 3520, facilitating the front cabin 3520 being much heavier (e.g., due to added armor) without compromising the cabin lifting performance of the hydraulic cylinders 3650. When returning the front cabin to the use position, the weight of the front cabin 3520 applies a compressive force on the hydraulic cylinder 3650, forcing fluid out of the extension chamber. Alternatively, the hydraulic cylinder 3650 may be double acting, and the retraction of the hydraulic cylinder 3650 may be powered.

Referring to FIGS. 90, 91, 95, and 96, the rear support 3614 is shown according to an exemplary embodiment. The rear support 3614 may be configured to support the loading caused by the addition of armor panels, mounted guns, and/or other components to the front cabin 3520. The rear support 3614 includes a bracket 3680 coupled to an outer vertical surface of the frame rail 3608. The bracket 3680 extends upwards, terminating in a horizontal plate 3681. A portion of the rear support 3614 extends directly above the frame rail 3608, increasing the blast resistance of the rear support to an explosion originating under the vehicle 3510. An isolator 3682, which may be substantially similar to the isolators 3640, extends both above and below the horizontal plate 3681 of the bracket 3680. A bracket, shown as extension 3684, is coupled to a top surface of the isolator 3682. In some embodiments, a fastener extends through the isolator 3682, the horizontal plate 3681, and a portion of the extension 3684, coupling the isolator 3682, the bracket 3680, and the extension 3684 together. The height of the extension 3684 may vary depending on the distance between the frame rail 3608 and the front cabin 3520 and the sizes of the other components in the rear support 3614. A latch 3616 is coupled to the top end portion of the extension 3684. The latch 3616 may be one or more of electrically, hydraulically, pneumatically, or passively actuated.

The frame 3600 is coupled to a support, shown as a bridge support 3690. The bridge support 3690 includes a main body 3692 and a pair of arms 3694 extending laterally outward from the main body 3692. The main body 3692 may be fastened to the rear of the frame 3600 and positioned along the longitudinal centerline of the vehicle 3510. The arms 3694 extend laterally outward and then downwards, defining a space between the vertically-extending portions of the arms 3694. The space may facilitate a lower position of the front cabin 3520 when other components (e.g., the primary driver) would otherwise interfere with the bridge support 3690. The arms 3694 terminate in a bracket, shown as a foot 3696, that forms a downward-opening U shape. A latch bolt is coupled to and extends horizontally through the foot 3696, passing across the opening of the foot 3696. Each latch bolt 3698 is configured to be received by the latch 3616 of one of the rear supports 3614. When the front cabin 3520 moves from the maintenance position to the use position, the latch bolts 3698 are received by the latches 3616, locking the front cabin 3520 in the use position. In order to move the front cabin 3520 from the use position to the maintenance position, the latches 3616 may be disengaged to release the latch bolts 3698, allowing the hydraulic cylinders 3650 to extend.

The arms 3694 of the bridge support 3690 may include an upper plate 3700, a lower plate 3702, and one or more web plates 3704 extending between the upper plate 3700 and the lower plate 3702. In some embodiments, the lower plates 3702 of the arms 3694 are integrally formed from a single plate. The arms 3694 may include multiple web plates 3704 that are spaced apart such that a cavity is formed inside the bridge support 3690. The upper plates 3700 and the web plates 3704 are coupled to the main body 3692. The bridge support 3690 includes a rib 3706 extending between the upper plates 3700, the main body 3692, and the lower plates 3702. The rib 3706 may be located between or outside of the web plates 3704. This rib 3706 increases the strength of the bridge support 3690 to facilitate supporting more weight with the front cabin 3520. The lengths of the main body 3692 and the vertical portions of the arms 3694 may be varied to facilitate clearance around other components (e.g., the primary driver, armor panels 3602, etc.). The distance between the upper plates 3700 and lower plate 3702 may be increased to increase the strength of the bridge support 3690. In other embodiments, the main body 3692 may extend down to meet the lower plate 3702.

In an alternative embodiment, the arms 3694 of the bridge support 3690 are pivotably coupled to the main body 3692. By way of example, the main body 3692 may define a first longitudinally-extending aperture. The arms 3694 may form a single structure separate from the main body 3692 and defining a second longitudinally-extending aperture. A pin may extend through both apertures, pivotably coupling the main body 3692 to the arms 3694. This facilitates pivoting of the arms 3694 to accommodate uneven loading, reducing bending stresses on the front cabin 3520.

In other embodiments, the rear supports 3614 each include a linear actuator, such as a hydraulic cylinder, that extends between the bracket 3680 and the latch 3616. The linear actuator may be arranged vertically such that a rod of the linear actuator extends upwards. The linear actuators may be extended upward to apply a lifting force on the front cabin 3520. The linear actuators may also be extended or retracted to adjust the orientation of the front cabin (e.g., such that the front cabin is made level). When the front cabin 3520 is moved from the use position to the maintenance position, the latches 3616 may release the latch bolts 3698, and the linear actuators may be extended. The extension of the linear actuators would facilitate movement of the front cabin 3520 under high loads (e.g., when the front cabin 3520 is armored) or when the lift assemblies 3612 have relatively short effective lever arms. The linear actuators and the hydraulic cylinders 3650 may be timed relative to one another (e.g., made to operate in a certain sequence) to maximize the effectiveness of the linear actuators.

Figure 97:
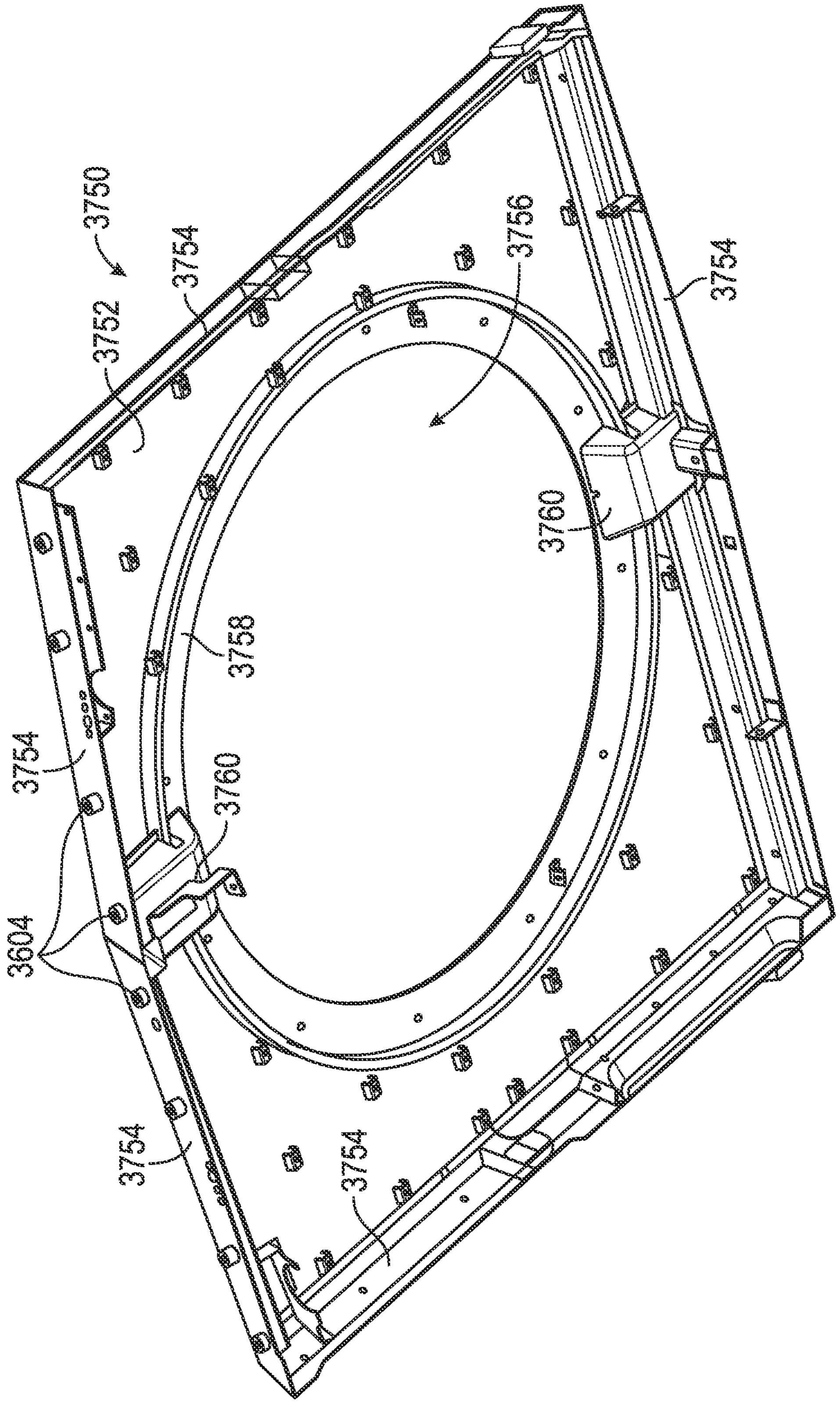
FIG. 97 is bottom perspective view of a roof of the front cabin of FIG. 87, according to an exemplary embodiment.

Referring to FIG. 97, a roof 3750 of the frame 3600 of the front cabin 3520 is shown according to an exemplary embodiment. The roof 3750 includes a plate, shown as a top plate 3752, that defines a top surface of the frame 3600. A number of flanges 3754 extend downward from the top plate 3752, facilitating a coupling of the top plate 3752 to the walls of the front cabin 3520. Some of the flanges 3754 may include extensions to which weapons (e.g., rifles) may be secured. An aperture 3756 is defined near the center of the top plate 3752. A turret ring 3758 is coupled to the top plate 3752 and extends along the outside of the aperture 3756. The turret ring 3758 is supported by a pair of bosses 3760 extending from the flanges 3754 towards the turret ring 3758. Specifically, a first boss 3760 extends from the front end of the roof 3750 to the turret ring 3758 and a second boss 3760 extending from the rear end of the roof 3750 to the turret ring 3758. In other embodiments, the roof 3750 includes more or fewer bosses 3760 and/or gussets or ribs to strengthen the roof 3750. The turret ring 3758 is incorporated into the structure of the roof 3750, stiffening the roof 3750. This facilitates having fewer components disposed beneath the top plate 3752, increasing the headroom inside of the front cabin 3520. The turret ring 3758 is positioned close enough to the top plate 3752 to facilitate clearance between the turret ring 3758 and any rifles secured to the roof 3750. The turret ring 3758 may serve as a bearing surface for a turret (e.g., a gun turret, the turret assembly 4110) mounted to the roof 3750. The aperture 3756 and the turret ring 3758 may be of sufficient diameter (e.g., greater than shoulder width) to facilitate access to the turret from the interior of the front cabin 3520. By way of example, the aperture 3756 may be larger than a torso of an operator.

In an alternative embodiment, the roof 3750 includes a central top 3752 plate and a series of top plates 3752 angled upward toward the central top plate 3752. The angled top plates 3752 are coupled to the central top plate 3752 on one side and to the flanges 3754 on the opposite side. The central top plate 3752 define the aperture 3756 and receive the turret ring 3758. The angled top plates 3752 plates are angled slightly upward (e.g., 90 degrees, 95 degrees, etc.). This arrangement facilitates the deflection of bullets off of the angled top plates 3752, increasing the protection afforded by the vehicle 3510.

Referring to FIG. 98, a steering system 3800 of the vehicle 3510 is shown. The steering system 3800 includes a steering wheel 3802 coupled to a steering column 3804, a first shaft 3806, a first universal joint 3808, a second shaft 3810, a second universal joint 3812, a third shaft 3814, a third universal joint 3816, and a steering box 3818, each coupled to one another in series. Turning the steering wheel 3802 rotates the universal joints and the shafts, which in turn rotates an input to the steering box 3818. The steering box 3818 actuates the other steering components of the vehicle 3510 to steer the vehicle 3510 in response to an input to the steering wheel 3802. The shafts and the steering column 3804 may be arranged to minimize the angular displacement of the universal joints. The second universal joint 3812 facilitates rotation of the front cabin 3520 relative to the frame 3512. A bulkhead panel 3820 is located partially along the length of the second shaft 3810. The bulkhead panel 3820 supports the second shaft 3810 while still facilitating uninhibited rotation of the second shaft 3810. The bulkhead panel 3820 seals the front cabin 3520 around the second shaft 3810, increasing the blast resistance of the front cabin 3520. Additional bulkhead panels may be utilized for other components (e.g., wires, hydraulic lines, etc.). In some embodiments, a wire will terminate at a bulkhead panel in an electrical connector, which is in turn connected to a wire on the interior of the front cabin 3520, further increasing the blast resistance of the front cabin 3520. An anti-sway bar 3822 is rotatably coupled to the frame 3512. The anti-sway bar 3822 extends through the aperture 3644 defined in the bracket 3630. The anti-sway bar 3822 is coupled to opposing ends of the front tractive assembly 40 and opposes vertical motion of one of the frontmost tractive elements 44 relative to the other of the frontmost tractive elements 44.

Seat Arrangement

Figure 99:
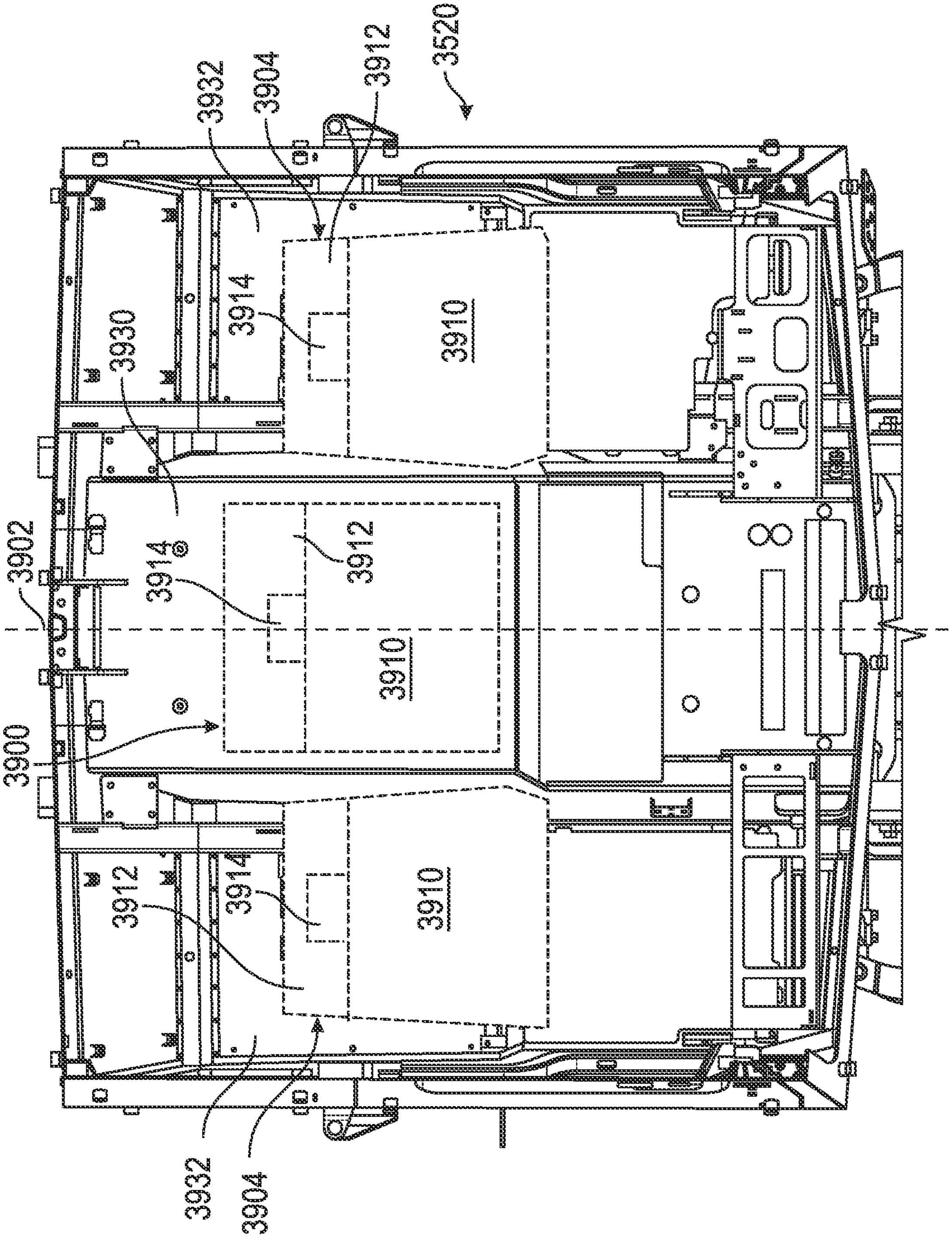
FIG. 99 is a top view an interior of the front cabin of FIG. 87, according to an exemplary embodiment.
Figure 100:
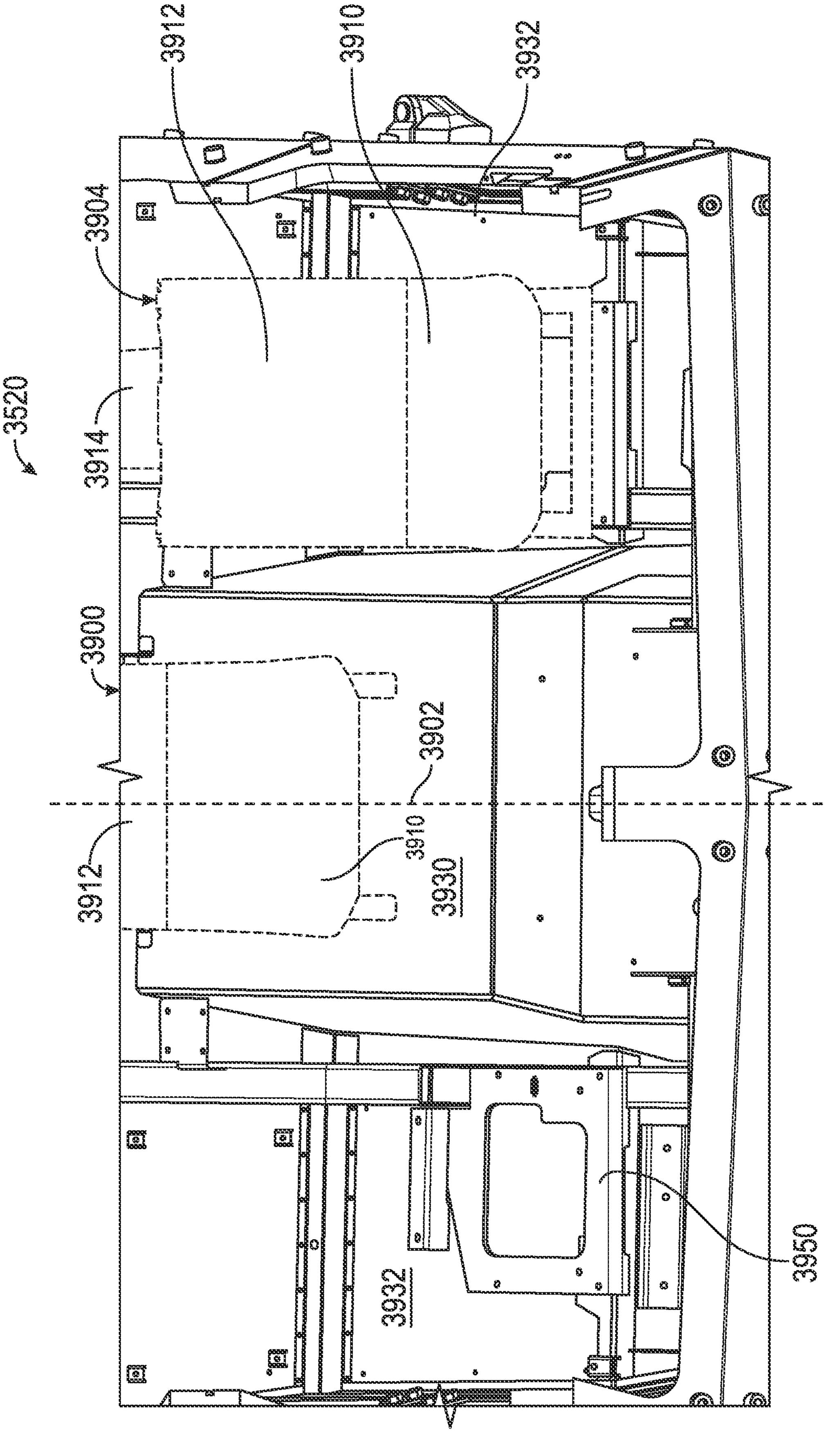
FIG. 100 is a perspective view the interior of FIG. 99, according to an exemplary embodiment.
Figure 102:
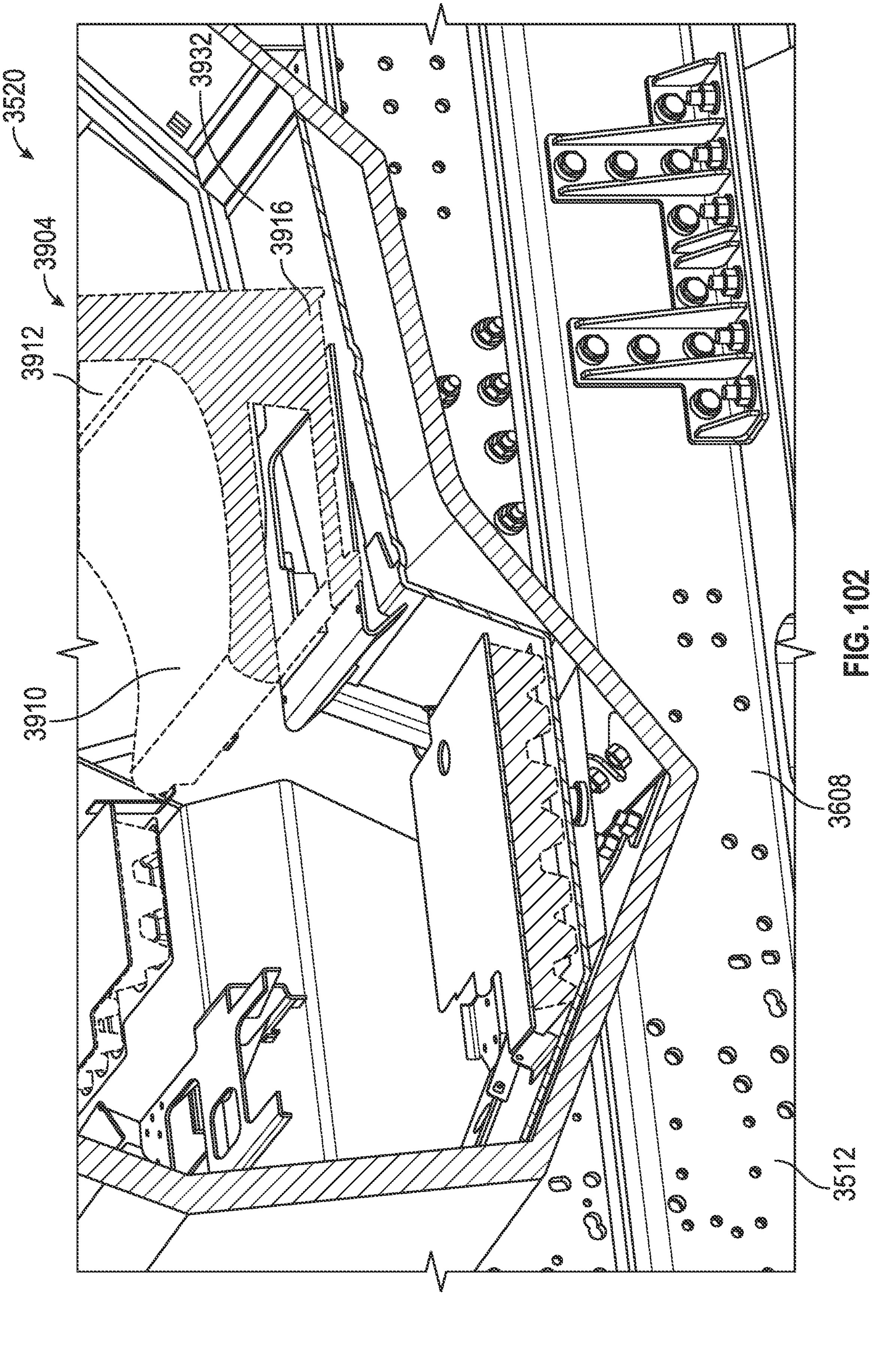
FIG. 102 is a perspective section view of the front cabin of FIG. 87, according to an exemplary embodiment.
Figure 103:
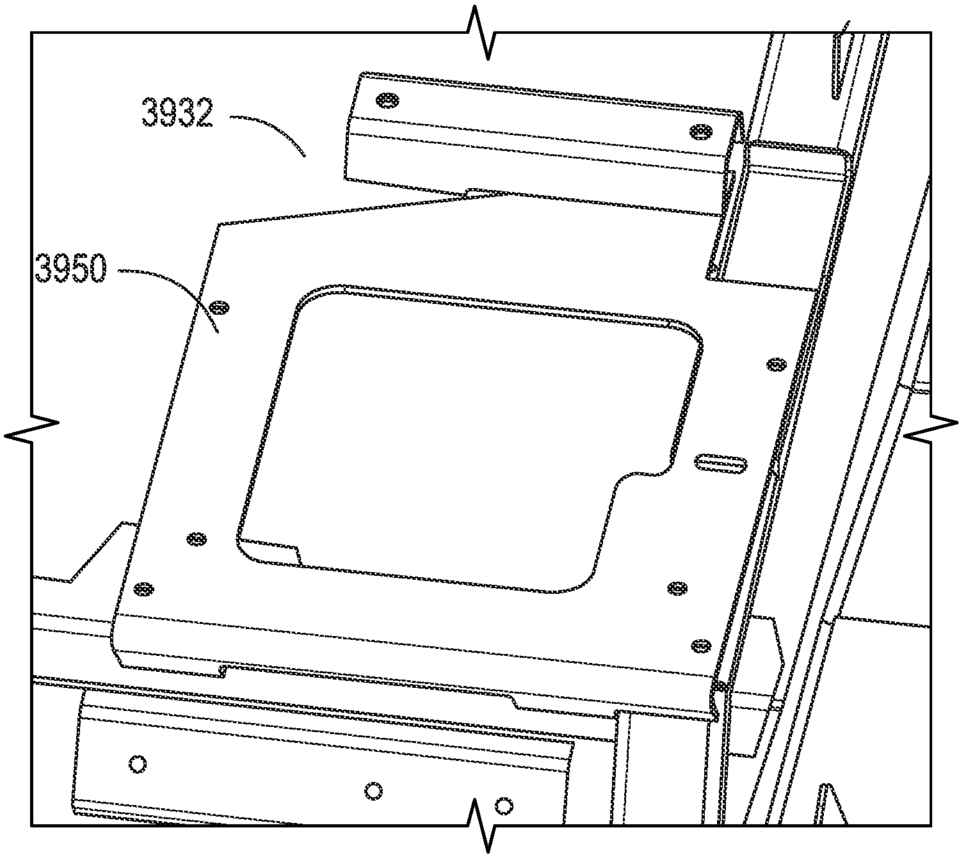
FIG. 103 is a perspective view of a mounting bracket for a seat of the front cabin of FIG. 87, according to an exemplary embodiment.

Referring to FIGS. 99 and 100, an interior of the front cabin 3520 is shown. The front cabin 3520 includes a seat, shown as center seat 3900, disposed along a longitudinal centerline 3902 of the vehicle 3510. A pair of seats, shown as side seats 3904, are arranged symmetrically on either side of the longitudinal centerline 3902. The center seat 3900 and each side seat 3904 are arranged such that the center seat 3900 supports a gunner, one side seat 3904 supports a driver, and the other side seat 3904 supports a passenger. Each seat includes a seat bottom 3910 configured to support an occupant's bottom, a seat back 3912 configured to support an occupant's back, and a headrest 3914 configured to support an occupant's head, neck, and/or upper back. As shown in FIGS. 101 and 102, each seat includes a frame 3916 that supports the seat bottom 3910, the seat back 3912, and the headrest 3914. The seat bottom 3910 may be oriented substantially parallel to a horizontal plane when folded down. The seat back 3912 may be angled relative to a vertical plane (e.g., 95 degrees, 100 degrees, 105 degrees, etc.) or may be oriented substantially parallel to a vertical plane. The headrest 3914 may be oriented substantially parallel to a vertical plane.

The front cabin 3520 includes a floor having a first floor section, shown as center floor section 3930, that is disposed along the longitudinal centerline 3902. The front cabin 3520 also includes a pair of second floor sections, shown as side floor sections 3932, arranged symmetrically on either side of the longitudinal centerline 3902. The center floor section 3930 is raised relative to each side floor section 3932 (e.g., to facilitate access to a turret assembly, to provide a tunnel for a primary driver of the vehicle 3510, etc.). The frames 3916 of the side seats 3904 are coupled to the side floor sections 3932 with mounting brackets 3950, as shown in FIGS. 100-103. The mounting bracket 3950 may be shaped to position the side seat 3904 in a desired orientation.

Figure 104:
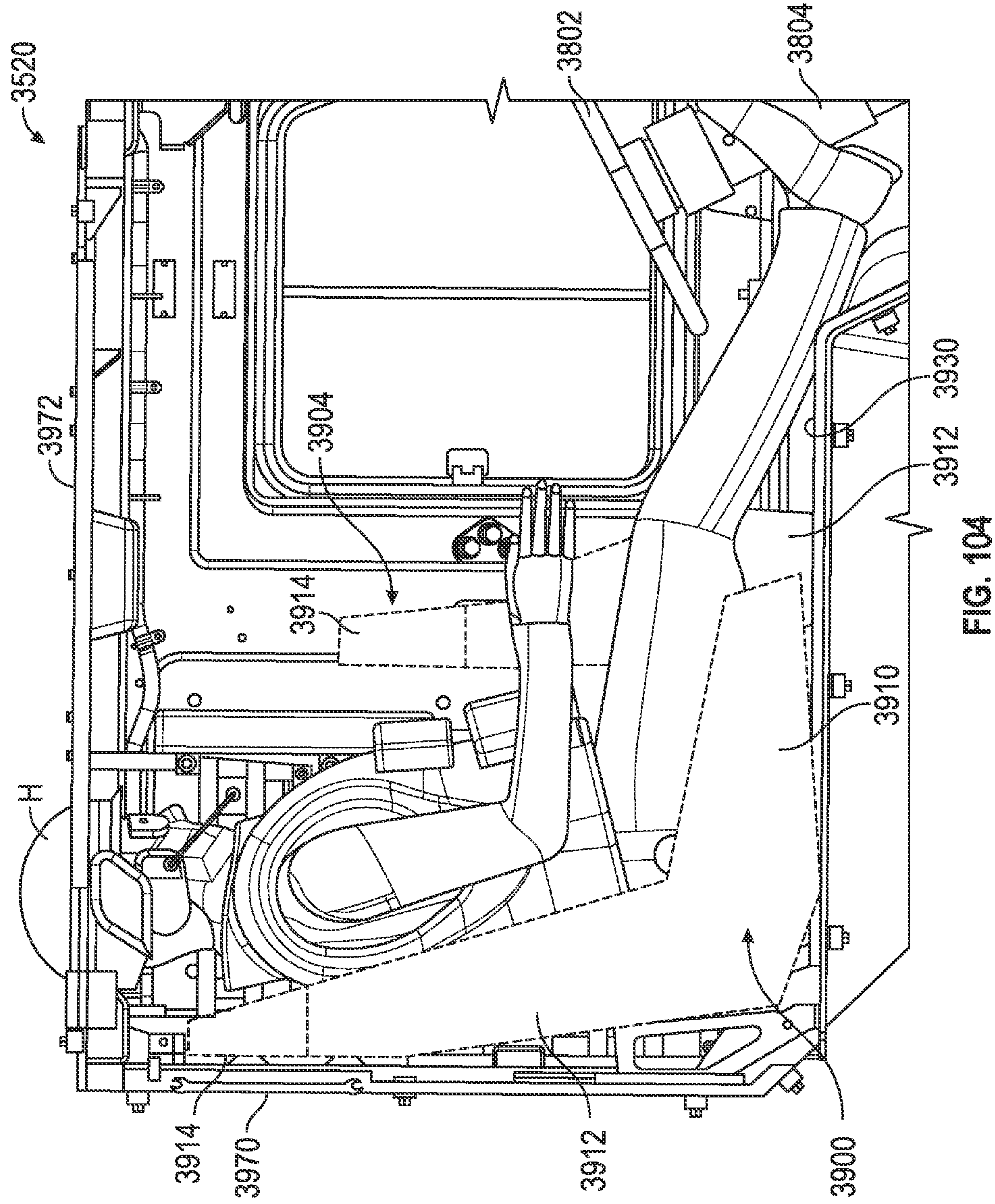
FIG. 104 is a side view of an occupant in a seat of the front cabin of FIG. 87, according to an exemplary embodiment.

Conventionally, the center seat 3900 would be coupled (e.g., bolted, etc.) to a rear wall 3970 of the front cabin 3520, as shown in FIG. 104. This specific coupling prevents the center seat 3900 from moving along the longitudinal centerline 3902. With the center floor section 3930 raised, this positioning can result in reduced headroom for the gunner. As shown in FIG. 104, with the center seat 3900 in this arrangement, a gunner may experience interference between their head H and a roof 3972 of the front cabin 3520 (e.g., the roof 3750) while seated in the center seat 3900.

Figure 105:
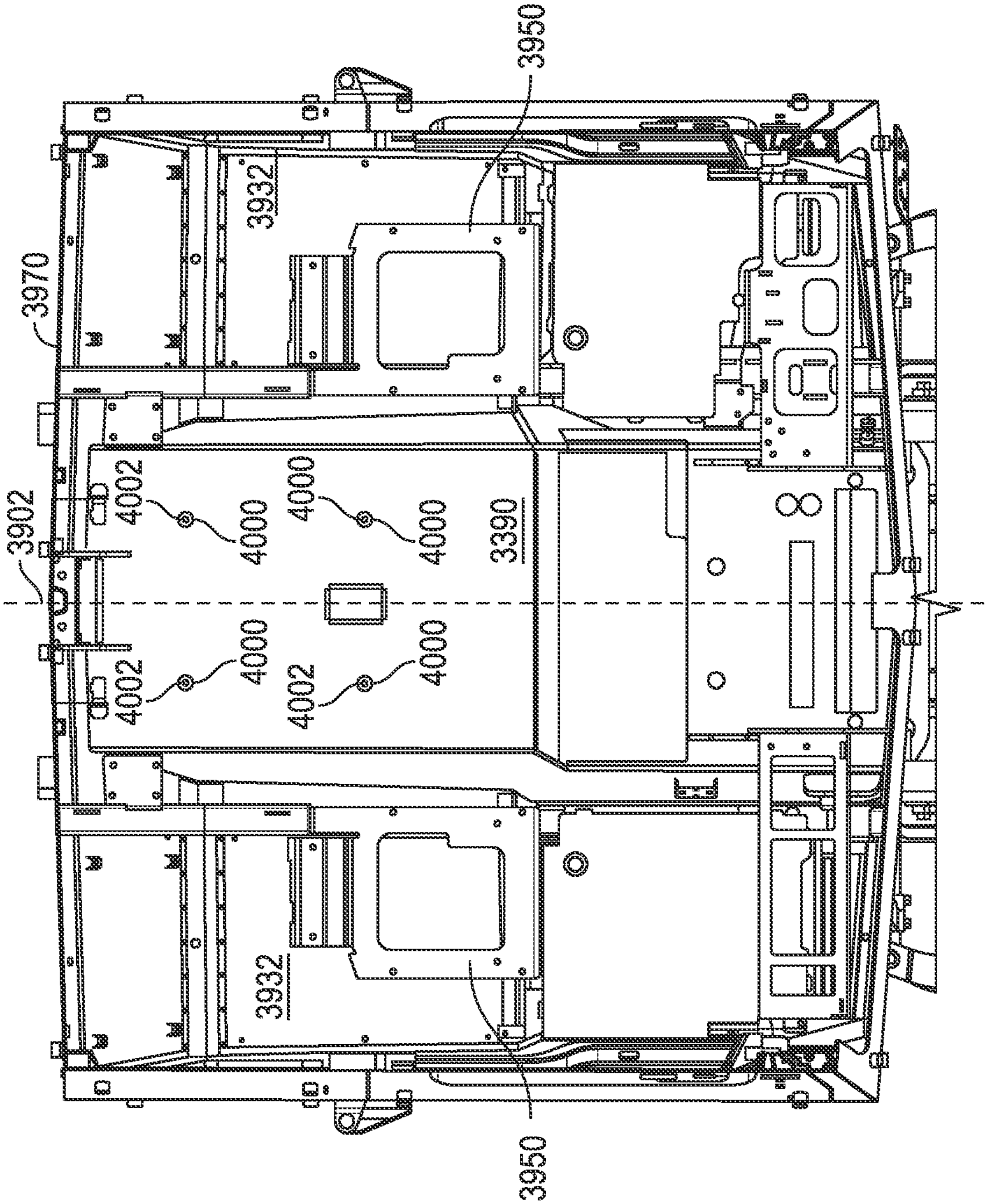
FIG. 105 is another top view the interior of FIG. 99, according to an exemplary embodiment.
Figure 106:
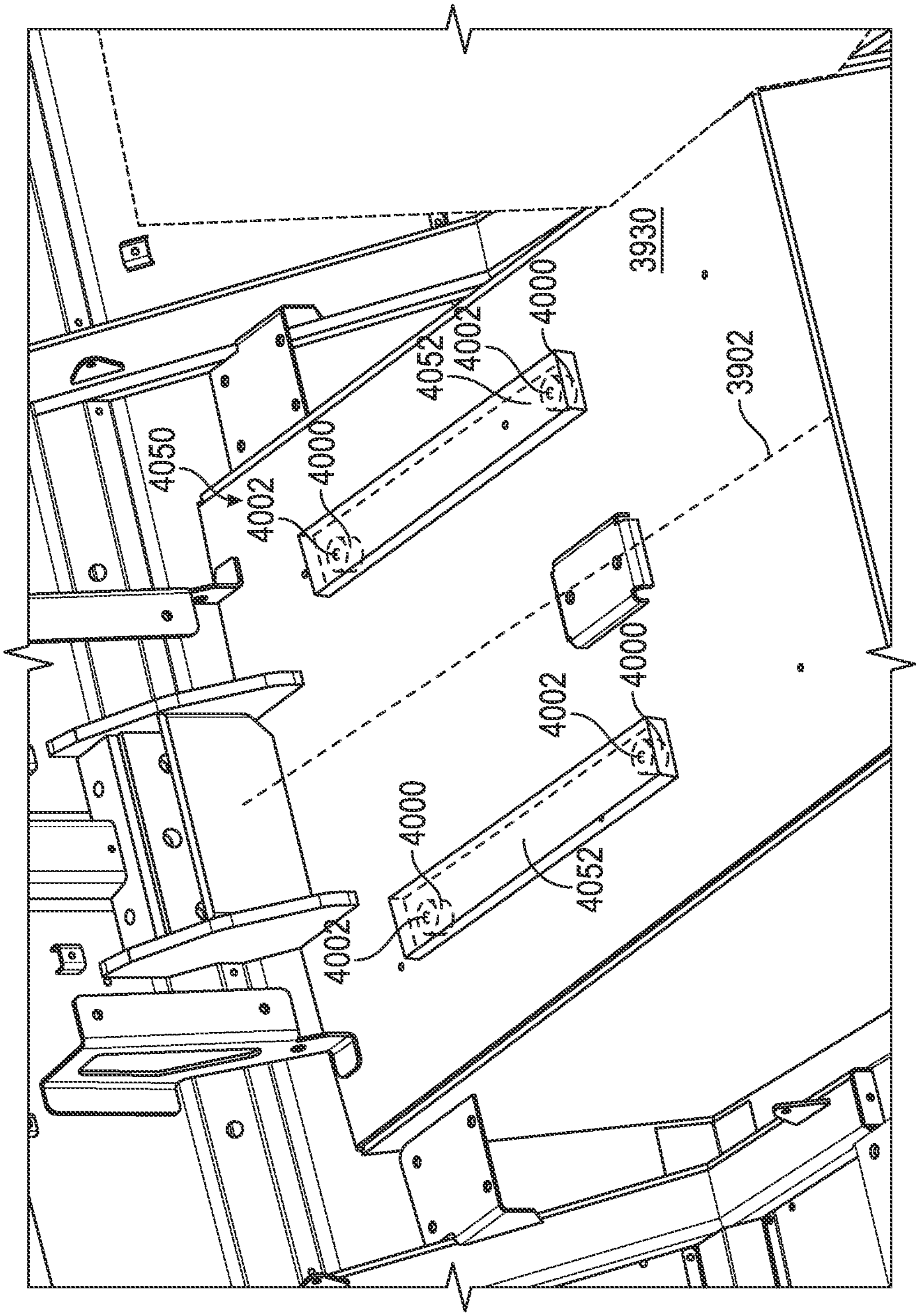
FIG. 106 is a perspective view of a floor section of the front cabin of FIG. 87, according to an exemplary embodiment.

Referring to FIGS. 105 and 106, instead of the center seat 3900 being coupled to the rear wall 3970, the center seat 3900 is coupled to the center floor section 3930. A series of bosses 4000 are coupled to (e.g., received by, welded to, threaded into, etc.) the center floor section 3930. The bosses 4000 extend upwards from the center floor section 3930 and each define a central aperture 4002. The center seat 3900 is slidably coupled to the bosses 4000 with a rail system 4050. The rail system 4050 includes a rail 4052 on each side of the longitudinal centerline 3902, both of which extend parallel to the longitudinal centerline 3902. In some embodiments, the rails 4052 are arranged symmetrically about the longitudinal centerline 3902. The rails 4052 include a linear bearing or are otherwise configured to facilitate sliding motion. The rails 4052 extend between, and are coupled to, each of the bosses 4000 on either side of the longitudinal centerline 3902. Each central aperture 4002 may be threaded to facilitate a bolted connection between the rails 4052 and the bosses 4000. The frame 3960 of the center seat 3900 is coupled to the rails 4052 to facilitate sliding movement of the center seat 3900 between a use position and a stored position. The rail system 4050 may include an interface (e.g., a lever, a button, etc.) to selectively engage a brake or lock to selectively prevent sliding movement of the center seat 3900. In some embodiments, movement of center seat 3900 between the use position and the stored position is driven by a motor.

Referring to FIG. 107, the stored position of the center seat 3900 is indicated at reference S, and the use position of the center seat 3900 is indicated at reference U. In the stored position, the center seat 3900 is located proximate the rear wall 3970 to facilitate unobstructed movement of the occupants throughout the front cabin 3520. Additionally, this positioning leaves a significant portion of the center floor section 3930 unobstructed, facilitating an occupant standing on the center floor section 3930 to access the turret assembly 4110 shown in FIGS. 108 and 109. The seat bottom 3910 may be rotatably coupled to the frame 3916 of the center seat 3900 such that the seat bottom 3910 can be rotated upwards, further reducing the size of the portion of the center floor section 3930 obstructed by the center seat 3900. As shown in FIG. 107, depending on the overall size of the center seat 3900, the headrest 3914 may interfere with the roof 3972 and/or one or more protrusions extending from the roof 3972 or the rear wall 3970. The size and shape of the headrest 3914 may be modified (e.g., as shown in FIG. 108) to fit below the roof 3972 and/or protrusions and thereby facilitate moving the center seat 3900 as close as possible to the rear wall 3970 in the stored position.

Figure 108:
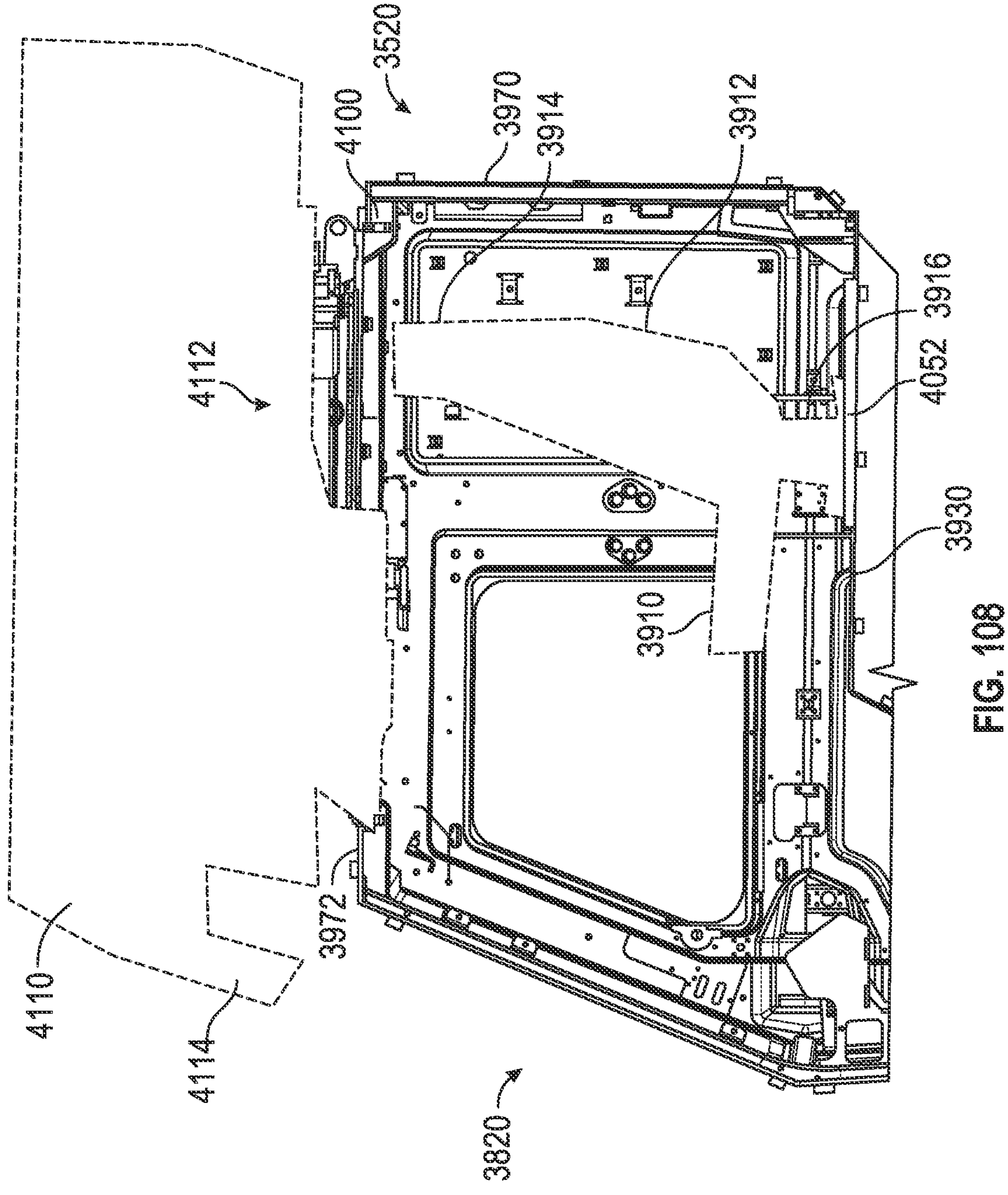
FIG. 108 is a side section view of the front cabin of FIG. 87 including a turret assembly, according to an exemplary embodiment.
Figure 109:
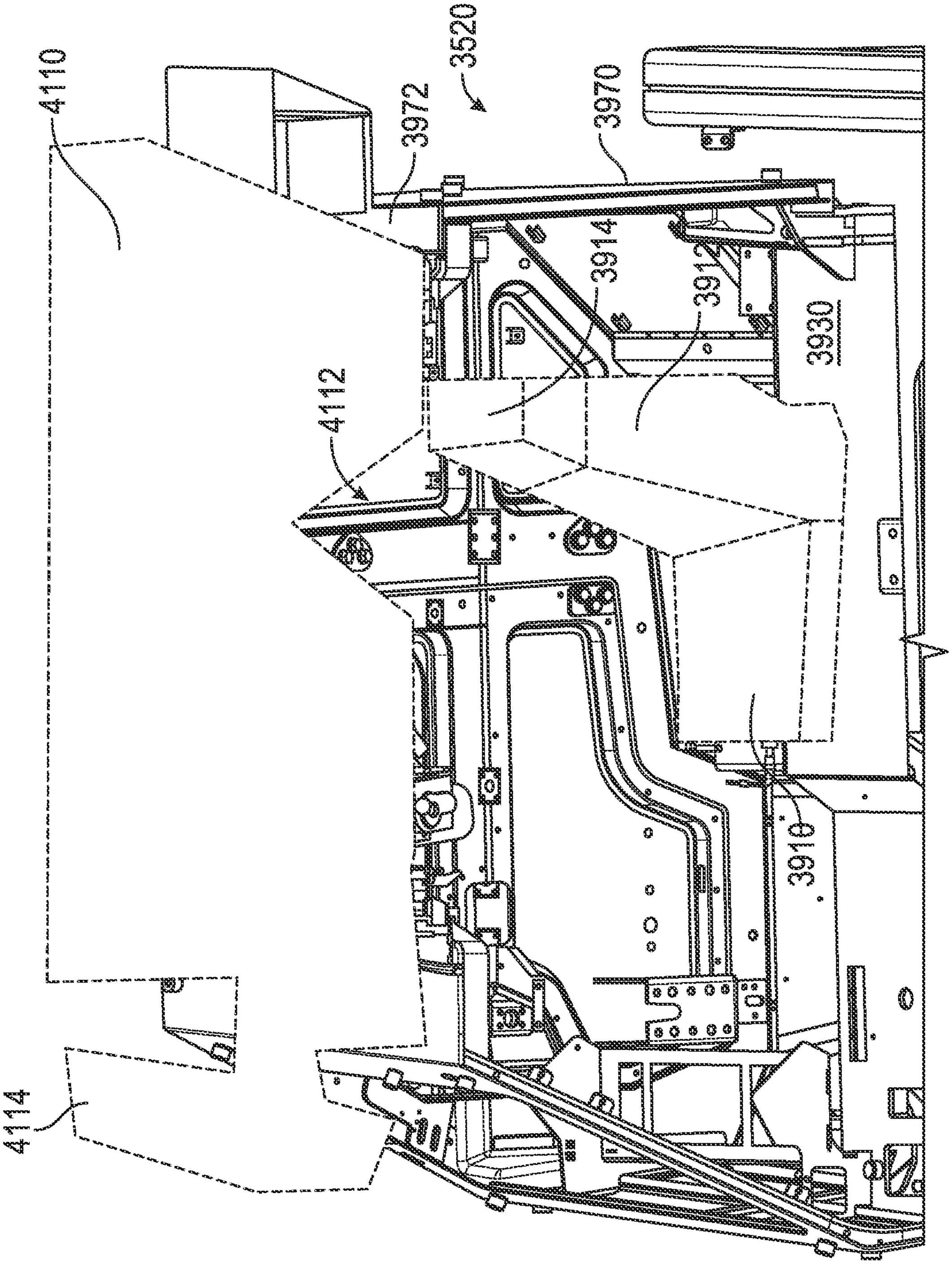
FIG. 109 is a perspective section view of the front cabin of FIG. 87 including the turret assembly of FIG. 108.

Referring to FIGS. 108 and 109, the center seat 3900 is shown in the use position. In the use position, the center seat 3900 is located directly below a gun turret, shown as turret assembly 4110. The turret assembly 4110 is coupled to the roof 3972. An aperture 4112 is defined through both the turret assembly 4110 and the roof 3972 to facilitate access to the turret assembly 4110 from the interior of the front cabin 3520. The gunner may extend their upper body (e.g., torso, etc.) through the aperture 4112 into the turret assembly 4110 to view the surroundings of the vehicle 3510 and/or use a weapon. The turret assembly 4110 may include one or more of a mounted weapon, a set of walls 4114 at least partially surrounding the aperture 4112 to protect the gunner when using the turret assembly 4110, a drive system configured to rotate the turret assembly 4110 relative to the front cabin 3520, and a door or hatch to selectively close off the aperture 4112 and seal the front cabin 3520. In some embodiments, the gunner uses a portable gun instead of a mounted gun. In the use position, the center seat 3900 is located directly below the aperture 4112 such that the head of the gunner may extend partially or completely through the aperture 4112 when seated. This improves the seated comfort of the gunner relative to a conventional seat arrangement because the head of the gunner does not contact the roof 3972.

When using the turret assembly 4110, the gunner stands in the front cabin 3520 and extends their upper body through the aperture 4112, where the gunner may operate the mounted gun. The center seat 3900 may be moved to the stored position when operating the turret assembly 4110. In such embodiments, the gunner stands on the center floor section 3930 underneath the turret assembly 4110. In other embodiments, the center seat 3900 remains in the use position during operation of the turret assembly 4110. In such embodiments, the gunner may stand on the seat bottom 3910 of the center seat 3900 and thereby extend their body farther through the aperture 4112. The gunner may choose whether to move the center seat 3900 to the use position or the stored position depending on their height. By way of example, a shorter gunner may choose to stand on the seat bottom 3910 instead of the center floor section 3930 as the higher position of the seat bottom 3910 may place the gunner's upper body in a position that more readily facilitates use of a mounted weapon.

Door Assembly

Figure 110:
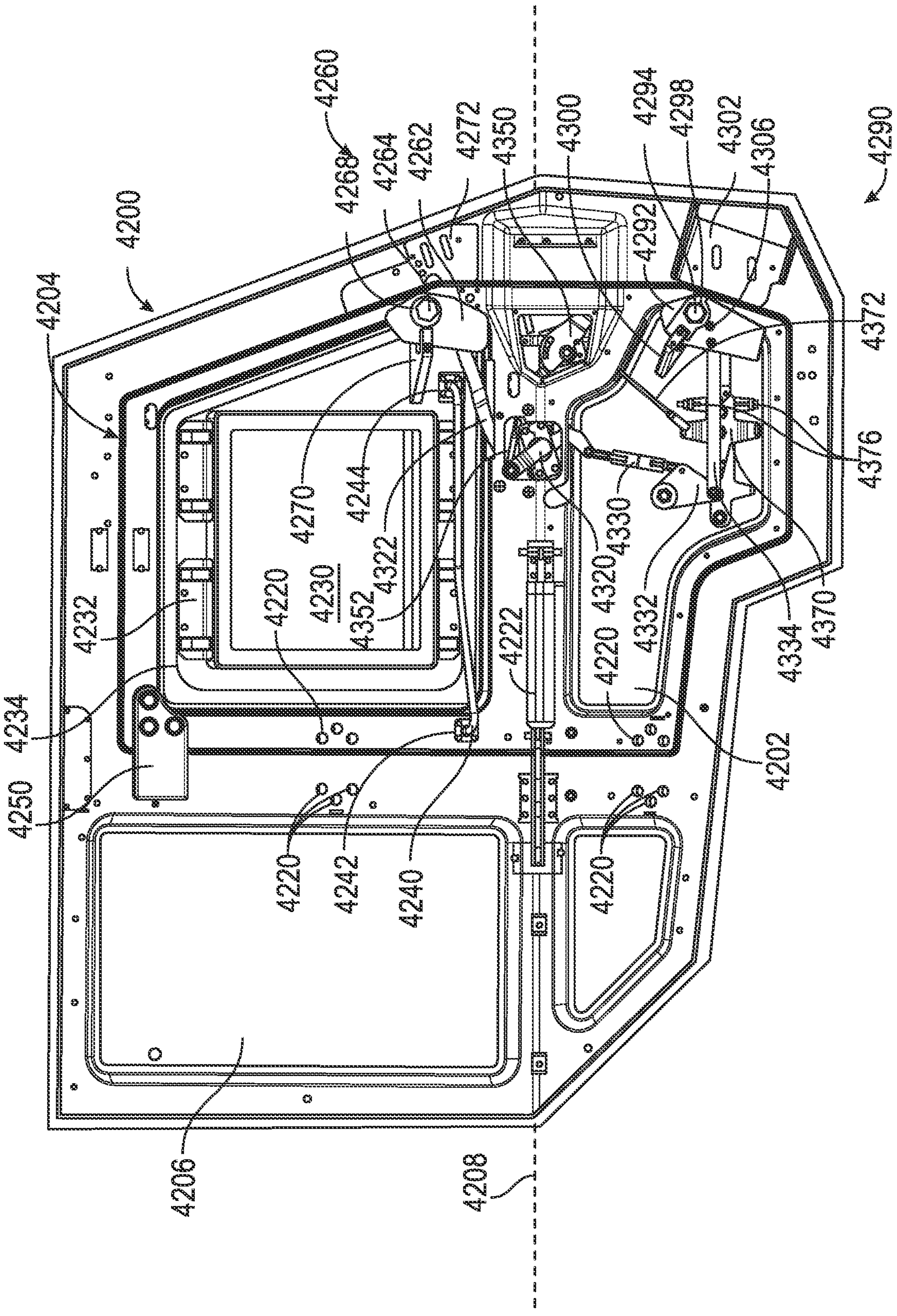
FIG. 110 is a side view of a door of the vehicle of FIG. 1 in an unlocked configuration, according to an exemplary embodiment.
Figure 111:
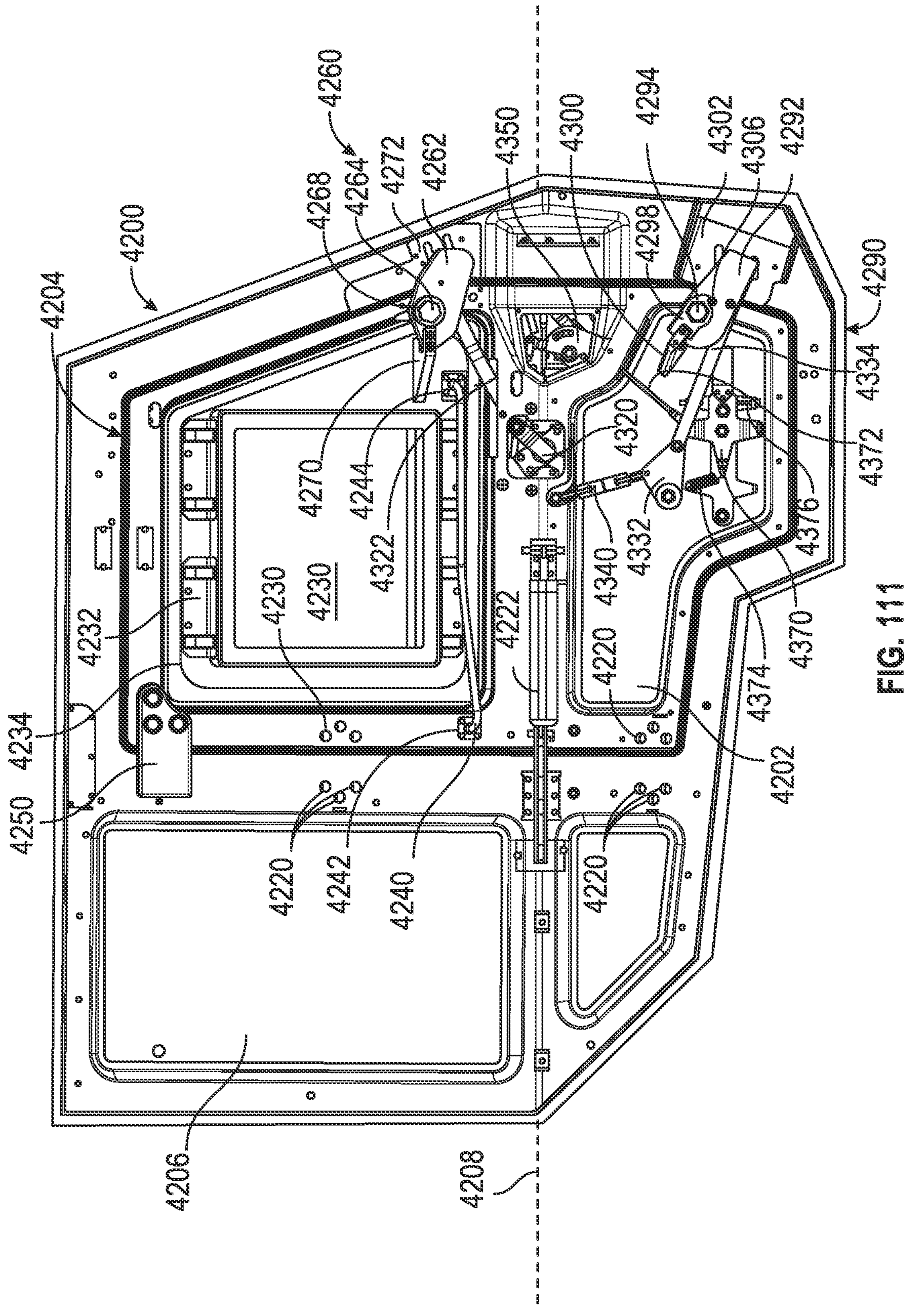
FIG. 111 is a side view of the door of FIG. 110 in a locked configuration, according to an exemplary embodiment.

Referring to FIGS. 110 and 111, a door 4200, including a frame 4202, is shown that may be substantially similar to the doors 3607. Each of the doors shown herein may be mirrored and used on the opposite side of the front cabin 3520. In some embodiments, the frame 4202 is constructed from multiple layers of sheet metal with one or more blocks coupled to the sheet metal to facilitate attachment of other components. In some embodiments, one or more portions of the frame 4202 are constructed from a single piece of material spanning the entire thickness of the frame 4202. FIG. 110 shows the door 4200 in an unlocked configuration, and FIG. 111 shows the door 4200 in a locked configuration. The door 4200 is disposed within an opening 4204 defined by a wall 4206 of the front cabin 3520. The wall 4206 may make up the left or the right side of the front cabin 3520. Both the door 4200 and the wall 4206 may be bent about an axis 4208 such that a width of the front cabin 3520 decreases toward the top of the vehicle 3510. The door 4200 is rotatably coupled to the wall 4206 through a pair of hinges that connect to a set of apertures, shown as hinge apertures 4220. In some embodiments, a body of each hinge defining an axis of rotation of the door 4200 relative to the wall 4206 is disposed outside of the front cabin 3520 to facilitate the outward movement of the door 4200. An actuator, shown as gas spring 4222, is coupled to both the door 4200 and the wall 4206. The gas spring 4222 may provide a damping force and/or a biasing force to assist an operator in opening or closing the door 4200. By way of example, the gas spring 4222 may provide a biasing force to assist the operator in opening the door 4200. By way of another example, the gas spring 4222 may provide a dampening force to prevent the door 4200 from swinging open or closed too quickly.

Referring again to FIGS. 110 and 111, the door 4200 includes a transparent portion, shown as window 4230. The window 4230 facilitates the operator seeing out of the side of the front cabin 3520. In some embodiments, the window 4230 is made from glass. In other embodiments, the window 4230 is made from a projectile and/or blast resistant material (e.g., polycarbonate, acrylic, etc.). The window 4230 is held in place relative to the door 4200 by a frame, shown as window frame 4232. The window frame 4232 may clamp the window 4230, provide a recess in which the window 4230 resides, fasten to the window 4230, or otherwise couple to the window 4230. The window frame 4232 is coupled to a window surround 4234. The window surround 4234 is couples the window frame 4232 to the frame 4202. The window surround 4234 may be a portion of the frame 4202 or may be a separate component coupled to the frame 4202. An interface member, shown as grip 4240, provides an operator with an interface through which to apply a pulling or pushing force to open or close the door 4200. As shown, the grip 4240 extends from the interior surface of the door 4200, forming a loop. As shown in FIGS. 110 and 111, the grip 4240 is coupled to the door 4200 at a first coupling point 4242 and a second coupling point 4244. The first coupling point 4242 is located on the frame 4202. In some embodiments, the second coupling point 4244 is located on the window surround 4234. In other embodiments, the second coupling point 4244 is located on the frame 4202. The location of the second coupling point 4244 may be driven by the location and/or presence of other components of the door 4200.

Referring again to FIGS. 110 and 111, the door 4200 includes a retainer, shown as paddle 4250. The paddle 4250 is removably coupled to the frame 4202. The paddle 4250 may be fastened to the frame 4202 through apertures 4252 (shown in FIG. 112). In some embodiments, the frame 4202 includes a reinforcing structure (e.g., a block) near the apertures 4252 to strengthen that particular portion of the door 4200. The paddle 4250 is located near the upper end of the door 4200 and extends from the frame 4202 over (e.g., across an inner surface of) the wall 4206. The paddle 4250 is positioned above both of the hinges. Given that the door 4200 swings out of the front cabin 3520 when opened, the paddle 4250 does not interfere with normal operation of the door 4200. During a blast event, the force imparted on the door 4200 by an explosion may cause the door 4200 to deflect. Conventionally, the upper end of a door is not held in place relative to the surrounding wall, facilitating free deflection of the door. In some cases, the force of an explosion causes the upper end of a door to deflect outwards. The frame of the door may then act as a spring, causing the upper end of the door to spring back inside of the front cabin, potentially contacting the head of an operator and causing injury. The paddle 4250 prevents the upper end of the door 4200 from deflecting outwards, removing the potential for the frame 4202 to gain enough momentum to spring inward of the front cabin 3520 and contact an operator. Accordingly, the addition of the paddle 4250 improves the safety of the vehicle 3510 during a blast event.

Again referring to FIGS. 110 and 111, the door 4200 includes a lock assembly, shown as upper lock assembly 4260. The upper lock assembly 4260 includes a paddle 4262 that rotates about a shaft member, shown as bolt 4264. Bolt 4264 is coupled to frame 4202 through a boss 4266 (shown in FIG. 112), which is in turn coupled to or integrally formed with the frame 4202. In some embodiments, a spacer 4268 is disposed between the paddle 4262 and a head of the bolt 4264 to facilitate retaining the paddle 4262. The paddle 4262 is configured to rotate about the bolt 4264 from a locked position when the door 4200 is in the locked configuration, shown in FIG. 111, to an unlocked position when the door 4200 is in the unlocked configuration, shown in FIG. 110. A retainer, shown as fork 4270, extends inward from the window surround 4234 and surrounds a portion of the paddle 4262. A plate, shown as reinforcement plate 4272, covers a portion of the wall 4206 that is covered by the paddle 4262 in the locked position. In the unlocked configuration, the door 4200 can open and close freely. In the locked configuration, the paddle 4262 extends over (e.g., along an inner surface of) the wall 4206, and the wall 4206 imparts a force on the paddle 4262 to counteract any force directed to opening the door, preventing the door 4200 from opening. The reinforcement plate 4272 strengthens the portion of the wall 4206 that imparts force on the paddle 4262 and reduces wear on the wall 4206 from the sliding of the paddle 4262. In some embodiments, a cover extends from the frame 4202 underneath the window surround 4234 to the fork 4270, covering a portion of the upper lock assembly 4260. The cover is coupled to both the frame 4202 and the fork 4270. In some embodiments, other covers are coupled to and cover portions of the door 4200.

Again referring to FIGS. 110 and 111, the door 4200 includes a second lock assembly, shown as lower lock assembly 4290. The lower lock assembly 4290 includes a paddle 4292 that rotates about a shaft member, shown as bolt 4294. Bolt 4294 is coupled to frame 4202 by a boss, which is in turn coupled to or integrally formed with the frame 4202. In some embodiments, a plate 4298 is disposed between the paddle 4292 and a head of the bolt 4294 to facilitate retaining the paddle 4292. The paddle 4292 is configured to rotate about the bolt 4294 from a locked position when the door 4200 is in the locked configuration, shown in FIG. 111, to an unlocked position when the door 4200 is in the unlocked configuration, shown in FIG. 110. A retainer, shown as fork 4300, extends from the frame 4202 and surrounds a portion of the paddle 4292. A plate, shown as reinforcement plate 4302, covers a portion of the wall 4206 that is covered by the paddle 4292 in the locked position. In the unlocked configuration, the door 4200 can open and close freely. In the locked configuration, the paddle 4292 extends over (e.g., along an inner surface of) the wall 4206, and the wall 4206 imparts a force on the paddle 4292 to counteract any force directed to opening the door, preventing the door 4200 from opening. The reinforcement plate 4302 strengthens the portion of the wall 4206 that imparts force on the paddle 4292 and reduces wear on the wall 4206 from the sliding of the paddle 4292. The reinforcement plate 4302 may include one or more portions bent up from the surface of the wall 4206 to facilitate coupling of other components to the wall 4206. In some embodiments, a protrusion 4306 extends from the paddle 4292. In such embodiments, the fork 4300 prevents rotation of the plate 4298, and the plate 4298 is shaped such that it contacts the protrusion 4306 to prevent rotation of the paddle 4292 past a certain rotational position. Although the upper lock assembly 4260 and the lower lock assembly 4290 are shown in specific locations, it should be understood that the upper lock assembly 4260 and the lower lock assembly 4290 could be located anywhere along the perimeter of the frame 4202.

Referring again to FIGS. 110 and 111, the upper lock assembly 4260 and the lower lock assembly 4290 are actuated between the locked and unlocked positions by a series of linkages connected to a link or lever, shown as handle link 4320. The handle link 4320 is rotatably coupled to the frame 4202 near the center of the door 4200. An upper end of the handle link 4320 is coupled to the paddle 4262 through a link 4322. When the handle link 4320 rotates clockwise as shown in FIGS. 110 and 111, the paddle 4262 rotates to the locked position. The lower end of the handle link 4320 is coupled to the paddle 4292 through a first link, shown as turnbuckle 4330, a second link, shown as rotating link 4332, and a third link, shown as link 4334. In some embodiments, the length of the turnbuckle 4330 is adjustable, (e.g., by threading a bolt in or out of the turnbuckle 4330) to facilitate adjustment of the position of the paddle 4292. The rotating link 4332 is rotatably coupled to the frame 4202. In some embodiments, the rotating link 4332 is coupled to the frame 4202 using a similar bolt, spacer, and boss arrangement to the upper lock assembly 4260. When the handle link 4320 rotates clockwise as shown in FIGS. 110 and 111, the rotating link 4332 rotates counterclockwise and the paddle 4292 moves toward the locked position.

As shown in FIGS. 110 and 111, a link, shown as central link 4350 is rotatably coupled to the frame 4202. The central link 4350 is coupled to the handle link 4320 through a link, shown as connecting link 4352. The connecting link 4352 couples the rotation of the handle link 4320 and the central link 4350 such that clockwise rotation of one causes clockwise rotation of the other. The central link 4350 may interface with a portion of the frame 4202 to limit rotation of the central link 4350, and by extension the handle link 4320 in one or both directions (e.g., to stop at in the locked or unlocked configurations. In some embodiments, a handle is coupled to the one or both of the handle link 4320 and the central link 4350 to facilitate an operator reconfiguring the door 4200 from the locked configuration to the unlocked configuration and vice versa. The central link 4350 may be configured to actuate an additional latch that selectively holds the door 4200 shut in normal operation, but not during a blast event. The door 4200 further includes a spring link 4370. The spring link 4370 may be coupled to the central link 4350 through a connecting link 4372 such that as the central link 4350 rotates clockwise, the spring link 4370 rotates counterclockwise. The spring link 4370 may be biased in a clockwise direction by a biasing member, shown as spring 4374. A pair of stops 4376 limit rotation of the spring link 4370.

Figure 112:
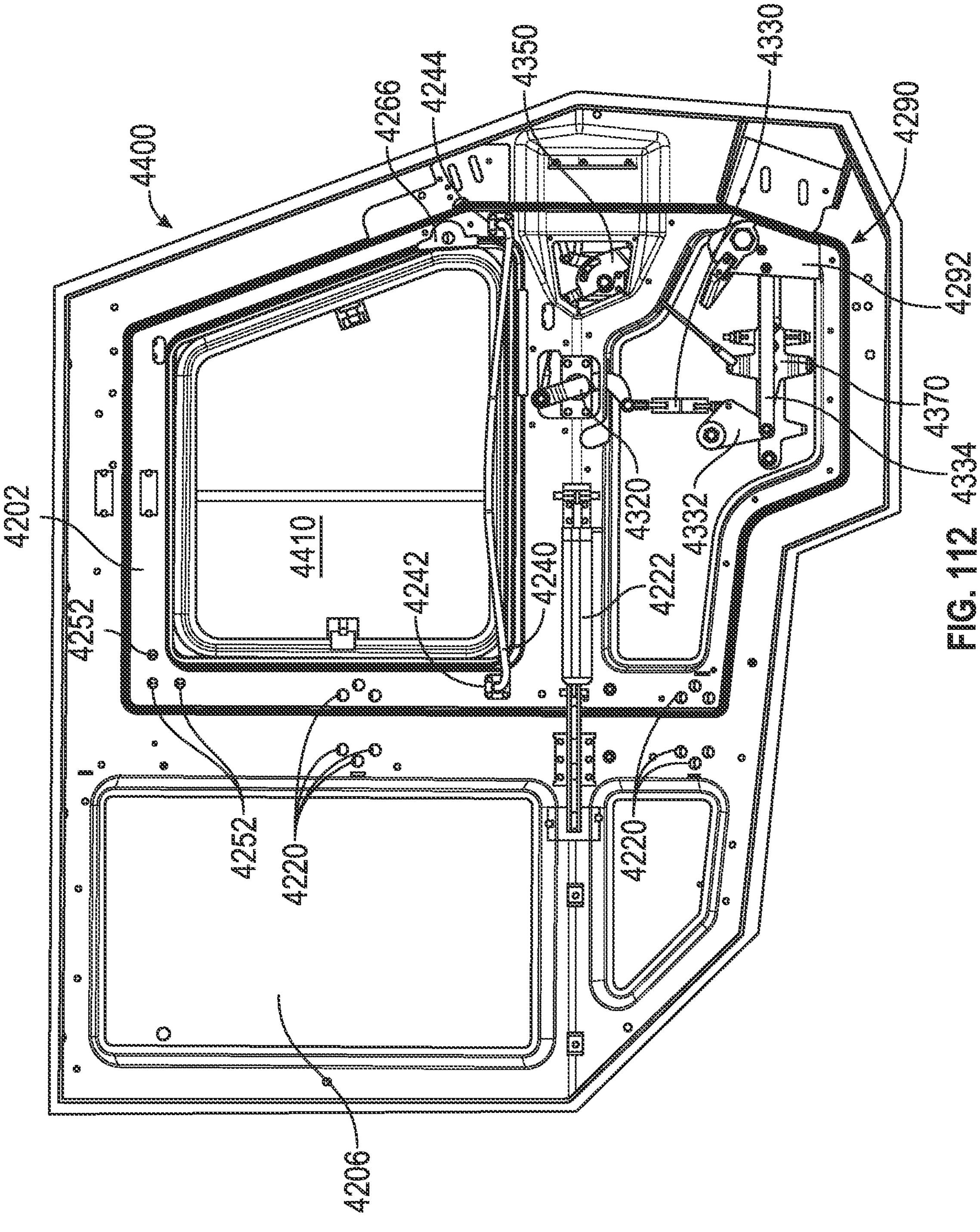
FIG. 112 is a side view of a door of the vehicle of FIG. 1, according to another exemplary embodiment.

Referring to FIG. 112, a door 4400 is shown as an alternative configuration of the door 4200. The door 4400 may be substantially similar to the door 4200 except as otherwise stated herein. The upper lock assembly 4260 is removed from the door 4400, however, the boss 4266 is still included coupled to the frame 4202. The paddle 4250 is removed, leaving the apertures 4252 exposed. The window 4230, the window frame 4232, and the window surround 4234 are replaced with a cover 4410. The cover 4410 may be removable without the use of tools (e.g., by coupling the cover 4410 to the frame 4202 with a latch). In other embodiments, one or more of the window 4230, the window frame 4232, and the window surround 4234 remain in the door 4400 and are covered by the cover 4410. The first coupling point 4242 of the grip 4240 remains in the same location as in the door 4200, and the second coupling point 4244 moves to frame 4202 near the frontmost edge of the door 4400. This change in location facilitates an increase in width of the grip 4240. The increased width of the grip 4240 provides the operator with an increased mechanical advantage when opening or closing the door 4400.

Figure 113:
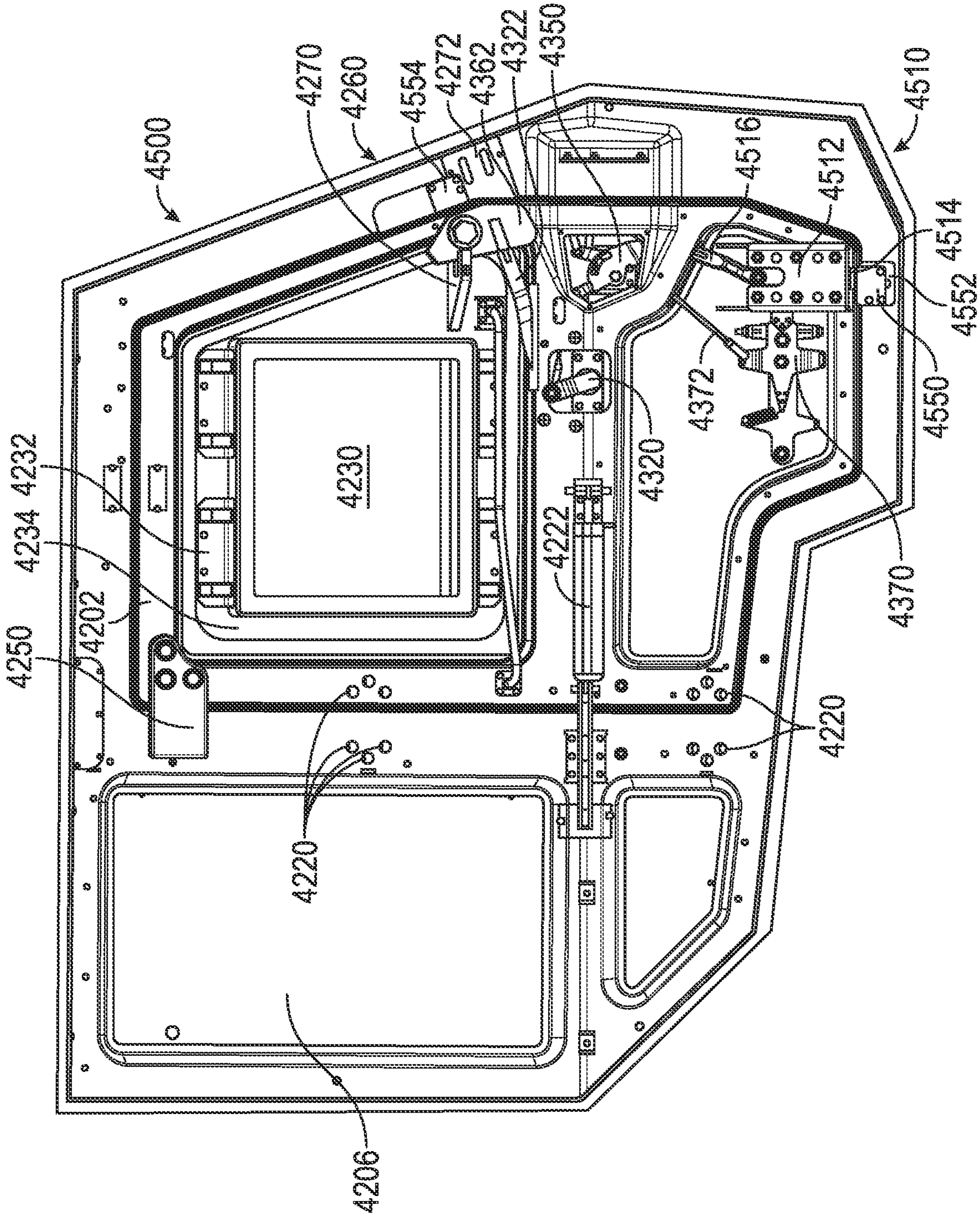
FIG. 113 is a side view of a door of the vehicle of FIG. 1, according to yet another exemplary embodiment.

Referring to FIG. 113, a door 4500 is shown according to an alternative embodiment. The door 4500 may be substantially similar to the door 4200 except as otherwise stated. In place of the lower lock assembly 4290, the door 4500 includes a lock assembly, shown as lower lock assembly 4510. The lower lock assembly 4510 includes a body 4512 coupled to the frame 4202, and a locking member 4514 translates in and out of the body 4512. In a locked position, the locking member 4514 extends out of the body 4512 and over the wall 4206, preventing opening of the door 4500. In an unlocked position, the locking member 4514 is received by the body 4512, and the door 4500 can open and close freely. The locking member 4514 is connected to the central link 4350 through a connecting link 4516. When the central link 4350 rotates clockwise, the locking member 4514 is extended toward the locked position. A reinforcement plate 4550 is coupled to the wall 4206 through a reinforcement plate 4552. A reinforcement plate 4554 is coupled to the reinforcement plate 4272. The reinforcement plates may be used to strengthen the wall 4206 and reduce wear on the wall 4206 from the sliding action of the paddle 4262 or the locking member 4514.

Figure 115:
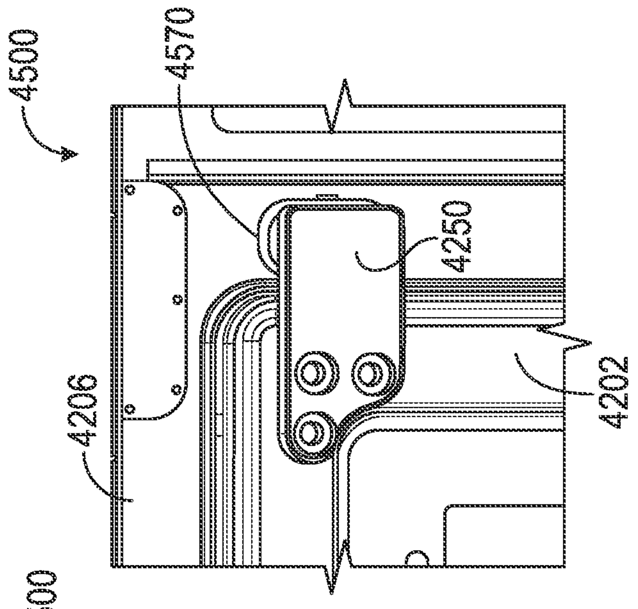
FIG. 115 is a perspective view of a retainer of the door of FIG. 114, according to an exemplary embodiment.
Figure 114:
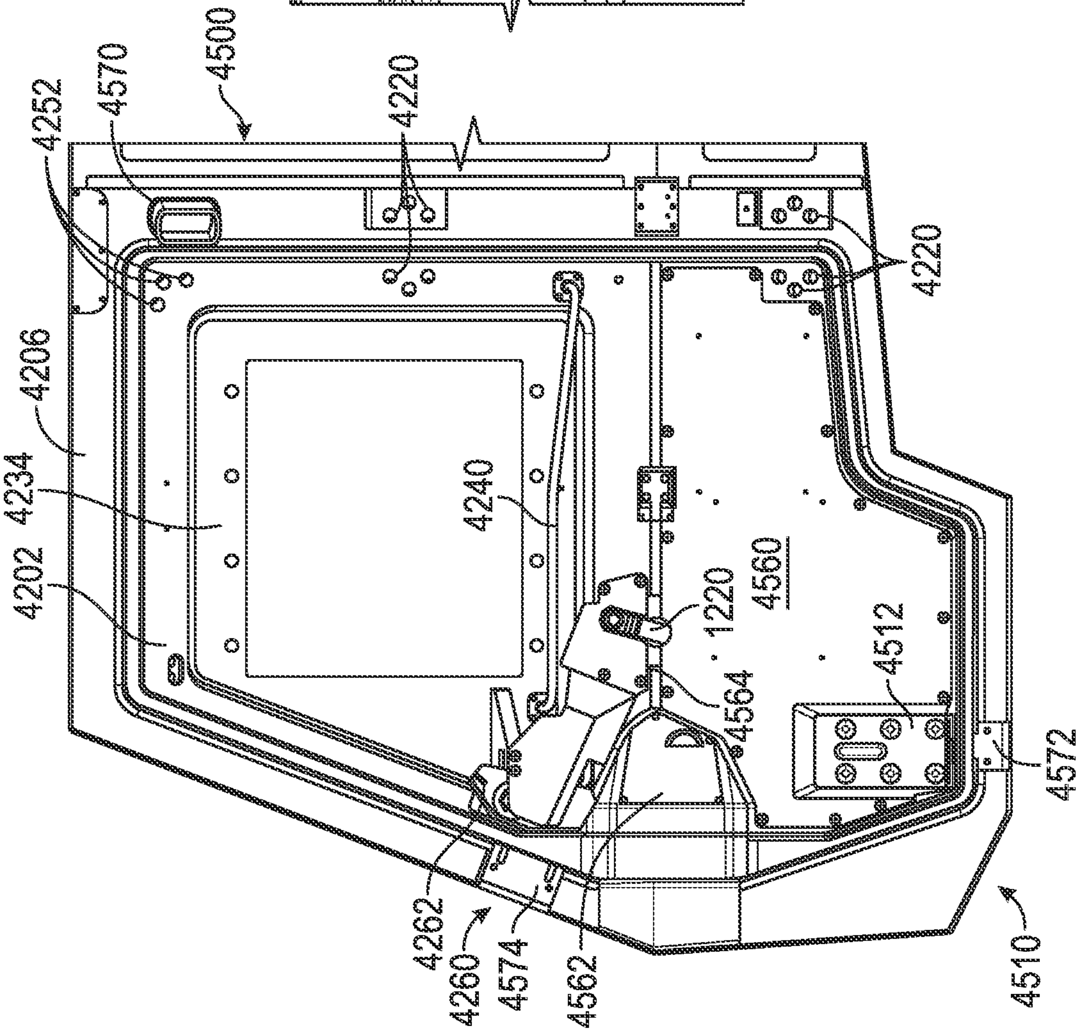
FIG. 114 is a side view of a door of the vehicle of FIG. 1, according to yet another exemplary embodiment.

Referring to FIG. 114, the door 4500 is shown in a configuration including a series of covers. A cover 4560 extends over the spring link 4370 and the connecting link 4516. A cover 4562 extends over the central link 4350. A cover 4564 extends over upper lock assembly 4260. The covers 4560, 4562, and 4564 obscure various components and prevent the occupants of the front cabin 3520 from coming into contact with moving components of the door 4500. The door 2100 is mirrored relative to the door 4500 such that it can be used on the opposite side of the front cabin 3520. The door 4500 further includes a block 4570, a block 4572, and a block 4574. The block 4570, the block 4572, and the block 4574 are received by the wall 4206 and may be welded to the wall 4206. Each of the blocks extend partway outside of the wall 4206 such that the blocks are visible within the front cabin 3520. In other embodiments, the blocks are positioned fully within the wall 4206 such that they are not visible from within the front cabin 3520. As shown in FIG. 115, the block 4570 is configured to strengthen the wall 4206 where the wall 4206 is contacted by the paddle 4250. The block 4572 is configured to strengthen the wall 4206 where the wall 4206 is contacted by the locking member 4514. The block 4574 is configured to strengthen the wall 4206 where the wall 4206 is contacted by the paddle 4262. The window surround 4234 is shown without the window frame 4232 or the window 4230.

Figure 116:
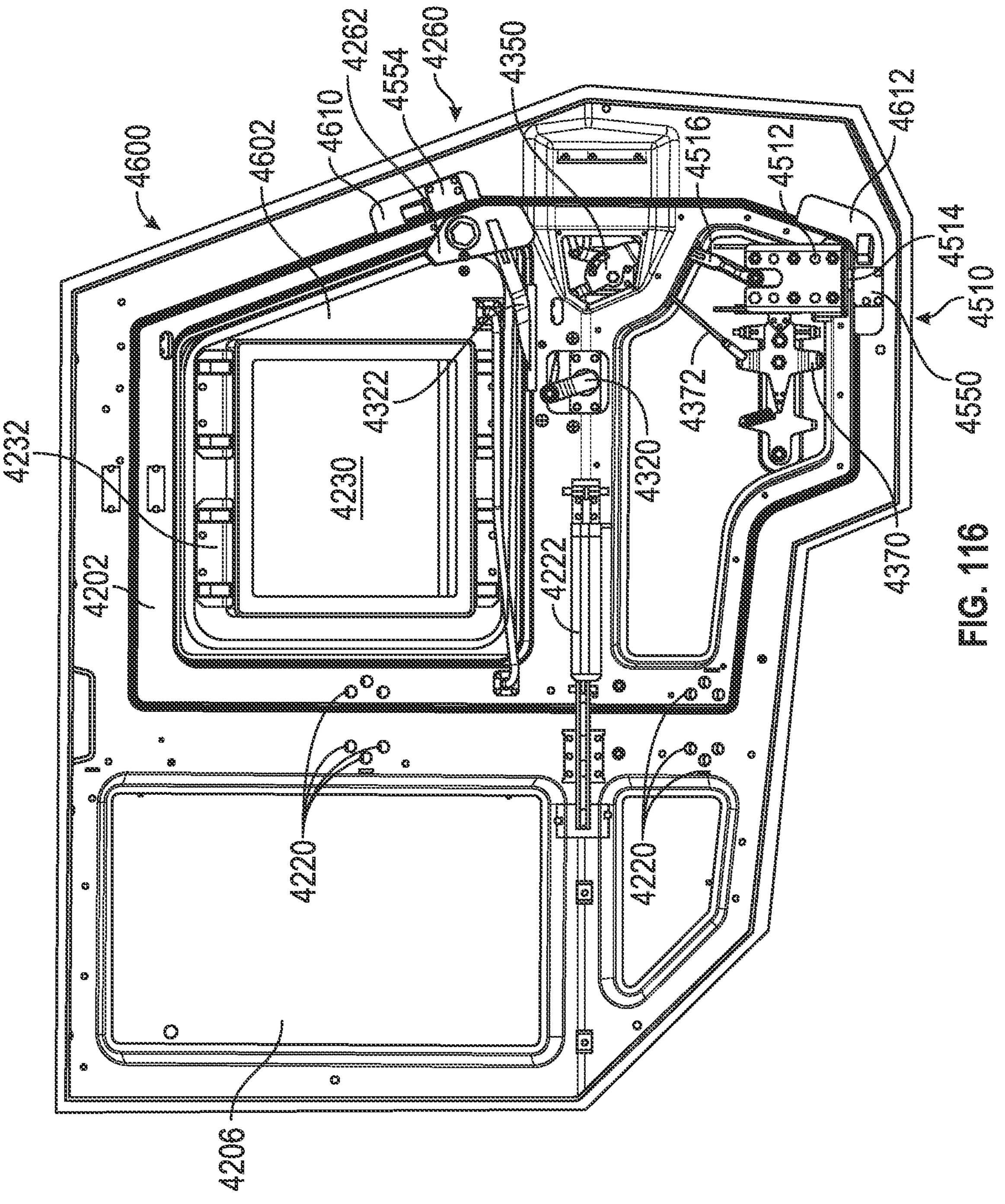
FIG. 116 is a side view of a door of the vehicle of FIG. 1, according to yet another exemplary embodiment.
Figure 117:
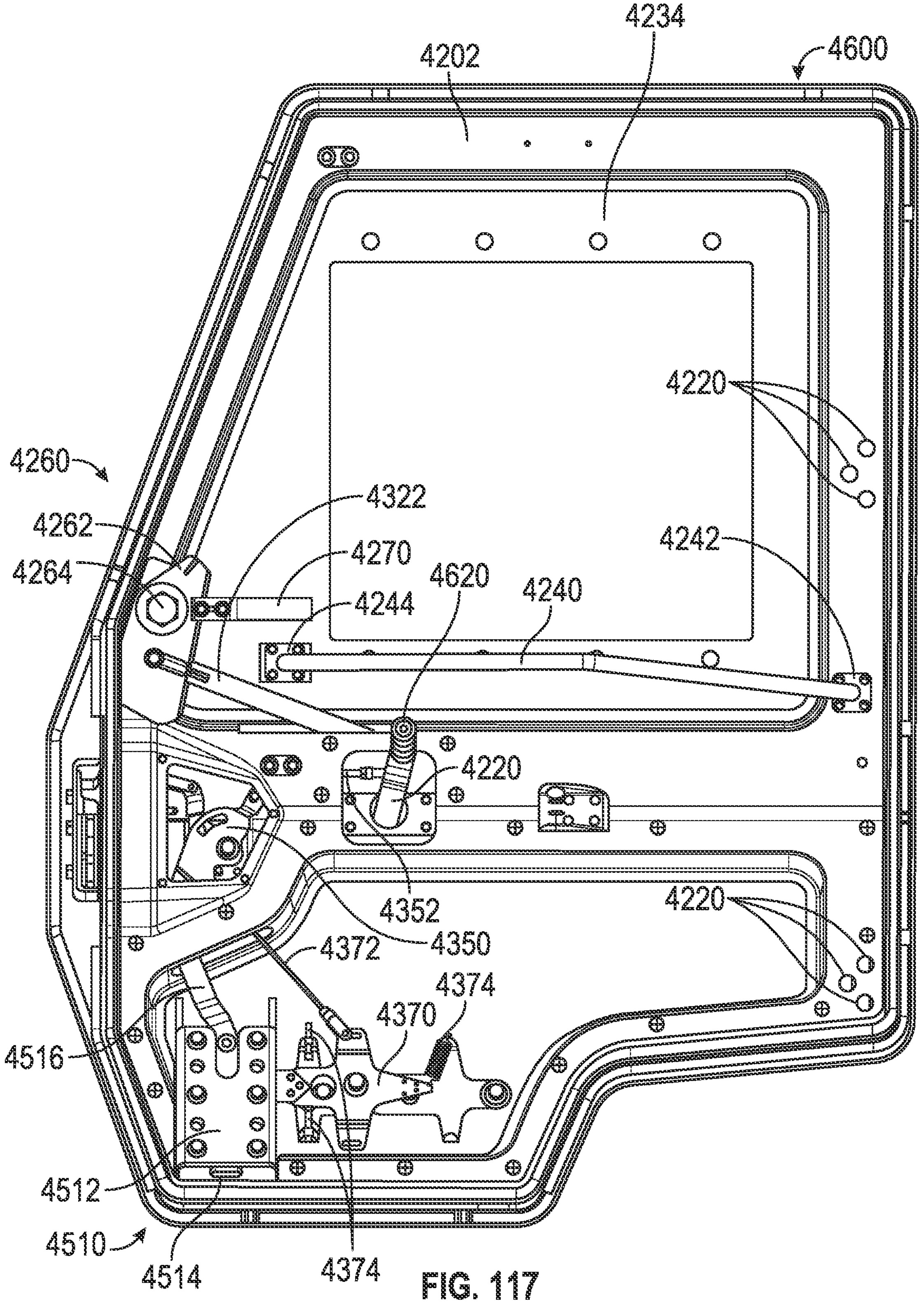
FIG. 117 is another side view of the door of FIG. 116, according to an exemplary embodiment.

Referring to FIGS. 116 and 117, a door 4600 is shown according to an alternative embodiment. The door 4600 may be substantially similar to the door 4500 except as otherwise stated. The door 4600 omits the paddle 4250, the apertures 4252, the fork 4270, the reinforcement plate 4272, and the reinforcement plate 4552. The door 4600 includes a window surround 4602 that is not configured to be coupled to the fork 4270. The door 4600 further includes a reinforcement plate 4610 in place of the reinforcement plate 4272 and a reinforcement plate 4612 in place of the reinforcement plate 4552. Referring to FIG. 117, the door 4600 includes a handle or grip 4620 coupled to the handle link 4320 to facilitate actuation of the lock assemblies by an occupant. The grip 4620 extends laterally inward from the door 4600.

Figure 118:
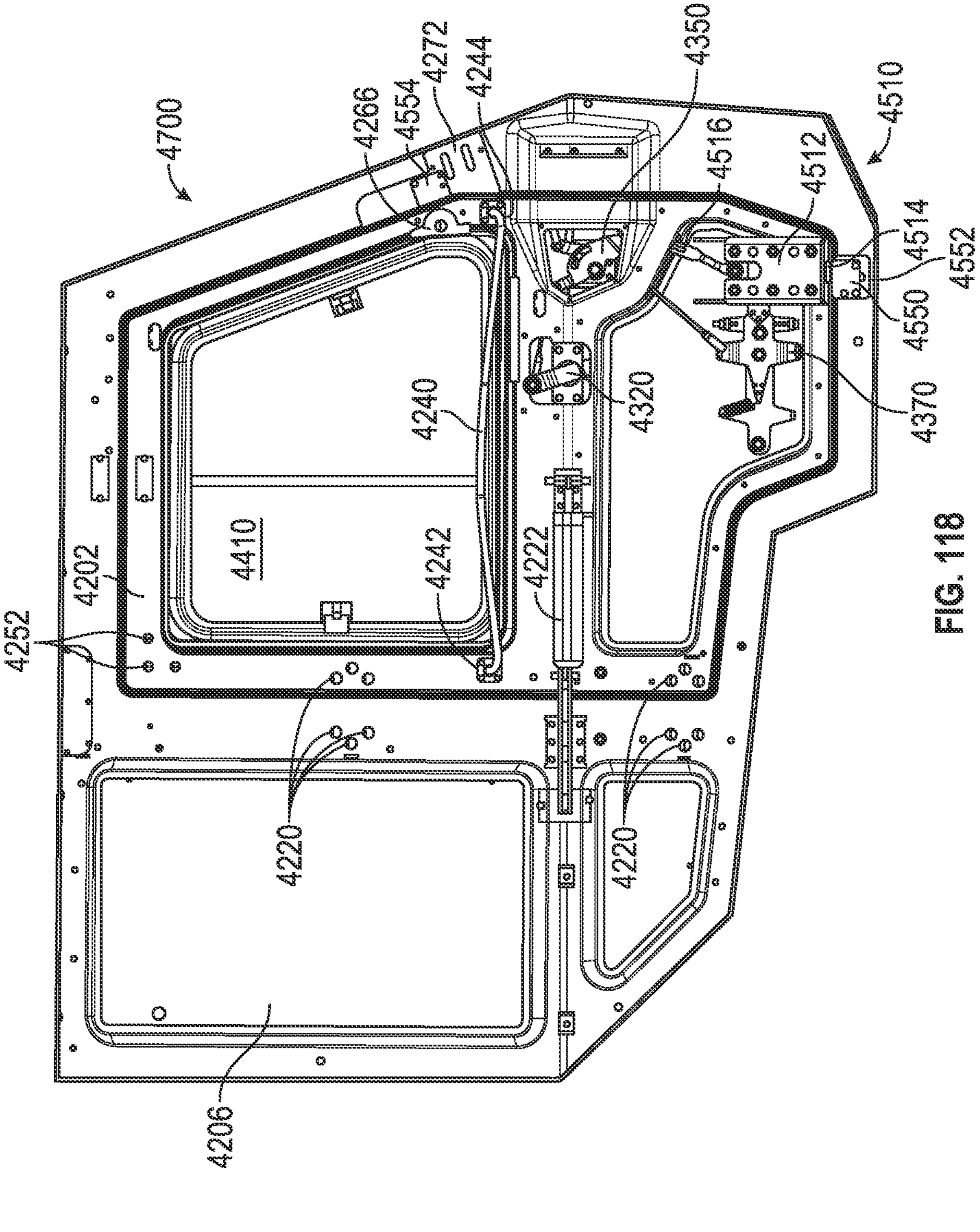
FIG. 118 is a side view of a door of the vehicle of FIG. 1, according to yet another exemplary embodiment.

Referring to FIG. 118, a door 4700 is shown according to an alternative embodiment. The door 4700 may be substantially similar to the door 4400 except as otherwise stated. The door 4700 omits the lower lock assembly 4290 and includes the lower lock assembly 4510. The door 4700 further includes the reinforcement plate 4550, the reinforcement plate 4552, and the reinforcement plate 4554.

Figure 119:
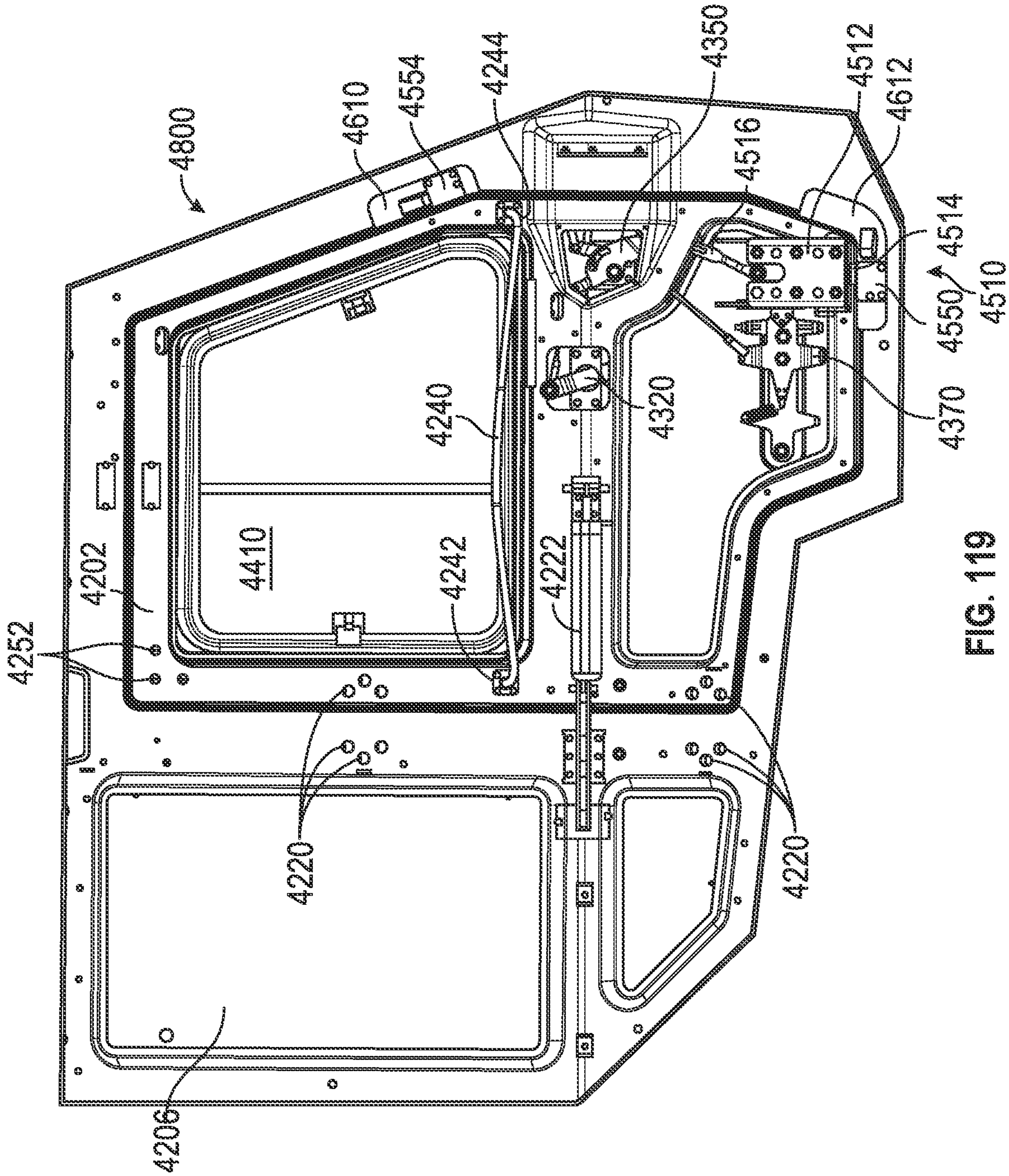
FIG. 119 is a side view of a door of the vehicle of FIG. 1, according to yet another exemplary embodiment.

Referring to FIG. 119, a door 4800 is shown according to an alternative embodiment. The door 4800 may be substantially similar to the door 4700 except as otherwise stated. The door 4800 omits the apertures 4252, the boss 4266, the reinforcement plate 4272, and the reinforcement plate 4552. The door 4800 includes the reinforcement plate 4610 and the reinforcement plate 4612.

Figure 120:
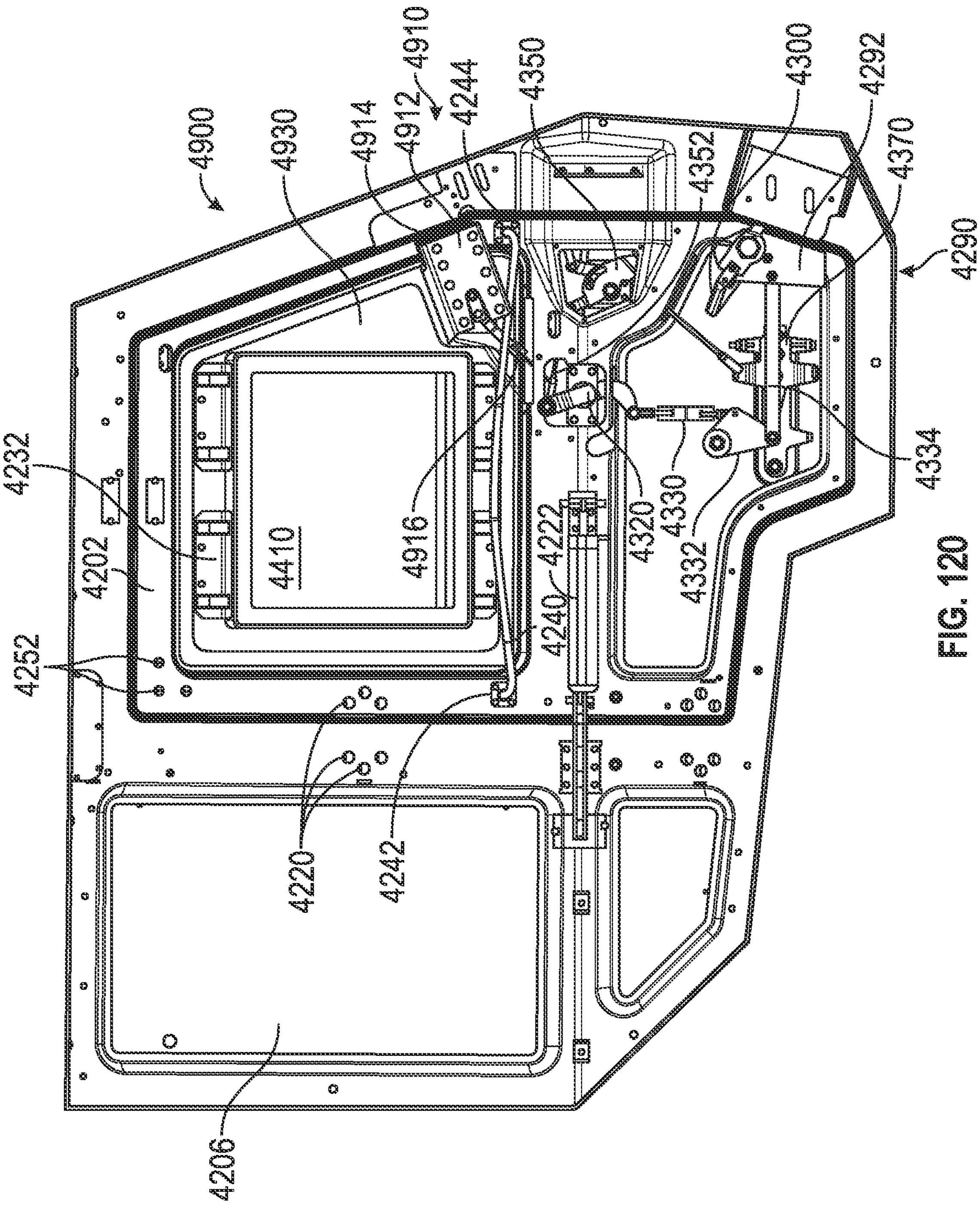
FIG. 120 is a side view of a door of the vehicle of FIG. 1, according to yet another exemplary embodiment.
Figure 121:
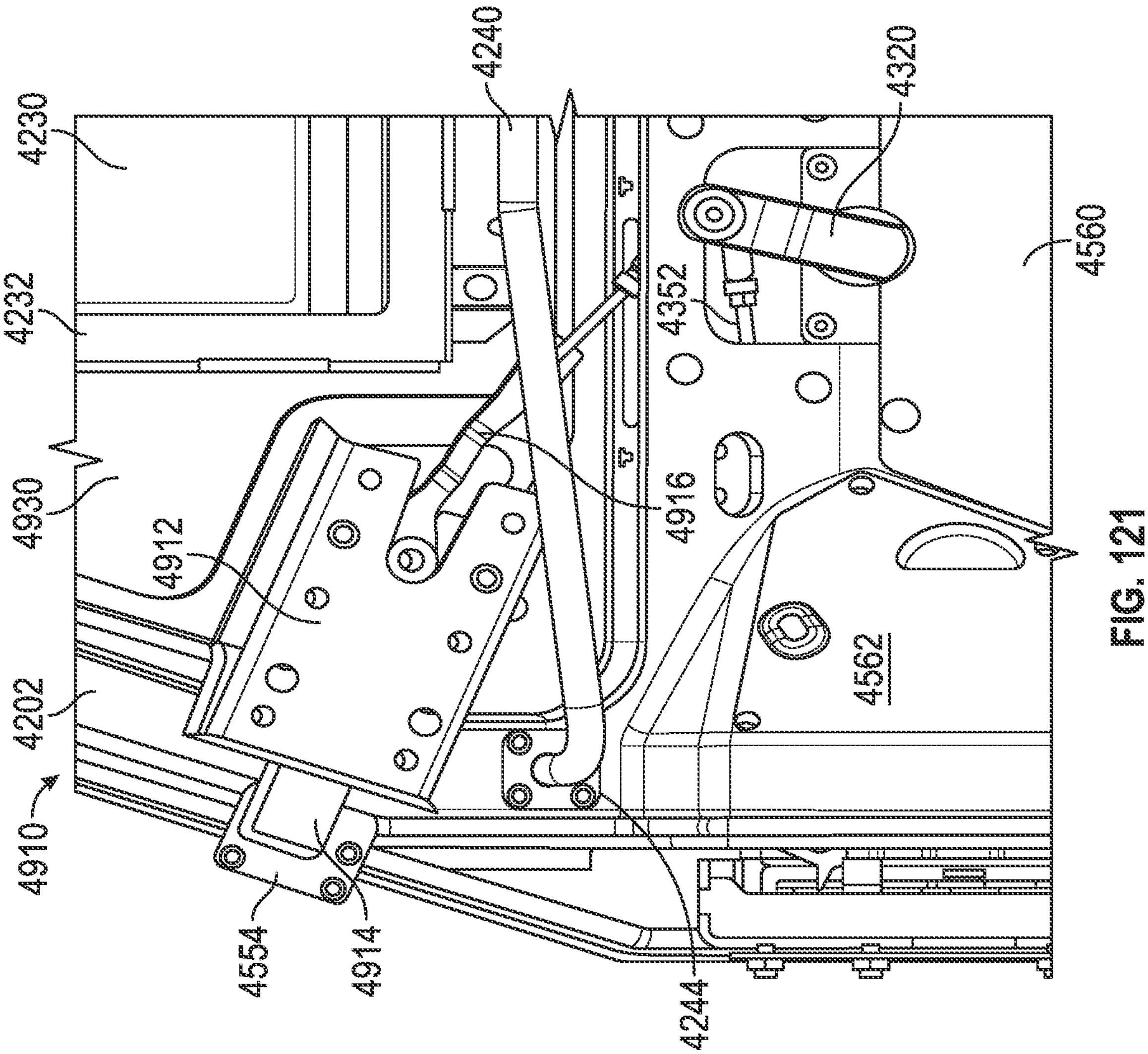
FIG. 121 is a side view of a lock assembly of the door of FIG. 120, according to an exemplary embodiment.
Figure 122:
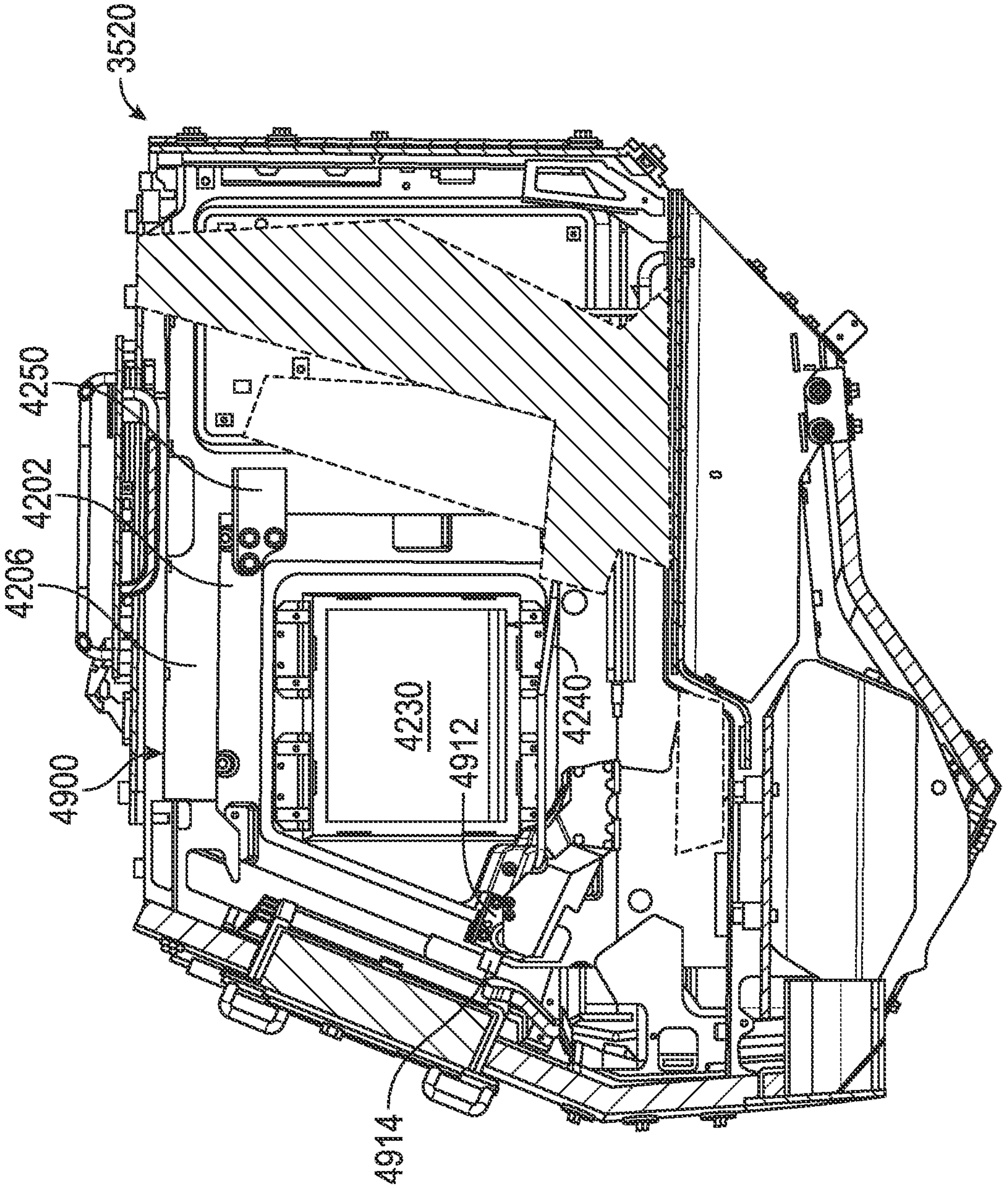

Referring to FIGS. 120 and 121, a door 4900 is shown according to an alternative embodiment. The door 4900 may be substantially similar to the door 4200 except as otherwise stated. The door 4900 omits the paddle 4250. The arrangement of the grip 4240 in the door 4900 is substantially similar to the arrangement of the grip 4240 in the door 4400. In place of the upper lock assembly 4260, the door 4900 includes a lock assembly, shown as upper lock assembly 4910. The upper lock assembly 4910 includes a body 4912 and a locking member 4914 that translates in and out of the body 4912. In a locked position, the locking member 4914 extends out of the body 4912 and over the wall 4206, preventing opening of the door 4900. In an unlocked position, the locking member 4914 is received by the body 4912, and the door 4900 can open and close freely. The locking member 4914 is connected to the connecting link 4352 through a connecting link 4916. When the handle link 4320 rotates clockwise, the locking member 4914 is extended toward the locked position. The door 4900 includes a window surround 4930 configured to be coupled to the body 4912. As shown in FIG. 122, the door 4900 includes a pair of covers 4920 coupled to the frame 4202 that cover a portion of the upper lock assembly 4910.

Figure 123:
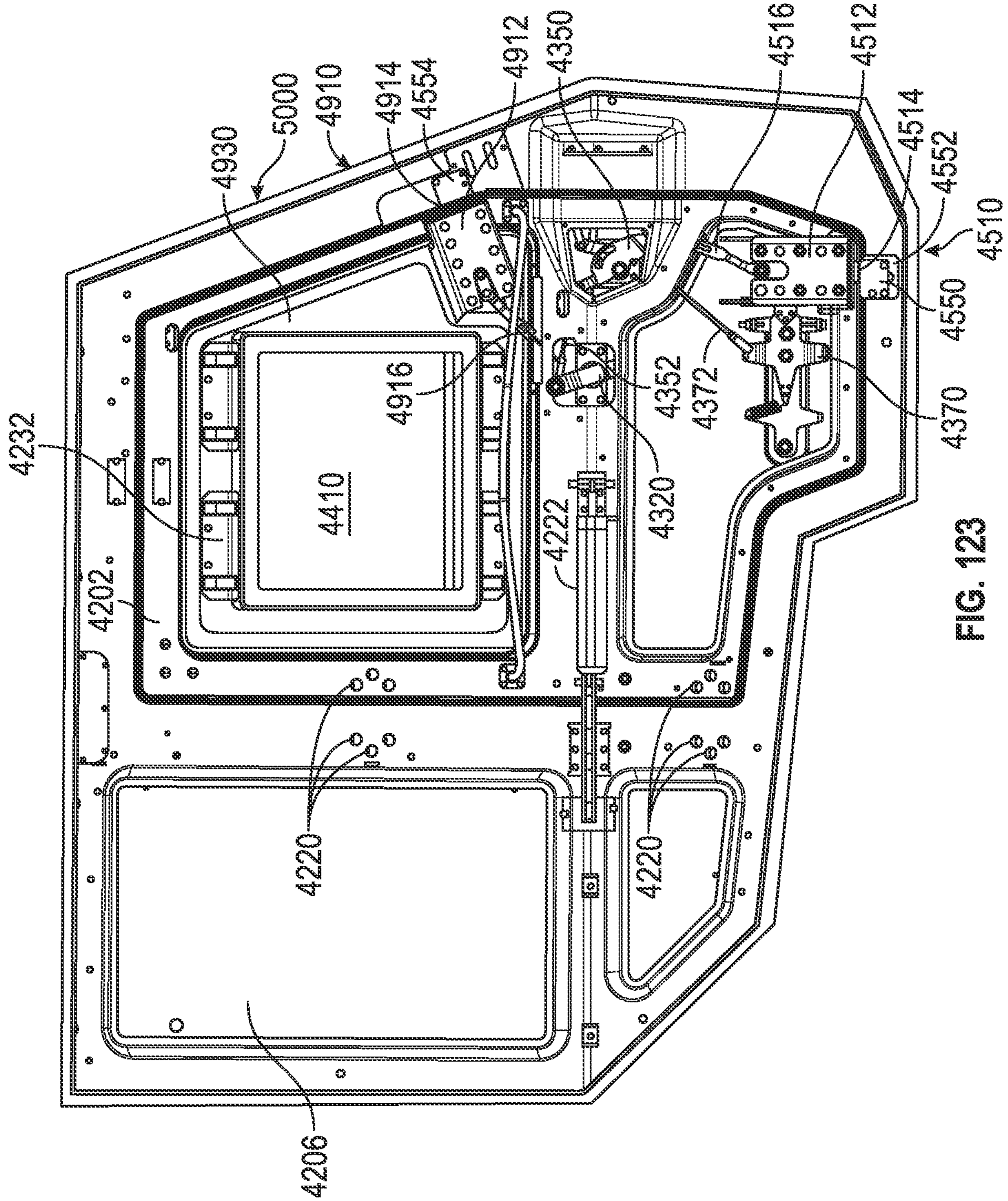
Figure 124:
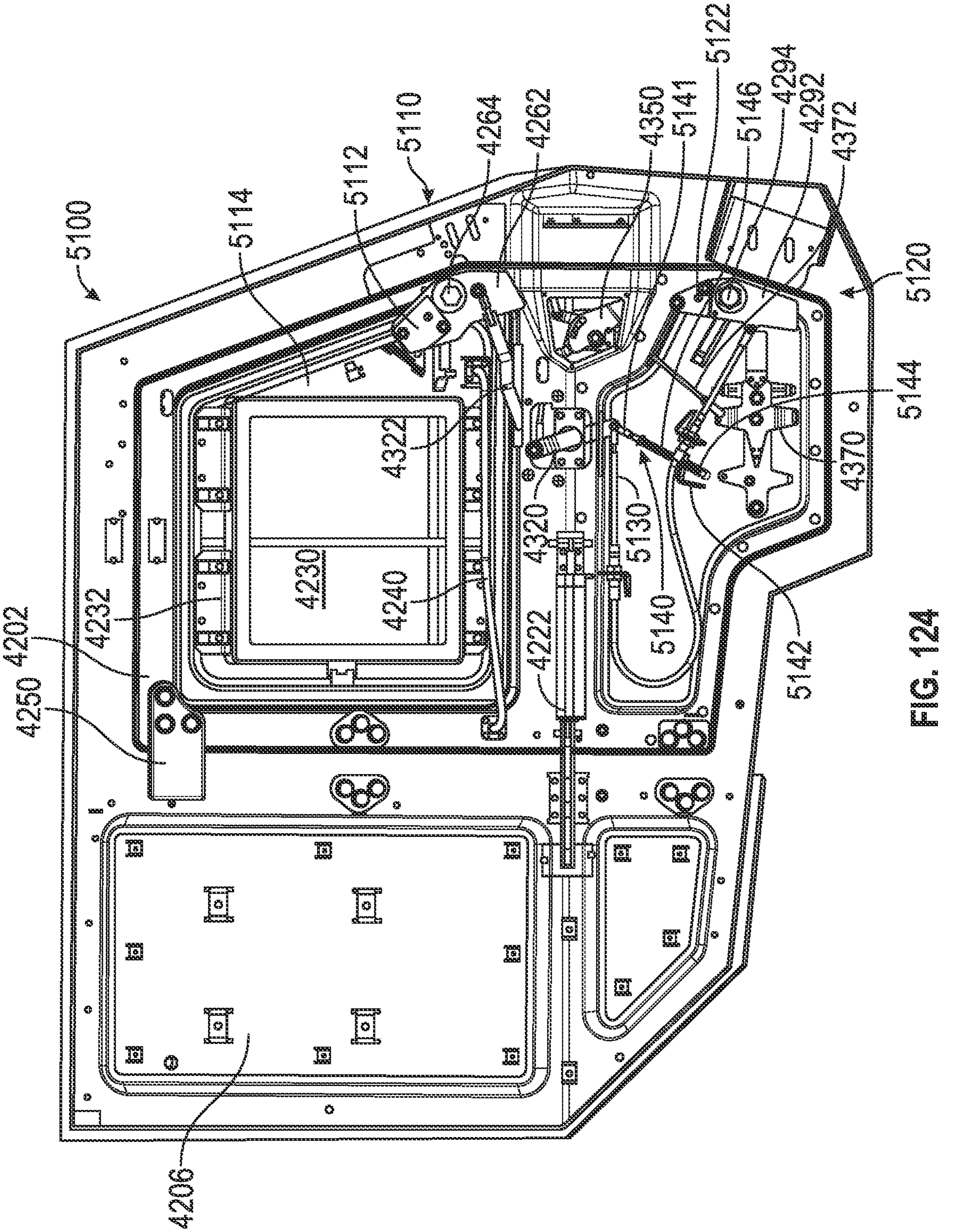

Referring to FIG. 123, a door 5000 is shown according to an alternative embodiment. The door 5000 may be substantially similar to the door 4900 except as otherwise stated. The door 5000 includes the lower lock assembly 4510 instead of the lower lock assembly 4290. The door 5000 further includes reinforcement plate 4550, reinforcement plate 4552, and reinforcement plate 4554.

Referring to FIG. 123, a door 5100 is shown according to an alternative embodiment. The door 5100 may be substantially similar to the door 4200 except as otherwise stated. The door 5100 includes an upper lock assembly 5110 and a lower lock assembly 5120. The upper lock assembly 5110 and the lower lock assembly 5120 are substantially similar to the upper lock assembly 4260 and the lower lock assembly 4290, respectively, except the upper lock assembly 5110 includes a weight, shown as counterweight 5112, and the lower lock assembly 5120 includes a counterweight 5122. The counterweight 5112 is coupled to the paddle 4262. The counterweight 5112 is offset from the axis of rotation of the paddle 4262 extending through the bolt 4264. The force of gravity acting on the counterweight 5112 provides a biasing force to bias the paddle 4262 toward the locked position. Accordingly, during a blast event, the mass of the counterweight 5112 causes the paddle 4262 to rotate toward the locked position automatically, preventing the door 5100 from opening. Similarly, the counterweight 5122 is coupled to the paddle 4292 and offset from the axis of rotation of the paddle 4292. Accordingly, the counterweight 5122 provides a similar effect. Additionally, the door 5100 includes a window surround 5114 that couples to the frame 4202, the window frame 4232, and the grip 4240.

The door 5100 omits the turnbuckle 4330, the rotating link 4332, and the link 4334. Instead, the door 5100 includes a tensile member, shown as cable 5130. The cable 5130 couples the handle link 4320 to the paddle 4292. When the handle link 4320 is rotated counterclockwise, the handle link 4320 imparts a tensile force on the cable 5130. The cable 5130 transfers this force to the paddle 4292, overcoming the biasing force of the counterweight 5122 and moving the paddle 4292 to the unlocked position. When the handle link 4320 is rotated clockwise, tension on the cable 5130 is released, and the counterweight 5122 moves the paddle 4292 back to the locked position.

The door 5100 further includes a biasing assembly, shown as biasing device 5140. The biasing device 5140 includes a shaft 5141 pivotably coupled to the handle link 4320. The shaft 5141 is received through an aperture defined by a protrusion 5142 extending outward from the frame 4202. A first biasing member 5144 extends between the shaft 5141 and the protrusion 5142 such that the first biasing member 5144 compresses when the shaft 5141 moves upward. A second biasing member 5146 extends between the shaft 5141 and the protrusion 5142 such that the second biasing member 5146 compresses when the shaft 5141 is moved downward. When the handle link 4320 is rotated between the locked position and the unlocked position, the shaft 5141 first moves downward, then back upward. This movement compresses the second biasing member 5146 such that the second biasing member 5146 provides a biasing force onto the shaft 5141. The biasing force opposes the initial portion of the movement of the handle link 4320 and facilitates the second portion of the movement of the handle link 4320. Accordingly, when the handle link 4320 is near the locked position, the biasing device 5140 opposes motion toward the unlocked position. Similarly, when the handle link 4320 is near the unlocked position, the biasing device 5140 opposes motion toward the locked position the biasing device 5140. The direction of the biasing force changes at a position between the unlocked position and the locked position. The biasing device 5140 prevents the door 5100 from unintentionally being locked or unlocked, especially during a blast event.

A number of the doors described herein provide the operator with the ability to reconfigure each door between a number of different configurations. Each of the door configurations may offer a different degree of protection (e.g., blast resistance, protection from an intruder outside the vehicle 3510 opening the door, bullet resistance, etc.). The doors may be reconfigured between an A-kit configuration (e.g., an unarmored configuration, a light armor configuration, etc.) and a C kit configuration (e.g., an armored configuration, a heavily armored configuration, etc.). In the A-kit configuration, the door is lightly armored for use in a situation where minimal protection is required (e.g., civilian use, military use in a non-combat area, etc.). The A-kit configuration requires fewer and/or less robust components to achieve this level of protection than the C-kit, and as such can be lighter and lower cost. In the C-kit configuration, the door is configured for use in a combat zone. In the C-kit configuration, additional armor and/or locking components may be added to the door to increase the degree of protection afforded to the operator. By way of example, the C-kit configuration may provide a greater resistance to explosives, projectiles, or unauthorized opening of the door by an outside intruder. In some embodiments, the door is additionally configurable into a B-kit configuration. The B-kit configuration also affords a greater degree of protection than the A-kit configuration, but utilizes different components than the C-kit configuration. The ability to change between different configurations facilitates the vehicle 3510 being optimally configured for the situation in which it will operate.

Each door may be reconfigurable between the different configurations without modifying the frame 4202. Each door may be reconfigured by simply adding components to or removing components from the frame 4202. This facilitates the vehicle 3510 being reconfigured (e.g., between the A-kit and C-kit configurations) without having to store an entirely different door or frame 4202 for each configuration. When this concept is applied over an entire fleet of vehicles, a relatively small number of components (e.g., the components necessary to outfit a portion of the vehicles in the fleet into the C-kit configuration) can be stored and distributed to only the vehicles that will be operating in situations that require the added components.

By way of example, the door 4400 may represent an A-kit configuration, the door 4900 may represent a B-kit configuration, and the door 4200 may represent a C-kit configuration. The door is selectively reconfigurable between the A-kit configuration, the B-kit configuration, and the C-kit configuration. In the C-kit configuration, the door 4200 is configured for use in a combat scenario. The exterior of the door 4200 may be outfitted with armor panels or another type of armor. The door 4200 includes the upper lock assembly 4260 and the lower lock assembly 4290 that function as combat locks, increasing the blast resistance of the door 4200 while preventing the door from being opened by an outside intruder. The door 4200 further includes the paddle 4250, which provides added protection to the operator, as described above.

In the A-kit configuration, the door 4400 is configured for use in a non-combat scenario. When reconfiguring the door 4200 (i.e., the C-kit configuration) into the door 4400 (i.e., the A-kit configuration), the grip 4240, the paddle 4250, the upper lock assembly 4260, and the link 4322 are removed by unbolting them from the frame 4202. The boss 4266 remains coupled to the frame 4202 to facilitate later coupling of the upper lock assembly 4260 to the frame 4202. A grip 4240 of increased width may be bolted to the frame 4202, and the window 4230, the window frame 4232, and the window surround 4234 may be replaced with the cover 4410. In other embodiments, the window 4230 is replaced with a window that is thinner and/or made from a less blast resistant or bulletproof material. The reverse of this process can be completed to reconfigure the door 4400 (i.e., the A-kit configuration) into the door 4200 (i.e., the C-kit configuration).

In the B-kit configuration, the door 4900 is configured for use in a combat scenario. When reconfiguring the door 4400 (i.e., the A-kit configuration) into the door 4900 (i.e., the B-kit configuration), the cover 4410 is removed and replaced with the window 4230, the window frame 4232, and the window surround 4930 which is, in turn, coupled to the upper lock assembly 4910. The connecting link 4916 is coupled to the connecting link 4352 to facilitate actuation of the locking member 4914. The reverse of this process can be completed to reconfigure the door 4900 (i.e., the B-kit configuration) into the door 4400 (i.e., the A-kit configuration).

In another embodiment, the door 5100 is a C-kit configuration. To convert the door 5100 to an A-kit configuration, the grip 4240, the paddle 4250, the upper lock assembly 5110, and the link 4322 are removed by unbolting them from the frame 4202. The boss 4266 remains coupled to the frame 4202 to facilitate later coupling of the upper lock assembly 5110 to the frame 4202. A grip 4240 of increased width may be bolted to the frame 4202, and the window 4230, the window frame 4232, and the window surround 5114 may be replaced with the cover 4410. In other embodiments, the window 4230 is replaced with a window that is thinner and/or made from a less blast resistant or bulletproof material.

Frame Assembly

Frame Assembly

Figure 125A:
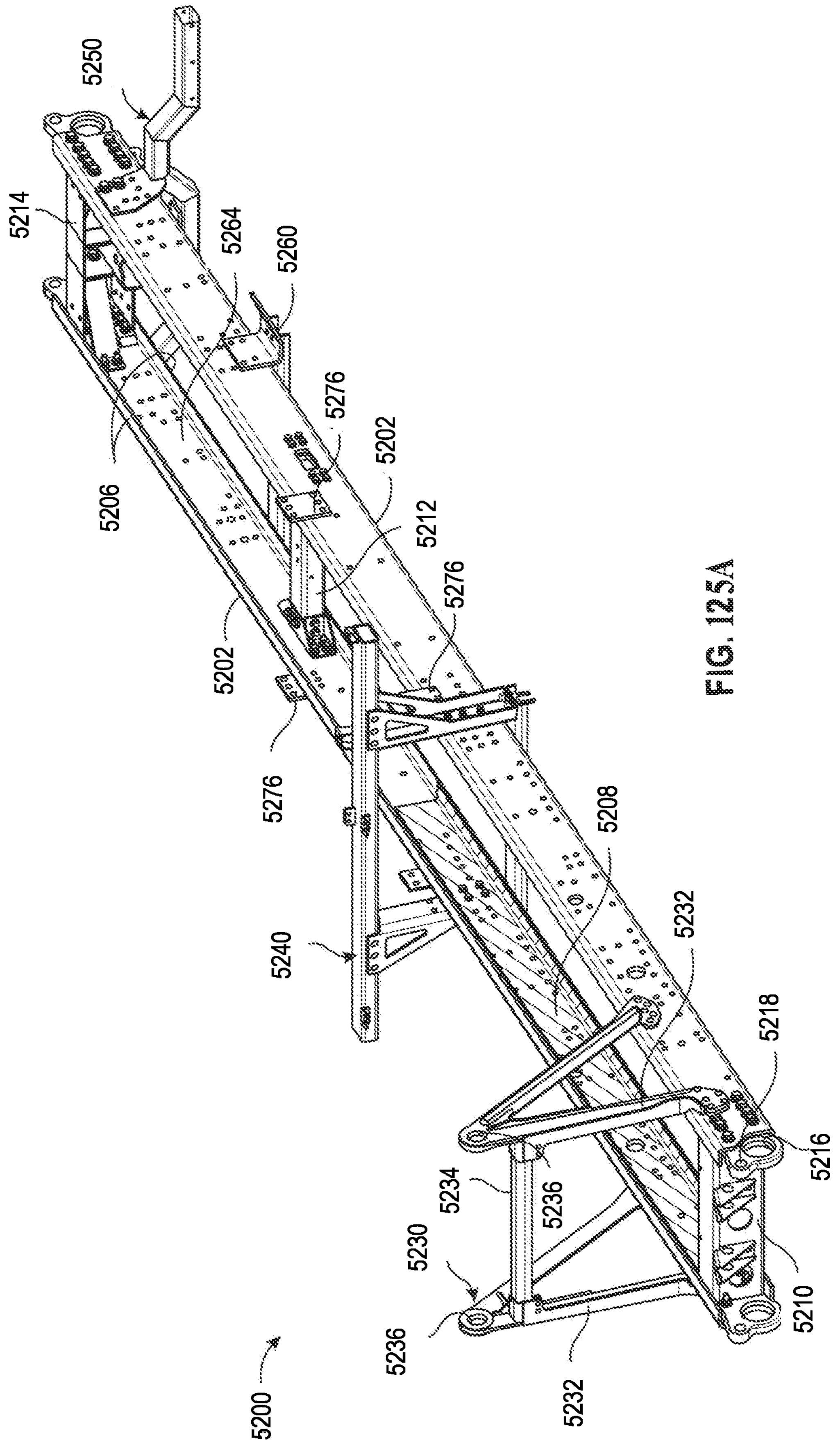

Referring to FIG. 125A, a vehicle frame, shown as frame 5200, is illustrated. The frame 5200 includes a number of components that are modularly modifiable to suit a particular application. The frame 5200 includes two longitudinal frame rails, shown as longitudinal frame rails 5202, that define a longitudinal axis of the frame 5200. In some embodiments, the frame rails 5202 have a C-channel cross-section that includes a base 5204 and two legs 5206 oriented perpendicular to the base 5204. In other embodiments, the frame rails 5202 may have a different cross-sectional shape (e.g., tubular, etc.). The legs 5206 define a width of the frame rail 5202, and the base 5204 defines a height of the frame rail 5202.

Frame liners 5208 may be coupled (e.g., bolted, welded, etc.) to the interior of the frame rails 5202 and provide additional structural rigidity (e.g., in areas of high stress, etc.). In areas with lesser stresses, the frame liners 5208 may be omitted from the frame rails 5202 in order to reduce weight. In some embodiments, the frame liners 5208 have a C-channel cross-section. In other embodiments, the frame liners 5208 have various cross-sections (e.g., angle, rectangular tube, etc.). In some embodiments, the frame liners 5208 extend from immediately behind a front cross member 5210 to between an accessory bracket 5240 and a mid-section cross member 5212. Placing the liners 5208 on the interior of the frame rails 5202 keeps the outside surface of the base 5204 of the frame rails 5202 free for mounting side plates, which can then be used to mount other components (e.g., suspension components, lift points, etc.). In some embodiments, the use of external reinforcement plates (i.e., fishplates) as opposed to liners is precluded in some locations by the presence of other side plates. By way of example, the front tractive assembly side plates 5270, shown in FIG. 125M, prevent the use of fishplates near the front end of the frame rails 5202.

Figure 125B:
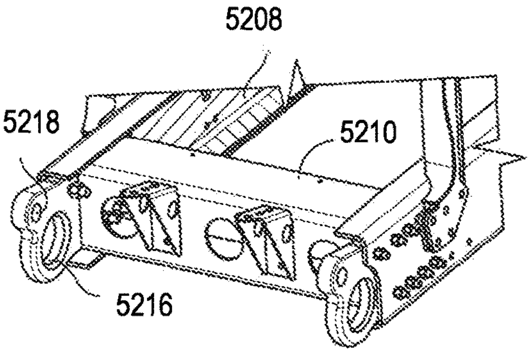
Figure 125C:
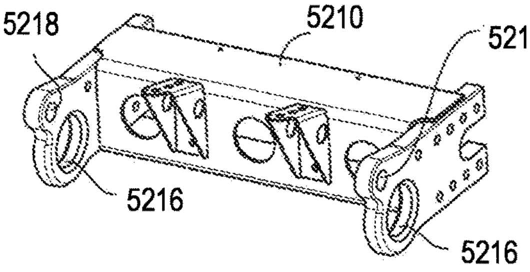
Figure 125D:
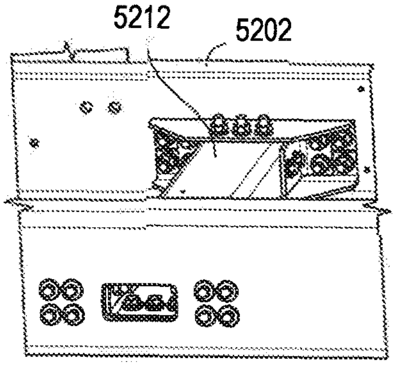
Figure 125E:
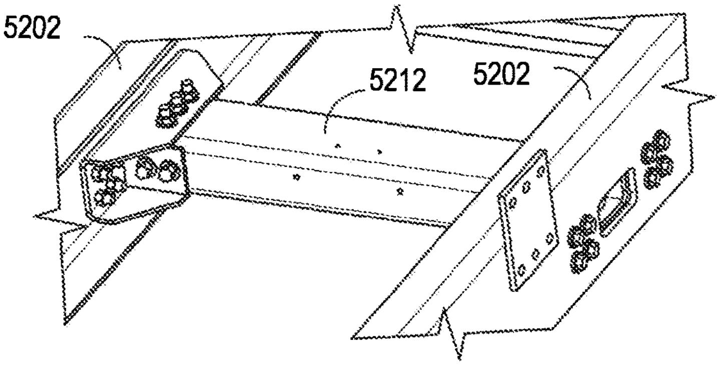
Figure 125F:
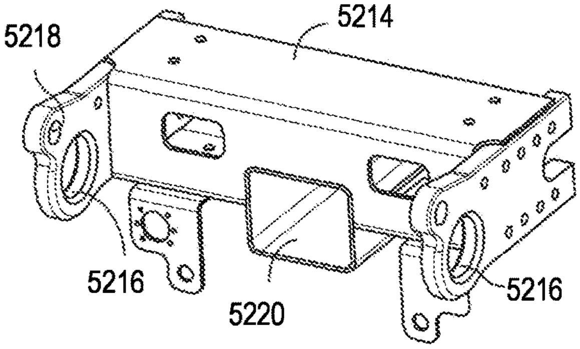
Figure 125G:
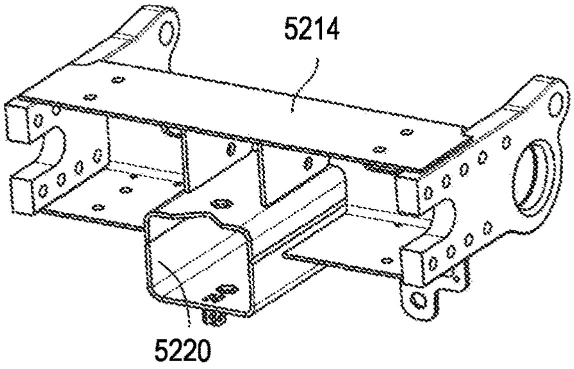

The frame 5200 may include the front cross member 5210, shown in FIGS. 125B and 125C, the mid-section cross member 5212, shown in FIGS. 125D and 125E, and the rear cross member 5214, shown in FIGS. 125F and 125G. The cross members 5210, 5212, and 5214 are coupled (e.g., bolted, welded, etc.) to the frame rails 5202. In some embodiments, as shown in FIG. 125D, the frame rails 5202 are cut away to facilitate access to the interior of the cross members 5210, 5212, and 5214 (e.g., to access mounting hardware, etc.). The cross members 5210, 5212, and 5214 may be made from various materials (e.g., steel, aluminum, etc.) with various cross-sections (e.g., square tube, C-channel, angle, etc.). In some embodiments, the frame 5200 includes more than one mid-section cross member 5212. In some embodiments, the front and rear cross members 5210 and 5214 incorporate tow eyes 5216 and tie down points 5218. The tow eyes 5216 may act as an interface for a connection to another object (e.g., with a strap or chain), may facilitate towing (e.g., push, pull) another object, and/or for the vehicle to be towed. The tie down points 5218 may act as interface for securing the vehicle to another object. By way of example, the tie down points 5218 might be used to secure the vehicle to a rail car. In some embodiments, the rear cross member 5214 incorporates a receiver 5220. Referring to FIGS. 125F and 125G, the receiver 5220 has a tubular cross-section and is perpendicular to the rear cross member 5214. The receiver 5220 is configured to translatably couple a towing mechanism (e.g., a pintle hook, a ball, etc.) to the frame 5200. The receiver 5220 may include a component that fixes the towing mechanism relative to the receiver 5220. By way of example, a pin may be configured to pass through both the receiver 5220 and the towing mechanism.

Figure 125H:
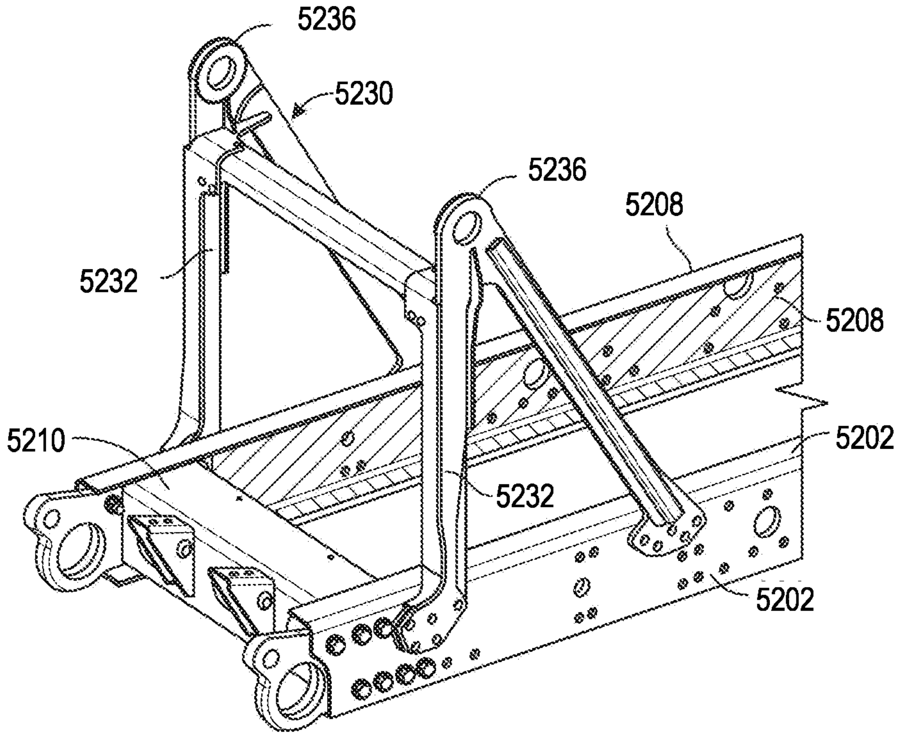

Referring to FIG. 125A, the frame 5200 further includes a front lift structure, shown as lift structure 5230. The lift structure 5230 may be coupled (e.g., bolted, welded, etc.) to the frame rails 5202. In some embodiments, the lift structure 5230 is located near the front end portion of the frame rails 5202 and provides an interface through which to lift the front end portion of the vehicle 10. Referring to FIG. 125H, the lift structure 5230 includes two vertical members 5232 and one cross member 5234. The cross member 5234 is coupled to the vertical member 5232 and provides structural rigidity to the vertical members 5232. The vertical members 5232 each include a lift ring 5236 near the top of each member. The lift ring 5236 acts as an interface by which the vehicle 10 can be lifted. As shown, the vertical members 5232 have a triangular shape or an A-shape to provide resistance to bending about the connection to the frame 5200. In other embodiments, the front lift structure 5230 is otherwise shaped. In some embodiments, the vertical members 5232 incorporate side plates to mount to the exterior of the base 5204 of the frame rails 5202. In some embodiments, the vertical members 5232 are partially or completely covered by a hood 5238 (depicted in FIG. 1). In some such embodiments, the lift rings 5236 are accessible without adjusting the position of (e.g., opening, etc.) the hood 5238.

Throughout a number of the embodiments discussed herein, the front lift structure (e.g., the front lift structure 5230) is placed in a consistent (e.g., identical, etc.) location relative to another portion (e.g., the frontmost portion of the frame rails 5202) of the frame (e.g., the frame 5200, etc.). The front lift structure consistency facilitates having multiple vehicle variants, each with the same or similar front end structure. By way of example, the front cabin 3520 and the hood 5238 may have a fixed relationship to the front lift structure 5230, such that locating the front lift structure 5230 in a consistent location also consistently locates the front cabin 3520 and the hood 5238, facilitating commonality of certain parts of the vehicle 10 (e.g., parts located in the front end of the vehicle) across most or all vehicle variants, reducing manufacturing and design costs. Consistently locating the front lift structure 5230 additionally provides a consistent lifting point regardless of the vehicle variant. Various other components (e.g., the accessory bracket 5240, discussed below) may be consistently located regardless of vehicle variant.

Figure 125I:
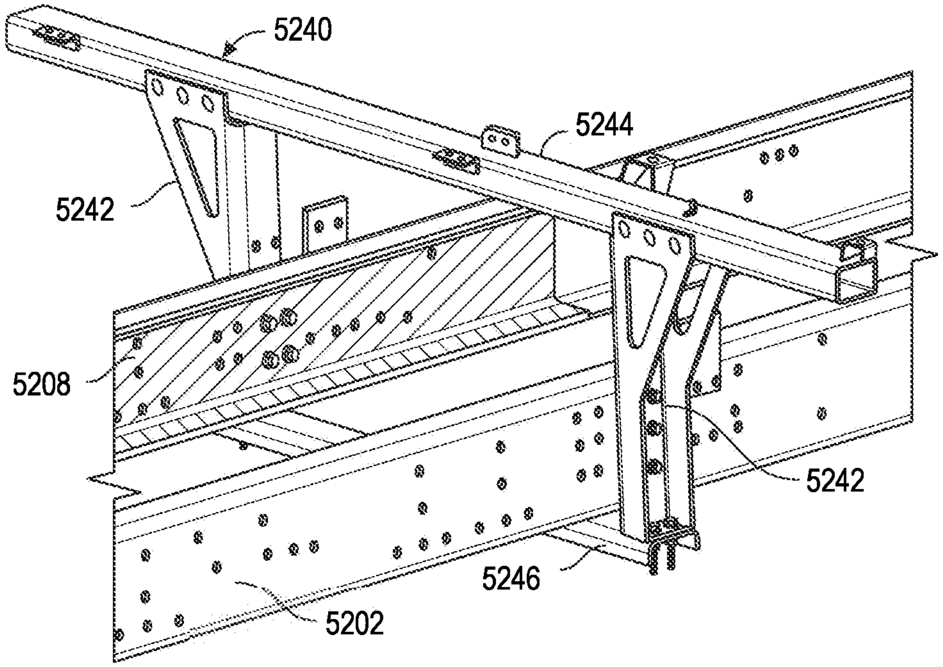

Referring to FIG. 125A, the frame 5200 further includes a bracket, shown as accessory bracket 5240. The bracket 5240 may be coupled (e.g., bolted, welded, etc.) to the frame rails 5202. In some embodiments, the bracket 5240 is located rearward of the lift structure 5230. Referring to FIG. 125I, the bracket 5240 includes two vertical members 5242, an upper cross member 5244, and a lower cross member 5246. The vertical members 5242 are coupled to the frame rails 5202, and the cross members 5244, 5246 are coupled to the vertical members 5242. In some embodiments, the vertical members 5242 are perpendicular to the cross members 5244, 5246. In some embodiments, in addition to providing structural rigidity to the frame members, additional components (e.g., an air cleaner, a spare tire, etc.) are coupled to the accessory bracket 5240. In some embodiments, the exact number and type of components coupled to the accessory bracket 5240 varies based on the application of the vehicle. In some such embodiments, a platform is coupled to the upper cross member 5244.

Figure 125J:
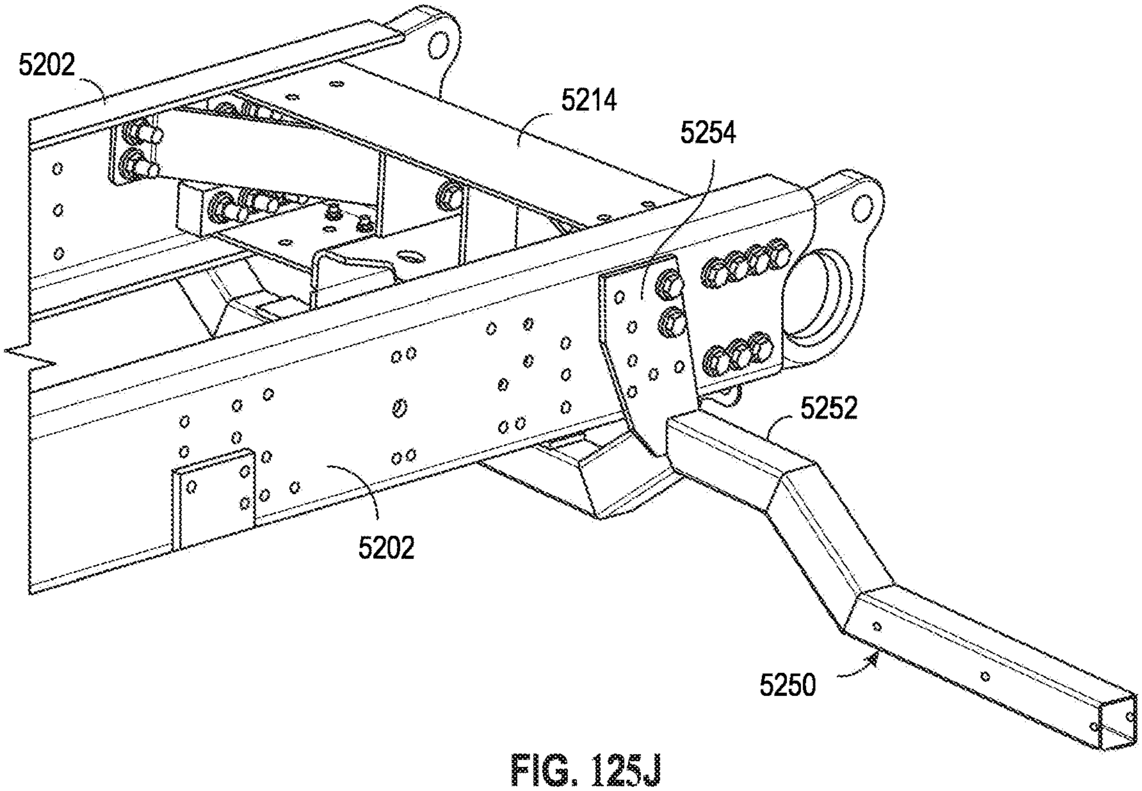

Referring to FIG. 125A, the frame 5200 further includes a bumper, shown as rear bumper 5250. In some embodiments, the rear bumper 5250 is located towards the rear end of the vehicle 10, proximate the rear cross member 5214. As shown in FIG. 125J, in some embodiments, the rear bumper 5250 includes a structural section 5252 and side plates 5254. The structural section 5252 includes a series of tubular members coupled to one another to form a single member. The shape of the structural section 5252 may vary to provide clearance around wheels or other vehicle components, or to facilitate connection to the frame rails 5202 without extending the side plates 5254. The side plates 5254 may be coupled (e.g., welded, bolted, etc.) to the structural section 5252. The side plates 5254 may be coupled (e.g., welded, bolted, etc.) to the side surface (i.e., the base 5204) of the frame rails 5202. The location of the side plates 5254 relative to the front and the back of the frame rails 5202 may vary to avoid conflict with the rear cross member 5214. In some embodiments, mounting hardware (e.g., bolts, screws, etc.) that is used to mount the rear bumper 5250 extends through both the rear bumper 5250 and the rear cross member 5214. By way of example, as shown in FIG. 125J, the mounting hardware used to couple the rear bumper 5250 to the frame rails 5202 also couples a portion of the rear cross member 5214 to the frame rails 5202.

Figure 125K:
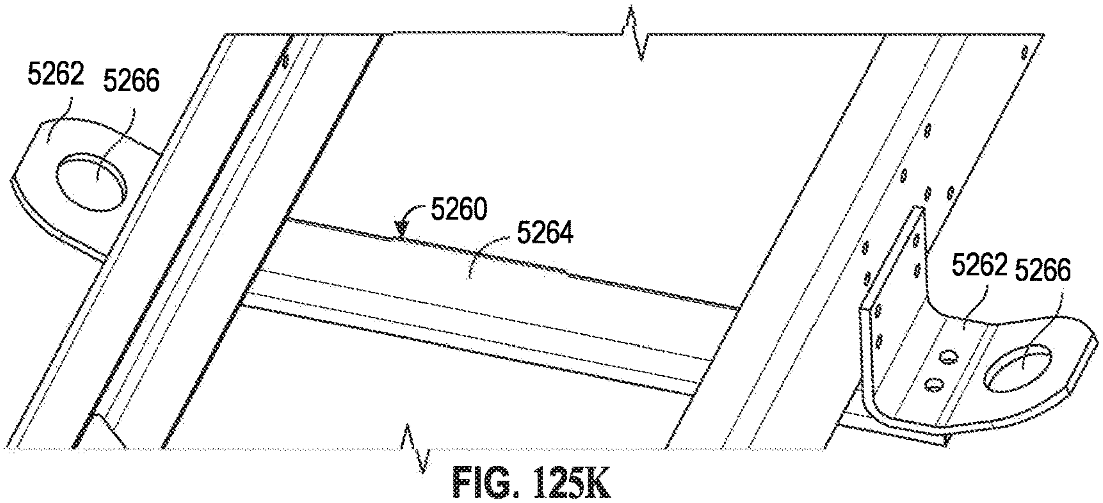
Figure 125L:
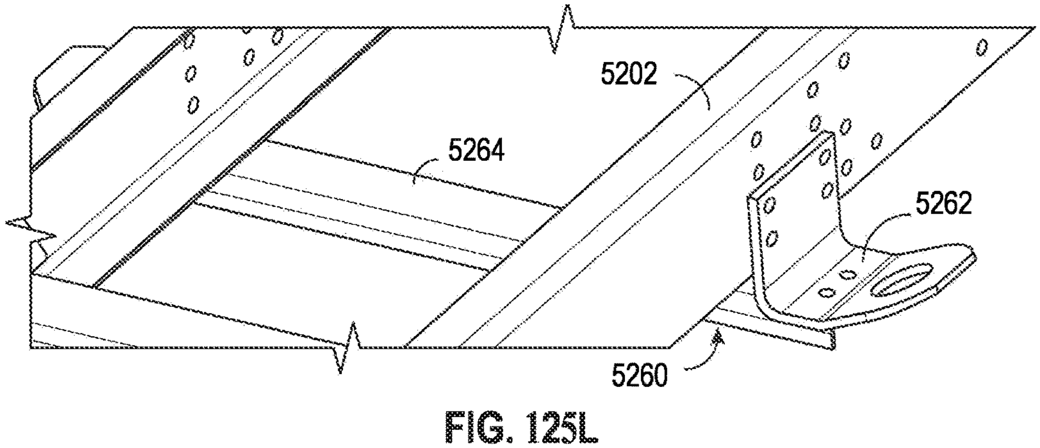

Referring to FIG. 125A, the frame 5200 also includes a lift structure, shown as rear lift structure 5260. The rear lift structure 5260 may be located near the rear end of the vehicle 10. In some embodiments, the rear lift structure 5260 is located forward of the rear bumper 5250 and rearward of the mid-section cross member 5212. The rear lift structure 5260 may facilitate lifting the rear end portion of the vehicle 10. The rear lift structure 5260, shown in FIGS. 125K and 125L, includes lift brackets 5262 and cross member 5264. The lift brackets 5262 may be coupled (e.g., bolted, welded, etc.) to the to the side surface (i.e., the base 5204) of the frame rails 5202. In some embodiments, the lift brackets 5262 protrude below the bottom surface of the frame rails 5202. In some embodiments, the lift brackets 5262 are formed using a sheet of bent material and define an upward-facing lift interface 5266 (e.g., a hole, etc.). The cross member 5264 may provide additional structural rigidity to the frame 5200 to support the forces from lifting the vehicle 10. In some embodiments, the cross member 5264 is coupled (e.g., welded, bolted, etc.) to one or both of the frame rails 5202 and the lift brackets 5262. The cross member 5264 may have various cross-sections (e.g., square tube, C-channel, angle, etc.).

Referring to FIG. 125A, the front cabin 3520 is coupled to the frame 97. In an embodiment of the vehicle 10 that includes the frame 5200, the cabin 3520 is located immediately rearward of the lift structure 5230 and immediately forward of the accessory bracket 5240. In some embodiments, the cabin 3520 is rotatably coupled to the frame 5200. In some embodiments, the vehicle 10 includes a rotation controller positioned to prevent relative movement between the cabin 3520 and the frame 5200. By way of example, a hydraulic cylinder may be coupled to the cabin 3520 and the frame 5200, and the extension or retraction of the hydraulic cylinder may cause the cabin 3520 to rotate relative to the frame 5200. The cabin 3520 may be coupled to the upper surface (i.e., the legs 5206) of the frame rails 5202 or coupled to the side surface (i.e., the base 5204) of the frame rails 5202 using side plates. In some embodiments, the cabin 3520 is coupled to the lift structure 5230 or the accessory bracket 5240.

Figure 125M:
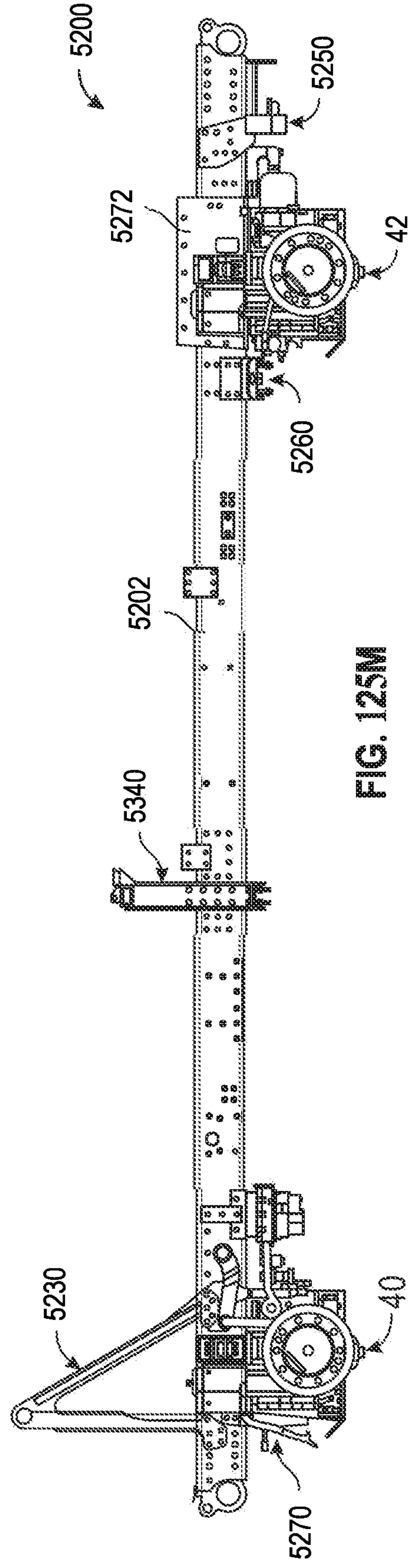

Referring to FIG. 125M, the front tractive assembly 40 and the rear tractive assembly 42 are coupled to the frame 5200. The front tractive assembly 40 may be coupled (e.g., bolted, welded, etc.) to the frame rails 5202 using front tractive assembly side plates 5270. The front tractive assembly 40 is located near the front end of the frame rails 5202. In some embodiments, the front tractive assembly 40 is located directly underneath the front lift structure 5230. The rear tractive assembly 42 may be coupled (e.g., bolted, welded, etc.) to the frame rails 5202 using rear tractive assembly side plates 5272. The rear tractive assembly 42 is located near the rear end of the frame rails 5202. In some embodiments, the rear tractive assembly 42 is located between the rear lift structure 5260 and the rear bumper 5250. In some embodiments, the rear tractive assembly side plates 5272 extend above the top surface of the frame rails 5202 and couple the mission equipment 154 to the frame rails 5202. Referring to FIG. 125A, side plates, shown as mounting side plates 5276, are coupled to the frame rails 5202. The side plates 5276 extend above the top surface of the frame rails 5202 and may facilitate coupling various components (e.g., the mission equipment 154, other frame members, etc.) to the frame 5200.

The construction of the frame 5200 facilitates modification thereof to suit different vehicle variants. The incorporation of C-channel frame rails 5202, frame liners 5208, and mounting of other components to the frame 5200 using side plates facilitates modification of the frame 5200 by changing only the lengths and locations of certain components. By way of example, the length of the frame rails 5202 may be extended to suit a particular application, and the frame liners 5208 may be moved, extended, or added to suit the loading of the application. Certain applications may require a longer frame 5200 to suit different mission equipment 154 or to carry a greater number of objects and/or objects of greater size. The frame liners 5208 may be located in areas of greater stress, the locations of which are dictated by the intended application of the vehicle 10. The extension of the tractive assembly side plates 5272 and the mounting side plates 5276 above the frame rails 5202 facilitates mounting other components to the frame 5200. The tractive assembly side plates 5272 and the mounting side plates 5276 may additionally be moved, added, removed, or sized to suit the application. Coupling other components (e.g., mission equipment 154, front tractive assemblies 40, rear tractive assemblies 42, the rear bumper 5250, etc.) to the frame 5200 using side plates (e.g., the tractive assembly side plates 5272 and the mounting side plates 5276) facilitates modification of the structure of the frame 5200 just by changing the size and location of the side plates.

Hereinafter are described various alternative embodiments to the frame 5200. The alternative embodiments shown in FIGS. 126A-135C may be substantially the same as or similar to the frame 5200 as shown in FIGS. 125A-125M, except as described below. Elements having the same or similar names and similar reference numerals may be substantially the same, except as described below. By way of example, the front lift structure 5230 is substantially similar or the same as a front lift structure 5330. The various embodiments described below may correspond to different vehicle variants.

Figure 126A:
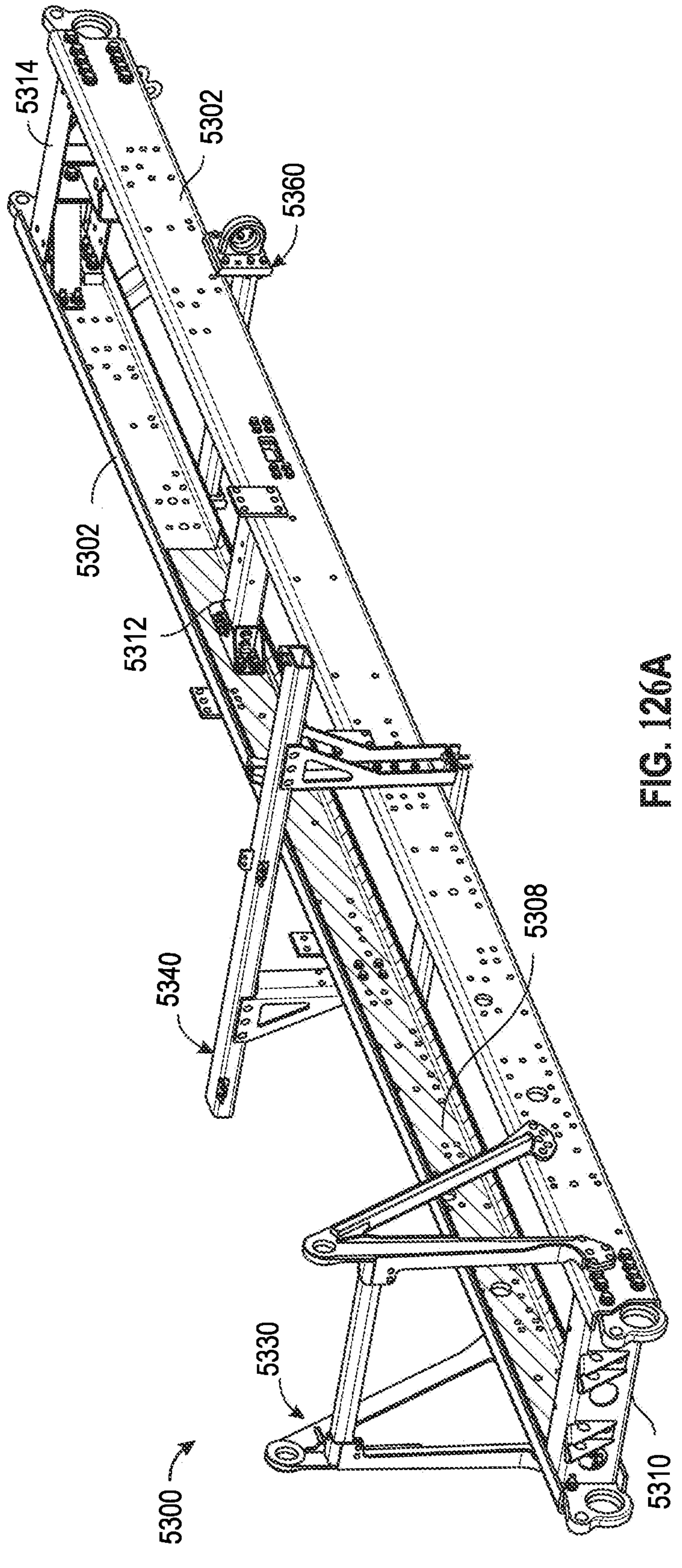
Figure 126B:
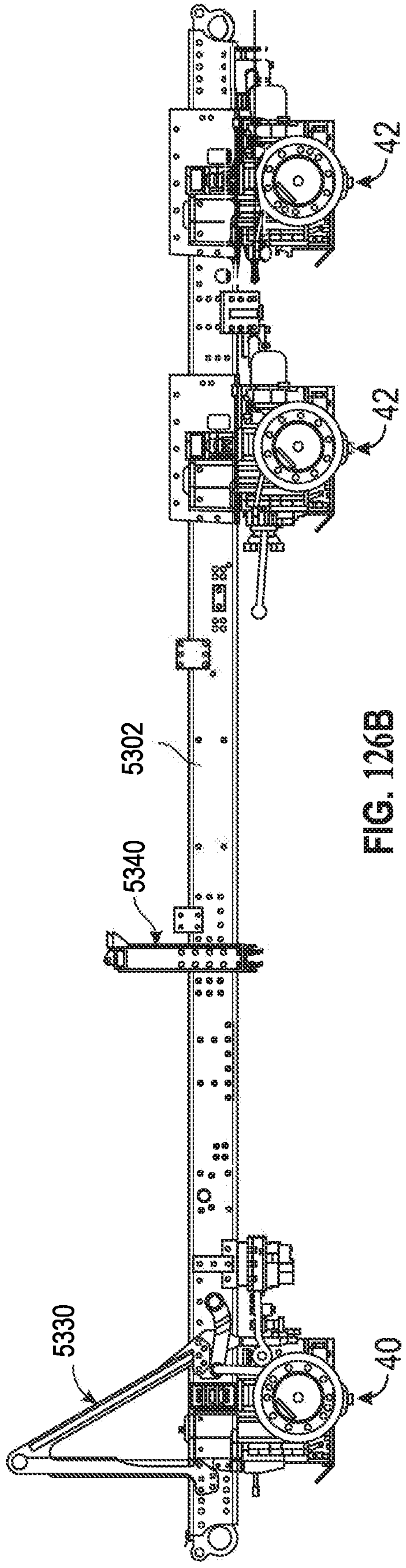

Referring to FIG. 126A, a frame, shown as frame 5300, is an alternative embodiment to the frame 5200. The frame 5300 may include one or more of longitudinal frame rails 5302, frame liners 5308, a front cross member 5310, a mid-section cross member 5312, a rear cross member 5314, a front lift structure 5330, an accessory bracket 5340, and a rear lift structure 5360. The frame 5300 may not include a rear bumper. The frame liners 5308 may extend from immediately behind the front cross member 5310 to between the mid-section cross member 5312 and the rear lift structure 5360. The frame rails 5302 may be extended to accommodate a front tractive assembly 40 and two rear tractive assemblies 42, as shown in FIG. 126B. As shown in FIG. 126B, one rear tractive assembly is located between the rear cross member 5314 and the rear lift structure 5360, and the other rear tractive assembly is located immediately forward of the rear lift structure 5360.

Figure 126C:
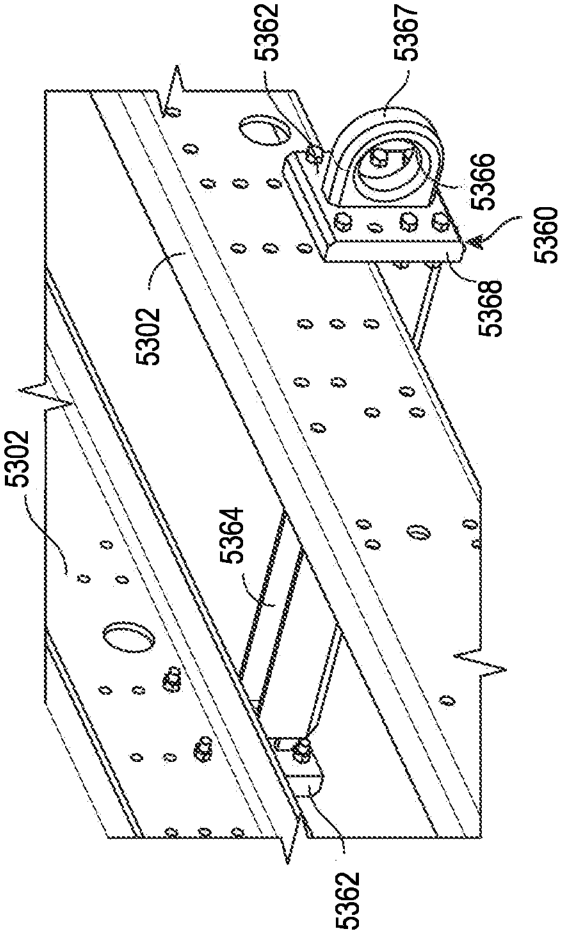

The rear lift structure 5360 shown in FIG. 126C includes lift brackets 5362 and cross member 5364. The lift brackets 5362 form a forward-facing lift interface 5366 in an interface member 5367, which is coupled to a base plate 5368. The base plate 5368 may be coupled (e.g., bolted, welded, etc.) to both the cross member 5364 and the frame rail 5302. In some embodiments, the cross member 5364 has a C-shaped cross-section and interfaces with the base plate 5368 by way of a series of flanges coupled to the cross member 5364.

Figure 127A:
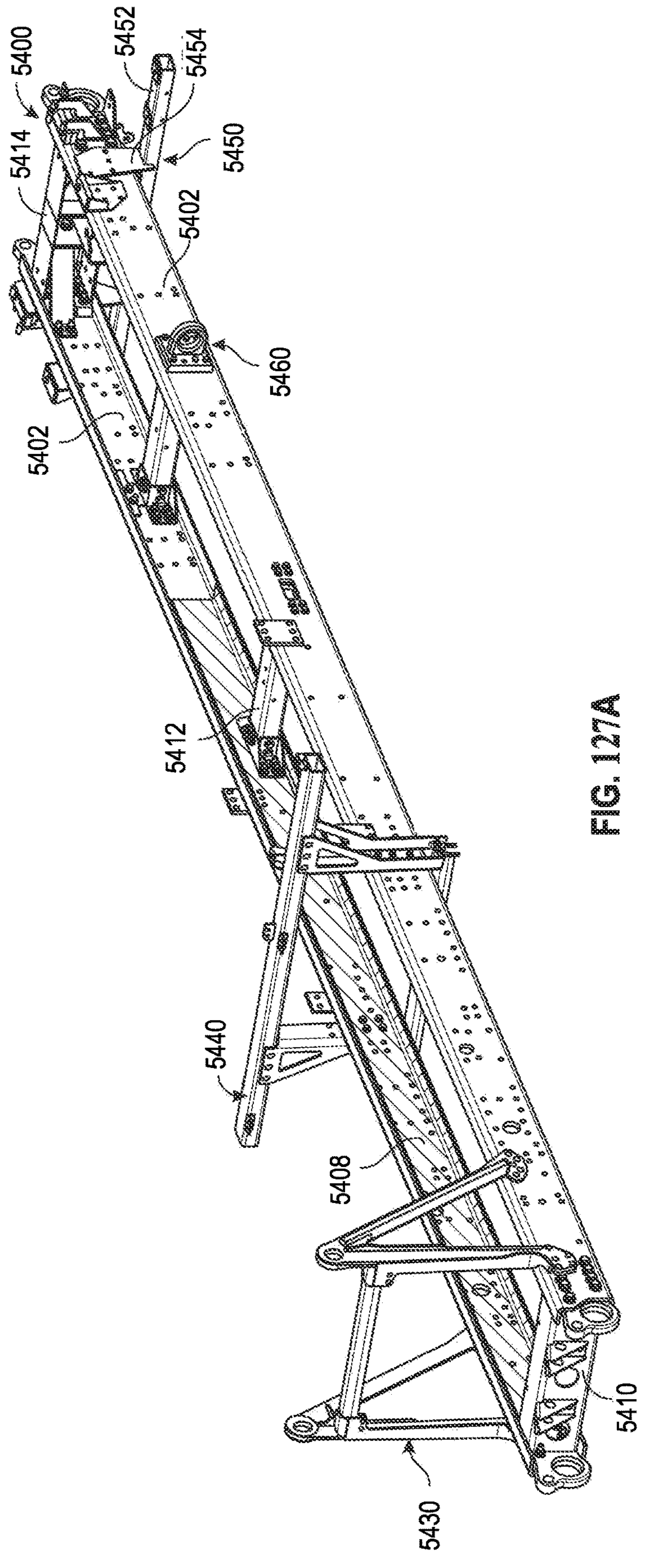
Figure 127B:
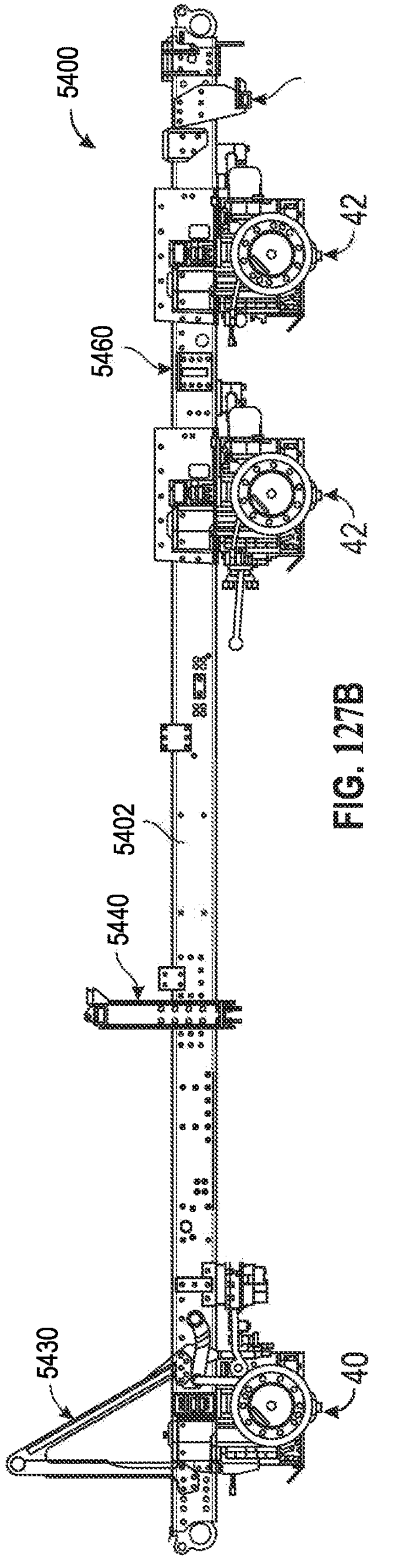
Figure 127C:
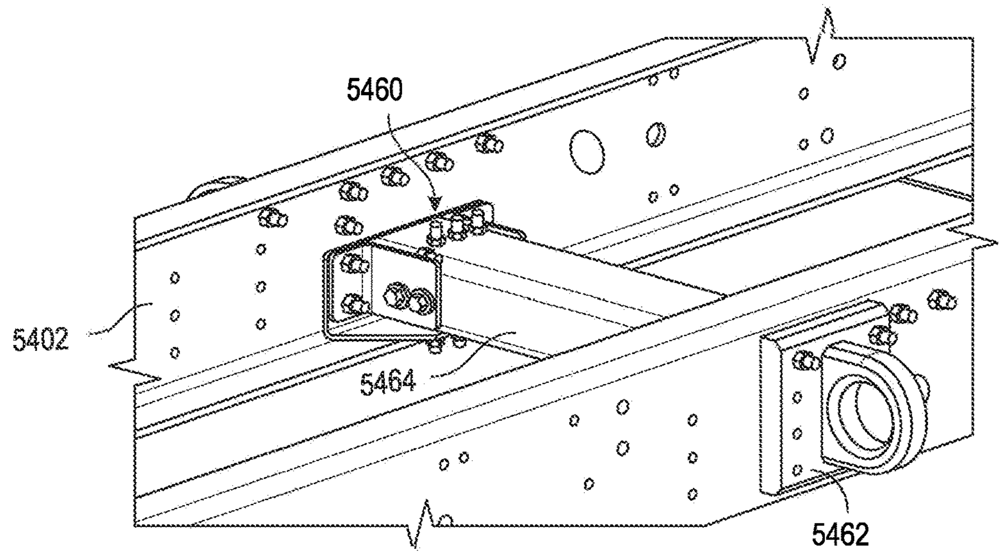
Figure 127D:
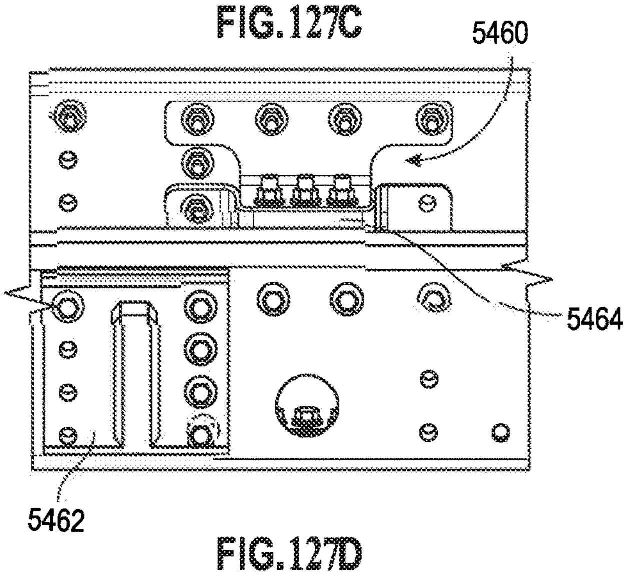
Figure 127E:
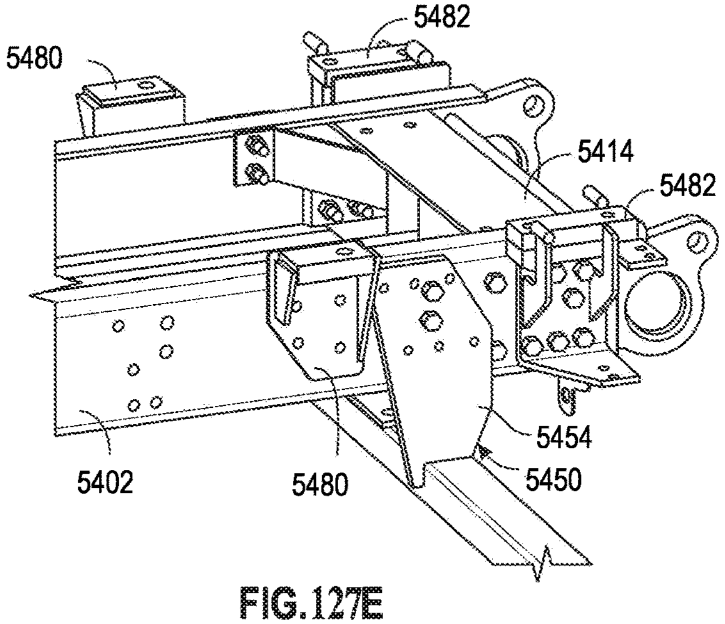

Referring to FIG. 127A, a frame, shown as frame 5400, is an alternative embodiment to the frame 5200. The frame 5400 may include one or more of longitudinal frame rails 5402, frame liners 5408, a front cross member 5410, a mid-section cross member 5412, a rear cross member 5414, a front lift structure 5430, an accessory bracket 5440, a rear bumper 5450, and a rear lift structure 5460. The frame liners 5408 may extend from immediately behind the front cross member 5410 to between the mid-section cross member 5412 and the rear lift structure 5460. The frame rails 5402 are extended to accommodate a front tractive assembly 40 and two rear tractive assemblies 42, as shown in FIG. 127B. As shown in FIG. 127A, the rear bumper 5450 includes a structural section 5452 and side plates 5454. The structural section 5452 may include one continuous, straight tube and may be coupled to the side plates 5454. As shown in FIGS. 127C and 127D, the rear lift structure 5460 includes a lift bracket 5462 substantially similar to the lift brackets 5362. The lift brackets 5462 are directly coupled to the frame rails 5402, forward of a cross member 5464 that is coupled to the interior of the frame rails 5402, an between the two rear tractive assemblies 42. In some embodiments, the frame 5400 includes brackets 5480 and brackets 5482 coupled to the frame rails 5402, as shown in FIG. 127E.

Figure 128A:
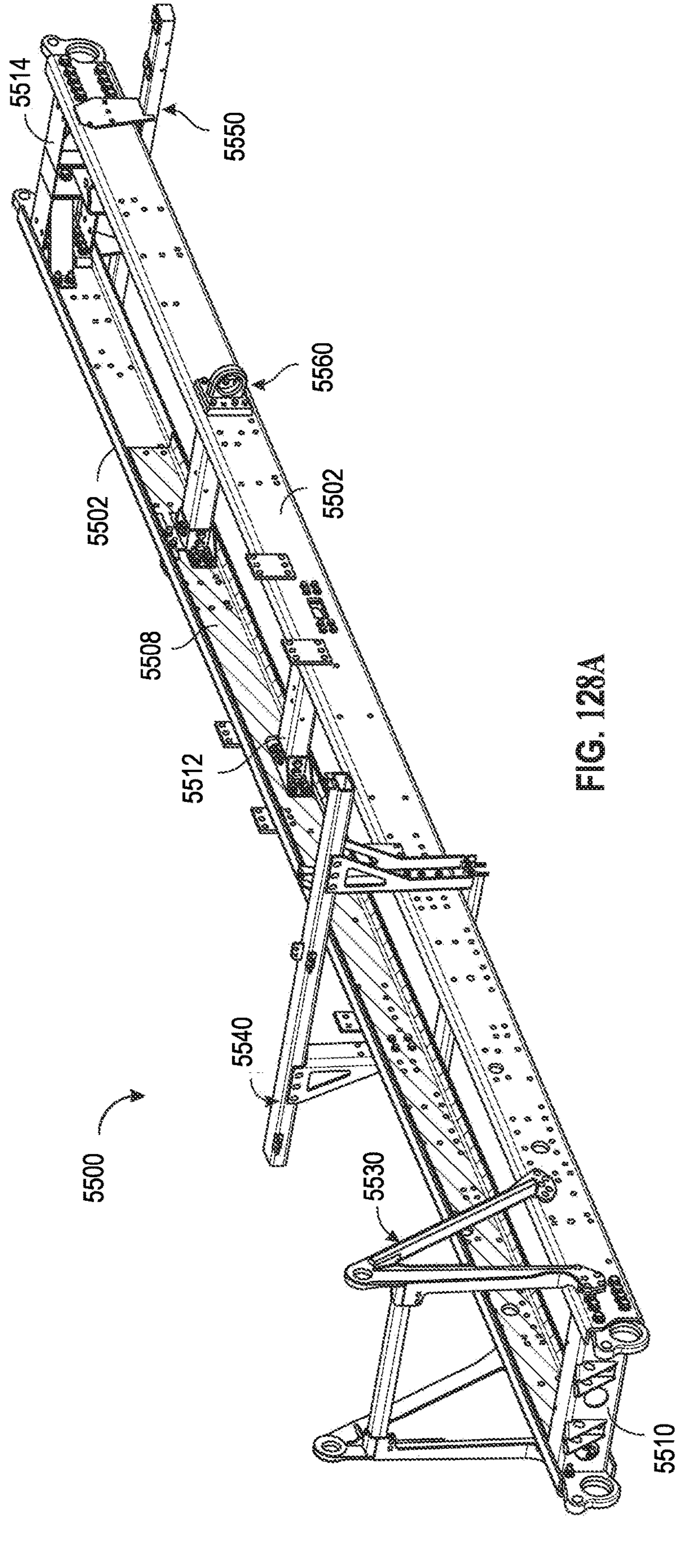
Figure 128B:
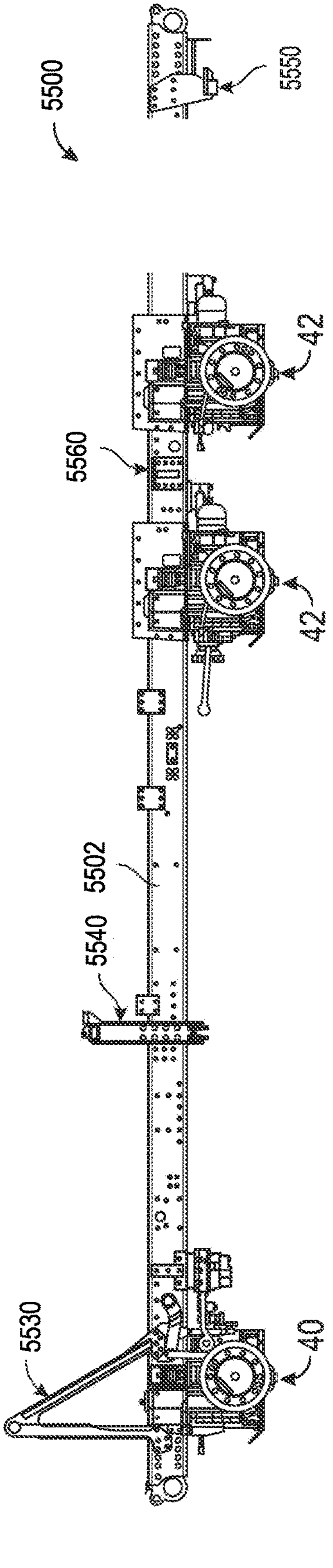

Referring to FIG. 128A, a frame, shown as frame 5500, is an alternative embodiment to the frame 5200. The frame 5500 may include one or more of longitudinal frame rails 5502, frame liners 5508, a front cross member 5510, a mid-section cross member 5512, a rear cross member 5514, a front lift structure 5530, an accessory bracket 5540, a rear bumper 5550, and a rear lift structure 5560. The frame liners 5508 may extend from immediately behind the front cross member 5510 to behind the rear lift structure 5560. The rear lift structure 5560 may be substantially similar to the rear lift structure 5460. The rear bumper 5550 may be substantially similar to the rear bumper 5450. The frame rails 5502 are extended to accommodate a front tractive assembly 40 and two rear tractive assemblies 42, and further extended beyond the rearmost tractive assembly, as shown in FIG. 128B.

Referring to FIG. 129A, a frame, shown as frame 5600 is an alternative embodiment to the frame 5200. The frame 5600 may include one or more of longitudinal frame rails 5602, frame liners 5608, a front cross member 5610, a mid-section cross member 5612, a rear cross member 5614, a front lift structure 5630, an accessory bracket 5640, a rear bumper 5650, and a rear lift structure 5660. The frame liners 5608 may extend from immediately behind the front cross member 5610 to immediately forward of the rear cross member 5614, as shown in FIG. 129B. The rear bumper 5650 may be substantially similar to the rear bumper 5450. The rear lift structure 5660 may be substantially similar to the rear lift structure 5460. The frame rails 5602 are extended to accommodate a front tractive assembly 40 and two rear tractive assemblies 42, and further extended beyond the rearmost tractive assembly as shown in FIG. 129C. As shown in FIG. 129B, the frame 5600 includes brackets 5680 and brackets 5682, substantially similar to the brackets 5480 and the brackets 5482, respectively, coupled to the frame rails 5602

Referring to FIG. 130A, a frame, shown as frame 5700, is an alternative embodiment to the frame 5200. The frame 5700 may include one or more of longitudinal frame rails 5702, frame liners 5708, a front cross member 5710, a mid-section cross member 5712, a rear cross member 5714, a front lift structure 5730, an accessory bracket 5740, a rear bumper 5750, and a rear lift structure 5760. The frame liners 5708 may extend from immediately behind the front cross member 5710 to between the mid-section cross member 5712 and the rear lift structure 5760. The rear bumper 5750 may be substantially similar to the rear bumper 5450. The rear lift structure 5760 may be substantially similar to the to the rear lift structure 5760. As shown in FIG. 130B, the frame rails 5702 are extended to accommodate a front tractive assembly 40 and two rear tractive assemblies 42, and further extended beyond the rearmost tractive assembly. As shown in FIG. 130C, the brackets 5782 and the brackets 5784 are coupled to the side surface of the frame rails 5702 to facilitate mounting other components to the frame 5700. The brackets 5784 may be located immediately behind the rearmost rear tractive assembly 42 and the brackets 5786 are located proximate the rear cross member 5714.

Figure 131A:
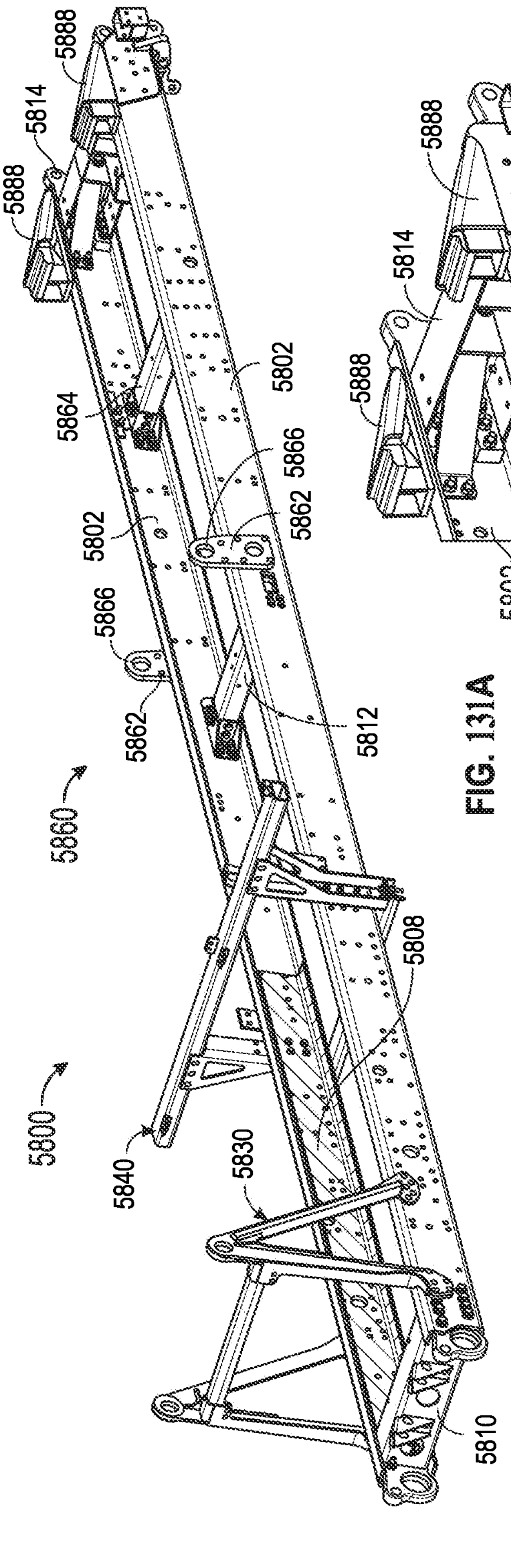
Figure 132B:
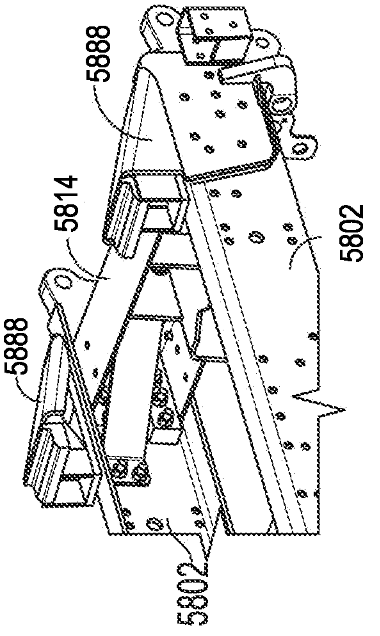
Figure 132A:
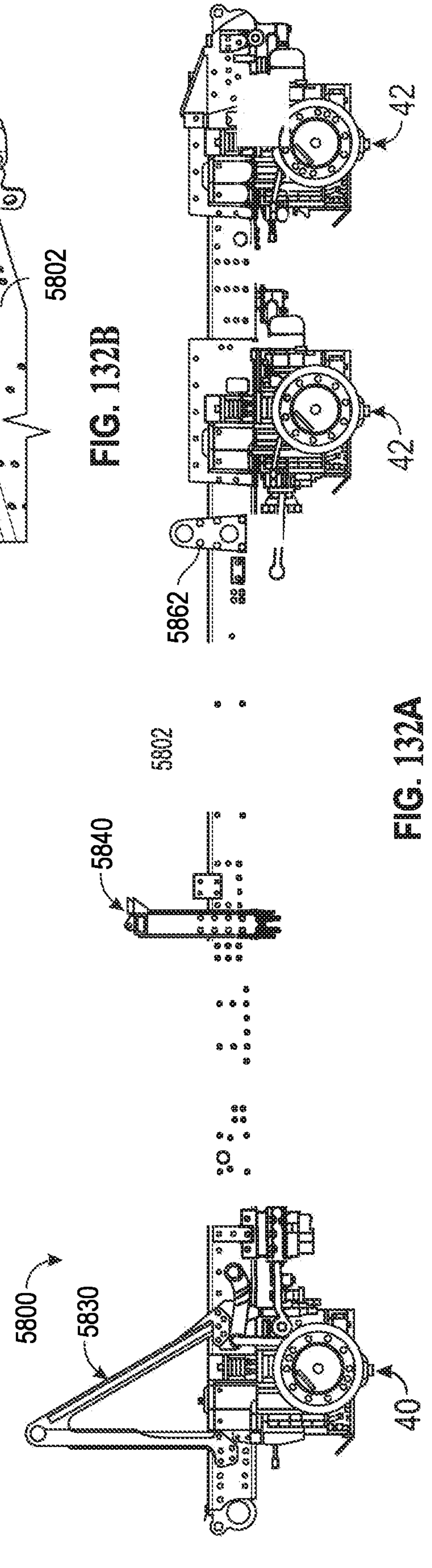

Referring to FIG. 131A, a frame, shown as frame 5800, is an alternative embodiment to the frame 5200. The frame 5800 may include one or more of longitudinal frame rails 5802, frame liners 5808, a front cross member 5810, a mid-section cross member 5812, a rear cross member 5814, a front lift structure 5830, an accessory bracket 5840, and a rear lift structure 5860. The frame liners 5808 extend from immediately behind the front cross member 5810 to between the accessory bracket 5840 and the mid-section cross member 5812. The frame 5800 may not have a rear bumper. As shown in FIG. 132A, the frame rails 5802 accommodate a front tractive assembly 40 and two rear tractive assemblies 42. The rear lift structure 5860, shown in FIG. 131A, includes lift brackets 5862 and cross member 5864. The lift brackets 5862 are flat and form a side-facing lift interface 5866. The lift brackets 5862 may be coupled (e.g., bolted, welded, etc.) to the side surface of the frame rail 5802 immediately rearward of the mid-section cross member 5812. The cross member 5864 may have a tubular cross-section and may be coupled to the inside of the side surfaces of the frame rails 5802 by way of a series of flanges that are in turn coupled to the cross member 5864. The cross member 5864 may be located rearward of the lift brackets 5862. As shown in FIG. 132B, the frame 5800 further includes brackets 5888 coupled (e.g., bolted, welded, etc.) to frame rails 5802 proximate the rear cross member 5814. The brackets 5888 include an angled protrusion near the top of the brackets 5888 that increases in thickness towards the front end of the frame 5800.

Figure 133A:
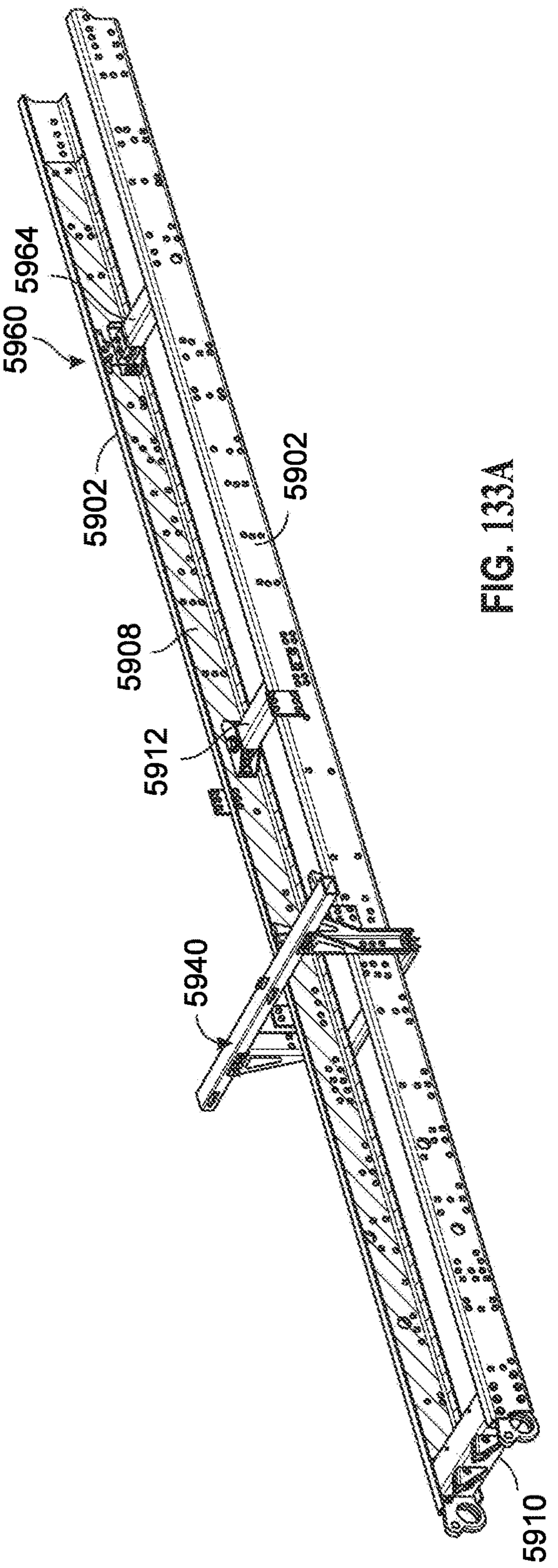
Figure 133B:
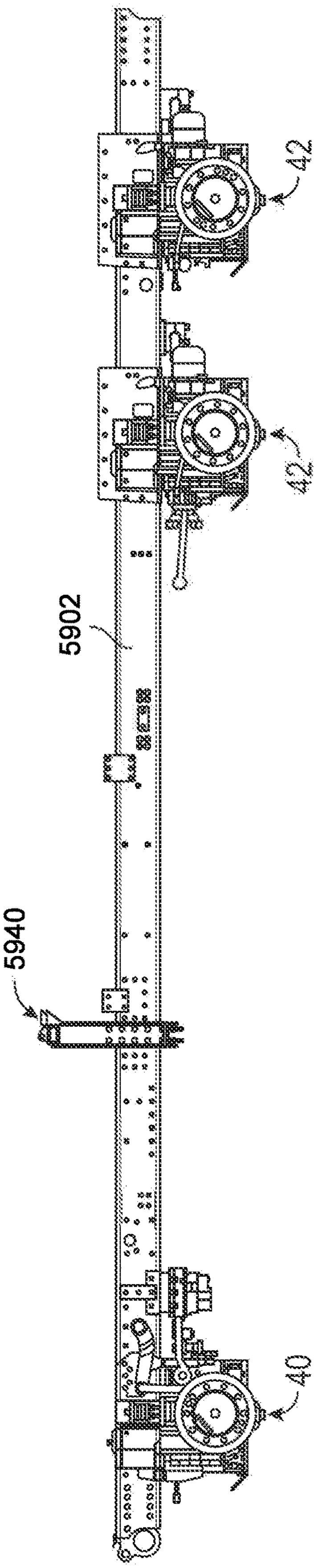

Referring to FIG. 133A, a frame, shown as frame 5900, is an alternative embodiment to the frame 5200. The frame 5900 may include one or more of longitudinal frame rails 5902, frame liners 5908, a front cross member 5910, a mid-section cross member 5912, an accessory bracket 5940, and a rear lift structure 5960. The frame liners 5908 may extend from immediately behind the front cross member 5910 to immediately forward of the rear end of the frame rails 5902. The frame 5900 may not include a rear bumper or a rear cross member. As shown in FIG. 133B, the frame rails 5902 are extended to accommodate a front tractive assembly 40 and two rear tractive assemblies 42. The rear lift structure 5960, shown in FIG. 133A, includes cross member 5964 substantially similar to the cross member 5864, but does not include any lift interfaces. In some embodiments, the frame 5900 interfaces with one or more pieces of equipment (not shown). In some such embodiments, one or more of a bracket, a cross member, a lift interface, a tie down, and a tow eye are incorporated into the equipment and provide a functional benefit (e.g., a towing interface, structural stability, etc.) to the frame 5900.

Figure 134A:
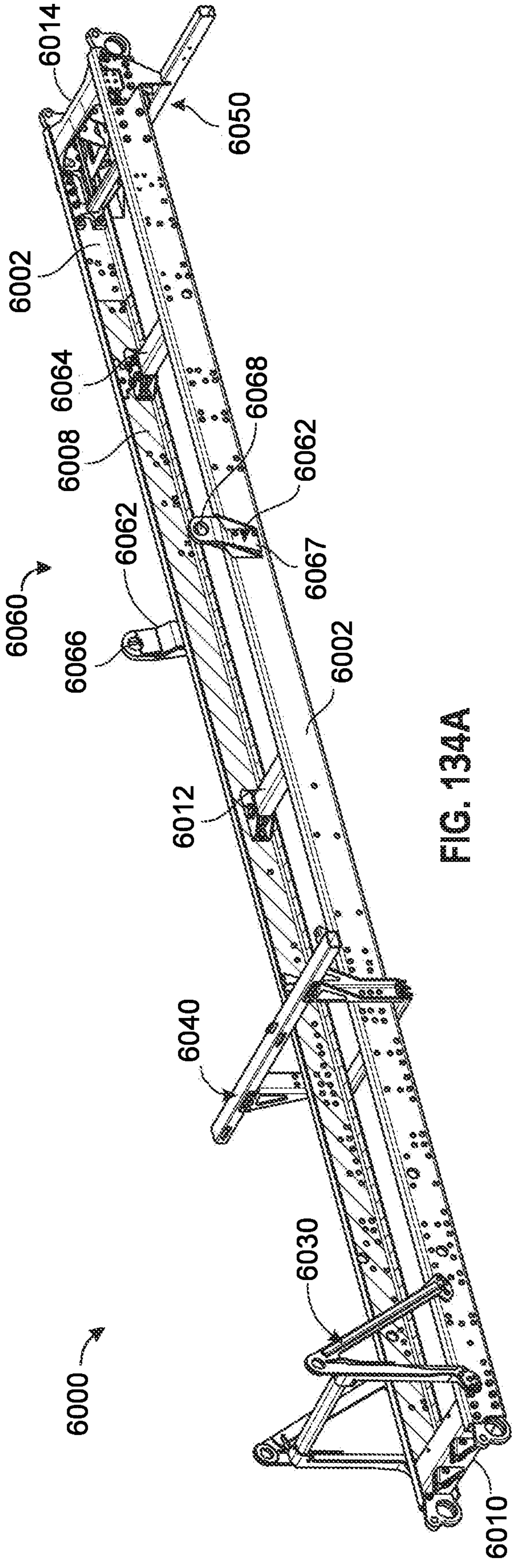
Figure 134B:
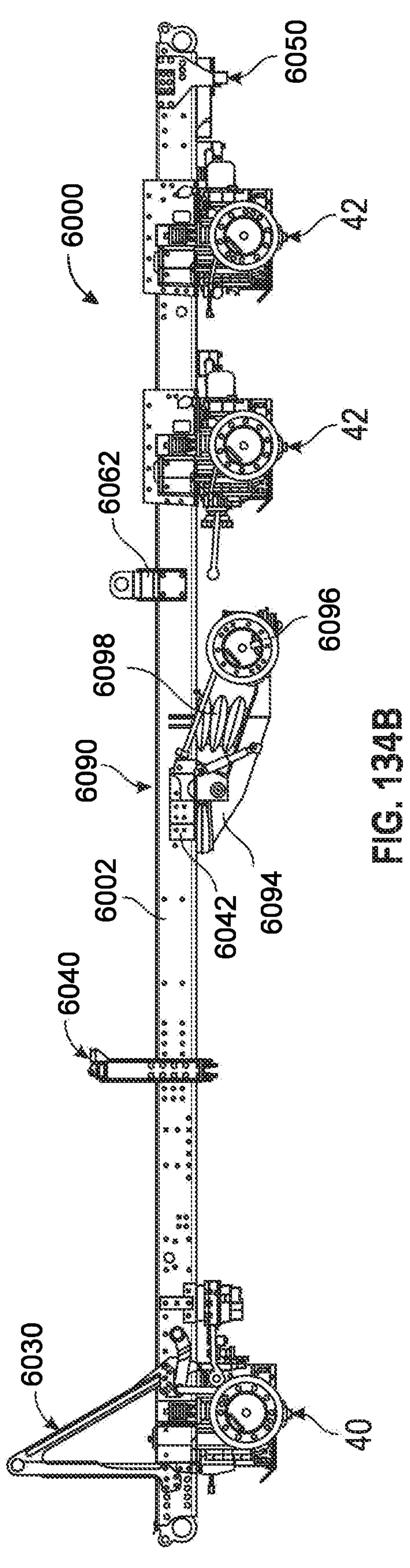
Figure 134C:
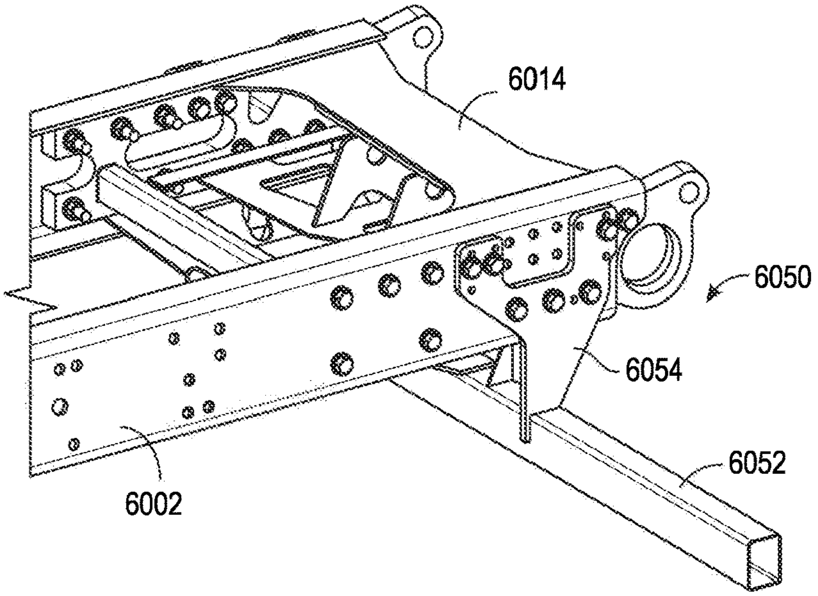
Figure 134D:
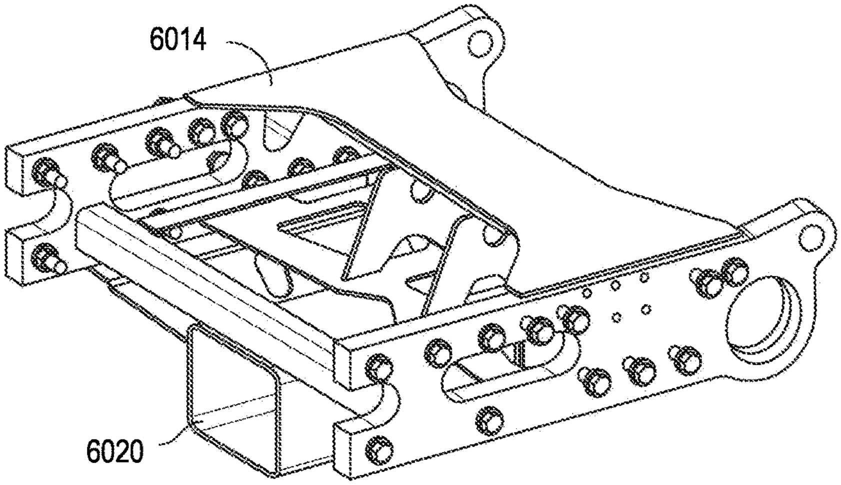
Figure 134E:
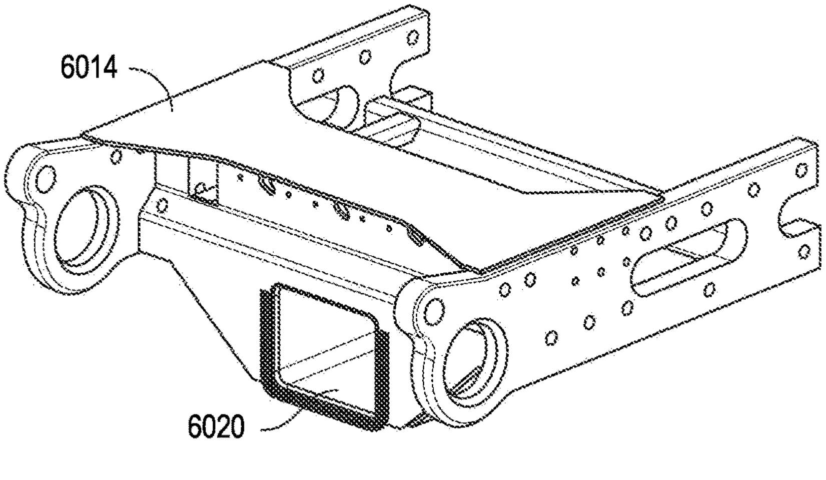

Referring to FIG. 134A, a frame, shown as frame 6000, is an alternative embodiment to the frame 5200. The frame 6000 may include one or more of longitudinal frame rails 6002, frame liners 6008, a front cross member 6010, a mid-section cross member 6012, a rear cross member 6014 including a receiver 6020, a front lift structure 6030, an accessory bracket 6040, a rear bumper 6050, and a rear lift structure 6060. The frame liners 6008 may extend from immediately behind the front cross member 6010 to immediately forward of the rear cross member 6014. As shown in FIG. 134B, the frame rails 6002 are extended accommodate a front tractive assembly 40 and two rear tractive assemblies 42. Referring to FIGS. 134C and 134D, the rear cross member 6014 is longitudinally extended to compared to the rear cross member 5214 (e.g., to facilitate supporting the receiver, etc.). As shown in FIG. 134A, the rear bumper 6050 includes a structural section 6052 including a section (e.g., a single, straight tubular section, etc.) coupled to side plates 6054. The side plates 6054 are coupled to the frame rails 6002 proximate the rear cross member 6014, and in some embodiments, the side plates 6054 have a shape that does not cover certain areas of the frame rails 6002 (e.g., to facilitate fastening other components, etc.). As shown in FIG. 134A, the rear lift structure 6060 includes lift brackets 6062 and cross member 6064, substantially similar to the cross member 5864. The lift brackets 6062 form a side-facing lift interface 6066. The lift brackets 6062 include a lower portion 6067 that is coupled (e.g., bolted, welded, etc.) to the side surface of the frame rail 6002 a distance (e.g., 2 feet, 8 feet, etc.) rearward of the mid-section cross member 6012. An upper portion 6068 is coupled to the lower portion and is offset outwards from the lower portion 6067. The cross member 6064 may be located a distance (e.g., 2 feet, 8 feet, etc.) rearward of the lift brackets 6062.

Referring to FIG. 134B, the frame 6000 further includes a lift axle 6090 (e.g., a pusher axle, etc.) coupled to the frame rails 6002 between the front tractive assembly 40 and the rear tractive assemblies 42. The lift axle 6090 is configured to selectively bear a portion of the weight of the vehicle 10. By way of example, the lift axle 6090 may be selectively engaged with a support surface by applying a pressurized gas (e.g., air) to a portion of the lift axle 6090. The lift axle 6090 may be coupled (e.g., bolted, welded, etc.) to the outside side surfaces of the frame rails 6002 using lift axle side plates 6092. The lift axles 6090 include a structural member 6094 rotatably coupled to the side plates 6092, an axle 6096 rotatably coupled to the structural member 6094, one or more tractive elements (not shown) coupled to the axle 6096, and one or more suspension elements 6098 (e.g., shock absorbers, struts, air bags, springs, pneumatic cylinders, etc.) to selectively raise and lower the axle 6096 relative to the frame rails 6002. In some embodiments, the axle 6096 spins freely.

Referring to FIG. 135A, a frame, shown as frame 6100, is an alternative embodiment to the frame 5200. The frame 6100 may include one or more of longitudinal frame rails 6102, frame liners 6108, a front cross member 6110, a mid-section cross member 6112, a rear cross member 6114, a front lift structure 6130, an accessory bracket 6140, a rear lift structure 6160, and mounting side plates 6176. The frame liners 6108 may extend from immediately behind the front cross member 6110 to between the mid-section cross member 6112 and the rear lift structure 6160. The rear lift structure 6160 may be substantially similar to the rear lift structure 5460. As shown in FIG. 135A, the frame 6100 includes brackets 6189 with C-shaped cross-sections coupled to the frame rails 6102 proximate the rear cross member 6114. As shown in FIGS. 135B and 135C, the frame rails 6102 are extended to accommodate a front tractive assembly 40 and two rear tractive assemblies 42. In some embodiments, the frame 6100 includes a lift axle 6190 substantially similar to the lift axle 6090.

Figure 136A:
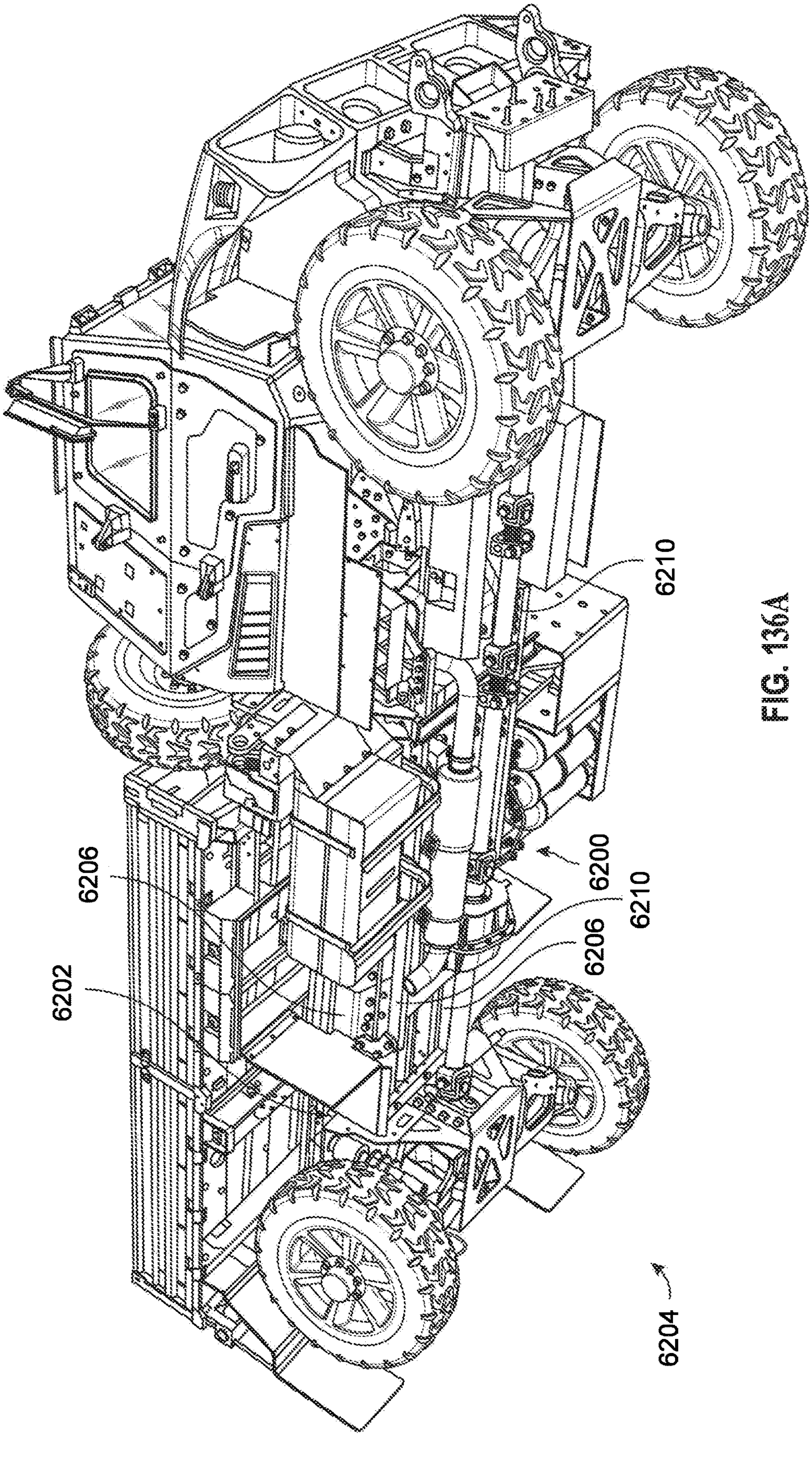

Referring to FIGS. 136A-12G, a frame reinforcement, shown as reinforcement system 6200, provides additional structural rigidity to a frame of a vehicle. The reinforcement system 6200 may be configured to interface with the various frame embodiments described herein, (e.g., the frame 5200, the frame 6100, etc.). The reinforcement system 6200 may increase the carrying capacity of the vehicle to which it is attached. In some embodiments, the reinforcement system 6200 may provide additional mounting points (e.g., bolt holes, side plates, etc.) onto which other components may be secured. In some embodiments, the reinforcement system 6200 may be removed from a frame on a vehicle and attached to a similar frame (e.g., a frame with the same components and dimensions) on another vehicle. The reinforcement system 6200 may be removed from a frame on a vehicle and attached to a different frame (e.g., a frame with different components and different dimensions) on another vehicle. The reinforcement system 6200 may be added or removed from a frame on a vehicle depending on the application of the vehicle.

Figures 136B, 136C:
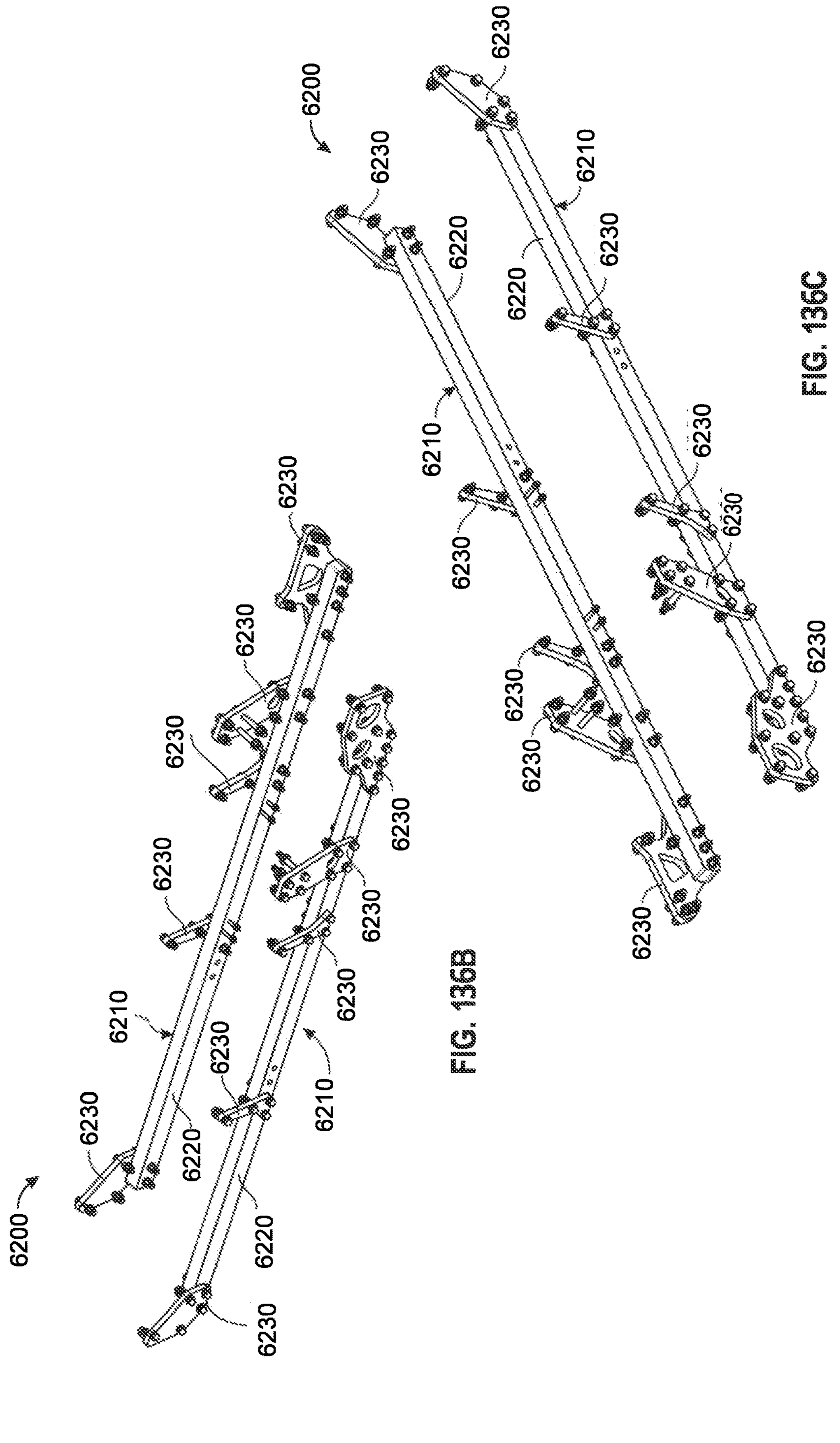

Referring to FIG. 136A, the reinforcement system 6200 is attached to a frame, shown as frame 6202, of a vehicle (e.g., the vehicle 10, etc.), shown as vehicle 6204. The frame 6202 includes frame rails, shown as longitudinal frame rails 6206. FIGS. 136B and 136C show the reinforcement system 6200 removed from the vehicle 6204. As shown in FIG. 136C, the reinforcement system 6200 includes a pair of assemblies, shown as reinforcement assemblies 6210. As shown in FIG. 136C, each reinforcement assembly includes a reinforcement member, shown as longitudinal reinforcement member 6220, and a number of side plates, shown as reinforcement side plates 6230. In some embodiments, the longitudinal reinforcement member 6220 is constructed from single piece with a solid cross-section. In other embodiments, the longitudinal reinforcement member 6220 has various cross-sectional shapes and/or is constructed from multiple pieces. The location, quantity, and shape of the reinforcement side plates 6230 may vary. As shown, the reinforcement side plates 6230 are flat, however in other embodiments, the reinforcement side plates 6230 are bent to facilitate mounting to various parts of the frame 6202. By way of example, the reinforcement side plates 6230 may be arranged to avoid certain components of a vehicle to which the reinforcement system 6200 is attached. The reinforcement side plates 6230 may be located on one or both sides of the longitudinal reinforcement members 6220.

Figure 136D:
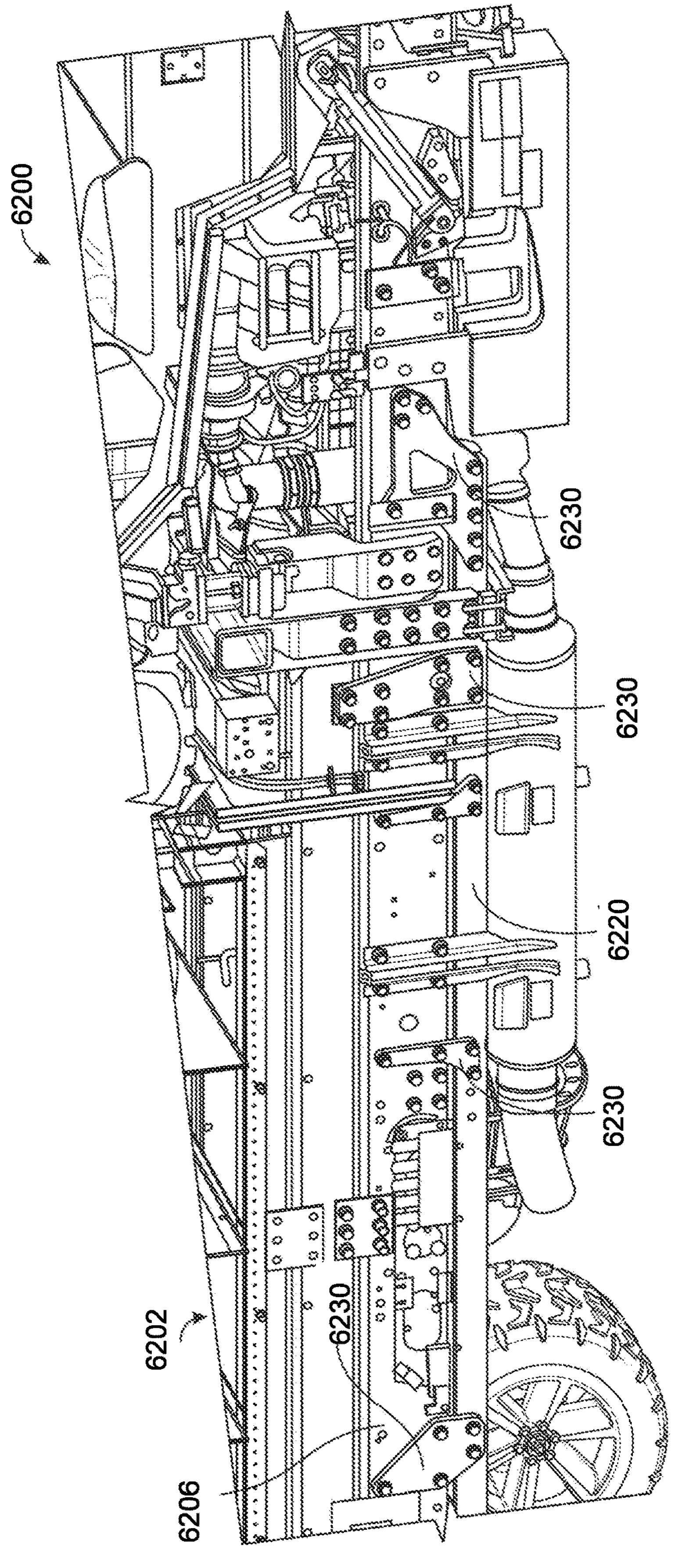
Figure 136E:
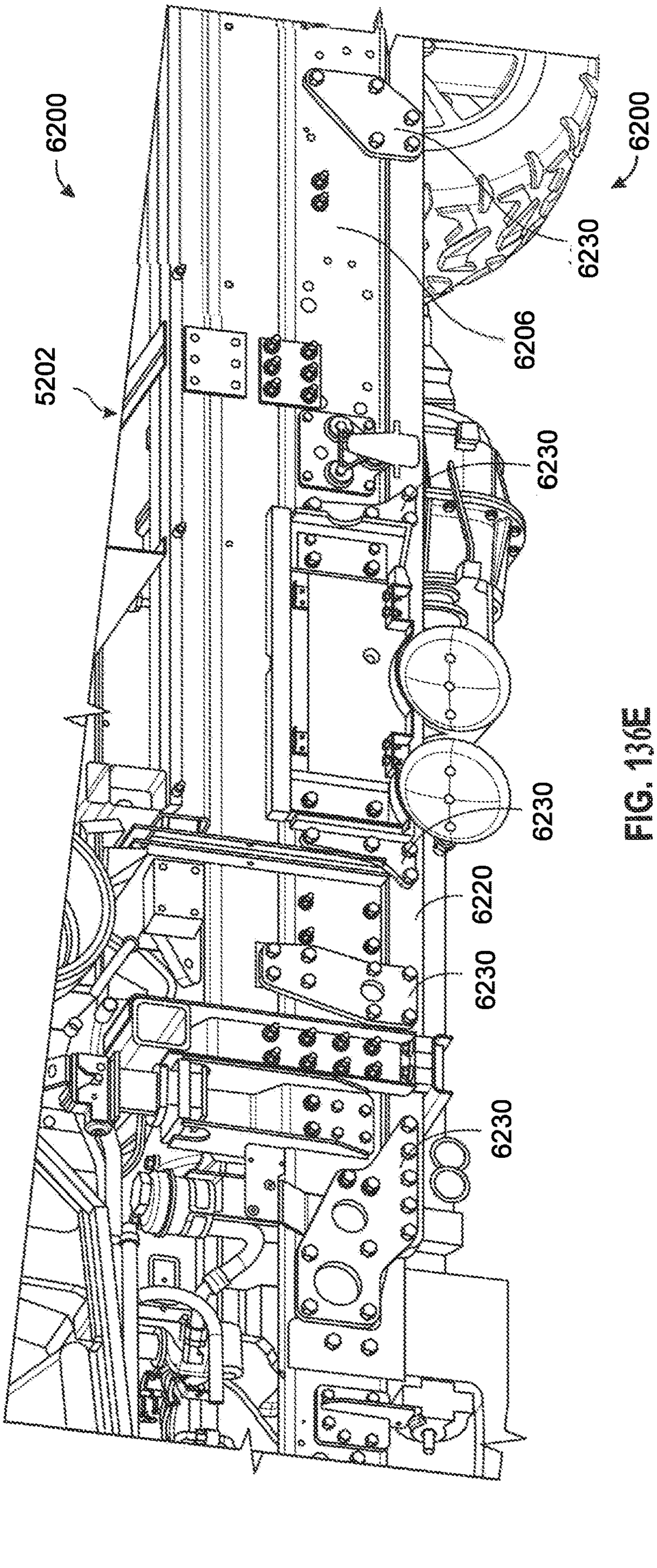
Figure 136F:
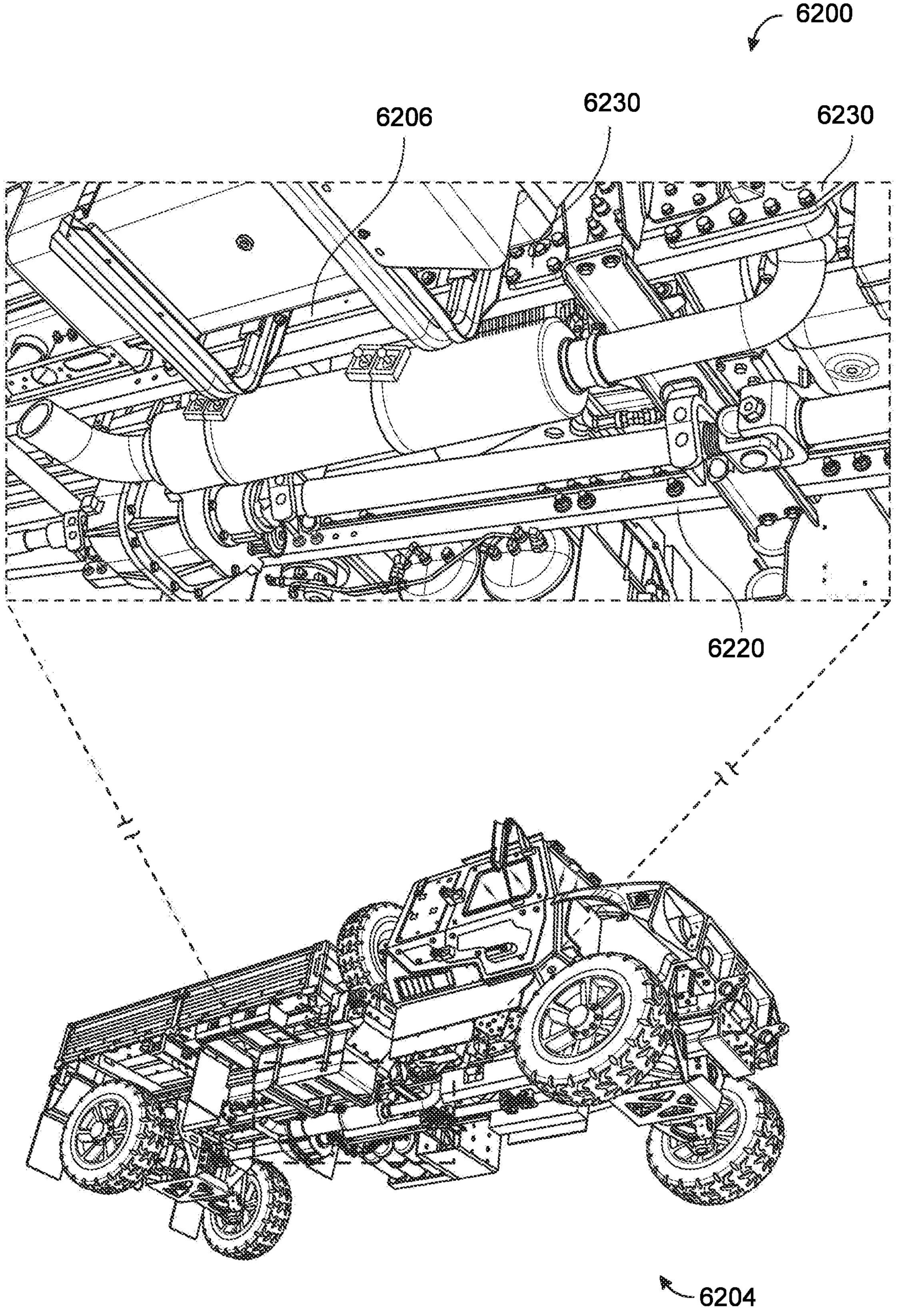

Referring to FIGS. 136D-136F, the reinforcement system 6200 is shown attached to the frame 6202. As shown in FIGS. 136D and 136E, the reinforcement side plates 6230 are coupled directly to an outside face of the longitudinal frame rails 6206. In some embodiments, the reinforcement side plates 6230 are removably coupled to the longitudinal frame rails 6206 (e.g., using bolts) in order to facilitate removal and reattachment on the same frame 6202 or a different frame. In some embodiments, the reinforcement side plates 6230 are coupled to another part of the frame 6202 (e.g., an upper surface of the longitudinal frame rails 6206, a lower surface of longitudinal frame rails 6206, etc.). In some embodiments, various components of the vehicle 6204 (e.g., wires, parts of the exhaust system, various hoses, etc.) are coupled to the reinforcement system 6200. The use of side plates 6230 facilitates adding or removing the reinforcement system 6200 from a vehicle depending on the intended application of the vehicle.

Hereinafter are described various alternative embodiments to the reinforcement system 6200. The alternative embodiments shown in FIGS. 137A-138F may be substantially the same as or similar to the reinforcement system 6200 as shown in FIGS. 136A-136F, except as described below. Elements having the same or similar names and similar reference numerals may be substantially the same, except as described below.

Figure 137A:
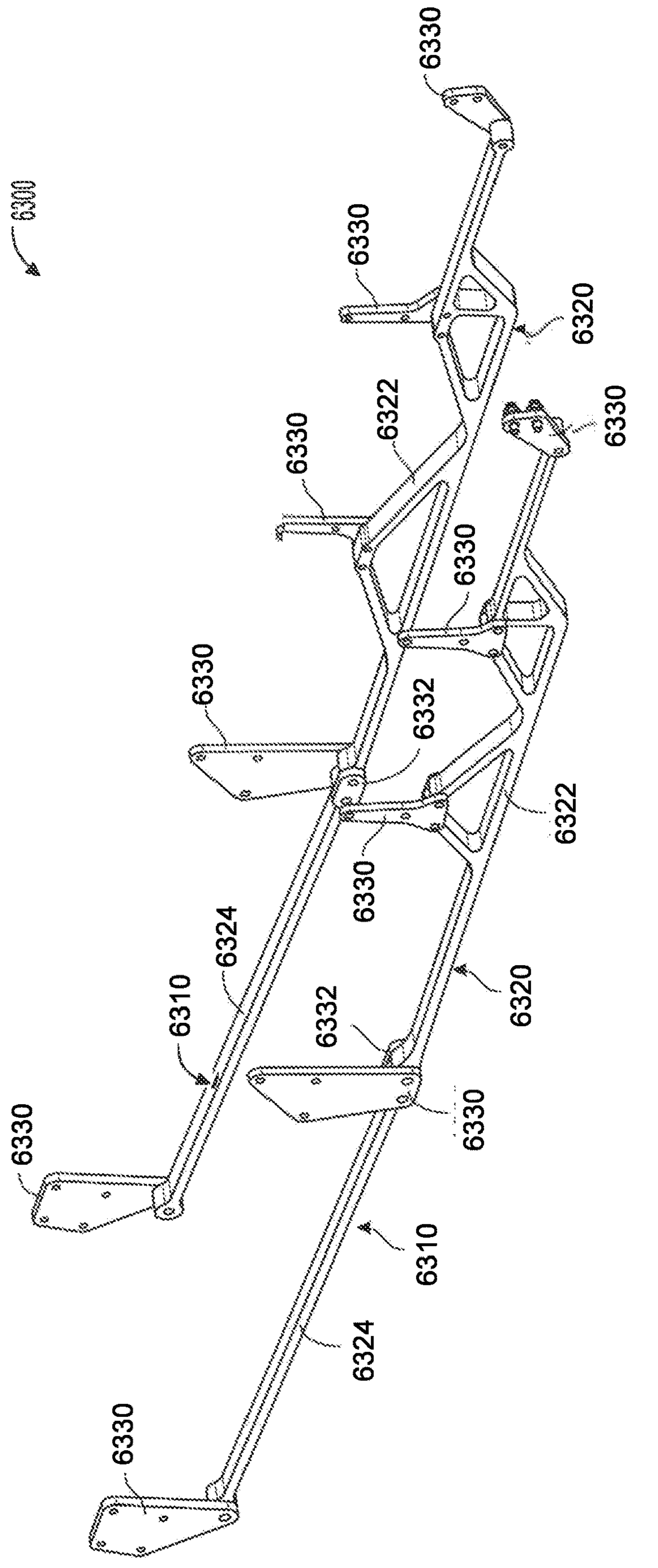
Figure 137B:
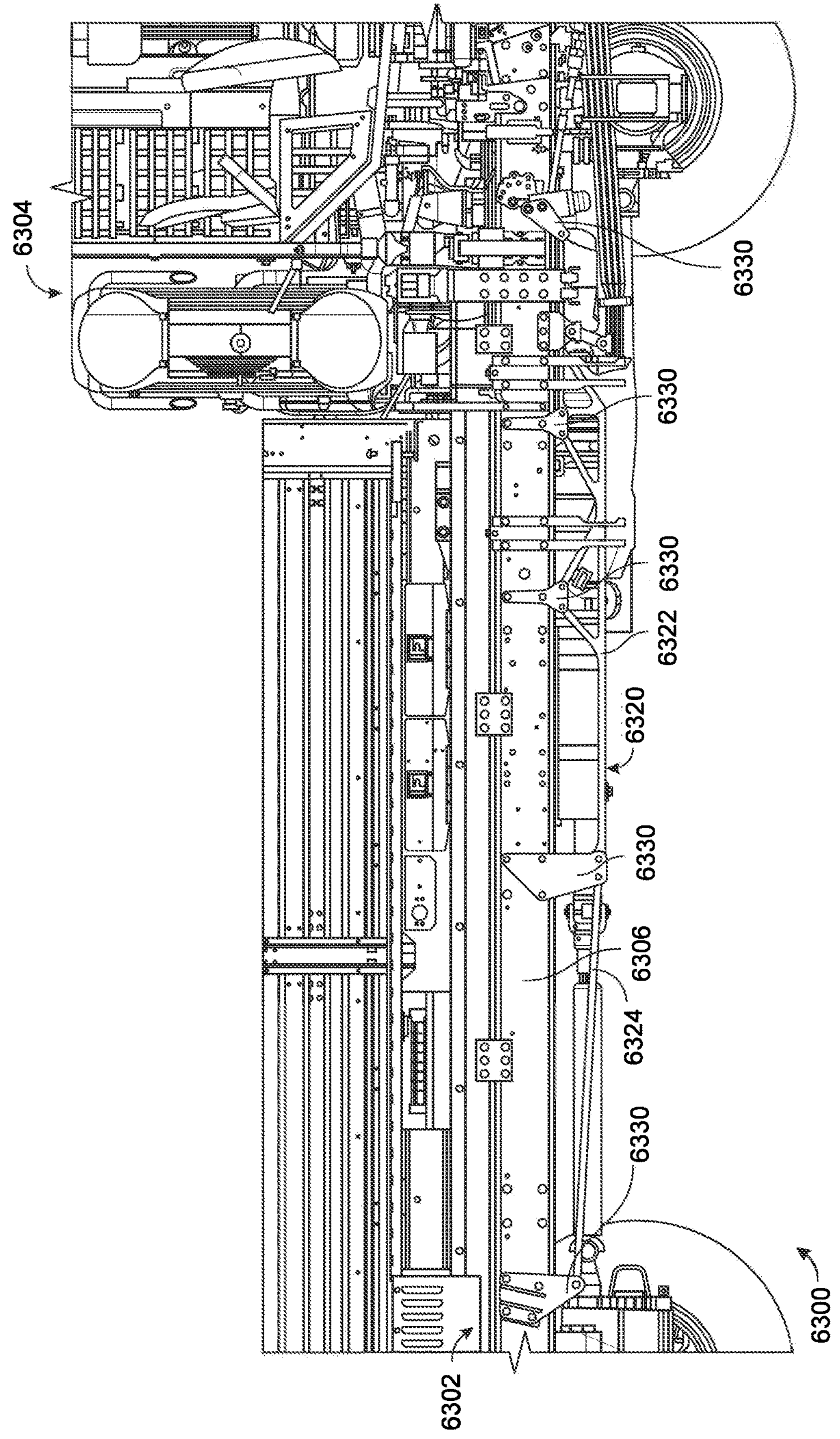
Figure 137C:
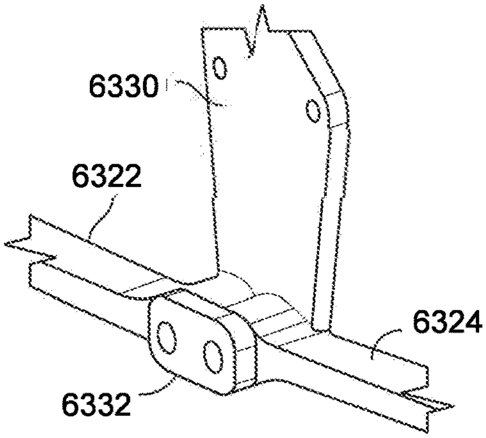
Figure 137D:
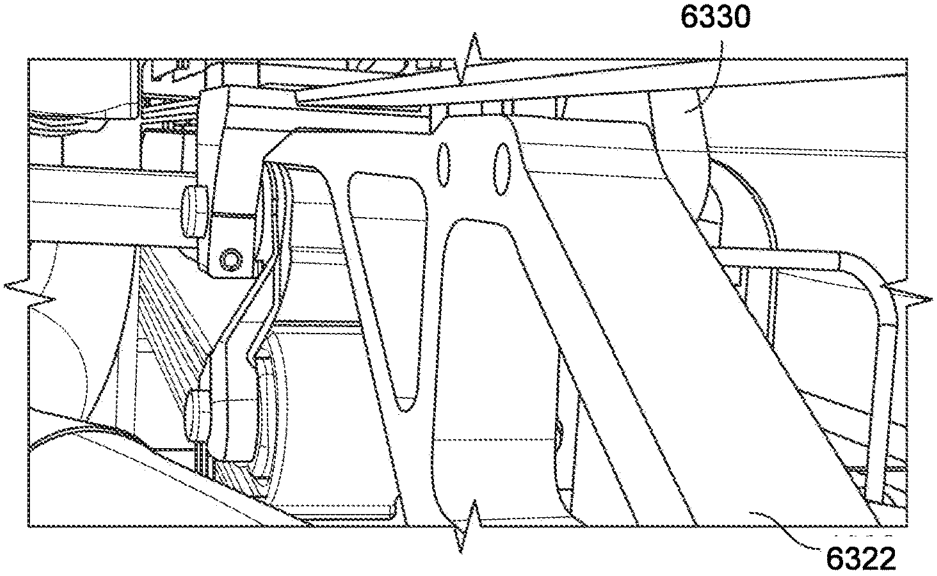
Figure 137E:
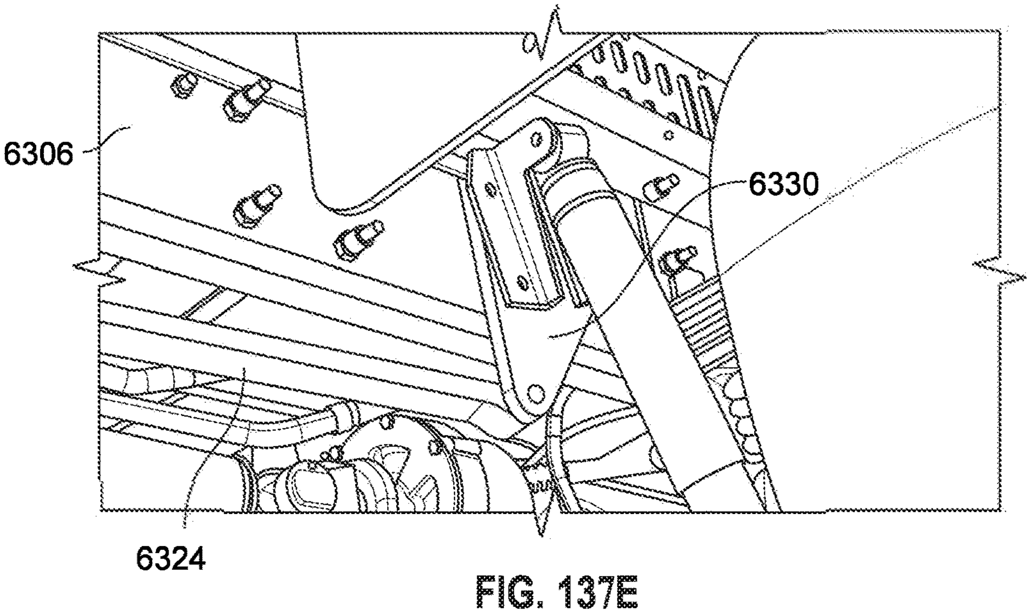
Figure 137F:
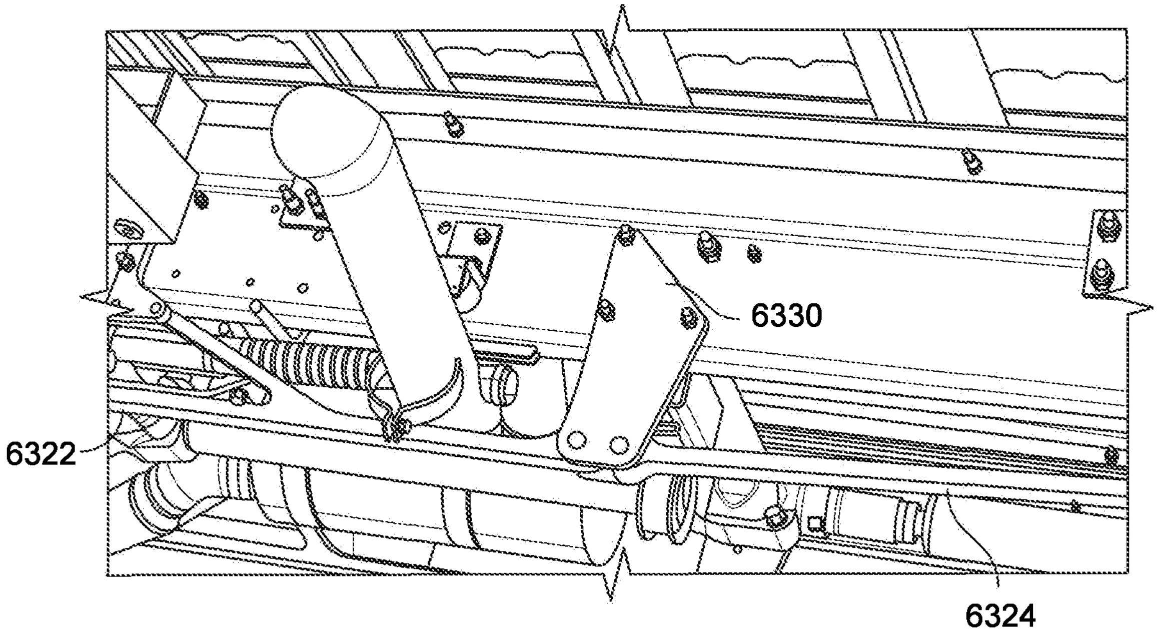
Figure 137G:
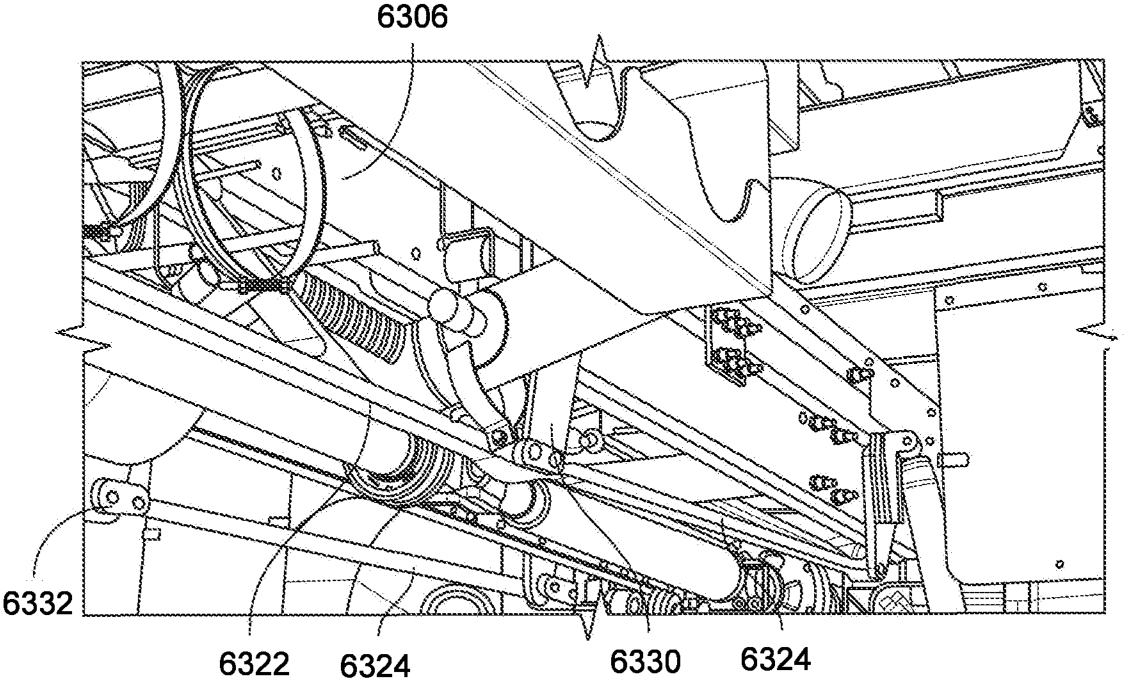
Figure 138A:
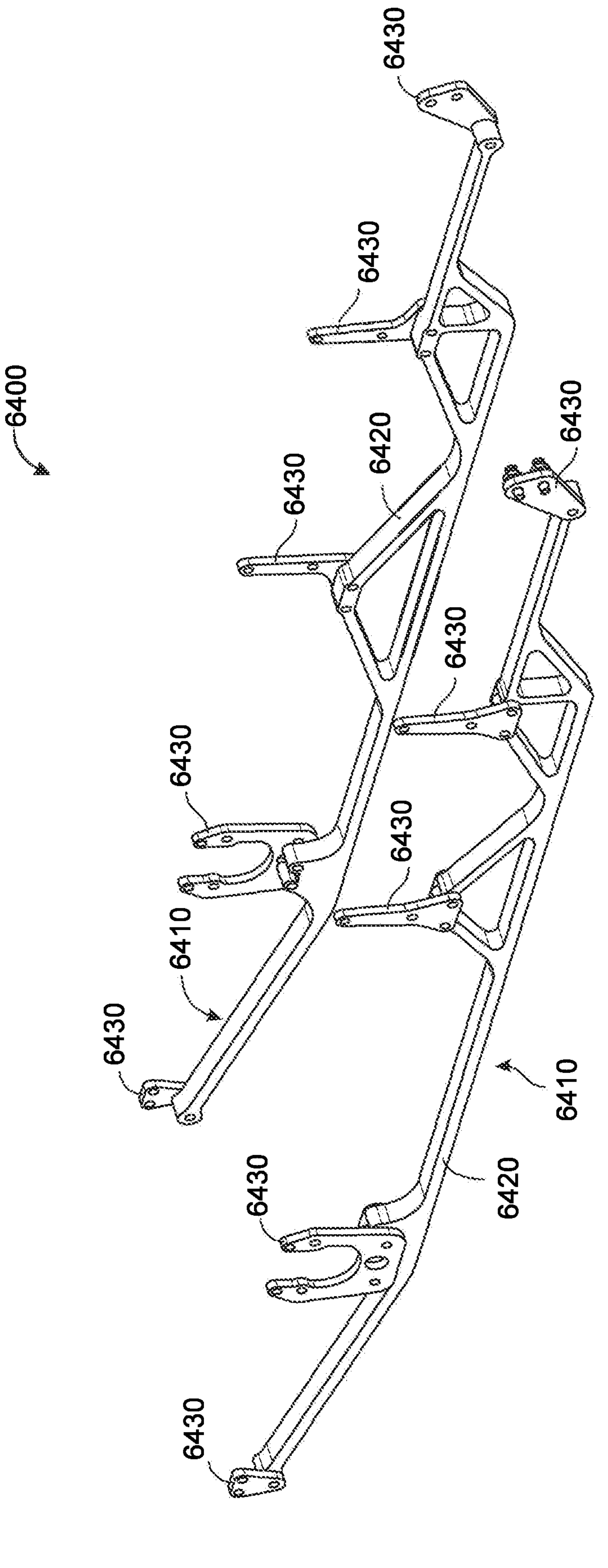
Figure 138B:
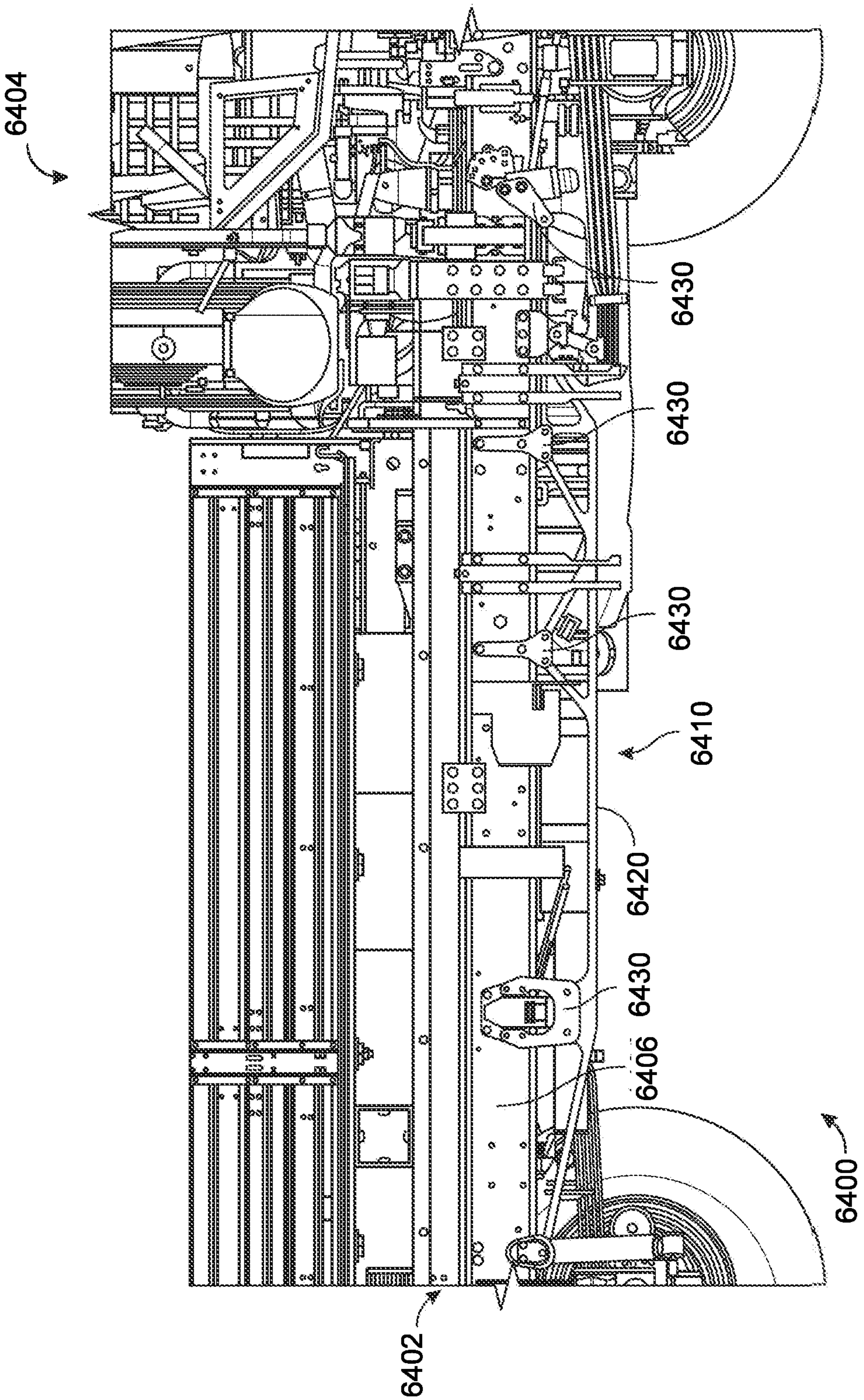
Figure 138C:
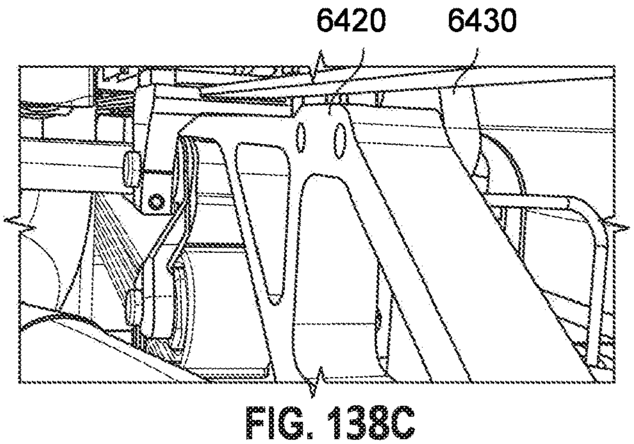
Figure 138D:
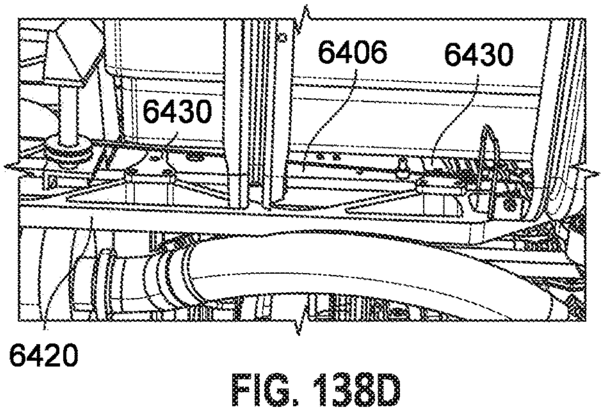
Figure 138E:
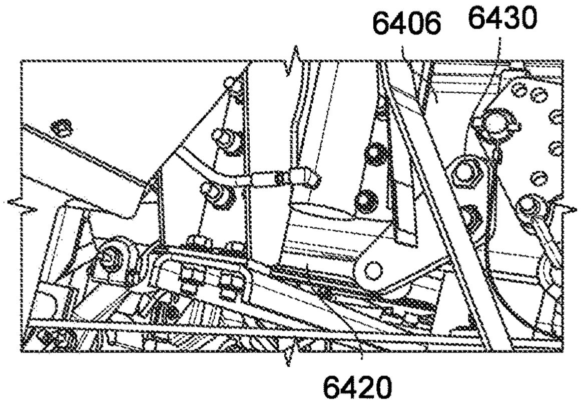
Figure 138F:
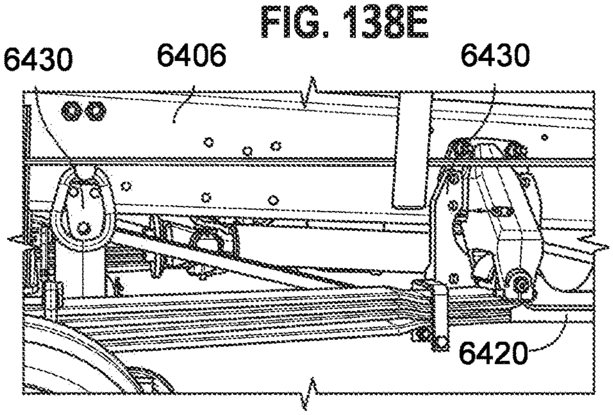

Referring to FIGS. 137A-137G, a reinforcement system, shown as reinforcement system 6300, is an alternative embodiment to the reinforcement system 6200. Reinforcement system 6300 may attach to a frame 6302 of a vehicle 6304, the frame 6302 having longitudinal frame rails 6306. Reinforcement system 6300 may include reinforcement assemblies 6310 each including a longitudinal reinforcement member 6320 and one or more reinforcement side plates 6330. As shown in FIG. 137A, the longitudinal reinforcement member 6320 includes a front portion 6322 and a rear portion 6324 separate from the front portion 6322. The front portion 6322 may be coupled to the rear portion 6324 using a reinforcement side plate 6330. By way of example, the reinforcement side plate 6330 may be widened in order to couple to both the front portion 6322 and the rear portion 6324. As shown in FIG. 137C, the reinforcement system additionally includes a coupling plate 6332. The coupling plate 6332 may be coupled to both the front portion 6322 and the rear portion 6324. As shown, the coupling plate 6332 does not extend to the frame 6302. The shape of the longitudinal reinforcement member 6320 may be modified (e.g., extended, cut out, etc.) to avoid portions of the vehicle 6304 and/or to increase structural rigidity in some areas. The shapes of the reinforcement side plates 6330 may be modified to fit around certain features or components (e.g., a bracket attached to the frame 6432).

Referring to FIGS. 138A-138F, a reinforcement system, shown as reinforcement system 6400, is an alternative embodiment to the reinforcement system 6200. Reinforcement system 6400 may attach to a frame 6402 of a vehicle 6404, the frame 6402 having longitudinal frame rails 6406. Reinforcement system 6400 may include reinforcement assemblies 6410 each including a longitudinal reinforcement member 6420 and one or more reinforcement side plates 6430. The shape of the longitudinal reinforcement member 6420 may be modified (e.g., extended, cut out, etc.) to avoid portions of the vehicle 6404 and/or to increase structural rigidity in some areas. The shapes of the reinforcement side plates 6430 may be modified to fit around certain features or components (e.g., a bracket attached to the frame 6402).

Frame Cross Member Assemblies

According to the exemplary embodiment shown in FIGS. 139-147, a frame assembly, shown as frame assembly 6512, includes a first frame rail, shown as left frame rail 6600; a second frame rail, shown as right frame rail 6620, spaced a target distance from the left frame rail 6600; a first cross member assembly, shown as front cross member assembly 6700; a second cross member assembly, shown as rear cross member assembly 6800; and/or a third cross member assembly, shown as rear cross member assembly 6900. The frame assembly 6512 may be used with the vehicle 10 and/or be the frame 97. As shown in FIGS. 139, 140, 142, and 145, the frame assembly 6512 has a first end, shown as front end 6514, and an opposing second end, shown as rear end 6516.

As shown in FIGS. 139, 140, 142, and 145, the left frame rail 6600 includes a base, shown as base plate 6602; a first arm, shown as upper flange 6604, extending at angle (e.g., perpendicularly, etc.) from an upper end of the base plate 6602; and a second arm, shown as lower flange 6606, extending at an angle (e.g., perpendicularly, etc.) from a lower end of the base plate 6602. According to the exemplary embodiment shown in FIGS. 139, 140, 142, and 145, the base plate 6602, the upper flange 6604, and the lower flange 6606 of the left frame rail 6600 cooperatively define a first recess, shown as left C-channel 6608. In other embodiments, the left frame rail 6600 has a different cross-sectional shape. The upper flange 6604 and the lower flange 6606 may define a width of the left frame rail 6600, and the base plate 6602 may define a height of the left frame rail 6600. As shown in FIGS. 139 and 140, the front end 6514 of the base plate 6602 of the left frame rail 6600 defines a first plurality of apertures, shown as front apertures 6610. As shown in FIGS. 139, 142, and 145, the rear end 6516 of the base plate 6602 of the left frame rail 6600 defines a second plurality of apertures, shown as rear apertures 6612.

As shown in FIGS. 139, 140, 142, and 145, the right frame rail 6620 includes a base, shown as base plate 6622; a first arm, shown as upper flange 6624, extending at an angle (e.g., perpendicularly, etc.) from an upper end of the base plate 6622; and a second arm, shown as lower flange 6626, extending at an angle (e.g., perpendicularly, etc.) from a lower end of the base plate 6622. According to the exemplary embodiment shown in FIGS. 139, 140, 142, and 145, the base plate 6622, the upper flange 6624, and the lower flange 6626 of the right frame rail 6620 cooperatively define a second recess, shown as right C-channel 6628. In other embodiments, the right frame rail 6620 has a different cross-sectional shape. The upper flange 6624 and the lower flange 6626 may define a width of the right frame rail 6620, and the base plate 6622 may define a height of the right frame rail 6620. According to an exemplary embodiment, the front end 6514 of the base plate 6622 of the right frame rail 6620 defines a first plurality of apertures (e.g., front apertures, similar to the front apertures 6610 of the left frame rail 6600, etc.) and the rear end 6516 of the right frame rail 6620 defines a second plurality of apertures (e.g., rear apertures, similar to the rear apertures 6612 of the left frame rail 6600, etc.).

As shown in FIGS. 139 and 140, the front cross member assembly 6700 is coupled to the front end 6514 of the frame assembly 6512 and extends between the left frame rail 6600 and the right frame rail 6620. As shown in FIGS. 140 and 141, the front cross member assembly 6700 includes a cross member, shown as front cross member 6710; a first coupling member, shown as left attachment member 6740; and a second coupling member, shown as right attachment member 6770. As shown in FIG. 141, the front cross member 6710 includes a first plate, shown as front plate 6712; a second plate, shown as upper plate 6714, extending at an angle (e.g., perpendicularly, etc.) from the front plate 6712; and a third plate, shown as lower plate 6716, extending at an angle (e.g., perpendicularly, etc.) from the front plate 6712. According to an exemplary embodiment, the front plate 6712, the upper plate 6714, and the lower plate 6716 are integrally formed. In other embodiments, the front plate 6712, the upper plate 6714, and the lower plate 6716 are fixedly coupled (e.g., welded together, etc.).

As shown in FIG. 141, the upper plate 6714 has a first extension, shown as left flange 6718, extending from a first lateral end (e.g., a left end, etc.) of the upper plate 6714 and a second extension, shown as right flange 6720, extending from an opposing second lateral end (e.g., a right end, etc.) of the upper plate 6714. According to an exemplary embodiment, the lower plate 6716 has a first extension (e.g., a left flange, similar to the left flange 6718 of the upper plate 6714, etc.) extending from a first lateral end (e.g., a left end, etc.) of the lower plate 6716 and a second extension (e.g., a right flange, similar to the right flange 6720 of the upper plate 6714, etc.) extending from an opposing second lateral end (e.g., a right end, etc.) of the lower plate 6716. As shown in FIG. 141, the front plate 6712 defines a plurality of apertures, shown as front apertures 6722, spaced along a longitudinal length thereof. As shown in FIG. 141, the front cross member 6710 includes a plurality of brackets, shown as front brackets 6724, coupled to and extending from the front plate 6712. The front brackets 6724 may be used to facilitate coupling other components of the vehicle 10 (e.g., the front cabin 3520, the hood 5238, a front bumper, etc.) to the frame assembly 6512.

As shown in FIGS. 140 and 141, the left attachment member 6740 includes a body, shown as left end plate 6742, having a first surface, shown as upper edge 6744, and an opposing second surface, shown as lower edge 6746. As shown in FIG. 141, the left flange 6718 of the upper plate 6714 and the left flange of the lower plate 6716 are positioned to receive the left end plate 6742 such that the left flange 6718 of the upper plate 6714 engages the upper edge 6744 of the left end plate 6742 and the left flange of the lower plate 6716 engages the lower edge 6746 of the left end plate 6742. According to an exemplary embodiment, the front cross member 6710 and the left end plate 6742 are fixedly coupled together (e.g., welded, etc.). In other embodiments, the front cross member 6710 and the left end plate 6742 are releasably coupled together (e.g., with fasteners, etc.). In an alternative embodiment, the front cross member 6710 and the left end plate 6742 are integrally formed. As shown in FIG. 141, the left end plate 6742 defines a plurality of apertures, shown as left apertures 6748.

As shown in FIGS. 140 and 141, the right attachment member 6770 includes a body, shown as right end plate 6772, having a first surface, shown as upper edge 6774, and an opposing second surface, shown as lower edge 6776. As shown in FIG. 141, the right flange 6720 of the upper plate 6714 and the right flange of the lower plate 6716 are positioned to receive the right end plate 6772 such that the right flange 6720 of the upper plate 6714 engages the upper edge 6774 of the right end plate 6772 and the right flange of the lower plate 6716 engages the lower edge 6776 of the right end plate 6772. As shown in FIGS. 140 and 141, the front cross member 6710 extends between the left end plate 6742 and the right end plate 6772. According to an exemplary embodiment, the front cross member 6710 and the right end plate 6772 are fixedly coupled together (e.g., welded, etc.). In other embodiments, the front cross member 6710 and the right end plate 6772 are releasably coupled together (e.g., with fasteners, etc.). In an alternative embodiment, the front cross member 6710 and the right end plate 6772 are integrally formed. As shown in FIG. 141, the right end plate 6772 defines a plurality of apertures, shown as right apertures 6778.

As shown in FIG. 140, the left end plate 6742 is positioned within, and releasably received by, the left C-channel 6608 of the left frame rail 6600. According to an exemplary embodiment, the left apertures 6748 of the left end plate 6742 are positioned to correspond and align with the front apertures 6610 of the base plate 6602 of the left frame rail 6600. As shown in FIG. 140, the frame assembly 6512 includes a first plurality of fasteners, shown as fasteners 6614. According to an exemplary embodiment, the fasteners 6614 are configured to be received by the front apertures 6610 of the base plate 6602 of the left frame rail 6600 and the left apertures 6748 of the left end plate 6742 to facilitate releasably coupling the left end plate 6742 and the front cross member 6710 to the left frame rail 6600.

As shown in FIG. 140, the right end plate 6772 is positioned within, and releasably received by, the right C-channel 6628 of the right frame rail 6620. According to an exemplary embodiment, the right apertures 6778 of the right end plate 6772 are positioned to correspond and align with the front apertures of the base plate 6622 of the right frame rail 6620. As shown in FIG. 140, the frame assembly 6512 includes a second plurality of fasteners, shown as fasteners 6634. According to an exemplary embodiment, the fasteners 6634 are configured to be received by the front apertures of the base plate 6622 of the right frame rail 6620 and the right apertures 6778 of the right end plate 6772 to facilitate releasably coupling the right end plate 6772 and the front cross member 6710 to the right frame rail 6620.

As shown in FIGS. 140 and 141, the left attachment member 6740 includes a first interface (e.g., an aperture, etc.), shown as left tow eye 6750, and a second interface (e.g., an aperture, etc.), shown left tie down 6752, extending from the left end plate 6742. As shown in FIG. 140, the left tow eye 6750 and the left tie down 6752 are positioned such that the left tow eye 6750 and the left tie down 6752 extend from the front end 6514 of the left C-channel 6608 of the left frame rail 6600. As shown in FIGS. 140 and 141, the right attachment member 6770 includes a first interface (e.g., an aperture, etc.), shown as right tow eye 6780, and a second interface (e.g., an aperture, etc.), shown right tie down 6782, extending from the right end plate 6772. As shown in FIG. 140, the right tow eye 6780 and the right tie down 6782 are positioned such that the right tow eye 6780 and the right tie down 6782 extend from the front end 6514 of the right C-channel 6628 of the right frame rail 6620.

According to an exemplary embodiment, the left tow eye 6750 and the right tow eye 6780 are configured to facilitate (i) towing (e.g., pushing, pulling, etc.) an object and/or another vehicle with the vehicle 10 and/or (ii) towing the vehicle 10. By way of example, the left tow eye 6750 and/or the right tow eye 6780 may receive a chain, a rope, and/or a strap to connect the front end 6514 of the frame assembly 6512 to an object and/or another vehicle 10. According to an exemplary embodiment, the left tow eye 6750, the right tow eye 6780, the left tie down 6752, the right tie down 6782, and/or the front apertures 6722 are configured to facilitate securing the front end 6514 of the frame assembly 6512 and/or the vehicle 10 to a surface or object. By way of example, the left tow eye 6750, the right tow eye 6780, the left tie down 6752, the right tie down 6782, and/or the front apertures 6722 may receive a chain, a rope, and/or a strap to secure the front end 6514 of the frame assembly 6512 and/or the vehicle 10 to the platform of a rail car, the floor of an aircraft carrier, the bed of a trailer, etc.

As shown in FIGS. 139 and 142, the rear cross member assembly 6800 is coupled to the rear end 6516 of the frame assembly 6512 and extends between the left frame rail 6600 and the right frame rail 6620. In an alternative embodiment, the front cross member assembly 6700 is coupled to the rear end 6516 of the frame assembly 6512 and extends between the left frame rail 6600 and the right frame rail 6620. As shown in FIGS. 142-144, the rear cross member assembly 6800 includes a cross member, shown as rear cross member 6810; a receiver, shown as hitch receiver 6830; a first coupling member, shown as left attachment member 6840; and a second coupling member, shown as right attachment member 6870. As shown in FIGS. 143 and 144, the rear cross member 6810 includes a first plate, shown as rear plate 6812; a second plate, shown as upper plate 6814, extending at an angle (e.g., perpendicularly, etc.) from the rear plate 6812; and a third plate, shown as lower plate 6816, extending at an angle (e.g., perpendicularly, etc.) from the rear plate 6812. According to an exemplary embodiment, the rear plate 6812, the upper plate 6814, and the lower plate 6816 are integrally formed. In other embodiments, the rear plate 6812, the upper plate 6814, and the lower plate 6816 are fixedly coupled (e.g., welded together, etc.).

As shown in FIGS. 143 and 144, the upper plate 6814 has a first extension, shown as left flange 6818, extending from a first lateral end (e.g., a left end, etc.) of the upper plate 6814 and a second extension, shown as right flange 6820, extending from an opposing second lateral end (e.g., a right end, etc.) of the upper plate 6814. According to an exemplary embodiment, the lower plate 6816 has a first extension (e.g., a left flange, similar to the left flange 6818 of the upper plate 6814, etc.) extending from a first lateral end (e.g., a left end, etc.) of the lower plate 6816 and a second extension (e.g., a right flange, similar to the right flange 6820 of the upper plate 6814, etc.) extending from an opposing second lateral end (e.g., a right end, etc.) of the lower plate 6816. As shown in FIGS. 143 and 144, the rear plate 6812 defines a plurality of apertures, shown as rear apertures 6822, spaced along a longitudinal length thereof. As shown in FIG. 143, the rear cross member 6810 includes a plurality of brackets, shown as rear brackets 6824, coupled to and extending from the lower plate 6816. The rear brackets 6824 may be used to facilitate coupling other components of the vehicle 10 to the frame assembly 6512.

As shown in FIGS. 143 and 144, the rear plate 6812 and the lower plate 6816 cooperatively define an aperture, shown as cutout 5326. The cutout 6826 is configured (e.g., positioned, sized, structured, etc.) to receive the hitch receiver 6830 such that the hitch receiver 6830 extends from the rear plate 6812 towards the front end 6514 of the frame assembly 6512. As shown in FIGS. 143 and 144, the hitch receiver 6830 defines an aperture, shown as hitch slot 6832. According to an exemplary embodiment, the hitch slot 6832 is configured to selectively and slidably receive a towing mechanism (e.g., a ball hitch, a pintle hook hitch, etc.). By way of example, a pin may be configured to pass through both the hitch receiver 6830 and the towing mechanism to selectively fix the towing mechanism within the hitch slot 6832. The hitch receiver 6830 may thereby facilitate towing (e.g., pushing, pulling, etc.) an object, a trailer, and/or another vehicle with the vehicle 10. As shown in FIGS. 142 and 144, the rear cross member assembly 6800 includes supports, shown as support plates 6828, positioned to extend (e.g., vertically, etc.) between the upper plate 6814, the rear plate 6812, and the hitch receiver 6830.

As shown in FIG. 142, the rear cross member assembly 6800 includes brackets, shown as support brackets 6834, positioned to extend (e.g., at an angle, etc.) between (i) the support plates 6828 and (ii) the base plate 6602 of the left frame rail 6600 and the base plate 6622 of the right frame rail 6620. According to an exemplary embodiment, the support brackets 6834 are releasably coupled to the support plates 6828, the left frame rail 6600, and the right frame rail 6620 (e.g., with fasteners, etc.). The support plates 6828 and/or the support brackets 6834 may provide support to the hitch receiver 6830 to increase the strength of the rear cross member assembly 6800 and/or increase the towing capacity of the rear cross member assembly 6800. According to an exemplary embodiment, the rear cross member 6810, the support plates 6828, and the hitch receiver 6830 are fixedly coupled together (e.g., welded, etc.). In other embodiments, the rear cross member 6810, the support plates 6828, and/or the hitch receiver 6830 are releasably coupled together (e.g., with fasteners, etc.). In an alternative embodiment, the rear cross member 6810, the support plates 6828, and/or the hitch receiver 6830 are integrally formed.

As shown in FIGS. 142-144, the left attachment member 6840 includes a body, shown as left end plate 6842, having a first surface, shown as upper edge 6844, and an opposing second surface, shown as lower edge 6846. As shown in FIGS. 143 and 144, the left flange 6818 of the upper plate 6814 and the left flange of the lower plate 6816 are positioned to receive the left end plate 6842 such that the left flange 6818 of the upper plate 6814 engages the upper edge 6844 of the left end plate 6842 and the left flange of the lower plate 6816 engages the lower edge 6846 of the left end plate 6842. According to an exemplary embodiment, the rear cross member 6810 and the left end plate 6842 are fixedly coupled together (e.g., welded, etc.). In other embodiments, the rear cross member 6810 and the left end plate 6842 are releasably coupled together (e.g., with fasteners, etc.). In an alternative embodiment, the rear cross member 6810 and the left end plate 6842 are integrally formed. As shown in FIGS. 143 and 144, the left end plate 6842 defines a plurality of apertures, shown as left apertures 6848.

As shown in FIGS. 142-144, the right attachment member 6870 includes a body, shown as right end plate 6872, having a first surface, shown as upper edge 6874, and an opposing second surface, shown as lower edge 6876. As shown in FIGS. 143 and 144, the right flange 6820 of the upper plate 6814 and the right flange of the lower plate 6816 are positioned to receive the right end plate 6872 such that the right flange 6820 of the upper plate 6814 engages the upper edge 6874 of the right end plate 6872 and the right flange of the lower plate 6816 engages the lower edge 6876 of the right end plate 6872. As shown in FIGS. 142-144, the rear cross member 6810 extends between the left end plate 6842 and the right end plate 6872. According to an exemplary embodiment, the rear cross member 6810 and the right end plate 6872 are fixedly coupled together (e.g., welded, etc.). In other embodiments, the rear cross member 6810 and the right end plate 6872 are releasably coupled together (e.g., with fasteners, etc.). In an alternative embodiment, the rear cross member 6810 and the right end plate 6872 are integrally formed. As shown in FIGS. 143 and 144, the right end plate 6872 defines a plurality of apertures, shown as right apertures 6878.

As shown in FIG. 142, the left end plate 6842 is positioned within, and releasably received by, the left C-channel 6608 of the left frame rail 6600. According to an exemplary embodiment, the left apertures 6848 of the left end plate 6842 are positioned to correspond and align with the rear apertures 6612 of the base plate 6602 of the left frame rail 6600. As shown in FIG. 142, the frame assembly 6512 includes a third plurality of fasteners, shown as fasteners 6616. According to an exemplary embodiment, the fasteners 6616 are configured to be received by the rear apertures 6612 of the base plate 6602 of the left frame rail 6600 and the left apertures 6848 of the left end plate 6842 to facilitate releasably coupling the left end plate 6842 and the rear cross member 6810 to the left frame rail 6600.

As shown in FIG. 142, the right end plate 6872 is positioned within, and releasably received by, the right C-channel 6628 of the right frame rail 6620. According to an exemplary embodiment, the right apertures 6878 of the right end plate 6872 are positioned to correspond and align with the rear apertures of the base plate 6622 of the right frame rail 6620. As shown in FIG. 142, the frame assembly 6512 includes a fourth plurality of fasteners, shown as fasteners 6636. According to an exemplary embodiment, the fasteners 6636 are configured to be received by the rear apertures of the base plate 6622 of the right frame rail 6620 and the right apertures 6878 of the right end plate 6872 to facilitate releasably coupling the right end plate 6872 and the rear cross member 6810 to the right frame rail 6620.

As shown in FIGS. 142-144, the left attachment member 6840 includes a first interface (e.g., an aperture, etc.), shown as left tow eye 6850, and a second interface (e.g., an aperture, etc.), shown left tie down 6852, extending from the left end plate 6842. As shown in FIG. 142, the left tow eye 6850 and the left tie down 6852 are positioned such that the left tow eye 6850 and the left tie down 6852 extend from the rear end 6516 of the left C-channel 6608 of the left frame rail 6600. As shown in FIGS. 142-144, the right attachment member 6870 includes a first interface (e.g., an aperture, etc.), shown as right tow eye 6880, and a second interface (e.g., an aperture, etc.), shown right tie down 6882, extending from the right end plate 6872. As shown in FIG. 142, the right tow eye 6880 and the right tie down 6882 are positioned such that the right tow eye 6880 and the right tie down 6882 extend from the rear end 6516 of the right C-channel 6628 of the right frame rail 6620.

According to an exemplary embodiment, the left tow eye 6850 and the right tow eye 6880 are configured to facilitate (i) towing (e.g., pushing, pulling, etc.) an object and/or another vehicle with the vehicle 10 and/or (ii) towing the vehicle 10. By way of example, the left tow eye 6850 and/or the right tow eye 6880 may receive a chain, a rope, and/or a strap to connect the rear end 6516 of the frame assembly 6512 to an object and/or another vehicle 10. According to an exemplary embodiment, the left tow eye 6850, the right tow eye 6880, the left tie down 6852, the right tie down 6882, and/or the rear apertures 6822 are configured to facilitate securing the rear end 6516 of the frame assembly 6512 and/or the vehicle 10 to a surface or object. By way of example, the left tow eye 6850, the right tow eye 6880, the left tie down 6852, the right tie down 6882, and/or the rear apertures 6822 may receive a chain, a rope, and/or a strap to secure the rear end 6516 of the frame assembly 6512 and/or the vehicle 10 to the platform of a rail car, the floor of an aircraft carrier, the bed of a trailer, etc.

As shown in FIG. 145, the rear cross member assembly 6900 is coupled to the rear end 6516 of the frame assembly 6512 and extends between the left frame rail 6600 and the right frame rail 6620 (e.g., the rear cross member assembly 6900 may replace and/or be interchangeable with the rear cross member assembly 6800, etc.). As shown in FIGS. 145-147, the rear cross member assembly 6900 includes a cross member, shown as rear cross member 6910; a receiver, shown as hitch receiver 6930; a first coupling member, shown as left attachment member 6940; and a second coupling member, shown as right attachment member 6970. As shown in FIGS. 146 and 147, the rear cross member 6910 includes a first plate, shown as rear plate 6912; a second plate, shown as upper plate 6914, extending at an angle (e.g., perpendicularly, etc.) from the rear plate 6912; and a third plate, shown as lower plate 6916, extending at an angle (e.g., perpendicularly, etc.) from the rear plate 6912. In some embodiments, the rear plate 6912, the upper plate 6914, and the lower plate 6916 are integrally formed. In some embodiments, the rear plate 6912, the upper plate 6914, and the lower plate 6916 are fixedly coupled (e.g., welded together, etc.).

As shown in FIGS. 146 and 147, the upper plate 6914 has a first extension, shown as left flange 6918, extending from a first lateral end (e.g., a left end, etc.) of the upper plate 6914 and a second extension, shown as right flange 6920, extending from an opposing second lateral end (e.g., a right end, etc.) of the upper plate 6914. According to an exemplary embodiment, the lower plate 6916 has a first extension (e.g., a left flange, similar to the left flange 6918 of the upper plate 6914, etc.) extending from a first lateral end (e.g., a left end, etc.) of the lower plate 6916 and a second extension (e.g., a right flange, similar to the right flange 6920 of the upper plate 6914, etc.) extending from an opposing second lateral end (e.g., a right end, etc.) of the lower plate 6916.

As shown in FIG. 146, the rear plate 6912 defines an aperture, shown as cutout 6926. The cutout 6926 is configured (e.g., positioned, sized, structured, etc.) to receive the hitch receiver 6930 such that the hitch receiver 6930 extends from the rear plate 6912 towards the front end 6514 of the frame assembly 6512. As shown in FIGS. 146 and 147, the hitch receiver 6930 defines an aperture, shown as hitch slot 6932. According to an exemplary embodiment, the hitch slot 6932 is configured to selectively and slidably receive a towing mechanism (e.g., a ball hitch, a pintle hook hitch, etc.). By way of example, a pin may be configured to pass through both the hitch receiver 6930 and the towing mechanism to selectively fix the towing mechanism within the hitch slot 6932. The hitch receiver 6930 may thereby facilitate towing (e.g., pushing, pulling, etc.) an object and/or another vehicle with the vehicle 10.

As shown in FIG. 147, the rear cross member assembly 6900 includes an intermediate plate, shown as intermediate plate 6934, positioned to extend from the rear plate 6912 along a top surface of the hitch receiver 6930. As shown in FIG. 147, the rear cross member assembly 6900 includes supports, shown as support plates 6928, positioned to extend between the upper plate 6914, the rear plate 6912, and intermediate plate 6934. As shown in FIGS. 146 and 147, the rear cross member assembly 6900 includes a support member, shown as lateral support bar 6936, positioned to extend between the left attachment member 6940 and the right attachment member 6970 (e.g., proximate a front end thereof, an end opposite the rear plate 6912, etc.). The support plates 6928, the intermediate plate 6934, and the lateral support bar 6936 may provide support to the hitch receiver 6930 to increase the strength of the rear cross member assembly 6900 and/or increase the towing capacity of the rear cross member assembly 6900. According to an exemplary embodiment, the rear cross member 6910, the support plates 6928, the hitch receiver 6930, the intermediate plate 6934, and the lateral support bar 6936 are fixedly coupled together (e.g., welded, etc.). In other embodiments, the rear cross member 6910, the support plates 6928, the hitch receiver 6930, the intermediate plate 6934, and/or the lateral support bar 6936 are releasably coupled together (e.g., with fasteners, etc.). In an alternative embodiment, the rear cross member 6910, the support plates 6928, the hitch receiver 6930, the intermediate plate 6934, and/or the lateral support bar 6936 are integrally formed.

As shown in FIGS. 145-147, the left attachment member 6940 includes a body, shown as left end plate 6942, having a first surface, shown as upper edge 6944, and an opposing second surface, shown as lower edge 6946. As shown in FIGS. 146 and 147, the left flange 6918 of the upper plate 6914 and the left flange of the lower plate 6916 are positioned to receive the left end plate 6942 such that the left flange 6918 of the upper plate 6914 engages the upper edge 6944 of the left end plate 6942 and the left flange of the lower plate 6916 engages the lower edge 6946 of the left end plate 6942. According to an exemplary embodiment, the rear cross member 6910 and the left end plate 6942 are fixedly coupled together (e.g., welded, etc.). In other embodiments, the rear cross member 6910 and the left end plate 6942 are releasably coupled together (e.g., with fasteners, etc.). In an alternative embodiment, the rear cross member 6910 and the left end plate 6942 are integrally formed. As shown in FIGS. 146 and 147, the left end plate 6942 defines a plurality of apertures, shown as left apertures 6948.

As shown in FIGS. 145-147, the right attachment member 6970 includes a body, shown as right end plate 6972, having a first surface, shown as upper edge 6974, and an opposing second surface, shown as lower edge 6976. As shown in FIGS. 146 and 147, the right flange 6920 of the upper plate 6914 and the right flange of the lower plate 6916 are positioned to receive the right end plate 6972 such that the right flange 6920 of the upper plate 6914 engages the upper edge 6974 of the right end plate 6972 and the right flange of the lower plate 6916 engages the lower edge 6976 of the right end plate 6972. As shown in FIGS. 145-147, the rear cross member 6910 extends between the left end plate 6942 and the right end plate 6972. According to an exemplary embodiment, the rear cross member 6910 and the right end plate 6972 are fixedly coupled together (e.g., welded, etc.). In other embodiments, the rear cross member 6910 and the right end plate 6972 are releasably coupled together (e.g., with fasteners, etc.). In an alternative embodiment, the rear cross member 6910 and the right end plate 6972 are integrally formed. As shown in FIGS. 146 and 147, the right end plate 6972 defines a plurality of apertures, shown as right apertures 6978.

As shown in FIG. 145, the left end plate 6942 is positioned within, and releasably received by, the left C-channel 6608 of the left frame rail 6600. According to an exemplary embodiment, the left apertures 6948 of the left end plate 6942 are positioned to correspond and align with the rear apertures 6612 of the base plate 6602 of the left frame rail 6600. According to an exemplary embodiment, the fasteners 6616 are configured to be received by the rear apertures 6612 of the base plate 6602 of the left frame rail 6600 and the left apertures 6948 of the left end plate 6942 to facilitate releasably coupling the left end plate 6942 and the rear cross member 6910 to the left frame rail 6600.

As shown in FIG. 145, the right end plate 6972 is positioned within, and releasably received by, the right C-channel 6628 of the right frame rail 6620. According to an exemplary embodiment, the right apertures 6978 of the right end plate 6972 are positioned to correspond and align with the rear apertures of the base plate 6622 of the right frame rail 6620. According to an exemplary embodiment, the fasteners 6636 are configured to be received by the rear apertures of the base plate 6622 of the right frame rail 6620 and the right apertures 6978 of the right end plate 6972 to facilitate releasably coupling the right end plate 6972 and the rear cross member 6910 to the right frame rail 6620.

As shown in FIGS. 145-147, the left attachment member 6940 includes a first interface (e.g., an aperture, etc.), shown as left tow eye 6950, and a second interface (e.g., an aperture, etc.), shown left tie down 6952, extending from the left end plate 6942. As shown in FIG. 145, the left tow eye 6950 and the left tie down 6952 are positioned such that the left tow eye 6950 and the left tie down 6952 extend from the rear end 6516 of the left C-channel 6608 of the left frame rail 6600. As shown in FIGS. 145-147, the right attachment member 6970 includes a first interface (e.g., an aperture, etc.), shown as right tow eye 6980, and a second interface (e.g., an aperture, etc.), shown right tie down 6982, extending from the right end plate 6972. As shown in FIG. 145, the right tow eye 6980 and the right tie down 6982 are positioned such that the right tow eye 6980 and the right tie down 6982 extend from the rear end 6516 of the right C-channel 6628 of the right frame rail 6620.

According to an exemplary embodiment, the left tow eye 6950 and the right tow eye 6980 are configured to facilitate (i) towing (e.g., pushing, pulling, etc.) an object and/or another vehicle with the vehicle 10 and/or (ii) towing the vehicle 10. By way of example, the left tow eye 6950 and/or the right tow eye 6980 may receive a chain, a rope, and/or a strap to connect the rear end 6516 of the frame assembly 6512 to an object and/or another vehicle 10. According to an exemplary embodiment, the left tow eye 6950, the right tow eye 6980, the left tie down 6952, and/or the right tie down 6982 are configured to facilitate securing the rear end 6516 of the frame assembly 6512 and/or the vehicle 10 to a surface or object. By way of example, the left tow eye 6950, the right tow eye 6980, the left tie down 6952, and/or the right tie down 6982 may receive a chain, a rope, and/or a strap to secure the rear end 6516 of the frame assembly 6512 and/or the vehicle 10 to the platform of a rail car, the floor of an aircraft carrier, the bed of a trailer, etc.

Axle Forward Mechanical Arrangement

Referring to FIGS. 148-156, a vehicle 7000 is shown. Unless otherwise specified, the vehicle 7000 may be substantially similar to the vehicle 10. Referring to FIGS. 149 and 150, the vehicle 7000 includes a chassis, shown as frame 7010. The frame 7010 includes a pair of longitudinal members, shown as frame rails 7012, extending along the length of the vehicle 7000. As shown, the frame rails 7012 are formed from a C-shaped channel. The C-shape includes a base section 7016, to which other components are coupled (e.g., using fasteners, etc.). The frame 7010 further includes a front cross member 7018 and a rear cross member 7020 disposed between and coupled to both frame rails 7012. A front lift structure 7022 is coupled to both frame rails 7012 and extends upwards. The front lift structure 7022 provides a pair of points from which to lift the vehicle 7000 (e.g., using a crane, a helicopter, etc.).

Referring to FIGS. 148 and 151-156, the vehicle 7000 includes a cabin, shown as front cabin 7030. The front cabin 7030 is coupled to the frame 7010. The front cabin 7030 is configured to contain one or more operators during operation of the vehicle 7000. According to an exemplary embodiment, the front cabin 7030 includes one or more doors, shown as doors 7032, that facilitate entering and exiting an interior of the front cabin 7030. The interior of the front cabin 7030 may include a plurality of seats (e.g., two, three, four, five, etc.), vehicle controls, driving components (e.g., steering wheel, accelerator pedal, brake pedal, etc.), etc. The interior of the front cabin 7030 is disposed between a frontmost surface 7034 and a rearmost surface 7036 of the front cabin 7030. The frontmost surface 7034 is defined by a front wall of the front cabin 7030, and the rearmost surface 7036 is defined by a rear wall of the front cabin 7030. As shown in FIG. 148, the front cabin 7030 is pivotable about an axis 7040 extending laterally across the vehicle 7000. In other embodiments, the front cabin 7030 is fixed to the frame 7010. The vehicle 7000 may include an actuator (e.g., a hydraulic actuator, a pneumatic actuator, etc.) configured to rotate the front cabin 7030 about the axis 7040 between a lowered position (shown in FIG. 148) and a raised position. Rotating the front cabin 7030 to the raised position facilitates accessing the components (e.g., an engine, etc.) underneath the front cabin 7030.

The front cabin 7030 may be configured to receive an armor kit that includes a number of armor panels. The armor panels can be coupled to the exterior surfaces (e.g., the left and right sides, the bottom, etc.) of the front cabin 7030 to increase the level of protection afforded by the front cabin 7030 during a blast event, contact with a projectile, etc. When operating the vehicle 7000 in a situation where armor is not necessary, the armor panels may be removed from the front cabin 7030. Accordingly, the front cabin 7030 may be outfitted with connection points (e.g., built-in threaded fasteners, etc.) to facilitate quick removal or addition of armor panels throughout the life of the vehicle 7000.

Referring to FIGS. 148 and 151-153, the vehicle 7000 includes a front tractive assembly, shown as front axle assembly 7050, and a pair of rear tractive assemblies, shown as rear axle assemblies 7052. In other embodiments, the vehicle 7000 includes one or more rear axle assemblies 7052. The front and rear axle assemblies 7050, 7052 may be substantially similar to the front and rear tractive assemblies 40, 42. As shown in FIG. 150, each axle assembly 7050, 7052 is coupled to the base sections 7016 of the frame rails 7012 (e.g., using side plates, etc.). As shown in FIG. 152, a central axis of the front axle assembly 7050 (i.e., a lateral axis passing through the center of the front axle assembly 7050) is disposed entirely forward of the front cabin 7030 (i.e., forward of the frontmost surface 7034). The rear axle assemblies 7052 are disposed rearward of the front cabin 7030, under the mission equipment (e.g., the mission equipment 154, etc.). The front axle assembly 7050 includes a pair of tractive elements, shown as front wheel and tire assemblies 7060. Each rear axle assembly 7052 includes a pair of tractive elements, shown as rear wheel and tire assemblies 7062. Each wheel and tire assembly 7060, 7062 includes a tire 7064 configured to provide traction with the ground and a wheel 7066 coupling the tire to the rest of the axle assembly. As shown in FIGS. 152 and 153, the front and rear wheel and tire assemblies 7060 and 7062 are the same size (e.g., the same diameter, the same width, etc.).

Referring to FIGS. 148 and 154, the vehicle 7000 includes a body component, shown as hood 7070. The hood 7070 is disposed immediately forward of the front cabin 7030 and above the front axle assembly 7050. In some embodiments, the hood 7070 defines a frontmost surface of the vehicle 7000 or of a portion of the vehicle 7000 (e.g., the hood 7070 defines a frontmost surface above the front wheel and tire assemblies 7060, etc.). The hood 7070 may be configured to rotate about an axis 7072 extending laterally across the vehicle 10. Such rotation may facilitate forward movement of the front cabin 7030 without obstruction from the hood 7070. The hood 7070 is rotatable between a closed position (shown in FIG. 148) and an open position where the hood 7070 is rotated forward. The front lift structure 7042 extends through the hood 7070 such that the front lift structure 7042 may be accessed without moving the hood 7070 to the open position. The hood 7070 may provide a structure to support and/or contain various components of the vehicle 7000 (e.g., headlights, the radiator 7100, etc.).

Referring to FIGS. 151-153 and 155, the vehicle 7000 includes a powertrain system that includes a primary driver, shown as engine 7080, a transmission 7082, and a transfer case 7084. The engine 7080 is configured to consume stored energy from an energy source (e.g., chemical energy stored in fuel, electrical energy stored in a battery, etc.) provide a power output to the transmission 7082 to drive the vehicle 7000. The engine 7080 may be configured to provide power to drive one or more of the front and rear axle assemblies 7050, 7052. The transmission 7082 may be configured to adjust the speed of the engine power output and provide a power output to the transfer case 7084. The transfer case 7084 may split the power output from the transmission 7082 and provide power to the front and/or rear axle assemblies 7050, 7052 (e.g., via one or more drive shafts, etc.).

Referring still to FIGS. 151-153 and 155, the engine 7080, the transmission 7082, and the transfer case 7084 are arranged in line with one another. The engine 7080, the transmission 7082, and the transfer case 7084 are located between the frame rails 7012 and may be located along a vertical plane centered laterally along the vehicle 7000. As shown in FIGS. 151 and 152, the engine 7080 is disposed entirely behind the frontmost surface 7034 of the front cabin 7030. A portion of the engine 7080 (e.g., 10% of the engine 7080, 144% of the engine 180, etc.) may be disposed behind the rearmost surface 7036 of the front cabin 7030. In some embodiments, the majority of the engine 7080 is disposed directly below the front cabin 7030 when the front cabin 7030 is in the lowered position. Moving the front cabin 7030 to the raised position facilitates access to the top of the engine 7080 (e.g., for maintenance, etc.) without having to disassemble the vehicle 7000. The transmission 7082 may be disposed rearward of the engine 7080. The transfer case 7084 may be disposed rearward of the transmission 7082. Placement of the engine 7080 and other components of the powertrain system rearward of the frontmost surface 7034 distributes their weight more evenly between the front and rear axle assemblies 7050, 7052 and opens a space under the hood 7070 for the front lift structure 7042.

Referring to FIG. 154, the vehicle 7000 includes a radiator 7100 disposed near the front end of the vehicle 7000. The radiator 7100 may be fluidly coupled to the engine 7080 and configured to transfer thermal energy from the engine 7080 to the air surrounding the vehicle 7000. The radiator 7100 may be exposed or covered with a permeable grill at the front end of the vehicle 7000 such that air passes through the radiator 7100, increasing its effectiveness when the vehicle 7000 drives forward. In some embodiments, the vehicle 7000 includes a fan to force air through the radiator 7100. Referring to FIG. 148, the radiator 7100 is located inside the hood 7070, with the hood 7070 partially cutaway to expose the radiator 7100. The radiator 7100 may be located forward of the front lift structure 7042 and/or the central axis of the front axle assembly 7050.

In some conventional vehicles, the front cabin is located directly above the front axle assembly. The distribution of the weight of the front cabin, and any other component on the vehicle, between the various axle assemblies of the vehicle is a function of the distance between the weight (e.g., the front cabin) and each axle assembly. With a greater the distance between the weight and the axle assembly, the axle assembly will support less weight. By way of example, semi-trucks used in Europe often place the front cabin directly over the front axle assembly such that nearly all the weight of the front cabin is supported by the front axle assembly. The load of the front cabin is generally relatively minimal and constant (any cargo on a semi-truck is generally placed rearward of the front cabin), and the front axle assembly may be sized accordingly. However, in some military applications, such as the vehicle 7000, the front cabin is armored, drastically increasing the weight of the front cabin. The vehicle 7000 is arranged with the front axle assembly 7050 positioned forward of the front cabin 7030 (i.e., in an axle-forward arrangement) and the powertrain system, which more evenly distributes the weight among the front and rear axle assemblies 7050, 7052 and reduces the load on the front axle assembly 7050 relative to conventional arrangements.

The reduction of load on the front axle assembly 7050 facilitates incorporating components rated for lesser loads. In some embodiments, the front axle assembly 7050 and rear axle assemblies 7052 each use axles rated to support the same or similar loads (e.g., 139,000 lbs., 144,000 lbs., 149,000 lbs., etc.). The front and rear axle assemblies 7050, 7052 may each use other components (e.g., springs, bearings, dampers, etc.) that are the same or similar for all of the axle assemblies 7050, 7052. The position of the front cabin 7030 thereby facilitates using one set of parts for all of the axle assemblies, reducing the amount of unique parts necessary to stock for maintenance of the vehicle 7000.

Some vehicles, including military vehicles, may be required to traverse terrain having a loosely packed surface, such as soft soil or sand. Supporting a significantly larger portion of the vehicle weight on one axle assembly than on another axle assembly increases the likelihood that one or more tires will sink into the surface of the terrain. Such sinking reduces the handling and performance of the vehicle as it forces its way through the terrain. Increasing the size of the vehicle tires (e.g., the diameter, the width, etc.) can reduce the sinking effect by applying the weight of the vehicle over a larger surface area. However, increasing the size of one set of wheels without increasing the size of the others requires the wheels on each axle to rotate at different speeds to achieve the same effective linear speed. Increasing the diameter of the wheels requires the body of the vehicle to sit higher to achieve the same amount of suspension travel. This raises the center of gravity of the vehicle, decreasing stability. The axle forward arrangement of the vehicle 7000 distributes the weight of the front cabin 7030 and powertrain system components between the front and rear axle assemblies 7050, 7052. The tires 7064 may be the same, minimal size (e.g., width and/or diameter), enabling the vehicle 7000 to pass through loose soil without raising the center of gravity of the vehicle 7000 to accommodate larger tires 7064.

The axle forward arrangement of the vehicle 7000 increases the ride quality for the passengers riding in the front cabin 7030. Moving the front cabin 7030 away from the front axle assembly 7050 reduces the effect of a disturbance (e.g., driving over a bump, etc.) experienced by the front axle assembly 7050 on the front cabin 7030. By way of example, a vertical displacement near the front end of the frame 7010 (e.g., caused by the front axle assembly 7050 driving over a bump, etc.) results in a smaller displacement near the middle of the frame 7010 and an even smaller displacement near the back of the frame 7010.

Suspension Element

Referring to FIGS. 157-158, an axle assembly is configured for use with the vehicle. According to the exemplary embodiment shown in FIG. 157, an axle assembly 7210 includes a differential 7212 connected to half shafts 7214, which are each connected to a wheel end assembly 7216. Alternatively, each wheel end assembly 7216 includes a prime mover (e.g., the axle assembly 7210 includes electric motors that each drive one wheel). Alternatively, the wheel end assembly 7216 may be implemented on a non-driven axle (e.g., an axle that includes or does not include a differential, half shaft, drive motor, or other component configured to provide a motive force, etc.); for example, as shown in FIG. 158. As shown in FIGS. 157-158, the wheel end assembly 7216 is at least partially controlled (e.g., supported) by a suspension system 7218, which includes a suspension element, shown as integrated spring damper 7220, an upper support arm 7224, and a lower support arm 7226 coupling the wheel end assembly 7216 to the vehicle body or part thereof (e.g., chassis, side plate, hull, etc.).

As shown in FIG. 157, the differential 7212 is configured to be connected with a drive shaft of the vehicle, receiving rotational energy from a prime mover of the vehicle, such as a diesel engine. The differential 7212 allocates torque provided by the prime mover between half shafts 7214 of the axle assembly 7210. The half shafts 7214 deliver the rotational energy to the wheel end assemblies 16 of the axle assembly 7210. The wheel end assemblies 16 may include brakes (e.g., disc brakes, drum brakes, etc.), gear reductions, steering components, wheel hubs, wheels, and other features. As shown in FIG. 158, the wheel end assemblies 16 include disc brakes. As the vehicle travels over uneven terrain, the upper and lower support arms 7224, 7226 at least partially guide the movement of each wheel end assembly 7216, and a stopper, shown as cushion 7228 provides an upper bound for movement of the wheel end assembly 7216.

As shown in FIG. 158, the suspension system 7218 includes various components configured to improve performance of the vehicle. The suspension system 7218 may also include various auxiliary components (not shown) such as a high-pressure gas pump coupled to a gas spring, a plurality of high-pressure gas pumps each coupled to separate gas springs, or fewer gas pumps than gas springs. In some embodiments, at least one of the suspension components receive and provide a fluid (e.g., gas, hydraulic fluid) to lift or lower the body of the vehicle with respect to the ground thereby changing the ride height of the vehicle.

According to the exemplary embodiment shown in FIGS. 159A-159B, an integrated spring damper 7300 is configured to act as a damper (e.g., a hydraulic damper) and a spring (e.g., a high pressure gas spring) simultaneously. The integrated spring damper 7300 includes a main body 7302 (e.g., cylinder, housing, base, etc.). In one embodiment, main body 7302 is tubular. The ends of the main body 7302 are closed by a cap 7304 and a barrier 7306 to define an internal volume. The internal volume of the main body 7302 is separated into a central chamber and an annular, outer chamber by an inner tube 7310 that extends from the cap 7304 to the barrier 7306. The end of the inner tube 7310 proximate to the barrier 7306 is closed with a cap 7312. The cap 7312 may be generally aligned with the barrier 7306 (e.g., received in a central opening 7314 in the barrier 7306). The integrated spring damper 7300 further includes a tubular (e.g., cylindrical, etc.) element, shown as main tube 7316. In one embodiment, main tube 7316 is tubular and defines an inner volume. The main tube 7316 is received in the annular chamber of the internal volume of the main body 7302. The main tube 7316 is configured to translate with respect to the main body 7302. According to an exemplary embodiment, the main tube 7316 has an inner diameter that is approximately equal to the outer diameter of the inner tube 7310 such that the inner tube 7310 is received in the main tube 7316 when the main tube 7316 is disposed within the internal volume of the main body 7302. The distal end of the main tube 7316 is closed by a cap 7318. The cap 7304, barrier 7306, cap 7312, and cap 7318 may be coupled to the respective components with a threaded connection or with another coupling mechanism (e.g., welding, brazing, interference fit, etc.).

According to an exemplary embodiment, the integrated spring damper 7300 includes a first eyelet 7320 and a second eyelet 7322 with which the integrated spring damper 7300 is coupled to an axle assembly. According to an exemplary embodiment, the integrated spring damper 7300 is coupled on one end (e.g., with the first eyelet 7320) to a moveable member of the axle assembly (e.g., an upper support arm, a lower support arm, etc.) and on the other end (e.g., with the second eyelet 7322) to the vehicle, vehicle structural element, vehicle body, or part thereof (e.g., chassis, side plate, hull). According to an exemplary embodiment, the first eyelet 7320 and the second eyelet are integrally formed with the cap 7304 and the cap 7318, respectively.

A main piston 7324 is disposed in the outer annular chamber defined between the main body 7302 and the inner tube 7310. The main piston 7324 is coupled to the main tube 7316 and extends to an inner surface of the main body 7302. The main piston 7324 separates the outer annular chamber into first annular chamber 7326 and a second annular chamber 7328. When the main tube 7316 translates relative to the main body 7302, the main piston 7324 changes the volume of the first annular chamber 7326 and the second annular chamber 7328. A dividing piston 7330 (e.g., floating piston) is disposed in the inner chamber defined by the inner tube 7310. The dividing piston 7330 slidably engages the inner tube 7310. The dividing piston 7330 separates the inner chamber into first inner chamber 7332 and a second inner chamber 7334. The pistons 7324 and 7330 may be coupled to the sidewalls of the main body 7302 and the inner tube 7310 with a seal or other interfacing member (e.g., ring, wear band, guide ring, wear ring, etc.).

The first annular chamber 7326, the second annular chamber 7328, and the first inner chamber 7332 contain a generally non-compressible fluid. In one embodiment, the first annular chamber 7326, the second annular chamber 7328, and the first inner chamber 7332 are hydraulic chambers configured to contain a hydraulic fluid therein (e.g., water, hydraulic oil, etc.). The first inner chamber 7332 is in fluid communication with the first annular chamber 7326 through apertures 7336 in the inner tube 7310. The fluid may flow between the first annular chamber 7326 and the second annular chamber 7328 through a passage 7342 (e.g., conduit, bore, etc.) in a bypass manifold 7340. According to an exemplary embodiment, the bypass manifold 7340 is a structure coupled (e.g., bolted) to the side of the main body 7302 and the passage 7342 is in fluid communication with the first annular chamber 7326 through an aperture 7344 in the main body 7302 and with the second annular chamber 7328 through an aperture 7346 in the main body 7302. Providing the bypass manifold 7340 as a separate component coupled to the exterior of the main body 7302 allows the bypass manifold 7340 to be replaced to vary the behavior of the integrated spring damper 7300, such as by changing the valving or adding optional features (e.g., position dependency).

The flow of fluid through the passage 7342 is controlled by a flow control device 7348. According to an exemplary embodiment, the flow control device 7348 is a disk valve disposed within the bypass manifold 7340 along the passage 7342. In other embodiments, the flow control device 7348 may be another device, such as a pop off valve, or an orifice. In other embodiments, the flow control device remotely positioned but in fluid communication with the first annular chamber 7326 and the second annular chamber 7328.

The second inner chamber 7334 contains a generally compressible fluid that may include (e.g., at least 90%, at least 95%) an inert gas such as nitrogen, argon, or helium, among others. The second inner chamber 7334 is in fluid communication with the internal volume 7350 of the main tube 7316 through apertures 7352 in the cap 7312. In some embodiments, the internal volume 7350 of the main tube 7316 is in fluid communication with external devices, such as one or more reservoirs (e.g., central reservoir, tank), an accumulator, or device allowing the pressure of the gas to be adjusted. The pressure of the gas may be adjusted by removing or adding a volume of gas to adjust the suspension ride height.

When the integrated spring damper 7300 is compressed or extended, the main tube 7316 translates relative to the main body 7302. The gas held in the second inner chamber 7334 compresses or expands in response to relative movement between the main tube 7316 and the dividing piston 7330, which may remain relatively stationary but transmit pressure variations between the incompressible hydraulic fluid in the first inner chamber 7332 and the compressible fluid in second inner chamber 7334. The gas in the second inner chamber 7334 resists compression, providing a force that is a function of the compressibility of the gas, the area of the piston, the volume and geometry of the chamber, and the current state (e.g., initial pressure) of the gas, among other factors. The receipt of potential energy as the gas is compressed, storage of potential energy, and release of potential energy as the gas expands provide a spring function for the integrated spring damper 7300.

Movement of the main tube 7316 relative to the main body 7302 translates the main piston 7324, causing the volume of the first annular chamber 7326 and the second annular chamber 7328 to vary. When the integrated spring damper 7300 compresses, the volume of the first annular chamber 7326 decreases while the volume of the second annular chamber 7328 increases. The fluid is forced from the first annular chamber 7326 through the passage 7342 and past the flow control device 7348 into the second annular chamber 7328. The resistance to the flow of the fluid through the passage provides a damping function for the integrated spring damper 7300 that is independent of the spring function. Movement of the main piston 7324 also changes the pressure of the fluid within first inner chamber 7332. Such pressure variation imparts a force on a first side of the dividing piston 7330 that varies the pressure of the fluid within the second inner chamber 7334.

Referring to FIG. 160, an integrated spring damper assembly 7400 is shown, according to another exemplary embodiment. The integrated spring damper assembly 7400 includes a tubular element (e.g., cylindrical, etc.), shown as main body 7402 (e.g., cylinder, housing, base, etc.). The ends of the main body 7402 are closed by a cap 7404 and a barrier 7406 to define an internal volume. The integrated spring damper assembly 7400 further includes a tubular element (e.g., cylindrical, etc.), shown as main tube 7416. The main tube 7416 is received in the internal volume of the main body 7402. The main tube 7416 is configured to translate with respect to the main body 7402. The distal end of the main tube 7416 is closed by a cap 7418. The cap 7404, barrier 7406, and cap 7418 may be coupled to the respective components with a threaded connection or with another coupling mechanism (e.g., welding, brazing, interference fit, etc.).

According to an exemplary embodiment, the integrated spring damper assembly 7400 includes a first eyelet 7420 and a second eyelet 7422 with which the integrated spring damper assembly 7400 is coupled to an axle assembly. According to an exemplary embodiment, the integrated spring damper assembly 7400 is coupled on one end (e.g., with the first eyelet 7420) to a moveable member of the axle assembly (e.g., an upper support arm, a lower support arm, etc.) and on the other end (e.g., with the second eyelet 7422) to the vehicle, vehicle structural element, vehicle body, or part thereof (e.g., chassis, side plate, hull). According to an exemplary embodiment, the first eyelet 7420 and the second eyelet 7422 are integrally formed with the cap 7404 and the cap 7418, respectively.

A main piston 7424 is disposed in the internal volume of the main body 7402. The main piston 7424 is coupled to the main tube 7416 and slidably engages the main body 7402. The main piston 7424 separates the internal volume into a first chamber 7426 (e.g., compression chamber) and a second chamber 7428 (e.g., extension chamber). The first chamber 7426 is a generally cylindrical chamber comprising the portion of the internal volume of the main body 7402 between the main piston 7424 and the cap 7404. The second chamber 7428 is an annular chamber defined between the main body 7402 and the main tube 7416 and extends between the main piston 7424 and the barrier 7406. When the main tube 7416 translates relative to the main body 7402, the main piston 7424 changes the volume of the first chamber 7426 and the second chamber 7428. A dividing piston 7430 (e.g., floating piston) is disposed in the main tube 7416 and slidably engages the main tube 7416. The dividing piston 7430 separates the internal volume of the main tube 7416 into the first inner chamber 7432 and a second inner chamber 7434. According to an exemplary embodiment, the first inner chamber 7432 is open to (i.e., in fluid communication with) the first chamber 7426.

A limiter, shown as recoil damper 7436, is disposed within the internal volume of the main body 7402 between the main piston 7424 and the barrier 7406. The recoil damper 7436 is intended to reduce the risk of damage to the main piston 7424, barrier 7406, the sidewall of main body 7402, or still another component of the integrated spring damper assembly 7400 by reducing the forces imparted by the main piston 7424 as it travels toward an end of stroke.

A recoil damper 7436 dissipates energy thereby reducing the total energy of the integrated spring damper assembly 7400. As the vehicle encounters a positive obstacle (e.g., a bump, a curb, etc.) or a negative obstacle (e.g., a depression, etc.), the main tube 7416 moves relative to main body 7402. Various factors including, among others, the speed of the vehicle, the weight of the vehicle, and the characteristics of the obstacle affect the energy imparted into the integrated spring damper assembly 7400 by the obstacle. By way of example, main tube 7416 translates away from the cap 7404 of first eyelet 7420 as a wheel of the vehicle encounters a negative obstacle. It should be understood that the main tube 7416 possesses kinetic energy that contributes to the total energy of integrated spring damper assembly 7400. Interaction of the recoil damper 7436 with the main piston 7424 dissipates energy thereby reducing the total energy of the integrated spring damper assembly 7400. Such dissipated energy does not increase the kinetic energy of main tube 7416 or main piston 7424, according to an exemplary embodiment.

Referring to FIG. 161, a recoil damper 7510 according to an exemplary embodiment is shown. To illustrate the design and operation of the recoil damper 7510, FIG. 161 shows the recoil damper 7510 integrated with a suspension component, shown as damper assembly 7500. According to the exemplary embodiment shown in FIG. 161, damper assembly 7500 includes a tubular element (e.g. cylindrical), shown as shaft 7538, coupled to a body portion 7504. As shown in FIG. 161, body portion 7504 includes a tubular (e.g., cylindrical) main body, shown as housing 7514, that includes a first end 7522 and a second end 7524. An end cap 7532 is coupled to first end 7522 of housing 7514. Housing 7514 includes a sidewall that defines an inner volume. The shaft 7538 translates within the inner volume between an extended position and a retracted position. According to an exemplary embodiment, a main piston, shown as plunger 7512, is positioned within the inner volume of housing 7514 and coupled to an end of shaft 7538. A limiter, shown as recoil damper 7510, is disposed within the inner volume of housing 7514 between plunger 7512 and end cap 7532. Recoil damper 7510 is intended to reduce the risk of damage to plunger 7512, end cap 7532, the sidewall of housing 7514, or still another component of damper assembly 7500 by reducing the forces imparted by plunger 7512 as it travels toward an end of stroke. Occupants within a vehicle experience large impulse forces as plunger 7512 contacts end cap 7532 or a component of the suspension system engages a hard stop. Recoil damper 7510 reduces such impulse forces transmitted to occupants within the vehicle by dissipating a portion of the kinetic energy of plunger 7512 and shaft 7538 (i.e., provide a supplemental damping force) as damper assembly 7500 reaches an end of stroke (e.g., as the piston reaches a recoil end of stroke, as the piston reaches a jounce end of stroke, etc.). According to an exemplary embodiment, recoil damper 7510 reduces the forces imparted to occupants within the vehicle from 35,000 pounds to 20,000 pounds. The forces may be imparted due to the stored energy inside the spring returning the wheel end to the full rebound position.

As shown in FIG. 161, a plunger 7512 separates the inner volume of a housing 7514 into a compression chamber 7516 and an extension chamber 7518. As shown in FIG. 161, housing 7514 also defines a port, shown as flow port 7520. According to an exemplary embodiment, a fluid (e.g., hydraulic oil, water, a gas, etc.) is disposed within the inner volume of housing 7514. As the plunger 7512 moves toward a first end 7522 of housing 7514, the pressure of the fluid within extension chamber 7518 increases. According to an exemplary embodiment, the fluid within extension chamber 7518 flows outward through flow port 7520. External valves (e.g. shim valves, etc.) restrict the flow of fluid from flow port 7520 and provide a base level of damping forces. Such a base level of damping may vary based on the location, speed, or other characteristics of plunger 7512. The damper assembly 7500 shown in FIG. 161, provides a constant base level damping force as plunger 7512 translates between the first end 7522 and a second end 7524 of housing 7514.

According to an exemplary embodiment, recoil damper 7510 includes a secondary piston, shown as secondary plunger 7526. As shown in FIG. 161, secondary plunger 7526 is an annular member positioned within extension chamber 7518. Secondary plunger 7526 includes a contact surface that is configured to engage plunger 7512. An opposing surface of secondary plunger 7526 is separated from the contact surface by the thickness of secondary plunger 7526. According to an exemplary embodiment, secondary plunger 7526 is coupled to an inner sidewall of housing 7514 with a seal (e.g., ring, wear band, guide ring, wear ring, etc.), shown as interfacing member 7528. A recoil chamber 7530 is formed by the volume of extension chamber 7518 located between secondary plunger 7526 and end cap 7532.

As shown in FIG. 161, interfacing member 7528 is a ring that has a circular cross-sectional shape. According to an alternative embodiment, interfacing member 7528 may have a rectangular, square, polygonal, or still other cross-sectional shape. The interfacing member 7528 is manufactured from a rigid material (e.g., a hard plastic, etc.). According to an exemplary embodiment, the rigid interfacing member 7528 prevents fluid flow between the inner sidewall of housing 7514 and secondary plunger 7526. A rigid interfacing member 7528 may also center secondary plunger 7526 within the bore of housing 7514 thereby reducing the likelihood of wear between an outer surface of secondary plunger 7526 and housing 7514. According to an alternative embodiment, interfacing member 7528 is manufactured from another material (e.g., glass reinforced nylon, a nitrile rubber, etc.).

According to an exemplary embodiment, recoil damper 7510 includes a resilient member, shown as return spring 7534. As shown in FIG. 161, return spring 7534 extends between a first end that engages secondary plunger 7526 and a second end that engages end cap 7532. Return spring 7534 may be an interlaced wave spring (i.e., a flat wire compression spring), a coil spring, or another type of spring. Return spring 7534 positions secondary plunger 7526 within housing 7514. The spring force generated by return spring 7534 may overcome gravity (e.g., where damper assembly 7500 is positioned in a vehicle suspension system with secondary plunger 7526 above end cap 7532) or may position secondary plunger 7526 more quickly than gravity alone (e.g., where damper assembly 7500 is positioned in a vehicle suspension system with secondary plunger 7526 below end cap 7532, as shown in FIG. 161). Return spring 7534 is not intended to damp the movement of plunger 7512, and return spring 7534 may have a relatively small spring constant (e.g., less than 7600 pounds per inch). According to an alternative embodiment, recoil damper 7510 does not include a return spring 7534. Such a recoil damper may reposition secondary plunger 7526 using gravity or an alternative device.

According to an exemplary embodiment, secondary plunger 7526 defines a channel (i.e., track, depression, kerf, notch, opening, recess, slit, etc.), shown as damping groove 7536. As shown in FIG. 161, damping groove 7536 extends radially outward across the contact surface of secondary plunger 7526, along an inner cylindrical face of secondary plunger 7526, and along the opposing surface of secondary plunger 7526. According to an alternative embodiment, damping groove 7536 extends only along the contact surface of secondary plunger 7526. According to still another alternative embodiment, damping groove 7536 extends across the contact surface and along the inner cylindrical face of secondary plunger 7526. As shown in FIG. 161, secondary plunger 7526 defines two damping grooves 7536. According to an alternative embodiment, secondary plunger 7526 defines more or fewer damping grooves 7536. Damping groove 7536 is sized to provide particular flow characteristics. According to an exemplary embodiment, the channel is defined along an axis extending radially outward from a centerline of secondary plunger 7526. According to an alternative embodiment, the channel is curvilinear or irregularly shaped. According to an exemplary embodiment, the channel has a square cross-sectional shape in a plane that is normal to the axis extending from the centerline of secondary plunger 7526. According to an alternative embodiment, the channel has another cross-sectional shape (e.g., rectangular, circular, semicircular, parabolic, etc.).

As shown in FIG. 161, plunger 7512 defines a contact surface that engages the contact surface of secondary plunger 7526. According to an exemplary embodiment, the contact surface of plunger 7512 and the contact surface of secondary plunger 7526 are complementary (i.e., corresponding, matched, correlative, etc.) thereby reducing the likelihood that pressurized fluid will seep between recoil chamber 7530 and extension chamber 7518 across the contact surfaces of plunger 7512 and secondary plunger 7526. According to an alternative embodiment, a seal is positioned between plunger 7512 and secondary plunger 7526.

According to an exemplary embodiment, a shaft 7538 extends through the secondary plunger 7526 and is connected to the plunger 7512 (see FIG. 161). According to an alternative embodiment, a shaft does not extend through secondary plunger (not shown). In this alternative embodiment, a damper assembly may include a shaft that is reversed; for example, a shaft that projects toward a second end of a housing from a plunger. In this alternative embodiment, a limiter (e.g., a recoil damper) may be positioned between the plunger and an end cap of the housing. The limiter may provide supplemental damping forces as the plunger approaches an end of a stroke (e.g., full compression). According to the exemplary embodiment shown in FIG. 161, plunger 7512 and secondary plunger 7526 are disk shaped. According to an alternative embodiment, plunger 7512 and secondary plunger 7526 have still another shape.

According to an exemplary embodiment, the various components of damper assembly 7500 (e.g., the sidewall of housing 7514, plunger 7512, secondary plunger 7526, shaft 7538, etc.) have a circular cross section. According to an alternative embodiment, the various components of damper assembly 7500 may include a different cross-sectional shape (e.g., rectangular, square, hexagonal, etc.). While shown in FIG. 161 as having a particular length, width, and thickness, it should be understood that the components of damper assembly 7500 may be otherwise sized (e.g., to suit a particular application).

Figure 162A:
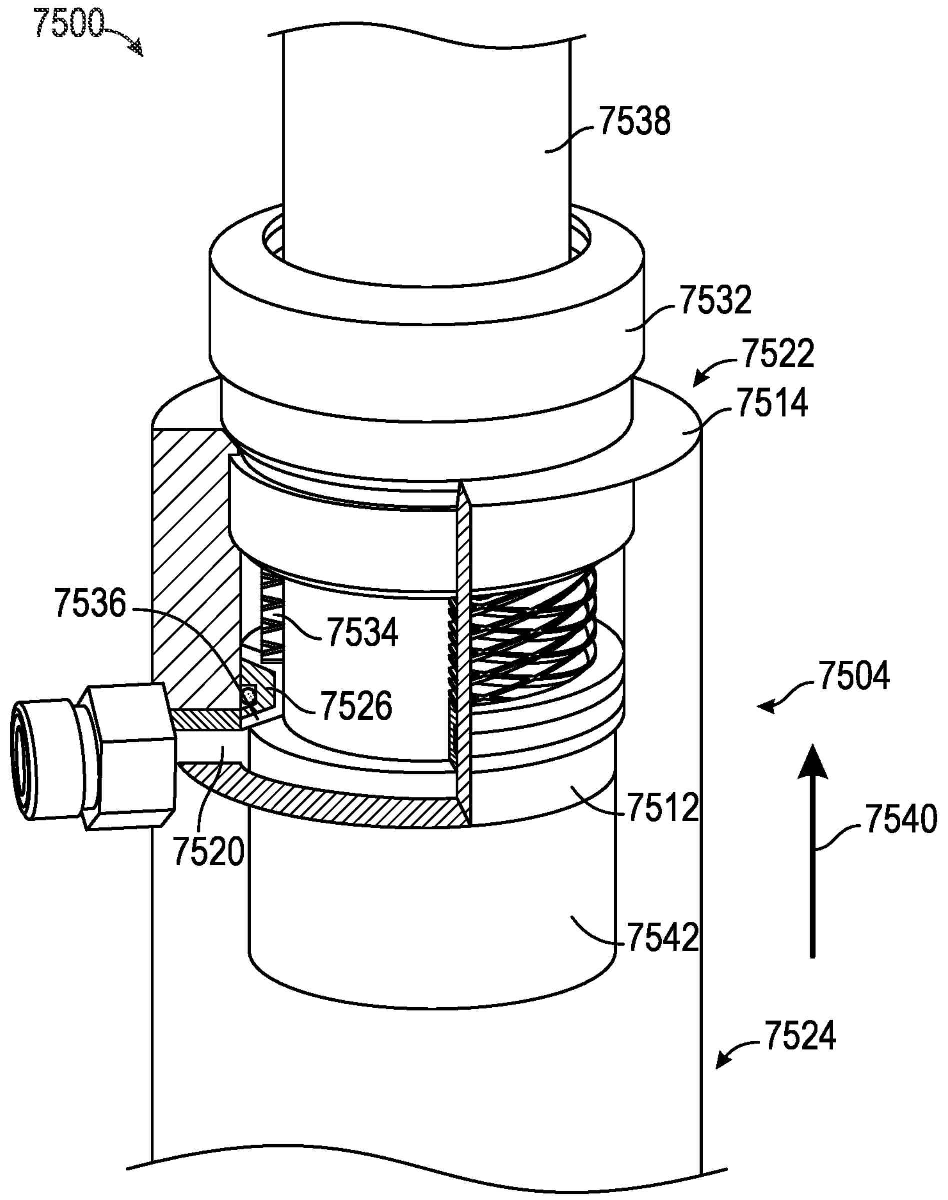
Figure 162B:
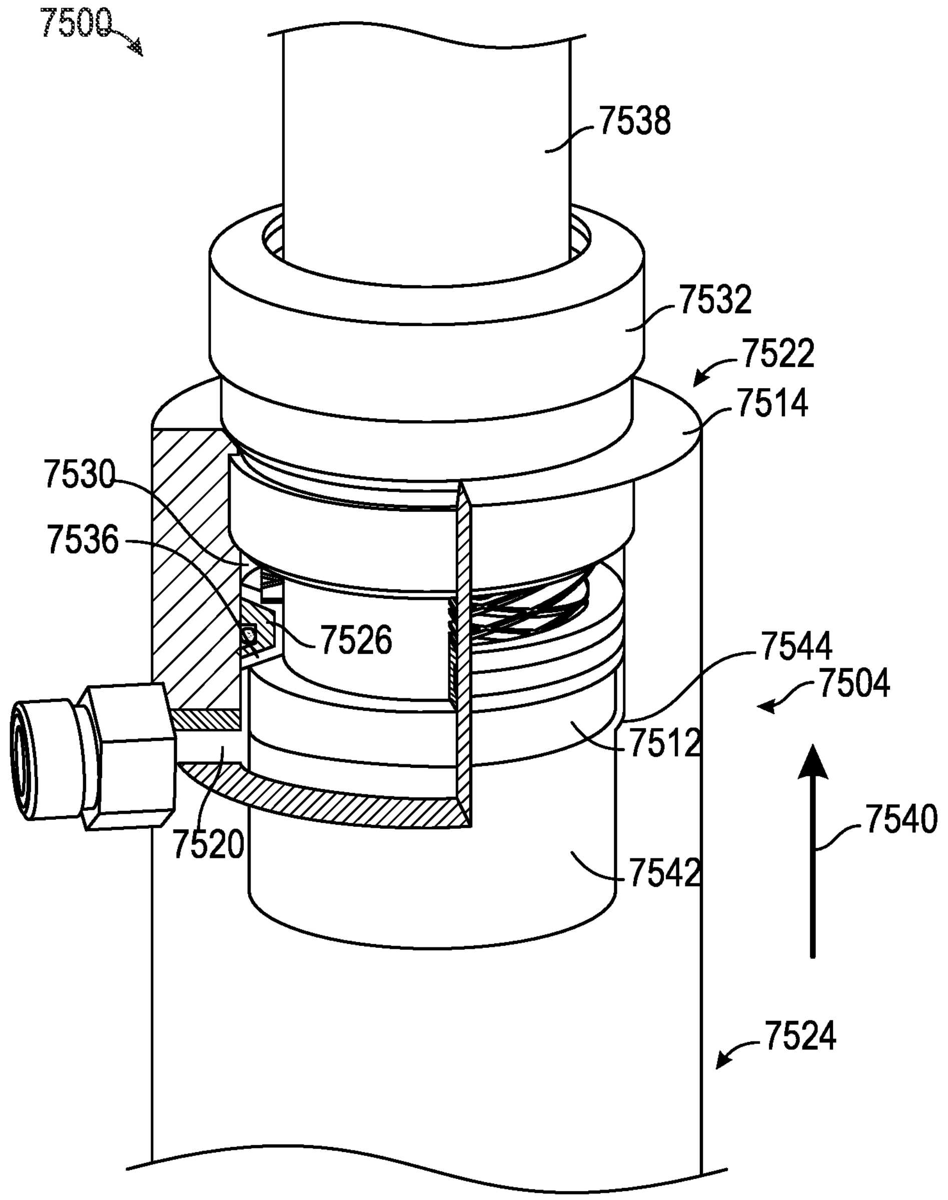
Figure 162C:
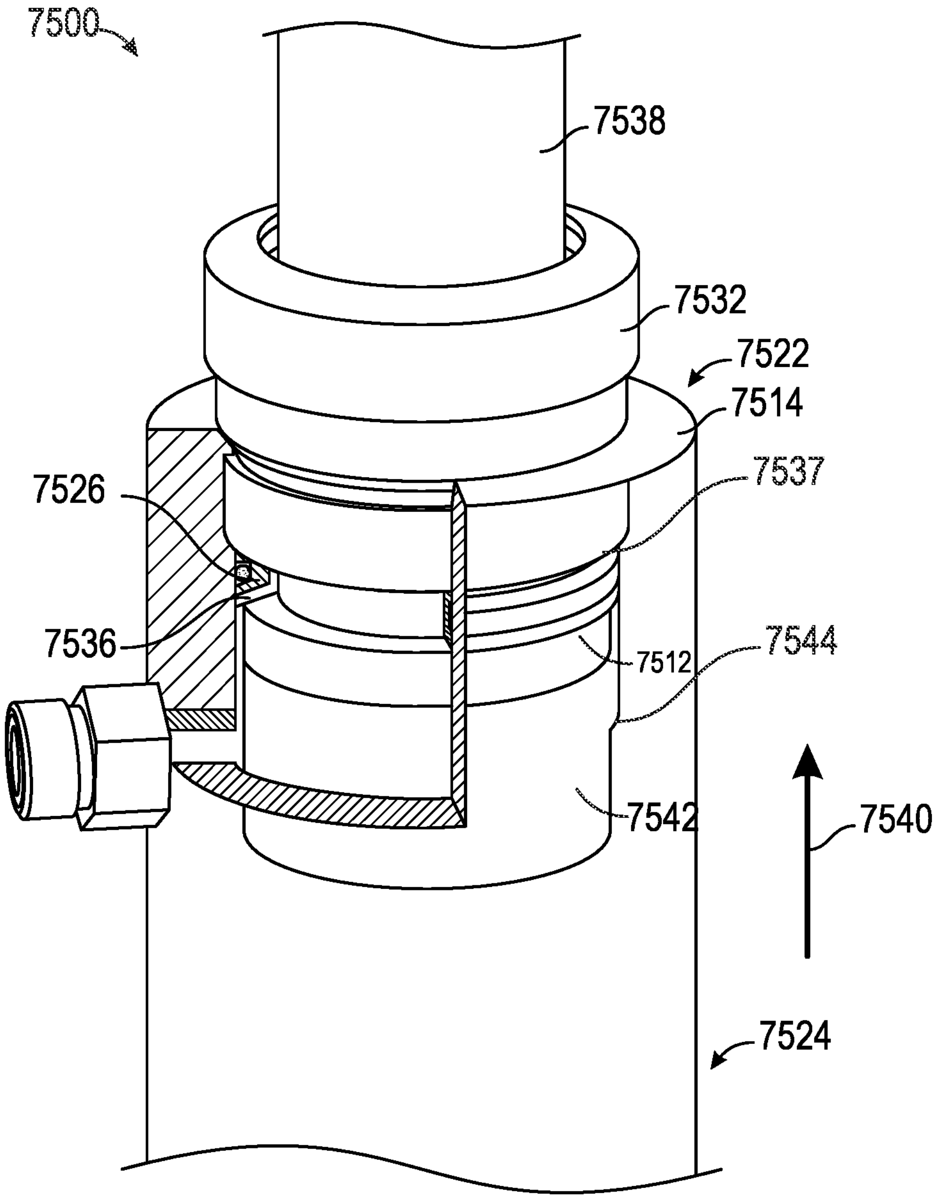
Figure 162D:
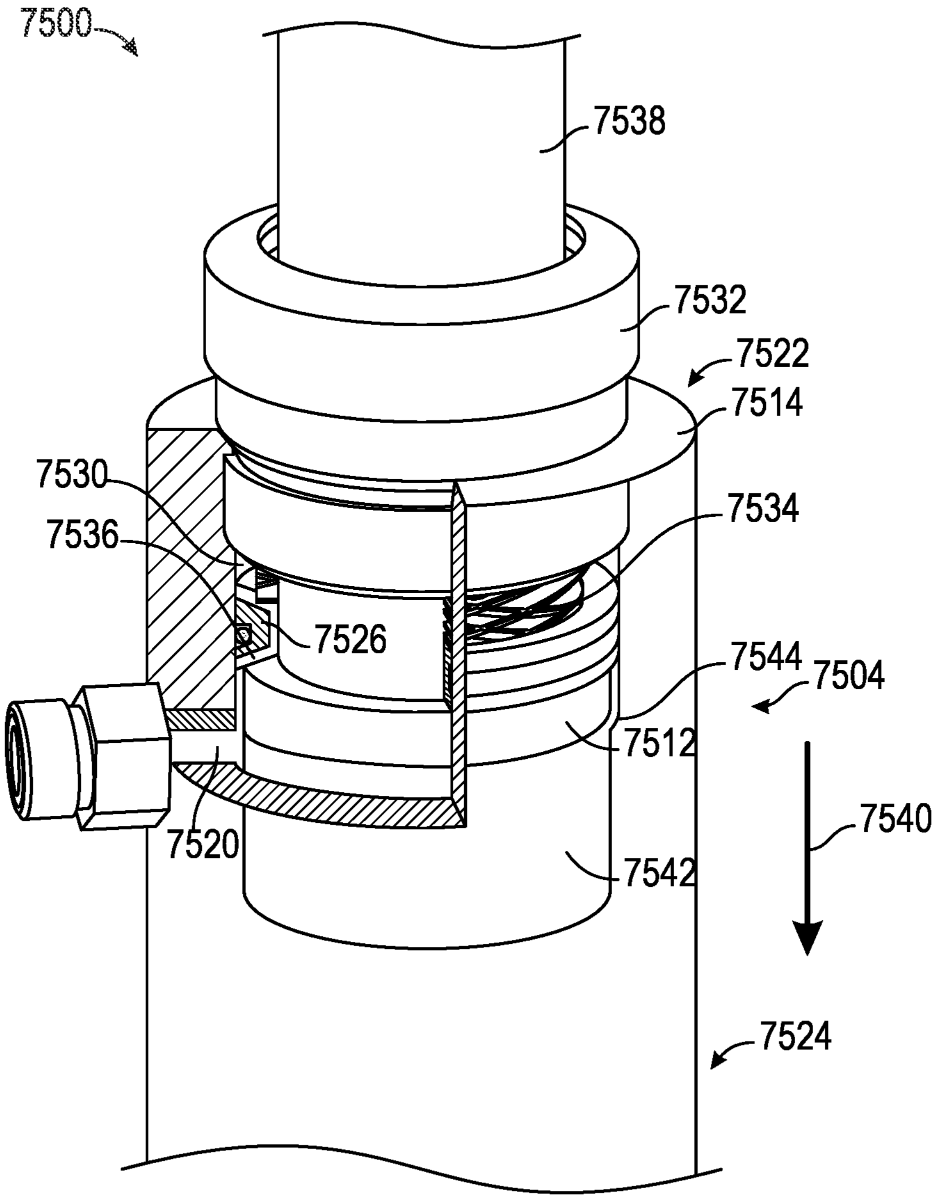

According to the exemplary embodiment shown in FIGS. 161-162D, plunger 7512 is actuatable within housing 7514 from a first location that is offset from secondary plunger 7526 (e.g., the position shown in FIG. 161) to a second position where the contact surface of plunger 7512 engages with (i.e., contacts, interfaces with, etc.) the contact surface of secondary plunger 7526 (e.g., the position shown in FIG. 162A). As shown in FIG. 162A, plunger 7512 translates within housing 7514 along a direction of travel 7540. Such motion may occur, by way of example, as the damper assembly 7500 approaches an extension end of stroke (e.g., in a recoil motion). As shown in FIG. 162A, plunger 7512 moves along direction of travel 7540 such that the contact surface of plunger 7512 engages the contact surface of secondary plunger 7526. As the contact surface of plunger 7512 engages the contact surface of secondary plunger 7526, the damping groove 7536 of secondary plunger 7526 and the contact surface of plunger 7512 form a flow conduit.

According to an alternative embodiment, plunger 7512 defines a channel. The channel of plunger 7512 may correspond to damping groove 7536 of plunger 7512 such that the channel of plunger 7512 and damping groove 7536 of secondary plunger 7526 together form a flow conduit. In other embodiments, the channel of plunger 7512 does not correspond to damping groove 7536 of plunger 7512 such that a plurality of flow conduits are formed between the damping groove 7536 and the contact surface of plunger 7512 and the channels of plunger 7512 and the contact surface of secondary plunger 7526. According to another alternative embodiment, secondary plunger 7526 does not include damping groove 7536, and a channel defined within plunger 7512 and a contact surface of plunger 7512 form the flow conduit.

As plunger 7512 translates between the position shown in FIG. 162A to the position shown in FIG. 162B, fluid flows from recoil chamber 7530, between secondary plunger 7526 and shaft 7538, through the conduit defined by damping groove 7536 and the contact surface of plunger 7512, through a passage between plunger 7512 and the sidewall of housing 7514, and into compression chamber 7542. According to an exemplary embodiment, the conduit restricts the flow of fluid from recoil chamber 7530 thereby dissipating energy and providing a supplemental damping force. According to an exemplary embodiment, damping groove 7536 is positioned to reduce the buildup of debris and maintain an unobstructed flow channel along the conduit formed by damping groove 7536 and the contact surface of plunger 7512. Wear between components of damper assembly 7500, oxidation, or still other conditions may generate debris in the fluid of damper assembly 7500. As shown in FIGS. 161-162D, damping groove 7536 is defined across a contact surface of secondary plunger 7526. Fluid flowing through the inner volume of housing 7514 (e.g., due to translation of plunger 7512 within housing 7514) flushes debris from damping groove 7536. Such flushing and the movement of shaft 7538 relative to secondary plunger 7526 reduce the risk of debris obstructing the fluid flow path between recoil chamber 7530 and compression chamber 7542 (e.g., between an inner surface of secondary plunger 7526 and an outer surface of shaft 7538).

According to an exemplary embodiment, the amount of energy dissipated and the supplemental damping forces provided by recoil damper 7510 (e.g., due to fluid flow through the conduit) is related to the shape of damping groove 7536. According to an exemplary embodiment, fluid flow does not occur between secondary plunger 7526 and the sidewall of housing 7514. Secondary plunger 7526 and interfacing member 7528 limit fluid flow between recoil chamber 7530 and compression chamber 7542 to a flow path through the conduit. Recoil damper 7510 thereby generates a fluid flow path through the conduit, and interfacing member 7528 facilitates determining the expected performance characteristics (e.g., the amount of energy dissipated, the supplemental damping forces provided, etc.) of recoil damper 7510. Such performance characteristics may be tuned as a function only of the features of damping groove 7536, according to an exemplary embodiment. Limiting fluid from flowing between secondary plunger 7526 and an inner sidewall of housing 7514 also provides more predictable and uniform energy dissipation and supplemental damping forces (i.e., additional flow paths may introduce additional variability into the energy dissipated by a limiter).

Referring next to FIG. 162C, plunger 7512 maintains engagement with secondary plunger 7526 and continues to translate along direction of travel 7540. According to an exemplary embodiment, the end cap 7532 is a hard stop for the motion of damper assembly 7500 at an end of stroke (e.g., extension, compression, etc.). As shown in FIG. 162C, end cap 7532 is a hard stop for an extension end of stroke for damper assembly 7500. According to an exemplary embodiment, the extension forces from plunger 7512 and shaft 7538 are imparted to end cap 7532 through secondary plunger 7526. The secondary plunger 7526 and the flow of fluid through the conduit reduces the magnitude of the extension forces and the total energy imparted on cap 7532 by plunger 7512 and shaft 7538.

According to an exemplary embodiment, end cap 7532 includes a contact end 7533 and has a cylindrical shape that defines an inner volume. The opposing surface of secondary plunger 7526 engages contact end 7533 of end cap 7532 to limit further movement of plunger 7512 and shaft 7538 along direction of travel 7540. It should be understood that return spring 7534 compresses as plunger 7512 and secondary plunger 7526 travel toward end cap 7532. According to an exemplary embodiment, return spring 7534 has an outer diameter that is smaller than contact end 7533 of end cap 7532 such that return spring 7534 extends within the inner volume of end cap 7532. Return spring 7534 nests within the inner volume of cap 7532 as plunger 7512 and secondary plunger 7526 translate toward end cap 7532 along direction of travel 7540.

According to an alternative embodiment, a vehicle suspension system includes an external hard stop that interfaces with another suspension component. By way of example, the suspension system may include a polymeric cushion coupled to a chassis of the vehicle that contacts a swing arm. Secondary plunger 7526 in such a suspension system may not contact end cap 7532 (i.e., the end of stroke for the installed damper assembly 7500 may occur before maximum extension). According to an alternative embodiment, the suspension system includes an external hard stop (e.g., a polymeric cushion) and also a secondary plunger 7526 that engages end cap 7532 to distribute the total stopping forces to various suspension components. According to still another alternative embodiment, damper assembly 7500 includes another type of internal hard stop (e.g., a snap ring positioned within and internal groove of housing 7514, a stud protruding into the inner volume of housing 7514, etc.). The internal hard stop may engage plunger 7512, secondary plunger 7526, or still another component of damper assembly 7500.

Referring next to FIG. 162D, plunger 7512 translates along direction of travel 7482 and away from secondary plunger 7526. By way of example, such motion may occur after the vehicle has encountered a negative obstacle as the wheel end begins to travel upward thereby compressing damper assembly 7500. According to an alternative embodiment, the motion of plunger 7512 away from secondary plunger 7526 occurs after the vehicle has encountered a positive obstacle and the wheel end begins to travel downward thereby extending damper assembly 7500 (e.g., where recoil damper 7510 is incorporated to dissipate energy at a jounce end of stroke). Translation of plunger 7512 along direction of travel 7482 increases the pressure of the fluid within compression chamber 7542 and decreases the pressure of the fluid within recoil chamber 7530 and extension chamber 7518. Fluid flows into extension chamber 7518 through flow port 7520 as plunger 7512 translates along the direction of travel 7540, according to an exemplary embodiment.

As shown in FIG. 162D, the sidewall of housing 7514 includes first portion having a first diameter and a second portion having a second diameter, the transition between the first diameter and the second diameter forming a shoulder, shown as step 7544. According to an exemplary embodiment, the length of the first portion defines the distance over which recoil damper 7510 dissipates energy and provides a supplemental damping force. As shown in FIG. 162D, secondary plunger 7526 is coupled to the first portion with interfacing member 7528. As shown in FIG. 162D, the diameter of secondary plunger 7526 is greater than the second diameter such that the secondary plunger 7526 translates only within the first portion of housing 7514. Step 7544 thereby limits the motion of secondary plunger 7526 and prevents secondary plunger 7526 from sliding (e.g., due to gravity, due to locking forces between secondary plunger 7526 and plunger 7512, etc.) toward the second end 7524 of housing 7514. According to an exemplary embodiment, plunger 7512 has a diameter that is approximately equal to the second diameter and is configured to translate along both the first portion and the second portion of housing 7514. In some embodiments, plunger 7512 is coupled to housing 7514 with an intermediate seal.

According to an exemplary embodiment, return spring 7534 includes a first end coupled to end cap 7532 and a second end coupled to secondary plunger 7526. As plunger 7512 translates along direction of travel 7482, return spring 7534 extends from a contracted position (e.g., nested within end cap 7532) to an extended position. According to an exemplary embodiment, the contact surface of secondary plunger 7526 engages step 7544 when return spring 7534 is in the extended position. The extension of return spring 7534 repositions secondary plunger 7526 such that recoil damper 7510 may again dissipate energy and provide a supplemental damping force (e.g., as the vehicle interacts with a subsequent positive or negative obstacle). As return spring 7534 extends, fluid is drawn from extension chamber 7518 into recoil chamber 7530 such that fluid is again available to flow through the conduit, dissipate energy, and provide a supplemental damping force. According to an alternative embodiment, recoil damper 7510 does not include return spring 7534 and secondary plunger 7526 travels downward toward step 7544 due to another force (e.g., coupling forces between plunger 7512 and secondary plunger 7526, gravitation forces, etc.).

As shown in FIG. 162D, translation of plunger 7512 along the direction of travel 7540 from the position shown in FIG. 162C separates plunger 7512 from the secondary plunger 7526. According to an alternative embodiment, plunger 7512 maintains engagement with the secondary plunger 7526 until the secondary plunger 7526 engages step 7544. According to an exemplary embodiment, damping groove 7536 facilitates separation of plunger 7512 from the secondary plunger 7526 as plunger 7512 translates along direction of travel 7540. Damping groove 7536 reduces the risk that coupling forces will lock plunger 7512 to the secondary plunger 7526 (e.g., due to contact between the two otherwise smooth corresponding surfaces). Such coupling forces may otherwise result in the translation of secondary plunger 7526 along the length of housing 7514 while in contact with plunger 7512, the combination of secondary plunger 7526 and plunger 7512 providing supplemental damping forces in unintended stroke positions (e.g., in locations other than at an end of housing 7514, etc.).

Referring now to FIGS. 163A-163C a suspension component, shown as a damper assembly 7600, is shown according to an exemplary embodiment. The damper assembly 7600 may be an integrated spring damper. The integrated spring damper may have a damping element that dissipates energy and a spring element that absorbs energy. Damper assembly 7600 may be generally similar in structure to the damper assembly 7500 discussed above. Like reference numerals are used in FIG. 163A to refer to features of the damper assembly 7600 that may be similar to or the same as those of the damper assembly 7500. In the example shown in FIG. 163A, a side wall of the housing 7514 is removed for purposes of illustration. However, it should be understood that the housing 7514 still includes such a side wall, which defines an internal volume.

As shown in FIG. 163A, a shaft 7538 may translate within an internal volume defined by the inner surface of the housing 7514 (shown in FIG. 162D). The shaft 7538 may translate between an extended position and a retracted position. In an exemplary embodiment, a piston, shown as a plunger 7512, is coupled to the shaft 7538 such that the plunger 7512 moves within the housing 7514 (shown in FIG. 162D) in a manner that corresponds to the translation of the shaft 7538. A limiter, shown as a recoil damper 7610, may also be disposed within the housing 7514 (shown in FIG. 162D), between the plunger 7512 and end cap 7532. In an exemplary embodiment, the recoil damper 7610 is similar to the recoil damper 7510.

Recoil damper 7610 includes a piston, shown as secondary plunger 7626. As shown in FIG. 163A, secondary plunger 7626, is an annular member positioned within an extension chamber. Secondary plunger 7626 includes a contact surface 7627 that is configured to engage plunger 7512. An opposing surface 7629 of secondary plunger 7626 is separated from the contact surface 7627 by the thickness of secondary plunger 7626. According to an exemplary embodiment, secondary plunger 7626 is coupled to an inner sidewall of housing 7514 (shown in FIG. 162D) with a seal (e.g., ring, wear band, guide ring, wear ring, etc.). In various embodiments, an outer surface of the secondary plunger 7626 includes a groove 7631 that extends throughout the entire circumference of the secondary plunger 7626. The groove 7631 is configured to receive a seal that couples the secondary plunger 7626 to the side wall of the housing 7514 (shown in FIG. 162D). In an exemplary embodiment, the seal is similar to the interfacing member 7528.

According to an exemplary embodiment, recoil damper 7610 includes a resilient member, shown as return spring 7534. As shown in FIG. 163A, return spring 7534 extends between a first end that engages secondary plunger 7626 and a second end that engages end cap 7532. Return spring 7534 may be an interlaced wave spring (i.e., a flat wire compression spring), a coil spring, or another type of spring. Return spring 7534 positions secondary plunger 7626 within housing 7514 (shown in FIG. 162D). The spring force generated by return spring 7534 may overcome gravity (e.g., where damper assembly 7600 is positioned in a vehicle suspension system with secondary plunger 7626 above end cap 7532) or may position secondary plunger 7626 more quickly than gravity alone (e.g., where damper assembly 7600 is positioned in a vehicle suspension system with secondary plunger 7626 below end cap 7532, as shown in FIG. 161). Return spring 7534 is not intended to damp the movement of plunger 7512, and return spring 7534 may have a relatively small spring constant (e.g., less than 7600 pounds per inch). According to an alternative embodiment, recoil damper 7610 does not include a return spring 7534. Such a recoil damper may reposition secondary plunger 7626 using gravity or an alternative device.

As shown in FIG. 163B, secondary plunger 7626 defines a plurality of channels (i.e., track, depression, kerf, notch, opening, recess, slit, etc.) through which hydraulic fluid may flow between different chambers created by the secondary plunger 7626 (i.e., a first chamber between the primary plunger 7512 and the secondary plunger 7626 and a second chamber between the secondary plunger 7626 and the end 7524 of the housing 7514). In the exemplary embodiment shown, each channel includes an opposite surface groove 7612 disposed on the opposite surface 7629, an inner groove 7616 disposed on an inner cylindrical face 7633 of the secondary plunger 7626, and a contact groove 7614 disposed on the contact surface 7627 of the plunger. In the example shown, each of the opposite surface groove 7612 and the contact groove 7614 extend across portions of the surfaces 7608 and 7611. In an exemplary embodiment, the grooves 7612-7616 are substantially similar in shape. The grooves 7612-7616 may be arcuate and have a constant radius of curvature. In an alternative embodiment, the opposite surface groove 7612 and the inner groove 7616 are similarly shaped, while the contact groove 7614 is differently shaped. In one embodiment, the opposite surface groove 7612 and the inner groove 7616 are curved, while the contact groove 7614 is substantially rectangular and narrower than the opposite surface groove 7612 and the contact groove 7614. In some embodiments, the contact surface 7627 of the secondary plunger 7626 engages with an upper surface of the plunger 7512 when the damper assembly 7600 is in a contracted position, and the contact groove 7614 interfaces with the upper surface to form a conduit for hydraulic fluid to flow to a chamber above the secondary plunger 7626.

As the plunger 7512 traverses towards or away from the first end 7522 and changes the volumes of the chambers created by the secondary plunger 7626, hydraulic fluid flows through the channels created by the grooves 7612-7616. By way of example, the plunger 7512 may move away from the first end 7522 (e.g., as a result of the vehicle encountering a positive obstacle), and the pressure of the fluid in the chamber between the secondary plunger 7626 and the end 7522 may decrease. Fluid flow from this chamber may occur through the channel defined by the grooves 7612-7614 towards the primary plunger 7512. The grooves 7612-7616 may be configured to restrict fluid flow to provide an additional damping force proportional to the pressure difference between the fluids in each of the chambers. Thus, through such a configuration, the secondary plunger 7626 provides an additional damping force when the pressure differences are greatest (e.g., when the damper assembly 7600 is at the end of a stroke).

As shown in FIG. 163C, the opposite surface grooves 7612 are spaced around the circumference of the secondary plunger 7626 (e.g., equally, symmetrically, unequally, etc.). As shown in FIG. 163C, each of the opposite surface grooves 7612 extends along the opposing surface 7629 at an angle relative a radial reference line passing through its center (e.g., each of the opposite surface grooves 7612 is non-radial). By way of example, FIG. 163C shows a radial reference line 7613 that extends from the axis 7615 of the secondary plunger 7626 through a center 7617 of one of the opposite surface grooves 7612.

As shown in FIG. 163C, pairs of the opposite surface grooves 7612 define a chord of the circle defined by the outer cylindrical face of the secondary plunger 7626. The opposite surface grooves 7612 in each pair are aligned along the chord and positioned substantially parallel to one another, according to one embodiment. Because the contact grooves 7614 and the inner grooves 7616 defining the channels are substantially aligned with the opposite surface grooves 7612, such an arrangement facilitates a uniform distribution of flow between the chambers. The distribution of opposite surface grooves 7612 is an improvement over only providing a single channel, which may result in lateral forces, rotational forces, and/or wear on the secondary plunger 7626, the shaft 7538, and/or the plunger 7512.

As shown in FIG. 163A, plunger 7512 defines a contact surface that is configured to engage the contact surface 7627 of secondary plunger 7626. According to an exemplary embodiment, the contact surface of plunger 7512 and the contact surface 7627 of secondary plunger 7626 are complementary (i.e., corresponding, matched, correlative, etc.) thereby reducing the risk of pressurized fluid seeping across the contact surfaces of plunger 7512 and secondary plunger 7626. According to an alternative embodiment, a seal is positioned between plunger 7512 and secondary plunger 7626.

According to an alternative embodiment, plunger 7512 defines a channel. The channel of plunger 7512 may correspond to the contact groove 7614 of the secondary plunger 7626 such that the channel of plunger 7512 and the contact groove 7614 of secondary plunger 7626 together form a flow conduit. In other embodiments, the channel of plunger 7512 does not correspond to the contact groove 7614 of secondary plunger 7626 such that a plurality of flow conduits are formed between the contact groove 7614 and the contact surface of plunger 7512.

According to an exemplary embodiment, the grooves 7612-7616 are shaped to dissipate a target amount of energy and/or provide a target supplemental damping force (e.g., due to fluid flow through the conduit). According to an exemplary embodiment, fluid flow does not occur between secondary plunger 7626 and the sidewall of housing 7514. Secondary plunger 7626 (e.g., with a seal disposed in the groove 7631) may limit fluid flow to a flow path through the channels defined by grooves 7612-7616. Recoil damper 7610 thereby generates fluid flow paths through the channels, and performance characteristics may be tuned as a function only of the features of the grooves 7612-7616, according to an exemplary embodiment. Limiting fluid from flowing between secondary plunger 7626 and an inner sidewall of housing 7514 also provides more predictable and uniform energy dissipation and supplemental damping forces (i.e., additional flow paths may introduce additional variability into the energy dissipated by a limiter).

Referring now to FIG. 164, a top view of an alternative secondary plunger 7726 is shown, according to an exemplary embodiment. The secondary plunger 7726 may be used in place of the secondary plunger 7526 and/or the secondary plunger 7626. The secondary plunger 7726 may share features with the secondary plunger 7626 (e.g., grooves on an inner cylindrical face 7712 thereof and grooves on a contact surface thereof).

In the example shown, an opposing surface 7710 (i.e., a surface of the secondary plunger 7726 that is further away from the plunger 7512) includes a first groove 7702, a second groove 7704, a third groove 7706, and a fourth groove 7708. As shown in FIG. 164, each of the first groove 7702, second groove 7704, third groove 7706, and fourth groove 7708 extend along an opposing surface 7710 at an angle relative a radial reference line passing through its center (e.g., each of the first groove 7702, second groove 7704, third groove 7706, and fourth groove 7708 are non-radial). By way of example, FIG. 164 shows a first angle 7701 formed between a first radial reference line 7703 that extends from the axis 7715 of the secondary plunger 7726 and passes through a center 7705 of the first groove 7702. Similarly, FIG. 164 shows a second angle 7707 formed between a second radial reference line 7709 that extends from the axis 7715 of the secondary plunger 7726 and passes through a center 7711 of the second groove 7704. In the embodiment shown in FIG. 164, the first angle 7701 and the second angle 7707 are the same. Alternatively they may be different.

As shown in FIG. 164, first ends of the first groove 7702 and the third groove 7706 are substantially aligned at a first diameter of the circle defined by the inner cylindrical face 7712. Additionally, the first groove 7702 and the third groove 7706 extend away from the first ends, across the entirety of the opposing surface 7710, and substantially parallel to one another. Second ends of the grooves 7702 and 7706 (e.g., ends closer to an outer surface 7714 of the secondary plunger 7726) are offset from one another. Grooves 7702 and 7706 may be substantially parallel to one another but on opposing sides of the secondary plunger 7726 such that fluid flowing through channels created by the grooves 7702 and 7706 provides counterbalancing forces on the secondary plunger 7726. Rotation of the secondary plunger 7726, and resulting wear and tear on any components (e.g., a shaft or return spring) may be reduced (e.g., eliminated, etc.).

First ends of the second groove 7704 and the fourth groove 7708 are substantially aligned at a second diameter of the circle defined by the inner cylindrical face 7712. In one embodiment, the first diameter (the diameter at which first ends of the first and third grooves 7702 and 7706 are aligned) is perpendicular to the second diameter. The second groove 7704 and the fourth groove 7708 extend away from the first ends, across the entirety of the opposing surface 7710, and substantially parallel to one another. Second ends of the grooves 7704 and 7708 (e.g., ends closer to an outer surface 7714 of the secondary plunger 7726) are offset from one another. In one embodiment, the first and third grooves 7702 and 7706 extend in a direction that is substantially perpendicular to the direction that the second and fourth grooves 7704 and 7708 extend. The second groove 7704 and the fourth groove 7708 may be substantially parallel to one another but on opposing sides of the secondary plunger 7726 such that fluid flowing through channels created by the grooves 7704 and 7708 provides counterbalancing forces on the secondary plunger 7726. Rotation of the secondary plunger 7726, and resulting wear and tear on any components (e.g., a shaft or return spring) may be reduced (e.g., eliminated, etc.).

As shown in FIG. 164, around the circumference of the secondary plunger 7726, there are grooves of alternating orientations. The grooves may be substantially perpendicular to one another. Such grooves further facilitate the counterbalancing of directional forces placed on the secondary plunger 7726 by fluid flow. In an exemplary embodiment, the secondary plunger 7726 also includes grooves on a contact surface thereof (e.g., a surface opposite to the opposing surface 7710). The grooves may be similar to the grooves 7614 and may establish a fluid conduit with the plunger 7512. In one such embodiment, the grooves on the contact surface are directly below each of the grooves 7702-7708 and substantially parallel to the grooves 7702-7708.

Returning now to FIG. 160, the recoil damper 7436 of the integrated spring damper 7400 includes a recoil piston 7438 positioned within the second chamber 7428 and a resilient member such as an interlaced wave spring (i.e., a flat wire compression spring), a coil spring, or another type of spring. The resilient member may be disposed between the recoil piston 7438 and the barrier 7406. According to an exemplary embodiment, the resilient member is not intended to damp the movement of the main piston 7424 but positions the recoil piston 7438 within the main body 7402, such as after it has been displaced by the main piston 7424. In other embodiments, the recoil damper 7436 may not include a resilient member and the recoil piston 7438 may be repositioned using gravity or an alternative device.

Occupants within a vehicle experience large impulse forces as the main piston 7424 contacts the barrier 7406 or a component of the suspension system engages a hard stop. The recoil damper 7436 reduces such impulse forces transmitted to occupants within the vehicle by dissipating a portion of the kinetic energy of the main piston 7424 and the main tube 7416 (i.e., provide a supplemental damping force) as the integrated spring damper assembly 7400 reaches an end of stroke (e.g., as the piston reaches a recoil end of stroke, as the piston reaches a jounce end of stroke, etc.).

The first chamber 7426, the second chamber 7428, and the first inner chamber 7432 contain a generally non-compressible fluid (e.g., hydraulic fluid, oil, etc.). The first inner chamber 7432 is in fluid communication with the first chamber 7426 through an opening 7425 in the main piston 7424. The fluid may flow between the first chamber 7426 and the second chamber 7428 through a passage 7442 (e.g., conduit, bore, etc.) in a bypass manifold 7440. According to an exemplary embodiment, the bypass manifold 7440 is a structure coupled to the side of the main body 7402. The passage 7442 is in fluid communication with the first chamber 7426 through an aperture 7444 in the main body 7402 and with the second chamber 7428 through an aperture 7446 in the main body 7402. According to an exemplary embodiment, the aperture 7446 opens into the second chamber 7428 between the main piston 7424 and the recoil piston 7438. The flow of fluid through the passage 7442 is controlled by a flow control device 7448. According to an exemplary embodiment, the flow control device 7448 is a disk valve disposed within the bypass manifold 7440 along the passage 7442. In other embodiments, the flow control device 7448 may be another device, such as a pop off valve, or an orifice. In other embodiments, the flow control device remotely positioned but in fluid communication with the first chamber 7426 and the second chamber 7428.

The second inner chamber 7434 contains a generally compressible fluid that may include (e.g., at least 90%, at least 95%) an inert gas such as nitrogen, argon, or helium, among others. In some embodiments, the second inner chamber 7434 is in fluid communication with external devices, such as one or more reservoirs (e.g., central reservoir, tank), an accumulator, or device allowing the pressure of the gas to be adjusted. The pressure of the gas may be adjusted by removing or adding a volume of gas to adjust the suspension ride height.

When the integrated spring damper assembly 7400 is compressed or extended, the main tube 7416 translates relative to the main body 7402. The gas held in the second inner chamber 7434 compresses or expands in response to relative movement between the main tube 7416 and the dividing piston 7430, which may remain relatively stationary but transmit pressure variations between the incompressible hydraulic fluid in the first inner chamber 7432 and the compressible fluid in second inner chamber 7434. The gas in the second inner chamber 7434 resists compression, providing a force that is a function of the compressibility of the gas, the area of the piston, the volume and geometry of the chamber, and the current state (e.g., initial pressure) of the gas, among other factors. The receipt of potential energy as the gas is compressed, storage of potential energy, and release of potential energy as the gas expands provide a spring function for the integrated spring damper assembly 7400.

Movement of the main tube 7416 relative to the main body 7402 translates the main piston 7424, causing the volume of the first chamber 7426 and the second chamber 7428 to vary. When the integrated spring damper assembly 7400 compresses, the volume of the first chamber 7426 decreases while the volume of the second chamber 7428 increases. The fluid is forced from the first chamber 7426 through the passage 7442 and past the flow control device 7448 into the second chamber 7428. The resistance to the flow of the fluid through the passage 7442 provides a damping function for the integrated spring damper assembly 7400 that is independent of the spring function.

Referring to FIGS. 165A-165F, an integrated spring damper 7800 is shown, according to another exemplary embodiment. As shown in FIG. 165A, the integrated spring damper 7800 includes a tubular element (e.g., cylindrical, etc.), shown as main body 7802. In one embodiment, the main body 7802 is manufactured using an extrusion process. In an alternative embodiment, the main body 7802 is manufactured using a casting process. As shown in FIGS. 165A and 165C, a cap, shown as cap 7804, and a barrier, shown as barrier 7806, are disposed on opposing ends of the main body 7802, defining an internal volume. The integrated spring damper 7800 further includes a tubular element (e.g., cylindrical, etc.), shown as main tube 7816. The main tube 7816 is at least partially received within the internal volume of the main body 7802. The main tube 7816 is configured to translate with respect to the main body 7802. As shown in FIG. 165C, a cap, shown as cap 7818, is disposed at a distal end of the main tube 7816. The cap 7804, barrier 7806, and cap 7818 may be coupled to the respective components with a threaded connection or with another coupling mechanism (e.g., welding, a friction weld, brazing, interference fit, etc.). As shown in FIG. 165A, in some embodiments, the integrated spring damper 7800 includes a locking mechanism, shown as locking mechanism 7870. In one embodiment, the locking mechanism 7870 is configured to position (e.g., lock, index, etc.) the cap 7804 in a target orientation relative to the main body 7802. In one embodiment, the locking mechanism 7870 includes a set screw that is tightened to facilitate locking the cap 7804 in the target orientation. The locking mechanism 7870 may facilitate indexing a lower mount of the integrated spring damper 7800 relative to other components thereof and thereby facilitate mounting integrated spring damper 7800 onto a vehicle.

According to an exemplary embodiment, the integrated spring damper 7800 includes a first mounting portion (e.g., a lower mounting portion, etc.), shown as eyelet 7820, with which the integrated spring damper 7800 is coupled to one portion of an axle assembly (e.g., a lower portion of the axle assembly, etc.). According to an exemplary embodiment, the integrated spring damper 7800 is coupled on one end (e.g., with the eyelet 7820 on a lower end, etc.) to a moveable member of the axle assembly (e.g., a lower support arm, etc.). According to an exemplary embodiment, the eyelet 7820 is integrally formed with the cap 7804. As shown in FIG. 165A, the integrated spring damper 7800 includes a second mounting portion (e.g., an upper mounting portion, a pin mount, etc.), shown as upper mount 7807. The upper mount 7807 is configured to couple an opposing second end (e.g., an upper end, etc.) of the integrated spring damper 7800 to a vehicle structural element, vehicle body, frame member, or part thereof (e.g., chassis, side plate, hull, etc.), shown as side plate 8000.

According to an exemplary embodiment, the eyelet 7820 includes a first ear 7902 and a second ear 7904. In the embodiment shown, the first ear 7902 includes a first opening 7903 (also see FIG. 166A) and the second ear 7904 includes a second opening 7905 (also see FIG. 166A). The first and second openings are circular and of the same diameter. It should be understood that, in various alternative embodiments, the openings may be shaped differently or differently from one another. In the embodiment shown, the openings in the first and second ears 7902 and 7904 are aligned with one another to facilitate the insertion of a mounting pin 7906 therethrough.

In the embodiment shown, the mounting pin 7906 is substantially cylindrical in shape. In one embodiment, the length of the mounting pin 7906 is greater than a distance between outer surfaces of the first and second ears 7902 and 7904. With the mounting pin 7906 inserted and centered, a first end 7908 of the mounting pin 7906 extends outwardly from the first ear 7902. Additionally, a second end of the mounting pin 7906 extends outwardly from the second ear 7904. As described below with respect to FIGS. 166A-166I, in addition to being inserted into the ears 7902 and 7904 of the eyelet 7820, the mounting pin 7906 is also inserted through an element (e.g., a swing arm, etc.) that is coupled to an axle assembly of a vehicle to rotatably couple the integrated spring damper 7800 to the axle assembly. In some embodiments, the mounting pin 7906 includes an opening that extends from the first end to the second end.

As shown in FIGS. 165A and 165C-165D, the upper mount 7807 includes a first mounting member 7808, a second mounting member 7810, a third mounting member 7812, and a fourth mounting member 7814. As shown in FIGS. 165A and 165D, the first mounting member 7808 is disposed proximal the cap 7818 and positioned such that an upper surface of the first mounting member 7808 abuts a first surface of the side plate 8000, shown as bottom surface 8002. In one embodiment, the first mounting member 7808 is constructed from a metal or wear resistant material. As shown in FIG. 165C-165D, the second mounting member 7810 includes a portion (e.g., a lower portion, a first portion, a non-protruded portion, etc.) that is positioned proximal both the first mounting member 7808 and the cap 7818. Specifically, the second mounting member 7810 is positioned between the cap 7818 and the first mounting member 7808. In one embodiment, the second mounting member 7810 is a resilient member, such as a flexible urethane, that serves as an isolator and an elastomeric spacer. The second mounting member 7810 may be configured to isolate the cap 7818 from at least one of the first mounting member 7808 and the side plate 8000. In some embodiments, the first mounting member 7808 and the second mounting member 7810 are annular and circular in shape. In other embodiments, the first mounting member 7808 and the second mounting member 7810 have another shape (e.g., discus square, hexagonal, etc.).

In some embodiments, the first mounting member 7808 is friction welded to the second mounting member 7810. For example, planar portions of the surface of the first mounting member 7808 that are to be disposed nearest the cap 7818 may be forced against planar portions of the surface of the second mounting member 7810 that is to be disposed nearest a side plate 8000. Rotational energy may be applied to at least one of the first mounting member 7808 and the second mounting member 7810 while the mounting members 7808 and 7810 are pressed against one another until friction welds 7890 and 7892 join the mounting members 7808 and 7810 together. In one embodiment, the first and second mounting members 7808 and 7810 are substantially circular and define apertures 7809 and 7811 through which a protruding portion 7819 of the cap 7818 extends. The friction welds 7890 and 7892 may circumferentially surround the aperture 7809.

As shown in FIGS. 165A and 165D, the fourth mounting member 7814 is positioned between the side plate 8000 and the third mounting member 7812. A second surface, shown as top surface 8004, of the side plate 8000 is in contact with a bottom surface of the fourth mounting member 7814, and the third mounting member 7812 is disposed on a top surface of the fourth mounting member 7814. The first mounting member 7808 and the fourth mounting member 7814 are spaced to receive the side plate 8000. In one embodiment, the fourth mounting member 7814 is a resilient member, such as a flexible urethane, that serves as an isolator and an elastomeric spacer. The fourth mounting member 7814 may be configured to isolate the third mounting member 7812 from the side plate 8000. In one embodiment, the third mounting member 7812 is constructed from a metal or wear resistant material. In some embodiments, the third mounting member 7812 and the fourth mounting member 7814 are annular and circular in shape. In other embodiments, the third mounting member 7812 and the fourth mounting member 7814 have another shape (e.g., discus square, hexagonal, etc.).

In some embodiments, the fourth mounting member 7814 is friction welded to the third mounting member 7812. For example, planar portions of a surface of the third mounting member 7812 may be forced against planar portions of a surface of the fourth mounting member 7814. Rotational energy may be applied to at least one of the third mounting member 7812 and the fourth mounting member 7814 while the mounting members 7812 and 7814 are pressed against one another until friction welds 7894 and 7896 join the mounting members 7812 and 7814 together. In one embodiment, the third and fourth mounting members 7812 and 7814 are substantially circular and define apertures 7813 and 7817 through which a protruding portion 7819 of the cap 7818 extends. The friction welds 7894 and 7896 may circumferentially surround the apertures 7813 and 7817.

As shown in FIG. 165D, the first mounting member 7808 defines an aperture, shown as first member aperture 7809, that corresponds with (e.g., aligns with, cooperates with, etc.) an aperture defined by side plate 8000, shown as locating aperture 8006. The second mounting member 7810 includes a protruded portion (e.g., a second portion, an upper portion, etc.) that extends through the first aperture 7809 and the locating aperture 8006 and is engaged with a recess, shown as recess 7815, defined by the fourth mounting member 7814. In one embodiment, the recess 7815 receives the protruded portion of the second mounting member 7810. The second mounting member 7810 defines an aperture, shown as second member aperture 7811, that extends longitudinally through the second mounting member 7810 and aligns with (e.g., cooperates with, etc.) an aperture, shown as third member aperture 7813, and an aperture, shown as fourth member aperture 7817, defined by the third mounting member 7812 and the fourth mounting member 7814, respectively. The second member aperture 7811, third member aperture 7813, and fourth member aperture 7817 receive a cap protrusion 7819 (e.g., a protruded portion 7819 of the cap 7818).

As shown in FIG. 165C, a main piston, shown as main piston 7824, is disposed in the internal volume of the main body 7802. The main piston 7824 is coupled to the main tube 7816 and slidably engages the main body 7802. The main piston 7824 separates the internal volume into a first chamber 7826 (e.g., compression chamber, etc.) and a second chamber 7828 (e.g., extension chamber, etc.). The first chamber 7826 is a generally cylindrical chamber that includes the portion of the internal volume of the main body 7802 between the main piston 7824 and the cap 7804. The second chamber 7828 is an annular chamber defined between the main body 7802 and the main tube 7816 and extends between the main piston 7824 and the barrier 7806. When the main tube 7816 translates relative to the main body 7802, the main piston 7824 changes the volume of the first chamber 7826 and the second chamber 7828. A dividing piston, shown as dividing piston 7830 (e.g., floating piston, etc.), is disposed in the main tube 7816 and slidably engages the main tube 7816. The dividing piston 7830 separates the internal volume of the main tube 7816 into a first inner chamber 7832 and a second inner chamber 7834. According to an exemplary embodiment, the first inner chamber 7832 is open to (i.e., in fluid communication with, etc.) the first chamber 7826.

According to an exemplary embodiment, the first chamber 7826, the second chamber 7828, and the first inner chamber 7832 contain a generally non-compressible fluid (e.g., hydraulic fluid, oil, etc.). According to an exemplary embodiment, the second inner chamber 7834 contains a generally compressible fluid that may include (e.g., at least 90%, at least 95%) an inert gas such as nitrogen, argon, or helium, among others. In some embodiments, the second inner chamber 7834 is in fluid communication with external devices, such as one or more reservoirs (e.g., central reservoir, tank, etc.), an accumulator, or a device allowing the pressure of the gas to be adjusted with a pressure regulation line. The pressure of the gas may be adjusted by removing or adding a volume of gas to adjust the suspension ride height.

According to an exemplary embodiment, the integrated spring damper 7800 includes a pressure regulation line that is located at a top portion (e.g., a top end, an upper end, etc.) of the integrated spring damper 7800. As shown in FIGS. 165A-165D, the integrated spring damper 7800 includes a port, shown as pressure regulation port 7880, coupled to the protruded portion 7819 of the cap 7818 (e.g., with a threaded interface, welded, etc.). As shown in FIGS. 165C-165D, the pressure regulation port 7880 defines a passageway, shown as inlet passageway 7882. The protruded portion 7819 of the cap 7818 defines a passageway, shown as intermediate passageway 7822. The intermediate passageway 7822 cooperates with the inlet passageway 7882 to define the pressure regulation line of the integrated spring damper 7800. The pressure regulation line extends from the pressure regulation port 7880, through the protruded portion 7819 of the cap 7818, and into the second inner chamber 7834 of the main tube 7816 such that it is fluidly connected to the second inner chamber 7834. According to an exemplary embodiment, the pressure regulation line of the integrated spring damper 7800 facilitates increasing or decreasing a volume of fluid (e.g., an inert gas, etc.) within the second inner chamber 7834 of the main tube 7816.

According to an exemplary embodiment, the pressure regulation port 7880 is positioned at the top of the integrated spring damper 7800 to provide a fixed or static location to fill or release gas from the second inner chamber 7834 of the integrated spring damper 7800. The pressure regulation port 7880 is positioned to increase (e.g., maximize, etc.) the travel of the main tube 7816 within the main body 7802, thereby increasing the stroke of the integrated spring damper 7800. By way of example, impulse forces transmitted to occupants within a vehicle from bumps, pot holes, etc. may be reduced by increasing the maximum stroke of the integrated spring damper 7800. According to an exemplary embodiment, the pressure regulation port 7880 is positioned above the side plate 8000 to reduce the risk of debris (e.g., dirt, rocks, mud, etc.) damaging or blocking the pressure regulation port 7880.

When the integrated spring damper 7800 is compressed or extended, the main tube 7816 translates relative to the main body 7802. The gas held in the second inner chamber 7834 compresses or expands in response to relative movement between the main tube 7816 and the dividing piston 7830, which may remain relatively stationary but transmit pressure variations between the incompressible hydraulic fluid in the first inner chamber 7832 and the compressible fluid in second inner chamber 7834. The gas in the second inner chamber 7834 resists compression, providing a force that is a function of the compressibility of the gas, the area of the piston, the volume and geometry of the second inner chamber 7834, and the current state (e.g., initial pressure, etc.) of the gas, among other factors. The receipt of potential energy as the gas is compressed, storage of potential energy, and release of potential energy as the gas expands provide a spring function for the integrated spring damper 7800.

In one embodiment, a recessed area is disposed in the dividing piston 7830. In FIG. 165C the recessed area is shown as cup 7831. According to the exemplary embodiment shown in FIG. 165C, the dividing piston 7830 is positioned such that the cup 7831 facilitates an increase in the volume of the second inner chamber 7834. In other embodiments, the dividing piston 7830 is positioned such that the cup 7831 facilitates an increase in the volume of the first inner chamber 7832. The dividing piston 7830 may be flipped and repositioned to selectively increase the volume of the first inner chamber 7832 or the second inner chamber 7834 to tune the performance of the integrated spring damper 7800. As shown in FIG. 165C, the cap 7818 defines a pocket, shown as cap pocket 7823. The cap pocket 7823 is structured to increase the volume of the second inner chamber 7834. In some embodiments, the cap pocket 7823 and the cup 7831 increase the volume of the second inner chamber 7834. In other embodiments, at least one of the cap pocket 7823 and the cup 7831 are not defined by the cap 7818 and the dividing piston 7830, respectively. By way of example, increasing the volume of the second inner chamber 7834 (i.e., decreasing the gas pressure within the second inner chamber 7834, etc.) may facilitate a softer ride (e.g., a smaller spring force, etc.), while decreasing the volume of the second inner chamber 7834 (i.e., increasing the gas pressure within the second inner chamber 7834, etc.) may facilitate a stiffer ride (e.g., a greater spring force, etc.).

Referring again to FIG. 165C, a limiter, shown as recoil damper 7836, is disposed within the internal volume of the main body 7802, between the main piston 7824 and the barrier 7806. The recoil damper 7836 reduces the risk of damage to the main piston 7824, barrier 7806, the sidewall of main body 7802, and still other components of integrated spring damper 7800 by reducing the forces imparted by the main piston 7824 as it travels toward an end of stroke (i.e., the maximum travel of the stroke, etc.). According to an exemplary embodiment, the recoil damper 7836 includes a recoil piston, shown as recoil piston 7838, positioned within the second chamber 7828 and a resilient member, shown as resilient member 7839. The resilient member 7839 may include an interlaced wave spring (i.e., a flat wire compression spring, etc.), a coil spring, or another type of spring. The resilient member 7839 may be disposed between the recoil piston 7838 and the barrier 7806. According to an exemplary embodiment, the resilient member 7839 is not intended to substantially resist the movement of the main piston 7824 but positions the recoil piston 7838 within the main body 7802, such as after it has been displaced by the main piston 7824. In other embodiments, the recoil damper 7836 does not include a resilient member, and the recoil piston 7838 may be repositioned using gravity or an alternative device.

Occupants within a vehicle experience large impulse forces as the main piston 7824 contacts the barrier 7806 or a component of the suspension system engages a hard stop. The recoil damper 7836 reduces such impulse forces transmitted to occupants within the vehicle by dissipating a portion of the kinetic energy of the main piston 7824 and the main tube 7816 (i.e., provide a supplemental damping force, etc.) as the integrated spring damper 7800 reaches an end of stroke (e.g., as the piston reaches a recoil end of stroke, as the piston reaches a jounce end of stroke, etc.).

Referring now to FIGS. 165E-165F, the first chamber 7826 and the second chamber 7828 are fluidly connected (e.g., such that fluid may flow between them) through at least one of a first passage 7852 (e.g., conduit, bore, etc.) of a flow path, shown as first flow path 7850, defined by a manifold, shown as bypass manifold 7840, and a second passage 7862 of a flow path, shown as second flow path 7860, also defined by bypass manifold 7840. In other embodiments, the bypass manifold 7840 defines a different number of passages (e.g., one, three, etc.). According to an exemplary embodiment, the bypass manifold 7840 is coupled to the side of the main body 7802 (e.g., removably coupled to the main body 7802 with a plurality of fasteners, etc.). In other embodiments, the bypass manifold 7840 and the main body 7802 are integrally formed (e.g., a unitary structure, etc.). According to an alternative embodiment, at least one of the first passage 7852 and the second passage 7862 are formed with tubular members coupled to an outer portion of the main body 7802 or with flow passages defined by the main body 7802.

According to the exemplary embodiment shown in FIGS. 165C and 165E-165F, damping forces are generated as the flow of fluid through the first passage 7852 and the second passage 7862 interacts with flow control elements, shown as first flow control device 7858 and second flow control device 7868. According to an exemplary embodiment, the first flow control device 7858 and the second flow control device 7868 are bidirectional flow valves disposed within the bypass manifold 7840 along the first passage 7852 and the second passage 7862, respectively. The first flow control device 7858 and the second flow control device 7868 may include washers that differentially restrict a fluid flow based on the direction that the fluid is flowing. In other embodiments, the first flow control device 7858 and the second flow control device 7868 are other types of flow control device, such as pop off valves or orifices (e.g., variable flow orifices, etc.). In other embodiments, the first flow control device 7858 and the second flow control device 7868 are remotely positioned but in fluid communication with the first chamber 7826 and the second chamber 7828.

According to an exemplary embodiment, the main body 7802 defines a plurality of sets of openings. As shown in FIG. 165E, the plurality of sets of openings include a first set having openings 7854 and openings 7856. The openings 7854 and the openings 7856 are fluidly coupled by the first passage 7852. As shown in FIG. 165F, the plurality of sets of openings include a second set having openings 7864 and openings 7866. The openings 7864 and the openings 7866 are fluidly coupled by the second passage 7862. According to an exemplary embodiment, the first passage 7852 and the second passage 7862 are offset relative to one another both circumferentially and longitudinally along the length of the main body 7802 and the bypass manifold 7840. In other embodiments, the main body 7802 defines a different number of sets of openings (e.g., one, three, four, etc.), each set corresponding with one of the passages defined by the bypass manifold 7840.

According to an exemplary embodiment, the integrated spring damper 7800 provides different damping forces in extension and retraction and also damping forces that vary based on the position of the main piston 7824 relative to the main body 7802 (e.g., position dependent dampening, etc.). According to an exemplary embodiment, the integrated spring damper 7800 provides recoil damping forces in jounce and compression damping forces in recoil as part of a spring force compensation strategy. By way of example, the position dependent dampening of the integrated spring damper 7800 may function as follows. As the main piston 7824 translates within main body 7802 (e.g., due to relative movement between components of a vehicle suspension system, etc.), various openings and their corresponding passages are activated and deactivated. According to an exemplary embodiment, fluid flows through the activated openings and their corresponding passages to provide damping forces that vary based on position and direction of travel of the main piston 7824 within the main body 7802.

Movement of the main tube 7816 relative to the main body 7802 translates the main piston 7824, causing the volume of the first chamber 7826 and the second chamber 7828 to vary. When the integrated spring damper 7800 compresses, the volume of the first chamber 7826 decreases while the volume of the second chamber 7828 increases. The fluid is forced from the first chamber 7826 through at least one of the openings 7854 of the first passage 7852 and the openings 7864 of the second passage 7862 (e.g., based on the position of the main piston 7824 within the main body 7802, etc.). The fluid flows through at least one the first passage 7852 and the second passage 7862 past the first flow control device 7858 and the second flow control device 7868 and out of the openings 7856 and the openings 7866 into the second chamber 7828. The resistance to the flow of the fluid along at least one of the first passage 7852 and the second passage 7862 and the interaction thereof with the first flow control device 7858 and the second flow control device 7868 provides a damping function for the integrated spring damper 7800 that is independent of the spring function. By way of example, if the non-compressible fluid is able to flow through both the first passage 7852 and the second passage 7862, the dampening provided by the integrated spring damper 7800 will be less than if fluid is able to flow through only one of the first passage 7852 and the second passage 7862. Therefore, as the main piston 7824 moves towards the cap 7804, the integrated spring damper 7800 provides a first dampening characteristic (e.g., less dampening, etc.) when the openings 7854 and the openings 7864 are active and a second dampening characteristics (e.g., more dampening, etc.) when only the openings 7864 are active (e.g., because the main piston 7824 deactivates the openings 7854, which may include the openings 7854 being positioned within the second chamber 7828, etc.).

Referring now to FIGS. 166A-166I, an integrated spring damper, shown as the integrated spring damper 7800, may be rotatably connected to a movable member, shown as a lower support arm 7920, of an axle assembly of a vehicle.

As shown in FIGS. 166A and 166B, the integrated spring damper 7800 includes a main body, shown as the main body 7802, a bypass manifold, shown as the bypass manifold 7840, and an eyelet, shown as the eyelet 7820. The eyelet 7820 includes a first ear 7902 and a second ear 7904, with each of the ears 7902 and 7904 including openings structured to receive a coupling device, shown as a mounting pin 7906. In the example shown, the mounting pin 7906 is substantially-cylindrical in shape.

The ears 7902 and 7904 of the eyelet 7820 may be spaced apart such that the distance between surfaces thereof is approximately equal to the width of a mounting portion 7922 of the lower support arm 7920. The mounting portion 7922 is substantially-cylindrical in shape and may be integrated with the lower support arm 7920 or separately attached to the lower support arm 7920. The mounting portion 7922 includes a substantially-cylindrical passage 7924. The mounting portion 7922 is configured to receive the mounting pin 7906 through the passage 7924.

In one embodiment, the mounting pin rotatably couples the integrated spring damper 7800 to the lower support arm 7920, combinations of thrust washers 7914 and seals 7912 are inserted into ends of the mounting portion 7922. In one embodiment, the seals 7912 are annular and include an inner diameter that is approximately equal to the diameter of the mounting pin 7906. The ears 7902 and 7904 may then be aligned with the passage 7924 of the mounting portion 7922. The mounting pin 7906 may then be inserted through one of the openings in one of the ears 7902 and 7904, through a combination of a thrust washer 7914 and a seal 7912, through the passage 7924 of the mounting portion 7922, through a combination of another thrust washer 7914 and another seal 7912, and finally through the other one of the openings in one of the ears 7902 and 7904. In the embodiment shown in FIGS. 166A-166C, the seal 7912 and thrust washer 7914 from one end of the passage are removed to simplify illustration (refer to FIGS. 166D-166F, which include the seals 7912 and thrust washers 7914 on both ends). In one embodiment, fasteners 7916 are inserted between the seals 7912 and the mounting portion 7922 to reduce the risk of the mounting pin 7906 rotating with respect to the lower support arm 7920. This way, the coupling of the integrated spring damper 7800 to lower support arm 7920 remains secure. In response to the vehicle encountering an obstacle (e.g., a bump), the integrated spring damper 7800 may be configured to rotate with respect to the lower support arm 7920 because the ears 7902 and 7904 are not restrictively coupled to the mounting pin 7906.

As shown in FIG. 166C, when the mounting pin 7906 is inserted into the passage 7924 of the mounting portion 7922 and centered, first and second ends 7926 and 7928 of the mounting pin 7906 protrude from the combination of the mounting portion 7922, seals 7912, and thrust washers 7914. The first and second ends 7926 and 7928 provide connection points for the ears 7902 and 7904 of the eyelet 7820.

As shown in FIGS. 166D-166F, each thrust washer 7914 includes an outer surface 7918 and an inner ring 7930. In one embodiment, there is a difference between the diameter of the inner ring 7930 and the diameter of the mounting pin 7906 to form an annular gap between the inner rings 7930 and the mounting pin 7906. In one embodiment, the seals 7912 are disposed in these annular gaps. An outer surface of the seal 7912 may be approximately flush with an inner surface (e.g., opposite the outer surface 7918 proximal the lower support arm 7920) of the thrust washer 7914. Such a configuration facilitates the insertion of the combination of the thrust washers 7914 and seals 7912 into the mounting portion 7922 of the support arm 7920. Additionally, the outer surfaces 7918 may include a plurality of channels 7932 therein. Portions of the seals 7912 may be visible when viewing the outer surfaces 7918 of the thrust washers 7914. The channels 7932 facilitate the cleaning of the thrust washers 7914 by providing a conduit through which debris can be removed (e.g., manually, fall out of, automatically, etc.) from the thrust washers 7914. Since more debris will tend flow through the channels 7932, the debris will not remain on the surface of the thrust washers 7914 and harden.

In the embodiment shown, the mounting portion 7922 includes a first substantially cylindrical passage 7924. The mounting portion also includes a second substantially cylindrical passage 7934 on a first side of the passage 7924 and a third substantially cylindrical passage 7936 on a second side of the passage 7924. In one embodiment, the first passage 7924, the second passage 7934, and the third passage 7936 are concentric. The first passage 7924 is of a first diameter and the second and third passages 7934 and 7936 are of a second diameter that is greater than the first diameter. In one embodiment, the first passage 7924 is centered within the mounting portion 7922 such that the second and third passages 7934 and 7936 are of a similar dimension in the lengthwise direction of the mounting portion 7922.

In one embodiment, the diameter of the first passage 7924 is at least equal to the diameter of the mounting pin 7906. The diameters of the second and third passages 7934 and 7936 are at least equal to the diameter of the inner rings 7930 of the thrust washers 7914. In one embodiment, the combinations of the thrust washers 7914 and seals 7912 are inserted into the passages 7934 and 7936.

A first face 7938 is disposed at the boundary between the first passage 7924 and the second passage 7934, and a second face 7940 is disposed at the boundary between the first passage 7924 and the third passage 7936. Axes normal to the faces 7938 and 7940 point outward from the center of the mounting portion 7922. In one embodiment, the faces 7938 and 7940 include a plurality of grooves that are structured to receive portions of the thrust washers 7914 and seals 7912. Debris may be prevented from entering the first passage 7924 and interfering with the coupling between the mounting pin 7906 and the mounting portion 7922. In some embodiments, grooves in the faces 7938 and 7940 receive portions of the fasteners 7916 to secure the combinations of the seals 7912 and thrusting washers 7914 to the mounting portion 7922.

As shown in FIGS. 166G-166I, with the integrated spring damper 7800 coupled to the mounting portion 7922, surfaces of the ears 7902 and 7904 are approximately flush with the outer surfaces 7918 of the thrust washers 7914. Portions of the outer surfaces 7918 of the thrust washers 7914 extend outwardly from the ears 7902 and 7904 of the eyelet 7820, such that portions of the outer surfaces 7918 are at a larger radial position than the ears 7902 and 7904. Additionally, the inner rings 7930 are substantially aligned with surfaces of the ears 7902 and 7904. As a result, openings are formed at the channels 7932 of the outer surfaces 7918. However, because the seals 7912 fit in the gap between the inner rings 7930 and the mounting pin 7906, passage of debris through these openings is reduced (e.g., eliminated, etc.). Instead, the channels guide the debris outwardly, away from the connection points between the mounting pin 7906 and the ears 7902 and 7904.

Referring now to FIGS. 167A-167B, isometric views of a main tube, shown as main tube 7942, and a cap, shown as cap 7944, are shown in accordance with an example embodiment. In various embodiments, the main tube 7942 may be equivalent to the main tube 7816 discussed above. The cap 7944 may be an alternative to the cap 7818 discussed above.

The cap 7944 is affixed to a first end of the main tube 7942. The cap 7944 includes an upper face 7946 and a lower portion 7948 that extends downward from the upper face 7946. In one embodiment, both the upper face 7946 and the lower portion 7948 are substantially circular. The diameter of the upper face 7946 may be greater than the diameter of the lower portion 7948. In one embodiment, the diameter of the lower portion 7948 is at most equal to an inner diameter of the main tube 7942, and the lower portion 7948 may be coupled to an inner surface of the main tube 7942 (e.g., with a threaded connection, etc.). In one embodiment, the diameter of the lower portion 7948 is greater than an outer diameter of the main tube 7942, and the main tube 7942 may be inserted into the lower portion 7948.

In the embodiment shown, an annular groove 7950 is formed proximate to the center of the cap 7944. Portions of an upper mount used to secure an integrated spring damper to a vehicle may be inserted into the annular groove 7950. A substantially cylindrical protruding portion 7945 extends from the center of the upper face 7946. In one embodiment, a friction weld 7952 is formed between the protruding portion 7945 and a central portion of the upper face 7946. An opening 7954 extends through the protruding portion 7945. In one embodiment, an additional opening 7956 extends through a central portion of the cap 7944 to fluidly couple the protruding portion 7945 to the inner volume of the main tube 7942 (e.g., to form a pressure regulator for an integrated spring damper). In one embodiment, the opening 7954 is greater in diameter than the opening 7956 to increase the pressure of fluid being inserted into the main tube 7942.

In the embodiment shown, the main tube 7942 includes a first notch 7958 and a second notch 7960 spaced from the first notch 7958. In one embodiment, the second notch 7960 is disposed at an end of the main tube 7942 that is opposite to the cap 7944. The spacing between the first notch 7958 and the second notch 7960 may correspond to the distance between portions of a main piston (e.g., the main piston 7824) of an integrated spring damper. The notches 7958 and 7960 facilitate the coupling of the main piston to the main tube 7942 such that forces applied to the main tube 7942 cause the positioning of the main piston to shift to provide the springing and damping forces discussed above.

Referring now to FIG. 168, a view of an integrated spring damper 8100 is shown, according to an exemplary embodiment. The integrated spring damper 8100 includes a main body, shown as main body 7802, and a main tube, shown as main tube 7942. The main body 7802 is tubular. In one embodiment, the main body 7802 is manufactured using an extrusion process. In an alternative embodiment, the main body 7802 is manufactured using a casting process. As shown in FIG. 168, a cap, shown as cap 7804, and a barrier, shown as barrier 7806, are disposed on opposing ends of the main body 7802, defining an internal volume. The main tube 7942 is at least partially received within the internal volume of the main body 7802. The main tube 7942 is configured to translate with respect to the main body 7802. A cap, shown as cap 7944, is disposed at a distal end of the main tube 7942. The cap 7804, barrier 7806, and cap 7944 may be coupled to the respective components with a threaded connection or with another coupling mechanism (e.g., welding, a friction weld, brazing, interference fit, etc.).

According to an exemplary embodiment, the integrated spring damper 8100 includes a first mounting portion (e.g., a lower mounting portion, etc.), shown as eyelet 7820, with which the integrated spring damper 8100 is coupled to one portion of an axle assembly (e.g., a lower portion of the axle assembly, etc.). According to an exemplary embodiment, the integrated spring damper 7800 is coupled on one end (e.g., with the eyelet 7820 on a lower end, etc.) to a moveable member of the axle assembly (e.g., a lower support arm, etc.). According to an exemplary embodiment, the eyelet 7820 is integrally formed with the cap 7804. In one embodiment, the eyelet 7820 is coupled to a mounting portion (e.g., the mounting portion 7922) of a lower support arm (e.g., the lower support arm 7920) using a mounting pin (e.g., the mounting pin 7906) discussed above.

As shown in FIG. 168, the integrated spring damper 8100 includes a second mounting portion (e.g., an upper mounting portion, a pin mount, etc.), shown as upper mount 7964. The upper mount 7964 is configured to couple an opposing second end (e.g., an upper end, etc.) of the integrated spring damper 8100 to a vehicle body, frame member, or part thereof.

In the embodiment shown, the upper mount 7964 includes a first mounting member 7966 that is disposed proximal the cap 7944. As shown in FIG. 168, the first mounting member 7966 is inserted in an annular grove (e.g., the annular groove 7950) in the cap 7944. The first mounting member 7966 is substantially annular in shape and includes an opening through which a portion of the cap 7844 extends. In one embodiment, the first mounting member 7966 is a resilient member, such as a flexible urethane, and serves as an isolator and an elastomeric spacer. In one embodiment, the upper surface of the first mounting member 7966 is substantially flush with an upper surface of a cap 7944. In alternative embodiments, the first mounting member 7966 extends above the upper surface of the cap 7944. The upper mount 7964 further includes a second mounting member 7968 disposed proximal the first mounting member 7966. In one embodiment, the second mounting member 7968 may define a volume into which the cap 7944 is disposed. With the upper mount 7964 disposed on the cap 7944, the cap 7944 is substantially covered by the second mounting member 7968. In one embodiment, the second mounting member

7968 is constructed of a metal or another wear resistant material. In one embodiment, the first mounting member 7966 isolates the second mounting member 7968 from the cap 7944. The first mounting member 7966 may be friction welded to the second mounting member 7968. In one embodiment, the upper surface of the second mounting member 7968 is structured to abut the surface of a structure (e.g., chassis, side plate, hull, etc.) of a vehicle.

The upper mount 7964 further includes a third mounting member 7970. The third mounting member 7970 may be spaced from the second mounting member 7968 to provide space for a vehicle structure. The vehicle structure may be mounted between the second portion 7968 and the third mounting member 7970, such that a lower surface of the third mounting member abuts the vehicle structure. In one embodiment, the third mounting member 7970 is a resilient member, such as a flexible urethane, and serves as an isolator and an elastomeric spacer. The upper mount 7964 further includes a fourth mounting member 7972 disposed proximal the third mounting member 7970. The lower surface of the fourth mounting member 7972 contacts the upper surface of the third mounting member 7970. In one embodiment, the fourth mounting member 7972 is constructed from a metal or another wear resistant material. In one embodiment, the fourth mounting member 7972 is friction welded to the third mounting member 7970.

In some embodiments, the first or second mounting members 7966 and 7968 include portions that extend through an opening in the vehicle structure (e.g., a side wall) to which the integrated spring damper 8100 is to be mounted to engage with the third or fourth mounting members 7970 and 7972.

In the embodiment shown, each of the mounting members 7966-7972 is substantially annular and include openings at approximately the centers thereof. In one embodiment, each of the openings receive the protruding portion 7945 of the cap 7944. In one embodiment, the protruding portion 7945 of the cap 7944 extends above the uppermost surface of the fourth mounting member 7972 when the upper mount 7964 is disposed on the cap 7944. In one embodiment, an outer surface of the protruding portion 7945 is threaded such that a fastener 7974 may be tightened to secure the upper mount 7964, and thereby the integrated spring damper 8100, to a structure of a vehicle.

In one embodiment, a pressure regulation portion 7976 may is coupled to the fastener 7974. The pressure regulation portion 7976 may be coupled to the openings in the protruding portion 7845 of the cap to provide a pressure regulation line for the integrated spring damper 8100. With the pressure regulation portion 7976, compressible fluid may be introduced into an internal volume of the main tube 7942 to adjust the riding height of the integrated spring damper 8100.

High Flow RCO

Referring now to FIGS. 169-171, an alternative secondary plunger 8326 is shown, according to various exemplary embodiments. The secondary plunger 8326 may be used in place of any of the secondary plunger 8236, the secondary plunger 8226, and/or the secondary plunger 8226. The secondary plunger 8326 may share features with either of the secondary plunger 8226 and the secondary plunger 8236 (e.g., grooves on an inner surface 8333 thereof and grooves on a contact surface thereof).

In the example shown in FIG. 169, an opposing surface 8329 (i.e., a surface of the secondary plunger 8326 that is opposite contact surface 8327) includes grooves (e.g., kerfs, channels, recesses, gulleys, depressions, etc.), shown as a first surface groove 8302*a*, a second surface groove 8302*b*, a third surface groove 8302*c*, a fourth surface groove 8302*d*, a fifth surface groove 8302*e*, a sixth surface groove 8302*f*, a seventh surface groove 8302*g*, and an eighth surface groove 8302*h*. As shown in FIG. 169, each of the first surface groove 8302*a*, the second surface groove 8302*b*, the third surface groove 8302*c*, the fourth surface groove 8302*d*, the fifth surface groove 8302*e*, the sixth surface groove 8302*f*, the seventh surface groove 8302*g*, and the eighth surface groove 8302*h* (also referred to as surface grooves 8302) extend along opposing surface 8329 at an angle relative a radial reference line passing through its center (shown in greater detail below with reference to FIG. 171A). Secondary plunger 8326 is shown including eight surface grooves 8302 (i.e., first surface groove 8302*a*, second surface groove 8302*b*, third surface groove 8302*c*, fourth surface groove 8302*d*, fifth surface groove 8302*e*, sixth surface groove 8302*f*, seventh surface groove 8302*g*, and eighth surface groove 8302*h*) extending outwards along opposing surface 8329, however secondary plunger 8326 may include any number of surface grooves 8302, according to various exemplary embodiments.

Referring still to FIGS. 169-171, secondary plunger 8326 is shown to include orifices (e.g., apertures, openings, cavities, mouths, holes, inlets, outlets, etc.), shown as bypass orifices 8332, according to an exemplary embodiment. Bypass orifices 8332 are adjacent to surface grooves 8302, thereby defining a shoulder between each bypass orifice 8332 and surface groove 8302. The shoulder is shown filleted. In some embodiments, the shoulder is chamfered. Eight bypass orifices 8332 are shown with each of the bypass orifices 8332 corresponding to one of surface grooves 8302. For example, bypass orifice 8332*a* corresponds to surface groove 8302*a*, bypass orifice 8332*b* corresponds to surface groove 8302*b*, bypass orifice 8332*c* corresponds to surface groove 8302*c*, bypass orifice 8332*d* corresponds to surface groove 8302*d*, bypass orifice 8332*e* corresponds to surface groove 8302*e*, bypass orifice 8332*f* corresponds to surface groove 8302*f*, bypass orifice 8332*g* corresponds to surface groove 8302*g*, and bypass orifice 8332*h* corresponds to surface groove 8302*h*. Each of bypass orifices 8332 may be configured to facilitate a fluid flow path with the corresponding surface groove 8302. For example, hydraulic fluid may flow along surface groove 8302*a*, and then flow through the corresponding bypass orifice 8332*a*. In FIGS. 169-170, bypass orifices 8332 are shown extending through an entire thickness of secondary plunger 8326 (e.g., extending from opposing surface 8329 to contact surface 8327).

Referring to FIG. 171A, bypass orifices 8332 are shown defined as a portion of a circle 8414. In some embodiments, bypass orifices 8332 are arcuate, or generally curved. In some embodiments, bypass orifices 8332 are defined by an arc having a non-constant radius of curvature. Specifically, bypass orifices 8332 are defined as portion of circle 8414 defined by angle 8416. A center of circle 8414 is disposed a distance 8402 radially outwards from a center 8420 of secondary plunger 8326. In some embodiments, circle 8414 is disposed distance 8402 radially outwards from center 8420 of secondary plunger 8326 and also offset a distance tangentially from an endpoint of distance 8402. Circle 8414 is shown having a radius 8412. Both the distance 8402 and the radius 8412 of circle 8414 may determine an area 8422 which facilitates fluid flow therethrough. For example, if distance 8402 increases, angle 8416 increases, and area 8422 also increases, thereby facilitating more fluid to flow through area 8422. If radius 8412 increases, area 8422 also increases, thereby facilitating more fluid to flow through area 8422. In this way, the radius 8412 and distance 8402 of circle 8414 from center 8420 determine area 8422 and determine an amount of fluid which may pass through bypass orifices 8332 therein (i.e., pass through area 8422). The amount of fluid allowed to pass through bypass orifices 8332 may determine a damping amount when damper assembly 8200 compresses. In this way, area 8422 facilitates fluid flow and damping of damper assembly 8200.

Secondary plunger 8326 has inner radius 8406 and outer radius 8404, according to an exemplary embodiment. Inner radius 8406 is defined as a distance between center 8420 of secondary plunger 8326 and an inner surface 8333. Inner surface 8333 is defined as a surface facing radially inwards towards center 8420 of secondary plunger 8326. Outer radius 8404 is defined as a distance between center 8420 of secondary plunger 8326 and an outer periphery, shown as outer surface 8331 of secondary plunger 8326. Outer surface 8331 and inner surface 8333 are substantially circular shaped, having radius 8404 and radius 8406, respectively. In some embodiments, outer surface 8331 and inner surface 8333 are circular shaped and have coincident centers. Outer surface 8331 is shown facing radially outwards from center 8420 of secondary plunger 8326. A difference between outer radius 8404 and inner radius 8406 may define a radial thickness 8410, according to some embodiments. In some embodiments, inner radius 8406 of inner surface 8333 is greater than an outer radius of shaft 8238. In this way, a flow area is defined between inner surface 8333 and the outer radius of shaft 8238. This area facilitates the flow of hydraulic fluid through the space defined between inner surface 8333 and the outer radius of shaft 8238. Increasing inner radius 8406 increases the area which facilitates hydraulic fluid therethrough, thereby adjusting damping of damper assembly 8200 (e.g., as damper assembly 8200 compresses).

Referring still to FIG. 171A, each of surface grooves 8302 are oriented at an angle. A centerline 8424 is shown extending radially outwards from center 8420 of secondary plunger 8326. Centerline 8424 is shown extending through a center of a circle (not shown) which defines bypass orifice 8332*f*. A centerline 8426 is shown extending along surface groove 8302*f* from an end of centerline 8424 (e.g., where centerline 8424 intersects bypass orifice 8332). In some embodiments, centerline 8426 is not a centerline of surface groove 8302*f*, but is still parallel to the centerline of surface groove 8302*f*. Centerline 8426 and centerline 8424 define an angle, shown as angle 8418. According to an exemplary embodiment, angle 8418 is 140 degrees. In some embodiments, angle 8418 is any value between 110 degrees and 160 degrees. In some embodiments, angle 8418 may be a negative value between −110 degrees and −160 degrees. In some embodiments, each of surface grooves 8302 are oriented at angle 8418, where each angle 8418 is defined similarly as described herein with reference to surface groove 8302*f*. In some embodiments, each of surface grooves 8302 are oriented at the same angle 8418. In some embodiments, one or more of surface grooves 8302 are oriented at a first angle, while one or more surface grooves 8302 are oriented at a second angle. For example, the angle 8418 which corresponds to surface groove 8302*f* may be 140 degrees, while the angle 8418 which corresponds to surface groove 8302*a* may be 120 degrees, etc. Surface grooves 8302 are shown having a width 8408. Width 8408 may be a same value for each of surface grooves 8302. In some embodiments, some of surface grooves 8302 have a first width 8408 while others of surface grooves 8302 have a second width 8408. For example, surface groove 8302*a*, surface groove 8302*c*, surface groove 8302*e*, and surface groove 8302*g* may have a first width 8408, while surface groove 8302*b*, surface groove 8302*d*, surface groove 8302*f*, and surface groove 8302*h* have a second width 8408, according to some embodiments.

Referring to FIG. 171B, an alternative embodiment of secondary plunger 8326 is shown according to an exemplary embodiment. Secondary plunger 8326 includes surface groove 8304*a* and surface groove 8304*b*, disposed about opposing surface 8329, and extending along opposing surface 8329. Surface groove 8304*a* and surface groove 8304*b* are disposed symmetrically about secondary plunger 8326 relative to axis 8303. Axis 8303 is shown parallel to both centerline 8306 and centerline 8308. Centerline 8306 and centerline 8308 are shown substantially parallel to each other, and are each disposed an equal distance (normal to axis 8303) from center 8420 of secondary plunger 8326. Surface groove 8304*a* and surface groove 8304*b* may have equal width, shown as width 8408.

Secondary plunger 8326 includes bypass orifice 8334*a* and bypass orifice 8334*b* disposed along inner surface 8333 and within a corresponding surface groove 8304. Each of the bypass orifices 8334 are associated with and adjacent to one of the surface grooves 8304. For example, as shown in FIG. 171B, bypass orifice 8334*a* is adjacent to surface groove 8304*a* and bypass orifice 8334*b* is adjacent to surface groove 8304*b*. Bypass orifices 8334 may be generally arcuate and have a radius 8314. Bypass orifices 8334 are shown disposed a radial distance 8312 from center 8420 and at angle 8316 relative to center 8420 and axis 8303.

Referring to FIG. 170, secondary plunger 8326 includes channels (i.e., track, depression, kerf, notch, opening, recess, slit, etc.), shown as channel 8318 and channel 8320, according to an exemplary embodiment. As shown in FIG. 170, channel 8318 and channel 8320 extend along contact surface 8327. Channel 8318 and channel 8320 extend radially outwards from a center (e.g., center 8420 as shown in FIG. 171A) of secondary plunger 8326. Channel 8318 and channel 8320 extend through an entire radial thickness of secondary plunger 8326 (e.g., radial thickness 8410 as shown in FIG. 171A). In some embodiments, channel 8318 and channel 8320 are configured to interface with one or more channels (i.e., track, depression, kerf, notch, opening, recess, slit, etc.) of plunger 8212 to cooperatively form a channel. For example, plunger 8212 may include one or more channels extending radially outwards from a center of plunger 8212 and configured to interface with at least one of channel 8318 and channel 8320 such that when plunger 8212 moves into contact with contact surface 8327, the one or more channels interface with at least one of channel 8318 and channel 8320 to form a bypass channel. Channel 8318 and channel 8320 are shown having a rectangular cross-sectional area. In some embodiments channel 8318 and channel 8320 have a non-rectangular cross-sectional area (e.g., circular, a portion of a circle, arcuate, etc.). Channel 8318 and channel 8320 are associated with and adjacent to bypass orifice 8332*a* and bypass orifice 8332*e*, respectively. In some embodiments, secondary plunger 8326 includes more than the two channels (i.e., channel 8318 and channel 8320). For example, each of bypass orifices 8332 may have a corresponding channel similar to channel 8318 and channel 8320, according to some embodiments.

Referring again to FIG. 169, surface grooves 8302 are shown to have a generally arc-shaped cross-sectional area. In other exemplary embodiments, surface grooves 8302 may each have any other cross-sectional shape (e.g., rectangular). The number, size, orientation, and cross-sectional shape of surface grooves 8302 may be determined based on the flow characteristics that the surface grooves 8302 produce. For example, if a particular flow characteristic is desired (e.g., a specific damping), the number, size, orientation, and cross-sectional shape of surface grooves 8302 may be configured to achieve the desired flow characteristic. Additionally, bypass orifices 8332 may be configured to achieve the desired flow characteristics. For example, as discussed above, the area 8422 may be changed by adjusting properties of the bypass orifices 8332 (e.g., radius 8412, distance 8402, etc.) to achieve the desired flow characteristics. As plunger 8212 moves into contact with contact surface 8327 (i.e., as damper 8200 extends), secondary plunger 8326 is forced to move such that recoil chamber 8230 decreases in volume. As recoil chamber 8230 decreases in volume, hydraulic fluid present in recoil chamber 8230 flows out of recoil chamber 8230 and into compression chamber 8242 or second chamber 228. In order to flow from recoil chamber 8230 to compression chamber 8242, the hydraulic fluid must flow through at least one of bypass orifices 8332 and at least one of channel 8318 and channel 8320. In some embodiments, fluid flows along at least one of surface grooves 8302 before flowing through an adjacent bypass orifice 8332.

Advantageously, the size, number, and orientation of surface grooves 8304 and surface grooves 8302 may prevent secondary plunger 8326 from rotating while it is being driven by plunger 8212. For example, as fluid passes along surface grooves 8304, the fluid may apply a force to a surface of surface grooves 8304. The force applied to surface grooves 8304 may generate a torque about a central axis 8310 (see FIG. 169), which may cause secondary plunger 8326 to rotate as secondary plunger travels due to plunger 8212. Advantageously, the orientation (e.g., angle 8418 of FIG. 171A) may be configured for some of surface grooves 8304 such that some of surface grooves 8304 cause secondary plunger 8326 to rotate in a first direction (e.g., clockwise), and other surface grooves 8304 cause secondary plunger 8326 to rotate in a second direction (e.g., counter-clockwise). In this way, a torque in the first direction due to some of the surface grooves 8304 and a torque in the second direction due to some of the surface grooves 8304 may be substantially equal and opposite such that secondary plunger 8326 is prevented from rotating. Surface grooves 8302 may result in similar or the same advantages by preventing secondary plunger 8326 from rotating, similar to surface grooves 8304.

Referring now to FIG. 172, a portion of damper assembly 8200 is shown, illustrating flow paths formed by plunger 8212 and secondary plunger 8326, according to an illustrative embodiment. As plunger 8212 moves along direction of travel 8240, plunger 8212 contacts and interfaces with contact surface 8327 of secondary plunger 8326. After contacting and interfacing with secondary plunger 8326, plunger 8212 may continue to move along direction of travel 8240, moving secondary plunger 8326 along direction of travel 8240 as well. Secondary plunger 8326 includes interfacing member 8228 (e.g., seal, ring, wear band, guide ring, wear ring, etc.), disposed between annular groove 8330 of secondary plunger 8326 and an interior surface of housing 8214, therein preventing fluid from flowing between an outer surface of secondary plunger 8326 and the interior surface of housing 8214. As secondary plunger 8326 moves along direction of travel 8240, recoil chamber 8230 decreases in volume and compression chamber 8242 increases in volume, with fluid flowing out of recoil chamber 8230 and into compression chamber 8242 or second chamber 228. Fluid may flow between recoil chamber 8230 and compression chamber 8242 along flow path 8508 and flow path 8510. Flow path 8508 is formed by surface groove 8302*a*, bypass orifice 8332*a*, and channel 8318 of secondary plunger 8326. In some embodiments, plunger 8212 includes a groove (i.e., track, channel, depression, kerf, notch, opening, recess, slit, etc.), shown as first groove 8504, which cooperatively forms flow path 8508 by interfacing with at least one of bypass orifice 8332*a* and channel 8318. In some embodiments, plunger 8212 does not include first groove 8504, and flow path 8508 is formed without first groove 8504. Flow path 8510 is similarly formed by surface groove 8302*e*, bypass orifice 8332*e*, and channel 8320 of secondary plunger 8326. In some embodiments, plunger 8212 includes a second groove (i.e., track, channel, depression, kerf, notch, opening, recess, slit, etc.), shown as second groove 8506, which cooperatively forms flow path 8510 by interfacing with at least one of bypass orifice 8332*e* and channel 8320. In some embodiments, plunger 8212 does not include second groove 8506, and flow path 8510 is formed without second groove 8506.

Referring still to FIG. 172, fluid may flow along flow path 8508 and/or flow path 8510. Some of the fluid from recoil chamber 8230 may flow along flow path 8508 and/or flow path 8510 without flowing along either surface groove 8302*a* or surface groove 8302*e*. For example, some of the fluid of recoil chamber 8230 may flow through area 8422 of bypass orifice 8332*a* and into compression chamber 8242 or second chamber 228 through channel 8318 without flowing along surface groove 8302*a*. FIG. 172 shows inner radius 8406 of secondary plunger 8326 being substantially equal to radius 8509 of shaft 8238. In some embodiments, inner radius 8406 of secondary plunger 8326 is substantially larger than radius 8509 of shaft 8238, allowing an additional area for fluid to flow therein.

Referring now to FIGS. 173-175, several configurations of damper assembly 8200 are shown, as damper assembly 8200 extends (e.g., recoils), according to an exemplary embodiment. FIG. 173 shows damper assembly 8200 with plunger 8212 shown not yet in contact with secondary plunger 8326. Damper assembly 8200 is shown to include recoil chamber 8230, extension chamber 8218 and compression chamber 8242. In the configuration shown in FIG. 173, extension chamber 8218 is defined as a volume between plunger 8212 and secondary plunger 8326 and within housing 8214. As plunger 8212 moves along direction of travel 8240, extension chamber 8218 decreases in volume. Plunger 8212 may move along direction of travel 8240 until it interfaces with secondary plunger 8326. Secondary plunger 8326 is shown adjacent step 8244. In some embodiments, secondary plunger 8326 is bias into engagement with step 8244 by return spring 8234.

Referring now to FIGS. 174 and 175, plunger 8212 is shown moved to a position where plunger 8212 engages with secondary plunger 8326. As discussed above with reference to FIG. 173, secondary plunger 8326 may be adjacent step 8244. When plunger 8212 moves along direction of travel 8240 and reaches the position where step 8244 is, plunger engages with secondary plunger 8326. When plunger 8212 engages with secondary plunger 8326 the volume of extension chamber 8218 may be substantially zero. Plunger 8212 and secondary plunger 8326 cooperatively form flow path 8508 and flow path 8510 through the interface between plunger 8212 and secondary plunger 8326. Flow path 8508 is defined by bypass orifice 8332, channel 8320, and plunger 8212. In some embodiments, flow path 8508 is also defined by surface groove 8302. Flow path 8510 may be formed similarly to flow path 8508. Flow path 8508 and flow path 8510 allow fluid to flow between recoil chamber 8230 and extension chamber 8242 as secondary plunger 8326 moves along direction of travel 8240 (e.g., being driven to move along direction of travel 8240 by plunger 8212). In some embodiments, fluid cannot flow between recoil chamber 8230 and extension chamber 8242 through flow path 8508 and flow path 8510 until damper 8212 has moved a distance along direction of travel 8240 such that an outer periphery of plunger 8212 is no longer interfaced with an inner surface of the second portion of housing 8214. After damper 8212 has moved along direction of travel 8240 such that plunger 8212 is no longer interfaced with the inner surface of the second portion of housing 8214, flow path 8508 and flow path 8510 may allow fluid to flow between recoil chamber 8230 and extension chamber 8242.

Referring to FIG. 175, plunger 8212 and secondary plunger 8326 are shown moved to an extremum position along direction of travel 8240. In the configuration shown in FIG. 175, recoil chamber 8230 may have a volume substantially equal to zero, with substantially all of the fluid of recoil chamber 8230 having entered compression chamber 8242. As plunger 8212 and secondary plunger 8326 move along direction of travel 8240 between the configuration shown in FIG. 174 and the configuration shown in FIG. 175, flow path 8508 and flow path 8510 may be additionally formed by a difference between an outer periphery of plunger 8212 and the first diameter of the first portion of housing 8214. Fluid may flow between the outer periphery of plunger 8212 and first portion of housing 8214.

As plunger 8212 and secondary plunger 8326 move along direction of travel 8240 and fluid flows from recoil chamber 8230 to compression chamber 8242, secondary plunger 8326 may provide additional damping. The damping may be determined based on a restriction to the flow of fluid between recoil chamber 8230 and compression chamber 8242 provided by any of bypass orifices 8332 (or bypass orifices 8334), and channel 8320 and channel 8318 which cooperatively form flow path 8508 and flow path 8510 with plunger 8212. Bypass orifices 8332, bypass orifices 8334, channel 8320 and channel 8318 may be configured to restrict fluid flow along any of flow path 8508 and flow path 8510 to provide an additional damping force proportional to the pressure difference between the fluids in each of recoil chamber 8230 and compression chamber 8242. Thus, through such a configuration, the secondary plunger 8326 provides an additional damping force when the pressure differences are greatest (e.g., when the damper assembly 8200 is at the end of a stroke, when the secondary plunger 8326 and plunger 8212 approach the configuration shown in FIG. 175).

Referring now to FIGS. 176-177, top sectional views of damper assembly 8200 in the configuration shown in either FIG. 174 or FIG. 175 are shown, according to an exemplary embodiment.

Suspension Element Lockout

Referring to FIGS. 179A-179F, an integrated spring damper 8700 is shown, according to another exemplary embodiment. As shown in FIG. 179A, the integrated spring damper 8700 includes a tubular (e.g., cylindrical, etc.) main body (e.g., cylinder, housing, base, etc.), shown as main body 8702. In one embodiment, the main body 8702 is manufactured using an extrusion process. In an alternative embodiment, the main body 8702 is manufactured using a casting process. As shown in FIGS. 179A and 179C, a cap, shown as end cap 8704, and a barrier, shown as barrier 8706, are disposed on opposing ends of the main body 8702, defining an internal volume. The integrated spring damper 8700 further includes a tubular (e.g., cylindrical, etc.) element, shown as main tube 8716. The main tube 8716 is at least partially received within the internal volume of the main body 8702. The main tube 8716 is configured to translate with respect to the main body 8702. As shown in FIG. 179C, a cap, shown as cap 8718, is disposed at a distal end of the main tube 8716. The end cap 8704, barrier 8706, and cap 8718 may be coupled to the respective components with a threaded connection or with another coupling mechanism (e.g., welding, a friction weld, brazing, interference fit, etc.). As shown in FIG. 179A, in some embodiments, the integrated spring damper 8700 includes a locking mechanism, shown as locking mechanism 8770. In one embodiment, the locking mechanism 8770 is configured to position (e.g., lock, index, etc.) the end cap 8704 in a target orientation relative to the main body 8702. In one embodiment, the locking mechanism 8770 includes a set screw that is tightened to facilitate locking the end cap 8704 in the target orientation. The locking mechanism 8770 may facilitate indexing a lower mount of the integrated spring damper 8700 relative to other components thereof and thereby facilitate mounting integrated spring damper 8700 onto a vehicle.

According to an exemplary embodiment, the integrated spring damper 8700 includes a first mounting portion (e.g., a lower mounting portion, etc.), shown as eyelet 8720, with which the integrated spring damper 8700 is coupled to one portion of an axle assembly (e.g., a lower portion of the axle assembly, etc.). According to an exemplary embodiment, the integrated spring damper 8700 is coupled on one end (e.g., with the eyelet 8720 on a lower end, etc.) to a moveable member of the axle assembly (e.g., a lower support arm, etc.). According to an exemplary embodiment, the eyelet 8720 is integrally formed with the end cap 8704. As shown in FIG. 179A, the integrated spring damper 8700 includes a second mounting portion (e.g., an upper mounting portion, a pin mount, etc.), shown as upper mount 8707. The upper mount 8707 is configured to couple an opposing second end (e.g., an upper end, etc.) of the integrated spring damper 8700 to a vehicle body, frame member, or part thereof (e.g., chassis, side plate, hull, etc.), shown as side plate 8900.

According to an exemplary embodiment, the eyelet 8720 includes an ear 8802 and a second ear 8804. In the example shown, the first ear 8802 includes a first ear opening and the second ear 8804 includes a second ear opening. The first and second ear openings are circular and of the same diameter. It should be understood that, in various alternative embodiments, the ear openings may be shaped differently or differently from one another. In the example shown, the ear openings in the first and second ears 8802 and 8804 are aligned with one another to facilitate the insertion of a mounting pin 8806 through the ear openings.

In the example shown, the mounting pin 8806 is substantially cylindrical-shaped and has a diameter that is less than the diameters of the ear openings (e.g., within a predetermined threshold of the diameters of the openings in the ears 8802 and 8804). In one embodiment, the length of the mounting pin 8806 is greater than a distance between outer surfaces of the first and second ears 8802 and 8804. In response to the mounting pin 8806 being inserted and centered, a first end 8808 of the mounting pin 8806 extends outwardly from the first ear 8802. Additionally, a second end of the mounting pin 8806 opposite the first end extends outwardly from the second ear 8804. As described below with respect to FIGS. 6A-61, in addition to being inserted into the ears 8802 and 8804 of the eyelet 8720, the mounting pin 8806 is also inserted through an element that is coupled to an axle assembly of a vehicle to rotatably couple the integrated spring damper 8700 to the axle assembly. In some embodiments, the mounting pin 8806 includes an opening 8810 that extends from the first end 8808 to the second end.

As shown in FIGS. 179A and 179C-179D, the upper mount 8707 includes a first mounting member 8708, a second mounting member 8710, a third mounting member 8712, and a fourth mounting member 8714. As shown in FIGS. 179A and 179D, the first mounting member 8708 is positioned such that a top surface of the first mounting member 8708 abuts a first surface of the side plate 8900, shown as bottom surface 8902. In one embodiment, the first mounting member 8708 is constructed from a metal or wear resistant material. As shown in FIG. 179C-179D, the second mounting member 8710 includes a portion (e.g., a lower portion, a first portion, a non-protruded portion, etc.) that is positioned between the cap 8718 and the first mounting member 8708. In one embodiment, the second mounting member 8710 is a resilient member, such as a flexible urethane, that serves as an isolator and an elastomeric spacer. The second mounting member 8710 may be configured to isolate the cap 8718 from at least one of the first mounting member 8708 and the side plate 8900. In some embodiments, the first mounting member 8708 and the second mounting member 8710 are annular and circular in shape. In other embodiments, the first mounting member 8708 and the second mounting member 8710 have another shape (e.g., discus square, hexagonal, etc.).

In some embodiments, the first mounting member 8708 may be friction welded to the second mounting member 8710. For example planar portions of the surface of the first mounting member 8708 that is to be disposed nearest the cap 8718 may be forced against planar portions of the surface of the second mounting member 8710 that is to be disposed nearest a side plate 8900. Rotational energy may be applied to at least one of the first mounting member 8708 and the second mounting member 8710 while the mounting members 8708 and 8710 are pressed against one another until friction welds 8820 and 8822 join the mounting members 8708 and 8710 together. In one embodiment, the first and second mounting members 8708 and 8710 are substantially circular and define apertures 8709 and 8711 through which a protruding portion 8719 of the cap 8718 extends. The friction welds 8820 and 8822 may circumferentially surround the aperture 8709.

As shown in FIGS. 179A and 179D, the fourth mounting member 8714 is positioned between the side plate 8900 and the third mounting member 8712. As shown in FIG. 179D, a second surface, shown as top surface 8904, of the side plate 8900 is in contact with a bottom surface of the fourth mounting member 8714, and the third mounting member 8712 is disposed on a top surface of the fourth mounting member 8714. The first mounting member 8708 and the fourth mounting member 8714 are spaced to receive the side plate 8900. In one embodiment, the fourth mounting member 8714 is a resilient member, such as a flexible urethane, that serves as an isolator and an elastomeric spacer. The fourth mounting member 8714 may be configured to isolate the third mounting member 8712 from the side plate 8900. In one embodiment, the third mounting member 8712 is constructed from a metal or wear resistant material. In some embodiments, the third mounting member 8712 and the fourth mounting member 8714 are annular and circular in shape. In other embodiments, the third mounting member 8712 and the fourth mounting member 8714 have another shape (e.g., discus square, hexagonal, etc.).

In some embodiments, the fourth mounting member 8714 may be friction welded to the third mounting member 8712. For example planar portions of the surface of the third mounting member 8712 may be forced against planar portions of the surface of the fourth mounting member 8714. Rotational energy may be applied to at least one of the third mounting member 8712 and the fourth mounting member 8714 while the mounting members 8712 and 8714 are pressed against one another until friction welds 8824 and 8826 join the mounting members 8712 and 8714 together. In one embodiment, the third and fourth mounting members 8712 and 8714 are substantially circular and define apertures 8713 and 8717 through which a protruding portion 8719 of the cap 8718 extends. The friction welds 8824 and 8826 may circumferentially surround the apertures 8713 and 8717.

As shown in FIG. 179D, the first mounting member 8708 defines an aperture, shown as aperture 8709, that corresponds with (e.g., aligns with, cooperates with, etc.) an aperture defined by side plate 8900, shown as side plate aperture 8906. The second mounting member 8710 includes a protruded portion (e.g., a second portion, an upper portion, etc.) that extends through the aperture 8709 and the side plate aperture 8906 and engages with a recess, shown as recess 8715, defined by the fourth mounting member 8714. In one embodiment, the recess 8715 receives the protruded portion of the second mounting member 8710. The second mounting member 8710 defines an aperture, shown as bore 8711, that extends longitudinally through the second mounting member 8710 and aligns with (e.g., cooperates with, etc.) an aperture, shown as aperture 8713, and an aperture, shown as aperture 8717, defined by the third mounting member 8712 and the fourth mounting member 8714, respectively. The bore 8711, aperture 8713, and aperture 8717 receive a protruded portion 8719 of the cap 8718.

As shown in FIG. 179C, a main piston, shown as main piston 8724, is disposed in the internal volume of the main body 8702. The main piston 8724 is coupled to the main tube 8716 and slidably engages the main body 8702. The main piston 8724 separates the internal volume into a first chamber 8726 (e.g., compression chamber, etc.) and a second chamber 8728 (e.g., extension chamber, etc.). The first chamber 8726 is a generally cylindrical chamber that includes the portion of the internal volume of the main body 8702 between the main piston 8724 and the end cap 8704. The second chamber 8728 is an annular chamber defined between the main body 8702 and the main tube 8716 and extends between the main piston 8724 and the barrier 8706. When the main tube 8716 translates relative to the main body 8702, the main piston 8724 changes the volume of the first chamber 8726 and the second chamber 8728. A dividing piston, shown as dividing piston 8730 (e.g., floating piston, etc.), is disposed in the main tube 8716 and slidably engages the main tube 8716. The dividing piston 8730 separates the internal volume of the main tube 8716 into a first inner chamber 8732 and a second inner chamber 8734. According to an exemplary embodiment, the first inner chamber 8732 is open to (i.e., in fluid communication with, etc.) the first chamber 8726.

According to an exemplary embodiment, the first chamber 8726, the second chamber 8728, and the first inner chamber 8732 contain a generally non-compressible fluid (e.g., hydraulic fluid, oil, etc.). According to an exemplary embodiment, the second inner chamber 8734 contains a generally compressible fluid that may include (e.g., at least 90%, at least 95%) an inert gas such as nitrogen, argon, or helium, among others. In some embodiments, the second inner chamber 8734 is in fluid communication with external devices, such as one or more reservoirs (e.g., central reservoir, tank, etc.), an accumulator, or a device allowing the pressure of the gas to be adjusted with a pressure regulation line. The pressure of the gas may be adjusted by removing or adding a volume of gas to adjust the suspension ride height.

According to an exemplary embodiment, the integrated spring damper 8700 includes a pressure regulation line that is located at a top portion (e.g., a top end, an upper end, etc.) of the integrated spring damper 8700. As shown in FIGS. 179A-179D, the integrated spring damper 8700 includes a port, shown as pressure regulation port 8780, coupled to the protruded portion 8719 of the cap 8718 (e.g., with a threaded interface, welded, etc.). As shown in FIGS. 179C-179D, the pressure regulation port 8780 defines a passageway, shown as inlet passageway 8782. The protruded portion 8719 of the cap 8718 defines a passageway, shown as intermediate passageway 8722. The intermediate passageway 8722 cooperates with the inlet passageway 8782 to define the pressure regulation line of the integrated spring damper 8700. The pressure regulation line extends from the pressure regulation port 8780, through the protruded portion 8719 of the cap 8718, and into the second inner chamber 8734 of the main tube 8716. According to an exemplary embodiment, the pressure regulation line of the integrated spring damper 8700 facilitates increasing or decreasing a volume of fluid (e.g., an inert gas, etc.) within the second inner chamber 8734 of the main tube 8716.

According to an exemplary embodiment, the pressure regulation port 8780 is positioned at the top of the integrated spring damper 8700 to provide a fixed or static location to fill or release gas from the second inner chamber 8734 of the integrated spring damper 8700. The pressure regulation port 8780 is positioned to increase (e.g., maximize, etc.) the travel of the main tube 8716 within the main body 8702, thereby increasing the stroke of the integrated spring damper 8700. By way of example, impulse forces transmitted to occupants within a vehicle from bumps, pot holes, etc. may be reduced by increasing the maximum stroke of the integrated spring damper 8700. According to an exemplary embodiment, the pressure regulation port 8780 is positioned above the side plate 8900 to reduce the risk of debris (e.g., dirt, rocks, mud, etc.) damaging or blocking the pressure regulation port 8780.

When the integrated spring damper 8700 is compressed or extended, the main tube 8716 translates relative to the main body 8702. The gas held in the second inner chamber 8734 compresses or expands in response to relative movement between the main tube 8716 and the dividing piston 8730, which may remain relatively stationary but transmit pressure variations between the incompressible hydraulic fluid in the first inner chamber 8732 and the compressible fluid in second inner chamber 8734. The gas in the second inner chamber 8734 resists compression, providing a force that is a function of the compressibility of the gas, the area of the piston, the volume and geometry of the second inner chamber 8734, and the current state (e.g., initial pressure, etc.) of the gas, among other factors. The receipt of potential energy as the gas is compressed, storage of potential energy, and release of potential energy as the gas expands provide a spring function for the integrated spring damper 8700.

In one embodiment, the dividing piston 8730 defines a cup 8731. According to the exemplary embodiment shown in FIG. 179C, the dividing piston 8730 is positioned such that the cup 8731 facilitates an increase in the volume of the second inner chamber 8734. In other embodiments, the dividing piston 8730 is positioned such that the cup 8731 facilitates an increase in the volume of the first inner chamber 8732. The dividing piston 8730 may be flipped and repositioned to selectively increase the volume of the first inner chamber 8732 or the second inner chamber 8734 to tune the performance of the integrated spring damper 8700. As shown in FIG. 12C, the cap 8718 defines a pocket, shown as cap pocket 8723. The cap pocket 8723 is structured to increase the volume of the second inner chamber 8734. In some embodiments, the cap pocket 8723 and the cup 8731 increase the volume of the second inner chamber 8734. In other embodiments, at least one of the cap pocket 8723 and the cup 8731 are not defined by the cap 8718 and the dividing piston 8730, respectively. By way of example, increasing the volume of the second inner chamber 8734 (i.e., decreasing the gas pressure within the second inner chamber 8734, etc.) may facilitate a softer ride (e.g., a smaller spring force, etc.), while decreasing the volume of the second inner chamber 8734 (i.e., increasing the gas pressure within the second inner chamber 8734, etc.) may facilitate a stiffer ride (e.g., a greater spring force, etc.).

Referring again to FIG. 179C, a limiter, shown as recoil damper 8736, is disposed within the internal volume of the main body 8702, between the main piston 8724 and the barrier 8706. The recoil damper 8736 reduces the risk of damage to the main piston 8724, barrier 8706, the sidewall of main body 8702, and still other components of integrated spring damper 8700 by reducing the forces imparted by the main piston 8724 as it travels toward an end of stroke (i.e., the maximum travel of the stroke, etc.). According to an exemplary embodiment, the recoil damper 8736 includes a recoil piston, shown as recoil piston 8738, positioned within the second chamber 8728 and a resilient member, shown as resilient member 8739. The resilient member 8739 may include an interlaced wave spring (i.e., a flat wire compression spring, etc.), a coil spring, or another type of spring. The resilient member 8739 may be disposed between the recoil piston 8738 and the barrier 8706. According to an exemplary embodiment, the resilient member 8739 is not intended to substantially resist the movement of the main piston 8724 but positions the recoil piston 8738 within the main body 8702, such as after it has been displaced by the main piston 8724. In other embodiments, the recoil damper 8736 does not include a resilient member, and the recoil piston 8738 may be repositioned using gravity or an alternative device.

Occupants within a vehicle experience large impulse forces as the main piston 8724 contacts the barrier 8706 or a component of the suspension system engages a hard stop. The recoil damper 8736 reduces such impulse forces transmitted to occupants within the vehicle by dissipating a portion of the kinetic energy of the main piston 8724 and the main tube 8716 (i.e., provide a supplemental damping force, etc.) as the integrated spring damper 8700 reaches an end of stroke (e.g., as the piston reaches a recoil end of stroke, as the piston reaches a jounce end of stroke, etc.).

Referring now to FIGS. 179E-179F, a first passage 8752 and a second passage 8762 may be disposed between the first chamber 8726 and the second chamber 8728. Fluid may flow between the first chamber 8726 and the second chamber 8728 through at least one of a first passage 8752 (e.g., conduit, bore, etc.) of a flow path, shown as first flow path 8750, and a second passage 8762 of a flow path, shown as second flow path 8760, defined by a manifold, shown as bypass manifold 8740. In other embodiments, the bypass manifold 8740 defines a different number of passages (e.g., one, three, etc.). According to an exemplary embodiment, the bypass manifold 8740 is coupled to the side of the main body 8702 (e.g., removably coupled to the main body 8702 with a plurality of fasteners, etc.). In other embodiments, the bypass manifold 8740 and the main body 8702 are integrally formed (e.g., a unitary structure, etc.). According to an alternative embodiment, at least one of the first passage 8752 and the second passage 8762 are formed with tubular members coupled to an outer portion of the main body 8702 or with flow passages defined by the main body 8702.

According to the exemplary embodiment shown in FIGS. 179C and 179E-179F, damping forces are generated as the flow of fluid through the first passage 8752 and the second passage 8762 interacts with flow control devices, shown as a first flow control device 8758 and a second flow control device 8768. According to an exemplary embodiment, the first flow control device 8758 and the second flow control device 8768 are bidirectional flow valves disposed within the bypass manifold 8740 along the first passage 8752 and the second passage 8762, respectively. The first flow control device 8758 and the second flow control device 8768 may include washers that differentially restrict a fluid flow based on the direction that the fluid is flowing. In other embodiments, the first flow control device 8758 and the second flow control device 8768 are other types of flow control device, such as pop off valves or orifices (e.g., variable flow orifices, etc.). In other embodiments, the first flow control device 8758 and the second flow control device 8768 are remotely positioned but in fluid communication with the first chamber 8726 and the second chamber 8728.

According to an exemplary embodiment, the main body 8702 defines a plurality of sets of openings. As shown in FIG. 179E, the plurality of sets of openings include a first set having first openings 8754 and second openings 8756. The first openings 8754 and the second openings 8756 are fluidly coupled by the first passage 8752, which is at least partially disposed between the first openings 8754 and the second openings 8756. As shown in FIG. 179F, the plurality of sets of openings include a second set having third openings 8764 and fourth openings 8766. The third openings 8764 and the fourth openings 8766 are fluidly coupled by the second passage 8762. According to an exemplary embodiment, the first passage 8752 and the second passage 8762 are offset relative to one another both circumferentially and longitudinally along the length of the main body 8702 and the bypass manifold 8740. In other embodiments, the main body 8702 defines a different number of sets of openings (e.g., one, three, four, etc.), each set corresponding with one of the passages defined by the bypass manifold 8740.

According to an exemplary embodiment, the integrated spring damper 8700 provides different damping forces in extension and retraction and also damping forces that vary based on the position of the main piston 8724 relative to the main body 8702 (e.g., position dependent dampening, etc.). According to an exemplary embodiment, the integrated spring damper 8700 provides recoil damping forces in jounce and compression damping forces in recoil as part of a spring force compensation strategy. By way of example, the position dependent dampening of the integrated spring damper 8700 may function as follows. As the main piston 8724 translates within main body 8702 (e.g., due to relative movement between components of a vehicle suspension system, etc.), various openings and their corresponding passages are activated and deactivated. According to an exemplary embodiment, fluid flows through the activated openings and their corresponding passages to provide damping forces that vary based on position and direction of travel of the main piston 8724 within the main body 8702.

Movement of the main tube 8716 relative to the main body 8702 translates the main piston 8724, causing the volume of the first chamber 8726 and the second chamber 8728 to vary. When the integrated spring damper 8700 compresses, the volume of the first chamber 8726 decreases while the volume of the second chamber 8728 increases. The fluid is forced from the first chamber 8726 through at least one of the first openings 8754 of the first passage 8752 and the third openings 8764 of the second passage 8762 (e.g., based on the position of the main piston 8724 within the main body 8702, etc.). The fluid flows through at least one the first passage 8752 and the second passage 8762 past the first flow control device 8758 and the second flow control device 8768 and out of the second openings 8756 and the fourth openings 8766 into the second chamber 8728. The resistance to the flow of the fluid along at least one of the first passage 8752 and the second passage 8762 and the interaction thereof with the first flow control device 8758 and the second flow control device 8768 provides a damping function for the integrated spring damper 8700 that is independent of the spring function. By way of example, if the non-compressible fluid is able to flow through both the first passage 8752 and the second passage 8762, the dampening provided by the integrated spring damper 8700 will be less than if fluid is able to flow through only one of the first passage 8752 and the second passage 8762. Therefore, as the main piston 8724 moves towards the end cap 8704, the integrated spring damper 8700 provides a first dampening characteristic (e.g., less dampening, etc.) when the first openings 8754 and the third openings 8764 are active and a second dampening characteristics (e.g., more dampening, etc.) when only the third openings 8764 are active (e.g., because the main piston 8724 deactivates the first openings 8754, which may include the first openings 8754 being positioned within the second chamber 8728, etc.).

Referring to FIG. 180, an integrated spring damper 8800 is shown, according to another exemplary embodiment. The integrated spring damper 8800 may be similar in construction to the integrated spring damper 8700. Accordingly, like reference numerals are used in FIG. 180 to refer to features of the integrated spring damper 8800 that may be similar to those of the integrated spring damper 8700.

The integrated spring damper 8800 includes one or more components that facilitate selectively reconfiguring the integrated spring damper 8800 into a locking condition. As shown in FIG. 180, the integrated spring damper 8800 includes a flow control element, shown as a valve 8772. The valve 8772 is disposed along a flow path between the first chamber and the second chamber. In the embodiment of FIG. 180, the valve 672 is positioned along a first passage 8752, between the first chamber 8726 and the second chamber 8728. In one embodiment, the valve 8772 is affixed to at least one of the surfaces 8751 of the first passage 8752 in a bypass manifold 8740. For example, the surfaces that form the first passage 8752 may include portions configured to couple with portions of the valve 8772. In the example shown, the valve 8772 is positioned approximately centrally within the first passage 8752 (e.g., at a midpoint between first and second openings 8754 and 8756). In alternative embodiments, the valve 8772 is positioned more proximate to either of the first and second openings 8754 and 8756. In another alternative embodiment, valve 8772 is attached to or integrated with the fluid flow control device 8758. In some embodiments, the valve 8772 includes a seal that selectively prevents fluid flow between the valve 8772 and the inner faces of the bypass manifold 8740 that define the first passage 8752.

In the example shown in FIG. 180, the integrated spring damper 8800 includes a single valve 8772. However, it should be understood that the integrated spring damper 8800 may include additional valves that are similar in construction to the valve 8772 in any other passages between the first and second chambers 8726 and 8728 (e.g., the second passage 8762 shown in FIG. 179F, etc.). In an alternative embodiment, valves are provided at each of the first and third openings 8754 and 8764 of the main body 8702.

In various embodiments, the valve 8772 includes at least two flow states and is adjustable between the flow states. For example, in one embodiment, the valve 8772 is a hydraulic pressure control valve that includes an open state and a closed state. In one embodiment, the valve 8772 may switch between an open and closed state when the pressure difference between the fluid on either side of valve 8772 in the first passage 8752 reaches a predetermined threshold. In one embodiment, the valve 8772 is configured to switch from an open state to a closed state when the pressure on the side of the valve 8772 closer to the opening 8756 is greater than the pressure on the side of the valve 8772 closer to the opening 8754 by more than a threshold amount. The valve 8772 is thereby closed when the integrated spring damper 8800 is in a relatively extended position. In an alternative embodiment, the orientation of the valve 8772 is switched, and the valve 8772 switches to the closed position when the integrated spring damper 8800 is in a relatively contracted position.

In various alternative embodiments, the valve 8772 is a solenoid valve that is selectively reconfigurable between an open state and a closed state. By way of example, the valve 8772 may be selectively reconfigurable in response to the application of an electrical current. In some embodiments, the valve 8772 includes a wireless transceiver configured to receive control signals from a central controller. The central controller may provide a control signal to the valve 8772 in response to a user indicating a preference to operate a vehicle to which the integrated spring damper 8800 is attached in a "lockout mode." Alternatively, the valve 8772 may receive such a control signal with a wired connection to a central controller.

In an embodiment, the valve 8772 is configured to prevent movement of the main tube 8716 in a direction. When the valve 8772 is switched to a closed state, further extension of the integrated spring damper 8800 may be prevented (e.g., eliminated, etc.). Extension of the integrated spring damper 8800 (i.e., translation of the main tube 8716 in a direction away from the end cap 8704) may produce a decrease in the volume of the second chamber 8728 and an increase in the volume of the first chamber 8726. Fluid is forced to flow through the first passage 8752 into the first chamber 8726 from the second chamber 8728. Such fluid flow is prevented (e.g., eliminated, etc.) when the valve 8772 is in a closed position. Further extension of the integrated spring damper 8800 may be prevented (e.g., eliminated, etc.) when the fluid in the second chamber 8728 is substantially compressed.

However, the valve 8772 may not prevent further compression of the integrated spring damper 8800. In other words, the fluid (e.g., the gas, etc.) in the second inner chamber 8734 may not be maximally compressed, so the main tube 8716 may still able to traverse towards the end cap 8704. While the inclusion of the valve 8772 facilitates a single-direction locking of the integrated spring damper 8800, the valve 8772 may not facilitate (e.g., may not entirely or completely facilitate or provide, etc.) bi-directional locking.

The integrated spring damper 8800 includes a locking member, shown as a bar 8774, that is configured to prevent further compression of the integrated spring damper 8800 beyond a predetermined amount. As shown in FIG. 180, the bar 8774 is disposed between the barrier 8706 and the cap 8718, proximal an outer surface 8729 of the main tube 8716.

In one embodiment, the bar 8774 is affixed to an outer surface 8729 of the main tube 8716 (e.g., welded, etc.). In response to the lower surface of the bar 8774 contacting the barrier 8706, further compression of the integrated spring damper is prevented by the bar 8774. The bar 8774 may thereby facilitate configuring the integrated spring damper 8800 in a "locking position." Together the valve 8772 and the bar 8774 are configured to prevent movement of the integrated spring damper 8800. Thus, if the valve 8772 is closed to prevent further extension when the bar 8774 contacts the barrier 8706, the integrated spring damper 8800 is substantially locked out. Locking out the integrated spring damper 8800 may facilitate transporting an associated vehicle (e.g., locking the suspension in a compressed or kneel position to clear an opening of a transport plane, etc.) and/or otherwise operating an associated vehicle (e.g., locking the suspension in position to hold the height of associated mission equipment stable, to provide enhanced ground clearance, etc.).

In the example shown, the bar 8774 only extends around a portion of the outer circumference of the main tube 8716. The bar 8774 is in a circumferential position relative the main tube 8716 that is substantially aligned with the bypass manifold 8740. However, in various alternative embodiments, the bar 8774 may be positioned at any rotational position on the outer circumference of the main tube 8716. Additionally, in an alternative embodiment, the bar 8774 may be positioned such that an upper end 8733 thereof contacts or is approximately flush with a lower surface 8721 of the cap 8718. As a result, when the integrated spring damper 8800 is in a locking position, the bar 8774 is pressed between the cap 8718 and the barrier 8706. Such a position places less strain on the joint between the bar 8774 and the main tube 8716. The bar 8774 may additionally or alternatively attach to the cap 8718 and/or the barrier 8706.

The integrated spring damper 8800 may additionally or alternatively include other systems to prevent compression thereof. For example, rather than having the bar 8774 affixed to the main tube 8716, which reduces the operational range of the integrated spring damper 8800, the bar 8774 may be separate from the main tube 8716. For example, the bar 8774 may be affixed to an external actuator that is attached to a support arm or other portion of a vehicle. The actuator may be configured to receive a control signal from a controller in response to a user indicating a preference to operate a vehicle in a particular transmission mode. The control signal may cause the actuator to position the bar 8774 adjacent to the main tube 8716 to lock out the integrated spring damper 8800. In an alternative embodiment, such a control signal may be provided in response to the main tube 8716 traversing a predetermined distance within the inner volume defined by the main body 8702. For example, the integrated spring damper 8800 may include a position sensor that detects the position of the cap 8718 relative to the barrier 8706. In one embodiment, when the position sensor detects that the cap 8718 is within a predetermined distance of the barrier 8706 a control signal is provided to position the bar 8774 and to close the valve 8772.

In various embodiments, to prevent recoil forces that may result from the bar 8774 contacting the barrier 8706 and/or cap 8718, the integrated spring damper 8800 may include additional recoil dampers disposed at the barrier 8706 and/or cap 8718. The recoil dampers may include springs (e.g., a flat wire compression spring, etc.) that are configured to counteract the force resulting from the bar 8774 translating towards the barrier 8706 or the cap 8718.

Referring to FIG. 181, an integrated spring damper 9000 is shown, according to another exemplary embodiment. The integrated spring damper 9000 is similar in construction to the integrated spring damper 8800 discussed above in that the valve 8772 is inserted into the first passage 8752 to prevent fluid flow between the first and second chambers 8726 and 8728.

Rather than the bar 8774 discussed above, the integrated spring damper 9000 includes an alternative locking member, shown as a collar 8776. The collar 8776 extends around the outer surface 8729 of the main tube 8716. In one embodiment, the collar 8776 is annular, and includes an inner surface 8725 that is approximately flush with the outer surface of the main tube 8716. The inner surface of the collar 8776 may be affixed to the outer surface of the main tube 8716 (e.g., welded, etc.). In response to a lower end 8778 of the collar 8776 contacting the barrier 8706, further extension or compression of the integrated spring damper 9000 is prevented.

In one embodiment, the collar 8776 extends around the entirety of the circumference of the main tube 8716 such that it entirely surrounds the main tube 8716. In an alternative embodiment, the collar 8776 is semi-circular and extends around only a portion (e.g., half, etc.) of the circumference of the main tube 8716. The extension of the collar 8776 around the circumference of the main tube 8716 provides a relatively large contact surface to be formed between the collar 8776, the main tube 8716, and the barrier 8706 when the collar 8776 is placed in such a position. Thus, forces resulting from the collar contacting the barrier 8706 (or any dampers attached thereto) are spread over these large contact surfaces.

The collar 8776 may be otherwise shaped, positioned, and/or actuated. In one embodiment, the collar 8776 is disposed at an upper end of the main tube 8716 such that an upper surface 8727 thereof is approximately flush with the cap 8718. The positioning of the lower end 8778 may be related to the height of the collar 8776. The degree to which the integrated spring damper 9000 needs to be compressed prior to reaching the locking position may vary with the height of the collar 8776. Additionally, as with the bar 8774 discussed above, the collar 8776 may be selectively repositioned with an actuator. In such embodiments, the full operational range of the integrated spring damper 9000 is ensured when locking out the integrated spring damper 9000 is not desired.

Suspension Element

Referring to FIG. 182, an integrated spring damper 9100 is shown, according to another exemplary embodiment. The integrated spring damper 9100 includes a tubular (e.g., cylindrical, etc.) main body 9102 (e.g., cylinder, housing, base, etc.). The ends of the main body 9102 are closed by a cap 9104 and a barrier 9106 to define an internal volume. The integrated spring damper 9100 further includes a tubular (e.g., cylindrical, etc.) main tube 9116. The main tube 9116 is received in the internal volume of the main body 9102. The main tube 9116 is configured to translate with respect to the main body 9102. The distal end of the main tube 9116 is closed by a cap 9118. The cap 9104, barrier 9106, and cap 9118 may be coupled to the respective components with a threaded connection or with another coupling mechanism (e.g., welding, brazing, interference fit, etc.).

According to an exemplary embodiment, the integrated spring damper 9100 includes a first eyelet 9120 and a second eyelet 9122 with which the integrated spring damper 9100 is coupled to an axle assembly. According to an exemplary embodiment, the integrated spring damper 9100 is coupled on one end (e.g., via the first eyelet 9120) to a moveable member of the axle assembly (e.g., an upper support arm, a lower support arm, etc.) and on the other end (e.g., via the second eyelet 9122) to the vehicle body or part thereof (e.g., chassis, side plate, hull). According to an exemplary embodiment, the first eyelet 9120 and the second eyelet 9122 are integrally formed with the cap 9104 and the cap 9118, respectively.

A main piston 9124 is disposed in the internal volume of the main body 9102. The main piston 9124 is coupled to the main tube 9116 and slidably engages the main body 9102. The main piston 9124 separates the internal volume into a first chamber 9126 (e.g., compression chamber) and a second chamber 9128 (e.g., extension chamber). The first chamber 9126 is a generally cylindrical chamber comprising the portion of the internal volume of the main body 9102 between the main piston 9124 and the cap 9104. The second chamber 9128 is an annular chamber defined between the main body 9102 and the main tube 9116 and extends between the main piston 9124 and the barrier 9106. When the main tube 9116 translates relative to the main body 9102, the main piston 9124 changes the volume of the first chamber 9126 and the second chamber 9128. A dividing piston 9130 (e.g., floating piston) is disposed in the main tube 9116 and slidably engages the main tube 9116. The dividing piston 9130 separates the internal volume of the main tube 9116 into the first inner chamber 9132 and a second inner chamber 9134. According to an exemplary embodiment, the first inner chamber 9132 is open to (i.e., in fluid communication with) the first chamber 9126.

A limiter, shown as recoil damper 9136, is disposed within the internal volume of the main body 9102 between the main piston 9124 and the barrier 9106. The recoil damper 9136 is intended to reduce the risk of damage to the main piston 9124, barrier 9106, the sidewall of main body 9102, or still another component of integrated spring damper 9100 by reducing the forces imparted by the main piston 9124 as it travels toward an end of stroke. According to an exemplary embodiment, the recoil damper 9136 includes a recoil piston 9138 positioned within the second chamber 9128 and a resilient member such as an interlaced wave spring (i.e., a flat wire compression spring), a coil spring, or another type of spring. The resilient member may be disposed between the recoil piston 9138 and the barrier 9106. According to an exemplary embodiment, the resilient member is not intended to damp the movement of the main piston 9124 but positions the recoil piston 9138 within the main body 9102, such as after it has been displaced by the main piston 9124. In other embodiments, the recoil damper 9136 may not include a resilient member and the recoil piston 9138 may be repositioned using gravity or an alternative device.

Occupants within a vehicle experience large impulse forces as the main piston 9124 contacts the barrier 9106 or a component of the suspension system engages a hard stop. The recoil damper 9136 reduces such impulse forces transmitted to occupants within the vehicle by dissipating a portion of the kinetic energy of the main piston 9124 and the main tube 9116 (i.e. provide a supplemental damping force) as the integrated spring damper 9100 reaches an end of stroke (e.g., as the piston reaches a recoil end of stroke, as the piston reaches a jounce end of stroke, etc.).

The first chamber 9126, the second chamber 9128, and the first inner chamber 9132 contain a generally non-compressible fluid (e.g., hydraulic fluid, oil, etc.). The first inner chamber 9132 is in fluid communication with the first chamber 9126 through an opening 9125 in the main piston

9124. The fluid may flow between the first chamber 9126 and the second chamber 9128 through a passage 9142 (e.g., conduit, bore, etc.) in a bypass manifold 9140. According to an exemplary embodiment, the bypass manifold 9140 is a structure coupled to the side of the main body 9102. The passage 9142 is in fluid communication with the first chamber 9126 through an aperture 9144 in the main body 9102 and with the second chamber 9128 through an aperture 9146 in the main body 9102. According to an exemplary embodiment, the aperture 9146 opens into the second chamber 9128 between the main piston 9124 and the recoil piston 9138. The flow of fluid through the passage 9142 is controlled by a flow control device 9148. According to an exemplary embodiment, the flow control device 9148 is a disk valve disposed within the bypass manifold 9140 along the passage 9142. In other embodiments, the flow control device 9148 may be another device, such as a pop off valve, or an orifice. In other embodiments, the flow control device remotely positioned but in fluid communication with the first chamber 9126 and the second chamber 9128.

The second inner chamber 9134 contains a generally compressible fluid that may include (e.g., at least 90%, at least 95%) an inert gas such as nitrogen, argon, or helium, among others. In some embodiments, the second inner chamber 9134 is in fluid communication with external devices, such as one or more reservoirs (e.g., central reservoir, tank), an accumulator, or device allowing the pressure of the gas to be adjusted. The pressure of the gas may be adjusted by removing or adding a volume of gas to adjust the suspension ride height.

When the integrated spring damper 9100 is compressed or extended, the main tube 9116 translates relative to the main body 9102. The gas held in the second inner chamber 9134 compresses or expands in response to relative movement between the main tube 9116 and the dividing piston 9130, which may remain relatively stationary but transmit pressure variations between the incompressible hydraulic fluid in the first inner chamber 9132 and the compressible fluid in second inner chamber 9134. The gas in the second inner chamber 9134 resists compression, providing a force that is a function of the compressibility of the gas, the area of the piston, the volume and geometry of the chamber, and the current state (e.g., initial pressure) of the gas, among other factors. The receipt of potential energy as the gas is compressed, storage of potential energy, and release of potential energy as the gas expands provide a spring function for the integrated spring damper 9100.

Movement of the main tube 9116 relative to the main body 9102 translates the main piston 9124, causing the volume of the first chamber 9126 and the second chamber 9128 to vary. When the integrated spring damper 9100 compresses, the volume of the first chamber 9126 decreases while the volume of the second chamber 9128 increases. The fluid is forced from the first chamber 9126 through the passage 9142 and past the flow control device 9148 into the second chamber 9128. The resistance to the flow of the fluid through the passage 9142 provides a damping function for the integrated spring damper 9100 that is independent of the spring function.

Referring to FIGS. 183-185, an integrated spring damper 9200 is shown, according to another exemplary embodiment. The integrated spring damper 9200 is similar in construction and function to the integrated spring damper 9100.

As shown in FIG. 183, the integrated spring damper 9200 includes a tubular (e.g., cylindrical, etc.) main body 9202 (e.g., cylinder, housing, base, etc.). The ends of the main body 9202 are closed by a cap 9204 and a barrier 9206 to define an internal volume. The integrated spring damper 9200 further includes a tubular (e.g., cylindrical, etc.) main tube 9216. The main tube 9216 is received in the internal volume of the main body 9202. The main tube 9216 is configured to translate with respect to the main body 9202. The distal end of the main tube 9216 is closed by a cap 9218. The integrated spring damper 9200 includes a first eyelet 9220 and a second eyelet 9222 with which the integrated spring damper 9200 is coupled to an axle assembly.

As shown in FIG. 184, a main piston 9224 is disposed in the internal volume of the main body 9202 and separates the internal volume into a first chamber 9226 (e.g., compression chamber) and a second chamber 9228 (e.g., extension chamber). A dividing piston 9230 (e.g., floating piston) is disposed in the main tube 9216 and separates the internal volume of the main tube 9216 into first inner chamber 9232 and a second inner chamber 9234. First inner chamber 9232 is open to (i.e., in fluid communication) first chamber 9226, according to an exemplary embodiment. A recoil damper 9236 including a recoil piston 9238 is disposed within the internal volume of the main body 9202 between the main piston 9224 and the barrier 9206. A bypass manifold 9240 is coupled to the side of the main body 9202 and includes a passage 9242 through which hydraulic fluid may pass between the first chamber 9226 and the second chamber 9228, and a flow control device 9248 is disposed within the bypass manifold 9240 along the passage 9242. The second inner chamber 9234 may be in fluid communication with external devices, such as one or more reservoirs (e.g., central reservoir, tank), an accumulator, or device allowing the pressure of the gas to be adjusted. The pressure of the gas may be adjusted by removing or adding a volume of gas to adjust the suspension ride height.

As shown in FIG. 185, the integrated spring damper 9200 includes a sensor, shown as ride height sensor 9260. The ride height sensor 9260 includes a first end 9262 and a second end 9264. According to an exemplary embodiment, the ride height sensor 9260 is coupled to the exterior of the integrated spring damper 9200, with the first end 9262 coupled to the main body 9202 and the second end 9264 coupled to the cap 9218. The ride height sensor 9260 is configured to have a relatively low profile such that it protrudes a minimal distance from the main body 9202. The low profile of the ride height sensor 9260 reduces the risk of interference with other components of the axle assembly. The ride height sensor 9260 is configured to detect the displacement of the second end 9264 relative to the first end 9262 and output a signal dependent on the displacement. The displacement may be detected, for example, with a potentiometer (e.g., a rotary potentiometer) that provides a variable output voltage to a control system. The output signal may be utilized by the control system to determine the relative extension or compression of the integrated spring damper 9200 and thereby the ride height of the vehicle with respect to the ground. A control system may use the signal (e.g., as feedback) to change the ride height of the vehicle by supplying a gas to or removing a gas from the second inner chamber 9234 (e.g., through an aperture 9254 from a gas reservoir).

Referring next to FIGS. 186*a*-186*b*, an integrated spring damper 9300 is shown, according to another exemplary embodiment. The integrated spring damper 9300 is similar in construction and function to the integrated spring damper 9890. The integrated spring damper 9300 includes a tubular (e.g., cylindrical, etc.) main body 9302 (e.g., cylinder, housing, base, etc.). The ends of the main body 9302 are closed by a cap 9304 and a barrier 9306 to define an internal volume that is separated into a central chamber and an annular, outer chamber by an inner tube 9310. The end of the inner tube 9310 proximate to the barrier 9306 is closed with a cap 9312. The integrated spring damper 9300 further includes a tubular (e.g., cylindrical, etc.) main tube 9316. The main tube 9316 is received in the internal volume of the main body 9302. The main tube 9316 is configured to translate with respect to the main body 9302. The distal end of the main tube 9316 is closed by a cap 9318. The integrated spring damper 9300 includes a first eyelet 9320 and a second eyelet 9322 with which the integrated spring damper 9300 is coupled to an axle assembly.

A main piston 9324 is disposed in an outer annular chamber defined between the main body 9302 and the inner tube 9310 and separates the outer annular chamber into first annular chamber 9326 and a second annular chamber 9328. A dividing piston 9330 (e.g., floating piston) is disposed in the inner chamber defined by the inner tube 9310 and separates the inner chamber into first inner chamber 9332 and a second inner chamber 9334. According to an exemplary embodiment, the first inner chamber 9332 is in fluid communication with first annular chamber 9326.

A bypass manifold 9340 is coupled to the side of the main body 9302 and includes a passage 9342 through which hydraulic fluid may pass between the first annular chamber 9326 and the second annular chamber 9328. A flow control device 9348 is disposed within the bypass manifold 9340 along the passage 9342. The second inner chamber 9334 may be in fluid communication with external devices, such as one or more reservoirs (e.g., central reservoir, tank), an accumulator, or device allowing the pressure of the gas to be adjusted. The pressure of the gas may be adjusted by removing or adding a volume of gas to adjust the suspension ride height.

The integrated spring damper 9300 includes a sensor, shown as ride height sensor 9360. The ride height sensor 9360 includes a first end 9362 and a second end 9364. According to the exemplary embodiment shown in FIG. 186*b*, the ride height sensor 9360 is positioned in the interior of the integrated spring damper 9300 with the first end 9362 coupled to the cap 9304 and the second end 9364 coupled to the cap 9318. The ride height sensor 9360 extends through openings in the cap 9312 and the dividing piston 9330. Positioning the ride height sensor 9360 in the interior of the integrated spring damper 9300 reduces the risk of interference with other components of the axle assembly. According to the exemplary embodiment shown in FIGS. 186*a*-186*b*, the ride height sensor 9360 is generally centrally positioned (e.g., along a center line, coaxial, etc.) within the interior of the main tube 9316. In other embodiments, the ride height sensor 9360 may be offset to one side of the integrated spring damper 9300.

Referring next to FIGS. 187*a*-187*b*, an integrated spring damper 9400 is shown, according to another exemplary embodiment. The integrated spring damper 9400 is similar in construction and function to the integrated spring damper 9100. The integrated spring damper 9400 includes a tubular (e.g., cylindrical, etc.) main body 9402 (e.g., cylinder, housing, base, etc.). The ends of the main body 9402 are closed by a cap 9404 and a barrier 9406 to define an internal volume. A main piston 9424 is disposed in the internal volume of the main body 9402 and separates the internal volume into a first chamber 9426 and a second chamber 9428. A bypass manifold 9440 includes a passage 9442 through which hydraulic fluid may pass between the first chamber 9426 and the second chamber 9428 and a flow control device 9448 disposed within the cap 9404 along the passage 9442.

The passage 9442 of the bypass manifold 9440 opens into the second chamber 9428 through an aperture 9446 in the main body 9402 (e.g., the sidewall of the chambers 9426 and 9428). The passage 9442 extends through the body of the cap 9404 and opens into the first chamber 9426 through an aperture 9444 provided in the cap 9404 (e.g., the end wall of the first chamber 9426). By providing the aperture 9444 at the end of the first chamber 9426 rather than along the sidewall of the first chamber 9426, the stroke length of the integrated spring damper 9400 is increased and the dead length (e.g., the difference between the stroke length and the total length of the integrated spring damper 9400) is reduced.

Referring next to FIGS. 188*a*-188*b*, an integrated spring damper 9500 is shown, according to another exemplary embodiment. The integrated spring damper 9500 is similar in construction and function to the integrated spring damper 100. The integrated spring damper 9500 includes a tubular (e.g., cylindrical, etc.) main body 9502 (e.g., cylinder, housing, base, etc.). The ends of the main body 9502 are closed by a cap 9504 and a barrier 9506 to define an internal volume that is separated into a central chamber and an annular, outer chamber by an inner tube 9510. The end of the inner tube 9510 proximate to the barrier 9506 is closed with a cap 9512. The integrated spring damper 9500 further includes a tubular (e.g., cylindrical, etc.) main tube 9516. The main tube 9516 is received in the internal volume of the main body 9502. The main tube 9516 is configured to translate with respect to the main body 9502. The distal end of the main tube 9516 is closed by a cap 9518. The integrated spring damper 9500 includes a first eyelet 9520 and a second eyelet 9522 with which the integrated spring damper 9500 is coupled to an axle assembly.

A main piston 9524 is disposed in an outer annular chamber defined between the main body 9502 and the inner tube 9510 and separates the outer annular chamber into first annular chamber 9526 and a second annular chamber 9528. A dividing piston 9530 (e.g., floating piston) is disposed in the inner chamber defined by the inner tube 9510 and separates the inner chamber into a first inner chamber 9532 and a second inner chamber 9534. The first inner chamber 9532 is in fluid communication with the first annular chamber 9526 through one or more apertures 9536 in the inner tube 9510, and second inner chamber 9534 is in fluid communication with a chamber between cap 9512 and cap 9518 via apertures in the cap 9512.

A bypass manifold 9540 includes a passage 9542 through which hydraulic fluid may pass between the first inner chamber 9532 and the second annular chamber 9528 and a flow control device 9548 disposed within the cap 9504 along the passage 9542. The passage 9542 of the bypass manifold 9540 opens into the first inner chamber 9532 through an aperture 9544 in the cap 9504 and into the second annular chamber 9528 through an aperture 9546 in the main body 9502. The passage 9542 extends through the body of the cap 9504 and opens into the first inner chamber 9532 through an aperture 9546 provided in the cap 9504.

The integrated spring damper 9500 additionally includes a sensor, shown as ride height sensor 9560. The ride height sensor 9560 includes a first end 9562 and a second end 9564. According to an exemplary embodiment, the ride height sensor 9560 is positioned in the interior of the integrated spring damper 9500 with the first end 9562 passing through the flow control device 9548 and coupled to the cap 9504 and the second end 9564 coupled to the cap 9518. The ride height sensor 9560 extends through openings in the cap 9512 and the dividing piston 9530.

Referring to FIGS. 189*a*-189*b*, an integrated spring damper 9600 is shown, according to another exemplary embodiment. The integrated spring damper 9600 is similar in construction and function to the integrated spring damper 9500. The integrated spring damper 9600 includes a bypass manifold 9640. The bypass manifold 9640 defines a passage 9642 through which hydraulic fluid may pass between a first inner chamber 9632 and a second annular chamber 9628, and a flow control device 9648 is disposed within the bypass manifold 9640 along the passage 9642. The passage 9642 includes one or more end portions 9645 formed in a cap 9604 and an annular portion 9647 between a main body 9602 and an outer wall and extending from the cap 9604 to a barrier 9606. The passage 9642 is in fluid communication with a first inner chamber 9632 through an aperture 9644 in the cap 9604 and with a second annular chamber 9628 through one or more apertures 9646 in the main body 9602.

Referring to FIGS. 190*a*-190*f*, an integrated spring damper 9700 is shown, according to another exemplary embodiment. As shown in FIG. 190*a*, the integrated spring damper 9700 includes a tubular (e.g., cylindrical, etc.) main body (e.g., cylinder, housing, base, etc.), shown as main body 9702. In one embodiment, the main body 9702 is manufactured using an extrusion process. In an alternative embodiment, the main body 9702 is manufactured using a casting process. As shown in FIGS. 190*a* and 190*c*, a cap, shown as cap 9704, and a barrier, shown as barrier 9706, are disposed on opposing ends of the main body 9702, defining an internal volume. The integrated spring damper 9700 further includes a tubular (e.g., cylindrical, etc.) element, shown as main tube 9716. The main tube 9716 is at least partially received within the internal volume of the main body 9702. The main tube 9716 is configured to translate with respect to the main body 9702. As shown in FIG. 190*c*, a cap, shown as cap 9718, is disposed at a distal end of the main tube 9716. The cap 9704, barrier 9706, and cap 9718 may be coupled to the respective components with a threaded connection or with another coupling mechanism (e.g., welding, a friction weld, brazing, interference fit, etc.). As shown in FIG. 190*a*, in some embodiments, the integrated spring damper 9700 includes a locking mechanism, shown as locking mechanism 9770. In one embodiment, the locking mechanism 9770 is configured to position (e.g., lock, index, etc.) the cap 9704 in a target orientation relative to the main body 9702. In one embodiment, the locking mechanism 9770 includes a set screw that is tightened to facilitate locking the cap 9704 in the target orientation. The locking mechanism 9770 may facilitate indexing a lower mount of the integrated spring damper 9700 relative to other components thereof and thereby facilitate mounting integrated spring damper 9700 onto a vehicle.

According to an exemplary embodiment, the integrated spring damper 9700 includes a first mounting portion (e.g., a lower mounting portion, etc.), shown as eyelet 9720, with which the integrated spring damper 9700 is coupled to one portion of an axle assembly (e.g., a lower portion of the axle assembly, etc.). According to an exemplary embodiment, the integrated spring damper 9700 is coupled on one end (e.g., via the eyelet 9720 on a lower end, etc.) to a moveable member of the axle assembly (e.g., a lower support arm, etc.). According to an exemplary embodiment, the eyelet 9720 is integrally formed with the cap 9704. As shown in FIG. 190*a*, the integrated spring damper 9700 includes a second mounting portion (e.g., an upper mounting portion, a pin mount, etc.), shown as upper mount 9707. The upper mount 9707 is configured to couple an opposing second end (e.g., an upper end, etc.) of the integrated spring damper 9700 to a vehicle body, frame member, or part thereof (e.g., chassis, side plate, hull, etc.), shown as side plate 9900.

As shown in FIGS. 190*a* and 190*c*-190*d*, the upper mount 9707 includes a first mounting member 9708, a second mounting member 9710, a third mounting member 9712, and a fourth mounting member 9714. As shown in FIGS. 190*a* and 190*d*, the first mounting member 9708 is positioned such that a top surface of the first mounting member 9708 abuts a first surface of the side plate 9900, shown as bottom surface 9902. In one embodiment, the first mounting member 9708 is constructed from a metal or wear resistant material. As shown in FIG. 190*c*-190*d*, the second mounting member 9710 includes a portion (e.g., a lower portion, a first portion, a non-protruded portion, etc.) that is positioned between the cap 9718 and the first mounting member 9708. In one embodiment, the second mounting member 9710 is a resilient member, such as a flexible urethane, that serves as an isolator and an elastomeric spacer. The second mounting member 9710 may be configured to isolate the cap 9718 from at least one of the first mounting member 9708 and the side plate 9900. In some embodiments, the first mounting member 9708 and the second mounting member 9710 are annular and circular in shape. In other embodiments, the first mounting member 9708 and the second mounting member 9710 have another shape (e.g., discus square, hexagonal, etc.).

As shown in FIGS. 190*a* and 190*d*, the fourth mounting member 9714 is positioned between the side plate 9900 and the third mounting member 9712. A second surface, shown as top surface 9904, of the side plate 9900 is in contact with a bottom surface of the fourth mounting member 9714, and the third mounting member 9712 is disposed on a top surface of the fourth mounting member 9714. The first mounting member 9708 and the fourth mounting member 9714 are spaced to receive the side plate 9900. In one embodiment, the fourth mounting member 9714 is a resilient member, such as a flexible urethane, that serves as an isolator and an elastomeric spacer. The fourth mounting member 9714 may be configured to isolate the third mounting member 9712 from the side plate 9900. In one embodiment, the third mounting member 9712 is constructed from a metal or wear resistant material. In some embodiments, the third mounting member 9712 and the fourth mounting member 9714 are annular and circular in shape. In other embodiments, the third mounting member 9712 and the fourth mounting member 9714 have another shape (e.g., discus square, hexagonal, etc.).

As shown in FIG. 190*d*, the first mounting member 9708 defines an aperture, shown as aperture 9709, that corresponds with (e.g., aligns with, cooperates with, etc.) an aperture defined by side plate 9900, shown as side plate aperture 9906. The second mounting member 9710 includes a protruded portion (e.g., a second portion, an upper portion, etc.) that extends through the aperture 9709 and the side plate aperture 9906 and engages with a recess, shown as recess 9715, defined by the fourth mounting member 9714. In one embodiment, the recess 9715 receives the protruded portion of the second mounting member 9710. The second mounting member 9710 defines an aperture, shown as bore 9711, that extends longitudinally through the second mounting member 9710 and aligns with (e.g., cooperates with, etc.) an aperture, shown as aperture 9713, and an aperture, shown as aperture 9717, defined by the third mounting member 9712 and the fourth mounting member 9714, respectively. The bore 9711, aperture 9713, and aperture 9717 receive a protruded portion 9719 of the cap 9718.

As shown in FIG. 190*c*, a main piston, shown as main piston 9724, is disposed in the internal volume of the main body 9702. The main piston 9724 is coupled to the main tube 9716 and slidably engages the main body 9702. The main piston 9724 separates the internal volume into a first chamber 9726 (e.g., compression chamber, etc.) and a second chamber 9728 (e.g., extension chamber, etc.). The first chamber 9726 is a generally cylindrical chamber that includes the portion of the internal volume of the main body 9702 between the main piston 9724 and the cap 9704. The second chamber 9728 is an annular chamber defined between the main body 9702 and the main tube 9716 and extends between the main piston 9724 and the barrier 9706. When the main tube 9716 translates relative to the main body 9702, the main piston 9724 changes the volume of the first chamber 9726 and the second chamber 9728. A dividing piston, shown as dividing piston 9730 (e.g., floating piston, etc.), is disposed in the main tube 9716 and slidably engages the main tube 9716. The dividing piston 9730 separates the internal volume of the main tube 9716 into a first inner chamber 9732 and a second inner chamber 9734. According to an exemplary embodiment, the first inner chamber 9732 is open to (i.e., in fluid communication with, etc.) the first chamber 9726.

According to an exemplary embodiment, the first chamber 9726, the second chamber 9728, and the first inner chamber 9732 contain a generally non-compressible fluid (e.g., hydraulic fluid, oil, etc.). According to an exemplary embodiment, the second inner chamber 9734 contains a generally compressible fluid that may include (e.g., at least 90%, at least 95%) an inert gas such as nitrogen, argon, or helium, among others. In some embodiments, the second inner chamber 9734 is in fluid communication with external devices, such as one or more reservoirs (e.g., central reservoir, tank, etc.), an accumulator, or a device allowing the pressure of the gas to be adjusted via a pressure regulation line. The pressure of the gas may be adjusted by removing or adding a volume of gas to adjust the suspension ride height.

According to an exemplary embodiment, the integrated spring damper 9700 includes a pressure regulation line that is located at a top portion (e.g., a top end, an upper end, etc.) of the integrated spring damper 9700. As shown in FIGS. 190*a*-190*d*, the integrated spring damper 9700 includes a port, shown as pressure regulation port 9780, coupled to the protruded portion 9719 of the cap 9718 (e.g., via a threaded interface, welded, etc.). As shown in FIGS. 190*c*-190*d*, the pressure regulation port 9780 defines a passageway, shown as inlet passageway 9782. The protruded portion 9719 of the cap 9718 defines a passageway, shown as intermediate passageway 9722. The intermediate passageway 9722 cooperates with the inlet passageway 9782 to define the pressure regulation line of the integrated spring damper 9700. The pressure regulation line extends from the pressure regulation port 9780, through the protruded portion 9719 of the cap 9718, and into the second inner chamber 9734 of the main tube 9716. According to an exemplary embodiment, the pressure regulation line of the integrated spring damper 9700 facilitates increasing or decreasing a volume of fluid (e.g., an inert gas, etc.) within the second inner chamber 9734 of the main tube 9716.

According to an exemplary embodiment, the pressure regulation port 9780 is positioned at the top of the integrated spring damper 9700 to provide a fixed or static location to fill or release gas from the second inner chamber 9734 of the integrated spring damper 9700. The pressure regulation port 9780 is positioned to increase (e.g., maximize, etc.) the travel of the main tube 9716 within the main body 9702, thereby increasing the stroke of the integrated spring damper 9700. By way of example, impulse forces transmitted to occupants within a vehicle from bumps, pot holes, etc. may be reduced by increasing the maximum stroke of the integrated spring damper 9700. According to an exemplary embodiment, the pressure regulation port 9780 is positioned above the side plate 9900 to reduce the risk of debris (e.g., dirt, rocks, mud, etc.) damaging or blocking the pressure regulation port 9780.

When the integrated spring damper 9700 is compressed or extended, the main tube 9716 translates relative to the main body 9702. The gas held in the second inner chamber 9734 compresses or expands in response to relative movement between the main tube 9716 and the dividing piston 9730, which may remain relatively stationary but transmit pressure variations between the incompressible hydraulic fluid in the first inner chamber 9732 and the compressible fluid in second inner chamber 9734. The gas in the second inner chamber 9734 resists compression, providing a force that is a function of the compressibility of the gas, the area of the piston, the volume and geometry of the second inner chamber 9734, and the current state (e.g., initial pressure, etc.) of the gas, among other factors. The receipt of potential energy as the gas is compressed, storage of potential energy, and release of potential energy as the gas expands provide a spring function for the integrated spring damper 9700.

In one embodiment, the dividing piston 9730 defines a cup 9731. According to the exemplary embodiment shown in FIG. 190*c*, the dividing piston 9730 is positioned such that the cup 9731 facilitates an increase in the volume of the second inner chamber 9734. In other embodiments, the dividing piston 9730 is positioned such that the cup 9731 facilitates an increase in the volume of the first inner chamber 9732. The dividing piston 9730 may be flipped and repositioned to selectively increase the volume of the first inner chamber 9732 or the second inner chamber 9734 to tune the performance of the integrated spring damper 9700. As shown in FIG. 190*c*, the cap 9718 defines a pocket, shown as cap pocket 9723. The cap pocket 9723 is structured to increase the volume of the second inner chamber 9734. In some embodiments, the cap pocket 9723 and the cup 9731 increase the volume of the second inner chamber 9734. In other embodiments, at least one of the cap pocket 9723 and the cup 9731 are not defined by the cap 9718 and the dividing piston 9730, respectively. By way of example, increasing the volume of the second inner chamber 9734 (i.e., decreasing the gas pressure within the second inner chamber 9734, etc.) may facilitate a softer ride (e.g., a smaller spring force, etc.), while decreasing the volume of the second inner chamber 9734 (i.e., increasing the gas pressure within the second inner chamber 9734, etc.) may facilitate a stiffer ride (e.g., a greater spring force, etc.).

Referring again to FIG. 190*c*, a limiter, shown as recoil damper 9736, is disposed within the internal volume of the main body 9702, between the main piston 9724 and the barrier 9706. The recoil damper 9736 reduces the risk of damage to the main piston 9724, barrier 9706, the sidewall of main body 9702, and still other components of integrated spring damper 9700 by reducing the forces imparted by the main piston 9724 as it travels toward an end of stroke (i.e., the maximum travel of the stroke, etc.). According to an exemplary embodiment, the recoil damper 9736 includes a recoil piston, shown as recoil piston 9738, positioned within the second chamber 9728 and a resilient member, shown as resilient member 9739. The resilient member 9739 may include an interlaced wave spring (i.e., a flat wire compression spring, etc.), a coil spring, or another type of spring. The resilient member 9739 may be disposed between the recoil piston 9738 and the barrier 9706. According to an exemplary embodiment, the resilient member 9739 is not intended to substantially resist the movement of the main piston 9724 but positions the recoil piston 9738 within the main body 9702, such as after it has been displaced by the main piston 9724. In other embodiments, the recoil damper 9736 does not include a resilient member, and the recoil piston 9738 may be repositioned using gravity or an alternative device.

Occupants within a vehicle experience large impulse forces as the main piston 9724 contacts the barrier 9706 or a component of the suspension system engages a hard stop. The recoil damper 9736 reduces such impulse forces transmitted to occupants within the vehicle by dissipating a portion of the kinetic energy of the main piston 9724 and the main tube 9716 (i.e. provide a supplemental damping force, etc.) as the integrated spring damper 9700 reaches an end of stroke (e.g., as the piston reaches a recoil end of stroke, as the piston reaches a jounce end of stroke, etc.).

Referring now to FIGS. 190*e*-190*f*, fluid may flow between the first chamber 9726 and the second chamber 9728 through at least one of a first passage 9752 (e.g., conduit, bore, etc.) of a flow path, shown as first flow path 9750, and a second passage 9762 of a flow path, shown as second flow path 9760, defined by a manifold, shown as bypass manifold 9740. In other embodiments, the bypass manifold 9740 defines a different number of passages (e.g., one, three, etc.). According to an exemplary embodiment, the bypass manifold 9740 is coupled to the side of the main body 9702 (e.g., removably coupled to the main body 9702 with a plurality of fasteners, etc.). In other embodiments, the bypass manifold 9740 and the main body 9702 are integrally formed (e.g., a unitary structure, etc.). According to an alternative embodiment, at least one of the first passage 9752 and the second passage 9762 are formed with tubular members coupled to an outer portion of the main body 9702 or with flow passages defined by the main body 9702.

According to the exemplary embodiment shown in FIGS. 190*c* and 190*e*-190*f*, damping forces are generated as the flow of fluid through the first passage 9752 and the second passage 9762 interacts with flow control elements, shown as first flow control device 9758 and second flow control device 9768. According to an exemplary embodiment, the first flow control device 9758 and the second flow control device 9768 are bidirectional flow valves disposed within the bypass manifold 9740 along the first passage 9752 and the second passage 9762, respectively. The first flow control device 9758 and the second flow control device 9768 may include washers that differentially restrict a fluid flow based on the direction that the fluid is flowing. In other embodiments, the first flow control device 9758 and the second flow control device 9768 are other types of flow control device, such as pop off valves or orifices (e.g., variable flow orifices, etc.). In other embodiments, the first flow control device 9758 and the second flow control device 9768 are remotely positioned but in fluid communication with the first chamber 9726 and the second chamber 9728.

According to an exemplary embodiment, the main body 9702 defines a plurality of sets of openings. As shown in FIG. 190*e*, the plurality of sets of openings include a first set having openings 9754 and openings 9756. The openings 9754 and the openings 9756 are fluidly coupled by the first passage 9752. As shown in FIG. 190*f*, the plurality of sets of openings include a second set having openings 9764 and openings 9766. The openings 9764 and the openings 9766 are fluidly coupled by the second passage 9762. According to an exemplary embodiment, the first passage 9752 and the second passage 9762 are offset relative to one another both circumferentially and longitudinally along the length of the main body 9702 and the bypass manifold 9740. In other embodiments, the main body 9702 defines a different number of sets of openings (e.g., one, three, four, etc.), each set corresponding with one of the passages defined by the bypass manifold 9740.

According to an exemplary embodiment, the integrated spring damper 9700 provides different damping forces in extension and retraction and also damping forces that vary based on the position of the main piston 9724 relative to the main body 9702 (e.g., position dependent dampening, etc.). According to an exemplary embodiment, the integrated spring damper 9700 provides recoil damping forces in jounce and compression damping forces in recoil as part of a spring force compensation strategy. By way of example, the position dependent dampening of the integrated spring damper 9700 may function as follows. As the main piston 9724 translates within main body 9702 (e.g., due to relative movement between components of a vehicle suspension system, etc.), various openings and their corresponding passages are activated and deactivated. According to an exemplary embodiment, fluid flows through the activated openings and their corresponding passages to provide damping forces that vary based on position and direction of travel of the main piston 9724 within the main body 9702.

Movement of the main tube 9716 relative to the main body 9702 translates the main piston 9724, causing the volume of the first chamber 9726 and the second chamber 9728 to vary. When the integrated spring damper 9700 compresses, the volume of the first chamber 9726 decreases while the volume of the second chamber 9728 increases. The fluid is forced from the first chamber 9726 through at least one of the openings 9754 of the first passage 9752 and the openings 9764 of the second passage 9762 (e.g., based on the position of the main piston 9724 within the main body 9702, etc.). The fluid flows through at least one the first passage 9752 and the second passage 9762 past the first flow control device 9758 and the second flow control device 9768 and out of the openings 9756 and the openings 9766 into the second chamber 9728. The resistance to the flow of the fluid along at least one of the first passage 9752 and the second passage 9762 and the interaction thereof with the first flow control device 9758 and the second flow control device 9768 provides a damping function for the integrated spring damper 9700 that is independent of the spring function. By way of example, if the non-compressible fluid is able to flow through both the first passage 9752 and the second passage 9762, the dampening provided by the integrated spring damper 9700 will be less than if fluid is able to flow through only one of the first passage 9752 and the second passage 9762. Therefore, as the main piston 9724 moves towards the cap 9704, the integrated spring damper 9700 provides a first dampening characteristic (e.g., less dampening, etc.) when the openings 9754 and the openings 9764 are active and a second dampening characteristics (e.g., more dampening, etc.) when only the openings 9764 are active (e.g., because the main piston 9724 deactivates the openings 9754, which may include the openings 9754 being positioned within the second chamber 9728, etc.).

Referring to FIGS. 191*a*-191*f*, an integrated spring damper 9800 is shown, according to another exemplary embodiment. The integrated spring damper 9800 is similar in construction and function to the integrated spring damper 9700.

As shown in FIG. 191*a*, the integrated spring damper 9800 includes a tubular (e.g., cylindrical, etc.) main body (e.g., cylinder, housing, base, etc.), shown a main body 9802. In one embodiment, the main body 9802 is manufactured using an extrusion process. In an alternative embodiment, the main body 9802 is manufactured using a casting process. As shown in FIGS. 191*a* and 191*c*, a cap, shown as cap 9804, and a barrier, shown as barrier 9806, are disposed on opposing ends of the main body 9802, defining an internal volume. According to an exemplary embodiment, the integrated spring damper 9800 includes a wearband, shown as wearband 9890, positioned between interfacing surfaces of the main body 9802 and the main piston 9824. The wearband 9890 increases the side load and bending load capabilities of the integrated spring damper 9800. The integrated spring damper 9800 further includes a tubular (e.g., cylindrical, etc.) element, shown as main tube 9816. The main tube 9816 is at least partially received within the internal volume of the main body 9802. The main tube 9816 is configured to translate with respect to the main body 9802. As shown in FIGS. 191*a*-191*c*, a cap, shown as cap 9818, is disposed at a distal end of the main tube 9816. The cap 9804, barrier 9806, and cap 9818 may be coupled to the respective components with a threaded connection, a friction weld, or with another coupling mechanism (e.g., welding, brazing, interference fit, etc.). In some embodiments, the integrated spring damper 9800 includes a plurality of O-rings positioned between components that are coupled with a threaded connection to reduce the risk of contaminants entering into the integrated spring damper 9800.

According to the exemplary embodiment shown in FIG. 191*a*, the integrated spring damper 9800 includes a locking mechanism, shown as locking mechanism 9870. In one embodiment, the locking mechanism 9870 is configured to position (e.g., lock, index, etc.) the cap 9804 in a target orientation relative to the main body 9802. As shown in FIG. 191*a*, the locking mechanism 9870 includes a retainer, shown as retainer 9872. The retainer 9872 is removably coupled to the main body 9802 with fasteners 9874. The retainer 9872 engages a face, shown as face 9876, defined by (e.g., machined into, etc.) the main body 9802. The cap 9804 includes an interfacing surface, shown as flat 9878. The retainer 9872 may be coupled to the main body 9802 via the fasteners 9874 when the flat 9878 aligns with the face 9876 (i.e., indicating the target orientation, etc.) to facilitate locking the cap 9804 in the target orientation. The locking mechanism 9870 may facilitate indexing a lower mount of the integrated spring damper 9800 relative to other components thereof and thereby facilitate mounting integrated spring damper 9800 onto a vehicle.

According to an exemplary embodiment, the integrated spring damper 9800 includes a first mounting portion (e.g., a lower mounting portion, etc.), shown as eyelet 9820, with which the integrated spring damper 9800 is coupled to one portion of an axle assembly (e.g., a lower portion of the axle assembly, etc.). According to an exemplary embodiment, the integrated spring damper 9800 is coupled on one end (e.g., via the eyelet 9820 on a lower end, etc.) to a moveable member of the axle assembly (e.g., a lower support arm, etc.). According to an exemplary embodiment, the eyelet 9820 is integrally formed with the cap 9804. According to an exemplary embodiment, the eyelet 9820 receives a pin to rotatably couple the eyelet 9820 to a lower portion of the axle assembly (e.g., lower support arm, etc.). In one embodiment, the pin is sized to allow an elastomeric bushing to fit between the pin and the lower support arm. As shown in FIG. 191*a*, the integrated spring damper 9800 includes a second mounting portion (e.g., an upper mounting portion, a pin mount, etc.), shown as upper mount 9807. The upper mount 9807 is configured to couple an opposing second end (e.g., an upper end, etc.) of the integrated spring damper 9800 to a vehicle body, frame member, or part thereof (e.g., chassis, side plate, hull, etc.), shown as side plate 9900.

As shown in FIGS. 191*a* and 191*c*-191*d*, the upper mount 9807 includes a first mounting member 9808, a second mounting member 9810, a third mounting member 9812, and a fourth mounting member 9814. As shown in FIGS. 191*a* and 191*d*, the first mounting member 9808 is positioned such that a top surface of the first mounting member 9808 abuts a first surface of the side plate 9900, shown as bottom surface 9902. In one embodiment, the first mounting member 9808 is constructed from a metal or wear resistant material. As shown in FIG. 191*c*-191*d*, the second mounting member 9810 includes a portion (e.g., a lower portion, a first portion, a non-protruded portion, etc.) that is positioned between the cap 9818 and the first mounting member 9808. In one embodiment, the second mounting member 9810 is a resilient member, such as a flexible urethane, that serves as an isolator and an elastomeric spacer. The second mounting member 9810 may be configured to isolate the cap 9818 from at least one of the first mounting member 9808 and the side plate 9900. In some embodiments, the first mounting member 9808 and the second mounting member 9810 are annular and circular in shape. In other embodiments, the first mounting member 9808 and the second mounting member 9810 have another shape (e.g., discus square, hexagonal, etc.).

As shown in FIGS. 191*a* and 191*d*, the fourth mounting member 9814 is positioned between the side plate 9900 and the third mounting member 9812. A second surface, shown as top surface 9904, of the side plate 9900 is in contact with a bottom surface of the fourth mounting member 9814, and the third mounting member 9812 is disposed on a top surface of the fourth mounting member 9814. The first mounting member 9808 and the fourth mounting member 9814 are spaced to receive the side plate 9900. In one embodiment, the fourth mounting member 9814 is a resilient member, such as a flexible urethane, that serves as an isolator and an elastomeric spacer. The fourth mounting member 9814 may be configured to isolate the third mounting member 9812 from the side plate 9900. In one embodiment, the third mounting member 9812 is constructed from a metal or wear resistant material. In some embodiments, the third mounting member 9812 and the fourth mounting member 9814 are annular and circular in shape. In other embodiments, the third mounting member 9812 and the fourth mounting member 9814 have another shape (e.g., discus square, hexagonal, etc.).

As shown in FIG. 191*d*, the first mounting member 9808 defines an aperture, shown as aperture 9809, that corresponds with (e.g., aligns with, cooperates with, etc.) an aperture defined by side plate 9900, shown as side plate aperture 9906. The second mounting member 9810 includes a protruded portion (e.g., a second portion, an upper portion, etc.) that extends through the aperture 9809 and the side plate aperture 9906 and engages with an aperture, shown as aperture 9815, defined by the fourth mounting member 9814. In one embodiment, the aperture 9815 receives the protruded portion of the second mounting member 9810. The second mounting member 9810 defines an aperture, shown as bore 9811, that extends longitudinally through the second mounting member 9810 and aligns with (e.g., cooperates with, etc.) an aperture, shown as aperture 9813, defined by the third mounting member 9812. The bore 9811 and the aperture 9813 receive a protruded portion 98198 of the cap 9818. In one embodiment, the protruded portion 9819 is coupled to the cap 9818 by a friction weld 9821. In other embodiments, the cap 9818 and the protruded portion 9819 are integrally formed. According to an exemplary embodiment, the friction weld 9821 between the cap 9818 and the protruded portion 9819 is positioned to reduce stress concentration within the cap 9818 and the integrated spring damper 9800 such that the side plate 9900 carries substantially all of the stresses generated during the use of the integrated spring damper 9800. In some embodiments, the cap 9818 includes notches, shown as notches 9823. The notches 9823 may be at least one of shaped and positioned to substantially reduce stress concentration within the cap 9818.

As shown in FIG. 191*c*, a main piston, shown as main piston 9824, is disposed in the internal volume of the main body 9802. The main piston 9824 is coupled to the main tube 9816 and slidably engages the main body 9802. The main piston 9824 separates the internal volume into a first chamber 9826 (e.g., compression chamber, etc.) and a second chamber 9828 (e.g., extension chamber, etc.). The first chamber 9826 is a generally cylindrical chamber that includes the portion of the internal volume of the main body 9802 between the main piston 9824 and the cap 9804. The second chamber 9828 is an annular chamber defined between the main body 9802 and the main tube 9816 and extends between the main piston 9824 and the barrier 9806. When the main tube 9816 translates relative to the main body 9802, the main piston 9824 changes the volume of the first chamber 9826 and the second chamber 9828. A dividing piston, shown as dividing piston 9830 (e.g., floating piston, etc.), is disposed in the main tube 9816 and slidably engages the main tube 9816. The dividing piston 9830 separates the internal volume of the main tube 9816 into a first inner chamber 9832 and a second inner chamber 9834. According to an exemplary embodiment, the first inner chamber 9832 is open to (i.e., in fluid communication with, etc.) the first chamber 9826.

According to an exemplary embodiment, the first chamber 9826, the second chamber 9828, and the first inner chamber 9832 contain a generally non-compressible fluid (e.g., hydraulic fluid, oil, etc.). According to an exemplary embodiment, the second inner chamber 9834 contains a generally compressible fluid that may include (e.g., at least 90%, at least 95%) an inert gas such as nitrogen, argon, or helium, among others. In some embodiments, the second inner chamber 9834 is in fluid communication with external devices, such as one or more reservoirs (e.g., central reservoir, tank, etc.), an accumulator, or a device allowing the pressure of the gas to be adjusted via a pressure regulation line. The pressure of the gas may be adjusted by removing or adding a volume of gas to adjust the suspension ride height.

According to an exemplary embodiment, the integrated spring damper 9800 includes a pressure regulation line that is located at a top portion (e.g., a top end, an upper end, etc.) of the integrated spring damper 9800. As shown in FIGS. 191*a*-191*d*, the integrated spring damper 9800 includes a port, shown as pressure regulation port 9880, coupled to the protruded portion 9819 of the cap 9818 (e.g., via a threaded interface, welded, etc.). As shown in FIGS. 191*c*-191*d*, the pressure regulation port 9880 defines a passageway, shown as inlet passageway 9882. The protruded portion 9819 of the cap 9818 defines a passageway, shown as intermediate passageway 9822. The intermediate passageway 9822 cooperates with the inlet passageway 9882 to define the pressure regulation line of the integrated spring damper 9800. The pressure regulation line extends from the pressure regulation port 9880, through the protruded portion 9819 of the cap 9818, and into the second inner chamber 9834 of the main tube 9816. According to an exemplary embodiment, the pressure regulation line of the integrated spring damper 9800 facilitates increasing or decreasing a volume of fluid (e.g., an inert gas, etc.) within the second inner chamber 9834 of the main tube 9816.

According to an exemplary embodiment, the pressure regulation port 9880 is positioned at the top of the integrated spring damper 9800 to provide a fixed or static location to fill or release gas from the second inner chamber 9834 of the integrated spring damper 9800. The pressure regulation port 9880 is positioned to increase (e.g., maximize, etc.) the travel of the main tube 9816 within the main body 9802, thereby increasing the stroke of the integrated spring damper 9800. By way of example, impulse forces transmitted to occupants within a vehicle from bumps, pot holes, etc. may be reduced by increasing the maximum stroke of the integrated spring damper 9800. According to an exemplary embodiment, the pressure regulation port 9880 is positioned above the side plate 9900 to reduce the risk of debris (e.g., dirt, rocks, mud, etc.) damaging or blocking the pressure regulation port 9880.

When the integrated spring damper 9800 is compressed or extended, the main tube 9816 translates relative to the main body 9802. The gas held in the second inner chamber 9834 compresses or expands in response to relative movement between the main tube 9816 and the dividing piston 9830, which may remain relatively stationary but transmit pressure variations between the incompressible hydraulic fluid in the first inner chamber 9832 and the compressible fluid in second inner chamber 9834. The gas in the second inner chamber 9834 resists compression, providing a force that is a function of the compressibility of the gas, the area of the piston, the volume and geometry of the second inner chamber 9834, and the current state (e.g., initial pressure, etc.) of the gas, among other factors. The receipt of potential energy as the gas is compressed, storage of potential energy, and release of potential energy as the gas expands provide a spring function for the integrated spring damper 9800.

In one embodiment, the dividing piston 9830 defines a cup 9831. According to the exemplary embodiment shown in FIG. 191*c*, the dividing piston 9830 is positioned such that the cup 9831 facilitates an increase in the volume of the first inner chamber 9832. In alternate embodiments, the dividing piston 9830 is positioned such that the cup 9831 facilitates an increase in the volume of the second inner chamber 9834. The dividing piston 9830 may be flipped and repositioned to selectively increase the volume of the first inner chamber 9832 or the second inner chamber 9834 to tune the performance of the integrated spring damper 9800. In other embodiments, the cup 9831 is not defined by the dividing piston 9830. By way of example, increasing the volume of the second inner chamber 9834 (i.e., decreasing the gas pressure within the second inner chamber 9834, etc.) may facilitate a softer ride (e.g., a smaller spring force, etc.), while decreasing the volume of the second inner chamber 9834 (i.e., increasing the gas pressure within the second inner chamber 9834, etc.) may facilitate a stiffer ride (e.g., a greater spring force, etc.).

Referring again to FIG. 191*c*, a limiter, shown as recoil damper 9836, is disposed within the internal volume of the main body 9802, between the main piston 9824 and the barrier 9806. The recoil damper 9836 reduces the risk of damage to the main piston 9824, barrier 9806, the sidewall of main body 9802, and still other components of integrated spring damper 9800 by reducing the forces imparted by the main piston 9824 as it travels toward an end of stroke (i.e., the maximum travel of the stroke, etc.). According to an exemplary embodiment, the recoil damper 9836 includes a recoil piston, shown as recoil piston 9838, positioned within the second chamber 9828 and a resilient member, shown as resilient member 9839. The resilient member 9839 may include an interlaced wave spring (i.e., a flat wire compression spring, etc.), a coil spring, or another type of spring. The resilient member 9839 may be disposed between the recoil piston 9838 and the barrier 9806. According to an exemplary embodiment, the resilient member 9839 is not intended to substantially resist the movement of the main piston 9824 but positions the recoil piston 9838 within the main body 9802, such as after it has been displaced by the main piston 9824. In other embodiments, the recoil damper 9836 does not include a resilient member, and the recoil piston 9838 is repositioned using gravity or an alternative device.

Occupants within a vehicle experience large impulse forces as the main piston 9824 contacts the barrier 9806 or a component of the suspension system engages a hard stop. The recoil damper 9836 reduces such impulse forces transmitted to occupants within the vehicle by dissipating a portion of the kinetic energy of the main piston 9824 and the main tube 9816 (i.e. provide a supplemental damping force, etc.) as the integrated spring damper 9800 reaches an end of stroke (e.g., as the piston reaches a recoil end of stroke, as the piston reaches a jounce end of stroke, etc.). Recoil dampers (e.g., recoil damper 9736, recoil damper 9836, etc.) are discussed in U.S. patent application Ser. No. 13/792,151, filed Mar. 10, 2013, which is incorporated herein by reference in its entirety.

Referring now to FIGS. 191*e*-191*f*, fluid may flow between the first chamber 9826 and the second chamber 9828 through at least one of a first passage 9852 (e.g., conduit, bore, etc.) of a flow path, shown as first flow path 9850, and a second passage 9862 of a flow path, shown as second flow path 9860, defined by a manifold, shown as bypass manifold 9840. In other embodiments, the bypass manifold 9840 defines a different number of passages (e.g., one, three, etc.). According to an exemplary embodiment, the bypass manifold 9840 is coupled to the side of the main body 9802 (e.g., removably coupled to the main body 9802 with a plurality of fasteners, etc.). In other embodiments, the bypass manifold 9840 and the main body 9802 are integrally formed (e.g., a unitary structure, etc.). According to an alternative embodiment, at least one of the first passage 9852 and the second passage 9862 are formed with tubular members coupled to an outer portion of the main body 9802 or with flow passages defined by the main body 9802.

According to the exemplary embodiment shown in FIGS. 191*c* and 191*e*-191*f*, damping forces are generated as the flow of fluid through the first passage 9852 and the second passage 9862 interacts with flow control elements, shown as first flow control device 9858 and second flow control device 9868. According to an exemplary embodiment, the first flow control device 9858 and the second flow control device 9868 are bidirectional flow valves disposed within the bypass manifold 9840 along the first passage 9852 and the second passage 9862, respectively. The first flow control device 9858 and the second flow control device 9868 may include washers that differentially restrict a fluid flow based on the direction that the fluid is flowing. In other embodiments, the first flow control device 9858 and the second flow control device 9868 are other types of flow control devices, such as pop off valves or orifices (e.g., variable flow orifices, etc.). In other embodiments, the first flow control device 9858 and the second flow control device 9868 are remotely positioned but in fluid communication with the first chamber 9826 and the second chamber 9828.

According to an exemplary embodiment, the main body 9802 defines a plurality of sets of openings. As shown in FIG. 191*e*, the plurality of sets of openings include a first set having openings 9854 and openings 9856. The openings 9854 and the openings 9856 are fluidly coupled by the first passage 9852. As shown in FIG. 191*f*, the plurality of sets of openings include a second set having openings 9864 and openings 9866. The openings 9864 and the openings 9866 are fluidly coupled by the second passage 9862. According to an exemplary embodiment, the first passage 9852 and the second passage 9862 are offset relative to one another both circumferentially and longitudinally along the length of the main body 9802 and the bypass manifold 9840. In other embodiments, the main body 9802 defines a different number of sets of openings (e.g., one, three, four, etc.), each set corresponding with one of the passages defined by the bypass manifold 9840.

According to an exemplary embodiment, the integrated spring damper 9800 provides different damping forces in extension and retraction and also damping forces that vary based on the position of the main piston 9824 relative to the main body 9802 (e.g., position dependent dampening, etc.). Position dependent dampening is discussed in U.S. Pat. No. 8,9701,017, issued Aug. 97, 2014, which is incorporated herein by reference in its entirety. According to an exemplary embodiment, the integrated spring damper 9800 provides recoil damping forces in jounce and compression damping forces in recoil as part of a spring force compensation strategy. By way of example, the position dependent dampening of the integrated spring damper 9800 may function as follows. As the main piston 9824 translates within main body 9802 (e.g., due to relative movement between components of a vehicle suspension system, etc.), various openings and their corresponding passages are activated and deactivated. According to an exemplary embodiment, fluid flows through the activated openings and their corresponding passages to provide damping forces that vary based on position and direction of travel of the main piston 9824 within the main body 9802.

Movement of the main tube 9816 relative to the main body 9802 translates the main piston 9824, causing the volume of the first chamber 9826 and the second chamber 9828 to vary. When the integrated spring damper 9800 compresses, the volume of the first chamber 9826 decreases while the volume of the second chamber 9828 increases. The fluid is forced from the first chamber 9826 through at least one of the openings 9854 of the first passage 9852 and the openings 9864 of the second passage 9862 (e.g., based on the position of the main piston 9824 within the main body 9802, etc.). The fluid flows through at least one the first passage 9852 and the second passage 9862 past the first flow control device 9858 and the second flow control device 9868 and out of the openings 9856 and the openings 9866 into the second chamber 9828. The resistance to the flow of the fluid along at least one of the first passage 9852 and the second passage 9862 and the interaction thereof with the first flow control device 9858 and the second flow control device 9868 provides a damping function for the integrated spring damper 9800 that is independent of the spring function. By way of example, if the non-compressible fluid is able to flow through both the first passage 9852 and the second passage 9862, the dampening provided by the integrated spring damper 9800 will be less than if fluid is able to flow through only one of the first passage 9852 and the second passage 9862. Therefore, as the main piston 9824 moves towards the cap 9804, the integrated spring damper 9800 provides a first dampening characteristic (e.g., less dampening, etc.) when the openings 9854 and the openings 9864 are active and a second dampening characteristics (e.g., more dampening, etc.) when only the openings 9864 are active (e.g., because the main piston 9824 deactivates the openings 9854, which may include the openings 9854 being positioned within the second chamber 9828, etc.).

Electrical Load Management

Referring generally to FIG. 192, a vehicle is shown as vehicle 10100. Vehicle 10100 generally comprises a chassis, a cab supported at a front portion of the chassis, a body supported by the chassis rearward of the cab, a drive system for operating the vehicle and/or one or more systems thereof, and a fluid delivery system. According to an exemplary embodiment, the vehicle 10100 is a military ground vehicle. In other embodiments, the vehicle 10100 is an off-road vehicle such as a utility task vehicle, a recreational off-highway vehicle, an all-terrain vehicle, a sport utility vehicle, and/or still another vehicle. In yet other embodiments, the vehicle 10100 is another type of off-road vehicle such as mining, construction, and/or farming equipment. In still other embodiments, the vehicle 10100 is an aerial truck, a rescue truck, an aircraft rescue and firefighting (ARFF) truck, a concrete mixer truck, a refuse truck, a commercial truck, a tanker, an ambulance, and/or still another vehicle.

Vehicle 10100 includes a charging system, shown as charging system 10002. Charging system 10002 includes a prime mover of the vehicle 10100, shown as an engine 10004, a power generator, shown as an alternator 10006, a regulator, shown as voltage regulator 10008, and a power storage device, shown as a battery 10010. Examples of suitable engine 10004 include, but are not limited to, an internal combustion gas-powered engine, a diesel engine, a fuel cell driven motor, an electric motor, or any other type of motor capable of providing mechanical energy. Any of the above mentioned prime movers may be used alone or in combination with one or more additional power sources (as in a hybrid vehicle) to provide mechanical energy. Engine 10004 generates mechanical energy (e.g., angular momentum) from an energy source (e.g., fuel). Such mechanical energy may be coupled to a motion transfer device (e.g., a transmission), which provides the energy to various motive members (e.g., wheels via a differential or the like) of the vehicle 10100.

Additionally, rotational energy generated by the engine 10004 may also be transferred to an alternator 10006. For example, a belt may be coupled to a member (e.g., crankshaft) of the engine 10004. A component of an alternator 10006 (e.g., a rotor coil) may also be coupled to the belt via a pulley system. The rotational energy provided to the alternator 10006 is converted to electrical energy which is used to power various other components of the vehicle 10100. Alternator 10006 generally includes a rotor coil and a set of stator coils. The rotor coil may be any form of electromagnet. In an embodiment, the rotor coil comprises a coil of electrically-conductive wire wrapped around an iron core. In an alternative embodiments, the rotor coil comprises plurality of electromagnet teeth that engage with one another around an axis of the rotor coil so as to provide a rotational variation in magnetic polarity around the axis. In any event, the alternator 10006 includes a member (e.g., brush, slip ring, etc.) configured to receive current either generated by the alternator 10006 or from the battery 10010 and provide a current to the rotor coil. The current creates a magnetic field in the electromagnets in the rotor coil. Additionally, rotational energy from the engine rotates the rotor coil, thus producing a rotationally changing magnetic field in the area surrounding the rotor coil. Such a magnetic field in turn induces alternating current in the set of stator coils. This alternating current is then rectified with a set of electrical components (e.g., diodes) to produce a DC-like field current, which is then used to charge the battery 10010. Additionally, a portion of the field current may be fed to the voltage regulator 10008.

In some embodiments, the alternator 10006 includes various sensors (not shown) to measure various aspects of the operation of the alternator 10006. For example, a rotational sensor may measure the rotation rate of the rotor coil. Various ammeters may measure the current at various stages (e.g., prior to or after the rectifier diodes) of the alternator 10006.

Voltage regulator 10008 is configured to maintain the output voltage of the charging system 10002 within a predetermined operating range. In an embodiment, the voltage regulator 10008 is integrated with (i.e. disposed on or in the same housing as the alternator 10006). In various alternative embodiments, the voltage regulator 10008 is separate from the alternator 10006.

In an embodiment, the voltage regulator 10008 includes an electromechanical relay (e.g., configured to close a circuit when a voltage produced by the battery is insufficient to counteract a field induced by the field current produced by the stator coils of the alternator 10006). In an alternative embodiment, the voltage regulator 10008 is a solid state device. Any suitable type of voltage regulator may be used. In some embodiments, the output voltage of the battery 10010 is an input to the voltage regulator 10008. The voltage regulator 10008 controls the voltage produced by the alternator 10006 by controlling the level of field current introduced into the rotor coil. In an embodiment, if the voltage of the battery 10010 is above or within a predetermined operating range (e.g., indicating a full charge), no field current is supplied to the rotor coil. However, if the voltage of the battery 10010 is below the operating range (e.g., indicating a drain on the battery 10010 by various electrical loads of the vehicle 10100), the field current provided to the rotor coil is increased so as to charge the battery 10010.

In various embodiments, the voltage regulator 10008 includes various measuring devices (not shown) configured to measure the state of operation of the charging system 10002. For example, in one embodiment, the voltage regulator 10008 includes a voltmeter configured to measure the output voltage generated by the alternator 10006 and an ammeter configured to measure the field current generated by the alternator 10006. An additional sensor may measure the output voltage of the battery 10010.

Battery 10010 is configured to provide a voltage used to power various electrical loads (e.g., the controller 10012, display 10016, etc.) of the vehicle 10100. In an embodiment, battery 10010 is a lead acid battery. As such, the battery 10010 includes a positive lead dioxide electrode, a negative electrode constructed of lead, and an acid mixture (e.g., sulfuric acid and water) disposed in a container. The positive electrode undergoes a positive chemical reaction (e.g., emitting electrons to produce a net positive charge on the positive electrodes), and the negative electrode undergoes a negative chemical reaction (e.g., gathering electrons to produce a net negative charge on the negative electronic) to produce a charge difference between the electrodes. This charge difference creates a voltage that may be used to provide a current to electrical loads in the vehicle 10100. After the battery is discharged, the charge must be replenished via the current produced by the alternator 10006. As such, the battery 10010 is electrically coupled to the alternator 10006. In various alternative embodiments, any other suitable type of charge storage device may be used in place of the battery 10010.

Still referring to FIG. 192, the vehicle 10100 includes a control system, shown as controller 10012. By way of overview, the controller 10012 includes a plurality of interfaces facilitating the controller 10012 receiving from the charging system 10002 and providing current to various electrical loads 10016-10022 of the vehicle 10100. As such, the controller 10012 facilitates the provision of electrical power generated by the charging system 10002 to the electrical loads 10016-10022. A more detailed description of the controller 10012 will be provided below in relation to FIG. 193.

Vehicle 10100 further includes a number of electrical loads, shown as a display 10016, lighting system 10018, radio 10020, and dashboard 10022. In various embodiments, the vehicle 10100 includes additional electrical loads (e.g., an engine controller, transmission controller, anti-lock brake system, windshield wiper system, etc.). In some embodiments, the electrical loads 10016-10022 are electrically connected to the controller 10012 via a wiring system (e.g., wire harness) of the vehicle 10100. Lighting system 10018 may include a set of conductors and light emitting elements (e.g., brake lights, headlights, internal lights, etc.) configured to produce light from current supplied by the battery 10010 and direct the light to various points of interest. Radio 10020 is configured to receive power from the battery 10010 and generally includes an antenna configured to receive radio signals and produce sounds audible to a user. Dashboard 10022 may include a plurality of indicators (e.g., an RPM meter, a speedometer, fuel gage, etc.) configured to present the user with the operational state of various components of the vehicle 10100. As such, the dashboard 10022 is electrically coupled to the battery 10010 and the controller 10012 to receive signals measured by various sensors disposed throughout the vehicle 10100.

Display 10016 may be, for example, a display (e.g., a CANlink® CL-711 display manufactured by HED Inc., etc.) having an interface (e.g., a touchscreen, a display with a row of buttons disposed along one side thereof, etc.) that receives an input from a user. Display 10016 may support any type of display feature, such as a flipbook-style animation, or any other type of transition feature. Display 10016 may generally provide a plurality of navigation buttons that allow a user to select various displays and other options via touch. Display 10016 may further, upon detection of a sensor signal captured by the charging system 10002, generate a graphical representation of the sensor signal. For example, if a signal is received from a voltage meter attached to the battery 10010, a notification of the voltage level of the battery 10010 may be presented. Display 10016 may have a wired or wireless connection with other response vehicle subsystems and/or with remote devices.

The display 10016 may be configured to display a graphical user interface, an image, an icon, a notification, and indication, and/or still other information. In the exemplary embodiment shown, the display includes a graphical user interface configured to provide general information about the vehicle 10100 captured by the various sensing devices included in the vehicle 10100. Through such an interface, the operator may be to select various electrical loads 10016-10022 to decouple from the charging system 10002 via the methods described herein.

The display 10016 may include any number of supporting buttons and other tactile user inputs to support interaction between a user and the display. For example, a plurality of push buttons may be located next to or below the display to provide the user with further options. It should be understood that the configuration of the display 10016 may vary without departing from the scope of the present disclosure.

The display 10016 may include or support various technologies. For example, the display 10016 be a touchscreen display and may be separated into any number of portions (e.g., a split-screen type display, etc.). For example, a first portion of the screen may be reserved for one particular type of display (e.g., warnings and alerts, etc.), while another portion of the screen may be reserved for general vehicle information (e.g., speed, fuel level, etc.). The display 10016 may be configured to handle any type of transition, animation, or other display feature that allows for ease of access of information on the display.

In one embodiment, the display 10016 is coupled to a USB input, allowing the display software to be updated. For example, such updates may include updating the maps stored on the display (e.g., to improve navigation features, etc.). Further, custom files may be downloaded to the display (e.g., custom logos, images, text, etc.) to personalize the display 10016 for use in the vehicle 10100.

The display may include any number of video inputs (e.g., from one or more cameras located on the vehicle 10100, etc.). For example, the display may be capable of receiving four video inputs and may display up to four video inputs simultaneously on the display. The display may be configured to detect when a camera feed is up, therefore determining when to display a video input on the display or not (e.g., not displaying a blank or blue screen, etc.).

Still referring to FIG. 192, the vehicle 10100 further includes a power distribution device, shown as a power distribution module 10014. The power distribution module 10014 is configured to selectively couple various electrical loads 10016-10022 to the charging system 10002. In one embodiment, the power distribution module 10014 decouples electrical loads 10016-10022 based on signals received from the controller 10012. In this regard, the power distribution module 10014 may include an electrical switch box that receives the voltage output by the battery 10010 as an input. Power distribution module 10014 further includes a plurality of output lines connected to each of the electrical loads 10016-10022. The power distribution module 10014 may include an electrical switch on each of the output lines. The switches may be selectively opened or closed based on electrical signals received from the controller 10012. Any suitable electrical switching device may be utilized as the power distribution module 10014.

Referring now to FIG. 193, a more detailed view of the controller 10012 of the vehicle 10100 of FIG. 192 is shown, according to an exemplary embodiment. The controller 10012 includes a processing circuit 10202 including a processor 10204 and a memory 10206. Processor 10204 may be a general purpose or specific purpose processor, an application specific integrated circuit (ASIC), one or more field programmable gate arrays (FPGAs), a group of processing components, or other suitable processing components. Processor 10204 may be configured to execute computer code or instructions stored in memory 10206 or received from other computer readable media (e.g., CDROM, network storage, a remote server, etc.) to perform one or more of the processes described herein. Memory 10206 may include one or more data storage devices (e.g., memory units, memory devices, computer-readable storage media, etc.) configured to store data, computer code, executable instructions, or other forms of computer-readable information. Memory 10206 may include random access memory (RAM), read-only memory (ROM), hard drive storage, temporary storage, non-volatile memory, flash memory, optical memory, or any other suitable memory for storing software objects and/or computer instructions. Memory 10206 may include database components, object code components, script components, or any other type of information structure for supporting the various activities and information structures described in the present disclosure. Memory 10206 may be communicably connected to processor 10204 via processing circuit 10202 and may include computer code for executing (e.g., by processor 10204, etc.) one or more of the processes described herein.

The memory 10206 is described below as including various modules. While the exemplary embodiment shown in the figures shows each of the modules 10208-10212 as being separate from one another, it should be understood that, in various other embodiments, the memory may include more, less, or altogether different modules. For example, the structures and functions of one module may be performed by another module, or the activities of two modules may be combined such that they are performed by only a signal module. Additionally, it should be understood that any of the functionalities described as being performed by a module that is a part of the controller 10012 below may also be performed by a separate hardware component having its own processors, network interfaces, etc.

As shown in FIG. 193, the controller 10012 includes an operator input 10214. The operator input 10214 is configured to receive inputs from an operator or other personnel and provide various inputs to vehicle subsystems (e.g., electrical loads 10016-10022, the engine 10004, etc.). The operator input may include one or more buttons, knobs, touchscreens, switches, levers, joysticks, pedals, or handles and associated hardware and software combinations (e.g., analog to digital converters and the like) to convert operator interactions with such components into readable control signals. For example, the operator input 10214 may include a control panel including a number of buttons. Each of the buttons may be associated with one of the electrical loads 10016-10022. In response to a user selecting one of the buttons, the controller 10012 may provide a control signal to the power distribution module 10014 so as to cause the power distribution module 10014 to decouple the indicated load from the charging system 10002. In another example, the operator input 10214 may also include an accelerator pedal enabling the operator to provide an input signal to the engine 10004.

As shown in FIG. 193, the controller 10012 includes a power distribution interface 10216 and a charging system interface 10218. Interfaces 10216-10218 communicably couple the controller 10012 to the charging system 10002 and the power distribution system 10014. As such, interfaces 10216-10218 may be any hardware and/or software compatible with the various connections between controller 10012 and these components. In some embodiments, the vehicle 10100 includes various data lines (not shown) connecting the various components herein. Accordingly, interfaces 10216-10218 discussed above may include a jack, a solder point, and/or other hardware for physically coupling the controller 10012 to the charging system 10002 and power distribution system 10014.

Via the charging system interface 10218, for example, the controller 10012 may receive electrical power from the battery and/or sensor signals from various sensors distributed throughout the charging system 10002 (e.g., a voltmeter measuring the output voltage of the battery, an ammeter measuring an output current of the alternator 10006, etc.). In another example, via the power distribution interface 10216, the controller 10012 may provide electrical control signals configured to selectively open or close various switches in the power distribution module 10014 to selectively decouple various electrical loads 10016-10022 from the charging system 10002.

As shown in FIG. 193, the memory 10206 includes a charging system diagnostics module 10208, a power control module 10210, and a display module 10212. The charging system diagnostics module 10208 is structured to cause the processor 10204 to receive and analyze various signals from the charging system 10002. In an embodiment, the charging system diagnostics module 10208 includes a data logging module configured to store periodic measurements received from various sensors distributed throughout the charging system 10002 (e.g. at the voltage regulator 10008 and battery 10010) in the memory 10206. Such data may be viewable to the user via the display 10016. As such, the user may monitor the performance and status of various components of the charging system 10002.

Additionally, the charging system diagnostics module 10208 may include modules configured to assess the data received from the charging system 10002 to identify various faults in the performance of the charging system 10002. For example, via the charging system diagnostics module 10208, the processor 10204 may compare data generated by a rotational sensor measuring the rate of rotation of a rotor coil of the alternator 10006 to current or voltage produced by the alternator 10006. If the relationship between these values is outside of a previously measured performance curve, for example, the controller 10012 may identify a defect in the coupling between the rotor coil and the engine. Alternatively or additionally, other current measurements measured throughout the alternator 10006 (e.g., prior to the rectifier diodes) may be used to identify other malfunctioning equipment within the alternator 10006 (e.g., the solid state devices themselves).

Additionally, the charging system diagnostics module 10208 identifies faults in the operation of the battery 10010. For example the charging system diagnostics module 10208 may compare a the rate of charging of the battery 10010 (e.g., based on the output voltage of the battery) to the level of field current being produced by the alternator 10006. If the relationship between these values is outside of a previously measured performance curve, for example, the controller 10012 may identify a defect in the battery 10010. Alternatively or additionally, the charging system diagnostics module 10208 may assess the rate of discharge of the battery 10010 as a function of the electrical loads 10016-10022 to which the power distribution module 10014 is supplying power. If the rate of discharge is greater than a previously measured discharge rate, for example, the processor 10204 may identify a fault in the performance of the battery 10010.

The power control module 10210 is configured to selectively decouple electrical loads 10016-10022 from the charging system 10002 in response to certain conditions being detected. For example, in the event that the controller 10012 detects a defect in the operation of the battery 10010 or alternator 10006, the power control module 10210 may generate a control signal configured to cause the power distribution module 10014 to decouple a default set of electrical loads from the charging system 10002. The default loads may be pre-selected by the manufacturer of the vehicle 10100 and may include generally less critical electrical loads (e.g., a cigarette lighter) for the operation of the vehicle 10100. This way, in the event of a charging system malfunction, power is only provided to the most critical electrical loads 10016-10022. In some embodiments, there are multiple sets of default electrical loads that may be decoupled from the charging system 10002. For example, a first set of default electrical loads may be decoupled in the event of a battery malfunction while a second set of default electrical loads may be decoupled in the event of an alternator malfunction.

Alternatively, the electrical loads 10016-10022 that are decoupled from the charging system 10002 may be selected by the user. For example, upon detection of low level of power generation (e.g., resulting from the vehicle 10100 idling, or a charging system malfunction), the controller 10012 (e.g., via the display module 10212 discussed below) may present the user with an interface listing the various electrical loads 10016-10022 coupled to the charging system 10002. The user may select from this list which loads to decouple from the charging system 10002. This way, the user can prioritize electrical loads in the event that insufficient power is available.

As shown in FIG. 193, the memory 10206 further includes a display module 10212. The display module 10212 is structured to cause the processor 10204 to generate various displays for viewing by the display 10016. In the example embodiments shown, the displays presented via the display 10016 may vary depending on various inputs received from the operator or other user. For example, the display module 10212 may include a menu navigation module (not shown). The menu navigation module may present the operator with a menu interface presenting various options to the operator. Each option may include a selectable widget configured to cause the display module 10212 to generate and/or retrieve a particular display in response to the operator's selection of the widget (e.g., by the operator touching the screen of the display 10016 in a position that corresponds to a particular widget).

For example, the menu interface may include a charging system widget. In response to the operator selecting the charging system widget, the display module 10212 may cause the processor 10204 to present the operator with the status of the charging system 10002. Such a display may, for example, identify current operational status of the vehicle alternator 10006 (e.g., current or voltage generation of the alternator 10006 versus engine RPM), a level of charge of the battery 10010, and the electrical loads 10016-10022 that are currently connected to the charging system 10002 via the power distribution module 10014. Additionally, the charging system widget may enable the user to select sets of electrical loads 10016-10022 that are disconnected from the charging system 10002 when deficiencies or malfunctions of the charging system 10002 are detected in accordance with the systems and methods disclosed herein.

While display module 10212 is described with reference to the vehicle 10100 in FIG. 193, it should be understood that display module 10212 may provide the same or a similar type of interface, with the same, similar, or different types of features (e.g., touchscreen input capability, etc.) external user devices (e.g., smartphones) as well (e.g., via a wireless communications interface).

Referring now to FIG. 194, a flow chart of a process 10300 for detecting a malfunction in a charging system of a vehicle, according to an exemplary embodiment. Process 10300 may be executed by, for example, the charging system diagnostic module 10208 of the controller 10012 of the vehicle 10100 discussed above. Process 10300 may be executed to determine that electrical loads connected to the charging system 10002 are to be disconnected.

Process 10300 includes receiving a signal indicative of a reduced battery charge level (block 10302). In some embodiments, the charge in the battery 10010 is reduced due to the number of electrical loads 10016-10022 coupled to the charging system 10002. For example, a user may utilize a windshield wiper system on the vehicle 10100 in the event of a rainstorm. Such an increase in the electrical load placed on the charging system 10002 may cause a diminution of battery charge. As such, a voltmeter may be attached to the electrodes of the battery 10010 in the vehicle 10100, and the controller 10012 may periodically record signals generated by the voltmeter. If such a signal drops below a predetermined threshold, that is an indication of a reduced battery charge level. In some embodiments, the indication is received via monitoring the performance of the alternator 10006. For example, if field current supplied by the voltage regulator 10008 rises above another threshold, that may also be an indication of a reduced charge level of the battery 10010 (because the electrical motive force produced by the battery is insufficient to overcome that produced by alternator).

Process 10300 includes receiving a signal indicative of the field current applied to an alternator rotor coil (block 10304). As discussed above, the voltage regulator 10008 is configured to increase the amount of field current supplied to the rotor coil of the alternator 10006 to increase the current induced in the stator coils, thereby increasing the charge level in the battery 10010. Thus, in a properly functioning charging system 10002, in response to the indication received at step 10302, the field current supplied to the rotor coil would increase. Accordingly, the controller 10012 receives (e.g., via an ammeter coupled to slip rings connected to the rotor coil and the charging system interface 10218) a signal indicative of the level of current provided to the rotor coil. If no increase is detected, this may be indicative of a malfunctioning voltage regulator 10008.

Process 10300 includes monitoring battery charge level (block 10306). In response to an increase in the field current applied to the rotor coil of the alternator 10006 a properly functioning battery 10010 will charge in response to an increase in current received from the alternator 10006. Accordingly, the controller 10012 continues to monitor the voltage of the battery 10010 to determine if the battery is functioning properly.

Process 10300 includes determining if the battery 10010 has charged as a result of the increased field current (block 10308). For example, the controller 10012 may compare successive measurements returned by the voltmeter measuring the voltage output of the battery 10010. If power generated by the battery 10010 is being supplied to various electrical loads 10016-10022 of the vehicle 10100, a neutral or relatively slow decline in the battery 10010's voltage may be consistent with the battery receiving charge from the alternator 10006. Accordingly, the controller 10012 may identify the electrical loads 10016-10022 that are currently being powered, and compare temporal variations in the voltage level of the battery 10010 to voltage levels at previous times when a similar set of electrical loads 10016-10022 was being powered by the battery 10010.

If the battery 10010's charge level is in line with previously-measured values, the controller 10012 provides an indication of proper charging system function (block 10310). For example, a graphical interface may be presented to a user on the display 10016 that indicates that the charging system 10002 is functioning properly. Alternatively or additionally, warning lights on the dashboard 10022 may not be provided with current, thus indicating no problems with the charging system 10002.

If the temporal variations of the battery 10010's charge deviate from previous values (e.g., if the battery 10010 is not charging, or if the battery 10010's voltage level is declining more quickly than a previously measured rate), the controller 10012 may monitor voltage and current outputs at various stages (e.g., after or prior to the rectifying diodes, at the output to the battery, at the output of each of the stator coils, etc.) of the alternator 10006 (block 10312). Such values may be measured as a function of field current provided to the rotor coil. Additionally, in some embodiments, the controller 10012 receives a signal from a motion detector configured to measure the rate of rotation of the rotor coil.

Process 10300 also includes determining if the outputs of the alternator 10006 are in line with past performance (block 10314). If a voltage or current level at a particular point in the alternator 10006 is not at a level that is in line with previously measured values (e.g., as a function of field current provided to the rotor coil or the rate of rotation of the rotor coil), the controller 10012 may provide an indication of alternator malfunction (block 10316). For example, a malfunction notification may be provided via the display 10016. The malfunction notification may indicate to a user that the alternator 10006 is not functioning as previously. Additionally, the notification may identify the portion(s) of the alternator 10006 that were detected to be deficient. For example, if the rate of rotation of the rotor coil mismatches an RPM level of the engine 10004 by more than what is usual, the notification may indicate that there is a defect in the rotational coupling between the engine 10004 and the rotor coil. In another example, if the current measured prior to the rectifier diodes is in line with previously measured values, but the current after the rectifier diodes is less than previously measured values, the notification may indicate to the user that there is a problem with the rectifier diodes (e.g., in a connection joint).

If the outputs in the alternator 10006 are in line with previously measured values, however, the controller 10012 may provide an indication of a battery malfunction (block 10318). In other words, if the battery charge level is decreasing by more than a previously measured amount and the alternator 10006 is functioning properly, then there is likely an issue with the operation of the battery 10010. Accordingly, the controller 10012 provide a battery malfunction notification to the user via the display 10016. The battery malfunction notification may indicate to the user that the battery is not functioning properly, and provide a charge level of the battery 10010 and an estimated time of complete battery discharge (e.g., determined based on the current level of power usage of the vehicle 10100).

In various embodiments, upon detection of either a malfunction in the alternator 10006 or the battery 10010 (e.g., at block 10308 or block 10314), the controller 10012 may selectively decouple various electrical loads 10016-10022 from the charging system to allocate the limited electrical power available to more essential loads (e.g., an engine control unit, braking system, etc.). For example, the controller 10012 may provide control signals to the power distribution module 10014 causing the power distribution module 10014 to open electrical switches associated with the electrical loads 10016-10022 that are to be decoupled from the charging system 10002.

In some embodiments, the particular set of electrical loads that is decoupled varies depending on the particular defect detected. For example, if an alternator issue is detected, the controller 10012 may only provide power to the most essential electrical loads 10016-10022 of the vehicle 10100 (e.g., engine 10004, braking system, transmission, etc.). In some embodiments, the user may select the electrical loads 10016-10022 that may remain connected to the charging system 10002 in the event of a charging system malfunction. For example, the user may be able to set which electrical loads are decoupled by the controller 10012 upon detection of a particular malfunction. Accordingly, the user may select a first set of electrical loads 10016-10022 to decouple from the charging system 10002 when a battery defect is detected and a second set of electrical loads 10016-10022 to decouple when an alternator defect is detected. Thus, the controller 10012 may decouple the first set of electrical loads 10016-10022 upon detecting a battery defect and the second set of electrical loads 10016-10022 upon detection of an alternator defect.

Referring now to FIG. 195, a flow chart of a process 10400 for selectively shedding electrical loads from a charging system of a vehicle is shown, according to an exemplary embodiment. Process 10400 may be executed by, for example, the charging system diagnostic module 10208, power control module 10210, and display module 10212 of the controller 10012 of the vehicle 10100 discussed above. Process 10400 may be executed to optimize the set of electrical loads connected to a charging system of a vehicle given the state of operation of the charging system.

Process 10400 includes receiving an indication of an engine operating level. For example, the engine 10004 of the vehicle 10100 may include sensor configured to generate a signal that corresponds to the operational rate of the engine 10004. The controller 10012 may receive such a signal via an interface (e.g., similar to the charging system interface 10218 discussed above).

Process 10400 also includes determining the operating level of the engine is below a power neutral level (block 10404). For example, the electrical loads 10016-10022 that are currently coupled to the charging system 10002 may require a certain amount of power to function properly. Such data may be stored in the memory 10206 of the controller 10012. For example, the memory 10206 may include various datasets describing the power usage of various sets of electrical loads 10016-10022. Accordingly, the controller 10012 may retrieve such previous datasets and determine the amount of power required to run the set of electrical loads 10016-10022. Additionally, memory 10206 may also include a lookup table describing the relationship between an engine RPM level and the level of current or voltage generated by the alternator 10006. Thus, the controller 10012 may compare the power generated by the alternator 10006 given the current RPM level of the engine 10004 to the amount of power required to operate the current set of electrical loads 10016-10022.

If the power produced by the alternator 10006 is lower than what is required to run the current set of electrical loads 10016-10022, the controller 10012 sheds power to a subset of the electrical loads 10016-10022 in accordance with user-input low power preferences (block 10406). For example, via the display module 10212 discussed above, the user may indicate various preferences regarding which electrical loads to decouple from the charging system 10002 in the event that the vehicle 10100 is operating below a power-neutral level (e.g., when the engine 10004 is idling). Such user-input preferences may be stored in the memory 10206 of the controller 10012. Accordingly, these preferences may be retrieved and used to generate control signals that are provided to the power distribution module 10014 to decouple the selected loads.

In some embodiments, the user is able to select which electrical loads to decouple in real time upon the detection of the vehicle 10100 being in a power depleting level of operation. For example, in response to the controller 10012 detecting such a level of operation, a power load selection interface may be presented to the user, enabling the user to select which electrical loads to decouple. In various alterative embodiments, the particular set of electrical loads that are decoupled may be pre-selected by the manufacturer of the vehicle 10100 or another individual.

Process 10400 further includes determining if the operating level of the vehicle 10100 has returned to a power generating level (block 10410). For example, in one embodiment, the controller 10012 monitors the signal corresponding to the RPM level of the engine and, upon the RPM level of the engine 10004 reaching a particular threshold, the controller may determine that the alternator 10006 is able to generate sufficient power to operate the initial set of electrical loads 10016-10022 coupled to the charging system 10002. In response to such a determination, the controller 10012 may provide control signals to the power distribution module 10014 to re-close the switches associated with the electrical loads shed at step 10406 (block 10412). As such, the systems and methods disclosed herein allow for real time adjustment of the electrical loads 10016-10022 connected to the charging system 10002 based on the level of power production of the alternator 10006.

In the event that the vehicle 10100 is determined to be operating at or above a power neutral level at step 10404, the controller 10012 determines if any charging system malfunctions have been detected (block 10414). In this regard, the controller 10012 continuously performs the process 10300 discussed above. Any indication of a reduced battery charge level, for example, may initiate performance of the method 10300 to detect any operational defects in the charging system 10002.

If performance of the process 10300 reveals a malfunction in the charging system 10002 (e.g., in either the alternator 10006 or the battery 10010) the controller 10012 sheds electrical loads in accordance with user-input malfunction preferences (block 10416). As discussed above, the controller 10012 may enable the user to set situation-based sets of electrical loads to decouple from the charging system 10002 that vary based on the particular malfunction detected in the charging system 10002. Accordingly, the controller 10012 may retrieve such user-input preferences and generate control signals that are provided to the power distribution module 10014 to decouple the selected set of loads. In some embodiments, the particular electrical loads 10016-10022 that are decoupled are pre-selected by the manufacturer of the vehicle or another individual. As such, only prioritized electrical loads 10016-10022 are provided with power in the event of the detection of a charging system malfunction.

If performance of the process 10300 does not reveal any charging system malfunctions, power is provided the electrical loads in the vehicle 10100 in accordance with default settings (block 10418). For example, certain electrical loads 10016-10022 may be automatically provided with power as a default (e.g., loads necessary for operation of the vehicle 10100), while others (e.g., the radio 10020) may only be provided with power in response to a user input (e.g., via the operator input 10214 or display 10016). Assuming proper functioning of the charging system 10002, the alternator 10006 provides a level of current to the battery 10010 that is necessary to maintain a charge level of the battery 10010. As such power is provided to the various electrical loads 10016-10022 in accordance with the user's preferences in a power-neutral fashion.

In some embodiments, even in the event that no malfunctioning of the charging system 10002 is detected, the user may still indicate a preference to decouple certain electrical loads 10016-10022 from the charging system 10002 (e.g., in an effort to conserve energy). For example, the user may select to decouple the display 10016 when the user does not wish to use the display 10016. Thus, power is conserved.

In-Seat Sound Suppression

As shown in FIG. 196, a vehicle, shown as vehicle 10510, includes a hull and frame assembly 10600, an armor assembly 10700, and wheel and tire assemblies 10850. According to the exemplary embodiment shown in FIG. 196, the vehicle 10510 is a military vehicle (e.g., joint light tactical vehicle ("JLTV"), family of medium tactical vehicles ("FMTV"), etc.). In other embodiments, the vehicle 10510 is an aircraft (e.g., an airplane, a helicopter, etc.), a troop carrier, a tank, a passenger vehicle, a semi-truck, an off-road vehicle, an all-terrain vehicle, a utility task vehicle, a motorcycle, construction equipment (e.g., a skid loader, a telehandler, boom lift, a scissor lift, etc.), a refuse vehicle, a concrete mixer truck, an ambulance, a fire truck, and/or still another type of vehicle. According to an exemplary embodiment, the vehicle 10510 includes an engine, a transmission, a transaxle, a braking system, a fuel system, and a suspension system coupling the hull and frame assembly 10600 to the wheel and tire assemblies 10850.

As shown in FIG. 196, the hull and frame assembly 10600 includes a passenger capsule, shown as cabin 10610, a front module, shown as front module 10620, and a rear module, shown as rear module 10630. According to an exemplary embodiment, the front module 10620 and the rear module 10630 are coupled to the cabin 10610 with a plurality of interfaces. As shown in FIG. 196, the front module 10620 includes a front axle having wheel and tire assemblies 10850. The front module 10620 includes a body panel, shown as hood 10622. In some embodiments, the hood 10622 at least partially surrounds the engine of the vehicle 10510. As shown in FIG. 196, the rear module 10630 includes a body assembly, shown as bed 10632.

As shown in FIGS. 197 and 201-203, the armor assembly 10700 includes a passenger capsule assembly 10702. The passenger capsule assembly 10702 includes a roof 10701, a floor 10707, a headliner 10710, and seats 10800. As shown in FIGS. 196, 197, and 201-203, the passenger capsule assembly 10702 is a main passenger compartment of the vehicle 10500. The passenger capsule assembly 10702 may be configured to encapsulate and/or provide a space for one or more seats 10800 for the operator (e.g., driver, etc.) and one or more occupants of the vehicle 10500 (e.g., front seats, rear seats, etc.). In an alternative embodiment, the passenger capsule assembly 10702 is a troop carrier disposed on and/or within another portion of a vehicle (e.g., the bed 10632 of the vehicle 10500, etc.).

As shown in FIGS. 198-201, each of the seats 10800 include a first portion, shown as seat portion 10810, a second portion, shown as back portion 10820, and a third portion, shown as headrest 330. As shown in FIGS. 198 and 199, the headrest 330 is integrally formed with the back portion 10820. As shown in FIG. 200, the headrest 330 is releasably coupled to the back portion 10820 where the back portion 10820 of the seat 10800 defines interfaces, shown as slots 10822, that cooperate with (e.g., receives, etc.) corresponding interfaces of the headrest 330, shown as posts 10832.

According to the exemplary embodiment shown in FIGS. 197-203, the passenger capsule assembly 10702 includes a noise suppression or noise canceling system, shown as sound suppression system 10900, configured to provide sound suppression to occupants sitting in the seats 10800. As shown in FIGS. 197-201, the sound suppression system 10900 is configured as an in-seat sound suppression system (e.g., multiple components of the sound suppression system 10900 are positioned within the seats 10800, etc.). As shown in FIGS. 202 and 203, the sound suppression system 10900 is configured as a sound suppression system positioned external from the seats 10800 (e.g., the majority of the components of the sound suppression system 10900 are positioned external from the seats 10800, etc.). In some embodiments, the sound suppression system 10900 includes components of both the in-seat sound suppression system and the external sound suppression system that cooperatively provide the sound suppression to the occupants sitting in the seats 10800.

As shown in FIGS. 197-201, the sound suppression system 10900 includes a first speaker, shown as first in-seat speaker 10910, a second speaker, shown as second in-seat speaker 10920, and a third speaker, shown as third in-seat speaker 10930, positioned within each headrest 330 of the seats 10800. The first in-seat speakers 10910 are positioned along a vertical centerline of and disposed within (e.g., recessed within, etc.) each of the headrests 330 such that the first in-seat speakers 10910 are positioned directly or approximately directly behind the head of passengers sitting in the seats 10800. The second in-seat speakers 10920 are positioned laterally offset from (e.g., to the left of, etc.) the vertical centerline of and disposed within (e.g., recessed within, etc.) each of the headrests 330 such that the second in-seat speakers 10920 are proximate the left ear of passengers sitting in the seats 10800. The third in-seat speakers 10930 are positioned laterally offset from (e.g., to the right of, etc.) the vertical centerline of and disposed within (e.g., recessed within, etc.) the headrests 330 such that the third in-seat speakers 10930 are proximate the right ear of passengers sitting in the seat 10800. In other embodiments, the sound suppression system 10900 includes a different number of speakers and/or the speakers are otherwise positioned within the seat 10800. According to an exemplary embodiment, the first in-seat speaker 10910 is configured to emit sound therefrom at a lower frequency than that of the sound emitted from the second in-seat speaker 10920 and/or the third in-seat speaker 10930. In some embodiments, the speakers are covered with some sort of protective covering, cage, grille, and/or padding.

As shown in FIGS. 202 and 203, the sound suppression system 10900 additionally or alternatively includes a fourth speaker, shown as first headliner speaker 10912, a fifth speaker, shown as second headliner speaker 10922, and a sixth speaker, shown third headliner speaker 10932, positioned within the headliner 10710 above each of the seats 10800. The first headliner speakers 10912 are positioned directly above each of the seats 10800. The second headliner speakers 10922 are positioned laterally offset from (e.g., to the left of, to the rear of, etc.) the first headliner speakers 10912. The third headliner speakers 10932 are positioned laterally offset from (e.g., to the right of, to the front of, etc.) the first headliner speakers 10912. In other embodiments, the sound suppression system 10900 includes a different number of speakers and/or the speakers are otherwise positioned within the headliner 10710. According to an exemplary embodiment, the first headliner speaker 10912 is configured to emit sound therefrom at a lower frequency than that of the sound emitted from the second headliner speaker 10922 and/or the third headliner speaker 10932.

As shown in FIG. 201, the first in-seat speakers 10910, the second in-seat speakers 10920, and the third in-seat speakers 10930 are selectively and/or dynamically controllable to emit sound waves at target frequencies that are out of phase with noise within the passenger capsule assembly 10702 (e.g., low frequency noises, etc.) to dampen the noise and generate first zones of quiet (e.g., a quiet bubble, etc.), shown as first sound suppression zones 10902, around the head of the passengers within each of the seats 10800. Accordingly, when a passenger's head is within the first sound suppression zone 10902, the noise (e.g., from lower frequency sources, etc.) heard thereby is significantly lower than what would otherwise be heard outside of the first sound suppression zone 10902.

As shown in FIGS. 202 and 203, the first headliner speakers 10912, the second headliner speakers 10922, and the third headliner speakers 10932 are selectively and/or dynamically controllable to emit sound waves at target frequencies that are out of phase with noise within the passenger capsule assembly 10702 (e.g., low frequency noises, etc.) to dampen the noise and generate second zones of quiet (e.g., a quiet bubble, etc.), shown as second sound suppression zones 10904, around the head of the passengers within each of the seats 10800. Accordingly, when a passenger's head is within the second sound suppression zone 10904, the noise (e.g., from lower frequency sources, etc.) heard thereby is significantly lower than what would otherwise be heard outside of the second sound suppression zone 10904. In some embodiments, the first sound suppression zone 10902 and the second sound suppression zone 10904 are used in unison to further dampen sound and/or depend different frequency noises.

According to an exemplary embodiment, the first sound suppression zones 10902 and/or the second sound suppression zones 10904 are configured to suppress noises having a frequency of 1,000 Hertz ("Hz") or less. In some embodiments, the first sound suppression zones 10902 and/or the second sound suppression zones 10904 are configured to suppress noises having a frequency greater than 1,000 Hz (e.g., 1,10700 Hz; 1,500 Hz; 2,000 Hz; etc.). By targeting lower frequency noises, the out of phase sound waves that make up the first sound suppression zones 10902 and/or the second sound suppression zones 10904 may travel farther from the speakers than if higher frequency noises were targeted (i.e., lower frequency waves travel farther than higher frequency waves). According to an exemplary embodiment, the first sound suppression zones 10902 and/or the second sound suppression zones 10904 are capable of extending up to approximately sixteen inches from the speakers that they were emitted by. In some embodiments, the first sound suppression zones 10902 and/or the second sound suppression zones 10904 extend farther than or less than sixteen inches (e.g., up to at least 22 inches, up to at least 20 inches, up to at least 18 inches, up to at least 14 inches, up to at least 97 inches, up to at least 10500 inches, up to at least 8 inches, up to at least 6 inches, etc.) by emitting sound waves that target lower frequencies, by emitting sound waves that target higher frequencies, etc.

As shown in FIGS. 197-203, the sound suppression system 10900 includes a microphone, shown as in-seat microphone 10940, positioned within each headrest 330 of the seats 10800. According to an exemplary embodiment, the in-seat microphone 10940 is positioned within the headrest 330 at a location that is near one or more ears of a passenger sitting in the seat 10800. Such positioning of the in-seat microphone facilitates monitoring sound that is approximately what a passenger sitting in the seat 10800 is hearing. In other embodiments, the in-seat microphone 10940 is otherwise positioned. By way of example, a microphone may be worn by the passenger (e.g., around their ear, an earpiece, etc.). Sound data acquired by the in-seat microphone 10940 may be analyzed for error tracking and making dynamic adjustments to the first sound suppression zone 10902 and/or the second sound suppression zone 10904 as needed to improve the sound suppression of noise at target frequencies.

As shown in FIGS. 201 and 203, the sound suppression system 10900 includes a user detection sensor, shown as user detection sensor 10960. The user detection sensor 10960 may be configured to detect the presence of, detect characteristics of, and/or facilitate identifying a passenger sitting within a respective seat 10800. By way of example, the user detection sensor 10960 may be a weight sensor or switch within the seat portion 10810 that detects when a passenger is sitting thereon. By way of another example, the user detection sensor 10960 may be a camera or other type of sensor capable of detecting characteristics of the passenger (e.g., sitting position, height, head position, etc.). By way of yet another example, the user detection sensor 10960 may be a biometric sensor or scanner (e.g., a fingerprint scanner, a facial scanner, a retinal scanner, etc.) that facilitates identifying the passenger (e.g., from a set of pre-stored passenger profiles, etc.).

As shown in FIGS. 201 and 203, the sound suppression system 10900 includes an input device, shown as user input/output ("I/O") device 10970. The user I/O device 10970 may be configured to facilitate a passenger in selecting a pre-stored passenger profile associated with them and/or setting up a new passenger profile.

As shown in FIGS. 197-203, the sound suppression system 10900 includes a control system, shown as controller 10950. In some embodiments, as shown in FIGS. 197-201, the sound suppression system 10900 includes a plurality of the controllers 10950, one positioned within each of the headrests 330. Such individually positioned controllers 10950 may individually control the components of the sound suppression system 10900 within the headrest 330 (e.g., the first in-seat speaker 10910, the second in-seat speaker 10920, the third in-seat speaker 10930, the in-seat microphone 10940, etc.) associated therewith. In some embodiments, the controllers 10950 positioned within the seats 10800 additionally or alternatively control the first headliner speaker 10912, the second headliner speaker 10922, and the third headliner speaker 10932 associated with the seat 10800 thereof. In some embodiments, as shown in FIGS. 197 and 201-203, the sound suppression system 10900 additionally or alternatively includes a central controller 10950. Such a central controller 10950 may control all of the components of the sound suppression system 10900 (e.g., control sound suppression for each of the seats 10800 independently, etc.) and/or send and receive data/commands with the controllers 10950 positioned within the seats 10800. Accordingly, the controller(s) 10950 may facilitate independent sound suppression control at each of the seats 10800 (e.g., based on the sound at the headrest 330, the characteristics of the passenger in the respective seat 10800, etc.).

As shown in FIG. 204, the controller 10950 is coupled to the first in-seat speaker 10910, the first headliner speaker 10912, the second in-seat speaker 10920, the second headliner speaker 10922, the third in-seat speaker 10930, the third headliner speaker 10932, the in-seat microphone 10940, the user detection sensor 10960, and the user I/O device 10970. In some embodiments, the controller 10950 is coupled to a plurality of the first in-seat speakers 10910, a plurality of the first headliner speakers 10912, a plurality of the second in-seat speakers 10920, a plurality of the second headliner speakers 10922, a plurality of the third in-seat speakers 10930, a plurality of the third headliner speakers 10932, a plurality of the in-seat microphones 10940, the user detection sensor 10960, and the user I/O device 10970 (e.g., in embodiments where the controller 10950 controls sound suppression for all of the seats 10800, etc.). In other embodiments, the controller 10950 is coupled to more or fewer components. By way of example, the controller 10950 may send and/or receive signals with one or more of the first in-seat speakers 10910, one or more of the first headliner speakers 10912, one or more of the second in-seat speakers 10920, one or more of the second headliner speakers 10922, one or more of the third in-seat speakers 10930, one or more of the third headliner speakers 10932, one or more of the in-seat microphones 10940, the user detection sensor 10960, and/or the user I/O device 10970.

The controller 10950 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 204, the controller 10950 includes a processing circuit 10952 and a memory 10954. The processing circuit 10952 may include an ASIC, one or more FPGAs, a DSP, circuits containing one or more processing components, circuitry for supporting a microprocessor, a group of processing components, or other suitable electronic processing components. In some embodiments, the processing circuit 10952 is configured to execute computer code stored in the memory 10954 to facilitate the activities described herein. The memory 10954 may be any volatile or non-volatile computer-readable storage medium capable of storing data or computer code relating to the activities described herein. According to an exemplary embodiment, the memory 10954 includes computer code modules (e.g., executable code, object code, source code, script code, machine code, etc.) configured for execution by the processing circuit 10952. In some embodiments, controller 10950 represents a collection of processing devices (e.g., servers, data centers, etc.). In such cases, the processing circuit 10952 represents the collective processors of the devices, and the memory 10954 represents the collective storage devices of the devices.

According to an exemplary embodiment, the controller 10950 (e.g., the central controller, the individual seat controllers, etc.) is configured to control the various speakers of the sound suppression system 10900 such that the speakers emit sound waves having at least one of a target frequency and a target amplitude to generate the first noise suppression zones 10902 and/or the second noise suppression zones 10904 that project outward from at least one of the headrests 330 and the headliner 10710 toward the passengers sitting in the seats 10800 of the passenger capsule assembly 10702 to suppress low frequency sound waves perceived by the passengers.

In some embodiments, the controller 10950 (e.g., the central controller, the individual seat controllers, etc.) is configured to store a baseline noise profile for the vehicle 10500. By way of example, a noise profile may be experimentally recorded for the vehicle 10500 and the various lower frequency noises (e.g., less than 1,000 Hz, etc.) generated thereby identified (e.g., the frequencies and amplitudes of the sound waves generated thereby, etc.). Using such a baseline noise profile, the controller 10950 may thereby more accurately and effectively control the various speakers to generate the various first sound suppression zones 10902 and/or the second sound suppression zones 10904 throughout the passenger capsule assembly 10702.

According to an exemplary embodiment, the controller 10950 (e.g., the central controller, the individual seat controllers, etc.) is configured to receive the sound data from each of the in-seat microphones 10940 and make adjustments to the frequency and/or amplitudes of the sound waves of the first sound suppression zones 10902 and/or the second sound suppression zones 10904 (e.g., relative to the baseline profile for the vehicle 10500, etc.). By way of example, the baseline profile may not be entirely representative of the sound at each headrest 330 within the passenger capsule assembly 10702. Accordingly, by monitoring the sound at each headrest 330 using the in-seat microphones 10940, the controller 10950 may make minor adjustments to the baseline profile to be more representative of the sound waves at each specific headrest 330 and, thereby, provide more effective sound suppression.

In some embodiments, the controller 10950 (e.g., the central controller, the individual seat controllers, etc.) is configured to additionally or alternatively make adjustments to the frequency and/or amplitude of the sound waves of the first sound suppression zones 10902 and/or the second sound suppression zones 10904 based on the identity of each respective passenger and/or characteristics of each respective passenger. By way of example, the controller 10950 may be configured to use pre-stored user profiles (e.g., based on data received from the user detection sensor 10960, based on a selection made by the passenger on the user I/O device 10970, etc.) to make adjustments. For example, each pre-stored user profile may indicate the height of a respective passenger, typical head positions thereof on the headrest 330, etc. The controller 10950 may then make minor adjustments to the first sound suppression zones 10902 and/or the second sound suppression zones 10904 based on the characteristics of the specific passenger. By way of another example, the controller 10950 may be configured to detect characteristics of the passengers in real-time (e.g., using the user detection sensor 10960, height, head position, etc.) to make dynamic adjustments to the first sound suppression zones 10902 and/or the second sound suppression zones 10904 based on the detected characteristics. The sound suppression system 10900 may thereby accommodate different sized passengers by adapting to their respective characteristics to provide effective sound suppression to each unique passenger.

As shown in FIGS. 205 and 206, a first sound profile, shown as natural noise profile 11000, and a second sound profile, shown as suppressed noise profile 11100, depict the performance capability of the sound suppression system 10900, according to one embodiment. As shown in FIG. 205, the natural noise profile 11000 of the noise generated by the vehicle 10500 (e.g., low frequency noises, noises below 1,000 Hz, etc.) includes a plurality of sound peaks at varying frequencies that exceed 85 decibels ("dB"), and in some instances approach or exceed 95 dB within the passenger capsule assembly 10702. Such noise levels may hinder communication between the passengers, as well as disrupt the ability of the passengers from hearing communications through earpieces (e.g., for communication with central command, a superior officer, another vehicle, another earpiece, a remote phone, etc.). As shown in FIG. 205, by generating the first sound suppression zones 10902 and/or the second sound suppression zones 10904 with the sound suppression system 10900, all of the sound peaks (e.g., low frequency sound peaks, etc.) of the natural noise profile 11000 can be targeted and may be reduced to a noise level that is less than 85 dB, as shown by suppressed noise profile 11100, and in some instances, all of the sound peaks may be reduced to a noise level that is less than 80 dB. Accordingly, the sound suppression system 10900 is configured to effectively reduce the low-frequency noise levels perceived by the passengers within the passenger capsule assembly 10702 without requiring the passengers to wear ear plugs or electronic noise canceling devices in or around their ears.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10500, the seats 10800, and the sound suppression system 10900 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A suspension element, comprising:

a main body having an internal volume;

a tubular element extending at least partially within the main body, wherein the main body and the tubular element each include a sidewall having an inner surface and an outer surface;

a first piston assembly separating the internal volume of the main body into a first chamber and a second chamber, the second chamber defined by at least portions of the outer surface of the tubular element, the inner surface of the main body, and a surface of the first piston assembly; and a second piston assembly including a side that is directly exposed to the first chamber, wherein the sidewall of the main body defines an aperture therethrough that forms a portion of a flow path between the first chamber and the second chamber, and wherein the first piston assembly is configured to prevent direct fluid communication between the first chamber and the second chamber during at least one of an extension and a contraction of the tubular element.

2. The suspension element of claim 1, wherein the second piston assembly is slidably coupled to the tubular element.

3. The suspension element of claim 1, wherein the first piston assembly couples the tubular element to the main body.

4. The suspension element of claim 1, further comprising at least one flow control element disposed along the flow path between the first chamber and the second chamber.

5. The suspension element of claim 4, wherein the first piston assembly extends between the tubular element and the inner surface of the main body.

6. The suspension element of claim 5, further comprising a cap disposed over a first end of the main body.

7. The suspension element of claim 6, further comprising a barrier coupled to a second end of the main body, wherein the barrier is annular and includes an aperture configured to receive the sidewall of the tubular element therethrough.

8. The suspension element of claim 7, wherein the cap defines an aperture in fluid communication with the first chamber and the second chamber.

9. The suspension element of claim 8, wherein the at least one flow control element is integrated into the cap.

10. The suspension element of claim 8, wherein the at least one flow control element is coupled to the main body.

11. The suspension element of claim 7, further comprising a manifold defining a passage that couples the first chamber with the second chamber, wherein the manifold defines at least a portion of the flow path.

12. The suspension element of claim 11, wherein the manifold comprises a second tubular element, and wherein the sidewall of the main body is disposed at least partially within the second tubular element.

13. The suspension element of claim 1, wherein the first chamber and the second chamber comprise hydraulic chambers configured to contain a hydraulic fluid therein.

14. A suspension assembly, comprising:

a wheel end assembly;

an upper support arm coupled to the wheel end assembly;

a lower support arm coupled to the wheel end assembly; and a suspension element coupled to at least one of the upper support arm and the lower support arm, the suspension element comprising:

a main body having an internal volume;

a tubular element extending at least partially within the main body, wherein the tubular element has an internal volume, and wherein the main body and the tubular element each include a sidewall having an inner surface and an outer surface;

a piston assembly separating the internal volume of the main body into a first chamber and a second chamber, the second chamber defined by at least portions of the outer surface of the tubular element, the inner surface of the main body, and a surface of the piston assembly, wherein the second chamber extends at least partially within the internal volume of the tubular element; and at least one flow control element disposed along a flow path between the first chamber and the second chamber, wherein the sidewall of the main body defines an aperture therethrough that forms a portion of the flow path, and wherein the piston assembly is configured to prevent direct fluid communication between the first chamber and the second chamber during at least one of an extension and a contraction of the tubular element.

15. The suspension assembly of claim 14, wherein the piston assembly couples the tubular element to the main body.

16. The suspension assembly of claim 14, wherein the piston assembly extends between the tubular element and the inner surface of the main body.

17. The suspension assembly of claim 14, further comprising a cap disposed over a first end of the main body.

18. The suspension assembly of claim 17, wherein the at least one flow control element is integrated into the cap.

19. The suspension assembly of claim 14, wherein the first chamber and the second chamber comprise hydraulic chambers configured to contain a hydraulic fluid therein.

20. A method of manufacturing a suspension element, the method comprising:

providing a main body having an internal volume;

extending a tubular element at least partially within the main body, wherein the tubular element has an internal volume that defines a first chamber, and wherein the main body and the tubular element each include a sidewall having an inner surface and an outer surface;

separating the internal volume of the main body into a second chamber and a third chamber with a first piston assembly, the third chamber defined by at least portions of the outer surface of the tubular element, the inner surface of the main body, and a surface of the first piston assembly;

separating the first chamber from the second chamber with a second piston assembly, wherein the second piston assembly includes a first side that is directly exposed to the first chamber and a second side that is directly exposed to the second chamber; and disposing at least one flow control element along a flow path between the second chamber and the third chamber, wherein the sidewall of the main body defines an aperture therethrough that forms a portion of the flow path, and wherein the first piston assembly is configured to prevent direct fluid communication between the second chamber and the third chamber during at least one of an extension and a contraction of the tubular element.

* * * * *